Jan. 10, 1967   W. L. McDONALD ETAL   3,297,992
DATA PROCESSING AND ACCOUNTING SYSTEM
Filed Dec. 28, 1962   119 Sheets-Sheet 2

FIG. 3a 3.10

| 4027 ACC'T. NO. | | .04 TAX | | SOUTHERN RAILWAY SHIPPER | |
|---|---|---|---|---|---|

STANDARD MAIL ORDER COMPANY
1234 FRONT STREET
ATLANTA, GEORGIA

SMC WAREHOUSE
567 RAILROAD STREET
ATLANTA, GEORGIA

| DATE | REF. | THIS TRANSACTION | BALANCE | REMARKS |
|---|---|---|---|---|
| JAN 10 62 | | .00 | .00 | |
| FEB 21 62 | 1006 | 39.94 | 39.94 | |
| MAR 8 62 | 1007 | 141.55 | 181.49 | |
| MAR 12 62 | 427 | 39.94 CR | 141.55 | |
| APR 9 62 | 922 | 141.55 CR | .00 | |
| APR 27 62 | 1016 | 363.74 | 363.74 | |

3.14 (arrow to FEB 21 62 row)

| 3017 | | | 28.80 | | SHIRT, 14/31 STYLE A 34 | |
|---|---|---|---|---|---|---|

| DATE | REF. | RECEIVED | AMT. SOLD | BALANCE | |
|---|---|---|---|---|---|
| DEC 12 61 | | | | 80 | |
| MAR 8 62 | 4027 | | 4 8/12 | 75 | 4/12 |
| APR 17 62 | 9036 | | 5 6/12 | 69 | 10/12 |
| APR 27 62 | 4027 | | 10 9/12 | 59 | 1/12 |

FIG. 3c 3.12

| 1559 | | | 6.34 | | MENS BLACK HOSE S347 | |
|---|---|---|---|---|---|---|

| DATE | REF | RECEIVED | AMT. SOLD | BALANCE | |
|---|---|---|---|---|---|
| FEB 14 62 | | | | 20 | |
| MAR 8 62 | 1234 | | 6 4/12 | 13 | 8/12 |
| MAR 19 62 | 4728 | | 6 8/12 | 6 | 4/12 |
| APR 27 62 | 4027 | | 6 4/12 | | |

Jan. 10, 1967 W. L. McDONALD ETAL 3,297,992
DATA PROCESSING AND ACCOUNTING SYSTEM
Filed Dec. 28, 1962 119 Sheets-Sheet 4

FIG. 5

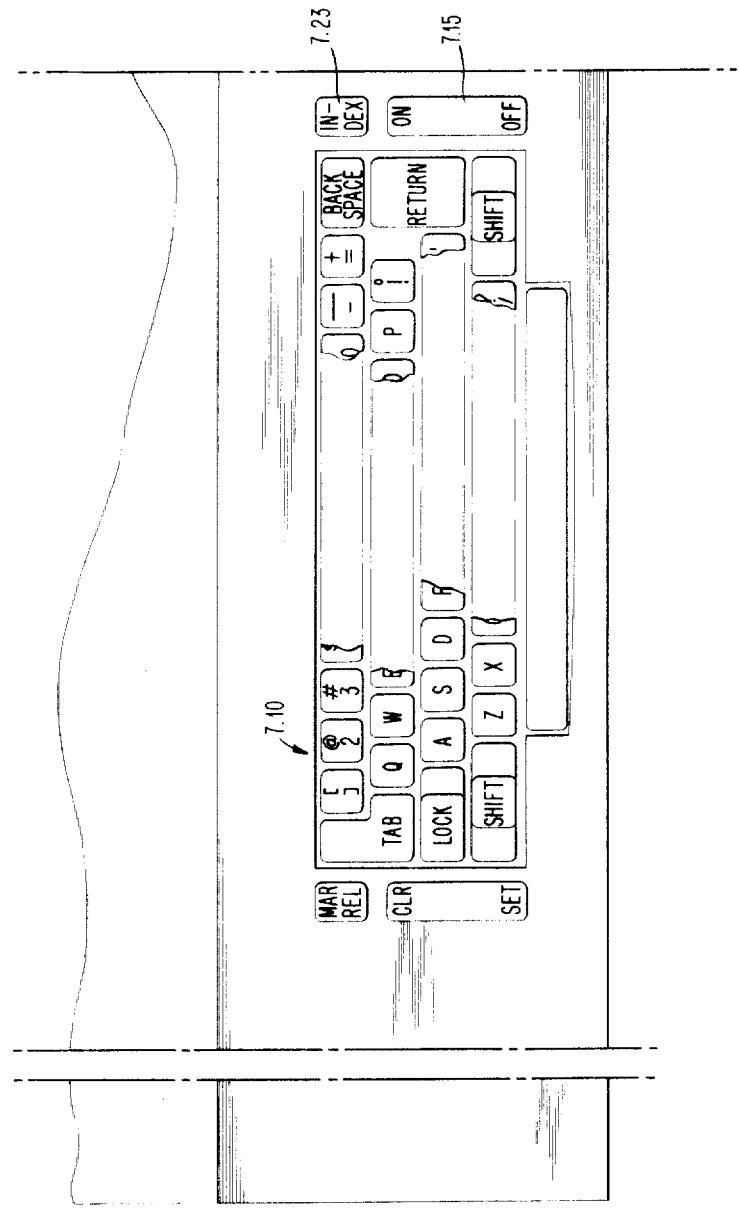

Jan. 10, 1967   W. L. McDONALD ETAL   3,297,992
DATA PROCESSING AND ACCOUNTING SYSTEM
Filed Dec. 28, 1962
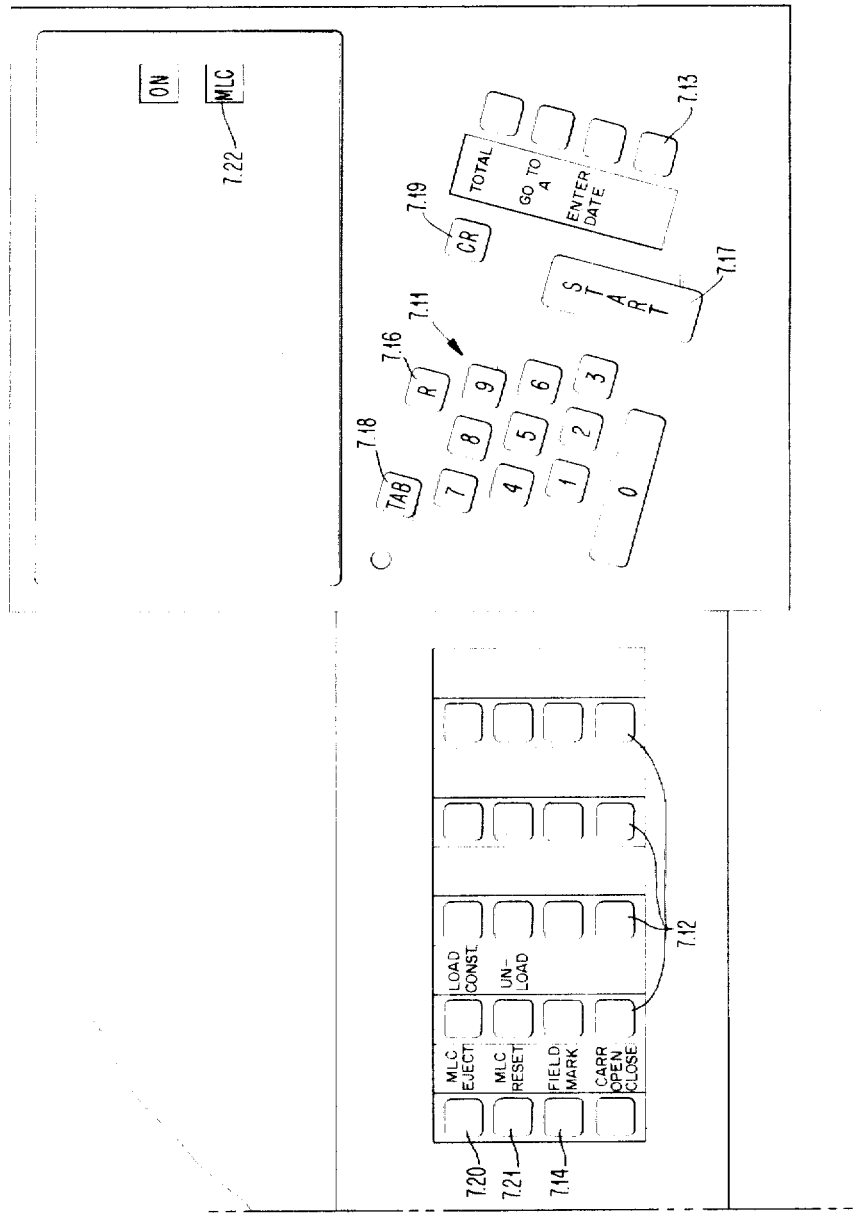

FIG.12

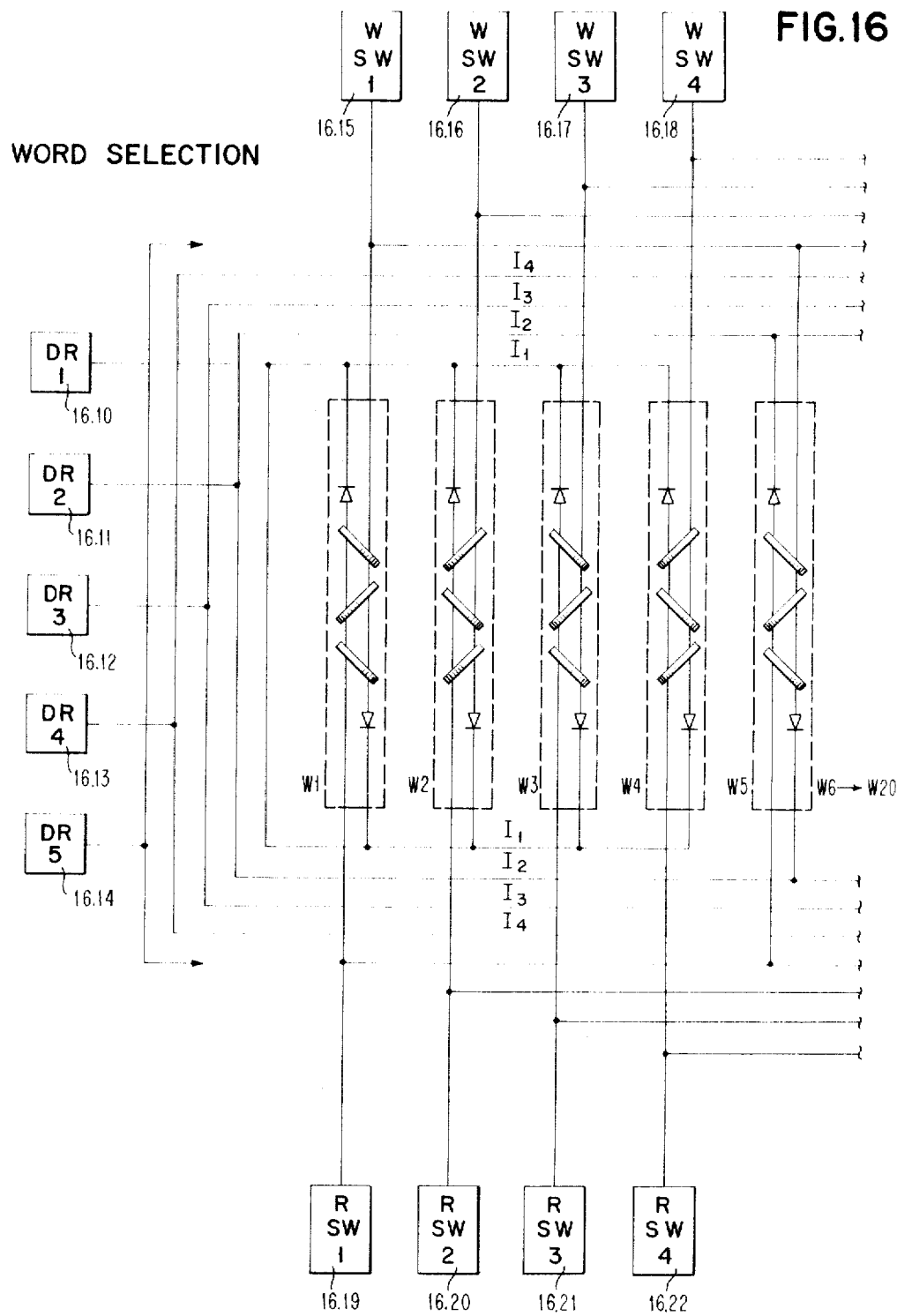

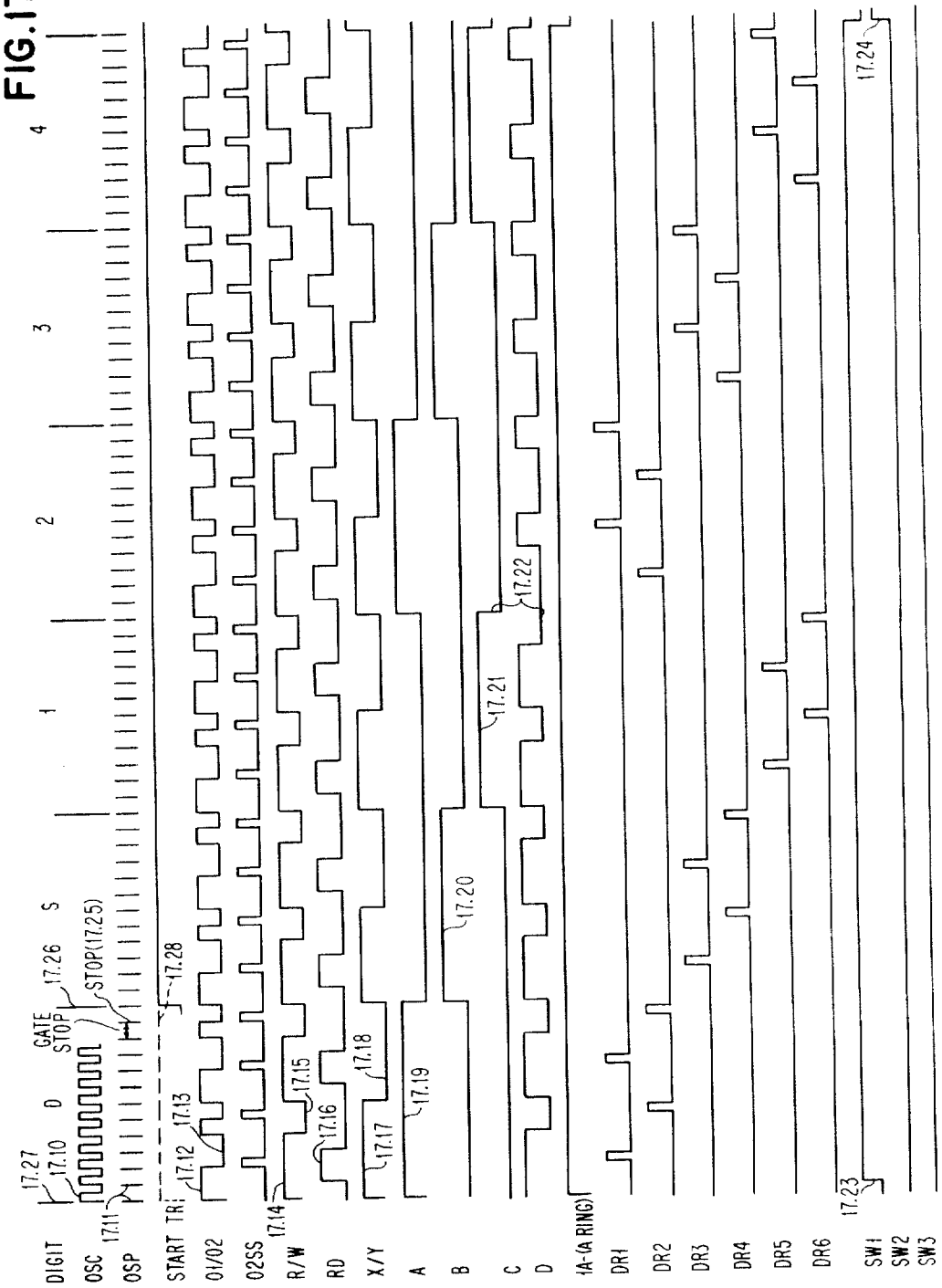

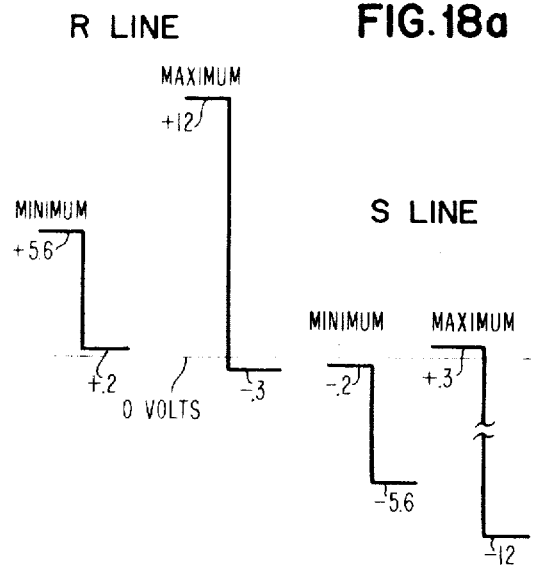
FIG. 18a
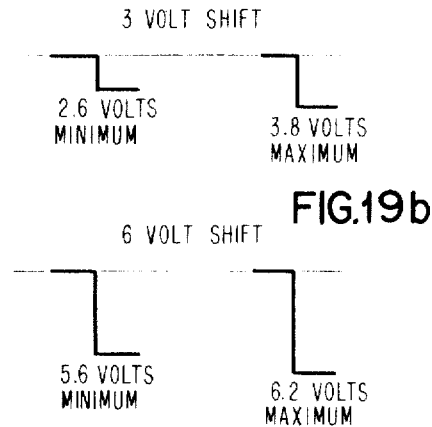
FIG. 19a VOLTAGE SHIFTS R and S LINES
FIG. 19b
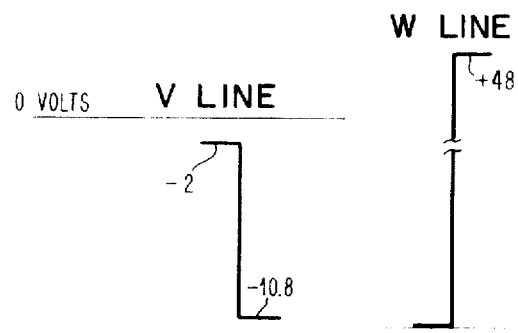
FIG. 18b
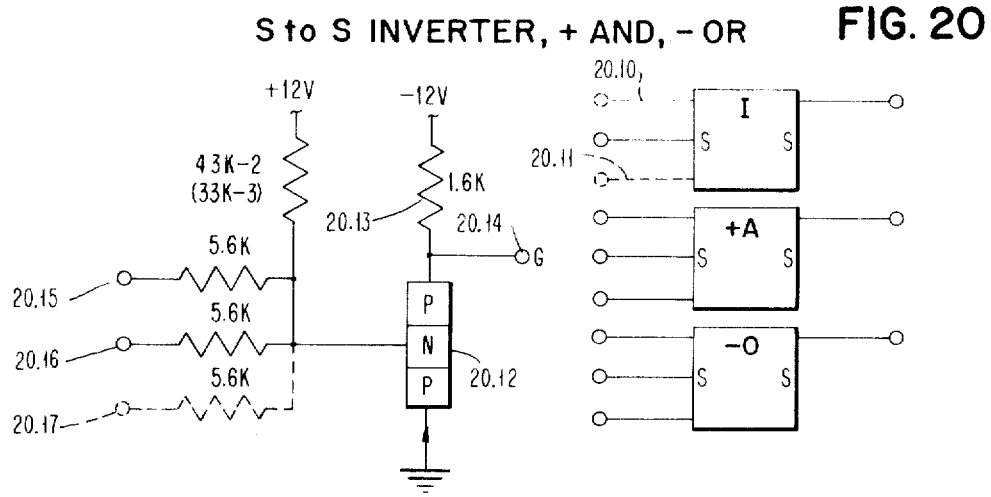
FIG. 20 S to S INVERTER, + AND, – OR Jan. 10, 1967  W. L. McDONALD ETAL  3,297,992
DATA PROCESSING AND ACCOUNTING SYSTEM
Filed Dec. 28, 1962                    119 Sheets-Sheet 19
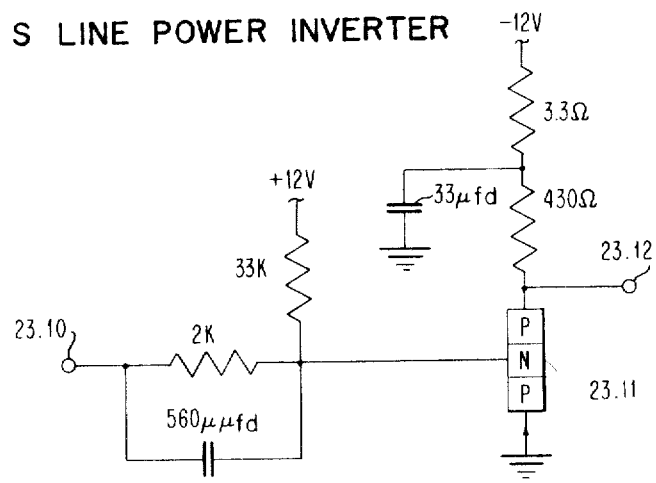
FIG. 23
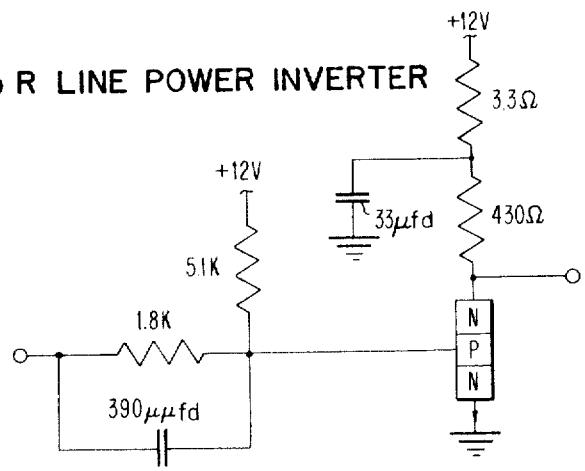
FIG. 24
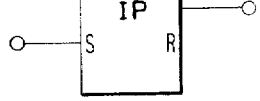
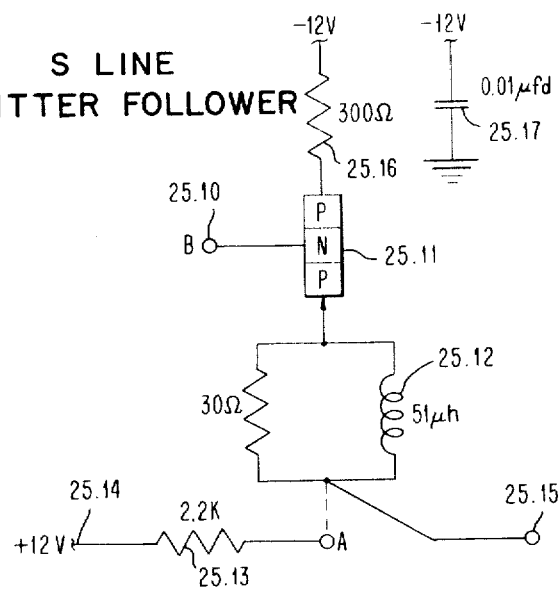
FIG. 25
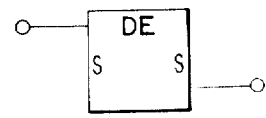

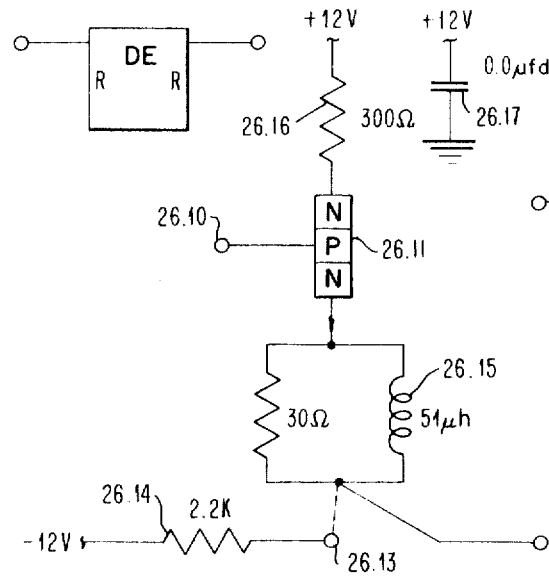
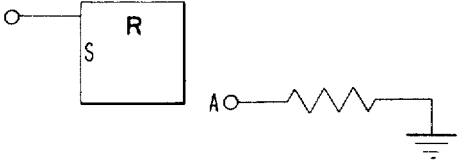
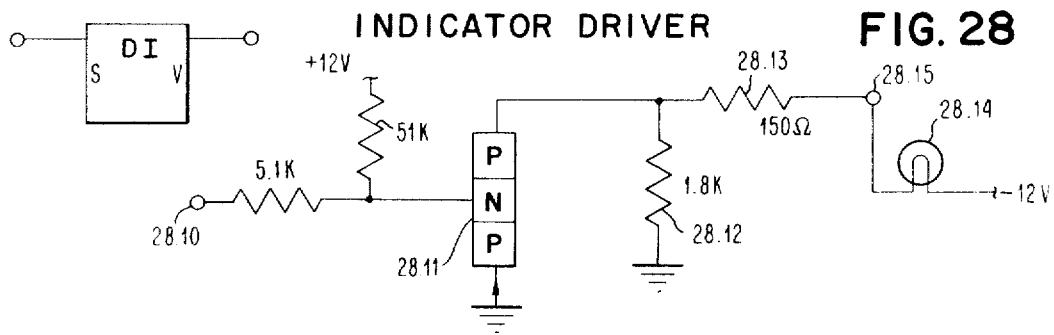
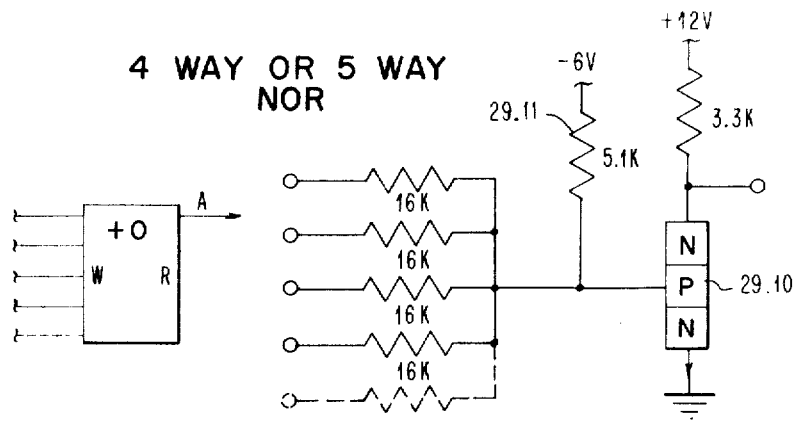

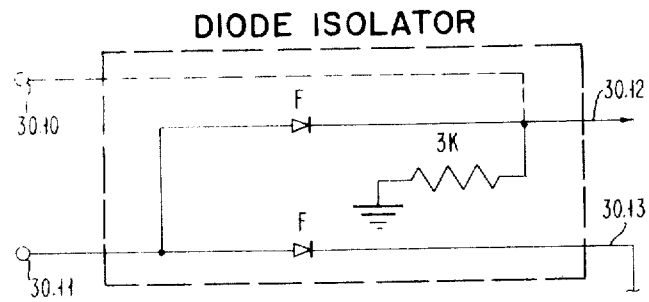
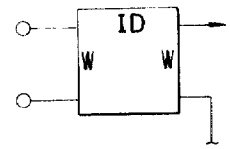
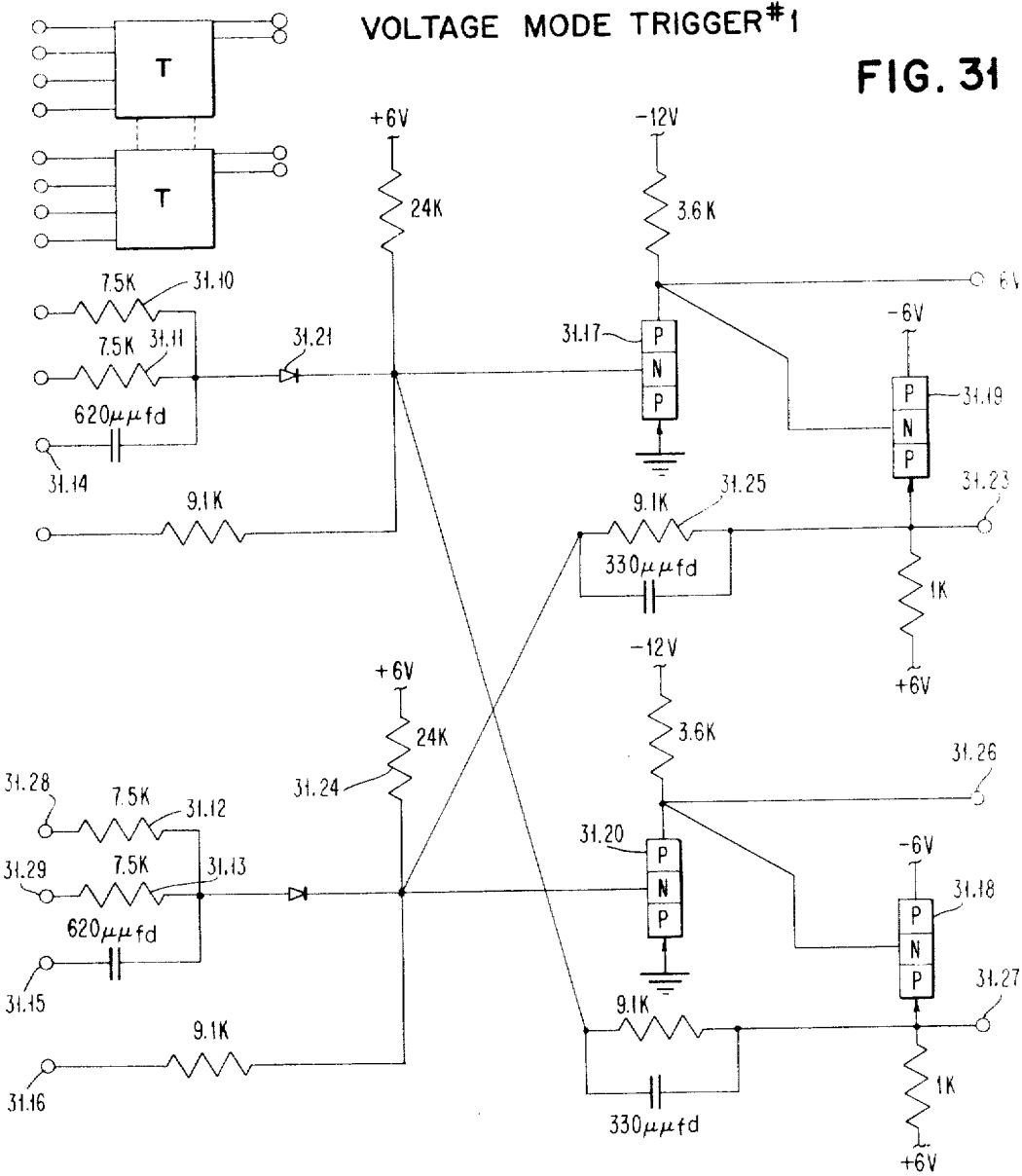

Jan. 10, 1967   W. L. McDONALD ETAL   3,297,992
DATA PROCESSING AND ACCOUNTING SYSTEM
Filed Dec. 28, 1962   119 Sheets-Sheet 22
VOLTAGE MODE TRIGGER #2     FIG. 32
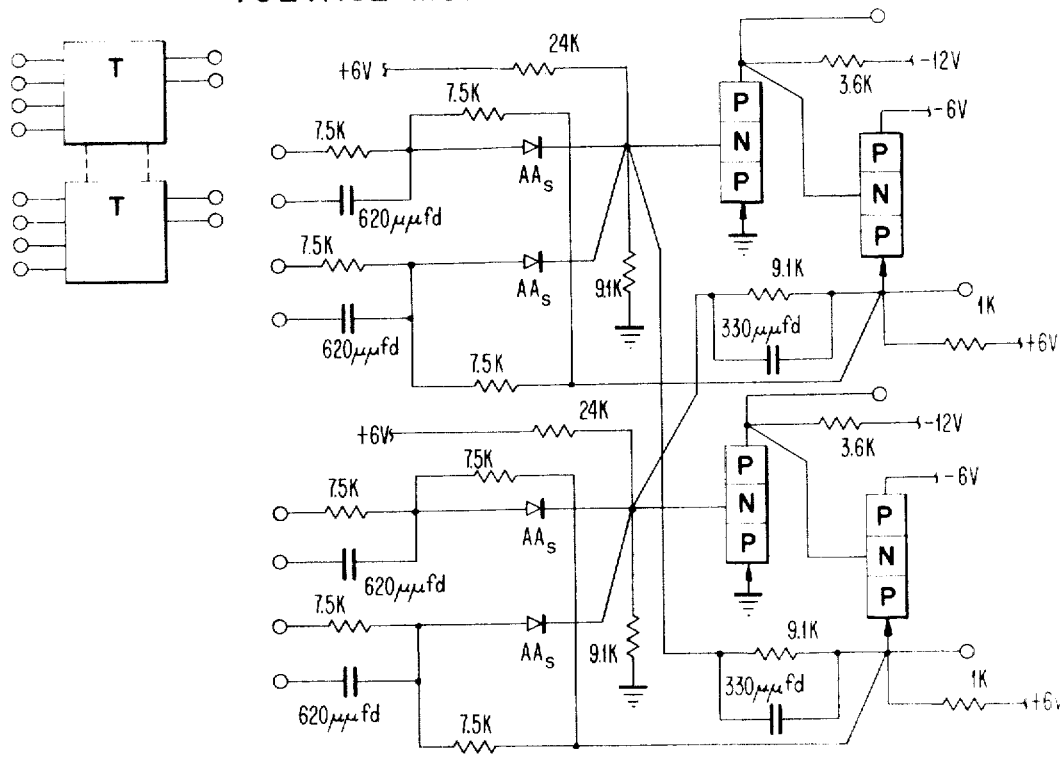
GATED SAMPLE PULSE DRIVER   FIG. 33
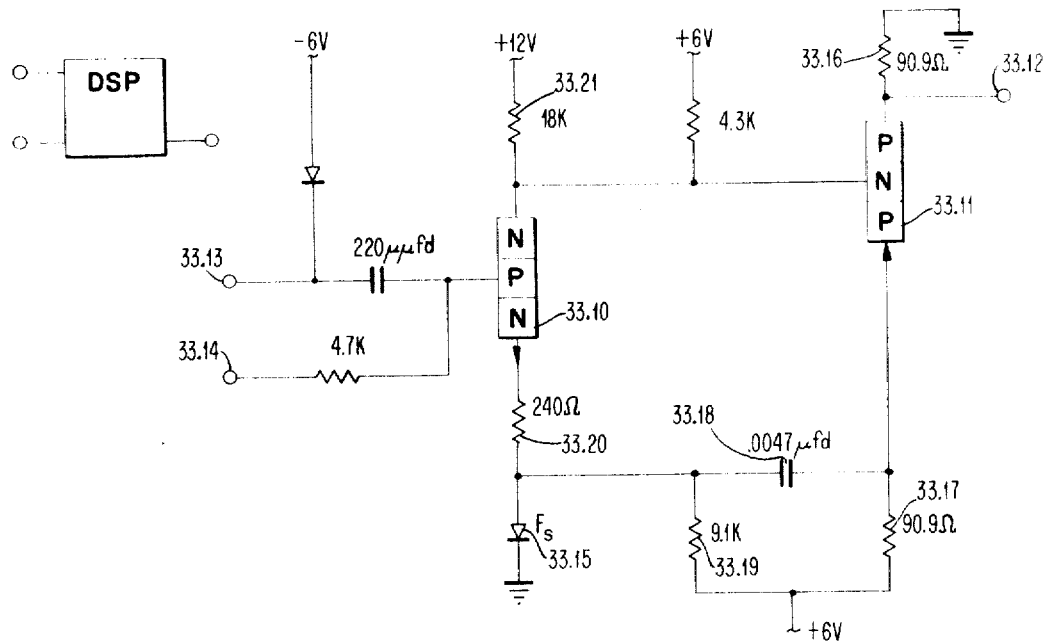

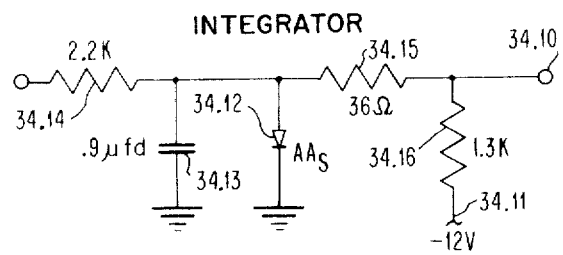
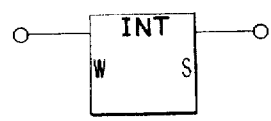
FIG. 34
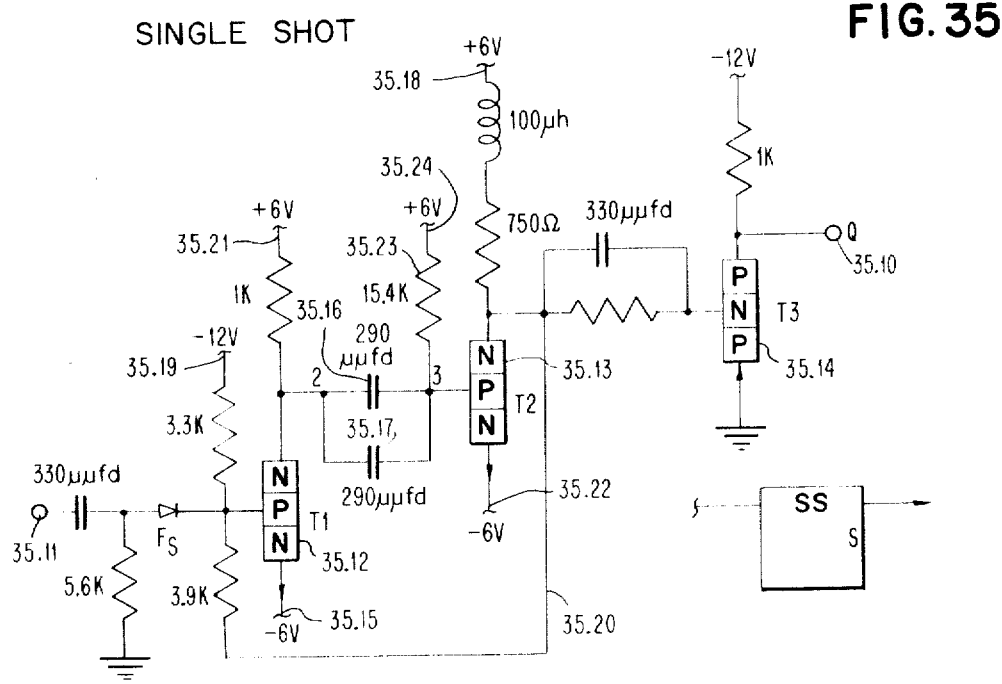
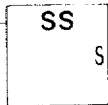
FIG. 35
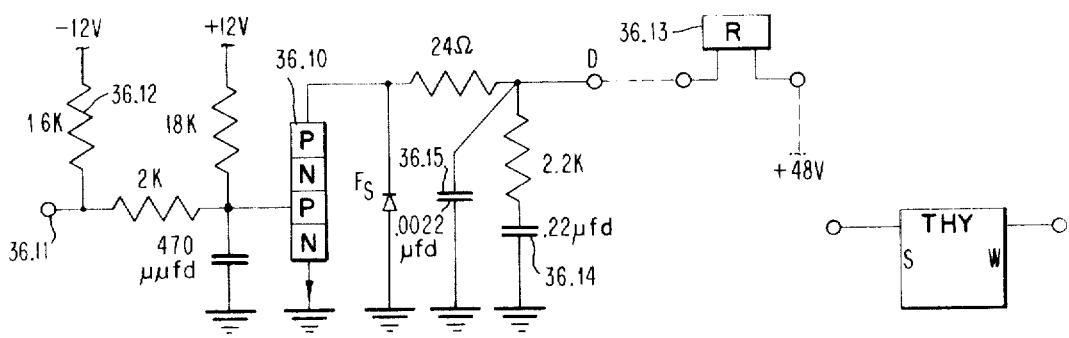
FIG. 36

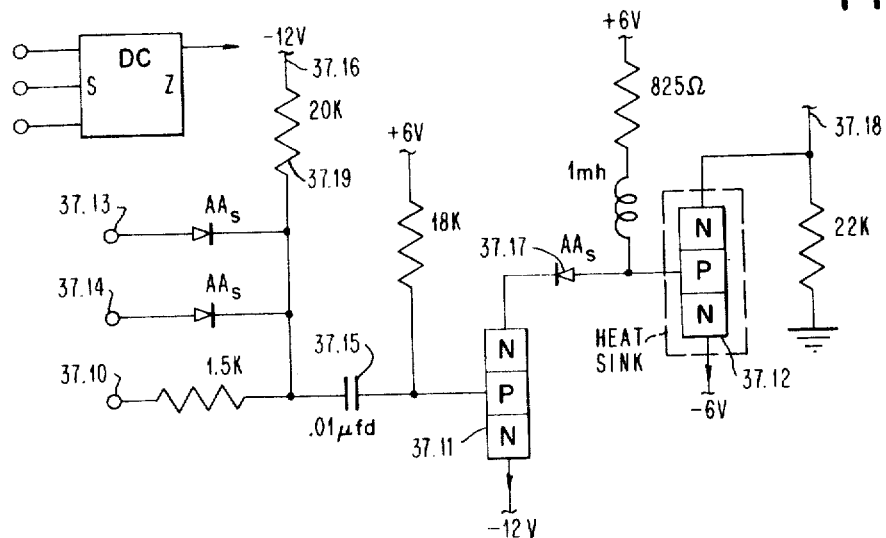
MEMORY DRIVER — FIG. 37
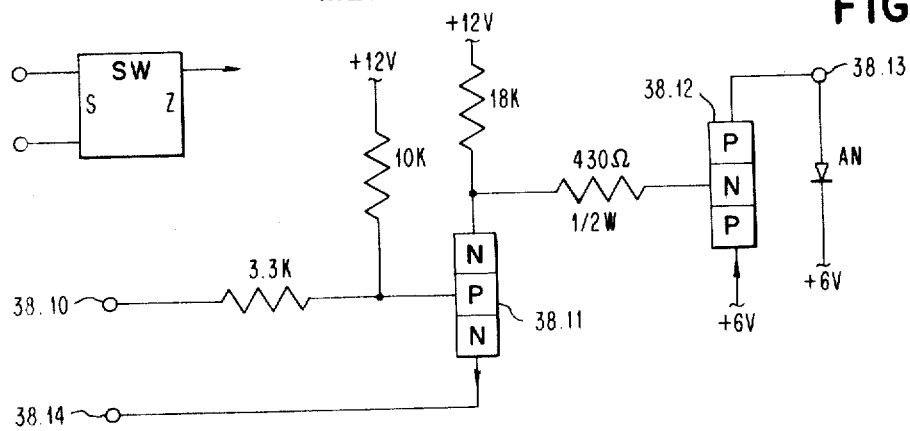
MEMORY SWITCH #1 — FIG. 38
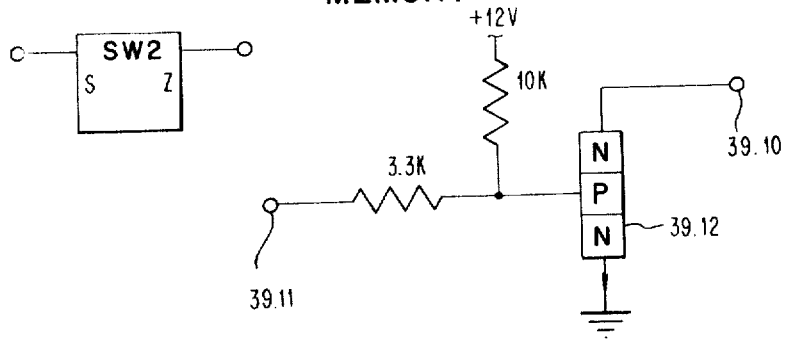
MEMORY SWITCH #2 — FIG. 39

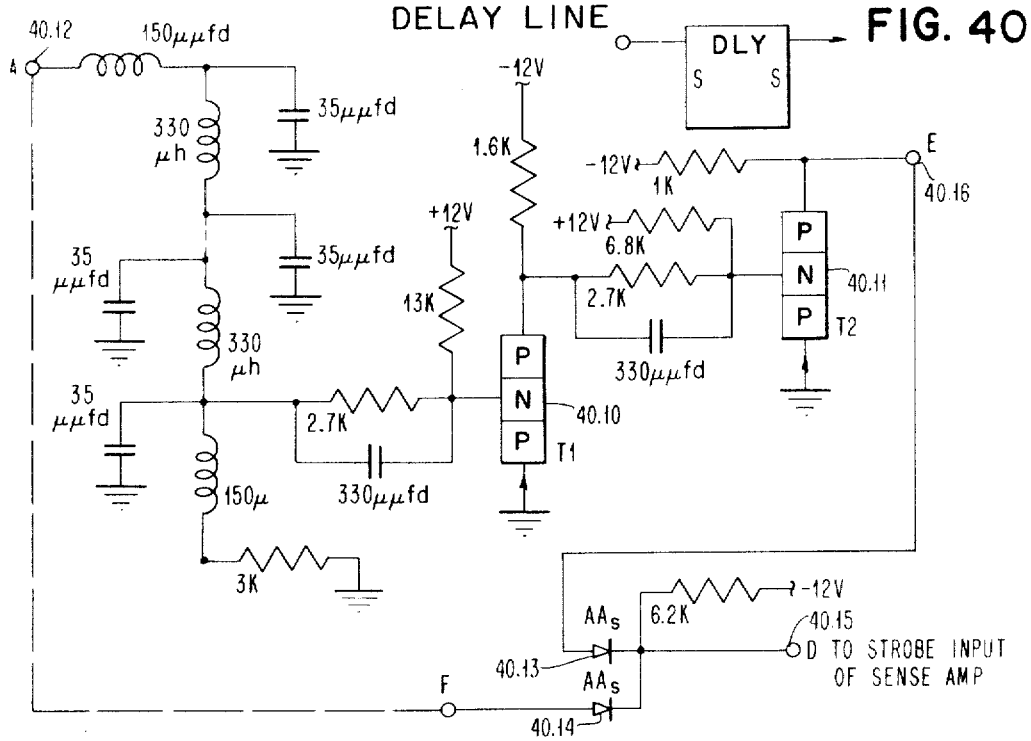
DELAY LINE — FIG. 40
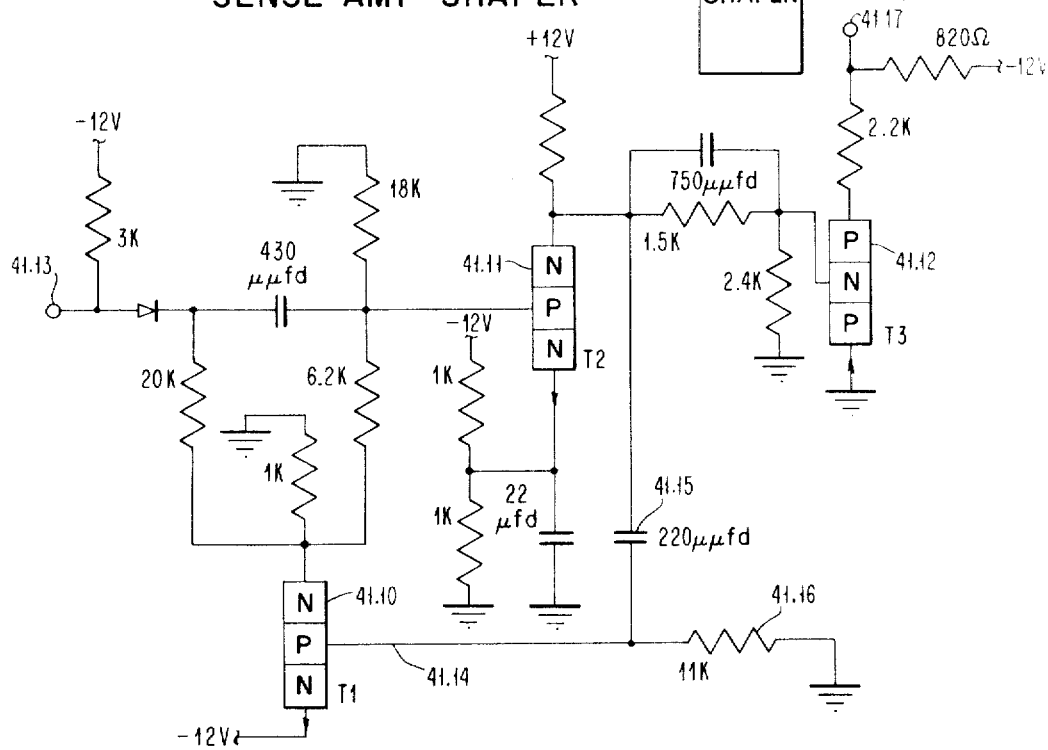
SENSE AMP SHAPER — FIG. 41

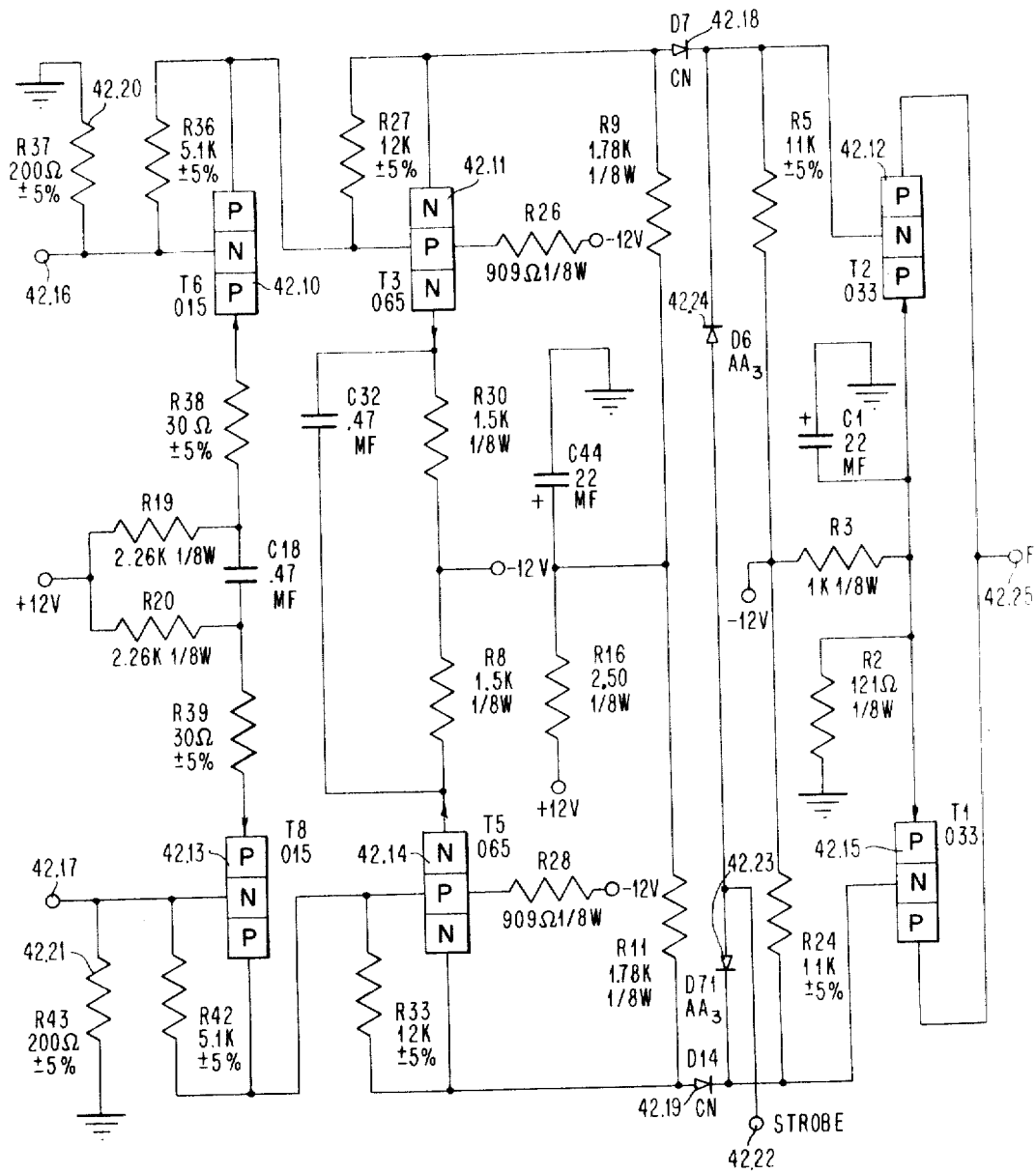
FIG. 42
SENSE AMPLIFIER
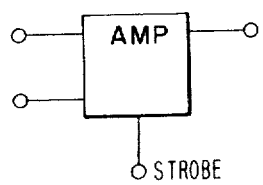

DOT FUNCTION BLOCKS
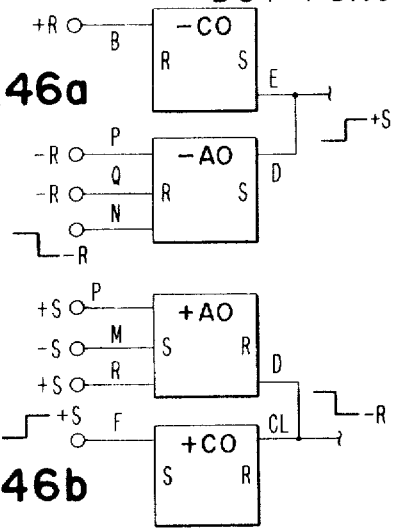
FIG. 46a
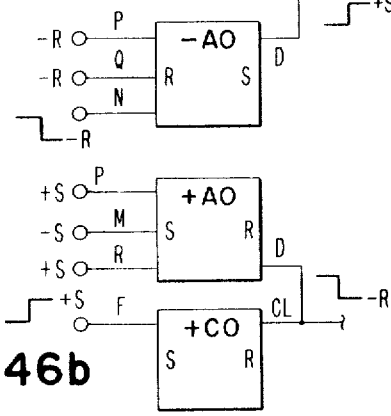
FIG. 46b
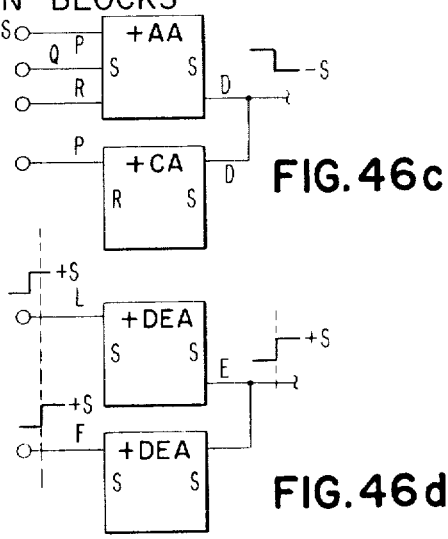
FIG. 46c
FIG. 46d
DOT FUNCTION DETAILS
FIG. 47a
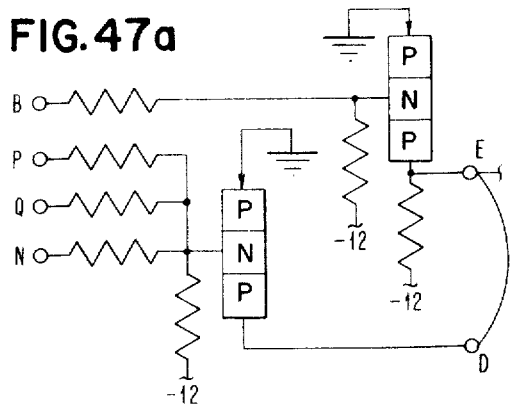
FIG. 47b
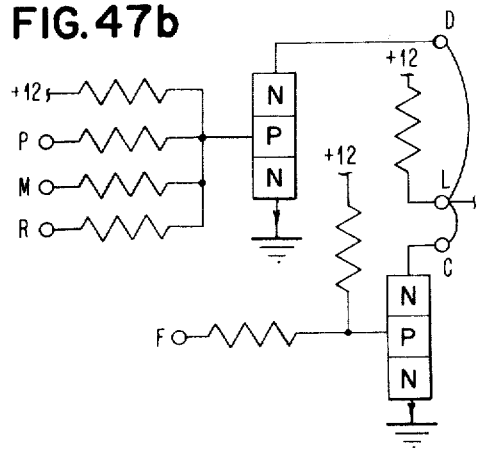
FIG. 47c
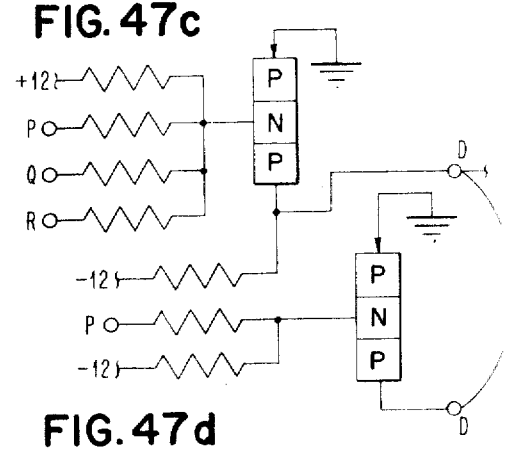
FIG. 47d
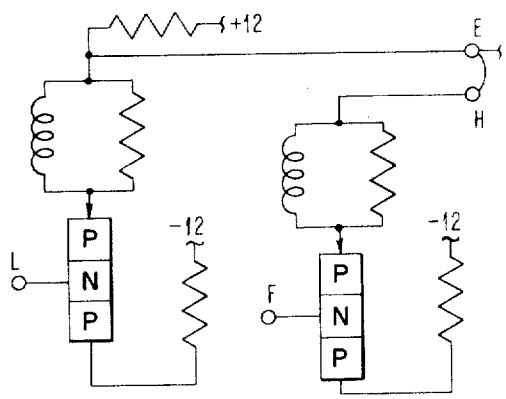

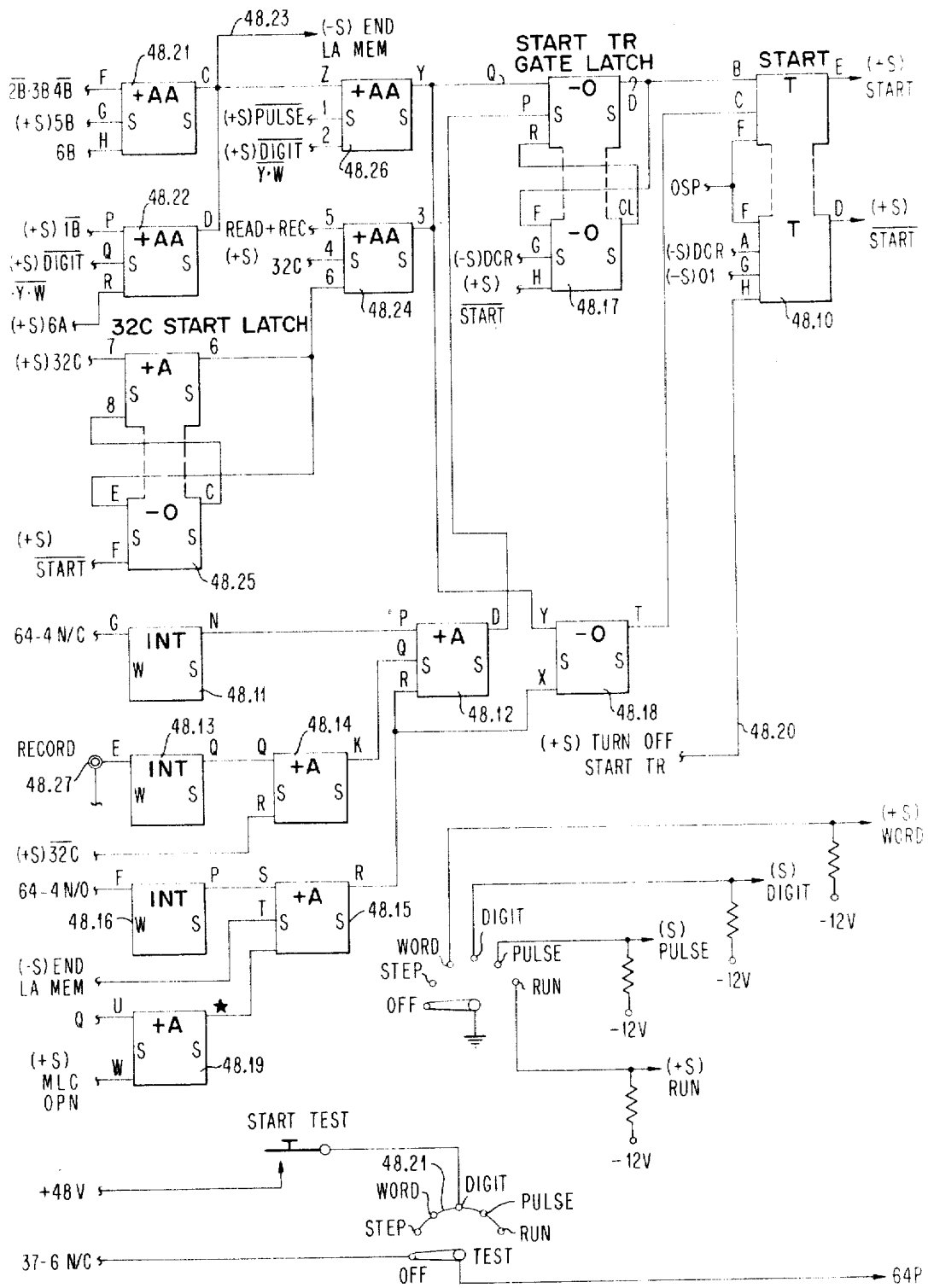
FIG.48 START TRIGGER

FIG. 50 — 01/02 R/W AND READ DELAY

FIG. 52
D, SIGN BIT
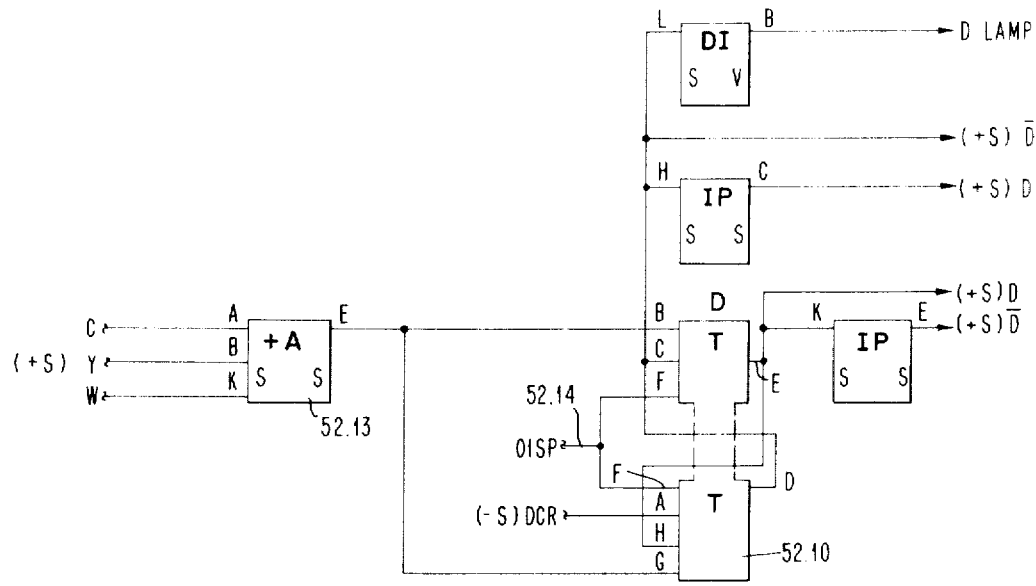
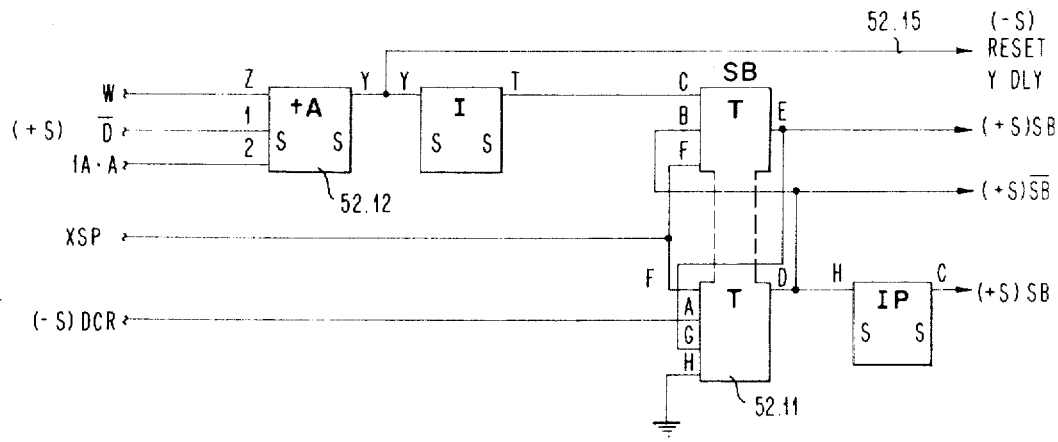

FIG.53 1A-6A RING

FIG.54 TYPE STOP, MULT OR DIVIDE STOP

FIXED FACTOR DRIVER SELECT, X TIME SWITCH AND DRIVER SELECT

NUM & MLC NUM OUT WORD HUBS-OFR SW SEL X GROUP OUT WD HUBS
FIG.57
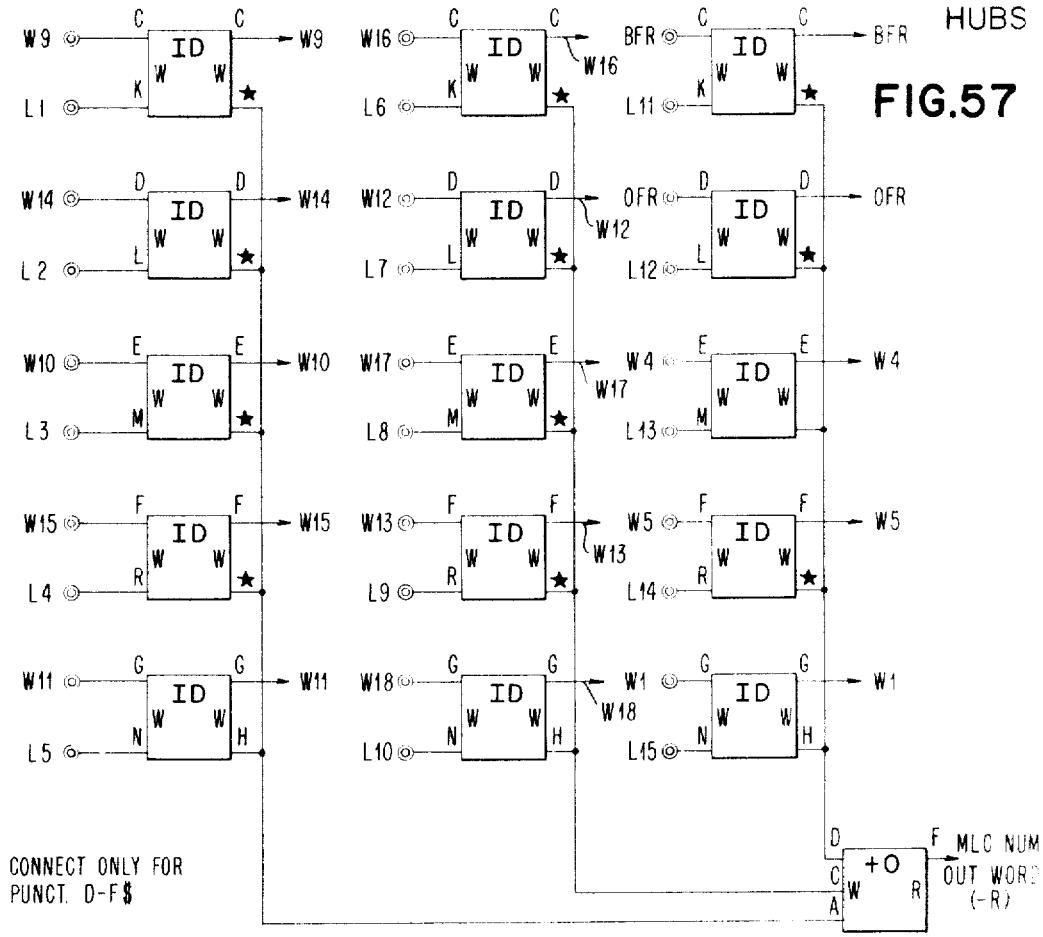
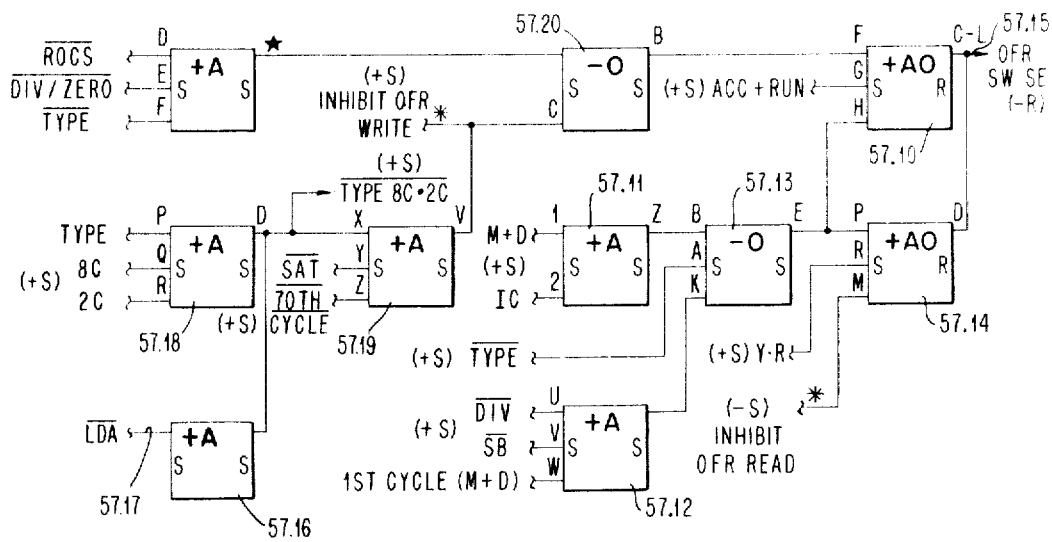

NUM AND MLC NUM IN WORD HUBS

Y GROUP IN WORD HUBS

WORD DRIVERS 3, 4 & 5  FIG. 60

READ & WRITE SWITCHES 1, 2 & 3  FIG. 61

FIG. 63 READ & WRITE SWITCHES 7 & 8

Jan. 10, 1967  W. L. McDONALD ETAL  3,297,992

DATA PROCESSING AND ACCOUNTING SYSTEM

Filed Dec. 28, 1962  119 Sheets-Sheet 46

BIT DRIVERS & SWITCHES MAIN MEMORY & MAGNETIC LEDGER CARD DRIVERS 1, 2, & 3

MAIN MEMORY & MAGNETIC LEDGER
CARD DRIVERS 4,5 & 6

DY-1, DY-2 & X DELAY
FIG. 67
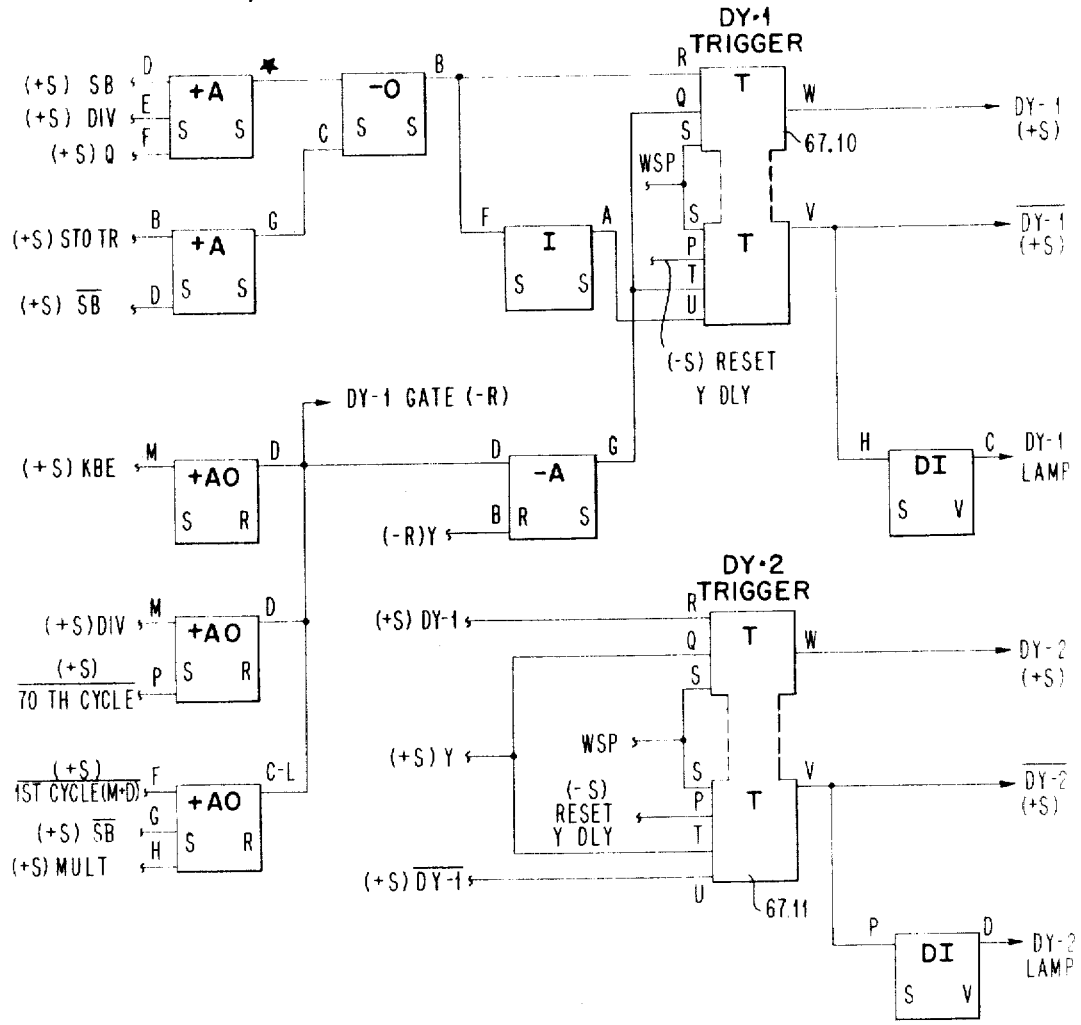
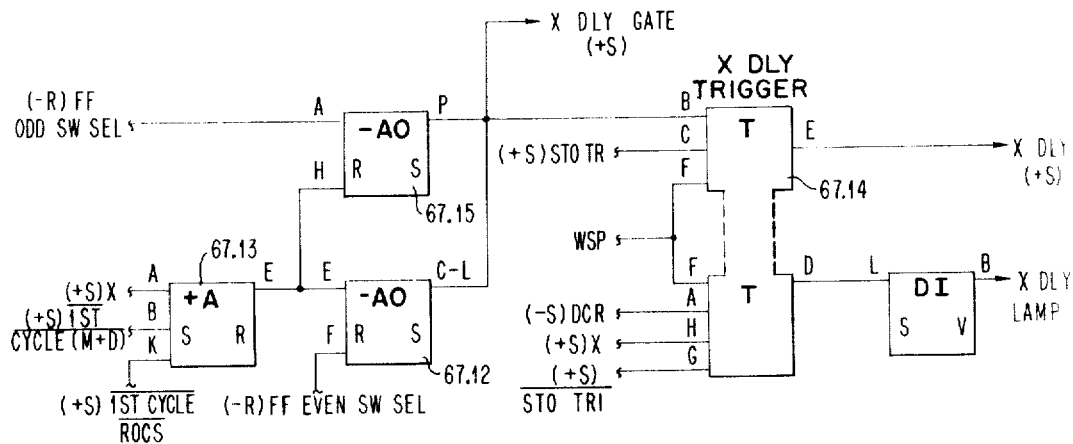

FIG. 68 ACCUMULATOR X GATE

FIG. 69 ACCUMULATOR Y GATE

Jan. 10, 1967 W. L. McDONALD ETAL 3,297,992
DATA PROCESSING AND ACCOUNTING SYSTEM
Filed Dec. 28, 1962 119 Sheets-Sheet 52
COMP TRIGGER AND Q TRIGGER Jan. 10, 1967  W. L. McDONALD ETAL  3,297,992
DATA PROCESSING AND ACCOUNTING SYSTEM
Filed Dec. 28, 1962  119 Sheets-Sheet 53

ADD-SUBTRACT TRIGGER  FIG. 72

ARITHMETIC FUNCTION HUBS

ZERO BALANCE NEGATIVE BALANCE FIG. 75

| DIGIT CAPACITY | DIGIT TO TYPE | FIXED FACTOR | FF SWS. ODD/EVEN | WORD DRIVER | R/W SWITCHES | | | | MLC MEM WD | | | |
|---|---|---|---|---|---|---|---|---|---|---|---|---|
| | | | | | 1B | 2B | 3B | 4B | 6B / 5B | 6B / 5B | 6B / 5B | 6B / 5B |
| 9 | 10 | $.5 \times 10^9$ | EVEN | 5 | 1 | 1 | 0 | 1 | 4 / 2 | 6 / 8 | 10 / 20 | 30 / 40 |
| 8 | 9 | $.5 \times 10^8$ | ODD | 1 | 0 | 1 | 0 | 0 | 3 / 1 | 5 / 7 | 1 / 11 | 21 / 31 |
| 7 | 8 | $.5 \times 10^7$ | EVEN | 1 | 1 | 1 | 0 | 0 | 4 / 2 | 6 / 8 | 2 / 12 | 22 / 32 |
| 6 | 7 | $.5 \times 10^6$ | ODD | 2 | 0 | 0 | 1 | 0 | 3 / 1 | 5 / 7 | 3 / 13 | 23 / 33 |
| 5 | 6 | $.5 \times 10^5$ | EVEN | 2 | 0 | 1 | 0 | 0 | 4 / 2 | 6 / 8 | 4 / 14 | 24 / 34 |
| 4 | 5 | $.5 \times 10^4$ | ODD | 3 | 0 | 1 | 1 | 0 | 3 / 1 | 5 / 7 | 5 / 15 | 25 / 35 |
| 3 | 4 | $.5 \times 10^3$ | EVEN | 3 | 1 | 1 | 1 | 0 | 4 / 2 | 6 / 8 | 6 / 16 | 26 / 36 |
| 2 | 3 | $.5 \times 10^2$ | ODD | 4 | 0 | 0 | 0 | 1 | 3 / 1 | 5 / 7 | 7 / 17 | 27 / 37 |
| 1 | 2 | $.5 \times 10^1$ | EVEN | 4 | 1 | 0 | 0 | 1 | 4 / 2 | 6 / 8 | 8 / 18 | 28 / 38 |
| 10 | 1 | $.5 \times 10^0$ | ODD | 5 | 0 | 1 | 0 | 1 | 3 / 1 | 5 / 7 | 9 / 19 | 29 / 39 |
| ✕ | SAT | $.5 \times 10^9$ | EVEN | 5 | 1 | 1 | 0 | 1 | 4 / 2 | 6 / 8 | 10 / 20 | 30 / 40 |

DC SET 5B & 6B, SAT TR

FIG.79 — B CTR ADV GATE-, AND·TR'S

FIG. 80 B CTR ADV GATE-, AND· TRIGGERS (PUNCT D F$ OR SLANT 2-4)

PUNCT D-F$ OR SLANT 2-4    FIG. 81

Jan. 10, 1967  W. L. McDONALD ETAL  3,297,992
DATA PROCESSING AND ACCOUNTING SYSTEM
Filed Dec. 28, 1962  119 Sheets-Sheet 63

B CTR-5B & 6B

Jan. 10, 1967 W. L. McDONALD ETAL 3,297,992
DATA PROCESSING AND ACCOUNTING SYSTEM
Filed Dec. 28, 1962 113 Sheets-Sheet 65
FIG. 85
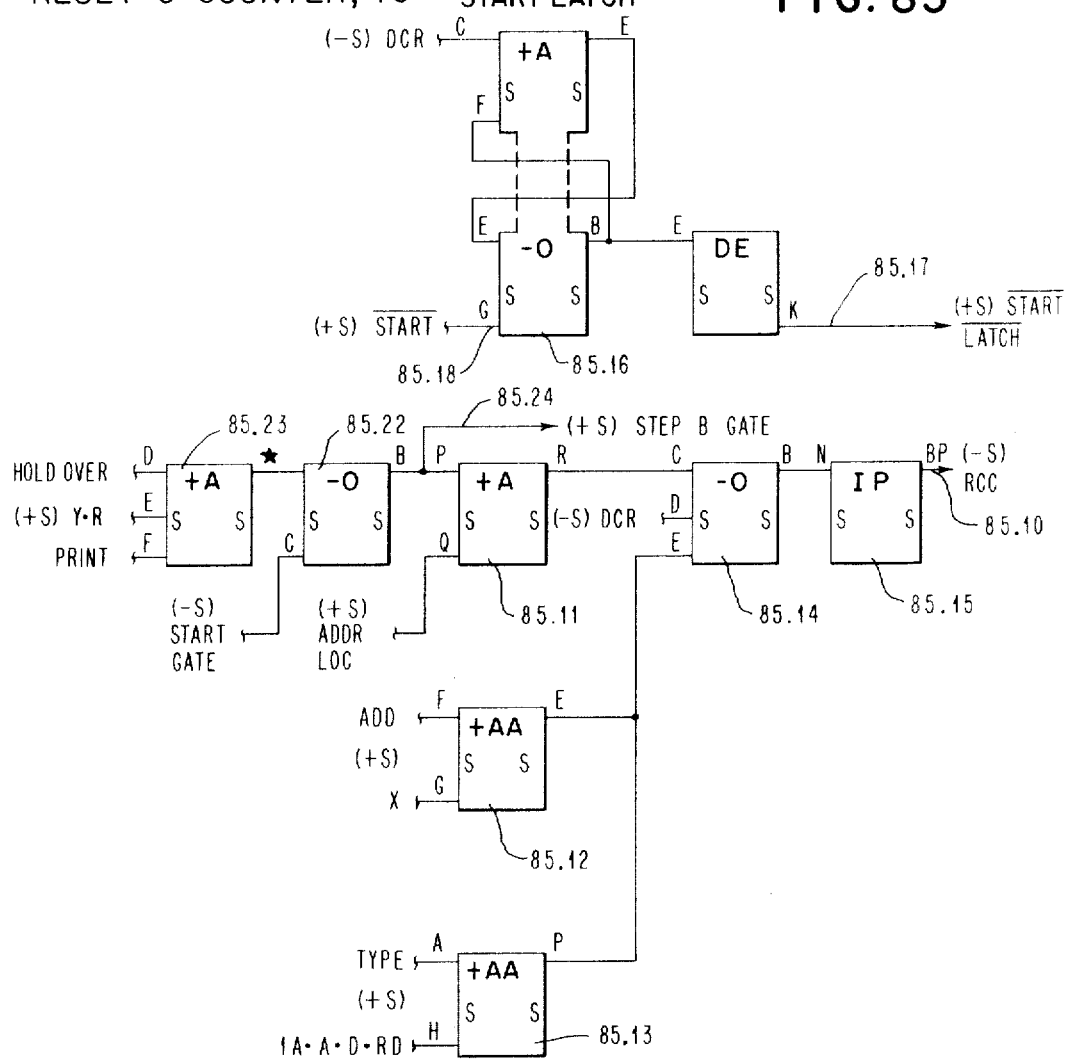
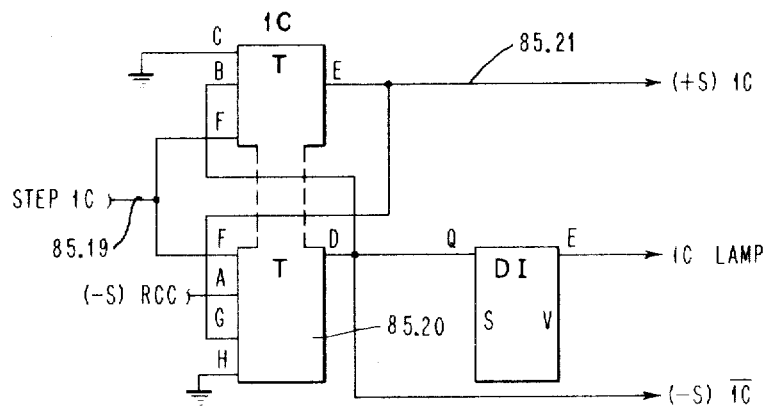

FIG. 89 ADDR LOC, HOLDOVER, POS LATCH

FIG. 90 1ST PRERUN CYCLE, RECORD, CHECK READ, DCR

FIG. 91
MAGNETIC LEDGER CARD READ & WRITE HEADS
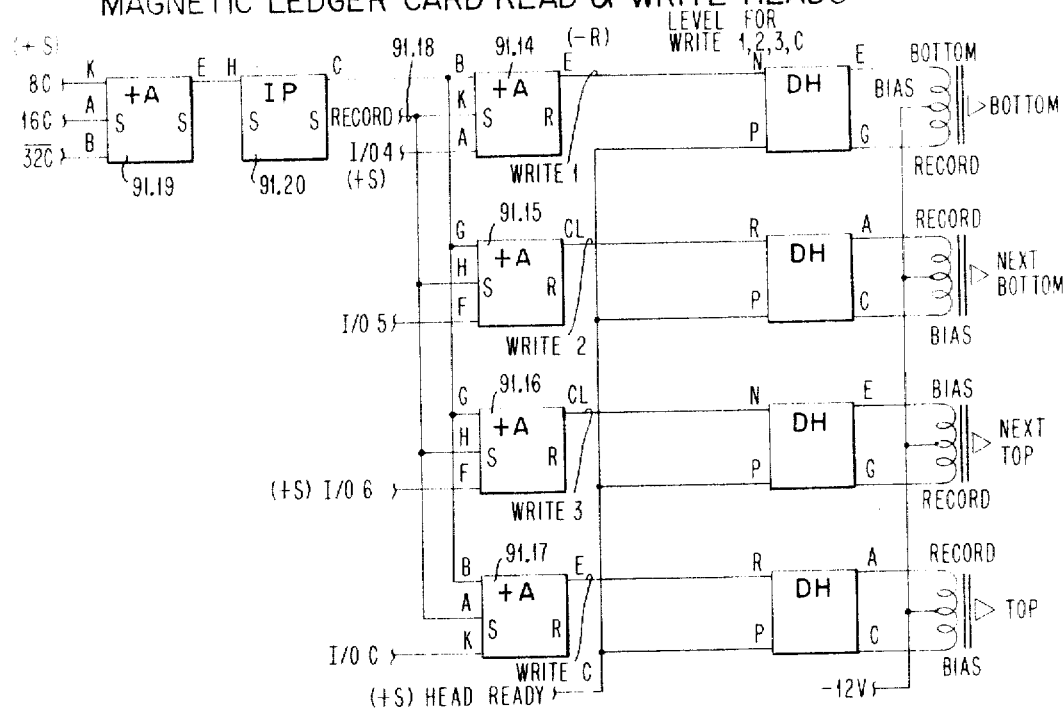
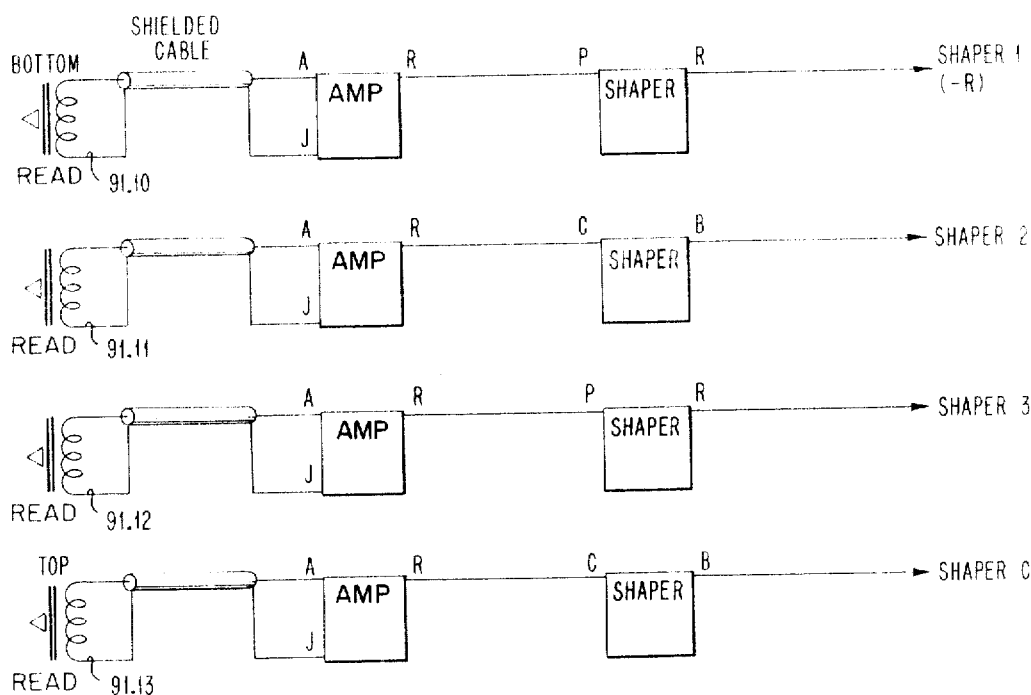

FIG. 94 — I/O CHECK TRIGGER

SYMBOLS FIG. 96

FIG. 101

I/O REGISTER CODES

| CHARACTER | | I/O REG TRIGGERS | | | | | | |
|---|---|---|---|---|---|---|---|---|
| LOWER CASE | UPPER CASE | 1 | 2 | 3 | 4 | 5 | 6 | |
| A | | 0 | 1 | 0 | 1 | 1 | 0 | ⎫ FUNCTION CODES |
| B | | 1 | 1 | 0 | 0 | 1 | 0 | |
| C | | 1 | 1 | 0 | 1 | 1 | 0 | |
| D | | 0 | 1 | 0 | 0 | 1 | 1 | |
| E | | 0 | 1 | 0 | 1 | 1 | 1 | |
| F | | 1 | 1 | 0 | 0 | 1 | 1 | |
| G | | 1 | 1 | 0 | 1 | 1 | 1 | |
| H | | 0 | 1 | 1 | 1 | 1 | 0 | |
| I | | 0 | 1 | 1 | 0 | 1 | 1 | |
| J | | 0 | 1 | 0 | 1 | 0 | 0 | |
| K | | 1 | 1 | 0 | 0 | 0 | 0 | |
| L | | 1 | 1 | 0 | 1 | 0 | 0 | |
| M | | 0 | 1 | 0 | 0 | 0 | 1 | |
| N | | 0 | 1 | 0 | 1 | 0 | 1 | |
| O | | 1 | 1 | 0 | 0 | 0 | 1 | ⎫ FUNCTION CODES |
| P | | 1 | 1 | 0 | 1 | 0 | 1 | |
| Q | | 0 | 1 | 1 | 1 | 0 | 1 | |
| R | | 0 | 1 | 1 | 0 | 0 | 1 | |
| S | | 1 | 0 | 0 | 0 | 1 | 0 | |
| T | | 1 | 0 | 0 | 1 | 1 | 0 | |
| U | | 0 | 0 | 0 | 0 | 1 | 1 | |
| V | | 0 | 0 | 0 | 1 | 1 | 1 | |
| W | | 1 | 0 | 0 | 0 | 1 | 1 | |
| X | | 1 | 0 | 0 | 1 | 1 | 1 | |
| Y | | 0 | 0 | 1 | 1 | 1 | 0 | |
| Z | | 0 | 0 | 1 | 0 | 1 | 1 | |
| . | ⌑ | 1 | 1 | 1 | 0 | 1 | 1 | |
| , | # | 1 | 0 | 1 | 0 | 1 | 1 | |
| / | ? | 0 | 0 | 0 | 1 | 1 | 0 | |
| % | : | 1 | 0 | 1 | 1 | 1 | 0 | |
| $ | ¢ | 1 | 1 | 1 | 0 | 0 | 1 | |
| ⁕ | @ | 1 | 0 | 1 | 0 | 0 | 1 | |
| R1 | T2 | R2A | R5 | T1 | R2 | | | |

"0" INDICATES MAGNET PICKED EXCEPT R-5

| CHARACTER | | I/O REG TRIGGERS | | | | | | |
|---|---|---|---|---|---|---|---|---|
| LOWER CASE | UPPER CASE | 1 | 2 | 3 | 4 | 5 | 6 | |
| & | + | 1 | 1 | 1 | 1 | 1 | 1 | |
| - | = | 1 | 1 | 1 | 1 | 0 | 1 | |
| 1 | ± | 0 | 0 | 0 | 1 | 0 | 0 | |
| 2 | < | 1 | 0 | 0 | 0 | 0 | 0 | |
| 3 | > | 1 | 0 | 0 | 1 | 0 | 0 | |
| 4 | ≡ | 0 | 0 | 0 | 0 | 0 | 1 | |
| 5 | ° | 0 | 0 | 0 | 1 | 0 | 1 | |
| 6 | " | 1 | 0 | 0 | 0 | 0 | 1 | |
| 7 | ' | 1 | 0 | 0 | 1 | 0 | 1 | |
| 8 | ! | 0 | 0 | 1 | 1 | 0 | 1 | |
| 9 | ( | 0 | 0 | 1 | 0 | 0 | 1 | |
| 0 | ) | 0 | 0 | 0 | 0 | 0 | 0 | |
| CARR. | RETURN | 0 | 1 | 1 | 0 | 0 | 0 | |
| SHIFT | DOWN | 0 | 1 | 1 | 1 | 0 | 0 | |
| SHIFT | UP | 0 | 0 | 1 | 1 | 1 | 0 | |
| SPACE | | 0 | 0 | 1 | 0 | 1 | 0 | |
| TAB | | 1 | 0 | 1 | 0 | 0 | 0 | |
| FIELD | MARK | 1 | 0 | 1 | 1 | 0 | 0 | |
| ELECT. LOCK UP | | 0 | 0 | 1 | 0 | 0 | 0 | |
| ELECT LOCK UP | | 0 | 0 | 1 | 1 | 0 | 0 | |
| % | : | 0 | 0 | 0 | 0 | 1 | 0 | |
| - | = | 0 | 1 | 0 | 0 | 0 | 1 | |
| & | + | 0 | 1 | 0 | 0 | 1 | 0 | |
| 0 | ) | 1 | 0 | 1 | 1 | 0 | 1 | |
| CR | SP | 0 | 1 | 1 | 0 | 1 | 0 | ⎫ REDUNDANT CODES |
| TAB | CR | 1 | 1 | 1 | 0 | 0 | 0 | |
| TAB CR | SP | 1 | 1 | 1 | 0 | 1 | 0 | |
| TAB | SP | 1 | 0 | 1 | 0 | 1 | 0 | |
| US | DS | 0 | 1 | 1 | 1 | 1 | 0 | |
| US DS | FM | 1 | 1 | 1 | 1 | 1 | 0 | |
| US | FM | 1 | 1 | 1 | 1 | 0 | 0 | |
| US | FM | 1 | 0 | 1 | 1 | 1 | 0 | |
| R1 | T2 | R2A | R5 | T1 | R2 | | | |

"0" INDICATES MAGNET PICKED EXCEPT R-5

FUNCTION THYRATRONS    FIG. 102
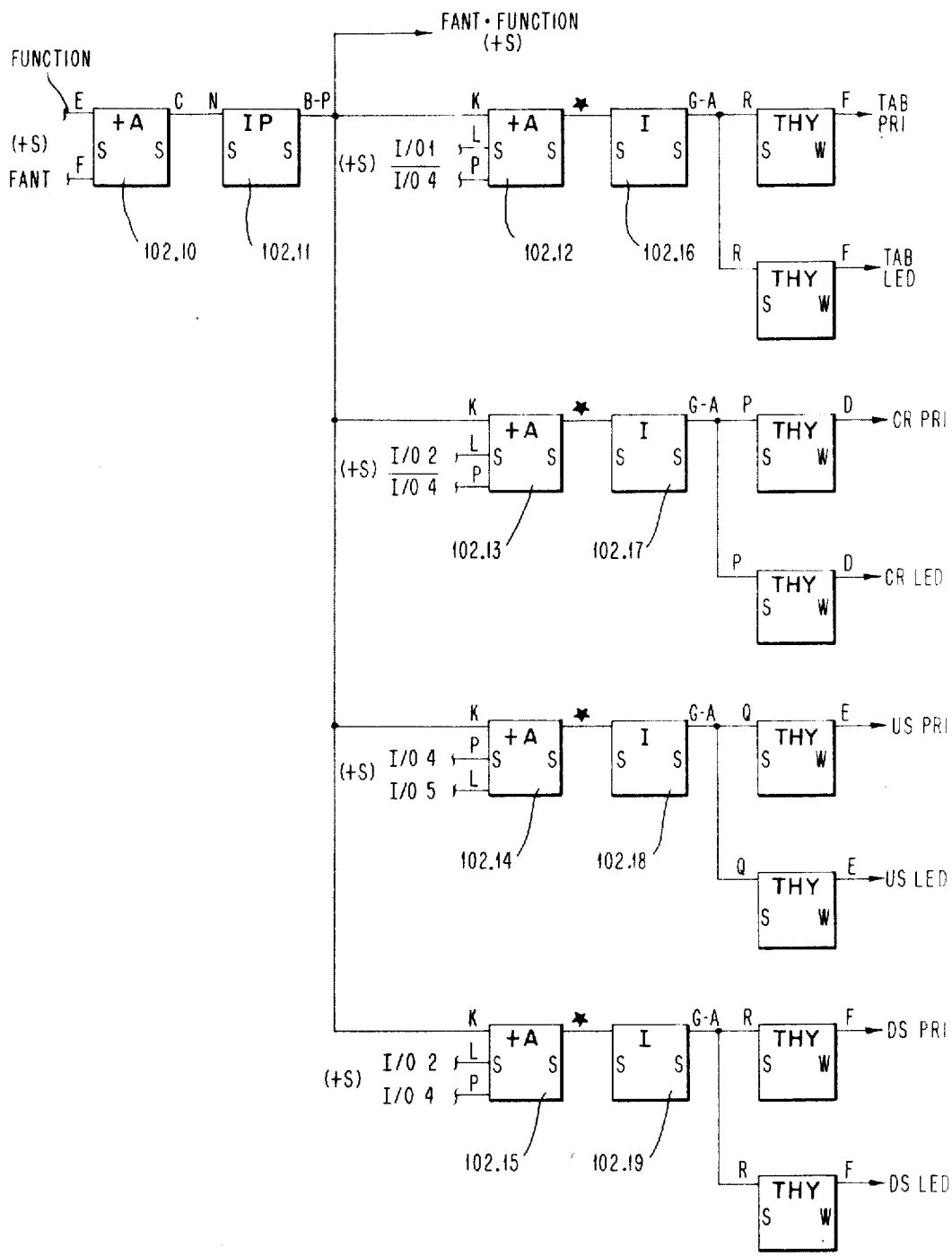

SPACE CHECK I/O PRINT FIELD MARK FIG. 103
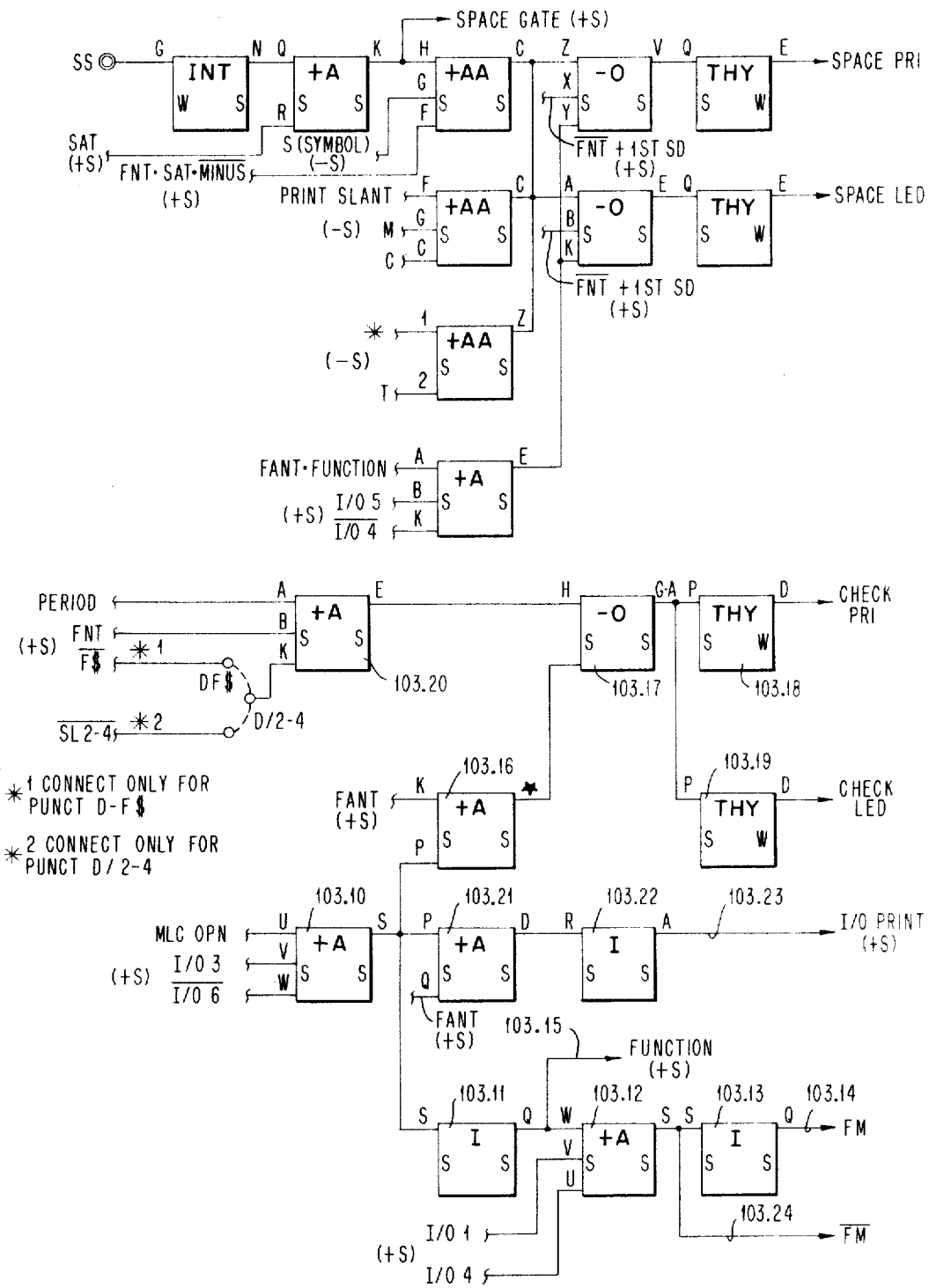

FNT- RELAY START GATE- KBR  FIG.104
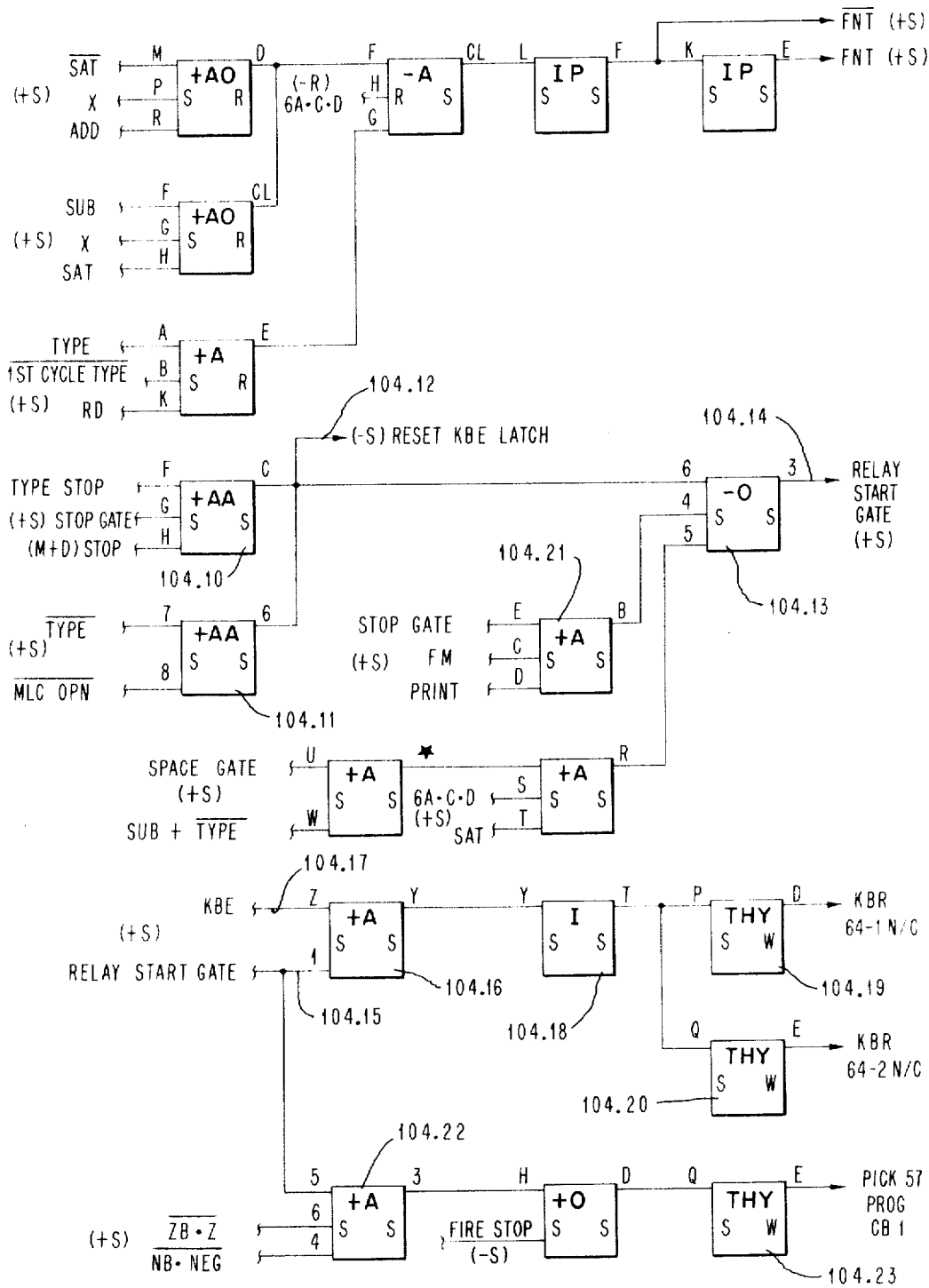

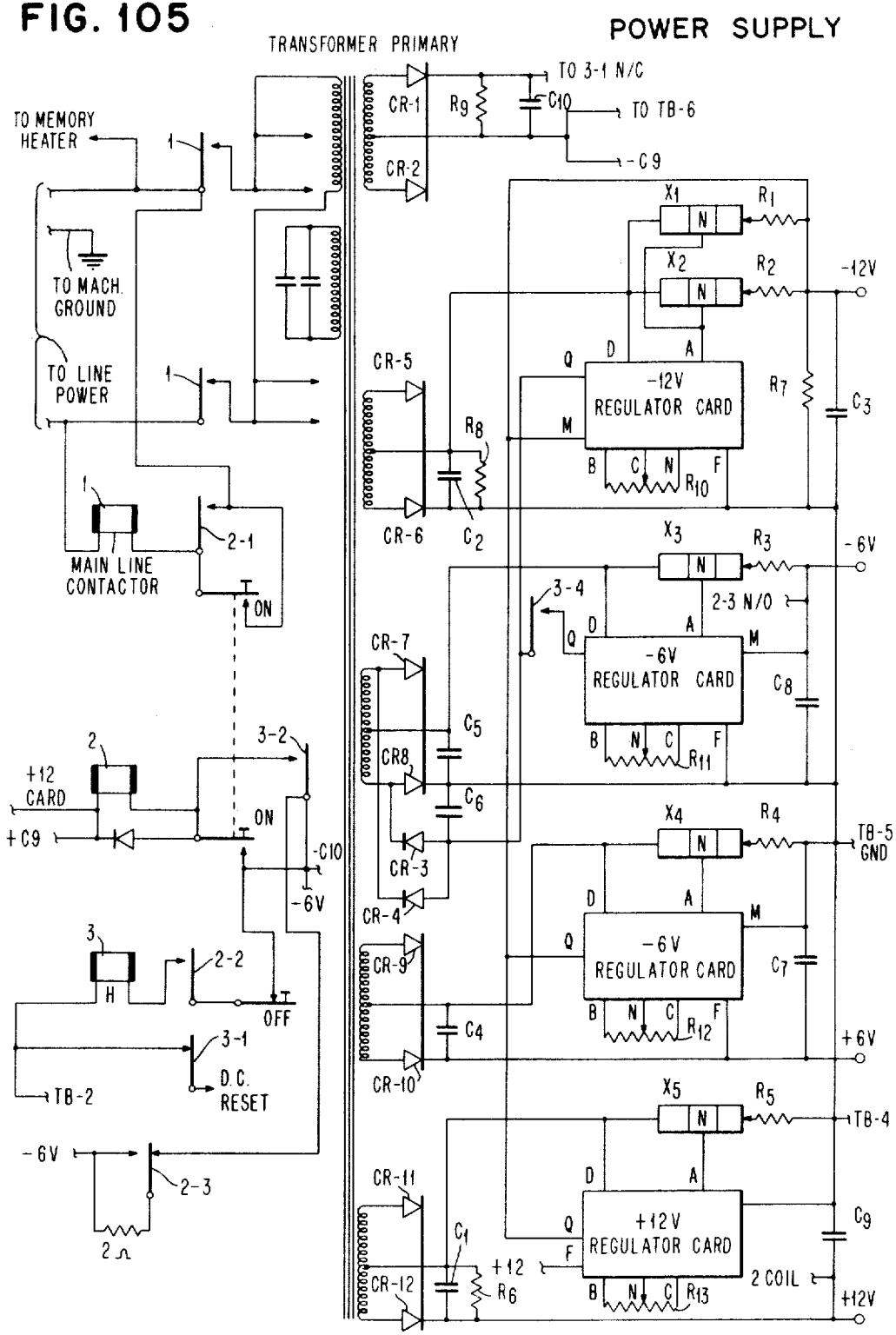
FIG. 105 — POWER SUPPLY

FIG.108 PROGRAM FUNCTION EXITS

Jan. 10, 1967  W. L. McDONALD ETAL  3,297,992
DATA PROCESSING AND ACCOUNTING SYSTEM
Filed Dec. 28, 1962  119 Sheets-Sheet 104

Jan. 10, 1967   W. L. McDONALD ETAL   3,297,992
DATA PROCESSING AND ACCOUNTING SYSTEM
Filed Dec. 28, 1962   119 Sheets-Sheet 113

FIG. 134   DIGIT ANALYZER

FIG.135 — DIGIT ANALYZER

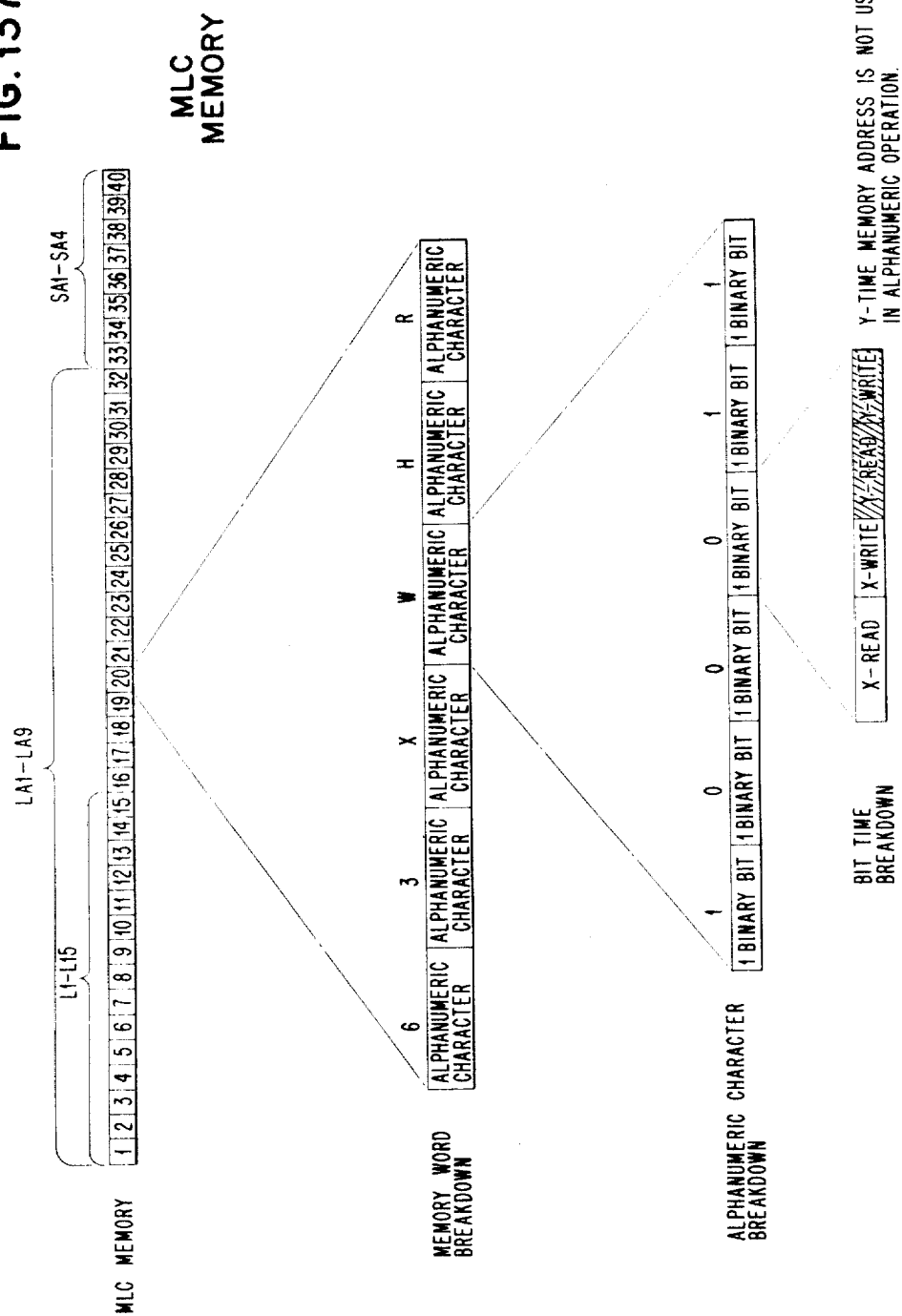

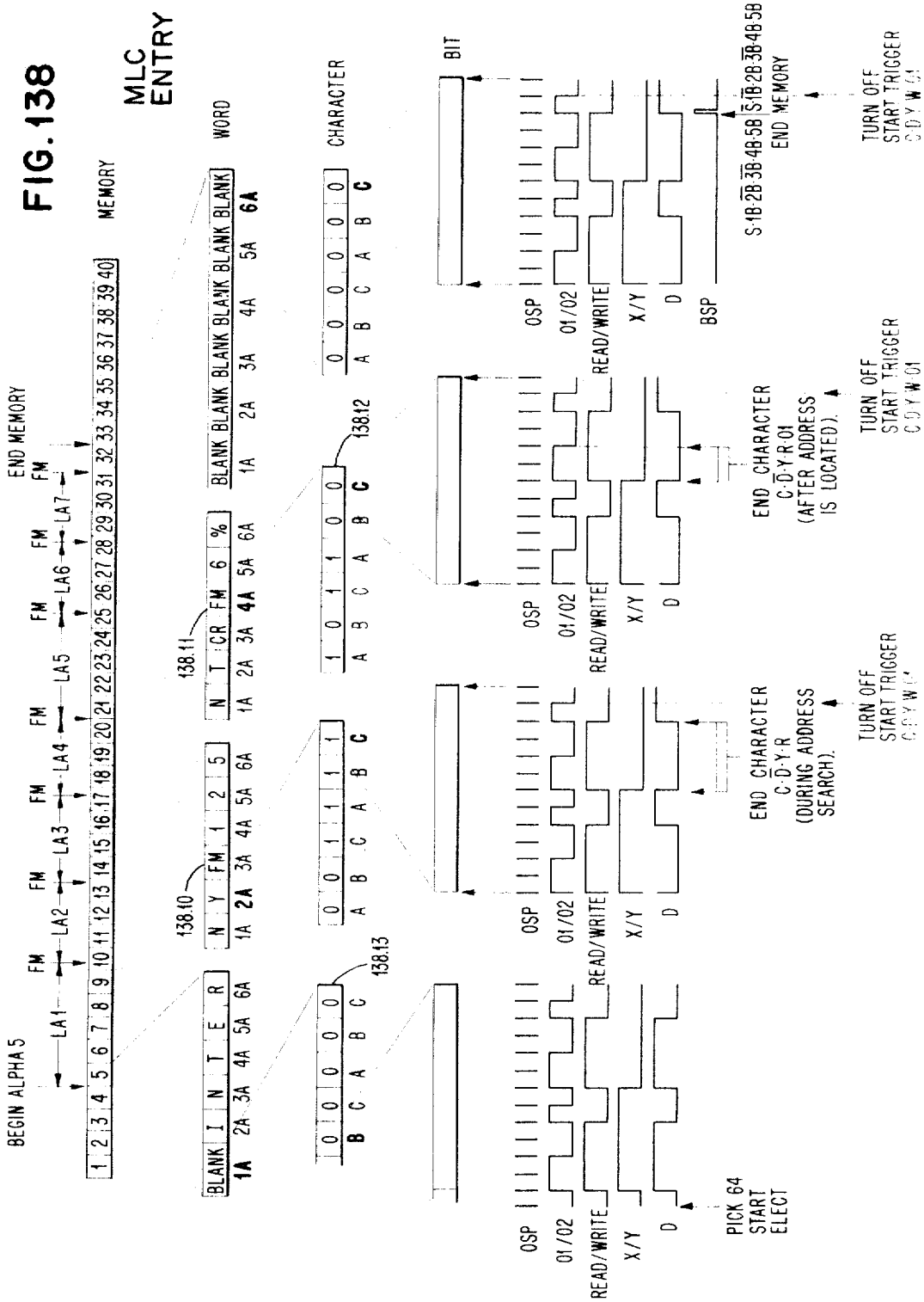

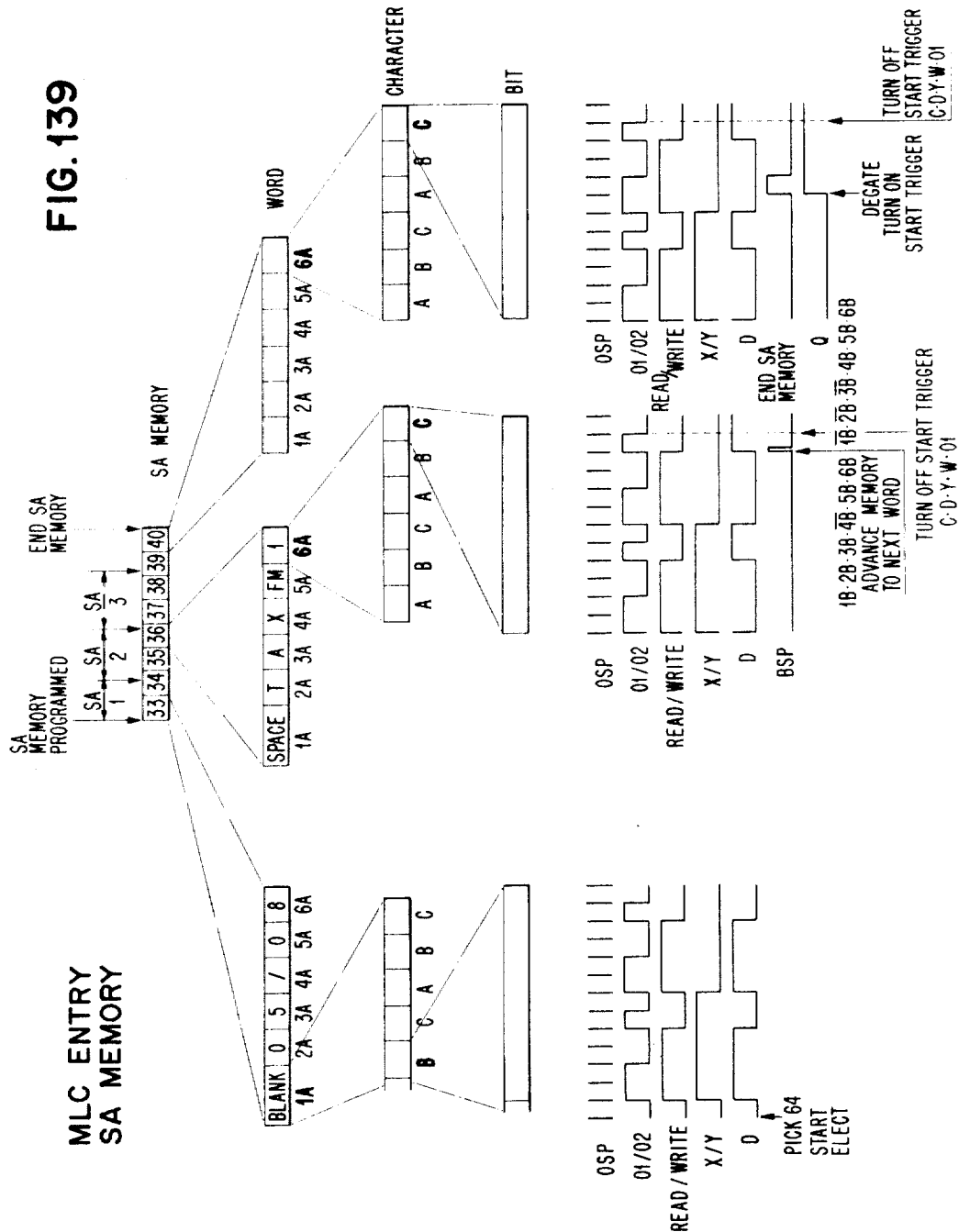

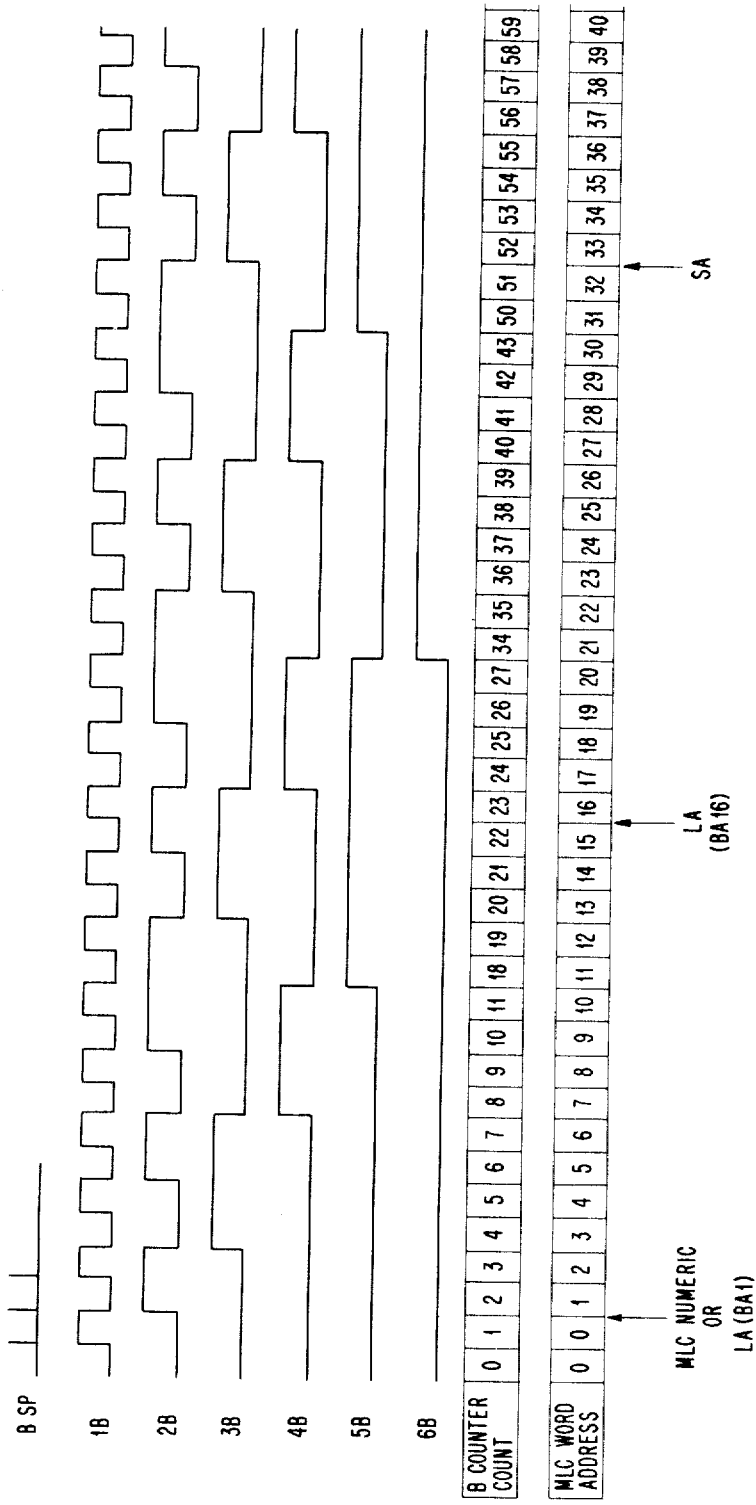

United States Patent Office 3,297,992
Patented Jan. 10, 1967

3,297,992
DATA PROCESSING AND ACCOUNTING SYSTEM
William L. McDonald, Peter J. De George, Joseph R. Stewart, and Ray H. Thurmond, Lexington, Ky., assignors to International Business Machines Corporation, New York, N.Y., a corporation of New York
Filed Dec. 28, 1962, Ser. No. 248,098
63 Claims. (Cl. 340—172.5)

This invention relates to data processing and accounting systems, and more particularly to a system of this nature which has magnetic memory facilities and which is capable of performing a wide range of arithmetic and accounting functions, including the preparation and processing of magnetic ledger cards, invoices, bills, paychecks, and similar media.

In most accounting applications, it is necessary to prepare large groups of documents such as invoices and paychecks at regular intervals. In preparing an invoice, for example, it is necessary to process certain data such as quantity of items shipped, description of item, price per item or per group of items, tax rates, shipping rates, and discounts, and to perform arithmetic operations with the data in order to develop a final total of charges. In addition, it is usually required that portions of the original data or data derived therefrom at certain stages of processing be printed on the invoice or similar form.

In a typical situation, much of the data handled does not change. Where invoices for steady customers are prepared periodically, as at the end of each month, certain data such as customer's name, shipping address, account number, the tax rates, discount rates and shipping rates which apply to a particular customer remain invariable from month to month. Also, in response to any shipment or sale of goods, it is necessary to update various records such as an accounts receivable record wherein the new charges are added to an old balance, an inventory record wherein the amount of the current sale is subtracted from the quantity of such items in stock and other records of similar nature.

Various arrangements have been provided in the prior art for automatically introducing repetitive, invariable data of the type described. These systems usually involve relatively complex and expensive auxiliary units such as tape readers, or similar devices, which result in an impractical system for a small business. In addition to the auxiliary media for entering such data, ledger cards capable of magnetically storing only numeric information have been used. Suitable magnetic reproducing apparatus has been provided for reading from and recording on the ledger cards. However, these systems have been limited to the introduction and handling of numeric information only and since relatively large amounts of alphabetic or alphanumeric information is frequently required in many document preparation procedures, these prior arrangements have had limited usefulness.

As another aspect of the preparation of business forms, it is frequently necessary to cause the output printing element to be moved to a particular new position relative to the document being prepared, in order to print a desired piece of information. The new position is different either vertically or horizontally, or both vertically and horizontally, from the initial position of the printing element. It is further necessary for expedient preparation of business forms to enable such position seeking and relocation to be conditioned upon some circumstance resulting from the data processing or, in other words, to enabe branching to either of two new locations, each of which may be at a different horizontal and/or vertical location.

A wide variety of data processing systems have been developed for the purposes mentioned. The range extends from systems which automatically assimilate and process large quantities of data with little or no operator intervention, to systems which handle relatively smaller quantities of data and which are more dependent on operator control. In the large systems, quantities of raw data and program instructions are initially entered from punched cards, magnetic or paper tapes or other media, and the data and instructions are stored within the machine or system for subsequent access. Thereafter, the machine or system processes the data and prints the required documents without further operator attention.

The first mentioned systems usually have great versatility and can perform numerous operations under control of complex stored programs. The smaller systems, on the other hand, have usually had rigid and limited routines, thereby lacking flexibility.

In the smaller systems, an operator usually maintains overall control of the machine for entry of data, manipulation of its processing, and printout of data, and fewer automatic operations are performed in accordance with a preestablished program.

In some cases, these systems are provided with program tapes having coded operating instructions thereon. The tapes are stepped along in coordinated manner with a machine element such as a printer or typewriter, with instructions being detected and acted upon at regular intervals during the machine operation. In other cases, simple and inexpensive programming is achieved by control panels which are prewired in accordance with the machine operation desired and which are connected into the circuitry of the machine during its operation.

On many forms, it is convenient to have boxes directly underneath each other that mean different things. For example: an invoice may have a line amount total. Underneath this, many forms have a subtotal, which represents an addition of all of the item totals on the invoice. On a line below that may be printed the discount amount; the next line below that, a tax amount; the next line, the invoice total amount, which is the gross, adjusted by the tax, discount, or similar factors.

The smaller systems have had only a limited amount of document format control. Paper forms are printed at a number of specified horizontal positions, but there has been no provision for modifying or branching a program from the horizontal format. In some cases limited flexibility exists under control of cumbersome external control media, such as detachable program bars, inserts, or racks, or similar devices, which in many cases are changeable only at the factory.

As a result, an undue amount of operator control has been required. For example, since the horizontal direction might be the only way the machine could branch, the operator might tab over to a particular horizontal position and backspace one space. In this way, the machine would really be in a different horizontal position and could pick up a different routine.

Some smaller systems have some arithmetic functions, such as add, substract, and multiply, but lack other arithmetic functions, such as divide. Even those functions that are provided might be restricted. For instance, a round-off column shift operation might be limited to either two or three places. A column shift right operation might be required to also be accompanied by a half adjust operation.

As another example, only one or two field widths might be available for print out of information, thereby imposing serious limitations on forms design. Also, even though a field to be printed out was small, where a large field width was mandatory, spacing over high order positions would be necessary, with a consequent loss of printing speed.

Other systems have had restricted storage facilities, which have been limited to numeric information only. In the case of magnetic ledger storage only very elementary storage means might be available, such as rotating wheels or mechanical counters which move in synchronism with the card. In that way, numeric information can be defined.

Accordingly, a primary object of the invention is to provide a data processing and accounting system for preparation of forms such as invoices and checks, and concurrent updating of associated ledger cards in order to maintain a historical record of items or entries.

Another object of the invention is to provide a system with complete arithmetic and functional flexibility.

An additional object of the invention is to provide a system of the type described which will accommodate and handle data in a number of basic radices.

A further object of the invention is to provide a system with memory facilities for accommodating data in a number of codes and with provision for translating from one code to another as required.

Another object of the invention is to provide a system for processing magnetic ledger cards in which magnetically recorded information is arranged in one convenient format on the card but is handled either in a first radix or a second radix as required by the program.

Another object of the invention is to provide an electronic system with facilities for storing information that is useful in arithmetic operations, as well as information that is useful in directing machine functions.

A further object of the invention is provide an electronic computing system which will handle a variety of input and output media.

Still another object of the invention is to provide an electronic computing system with a high degree of automatic operation while maintaining a desirable amount of operator orientation and control.

Another object of the invention is provide a system that is more versatile, and which is capable of handling complex accounting applications.

Another object of the invention is to provide a system having capabilities for storing and manipulating both alphabetic and numeric information and also having provision for reading such information from, or recording such information on, magnetic ledger cards.

In addition, an object of the invention is to provide an economical memory unit for an electronic computing system with simplified information selection functions.

A further object of the invention is to provide basic memory facilities for entry or dispensing of variable numeric and alphanumeric information, as well as a separate fixed factor memory for use in arithmetic and other operations.

Another object of the invention is to provide a system of this nature with facilities for selecting any memory location at random under automatic program control or for selecting a specified group of memory locations in a sequential manner beginning with a specified location.

A still further object of the invention is to provide common means for controlling the accessing of the memory in a sequential manner as noted above, as well as controlling print out of information, and shifting of information during arithmetic operations.

An additional object of the invention is to provide memory facilities which are extremely flexible and which selectively accommodate a variety of numeric and alphabetic information from diverse sources.

An additional object of the invention is to provide a system of this nature with facilities for storing fixed length data and variable length data, with the amounts of each being selectively altered according to the requirements of the application.

Another object of the invention is to provide a system with memory selection facilities which can be selectively actuated according to a predetermined program, or under manual operator control, or dependent on machine decisions concurrently with form preparation and processing of data.

Still another object of the invention is to provide a system with memory facilities which will selectively receive and dispense data in synchronous manner or in an asynchronous manner depending on the devices and operations involved.

An additional object of the invention is to provide a system with memory facilities for storing units of information of variable length with the lengths of the individual units being selectively determined according to the requirements of each application, and with automatic machine recognition and handling of the units of information regardless of length.

As a corollary, an object of the invention is to provide memory facilities in a machine of the type described which will enable the recognition and selection of units of information regardless of length or location in memory.

Another object of the invention is to provide simple, inexpensive and effective means for automatically entering both numeric and alphanumeric data into storage of a data processing system for ready access.

Still another object of the invention is to provide efficient transfer of both numeric and alphanumeric data between a record medium and the storage unit of a data processing system.

Another object of the invention is to facilitate the transfer of alphanumeric data between a record medium and a storage unit without the necessity of code translation.

Another object of the invention is to facilitate visible and magnetic recording of both numeric and alphanumeric information on a ledger card.

Another object of the invention is to provide a system with error correction and duplication facilities for magnetically recorded information on a record card.

An additional object of the invention is to provide simple and reliable error checking facilities for use in connection with magnetic reading and recording of information bits on a magnetic ledger card to and from the memory unit of a data processing system.

In order to accomplish these and other objects of the invention, an electronic computing system is disclosed which has a wide variety of data transfer, arithmetic and opeartional features. The system is provided with several entry and output devices for the preparation of printed documents, as well as an auxiliary unit for extracting information from magnetic ledger cards, and recording the same or altered information on the ledger cards.

The system takes advantage of horizontal position programming and expands thereon by adding another program control dimension, the vertical as well, which provides a considerable degree of format control.

The system further has a control panel which can be selectively wired to perform a variety of operations in response to format or other control signals.

In addition, a magnetic ledger system is provided which has the ability to handle numeric and also alphabetic information.

The system also has magnetic memory facilities for receiving numeric and alphabetic information from operator-controlled keyboards or a magnetic storage area of a ledger card and dispensing the information in original or altered form to a primary printer for preparing an invoice or similar document; or to a secondary printer for printing on the magnetic ledger card or for recording on the magnetic storage area of the ledger card.

In the course of operation, the system has means for variably expanding or contracting the amount of one type of data accommodated by the memory, such as numeric information meanwhile conversely contracting or expanding the amount of another type of data accommodated by the memory, such as alphanumeric information.

In addition, the memory area of the system has provision for handling special, variable alphabetic information of a semi-permanent nature, such as date, discount rates or the like, which are changeable under operator control.

In addition, the system has memory facilities for receiving and storing numeric information in one radix, such as binary, for use in arithmetic operations, and for storing alphabetic and numeric information in another radix, such as 6 bit coded format for use in print out or recording operations.

Also, provision is made for handling certain information in a first radix, such as a binary form with or without conversion to or from another form, such as 6 bit coded format and with equal facility handling other information in a second radix, such as 6 bit coded format, without conversion.

The system also has memory facilities which are extremely flexible with respect to the variety of information accommodated and which are selectively controlled by a number of means that in themselves are also flexible and combinable in diverse combinations according to the type of information currently being handled.

Also, the system has memory facilities for handling units of information of fixed length, such as binary numeric, and also for handling units of information of variable length, such as alphanumeric, with rapid processing of either type of information under control of certain selection and control apparatus.

The foregoing and other objects, features, and advantages of the invention will be apparent from the following more particular description of the preferred embodiment of the invention as illustrated in the accompanying drawings.

Figure 2:
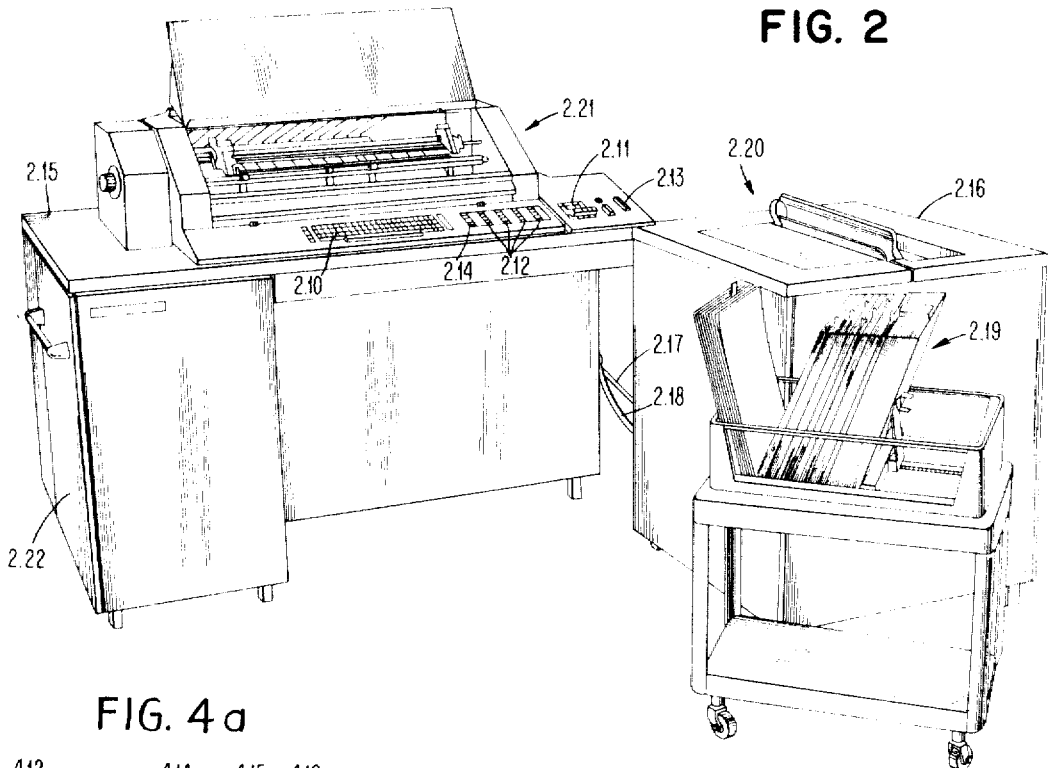
FIG. 2 is a perspective view of a business machine having the features shown in FIG. 1, including a magnetic ledger card unit.

FIGS. 3a, 3b, and 3c show three representative ledger cards for use in the ledger card unit of FIG. 2, each card having a magnetic stripe for storage of information.

Figure 4A:
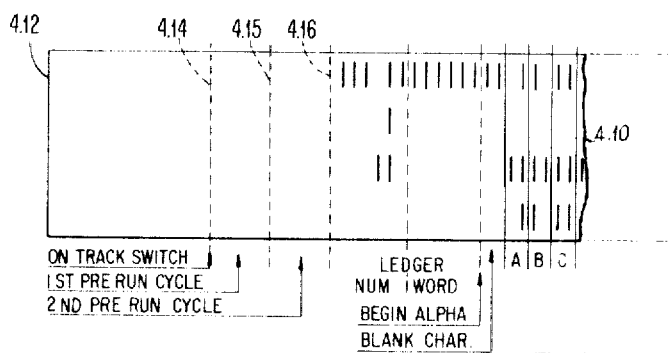
Figure 4B:
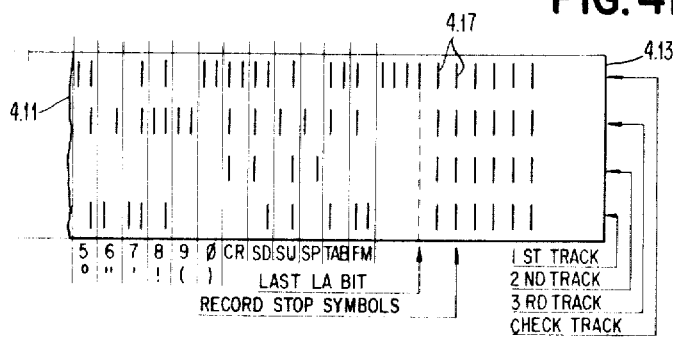

FIGS. 4a and 4b are detailed views of the ledger card stripe of FIG. 3.

FIG. 5 represents a typical invoice form which serves as one form of output for the machine of FIG. 2, together with vertical and horizontal program tapes at the left and above the document, respectively.

Figure 6:
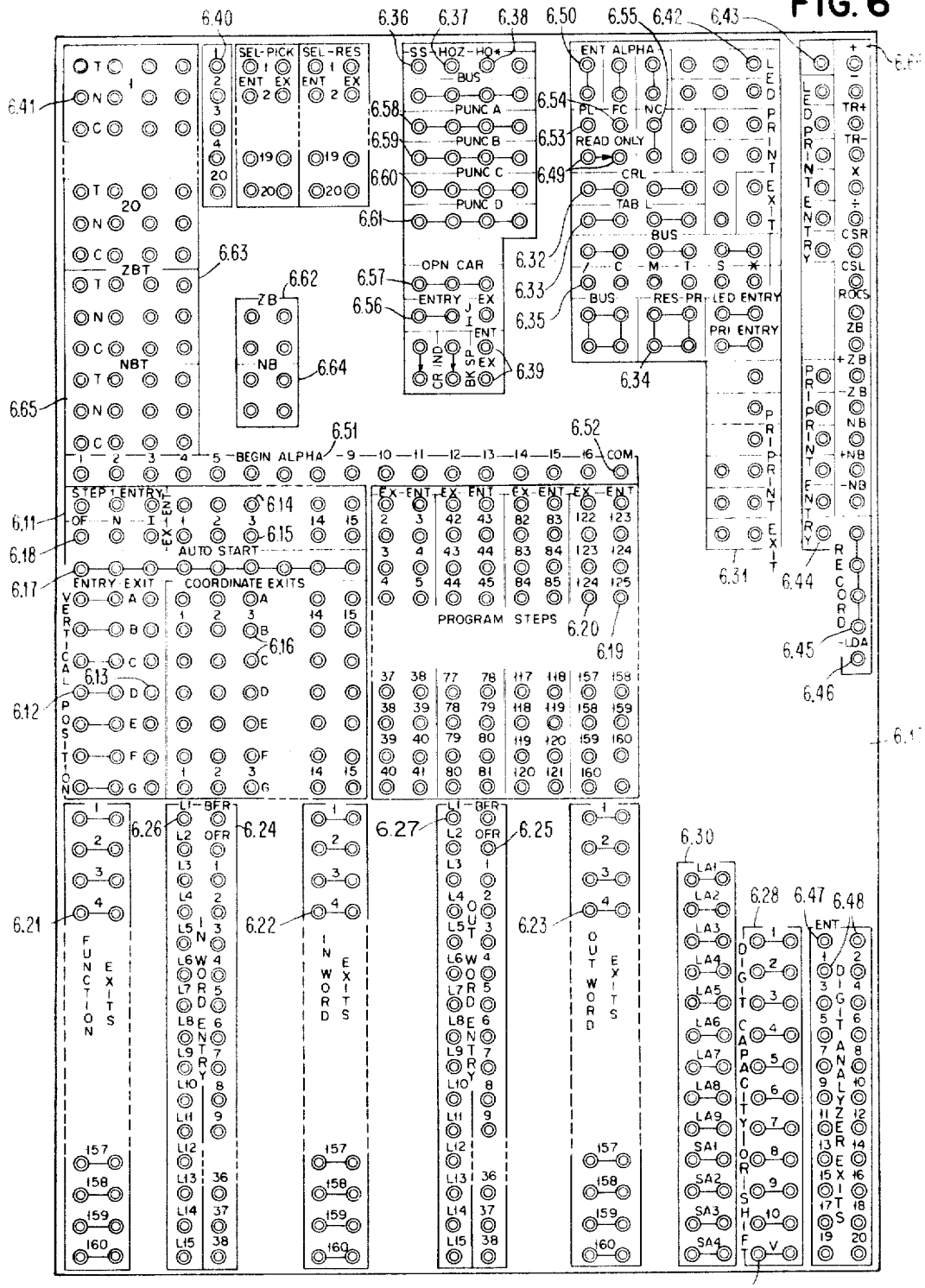

FIG. 6 is a control panel used in the machine of FIG. 2.

FIGS. 7a and 7b together, with FIG. 7b disposed on the right of FIG. 7a, represent various entry and control keys associated with the machine of FIG. 2.

Figure 1:
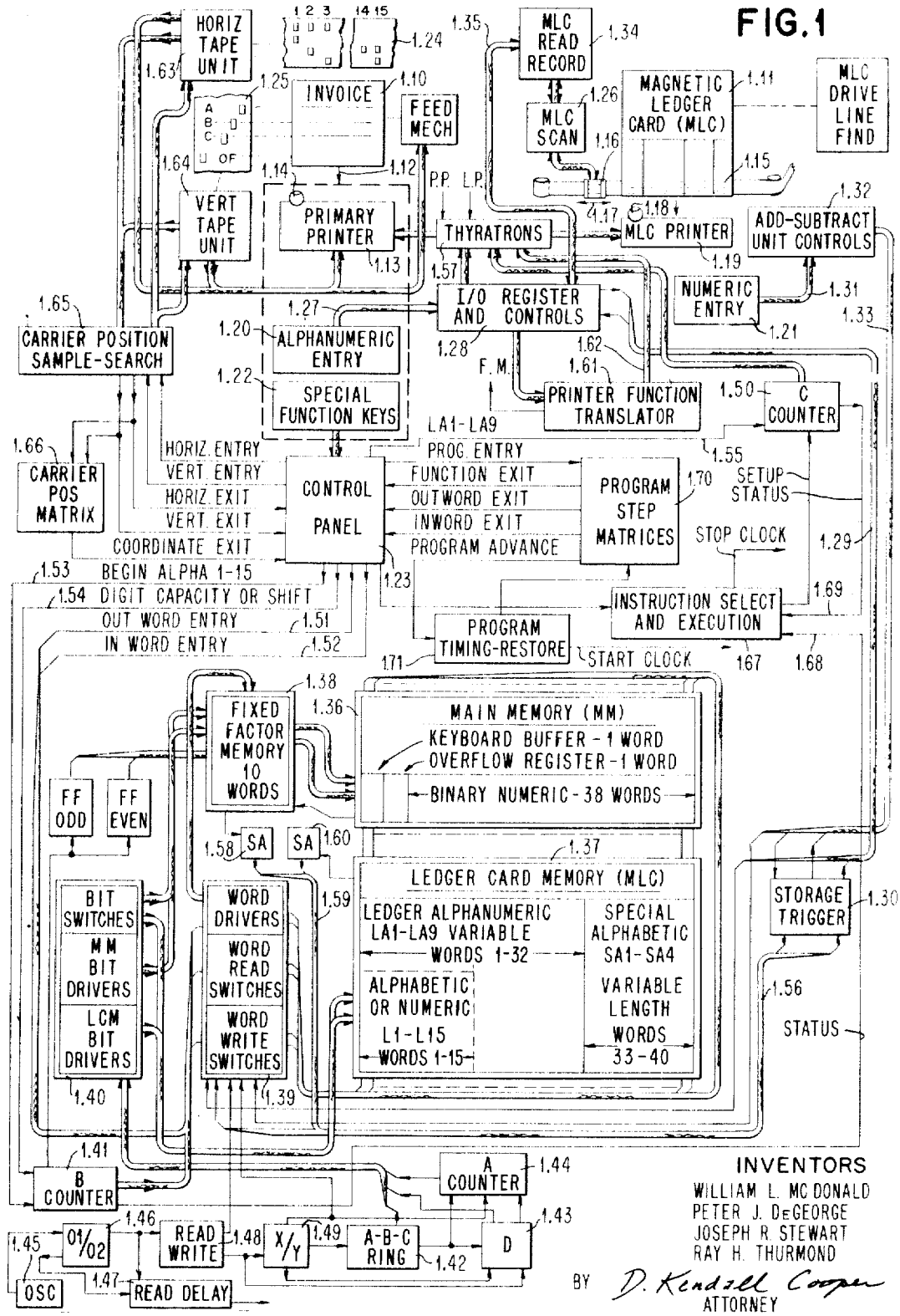
FIG. 1 is a block diagram of an electronic computing system in which the invention is incorporated.
Figure 12:
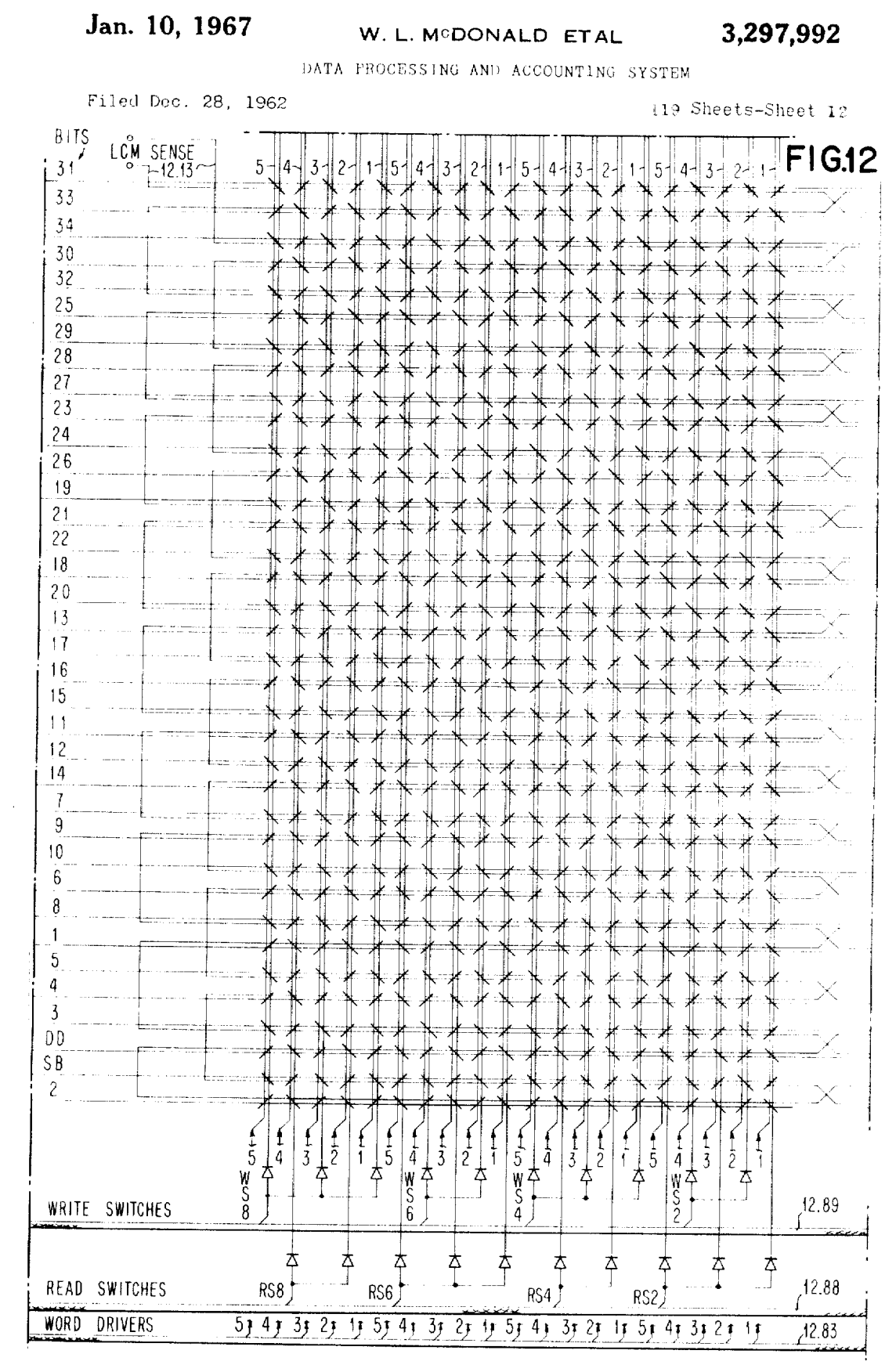
Figure 13:
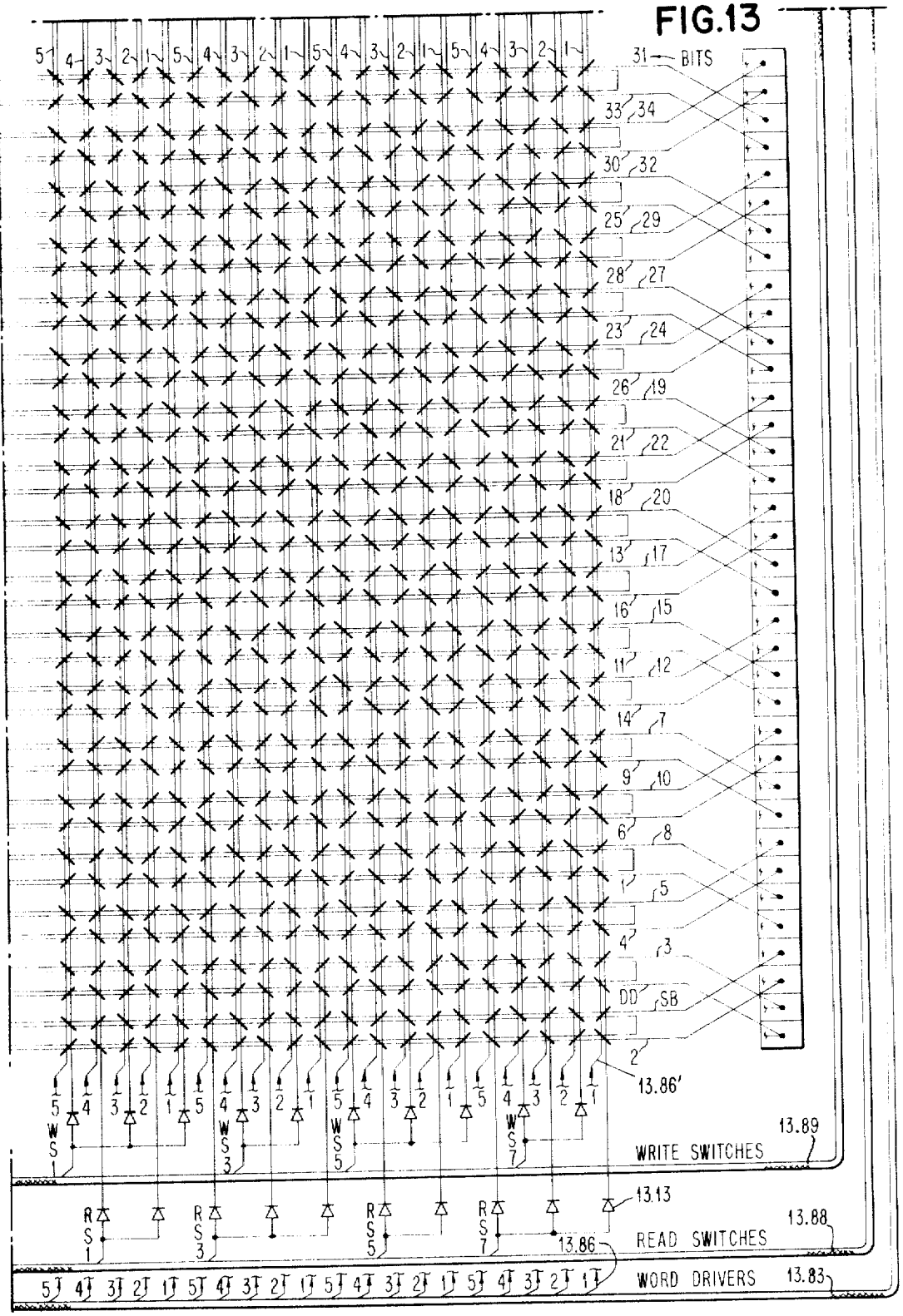
Figure 14:
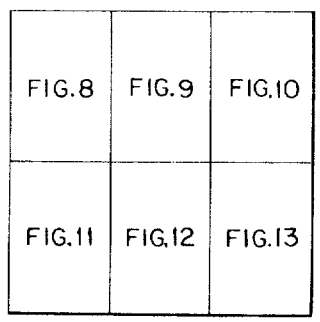

FIGS. 8–13 when arranged according to FIG. 14 show the details of the memory facilities of the system of FIG. 1 and a portion of the associated selection means.

Figure 15:
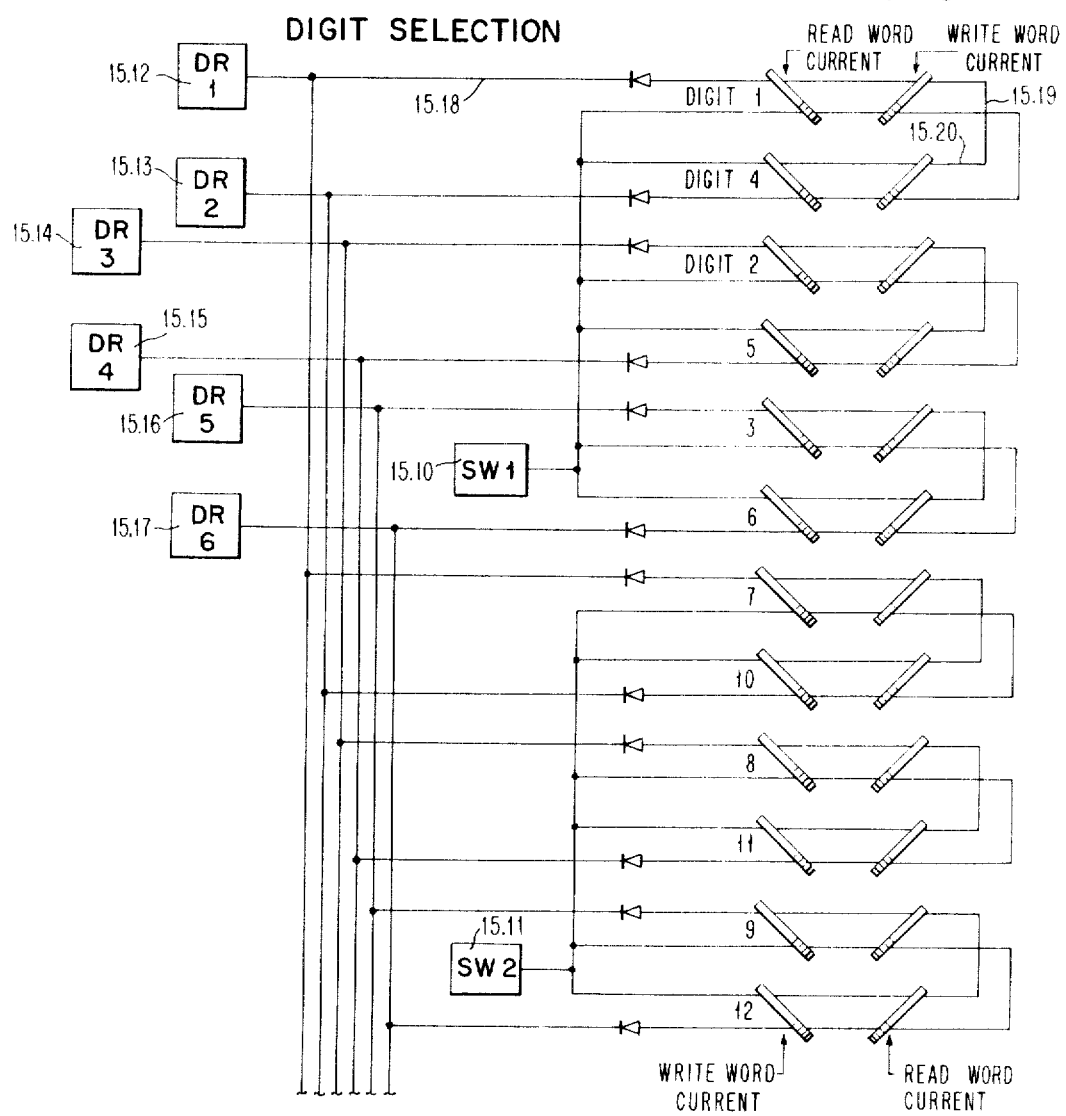

FIGS. 15 and 16 illustrate digit selection and word selection for the memory facilities shown in FIGS. 8–13.

FIG. 17 is a timing chart for the system.

FIGS. 18a, 18b, and 19 represent voltage levels and shifts that are encountered in the system.

FIGS. 20–47 represent basic circuit blocks used in the system.

FIGS. 48–104 show electronic circuit arrangements that are used in the invention, which utilize the basic circuit blocks of FIGS. 20–47.

FIG. 105 represents the power supply for the system.

FIGS. 106–133, arranged in sequence from FIG. 106 to FIG. 133, show relay circuits that are used in the system.

Figure 134:
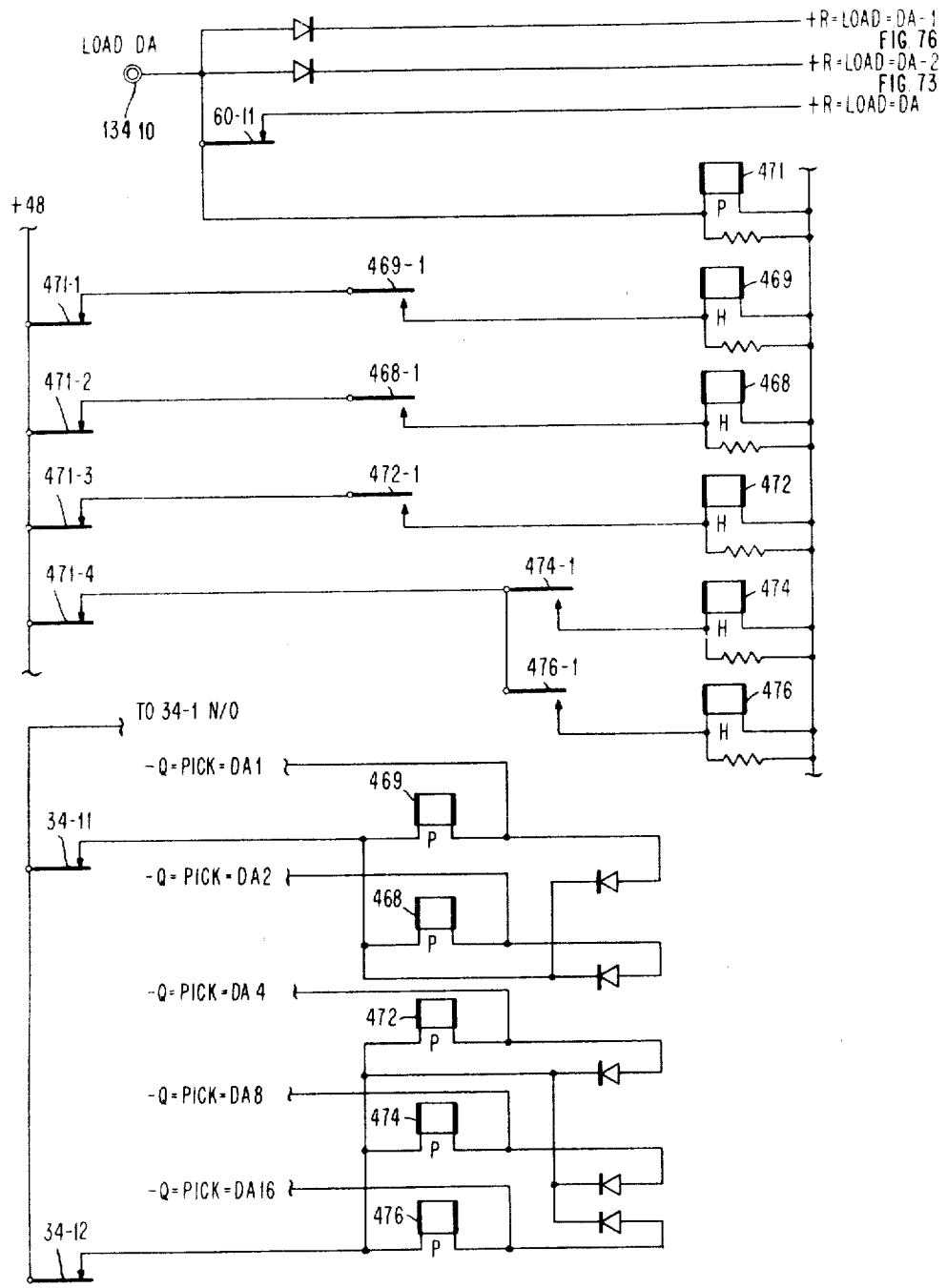
Figure 135:
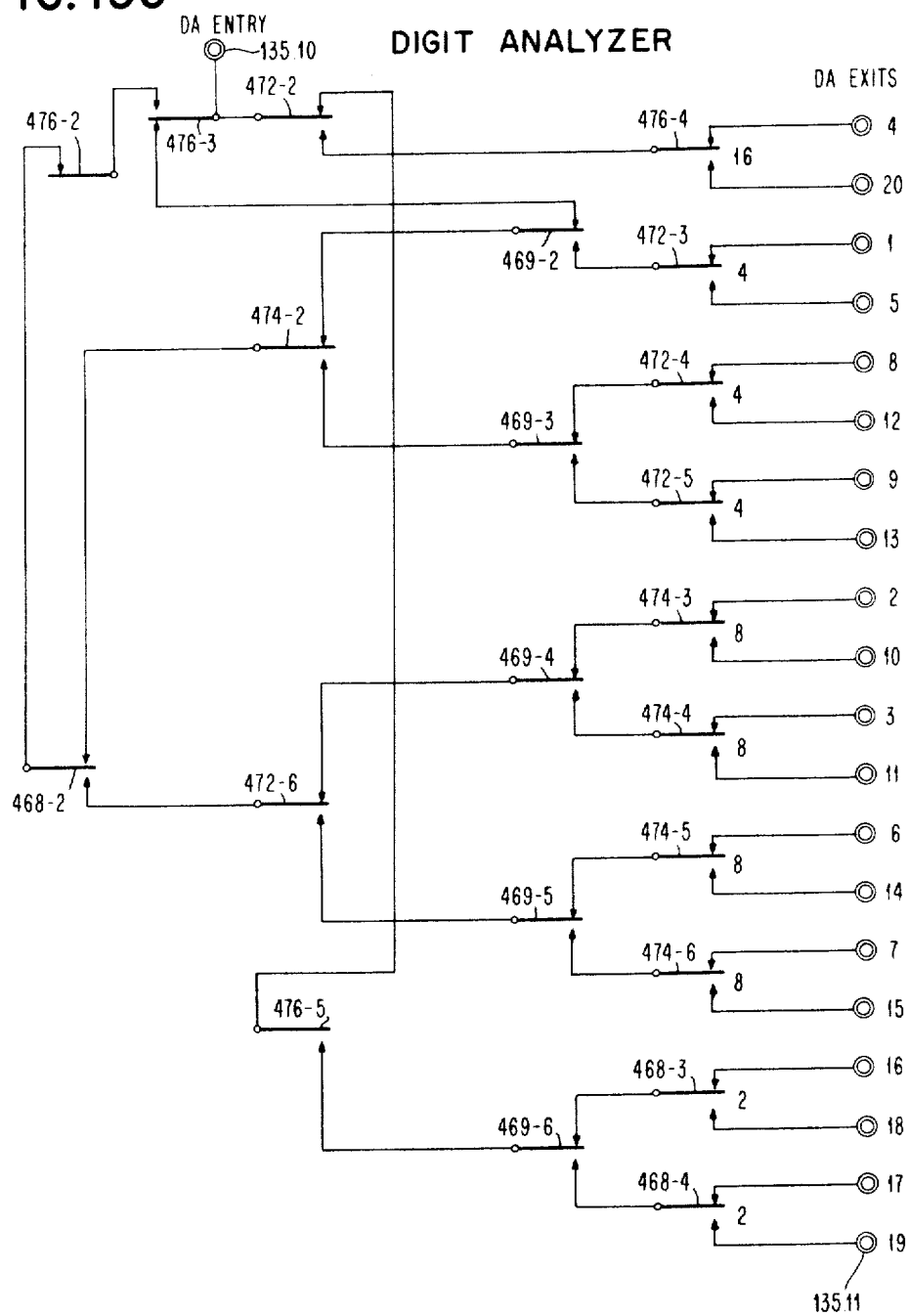
Figure 136:
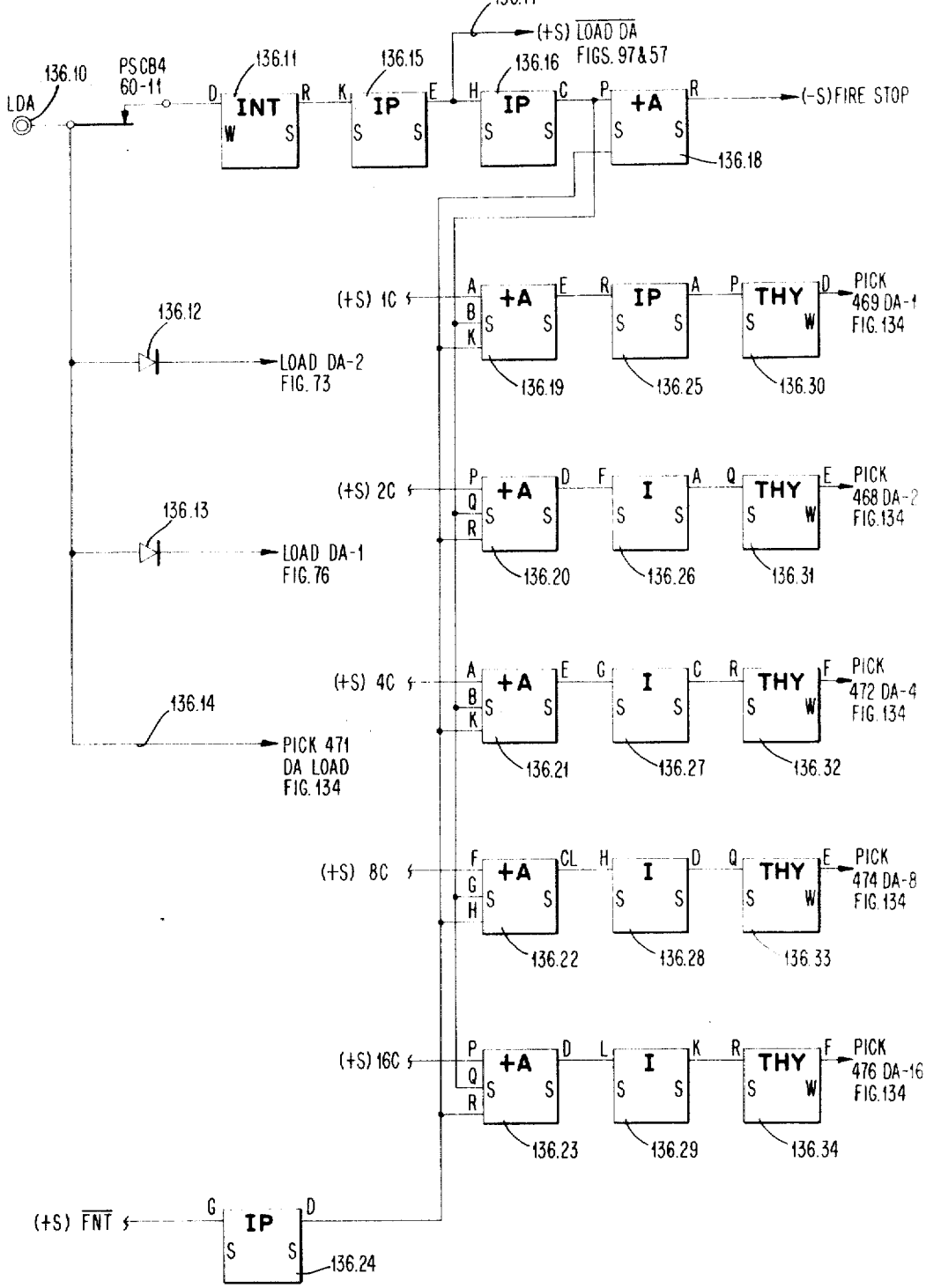

FIGS. 134–136 represent additional circuitry required for a Digit Analyzer feature.

FIGS. 137–140 depict typical memory arrangements and memory selection sequencing used in the system.

For convenience, reference numerals herein are composed of two parts separated by a period. The first part indicates the figure number referred to. The entire number indicates the reference numeral itself. As an example, 1.12 indicates FIG. 1.

TABLE OF CONTENTS

| | Column |
|---|---|
| Introduction | 6 |
| Control Panel | 15 |
| Logic Blocks and Circuits | 18 |
| Clock Circuits | 28 |
|    Initial Conditions | 28 |
|    Starting the Clock | 29 |
|    Stopping the Clock | 33 |
| Data Transfer and Memory Selection | 34 |
|    B Counter | 34 |
|    C Counter | 36 |
| Numeric Entry With Memory Selection by Direct Control Panel Wiring | 37 |
|    Transfer of Keyboard Buffer Word to Another Storage Word | 43 |
| Numeric Type With Memory Selection in a Sequential Manner | 45 |
|    Punctuation Control and Punctuation Options | 55 |
| Digit Analyzer | 60 |
| Memory Selection During Column Shift Operations | 63 |
|    Round off Column Shift | 63 |
|    Column Shift Left and Column Shift Right | 64 |
| Multiply and Divide Operations | 65 |
|    Multiply | 65 |
|    Divide | 67 |
| Organization of Magnetic Ledger Card (MLC) Memory and Memory Selection for MLC Operations | 70 |
| Alphanumeric Entry | 73 |
|    B Counter Setup | 76 |
|    C Counter Setup | 77 |
|    Start of Electronics and Search for Required Field | 78 |
|    Distinctions Between Search for Field LA1 and One of Fields LA2–LA9 | 83 |
|    Entry of First Alphanumeric Character | 87 |
|    Entry of the Second Alphanumeric Character and Subsequent Characters | 90 |
|    Entry of Information into the Special Alphanumeric (SA1–SA4) Portion of MLC Memory | 92 |
| Alphanumeric Print | 93 |
|    Alphanumeric Print From SA Memory | 99 |
| Ledger Operations | 99 |
|    Summary of Record Ledger Operation | 101 |
|    Summary of Read Ledger Operation | 101 |
| Read Ledger Operation | 103 |
| Record Ledger and Check Read Operation | 110 |
|    Check Read | 114 |
| Full Card Regeneration | 115 |
| Summary | 117 |

INTRODUCTION

The system of FIG. 1 utilizes solid state, electromechanical and magnetic storage techniques for performing a variety of arithmetic and accounting functions. A number of input-output media and controls are provided.

The system operates in binary arithmetic, but communicates with input and output media by means of 6 bit coded alphabetic and numeric characters, which are referred to as alphanumeric characters. However, the system can store information in either form. The alphanumeric data is not manipulated arithmetically, and further is not transposed to any other code, but remains in the six bit code in which it is entered.

The mechanisms of the system including entry keys and printers and the circuits of the machine are housed in an operator console 2.15 and a magnetic ledger card handling unit 2.16, which is the subject of a copending application of Charles Jenkins and Kenneth Perkins, Ledger Card Handling Apparatus, Ser. No. 248,117, filed December 28, 1962, and assigned to the same assignee as the present invention. The ledger card unit 2.16 is interconnected to the console 2.15 by cables 2.17 and 2.18.

In FIG. 1, an invoice 1.10, which would usually be part of a continuous strip of invoices, is being prepared. Invoice 1.10 has a horizontal program tape 1.24 and a vertical program tape 1.25 associated therewith for format control purposes. Tapes 1.24 and 1.25 have apertures therein that are positioned in predetermined locations with respect to specific horizontal and vertical positions on invoice 1.10. A Horizontal Tape unit 1.63 and a Vertical Tape unit 1.64 in conjunction with a carrier position Sample-Search unit 1.65 and a Carrier Position Matrix 1.66 provide novel format control for the system as described in detail in application Ser. No. 248,110, filed December 28, 1962, W. L. McDonald et al., with the same assignee as the present application.

Arrow 1.12 indicates that invoice 1.10 is fed through a primary printer 1.13 for printing by a spherical type head 1.14. An invoice, like invoice 1.10 is shown in detail at 5.10 in FIG. 5, with associated horizontal and vertical program tapes 5.11 and 5.12. The programming power of the system is greatly increased by using both horizontal and vertical dimensions, since it is possible to define an entire matrix of positions on any form in use. For example, a horizontal position in the heading of the invoice will have an entirely different meaning from the same horizontal position in the body of an invoice or a total line of an invoice, or the predetermined date line. It may be desired to print out line item totals down the right side of the paper while directly underneath the line items it is desired to print the invoice total. The format control makes this possible. A magnetic ledger card 1.11 is representative of a large number of ledger cards such as accounts receivable, inventory, and the like, which would be used during the preparation of invoice 1.10. Ledger card 1.11 has a magnetic stripe 1.15 which is read and recorded by a magnetic head assembly 1.16 that scans card 1.11 as indicated by arrow 1.17. Ledger card 1.11 is printed upon by spherical type head 1.18 which is part of a printer 1.19.

A typical group of magnetic ledger cards, such as ledger card 1.11, are shown in FIGS. 3a, 3b, and 3c at 3.10, 3.11 and 3.12 respectively. Each ledger card has a magnetic stripe for recording information such as stripe 3.13 on card 3.10. The stripe 3.13 is shown in greater detail in FIGS. 4a and 4b. Three longitudinal channels on the magnetic ledger stripe of the magnetic ledger card are information tracks and a fourth longitudinal channel is provided for redundancy check bits to make the number of bits in each vertical column odd.

The system has a numeric entry keyboard 1.21 for entry of numeric characters 0–9 which are translated from 1–2–4–8 code to binary, an alphanumeric keyboard 1.20 for entry of both alphabetic and numeric characters in 6 bit coded format, and a special function or control keyboard 1.22 for generating signals that are applied through a control panel 1.23 for special purposes.

Figure 68:
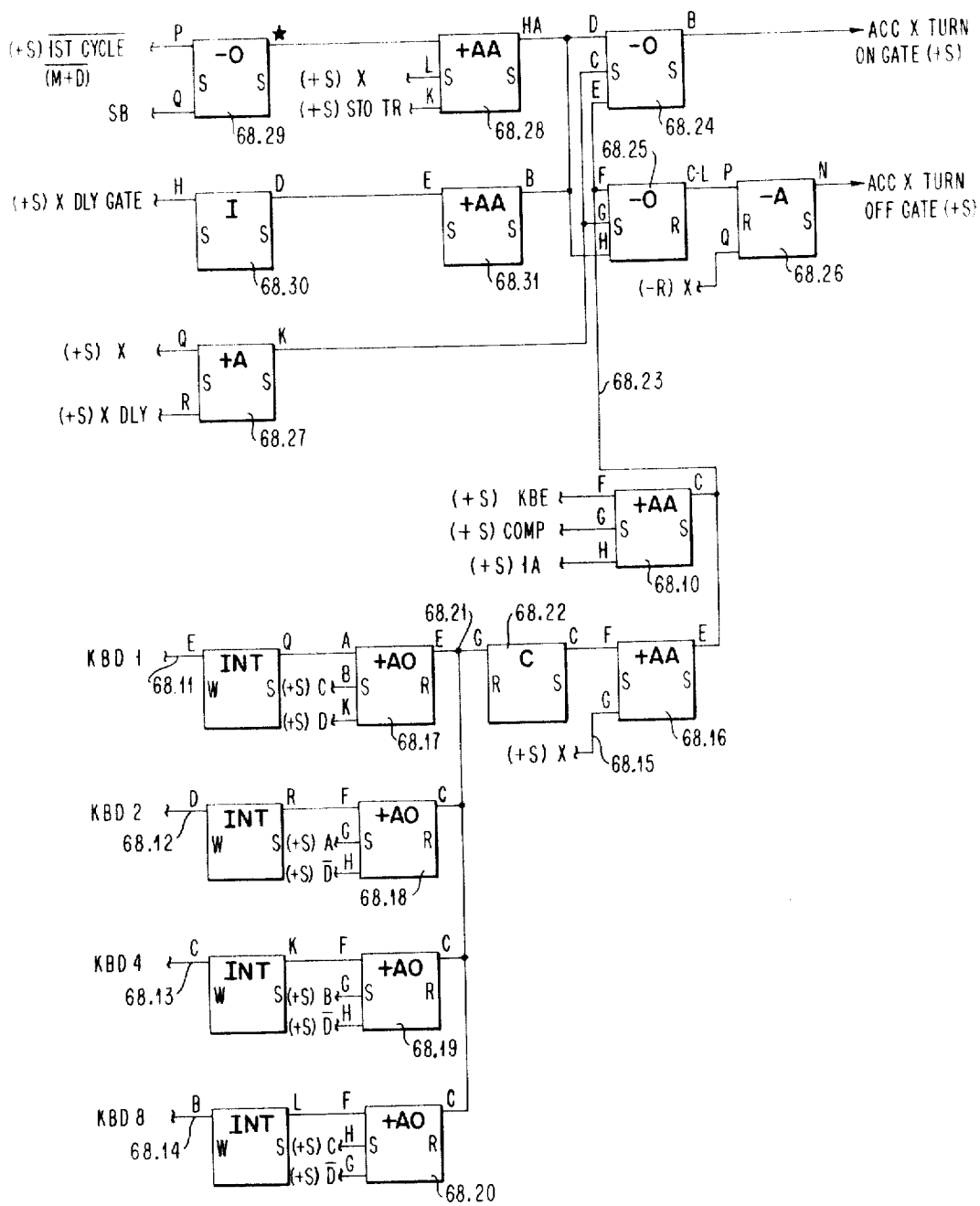

The numeric keys 1.21 are shown at 2.11 and also in detail in FIG. 7b at 7.11. When depressed, the numeric keys actuate contacts which are shown in FIG. 68, and which provide signals according to a 1–2–4–8 code. These keys are used to enter information which is manipulated arithmetically.

The contacts are successively sampled during the first four bit times of an electronic cycle to be represented as bits 1, 2, 4, and 8. The translating procedure from 1–2–4–8 to binary is disclosed more fully in a copending application, Method and Means for Translating Decimal Number into Equivalent Binary Numbers by William L. McDonald and Ray H. Thurmond, Ser. No. 112,116, filed May 23, 1961, now U.S. Patent 3,185,825 and assigned to the present assignee. The digits are successively entered into unit 1.21 high order first.

Numeric 1–2–4–8 bit coded decimal characters from keyboard 1.21 go by cable 1.31 to an Add-Subtract unit 1.32 for conversion to binary and from there by cable 1.33 for entry into memory.

Figure 115:
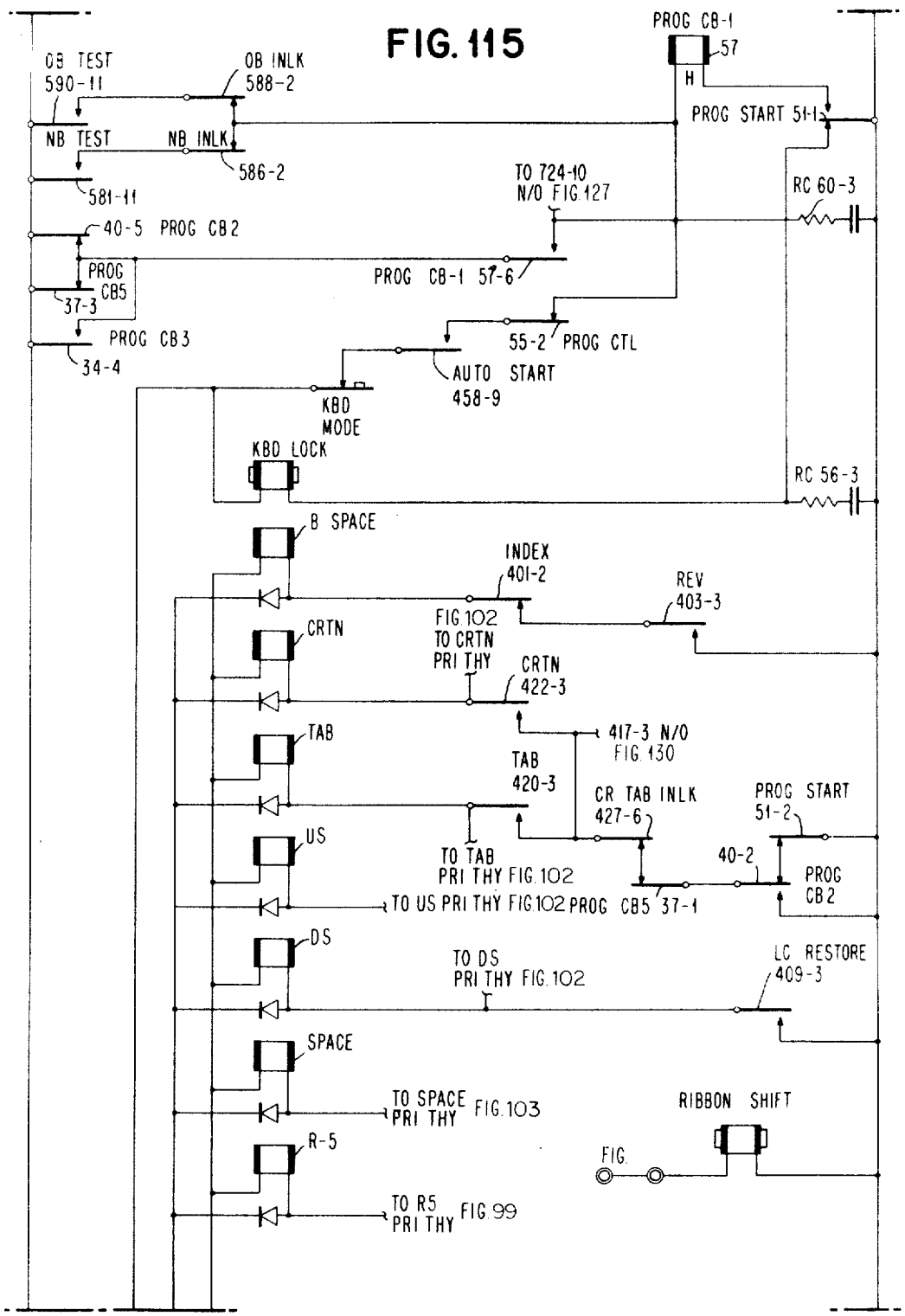
Figure 116:
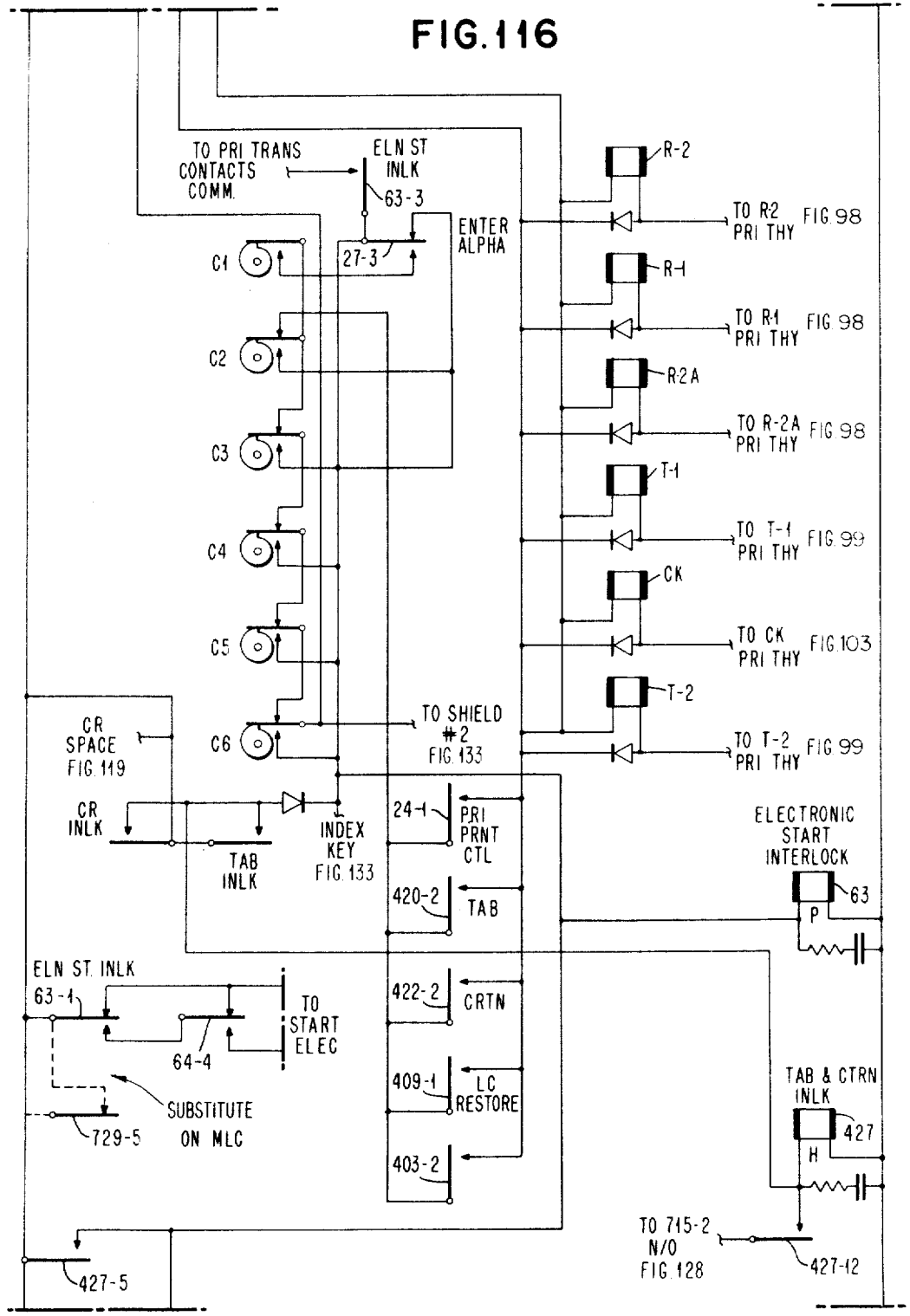
Figure 117:
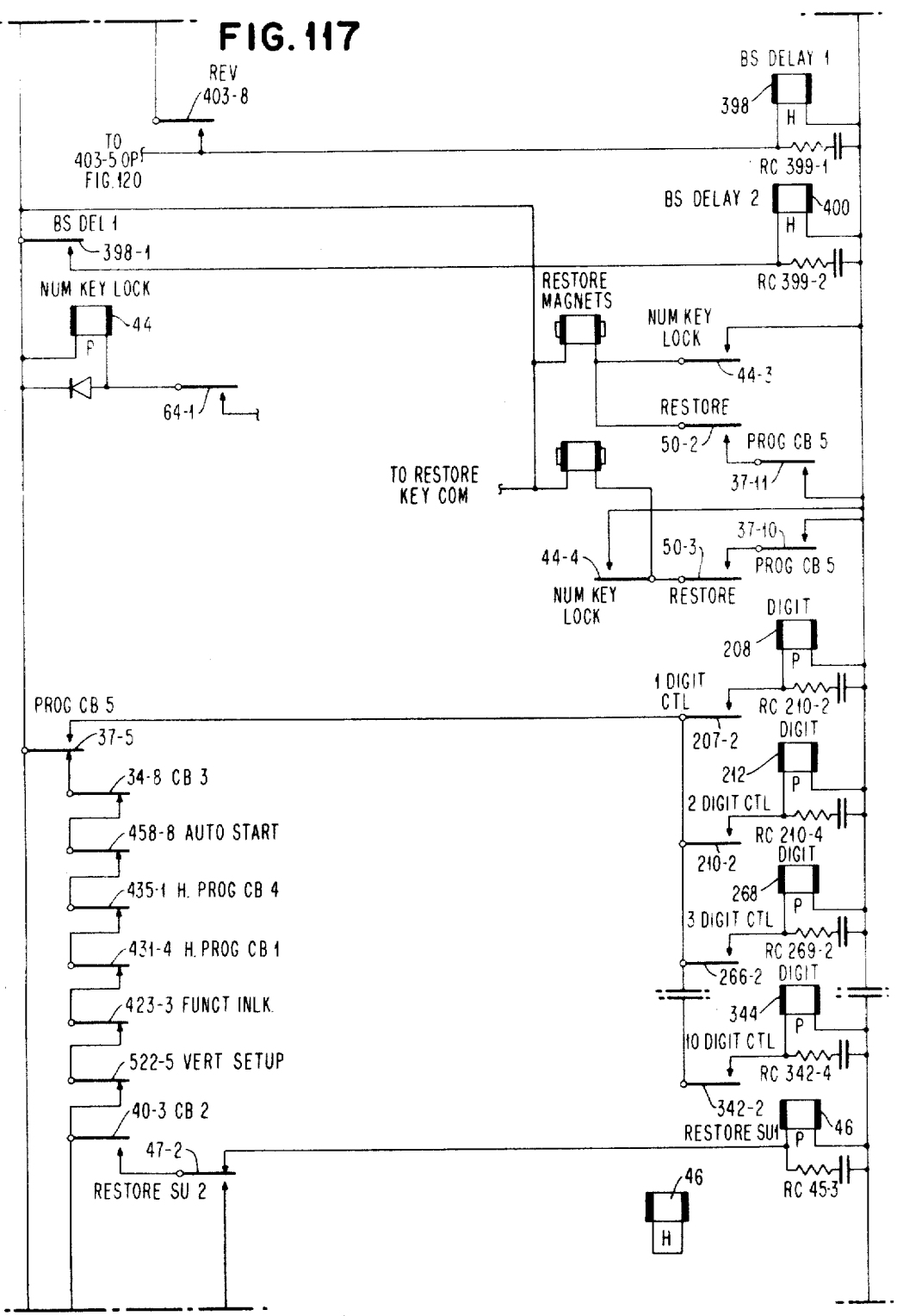
Figure 130:
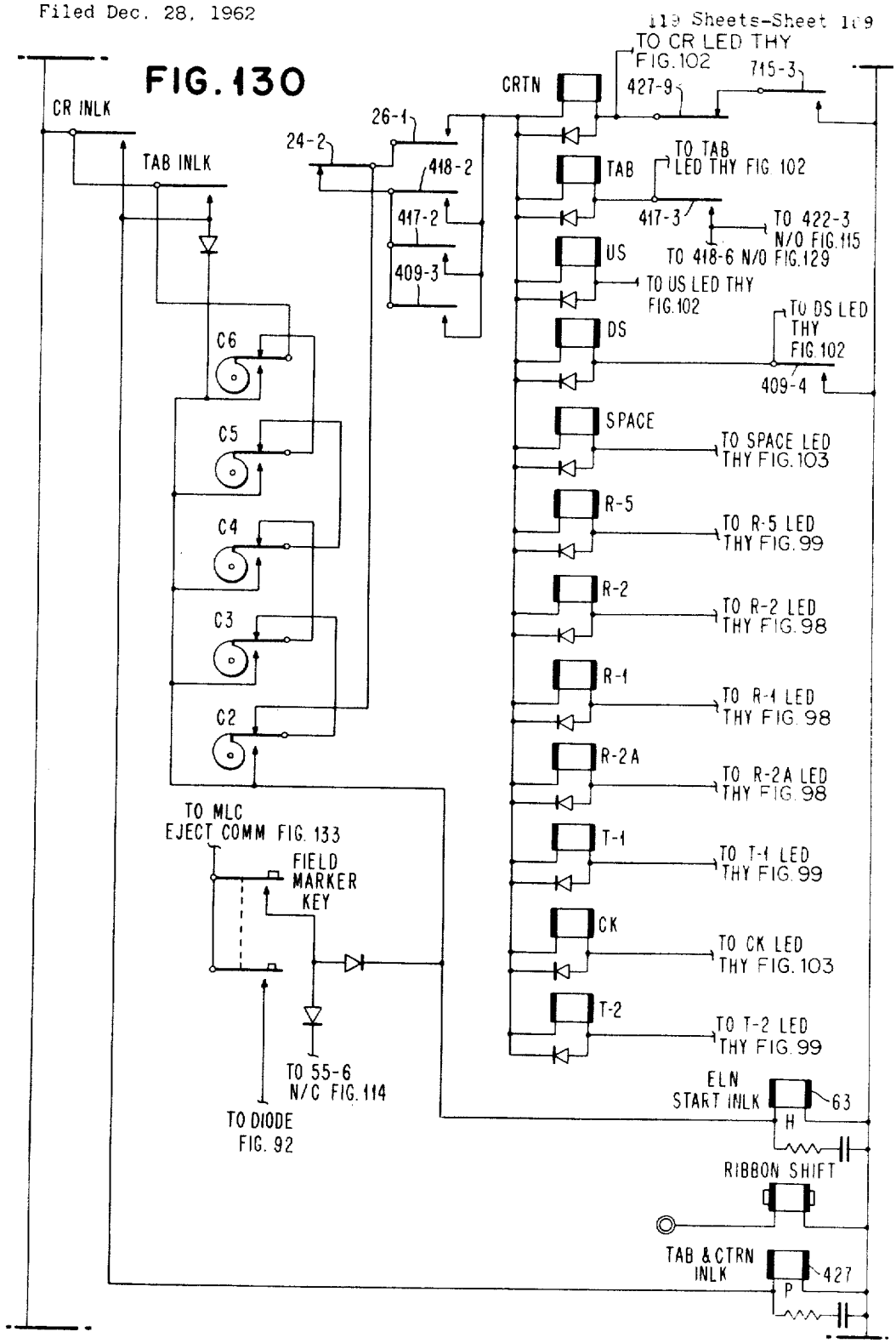

The alphanumeric keys 1.20 are also shown at 2.10 in FIG. 2, and in detail in FIG. 7a at 7.10. The alphanumeric keys are part of a typewriting apparatus which is comparable to that disclosed in U.S. Patent 2,919,002, L. E. Palmer, as modified for input-output use. The Palmer patent describes a machine with a single element printing head mounted for movement on a carrier wherein all characters of a type font are located on the surface of the head with selection being determined according to varying degrees of rotation and tilting. The modifications permit the apparatus to be operated manually, or automatically under control of print magnets and solenoids. The print magnets, when impulsed, are used to type all the letters, numbers and special characters. The solenoids are used to operate the space bar, carriage return, and tab functions. The magnets and solenoids are shown in FIGS. 115, 116, and 130. The apparatus also has a selector unit which is used to transmit electrical impulses to the Input/Output register 1.28 each time a typing key, carriage return, tab, shift or space bar is operated.

Manipulation of the keyboard of the alphanumeric entry unit 1.20 causes each of the characters represented by the keylevers to be coded into a 6 bit code as shown in FIG. 101. Alphanumeric characters in this particular coded form from keyboard 1.20 are entered by cable 1.27 to the Input/Output Register 1.28 and from there by cable 1.29 for entry into memory.

The machine performs its functions in a programmed sequence under control of a control panel 1.23 which is shown in detail in FIG. 6 at 6.10; and the special function keyboard 1.22. In addition, a small group of control keys 2.14 are used for controlling a number of functions including some concerned with the ledger card handling device 2.16 and a forms carriage generally indicated at 2.21.

The control panel provides impulses to an Instruction Select and Execution unit 1.67 for performing various machine functions such as Add, Subtract, and other functions.

Unit 1.67 is also receptive to the status of a B Counter 1.41 over line 1.68 and to the status of a C Counter 1.50 as indicated over line 1.69. The unit 1.67 automatically controls the operation of the machine.

The Program Step matrix 1.70 supplies impulses to the control panel at each program step, and provides an orderly stepping of the machine from one program step to the next. When the last program step of a sequence is reached, this condition is detected and this unit is automatically restored by unit 1.71.

The special function keys 1.22 are also shown at 2.11, and in detail in FIG. 7b at 7.12 and 7.13. The special function keys can be used for various functions, including modifying the programming sequence, moving the printing element to a programmed position under manual control, starting a new program sequence, initiating vertical paper movement when the vertical format control device is used, and opening and closing of the manual, front feed form chute.

Other manual controls or key controls include: an On-Off switch 7.15, which is the power switch, an "R" Key 7.16 which is used to restore or condition the machine to accept a new entry in the event a mistake is made in key entry on the 10-key unit, a Program Start Bar 7.17, which is used to initiate a program sequence, a Remote Tab Key 7.18 for controlling tabulation, and a Remote Carrier Return Key 7.19 for controlling return of the Primary printing head carrier.

A number of Magnetic Ledger Control Keys are shown in FIG. 7b. These include a Field Mark Key, 7.14, which is used to enter field marks when entering alphabetic information to be recorded magnetically, an MLC Eject Key 7.20 which initiates ejection of the magnetic ledger card, and an MLC Reset Key 7.21. If recording errors are sensed by the machine, the ledger card is ejected, the MLC light 7.22 comes on, and the machine locks. It is then necessary, after removing the card from the machine, to depress key 7.21 to restore the machine to an operating condition, whereupon the card recording operation can be tried again.

The console 2.15 houses a Primary printer, not evident, which is like the Primary printer 1.13 of FIG. 1 and which operates in response to depression of the alphanumeric keys 2.10 and also in response to signals provided from the core memory of the machine. Console 2.15 also contains a control panel like that in FIG. 6 which is positioned behind a gate 2.22 for control of machine functions and which can be easily inserted or removed when the gate 2.22 is open. On the top of console 2.15 is the forms carriage 2.21 which can accommodate and feed a variety of accounting forms. The forms carriage has two pin feed primary document tractor units, in front of which there is room for front feeding of unit document forms; that is, documents which are unit records by themselves.

Console 2.15 also contains the core memory of FIGS. 8–13, and practically all of the electronic circuitry of FIGS. 48–104, and 136 and the relay circuits of FIGS. 105–135.

The electronic logic includes Triggers, NOR circuits, Sample Pulse Drivers, Power Inverters, Integrators, Emitter Followers, Switches, Core Drivers and Thyratrons which are logically combined to perform the arithmetic operations, clocking and other control functions.

The relay circuits are used to set-up each program step, provide for the horizontal and vertical positioning of the carrier and form, the sequential stepping from program step to program step and the necessary restore operations.

Unit 2.16 houses a Magnetic Ledger Card (MLC) printer such as printer 1.19, FIG. 1, and reading and recording apparatus including a magnetic head assembly, like assembly 1.16 and associated scan control 1.26.

A large group of ledger cards is shown at 2.19. Individual cards are selected by the operator during the course of a program and inserted in a slot 2.20. Unit 2.16 automatically feeds each card to predetermined positions for printing, and reading and recording of information on the magnetic stripe. A card is subsequently ejected by unit 2.16 under operator control, or when the program sequence in which it is involved is completed. Details of the card handling procedures by unit 2.16 are fully covered in the aforementioned application Ser. No. 248,117.

The ledger card unit 2.16 is responsive to the insertion of a magnetic ledger card to initially drive the card to a magnetic read-record station at which time under the control of the magnetic head scan mechanism 1.26, the magnetic head 1.16 is swept across the magnetic ledger stripe on the back of the card. Under the control of the read-record apparatus 1.34, the information previously recorded on the magnetic stripe of the card is transmitted along the four line cable 1.35 to Input/Output register 1.28. Three lines of cable 1.35 carry information bits to three triggers 4, 5, 6 in the Input/Output register 1.28 and one line of cable 1.35 carries the parity check bit which is applied to a parity check trigger that is associated with the Input/Output register.

The information that appears on the stripe of the magnetic ledger card, as shown in FIGS. 4a, and 4b, is placed into the magnetic ledger card section of memory 6–42 without any translation.

Alphanumeric characters read from Magnetic Ledger card 1.11 pass through an MLC Read-Record block 1.34, by cable 1.35 to the Input/Output register 1.28, and from there by cable 1.29 for entry into memory.

The numeric information stored in memory in the respective manners hereinabove described may be processed by the add-subtract unit 1.32 in predetermined manners as directed by the prewired control panel 1.23. Numeric information in any portion of numeric memory may be printed out on either the Primary printer 1.13 or on the Ledger printer 1.19. In the handling of the information, a sense amplifier 1.58 receives the information bits directly from the memory unit 1.36 and applies it to Storage trigger 1.30 along a cable 1.59.

During print out of alphanumeric information from the magnetic ledger card section of memory, information bits are passed through the sense amplifier 1.60, through the Storage trigger 1.30, and into the Input/Output register 1.28 along cable 1.29. Thereafter, the information is presented to the thyratron circuit 1.57 in parallel, and then to either the Primary printer 1.13 or the Ledger printer 1.19.

In addition to print out of numeric or alphanumeric information, the printers 1.13 and 1.19 are further under control of a Printer Function Translator unit 1.61, to perform other typewriter functions such as Tab, Carrier Return, Upshift or Downshift. Provision is made in this unit for taking into account the condition of the respective triggers of the Input/Output register to apply properly coded signals along a five line cable 1.62 to the thyratron circuit 1.57.

Controls for the entry, transfer, or reading, of numeric and alphanumeric information in memory include direct wiring from the control panel 1.23, the B Counter 1.41, and the C Counter 1.50. Direct word selection is accomplished under control of signals on lines 1.51 and 1.52 to the Word Drivers and Switches.

The B Counter may be set up by line 1.53 to control separation of numeric and alphanumeric information in MLC memory. The B Counter is also set up by line 1.54 to control a Numeric Type or Column Shift operation. The C Counter is set up by line 1.55 to select a particular variable length alphanumeric field in MLC memory.

The system of FIG. 1 has a number of related memory units for storage of information and for its manipulation during processing. These include two dimensional core memory facilities which comprise a binary numeric or Main memory (MM) 1.36, a Magnetic Ledger Card (MLC) memory 1.37 which accommodates both numeric and alphabetic information, and a Fixed Factor memory 1.38. Each core stores a bit of information as a "1" or a "0."

The Main memory 1.36 consists of a total of 40 words of 36 bits each. The words are designated as follows: 38 numeric binary words which store 10 decimal digits plus sign, 1 input Keyboard Buffer word (KB) of 10 decimal digits plus sign, and 1 Overflow register word (OR) of 10 decimal digits plus sign.

The magnetic ledger memory 1.37 consists of 40 word locations, each word comprising 36 bits. Words 1–32 in memory 1.37 may all be used for storing alphabetic and numeric coded decimal characters of 6 bits each that are derived from the alphanumeric keyboard 1.20 or the magnetic stripe 1.15 on ledger card 1.11.

The alphanumeric storage is not used for calculation purposes and is available only for entry and print out, or recording on the magnetic ledger card 1.11. The number of alphanumeric characters available is divided into nine variable length words LA1 to LA9 for addressing purposes. Any or all of the characters may be assigned to any LA word. The numeric information stored in 6 bit form in this memory is used for such things as street address, or similar items.

All or any portion of words 1 through 15 in memory 1.37 can be used for the storage of binary numeric information for use in arithmetic operations, in which case, these words are not available for storage of alphanumeric information. It is possible to address these words and use them in arithmetic operations. Information contained in Main Memory can be modified by the MLC Memory data or the MLC Memory information can be modified by information stored in Main memory. Depending on the number of binary words 1–15 that are programmed in the MLC memory, a minimum of 17 words and a maximum of 32 words are available for storage of alphanumeric information.

Words 33–40 of Magnetic Ledger memory 1.37 are reserved for special alphabetic (SA) information of 48 alphanumeric characters which may be divided into four variable length fields SA1–SA4. These memory locations are generally used for information of a semi-permanent nature. These character positions can be entered into from the alphanumeric keyboard 1.20 and printed out as required. They usually remain unchanged throughout an entire accounting project.

The 36 bits of each binary word in memory include a Dummy Digit (DD bit), Sign bit (SB bit), and thirty-four bits of information. The 36 bits of each alphanumeric word include six alphanumeric characters of six bits each.

Each variable lengthfield in LA or SA memory is defined by a field mark character. The field mark is also coded in 6 bit form. Since the fields are clearly defined, it is possible to address each field individually.

The Primary printer with its associated alphanumeric keyboard and the Ledger printer all operate in a six bit code which is identical to the six bit code used in the alphanumeric words of memory 1.37. Therefore, no translation between the memory and these devices is necessary.

Memory 1.38 comprises a group of cores which store fixed factors. A set of ten drive lines is provided, each of which selectively couples particular ones of the cores in the fixed factor memory. With a 1 bit stored in each core, fixed factor numbers can be read out on the respective lines. These are represented by the expression $5 \times 10^n$, wherein "$n$" may be an integral value from $-1$ to $+8$.

Figure 8:
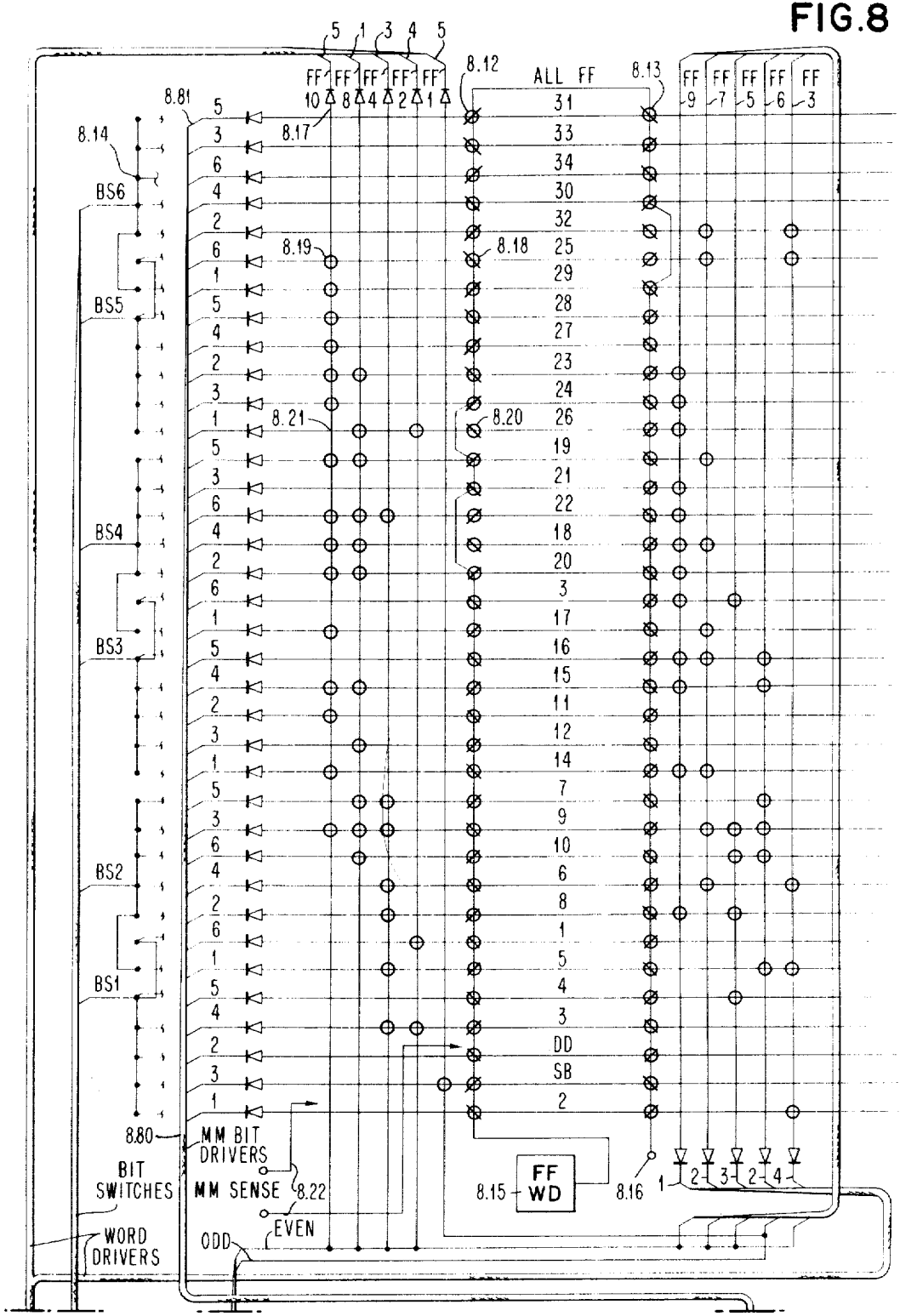
Figure 9:
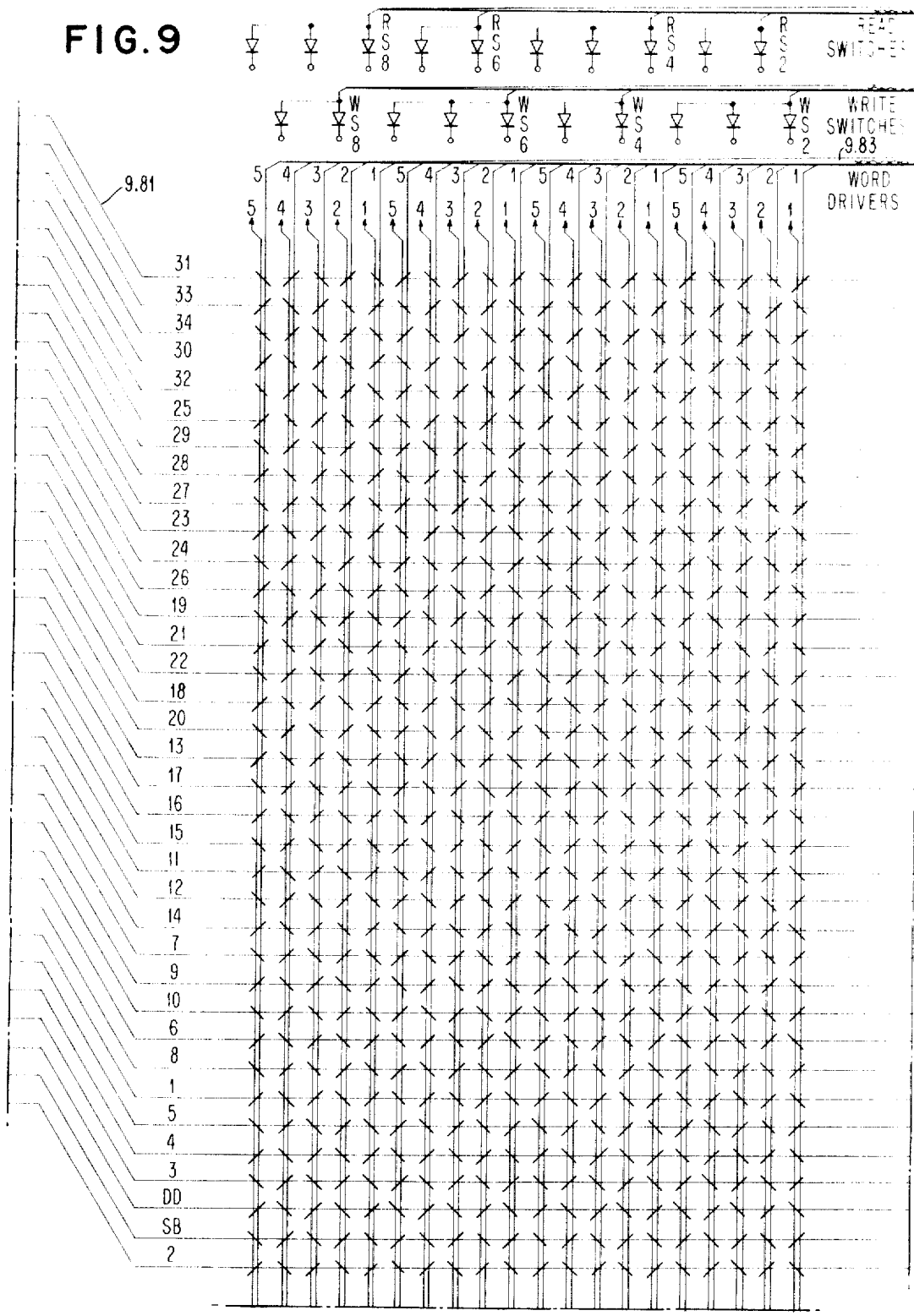
Figure 10:
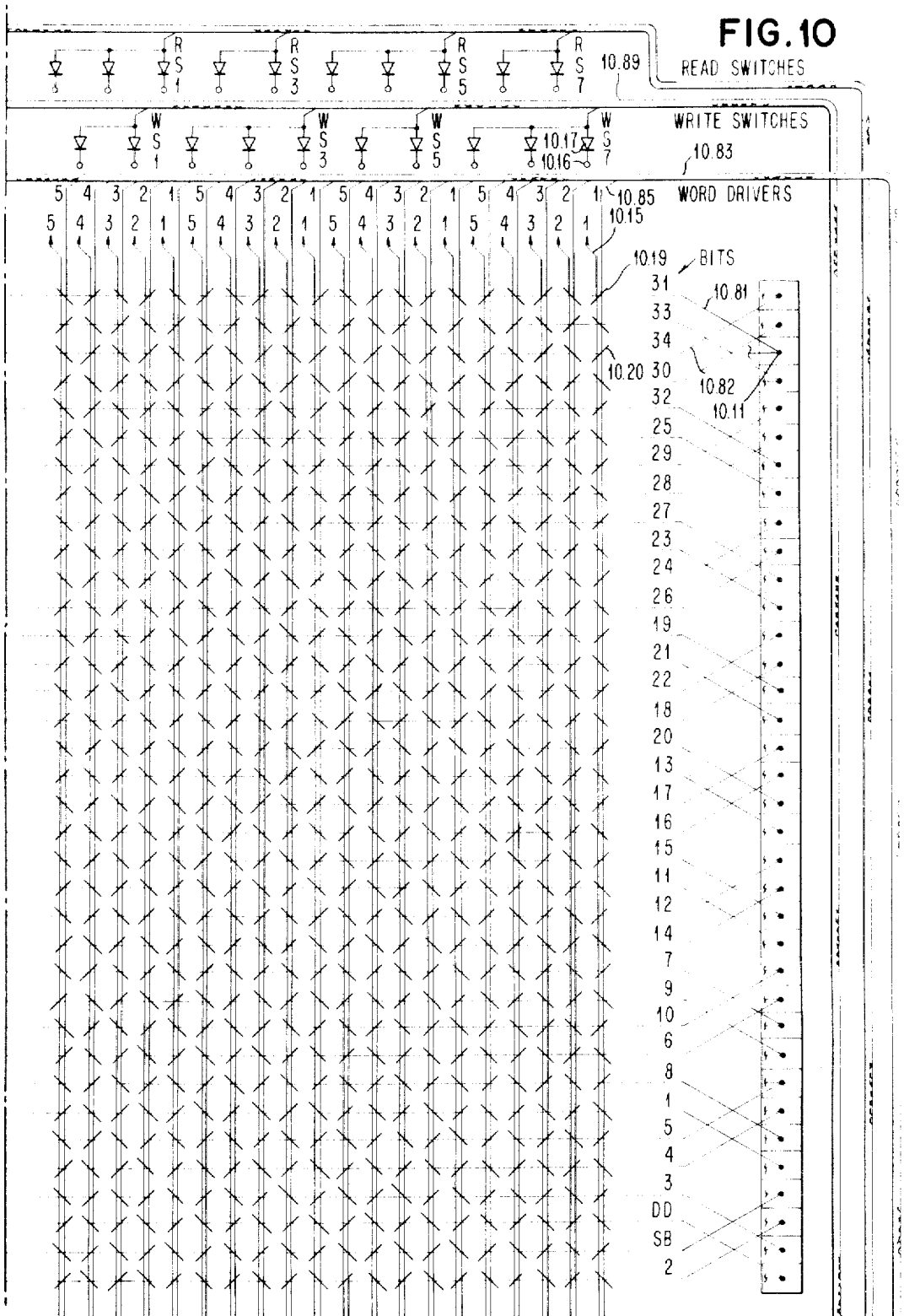

The detailed layout of the machine memory is indicated in FIGS. 8–13. These figures should be arranged as shown in FIG. 14 which generally conforms to the arrangement of FIG. 1. Fixed factor memory 1.38 is shown in FIG. 8. Twenty words of Main memory 1.36 are shown in FIG. 9. The other twenty words of Main memory are shown in FIG. 10. Twenty words of MLC memory 1.37 are shown in FIG. 12 and the other twenty words of MLC memory 1.37 are shown in FIG. 13.

Figure 11:
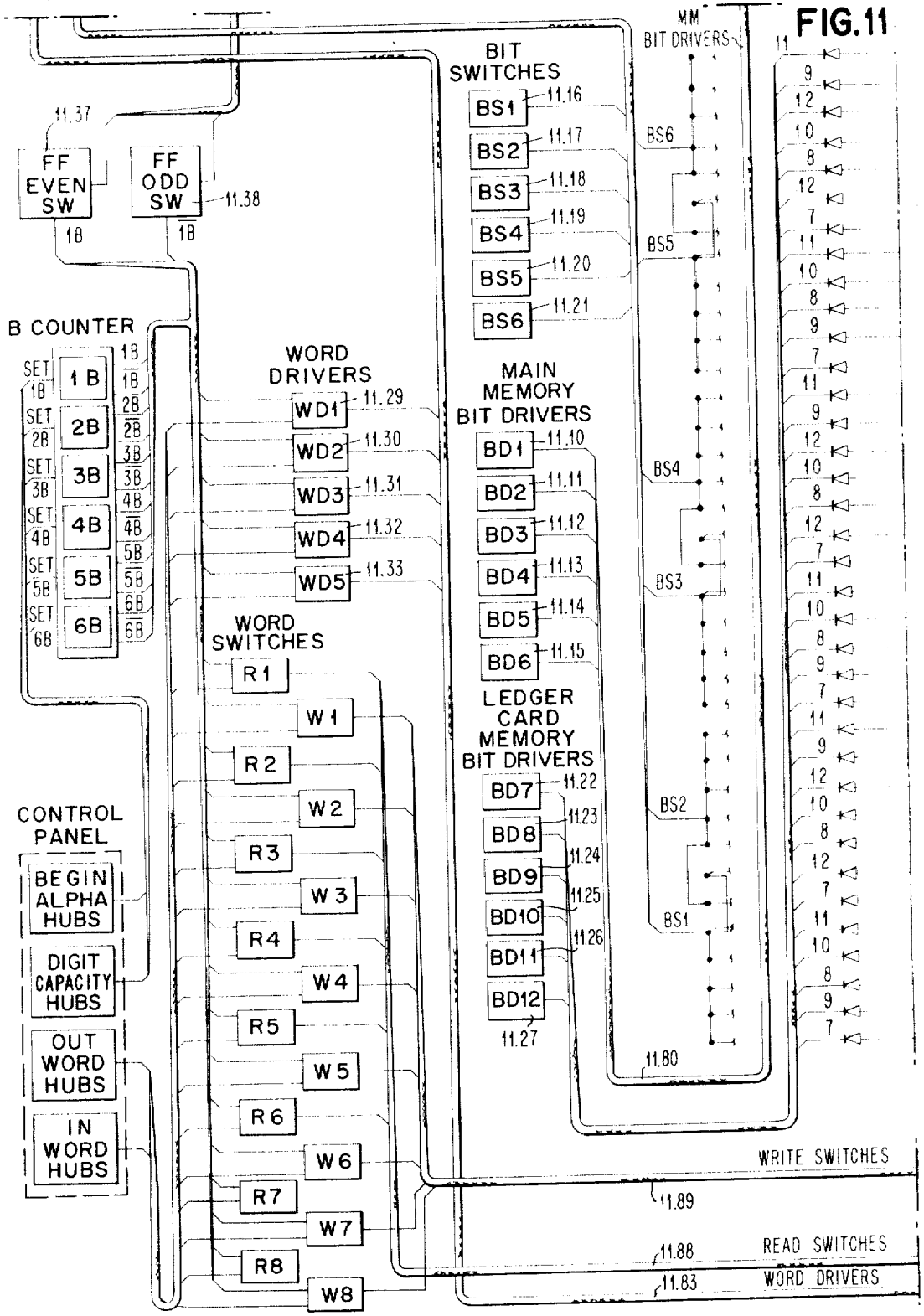

Selection circuitry including word drivers and switches 1.39 and bit drivers and switches 1.40, plus a B Counter 1.41, and a few diagrammatically indicated control panel hubs are shown in FIG. 11.

Principles of operation of the memory will be discusesd by reference to the following figures: FIG. 15, Digit Selection; FIG. 16, Word Selection; and FIG. 17, Timing Chart.

Information is handled serial by word, serial by bit, with coincident-current being used for both reading and writing. Because only one bit in memory is being worked with at any time, inhibit circuitry is not required.

FIG. 15 shows the driver-switch arrangement for bit selection. Six drivers and six switches, in connection with 36 diodes, permit selection of 36 bits for both reading and writing. Only two switches, 15.10 and 15.11, are shown in FIG. 15. The six bit drivers 15.12–15.17 are addressed by an ABC ring, which is shown at 1.42; FIG. 1, and which, with a D trigger 1.43 supplies six bit gating outputs. The six switches are controlled by an A Counter 1.44 which steps once every six bit times. Each bit drive line, such as line 15.18, has a first section 15.19 that is directed through a first bit row. Each bit drive line loops back into a second section, such as 15.20, that is directed through a different bit row, and connected to a switch, such as 15.10.

The bit selection principles of FIG. 15 can be related to the detailed wiring of FIGS. 8–13 by actually tracing a typical bit selection path.

In FIG. 11, six drivers 11.10–11.15 cooperate with six switches 11.16–11.21 to provide the thirty-six bit driving combinations for the ten words of the Fixed Factor memory of FIG. 8 and forty words of Main memory in FIGS. 9 and 10.

Six additional drivers 11.22–11.27 cooperate with the same set of switches 11.16–11.21 to provide the thirty-six bit driving combinations for the forty words of the MLC memory in FIGS. 12 and 13.

As an example, Bit Driver 11.14 is connected through cables 11.80 and 8.80 to six bit drive lines, such as line 8.81, all of which have the designations "5". Line 8.81 passes through two core locations 8.12 and 8.13 in Fixed Factor memory, continues in FIG. 9 as line 9.81 through twenty core locations of Main memory and in FIG. 10 as line 10.81 through another twenty core locations of Main memory. The line 10.81 appears to terminate at a terminal 10.11. However, it will be understood by those familiar with core wiring diagrams having the loop back feature that the line 10.81 continues from right to left in FIG. 10 through the same row of cores designated "34" as another drive line 10.82 and in parallel with line 10.82.

The drive line 10.81 then continues back through the rows of cores designated "34" in FIGS. 8 and 9 and is connected at a terminal point 8.14. Terminal 8.14 belongs to a group of similar terminals all connected to a line marked "BS6." This stands for Bit Switch 6. Driver 11.14 is connected in this manner through the path indicated to Bit Switch 6, which is designated 11.21 in FIG. 11 and is connected in a similar manner to the other five bit switches 11.16–11.20. The other drivers 11.10–11.13 and 11.15 are similarly connected to the six bit switches 11.16–11.21, thus providing the required thirty-six half-select combinations with the loop back permitting both reading and writing under proper conditions of gating.

Referring to FIG. 16, individual words or columns of the memory are selected by appropriate control of drivers and read and write switches. The column current must flow in one direction at read time and in the opposite direction at write time. One driver may be used at both read and write times if two switches are used. That is, one driver will supply current to two wires in the column with a read switch on one wire and a write switch on the other. These two windings are arranged physically in such a way that current will flow in opposite directions through the cores at read and write time. A matrix arrangement with diodes is used for the selection function. For the twenty words of memory indicated in FIG. 16, this is a five by four matrix involving five drivers, 16.10–16.14, and four pairs of read-write switches, 16.15–16.22. A particular driver such as driver 16.10, and a particular read-write switch pair, such as pair 16.15–16.19 is selected by direct control panel wiring, or under control of the B Counter 1.41.

The principles of word selection can be applied to FIGS. 8–13, as with bit selection. Five word drivers 11.29–11.33 cooperate with eight read switch-write switch combinations (R1–W1 through R8–W8) in FIG. 11 to provide for selecting forty words of memory. By wiring the forty words of Main memory in FIGS. 9 and 10 in series with the corresponding forty words of MLC memory in FIGS. 12 and 13, eighty words of memory can be half-selected for reading and writing.

For example, Word Driver 11.29 (Word Driver 1) is connected by cables 11.83, 12.83, 13.83, 10.83 and 9.83 to drive eight vertical lines designated "1" in FIGS. 9 and 10, such as line 10.85. This driver is also connected to eight similar vertical lines in FIGS. 12 and 13 which are also designated "1," such as line 13.86. Line 13.86 is continued at 13.86' but is shown broken for reasons of clarity.

The line 10.85 passes downward through a single column of thirty-six cores in FIG. 10 and a similar serially connected column of thirty-six cores in FIG. 11 finally being connected through a diode 13.13, to a cable 13.88. The diode 13.13 belongs to a group of diodes generally designated "RS7" which indicates that they are all connected by cables 13.88, 12.88 and 11.88 to Read Switch R7 in FIG. 11.

Line 13.86 passes upward in a similar manner through thirty-six cores of MLC memory and thirty-six cores of Main memory. Line 13.86 is shown terminated by an arrowhead at 10.15 but actually connects to a terminal 10.16 and diode 10.17. Diode 10.17 belongs to a group of diodes designated "WS7" which are connected through cables 10.89, 13.89, 12.89 and 11.89 to Write Switch W7 in FIG. 11.

As an example, core 10.19 is read by a half select from the Bit Driver 11.14 (BD5)-Bit Switch 11.21 (BS6) combination when Word Driver 11.29 (WD1) and Read Switch 7 (R7), FIG. 11, are activated. Core 10.19 is written into by a half select from the Bit Driver 11.15 (BD6)-and Bit Switch 11.21 (BS6) combination when Word Driver 11.29 (WD1) and Write Switch (W7) FIG. 11, are activated.

Because of the loopback arrangement, a different core 10.20 is read and written into by the same drivers and switches but with opposite gating. Core 10.20 is read by a half select from the Bit Driver 11.15 (BD6) and Bit Switch 11.21 (BS6) combination when Word Driver 11.29 (WD1) and Read Switch 7 (R7) FIG. 11, are activated. Similarly, core 10.20 is written into by a half select from Bit Driver 11.14 (BD5) and Bit switch 11.21 (BS6) combination when the Word Driver 11.29 (WD1) and Write Switch 7 (W7), FIG. 11, are activated.

Similar selection principles apply to the other core locations in Main memory and MLC memory.

The five Word Drivers 11.29–11.33 cooperate with a Fixed Factor Even Switch 11.37 and a Fixed Factor Odd Switch 11.38 to form a 5×2 arrangement for selecting the ten words of Fixed Factor memory under certain conditions to be described in detail later. Selection of individual bits in the Fixed Factor memory for reading occurs as for Main memory bit selection with the Bit Drivers 11.10–11.15 and Bit Switches 11.16–11.21 being involved.

However, since Fixed Factor memory is permanent by nature, all core locations are written back into each and every cycle by a common Fixed Factor Write Driver 8.15 which is connected to a suitable source of potential at terminal 8.16. Two physical words of 36 cores each are provided in the Fixed Factor memory, FIG. 8. Five fixed factors are set up by wiring their drive lines in a selective predetermined manner through a first word which includes the previously noted core 8.12 and all cores directly below it. The physical core locations are represented by circles that are distinguished by a slant mark (/) diagonally through them, as for core 8.12.

Five other fixed factors are set up by selectively wiring a second physical word which includes core 8.13 and which comprises all cores directly below it in FIG. 8.

A circle without the slant mark indicates that a vertical fixed factor word drive line is wound through the closest physical core on the same horizontal bit line. For example, fixed factor 10 line 8.17 is wired through physical core 8.18 as indicated at 8.19 and is also wired through other selected cores, but is not wired through physical core 8.20 and selected cores as indicated by the absence of a circle at intersection 8.21.

FIG. 17 shows typical timing conditions, including bit driver and switch sequencing. A crystal controlled oscillator 1.45, FIG. 1 (50.10, FIG. 50), which operates, for example, at 100 kilocycles, (kc.) provides the basic timing for the machine. The oscillator output pulses shown at 17.10 are applied to a sample pulse driver (DSP) 50.11 which delivers the pulses 17.11 to drive the clock circuits.

The initial timing pulses developed by the clock are the 01/02 pulses 17.12 and 17.13, the Read/Write pulses 17.14 and 17.15, and the Read Delay pulses 17.16. An 01/02 trigger 1.46 (50.12 in FIG. 50) functions in a binary fashion to divide the oscillator frequency in half. However, the circuit output is modified by the action of a Read Delay trigger 1.47 (50.13) to produce the pulses 17.16 shown in the timing diagram of FIG. 17. One cycle of the 01/02 pulses requires four oscillator periods while the next cycle requires only two oscillator periods. In time, this would be 40 microseconds and 20 microseconds, respectively. The frequency of the 01/02 circuit is halved again by a Read/Write trigger 1.48 (50.14). The Trigger 1.48 is in the Read state during the longer period of 01/02 and in the Write state during the shorter period. The outputs of Read/Write trigger 1.48 and 01/02 trigger 1.46 are used to drive an X/Y trigger 1.49.

In the machine, two words are selected concurrently, with the bits in each word being worked with in a sequential, but alternate manner. One word is referred to as the X word (Out word), and the other word is referred to as the Y word (In word). The Read/Write trigger 1.48 is used to drive the memory selection circuits in order to read information from a core and to write information into a core. Since it is necessary to define the particular word being addressed, the outputs of the X/Y trigger 1.49 are also used to drive the word selection circuits. During X time, as at 17.17, a read-write operation is performed on a single core in one programmed word, and during Y time, as at 17.18, a read-write operation is performed on the corresponding core of another programmed word.

It is still necessary to define each of the 36 bits which make up a word of storage. As shown above, X/Y time defines one bit in each of two words. Additional logic is required to sequentially address the 36 bits making up each word.

This is accomplished through the use of 10 triggers and a switching matrix. The three trigger ABC ring 1.42 is stepped at the beginning of each X time. Therefore, 3 bit times, as at 17.19, 17.20 and 17.21, are defined by the ABC ring. An additional trigger, D, 1.43 (52.10) operates in phase with read-write for one ABC cycle and 180 degrees out of phase with read-write for the following cycle. This is done by omitting one advance pulse to the D trigger as at 17.22 at the end of each ABC time. In this way, the ABC ring, in conjunction with the D trigger, defines 6 bit times.

The A Counter 1.44, is another 6 trigger ring, 1A–6A, which completes the logic required to define the 36 bits of a word. The A Counter is shown in detail in FIG. 53. This 6 trigger ring is advanced at the end of two cycles of the ABC ring. Therefore, 1 trigger in the 1A–6A ring remains on for 6 bit times. Since there are 6 triggers in the ring, all 36 bits are now defined.

The bit drivers and switches of FIG. 15 are sequenced as shown in FIG. 17 to provide a pattern for bit selection for each X and each Y word as shown in the following table:

| Bit Driver 1 | Selected at Read | 1 Bit Time | Switch #1 Closed (as shown at 17.23). |
|---|---|---|---|
| Bit Driver 2 | Selected at Write | 1 Bit Time | Switch #1 Closed. |
| Bit Driver 3 | Selected at Read | 2 Bit Time | Switch #1 Closed. |
| Bit Driver 4 | Selected at Write | 2 Bit Time | Switch #1 Closed. |
| Bit Driver 5 | Selected at Read | 3 Bit Time | Switch #1 Closed. |
| Bit Driver 6 | Selected at Write | 3 Bit Time | Switch #1 Closed. |

The sequence in which the drivers are selected for the next three bit times is as follows:

| Bit Driver 2 | Selected at Read | 4 Bit Time | Switch #1 Closed. |
|---|---|---|---|
| Bit Driver 1 | Selected at Write | 4 Bit Time | Switch #1 Closed. |
| Bit Driver 4 | Selected at Read | 5 Bit Time | Switch #1 Closed. |
| Bit Driver 3 | Selected at Write | 5 Bit Time | Switch #1 Closed. |
| Bit Driver 6 | Selected at Read | 6 Bit Time | Switch #1 Closed. |
| Bit Driver 5 | Selected at Write | 6 Bit Time | Switch #1 Closed. |

The drivers are selected in the same sequence as above for the next six bits, bits seven (7) through (12), with switch #2 closed, beginning at 17.24. This sequence is followed throughout for the remainder of the thirty-six bits. An operation involving 36 X/Y times is considered one cycle of operation.

Running of the clock circuits is initiated under control of a Start trigger 48.10, FIG. 48. The clock normally stops at the end of Dummy Digit time as indicated at 17.25, FIG. 17. This is after the last oscillator sample pulse in Dummy Digit time. When the clock is restarted it begins at the beginning of the Sign Bit interval at 17.26. In any operation, except an alphanumeric operation, the clock returns to this point and stops. In an alphanumeric operation, the clock starts in the first cycle at 17.26 but in subsequent cycles, except the last, will stop at the beginning of the Dummy Digit interval as indicated at 17.27. Alphanumeric operations include Alphanumeric Entry, Alphanumeric Print, Read ledger, and Record ledger.

CONTROL PANEL

The control panel hubs, FIG. 6, are arranged in nine general categories which are as follows: (1) Format Control, (2) Program Step Control, (3) Operational Exits, (4) Operational Entries, (5) Primary Printer and Ledger Printer controls, (6) Control Key exits, (7) Selectors, (8) Magnetic Ledger Control, (9) Digit Analyzer. Every type of hub used in the machine is shown in FIG. 6, but in order to avoid repetition, only a few representative hubs of some types are shown.

The format control hubs are shown within the rectangular area 6.11 and provide a means of starting a particular program routine based on the vertical position of the output document and the horizontal position of the type head carrier in the Primary printer. This is accomplished by using the coordinate positions of the vertical and horizontal program tapes. The reading and control circuits for these tapes are shown in FIGS. 120–123.

There are seven (7) dual Vertical Position hubs labeled A through G, such as hub 6.12, which are receptive to 48 volts pulses for initiating a carrier return and form search for the programmed positions. Once a Vertical Position Entry hub is pulsed, the vertical format tape 5.12 and documents 5.10 will be advanced until a vertical sense wheel corresponding to the desired programmed entry hub channel falls into a hole in the tape. The sense mechanism will then indicate to the system that the proper vertical position has been reached and movement of the tape and document ceases.

After the vertical position sought is reached, an exit hub, such as hub 6.13, emits a pulse. There are seven Vertical Position Exit hubs, one corresponding to each vertical position.

Figure 119:
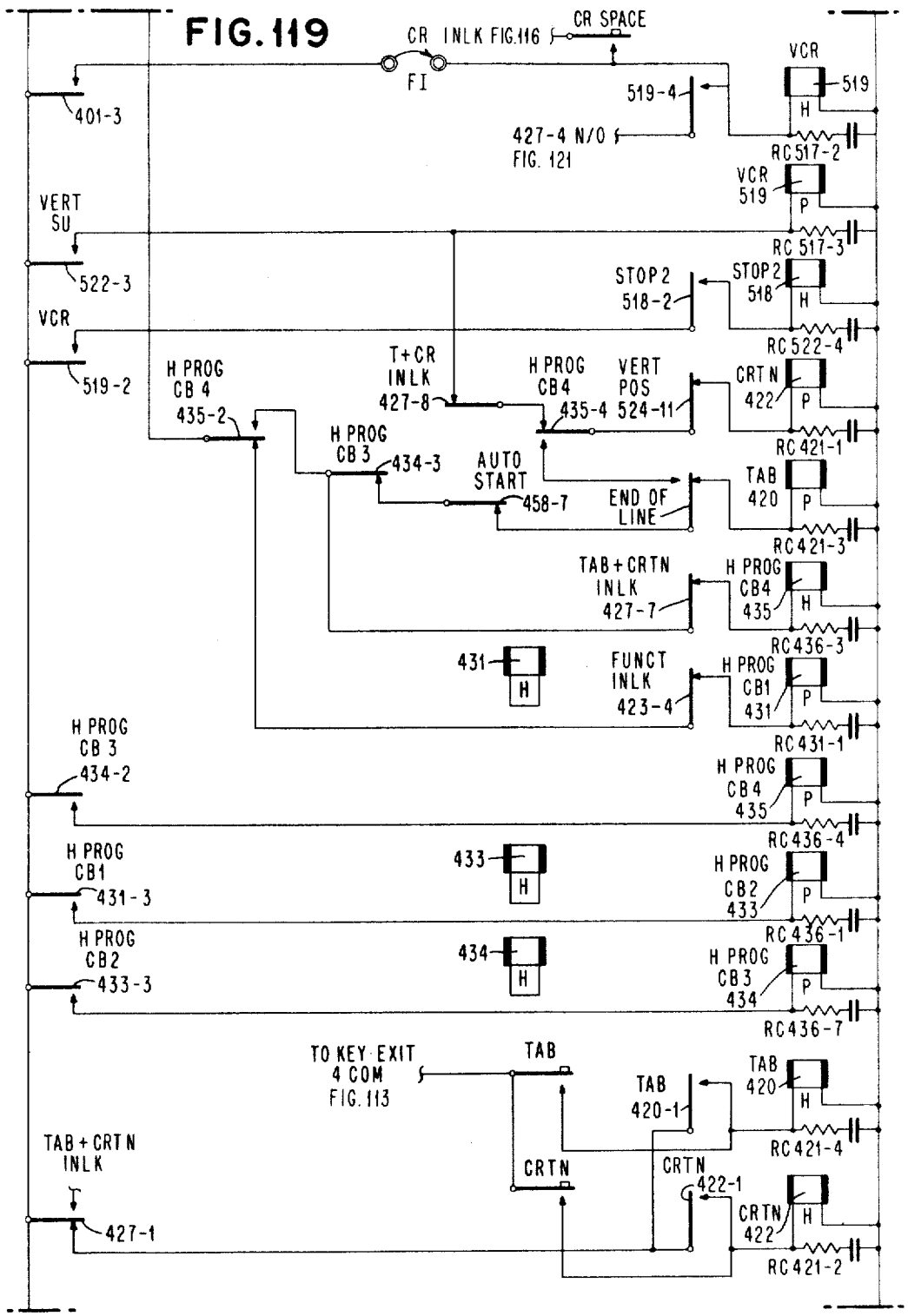
Figure 120:
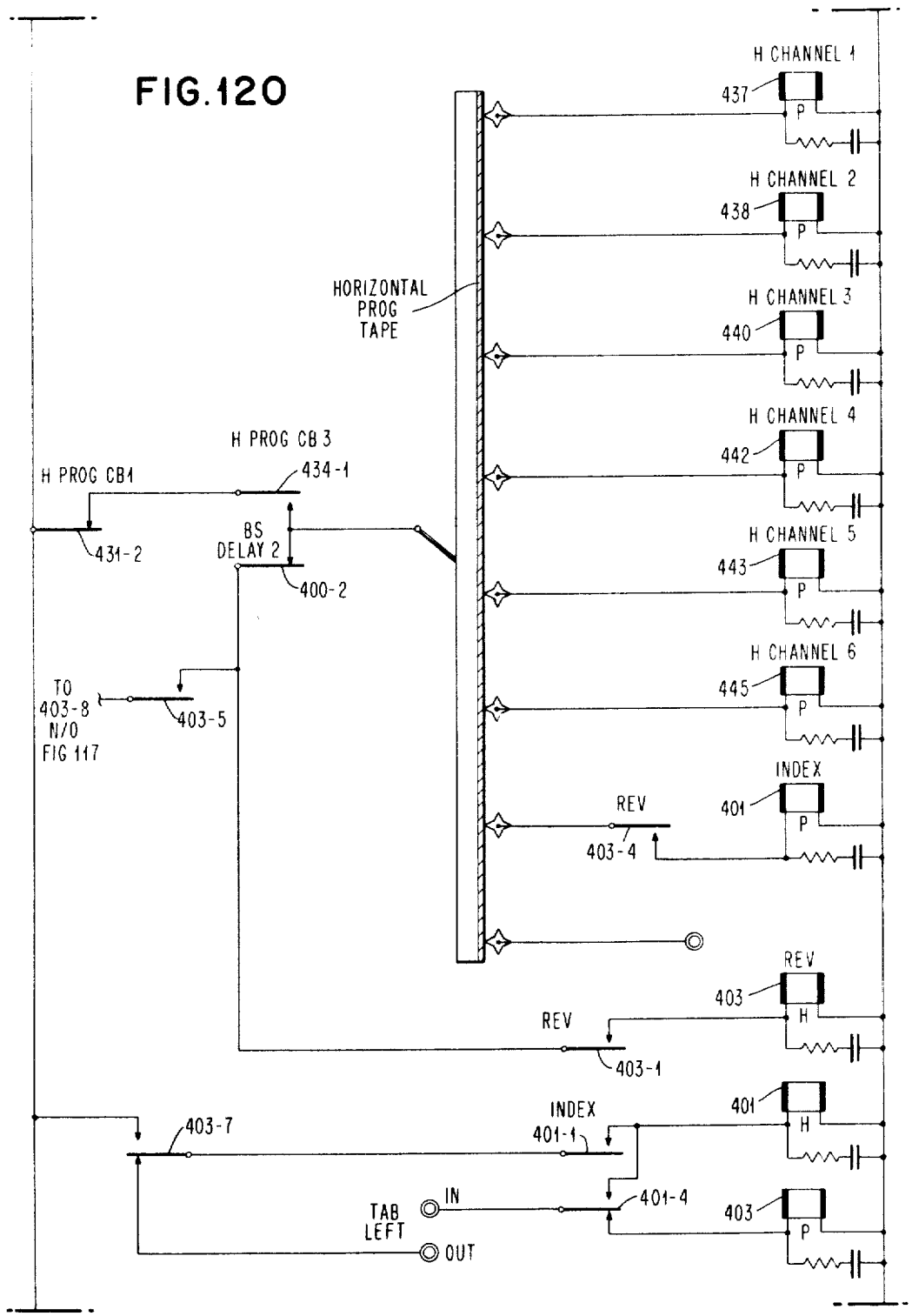
Figure 121:
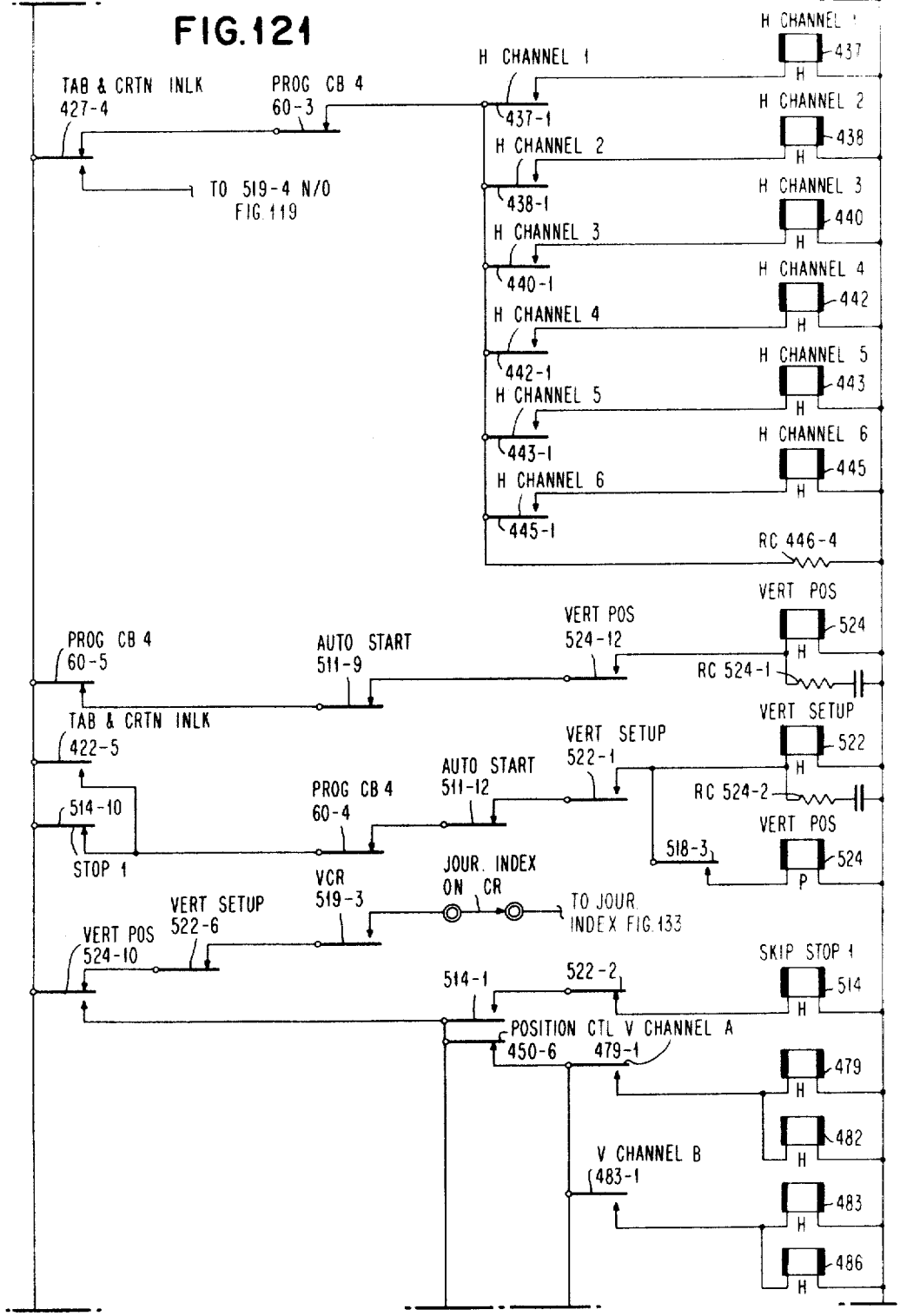
Figure 122:
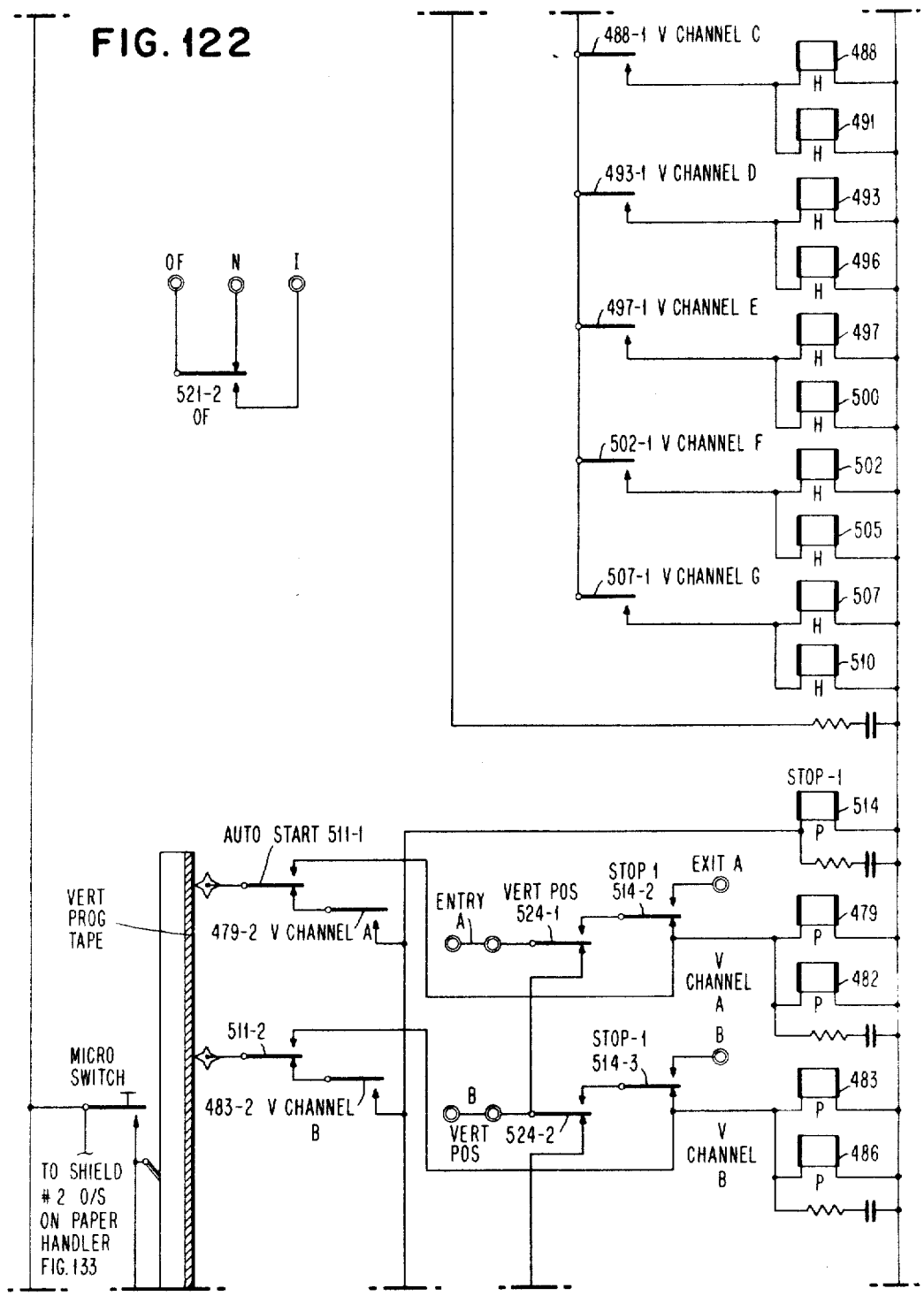
Figure 123:
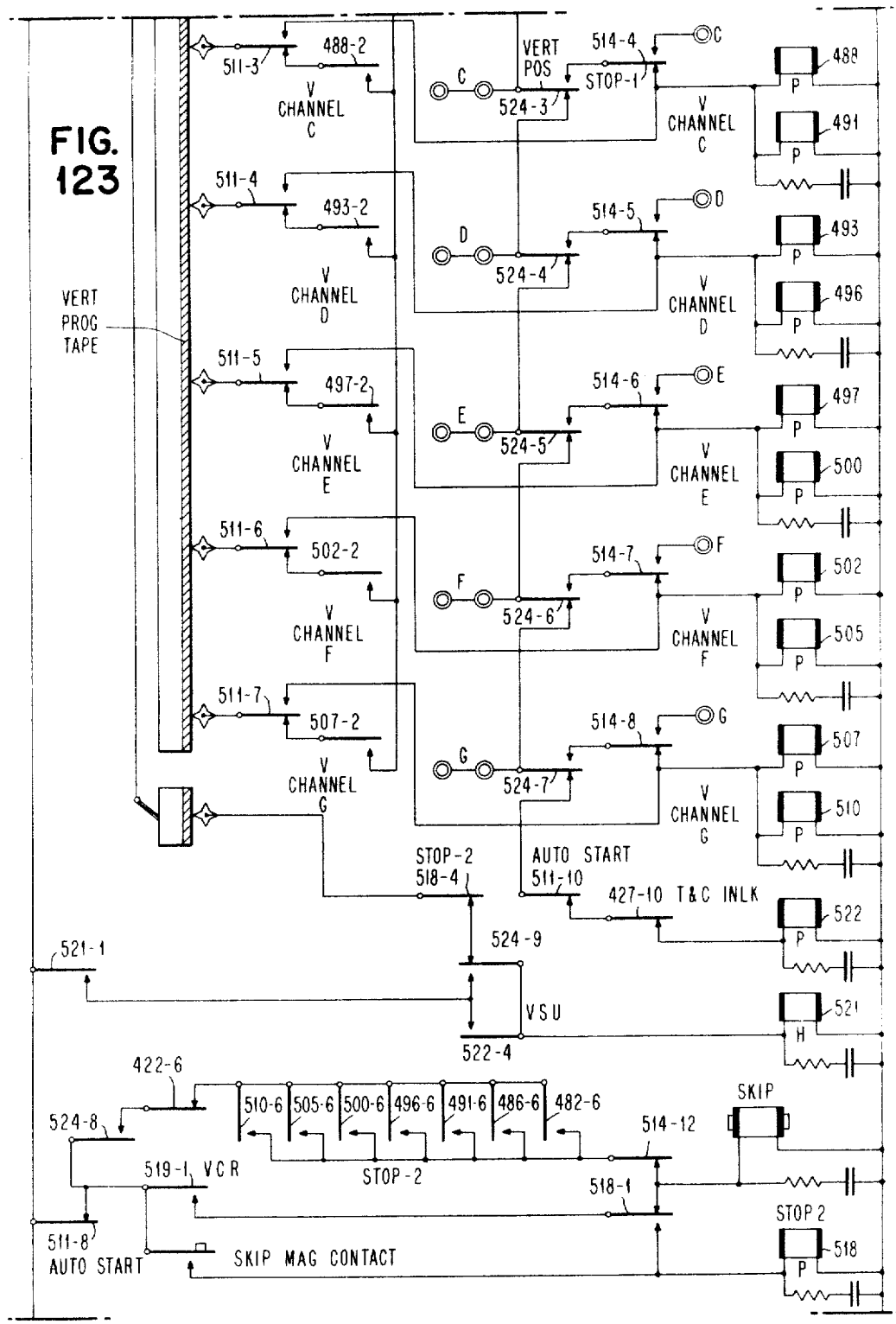
Figure 124:
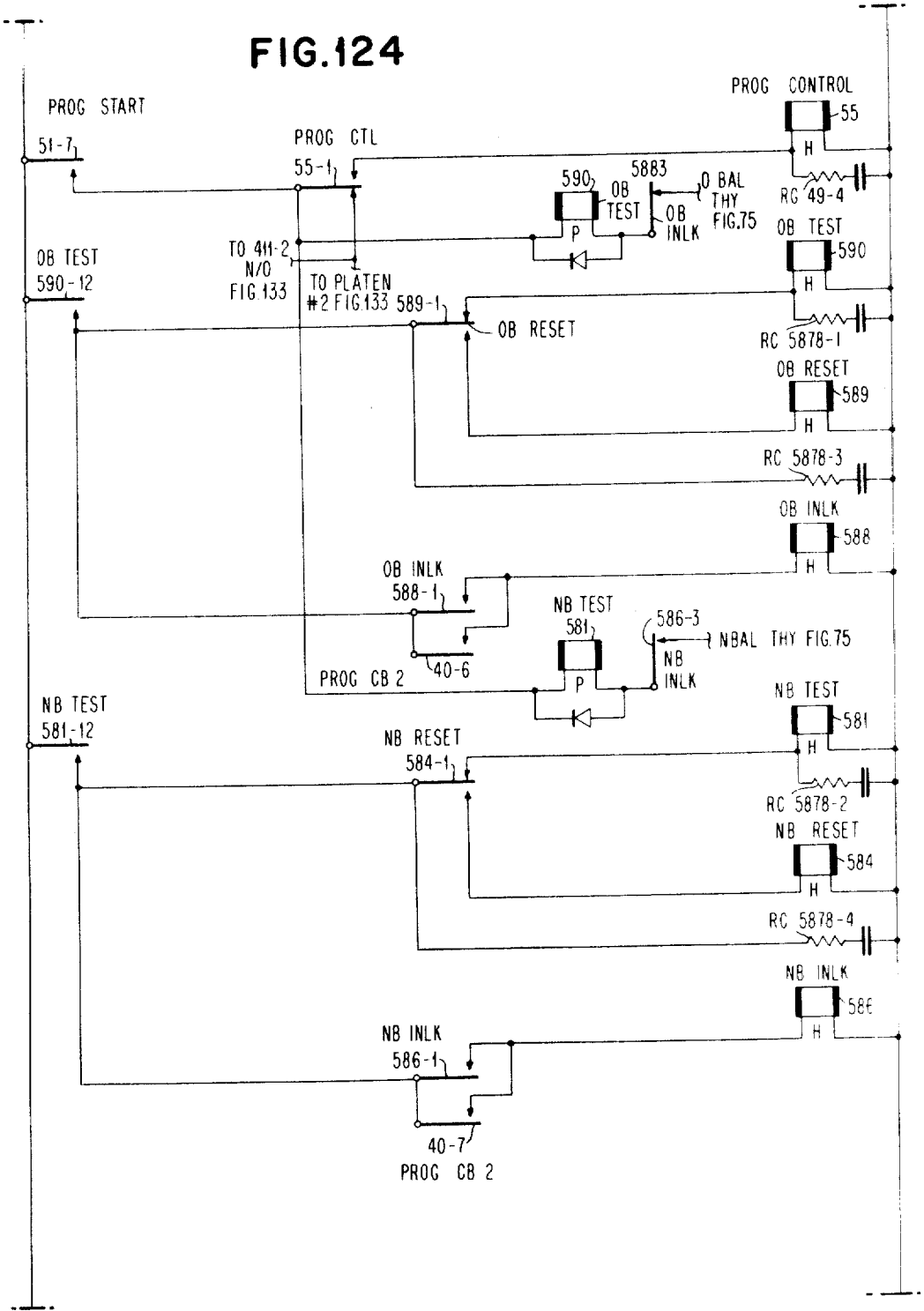

A set of fifteen (15) Horizontal Position Entry hubs such as hub 6.14, are provided. These hubs are receptive to 48 volt signals to cause the carrier of the Primary printer to initiate a search for a printing position or field which corresponds horizontally to the hub position impulsed. When a Horizontal Position Entry hub is impulsed, the horizontal position unit 1.65 will first check the position of the carrier for typehead 1.14. If the carrier is in a position corresponding to the hub impulsed, a horizontal search operation will not be initiated. However, if the carrier is not in this position, the carrier will tab to each following tab stop, checking each position until the proper horizontal position is reached. Various relays involved are shown in FIG. 119. If the carrier tabs to the right margin without locating the sought horizontal position, an automatic carrier return is initiated and the tab search operation will continue from the left margin. It is necessary to code the horizontal program tape 5.11 with apertures corresponding to the horizontal positions required and to set a tab stop at each field that will be used for program control. When a sought horizontal position is reached, the search operation is complete and a corresponding Horizontal Position Exit hub, such as hub 6.15, will emit an impulse.

A group of one hundred and five (105) (7×15) hubs such as those shown at 6.16 are provided and these are receptive to electrical impulses for selecting a program routine based on both the vertical position of the form and the horizontal position of the printing element. A Coordinate Exit hub exists for each coordinate position of the vertical and horizontal program tapes. There are 7 vertical positions and 15 horizontal positions which makes it possible to select 105 (7×15) different program routines based on the coordinate position of the primary document.

Figure 118:
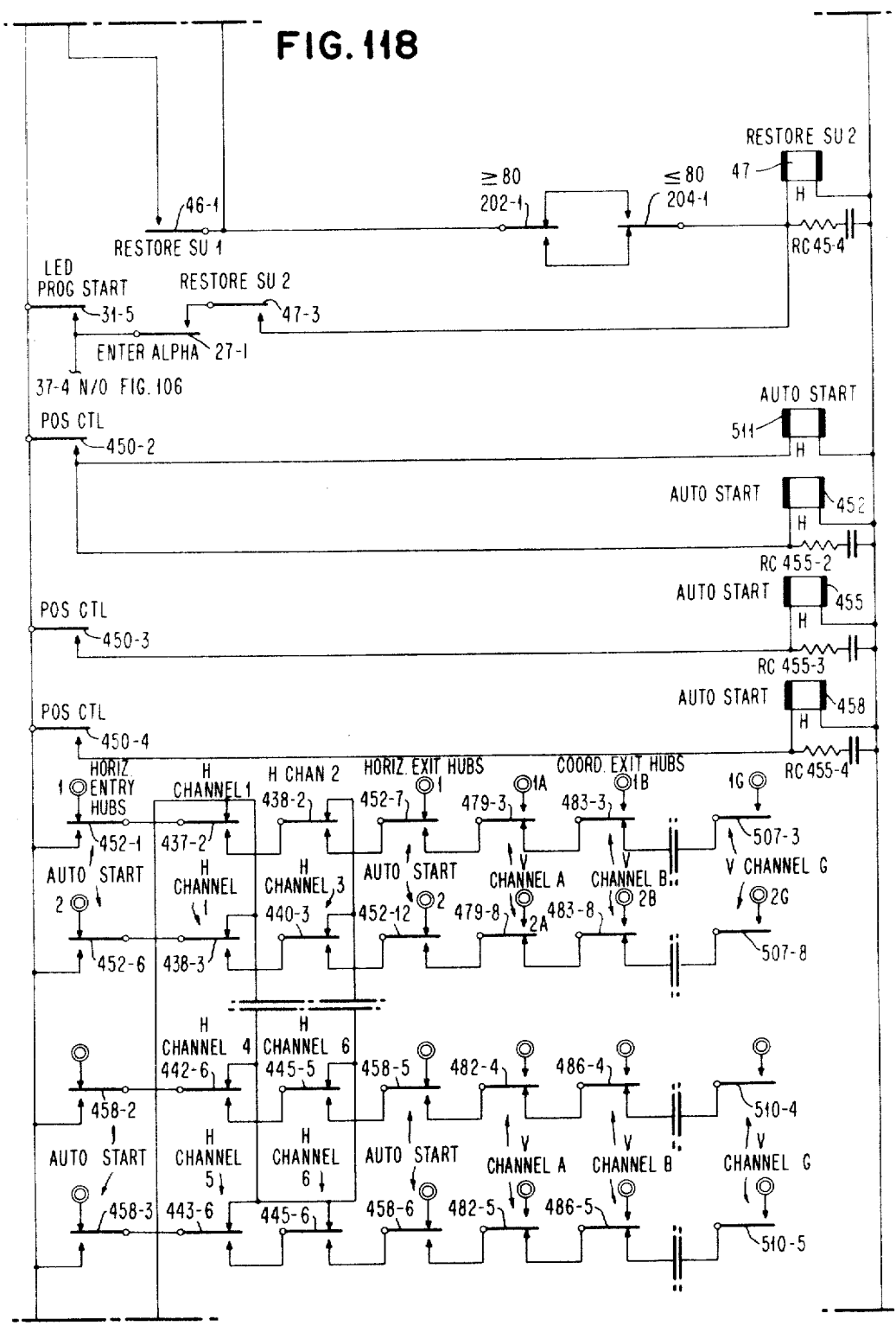

A Coordinate Exit hub 6.16 will emit an electrical impulse when Program Start bar 7.17 is depressed or when an Auto Start hub, such as hub 6.17, is impulsed. Hubs like 6.15, 6.16, and 6.17 are also shown in FIG. 118.

There are eighteen (18) Auto Start hubs, such as hub 6.17, which are electrically joined to one another. These hubs are responsive to electrical impulses to automatically start a program routine of the machine without the need of depressing the Program Start bar 7.17. The Auto Start hubs and the Program Start bar perform the same function. When an Auto Start hub is impulsed, the machine will sample the vertical and horizontal position and emit a pulse from the Coordinate Exit hub corresponding to vertical position of the form and the horizontal position of the carrier.

A set of three hubs at 6.18 is provided for indicating an overflow condition of the output document. In FIG. 5 at the bottom of the primary field of the output document 5.10, a punched hole 5.13 exists in the vertical tape, 5.12 in the corresponding position. When this punched hole is sensed by the Vertical Tape unit 1.64, a relay is energized and impulses are available from the set of hubs 6.18 for indicating an overflow condition.

Figure 111:
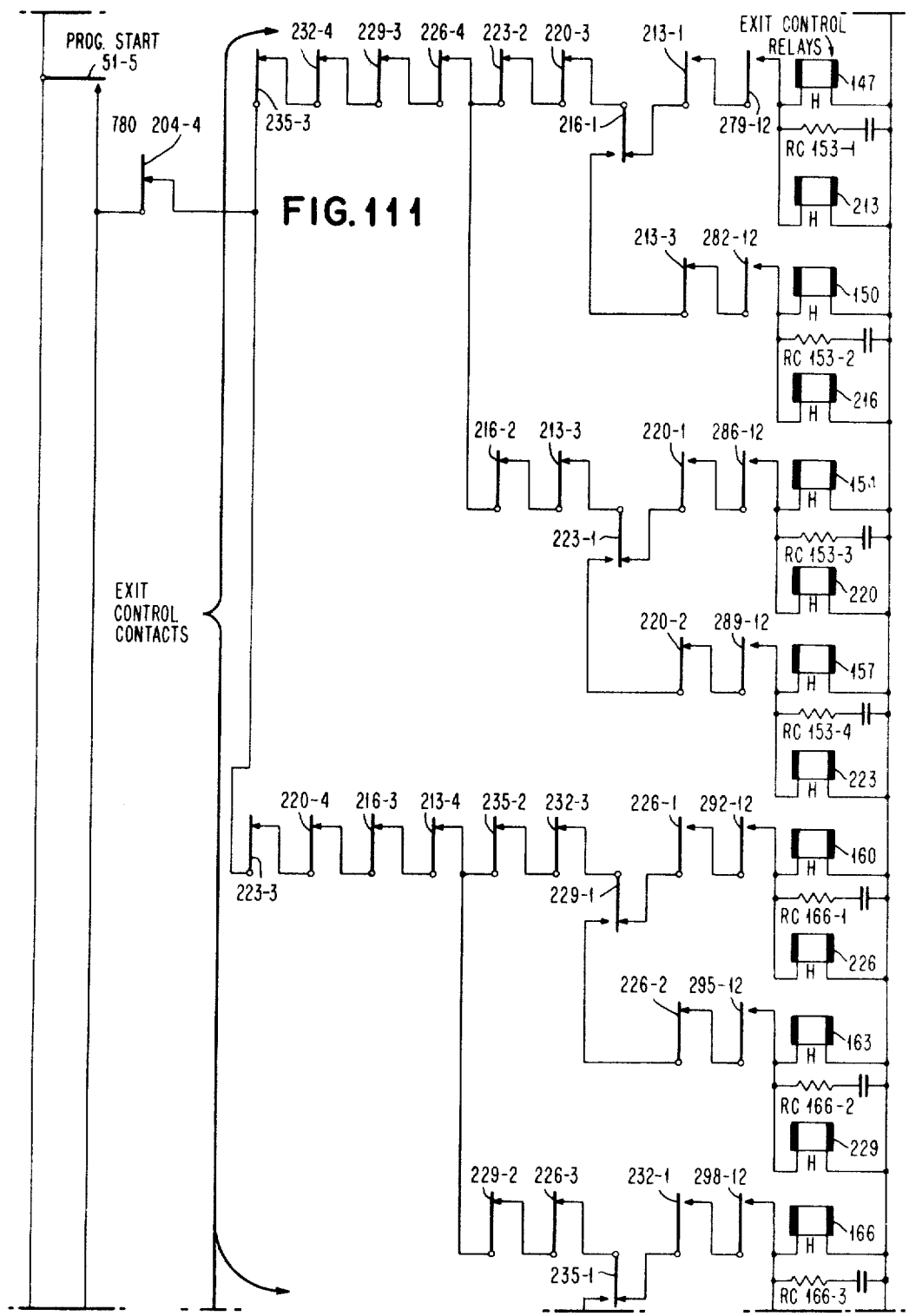
Figure 112:
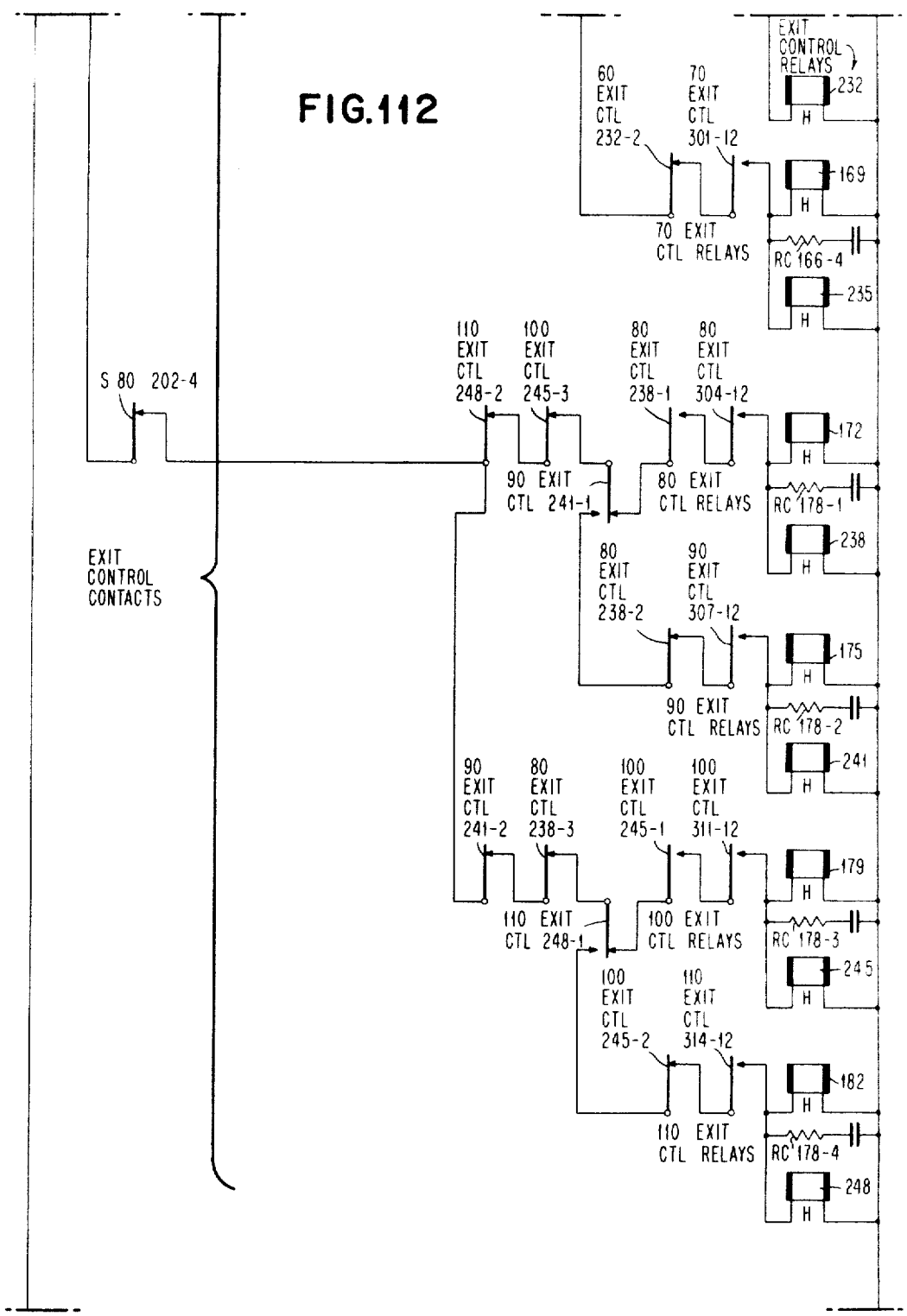
Figure 113:
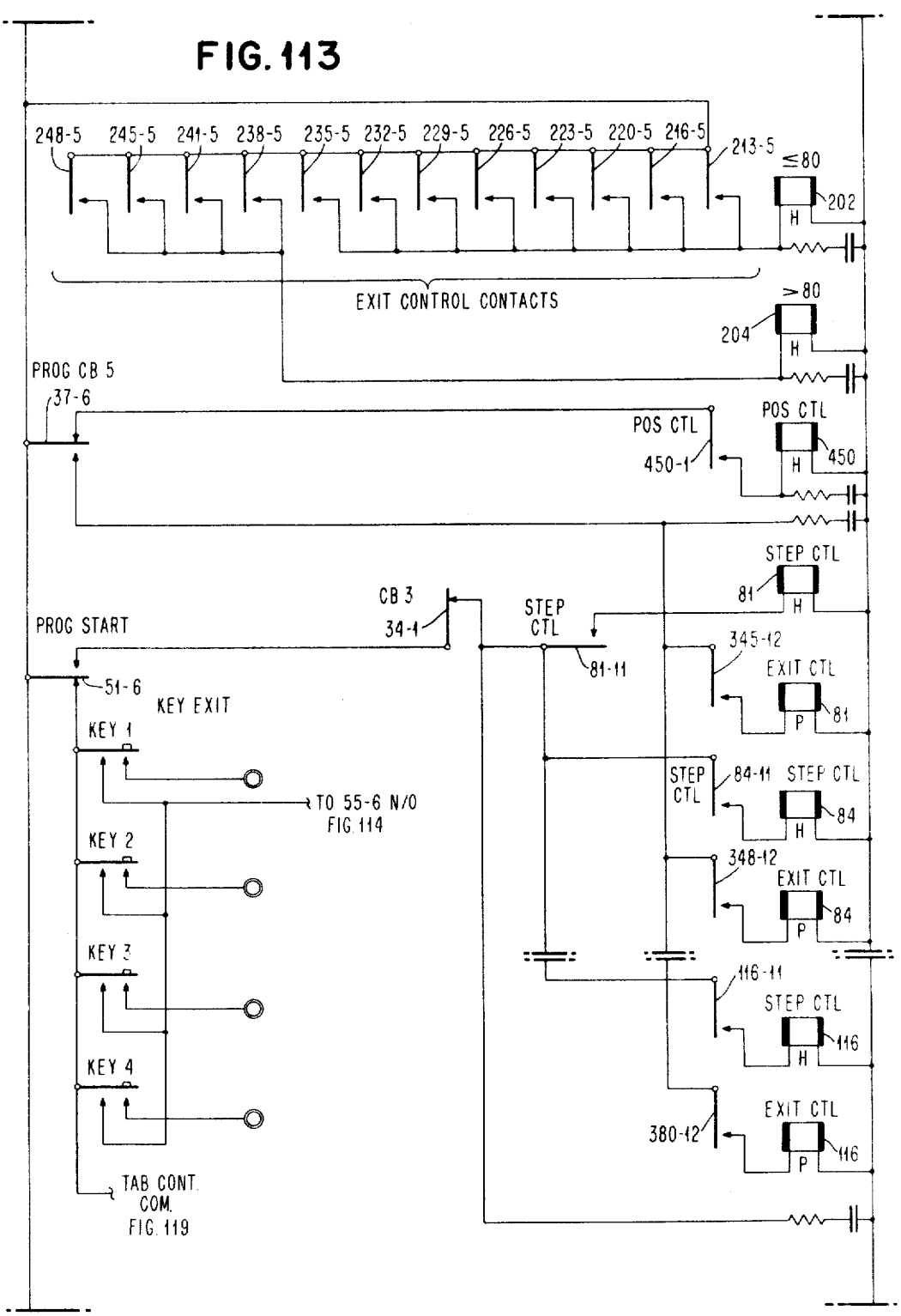
Figure 114:
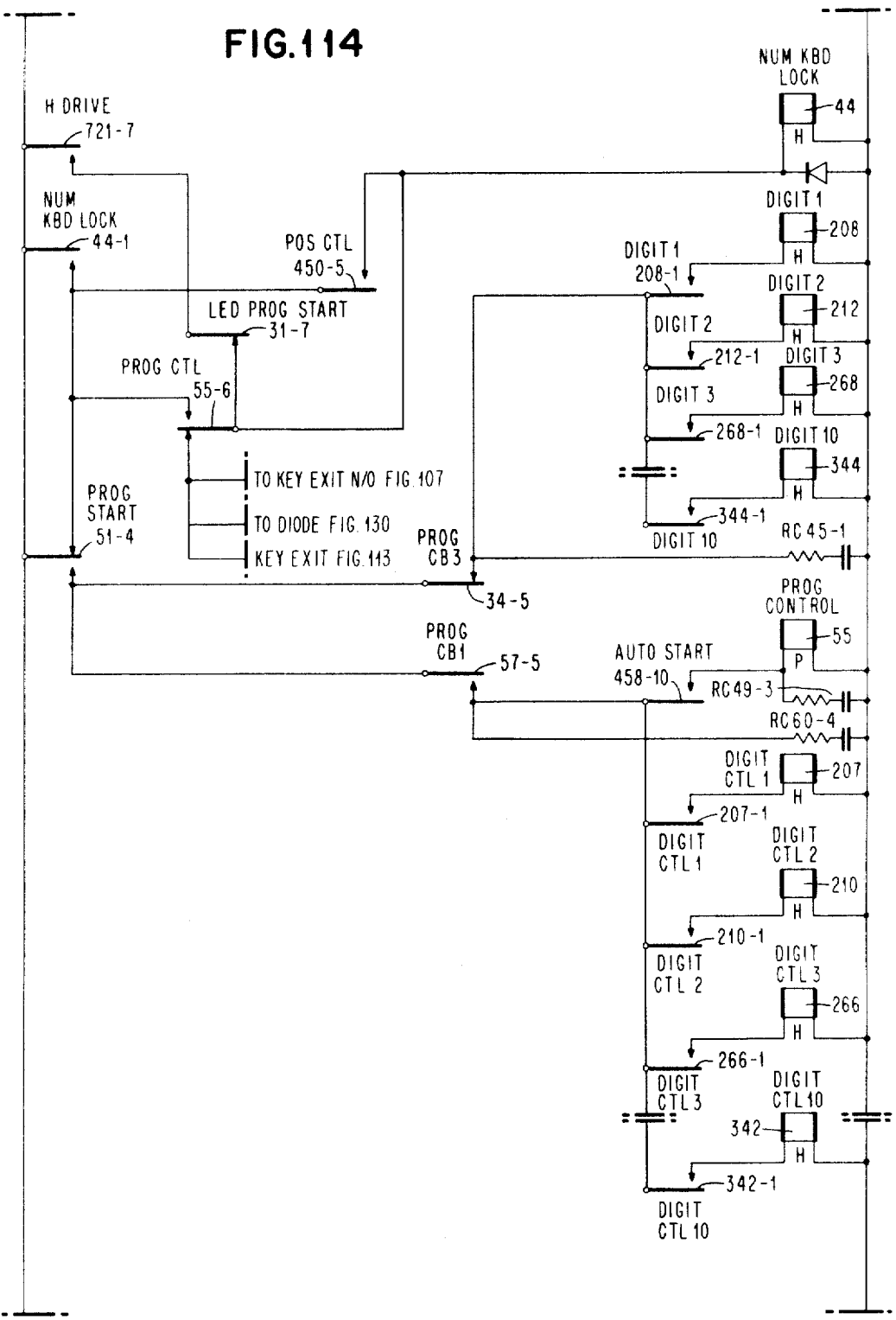

The control panel also has a number of Program Step Entry hubs, such as hub 6.19, and Program Step Exit hubs, such as hub 6.20. The Program Step Entry hubs (120 hubs shown in FIG. 110) are responsive to an electrical impulse to cause the machine to initiate a program step. The Program Step Exit hubs (120 hubs shown in FIG. 109.) emit impulses at the completion of the corresponding program step. The Program Step Exit control contacts are shown in FIGS. 111–113. Three Program Step 1 Entry hubs at 6.11 are provided for initiating Step 1 of the program. Additional Program control circuits are shown in FIG. 114.

Once the machine is started into a program step sequence in the automatic mode, it will advance from program step to program step in any order in which the control panel is prewired, until the sequence is interrupted or terminated. When the program step sequence is interrupted, it cannot be restarted until an Auto Start hub is impulsed or until the Program Start bar is manipulated.

Figure 108:
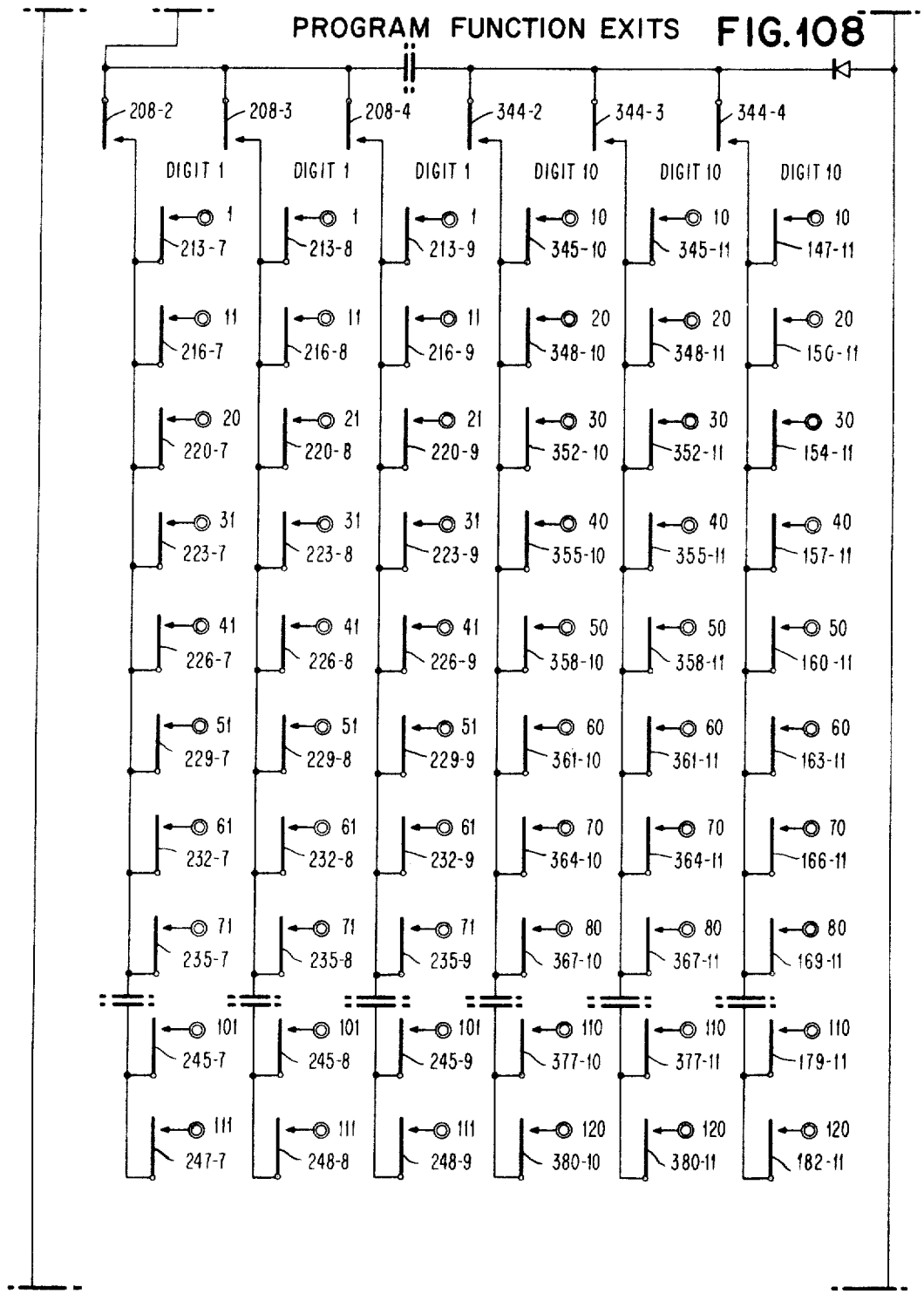
Figure 109:
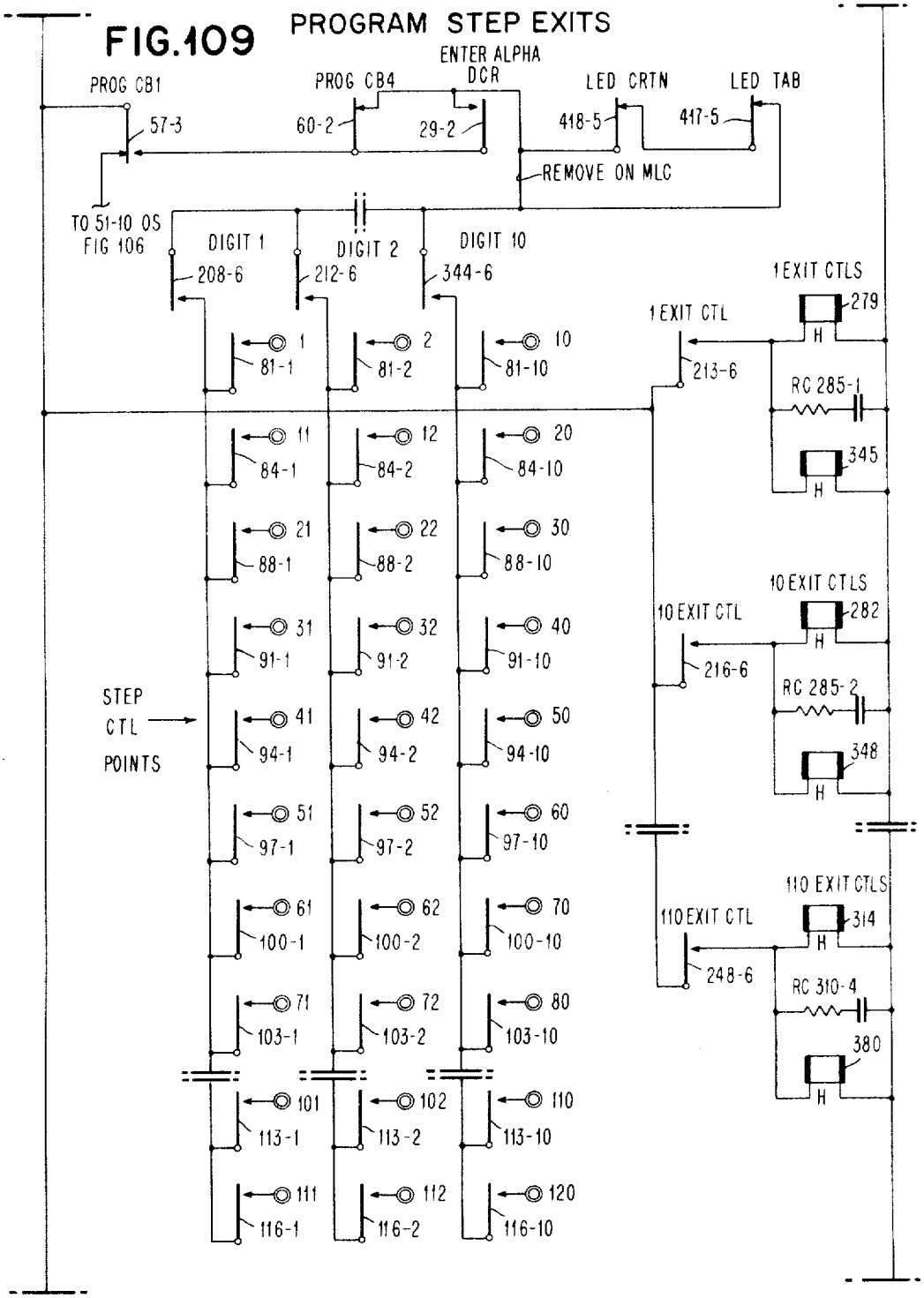
Figure 110:
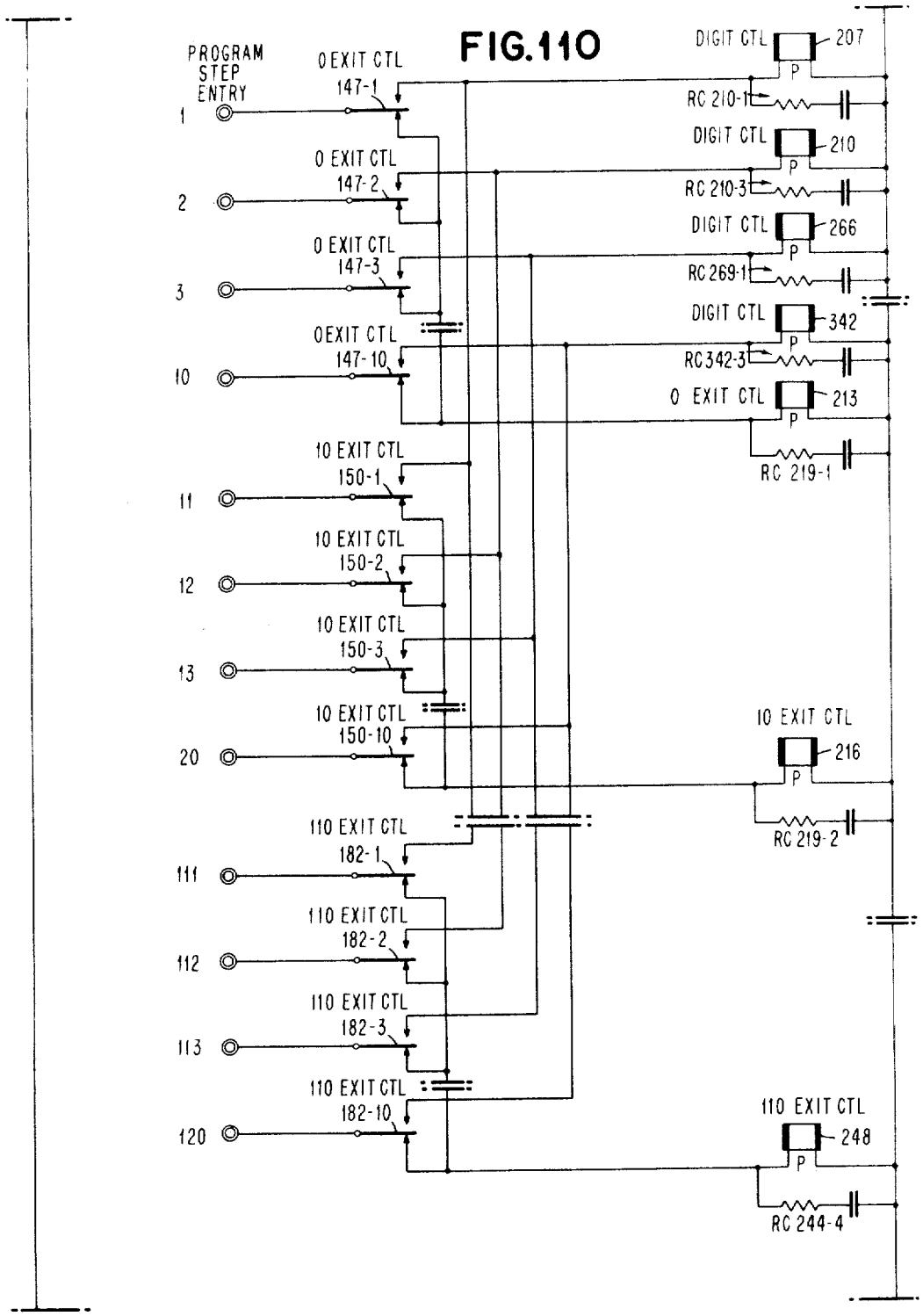

There are three related exit hubs for each program step. These are divided into three groups called Function Exits, such as exit 6.21, In Word Exits, such as exit 6.22, and Out Word Exits, such as exit 6.23. These hubs supply impulses when the corresponding program step is active. The Function Exit hubs, also shown in FIG. 108, are used for selecting an arithmetic or other operation, such as that may be desired in a particular program step. The In Word Exit hubs are used to select one of the operands in an arithmetic or related function, the Digit Capacity of a numeric word to be printed, the number of spaces to be shifted right or left, as the case may be, and for other purposes. The Out Word Exits are generally used to select another operand or to select a particular variable length field in the Magnetic Ledger Card memory.

The In Word Entry hubs for selecting any word of Main memory are shown at 6.24. The Out Word Entry hubs are shown at 6.25. The first two hubs in these columns represent Keyboard Buffer word and Overflow Register word. Thirty-eight other hubs representing the other 38 words of main memory are also provided. In an adjacent column at 6.26, the first 15 hubs are labeled L1 to L15, respectively, and represent the first 15 possible numeric word selections in MLC memory. An identical group of Out Word hubs for selecting this section of memory is shown in column 6.27.

For programming either the Digit Capacity of a numeric word during the Type operation or the number of spaces during a Column Shift operation, a group of dual hubs numbered 1 to 10 and V are shown at 6.28. An impulse to any of the hubs 1 to 10 is effective to condition the machine to print out a field of the same number of digits or to shift a programmed word the number of places so designated.

The last hub 6.29 of the group 6.28 which is labeled V, may be impulsed to condition the machine for variable length fields as for Print out of the variable length fields of MLC memory.

A group of hubs 6.30 are designated LA1 through LA9 and SA1 through SA4. The machine is responsive to an impulse applied to any one of the hubs LA1 through LA9 to cause the corresponding variable length field in MLC memory to be located for Alphanumeric Entry or Alphanumeric Print and similarly, the machine is responsive to an impulse applied to any one of the hubs SA1 through SA4 to cause the corresponding variable length field of Special Alphanumeric memory to be located, also for Alphanumeric Entry or Alphanumeric Print out. The Enter Alpha hubs, such as hub 6.50, when impulsed, will initiate an Alphanumeric Entry operation into the particular variable field LA1–LA9 or SA1–SA4, that is selected by an impulse to one of the hubs 6.30. The beginning of the alphanumeric fields LA1–LA9 is established by wiring into one of the Begin Alpha hubs 1–16 in the group 6.51 from the Begin Alpha Common hub 6.52.

The Primary printer is selected for automatic operation by impulses to Primary Print Entry hubs 6.44. As a result, signals are available at the Primary Print Exit hubs 6.31, which are useful for selecting minor functions of the Primary printer. These minor functions include Carrier Return Ledger 6.32; Tab Ledger Carrier 6.33; Reset Print 6.34, Symbols: /, C, M, T, S, *, such as hub 6.35; Space Suppress 6.36, which, when impulsed, will cause the machine to suppress the normal space which occurs after a Type operation; High Order Zeroes (HOZ) 6.37 which, when impulsed, will cause high order zeroes of a number typed to be printed; and High Order Asterisks (HO*) 6.38 which, when impulsed, causes a similar function.

The Backspace hubs 6.39 provide a means for backspacing the printing element to a predetermined position.

Figure 107:
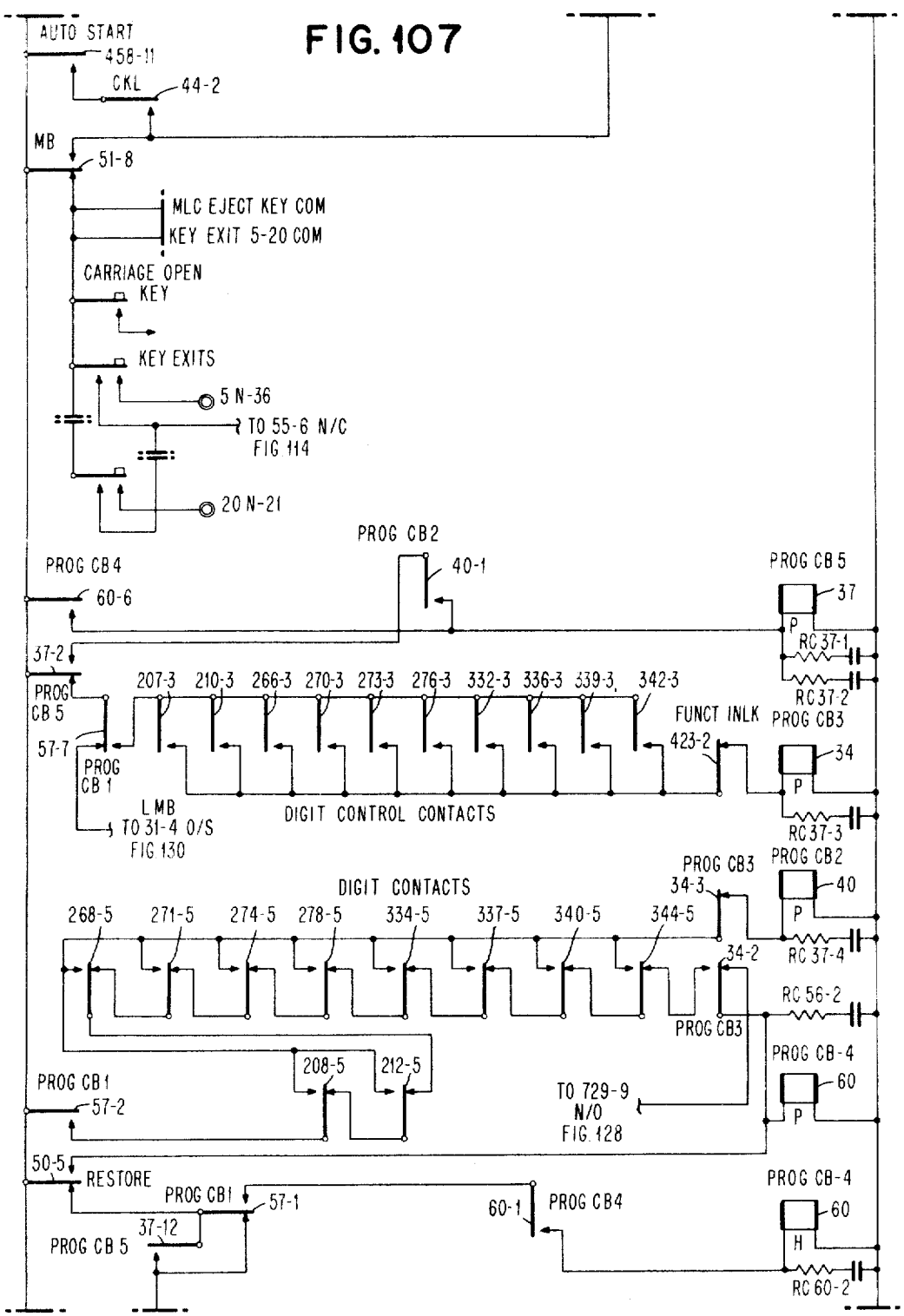

A maximum of twenty control keys, each having one exit hub, such as hub 6.40, provide additional controls for the operator. Some of the keys and associated hubs are shown in FIGS. 107 and 113. The control keys, are located near the Alphanumeric Keyboard and Numeric Keyboards (FIGS. 7a and 7b). When a Control Key is depressed, its corresponding Control Key Exit hub becomes active. The Control Key Exits are used to change the program routine to another routine such as an error correct routine.

Figure 125:
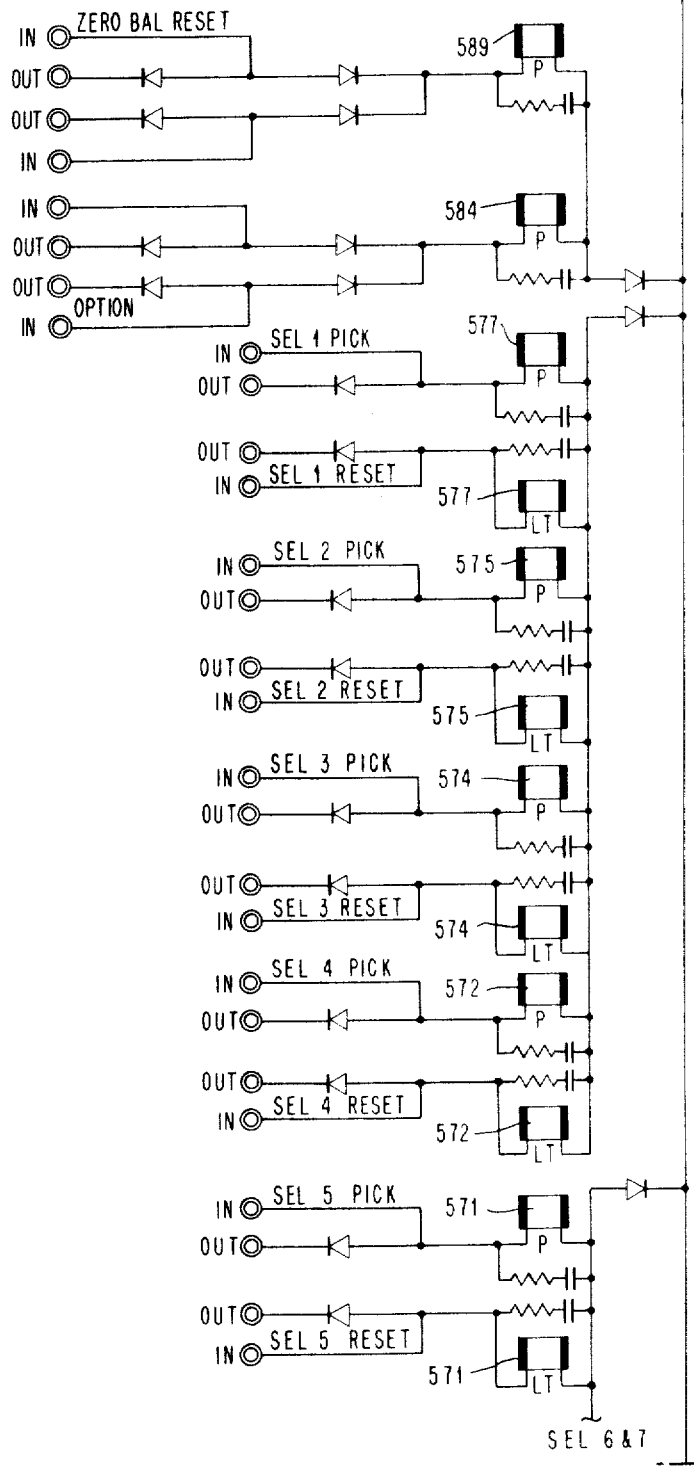

The machine selectors have sets of hubs, such as set 6.41. They provide a means for automatically changing the program routine. The use of selectors for increasing programming flexibility is known in the art. Five selector relays are shown in FIG. 125.

Figure 132:
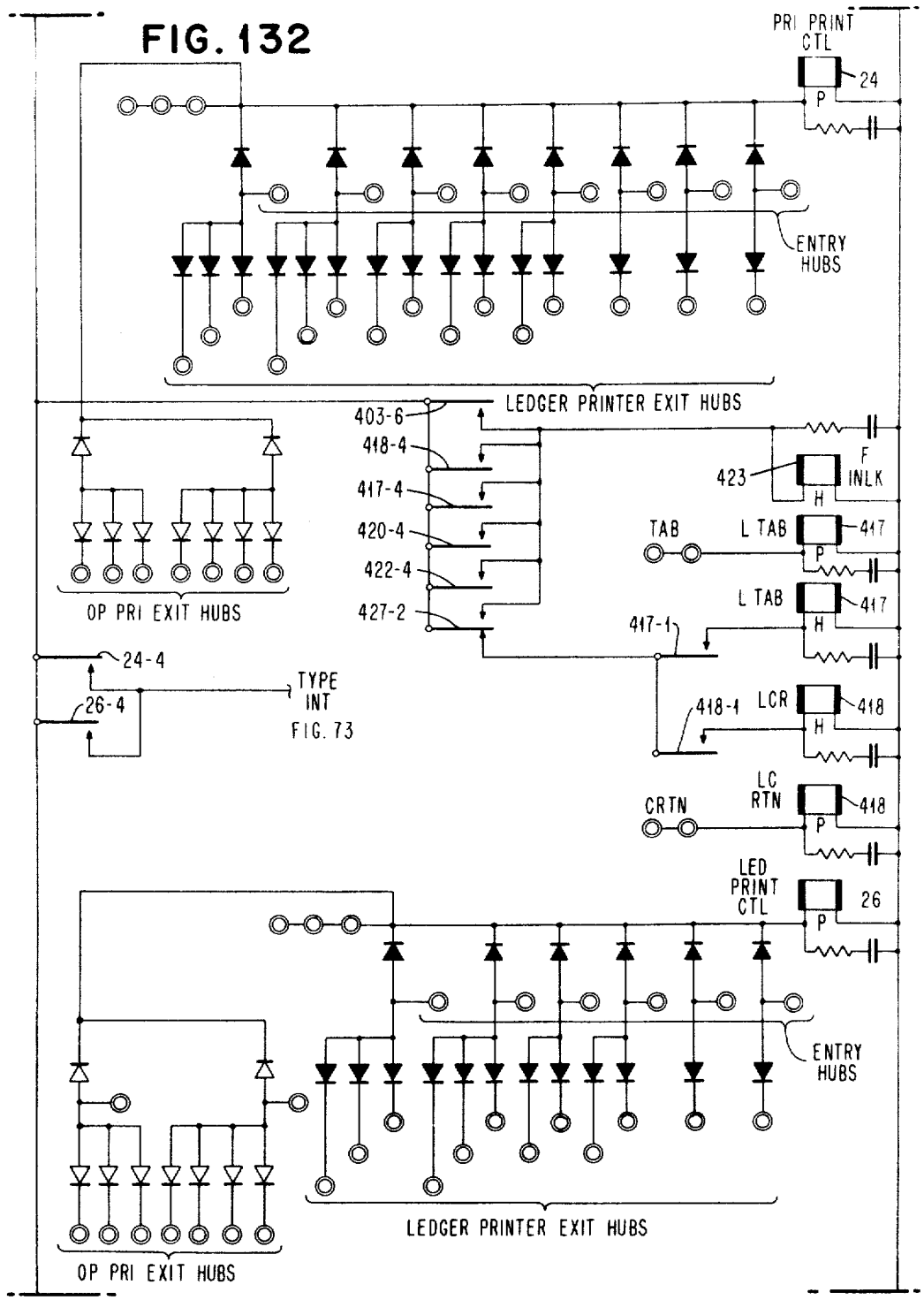

A few hubs related to the Ledger Printer are shown at 6.42 and 6.43 refer also to FIG. 132. These are used to control functions that are similar to hubs 6.31 and 6.44 for the Primary Printer (FIG. 132). Another group of hubs 6.45 receive impulses at appropriate times for initiating a Record Ledger operation with respect to a ledger card. No hubs are shown for the Read Ledger operation since this operation takes place automatically upon insertion of a ledger card in unit 2.16. Thereafter, the card is fed to a station in unit 2.16 for printing. However, a set of Read Only hubs 6.49, when connected, cause a reading operation without subsequent printing. The Posting Line (PL) hubs 6.53 emits an impulse when a ledger card reaches the posting station in unit 2.16 for printing. The Full Card (FC) hub 6.54 provides a signal when all posting lines on a ledger card have been printed. When the Full Card signal occurs, the machine is automatically placed in a Duplicate mode. The card involved is ejected without a Record Ledger operation. A new card can then be inserted for printing of heading information. The contents of MLC memory are then transferred to the new card by a Record Ledger operation.

A new ledger card can be duplicated from another ledger card, whether the latter is fully posted, or not, by impulsing either of the New Card (NC) hubs, such as hub 6.55.

Figure 133:
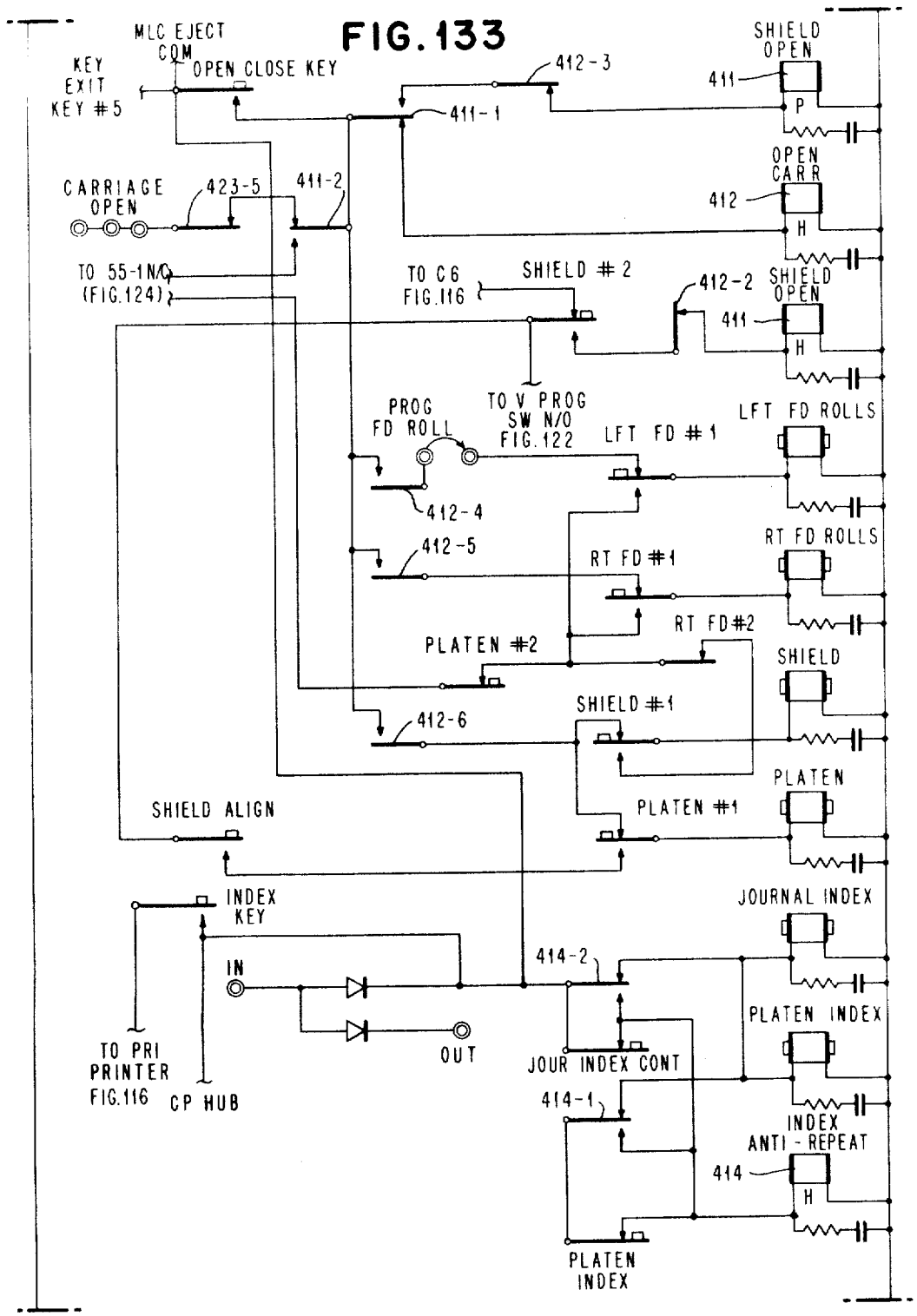

An impulse to either Journal Index (J.I.) hub, such as hub 6.56, will result in the platen-fed journal and front feed forms being indexed one position. If a Carriage Open (OPN Car) hub, such as hub 6.57, is impulsed, the Primary printer carriage will open for insertion of front-fed forms. Hubs like 6.56 and 6.57 are also shown in FIG. 133.

A number of hubs are provided at 6.58, 6.59, 6.60, and 6.61 for initiating a variety of punctuation options during a Numeric Type Operation.

Provision is also made for Zero Balance Test functions at the groups of hubs 6.62 and 6.63 and for Negative Balance Test functions at the groups of hubs 6.64 and 6.65.

The hubs for initiating arithmetic operations, including Add (+), Subract (−), Multiply (×), Divide (÷), and other operations are shown at 6.66.

A number of hubs related to a Digit Analyzer feature are shown at 6.46, 6.47, and 6.48. These are Load Digit Analyzer 6.46, Digit Analyzer Entry 6.47, and Digit Analyzer Exit 1 through 20, in an area designated 6.48.

LOGIC BLOCKS AND CIRCUITS

Complemented transistor resistor logic (CTRL) circuits are used in the machine. They are characterized by large signal swings and saturating transistors.

Logic blocks depicting CTRL circuits follow output phase rules of placement where out-of-phase outputs are above the center of the block, in phase below.

FIGS. 18a and 18b show fundamental voltage swings and line levels of CTRL circuits. Maximum and minimum signals are stated as a guide to levels that may be expected. The machine power source is shown in FIG. 105.

Four sets of voltage swings or lines are encountered. These are:

|  | − R Level | + R Level |
|---|---|---|
| R Line:  Minimum  Maximum | +.2 volts to +.2 volts to −.3 volts to | +5.6 volts +5.6 volts +12.0 volts |
|  | − S Level | + S Level |
| S Line:  Minimum  Maximum | −5.6 volts to −12.0 volts to | −.2 volts +.3 volts |
|  | − V Level | + V Level |
| V Line | −10.8 volts to | −2.0 volts |
|  | − W Level | + W Level |
| W Line | 0 Volts to | +48.0 volts |

These circuits are characterized by resistor input networks and inverted signal outputs. The alloy junction transistors are employed which are usually operated in saturation, when conducting. The logic of the block functional symbol is performed by the resistor input network; the transistor inverts and amplifies the resistor network output. Some of the circuits operate from the voltage shift of a line and have a capacitor input; this is voltage mode operation and employs the voltage shifts shown in FIG. 19.

S to S Inverter (+And, −Or)

This PNP nonstranslating circuit in FIG. 20 is used for repowering and level setting of CTRL signals. This circuit is sometimes called the NOR circuit. It performs any one of three basic logic functions: (+And, −Or, INVERT). The logic function is performed by the input resistor network; the invert function, by the common emitter transistor configuration.

With the component values and voltage levels shown, the functions of the circuit of FIG. 20 are obtained in the following manner:

| Function | Inputs | Output |
|---|---|---|
| Complemented +And | All inputs zero volts | −6 to −12 volts. |
| Complemented −Or | One or more inputs, −6 to −12 volts. | Zero volts. |
| Inverter | Single input, −6 to −12 volts. | Zero volts. |
|  | Single input, Zero volts. | −6 to −12 volts. |
|  | (Remaining inputs, such as inputs 20.10 and 20.11, are not connected and are also at a zero level). |  |

The base of transistor 20.12 is biased by the voltage developed across the input divider network. The exact level of this bias depends on the number of inputs used and their level. Input levels may vary at their low levels (−S), but all will reach ground potential at the +S level. When +S levels exist at all the input pins, the base of transistor 20.12 is at +0.65 v. The transistor is reverse-biased off as its emitter is returned to ground. This causes a −S output to exist at pin 20.14. The exact output level at pin 20.14 is dependent upon circuit loading.

Dropping any input 20.15–20.17 to the −S level causes transistor 20.12 base to decrease toward −3.15 v. Transistor 20.12 becomes forward-biased on and clamps the base at −0.2 v. Saturation current flows through the transistor and quickly raises the output at 20.14 to the +S level (−0.2 v.)

Coincidence of more than one −S level at the input drives the transistor farther into saturation and increases the turn-off delay of the circuit.

S to R Converter (+And, −OR)

Figure 21:
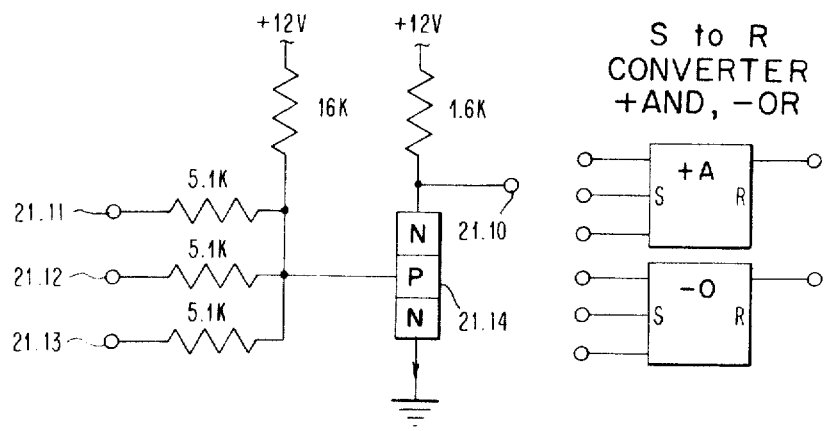

This NPN translating circuit, FIG. 21, is used for repowering and level setting of CTRL signals. It performs any one of three basic logic functions (+And, −Or, Convert) and inverts an S input level to an R output level. The logic function is performed by the input resistor network; the invert function, by the common emitter transistor configuration.

In the +And, Invert logic application illustrated in FIG. 21, a −R output at pin 21.10 is obtained only when all the inputs 21.11–21.13 are up (+S).

The base of transistor 21.14 is biased by the voltage developed across the input divider network. The exact level of this bias depends on the number of inputs used and their levels. Input levels may vary at their low levels, but all will reach ground potential (+S) when up. A −S level at any input holds the base of transistor 21.14 below the emitter voltage and keeps it off, causing a +R output to exist at pin 21.10. The exact output level at pin 21.10 is dependent on the circuit loading.

When all the inputs used are at the +S level, current flow into the divider network to the +12 v. supply raises the base voltage of transistor 21.14 above ground potential. Transistor 21.14 is forward-biased into saturation and drops the output at pin 21.10 to the −R level.

R to S Converter (+Or, −And)

Figure 22:
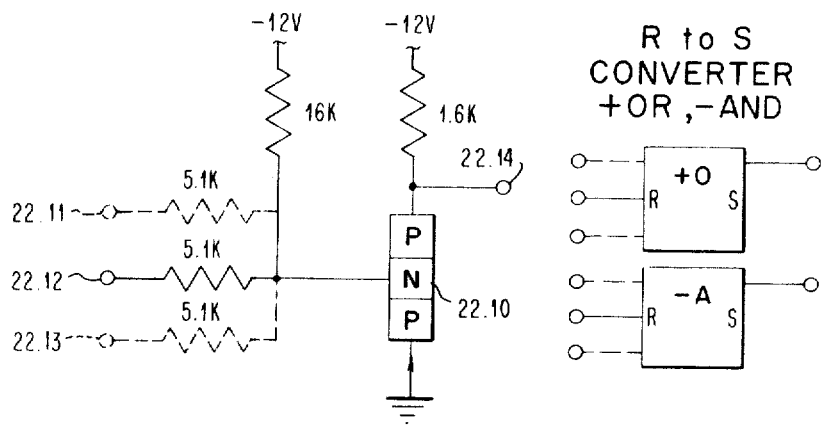

This PNP translating circuit, FIG. 22, is used for repowering and level setting of CTRL signals. It performs a basic logical function (+Or, −And, Convert) and inverts an R input level to an S output level. The logical function is performed by the input resistor network and the invert function is accomplished by the common emitter transistor configuration. In the −And, invert logic application illustrated in FIG. 22, a +S output is obtained only when all the inputs are down (−R).

The base of transistor 22.10 is biased by the voltage developed across the input divider network. The exact level of this bias depends on the number of inputs used and their levels. Input levels may vary at their high levels, but all will go to ground (−R) when down. A +R level at any one of the inputs 22.11–22.13 holds the base of transistor 22.10 above the emitter voltage and keeps it cut off, causing a −S level to exist at pin 22.14. The exact output level at pin 22.14 is dependent on the circuit loading.

When all inputs used are at the −R level, current flow from the −12 v. supply decreases the base voltage of transistor 22.10 below ground potential. Transistor 22.10 is forward-biased into saturation and increases the output at pin 22.14 to the +S level.

S Line Power Inverter (IP)

The Power Inverter, FIG. 23, provides a large power output to drive branching circuits or transmission lines. A relatively small S input at pin 23.10 results in an amplified and inverted S output.

A +S input to pin 23.10 reverse-biases transistor 23.11 off. The collector of transistor 23.11 is near −12 v.; the exact level depends on the load connected to pin 23.12. When the input falls to −S, the base of transistor 23.11 tends to drop below ground. The emitter of transistor 23.11 clamps the base at about −.2 v. and 23.11 goes into saturation. Output pin 23.12 rises to a +S level, depending on the load.

The 3.3 ohm, 33 $\mu$f. network decouples the collector load resistor from the −12 v. supply to prevent the sudden current demand from affecting other nearby circuits.

S to R Line Power Inverter (IP)

This power inverter is similar in operation to the S-Line Power Inverter of FIG. 23. An NPN transistor is used (FIG. 24) and the collector is returned to a positive supply voltage. An S input results in an inverted R output.

S Line Emitter Follower (DE)

The PNP emitter follower circuit of FIG. 25 serves as a nontranslating current amplifier that drives additional logic or branching circuits. Emitter followers also serve as buffer devices to match impedances or provide isolation. A slight DC voltage shift results between the input and output voltage signals.

With an input at pin 25.10 of about −0.2 v., transistor 25.11 is in partial conduction. This current flows through the low resistance inductor 25.12 into the 2.2K emitter follower resistor 25.13 to the +12 v. supply at 25.14. Transistor 25.11 base-emitter drop (0.2 v. to 0.4 v.) causes a slight voltage shift between the input and output signals. A +S output exists at pin 25.15. When the input voltage drops toward −12 v., the forward bias on transistor 25.11 is increased. Current through transistor 25.11 starts to increase but is momentarily resisted by the inductor 25.12. Then the output drops sharply to the −S level and the transistor is in full conduction.

The circuit is returned to its original status by a +S level to the base of transistor 25.11. The rise to the +S level is similarly resisted by the inductor 25.12 and again a sharp shift results.

Because of the relatively low impedance offered by the emitter follower, the output level is little affected by the output loading (within limits). The 300 ohm collector resistor 25.16 limits the power dissipation across transistor 25.11. The 0.01 $\mu$fd. capacitor 25.17 filters to ground any oscillation or ringing that might be introduced onto the −12 v. line by the coil 25.12.

R Line Emitter Follower (DE)

The NPN emitter follower circuit, FIG. 26, serves as a non-translating current amplifier that drives additional logic or branching circuits.

A +0.2 v. input at pin 26.10 results in transistor 26.11 being in partial conduction. Most of the current from any load across terminals 26.12 and 26.13 and the 2.2K resistor 26.14 flows through the low resistance inductor 26.15 into the transistor. Transistor 26.11 base-emitter drop (0.2 v. to 0.4 v.) gives a slight voltage shift between the input and output signals. A −R output exists at pin 26.16.

When the input line rises toward +12 v., the forward bias on transistor 26.11 increases. Initially, current through transistor 26.11 starts to increase, but is momentarily resisted by the inductor 26.15. The voltage drop developed across the parallel LR network holds the output positive until the counter −EMF is overcome. Then, the output increases sharply to the +R level and the transistor is in full conduction.

The circuit is returned to its original status by a −R level to the base of transistor 26.11. The drop to the −R level is similarly resisted by the inductor 26.15 and again a sharp shift results. The 300 ohm collector resistor 26.16 limits the power dissipation across transistor 26.11. The 0.01 μfd. capacitor 26.17 filters to ground any oscillation or ringing that might be introduced onto the +12 v. line by the coil.

Remote Load (R)

The output of any transistor is basically an electric current. Each transistor is connected to a suitable voltage through a load device. The purpose of this load device, FIG. 27 (usually a resistor), is twofold: first, to limit the current through the transistor, and second, to provide a voltage level based on the amount of current flow so that other transistors can be controlled. A voltage pulse with little current demand tends to degenerate because of line capacity and resistance. Therefore, when the output transistor is separated from the input network of the next transistor by a considerable distance it is desirable to develop the controlling voltage near the input network.

Indicator Driver (DI)

The indicator driver circuit in FIG. 28 supplies up to 20 ma. to an incandescent lamp connected to its out-of-phase output pin. A −S input level is required to turn on the transistor and light the lamp.

With a −S input at pin 28.10, the base voltage of transistor 28.11 clamps at −0.3 v. as transistor 28.11 is forward biased on. The output at 28.15 increases toward ground potential and supplies sufficient current to light the lamp.

When the input increases to the +S level, the base of transistor 28.11 increases to +1.2 v. and holds the transistor reverse biased off. Only a pre-energizing current of 5.5 ma. flows through resistors 28.12 and 28.13, and the lamp 28.14 to the −12 v. supply; this current is not sufficient to light the lamp. A voltage output of −10 v. exists at pin 28.15.

4 or 5-Way −Nor (+O)

This circuit, FIG. 29, converts +48 volt signals to −R line signals, and at the same time performs the OR function. If any of the 4 or 5 inputs is connected through proper circuitry to +48 volts, the transistor 29.10 will conduct and the output will be at ground potential. If all the inputs are open (ground), the transistor 29.10 is cut off through the biasing resistor 29.11 to −6 volts. Thus the output is returned through the collector load resistor to +12 volts, resulting in a +R level.

Diode Isolator (ID)

The diode isolator circuit, FIG. 30, is designed to carry +48 v. from the control panel through either of two inputs 30.10 and 30.11 to a common load resistor. One of the inputs 30.10 serves also as an output line 30.12. The other input 30.11 is isolated from the first, but will connect the first input-output line and an additional output line 30.13 to +48 v. when applied.

Voltage Mode Trigger 1

The voltage mode trigger circuit, FIG. 31, is used in clock and ring circuits and as an isolated binary bit memory. The trigger circuit uses two inverters and two emitter followers and operates at a frequency near 150 kc. The trigger may be connected to be operated by many input configurations. It may be operated with a binary input, a single gated A.C. input, a dual gated A.C. input, or a D.C. set input. Both in-phase and out-of-phase outputs are available.

Binary Operation: The trigger may be connected for binary operation (gated or not gated) by connecting one of the gate resistors 31.10–31.13 to the emitter follower output on the same side of the trigger. The other gate input may then be used as an external gate or tied to ground. The two A.C. inputs 31.14 and 31.15 are connected together and driven from a sample pulse driver to form the binary operation.

A.C. Set Input: For gated input operation, the A.C. set pulse to 31.14 and 31.15 may be either a 3 v. or a 6 v. positive shift.

D.C. Set Input: A signal of −5.56 v. (or more negative) applied to the D.C. set input at 31.16 triggers the circuit. The negative set signal may go as far negative as −12.48 volts. The down input pulse must be at least 3.0 μs. in duration.

A starting condition (FIG. 31) of transistor 31.17 and 31.18 in full conduction, transistor 31.19 in minimum conduction, and transistor 31.20 off, is assumed. With gate 31.10 tied to ground and gate 31.11 gated from −6 v. to 0 v. for 4.5 μs. before an A.C. input shift is applied, a positive going 3 v. pulse of 0.5 μs. is applied to the A.C. set input at terminal 31.14. The output of gate at diode 31.21 causes the base of transistor 31.17 to become more positive than the emitter (ground potential). Transistor 31.17 becomes reverse-biased off and its collector voltage tries to go to −12 v. Because of the diode action between the collector and base of transistor 31.19, the collector of transistor 31.17 is allowed to go only to −6 v. (pin 31.22). This negative −6 v. forward biases transistor 31.19 into full conduction. The emitter of the emitter follower transistor 31.19 follows the base to −6 v. The output of the emitter follower at pin 31.23 is coupled to the base of transistor 31.20 through the voltage divider network comprising resistors 31.24 and 31.25, forward biasing 31.20. The conduction of transistor 31.20 causes its collector (pin 31.26) to rise from −6 v. to 0 v. The transistor 31.20 collector voltage rise to 0 v. is fed to the base of transistor 31.18 and reduces its forward bias. The bias on the emitter follower transistor 31.18 reduces its conduction so that its emitter rises to 0 v. at pin 31.27. This output is coupled back to the base of transistor 31.17, reverse biasing it, thus providing latch back to the circuit. If pins 31.28 and 31.29 are gated on, and an A.C. set pulse applied to pin 31.15, the trigger is restored to its original state.

Voltage Mode Trigger 2

This trigger, FIG. 32, differs from voltage mode trigger 1 only in the input wiring. It may be operated with binary input or A.C. set input. Two gated A.C. set inputs per state are provided. This circuit is used for the Accummulator trigger function herein.

Binary Operation: The trigger may be connected for binary operation (gated or non-gated). When it is used as a non-gated trigger, the gate inputs are tied to ground and the A.C. set inputs are tied together and driven by a sample pulse driver.

A.C. Set Input: For gated input operation, the A.C. set pulse may be either a 3 v. or a 6 v. positive going pulse. Because there are two A.C. set gates per state in this circuit, the trigger can be driven from either gate input as gated or non-gated, or the gates may be connected together and operated as a single A.C. set input.

Gated Sample Pulse Driver (DSP)

This sample pulse driver, FIG. 33, is used to drive voltage mode triggers 1 and 2. The driver is driven by voltage mode circuits and produces a 3 v. output shift.

The circuit provides about a 1 µs. output pulse regardless of the input signal duration. A gated, positive signal to the voltage mode input starts a single-shot action.

The normal status of the circuit is with transistors 33.10 and 33.11 off and output pin 33.12 at approximately ground level. There is a single set input 33.13 and a gating input 33.14. The gate 33.14 must be up to 0 v. before a signal to input 33.13 can operate the circuit. The output expected is a 3 v. positive, 1 ms. pulse regardless of input duration in excess of 1 ms.

With the input gate 33.14 at 0 v. for more than 5 ms., a positive shift at input pin 33.13 turns transistor 33.10 on. The emitter of 33.10 is clamped to approximately +0.5 v. by diode 33.15. The collector of 33.10 approaches +0.5 v. and turns transistor 33.11 on. The two resistors 33.16 and 33.17 form a voltage divider with transistor 33.11 in conduction and an output voltage of approximately +3 volts is produced at terminal 33.12.

The emitter of transistor 33.11 is now at approximately +3 v. The 3 volt negative shift on resistor 33.17 is coupled through capacitor 33.18 and reduces the emitter voltage of transistor 33.10 to approximately −2.5 volts. Diode 33.15 is now reverse biased. Capacitor 33.18 will charge through resistor 33.19 and resistors 33.21, 33.20 and transitor 33.10 toward a positive voltage.

As the emitter of transistor 33.10 becomes more positive than 0 v. (applied at terminal 33.14) transistor 33.10 will be turned off. The collector of transistor 33.10 will then go toward +12 v. This shift will turn transistor 33.11 off and return the output to ground level. The emitter of transistor 33.11 will return to +6 volts and the circuit resumes its quiescent state.

The input signal must extend beyond the 1 ms. period to allow the circuit to time out.

Integrator

The integrating circuit, FIG. 34, is driven by a W line and provides an S level that is relatively free of the noise and bounce generally found on circuit breaker or relay lines. With the input at +48 v., the output at terminal 34.10 is clamped to a +S level from terminal 34.11 by the action of diode 34.12.

When the input is opened, the capacitor 34.13 charges to a −S level. The output will also be at a −S level.

Single Shot

The Single Shot circuit, FIG. 35, will provide a +S output at pin 35.10 until triggered, when the output will drop to a −S level (−12 volts). The duration of the output signal is 6 microseconds. The output duration is independent of the input signal.

When the Single Shot is off, transistor 35.12 is off, transistor 35.13 is on, and transistor 35.14 is on.

Capacitors 35.16 and 35.17 have approximately +6 volts applied to them from terminal 35.21. Transistor 35.13 being on at this time results in −6 volts being applied on the right extremities of 35.16 and 35.17 (base of 35.13).

Capacitors 35.16 and 35.17 are then charged with about 12 volts by virtue of the +6 volts from terminal 35.21 to the −6 volts at terminal 35.22.

A positive A.-C. signal at pin 35.11 turns transistor 35.12 on. The collector of transistor 35.12 approaches −6 volts. This is a negative shift which is applied through capacitors 35.16 and 35.17 to the base of transistor 35.13, turning it off. As transistor 35.13 turns off, its collector shifts positive and is coupled to the base of transistor 35.14, turning it off. The output becomes −12 volts.

A feedback loop is provided from terminal 35.18 to −12 volts at terminal 35.19 by line 35.20. This results in the base of transistor 35.12 being held around −3 volts and transistor 35.12 remains on. The collector of transistor 35.12 is at −6 volts at this time.

Transistor 35.13 remains off until its base becomes more positive than −6 volts.

The collector of transistor 35.12 will be clamped to −6 volts, so the capacitors 35.16 and 35.17 are changed through resistor 35.23 to +6 volts at terminal 35.24.

The RC time constant of capacitors 35.16 and 35.17 determines the timing of the Single Shot. As the base of transistor 35.13 moves from approximately −18 volts toward +6 volts, it will go more positive than −6 volts and will turn on.

As transistor 35.13 turns on, 35.14 turns on, and the voltage at the collector of 35.13 (which is clamped about −6 volts) is coupled by line 35.20 to terminal 35.19, resulting in −9 volts to the base of transistor 35.12, turning it off. As transistor 35.12 goes off, its collector approaches +6 volts and is coupled as a positive shift to drive 35.13 even more into saturation.

Capacitors 35.16 and 35.17 charge up as before.

Thyratron Relay Driver

This circuit is shown in FIG. 36. The circuit has a thyratron transistor 36.10 which, when fired by a signal at input 36.11, remains on until the collector circuit is opened.

Resistor 36.12 reduces the load resistance of the circuit driving the circuit of FIG. 36. Normally, transistor 36.10 is off because of negative voltage applied to its base. An input of zero volts turns transistor 36.10 on.

The input signal is about ten microseconds long in some cases, which is of short duration. When transistor 36.10 comes on, the relay 36.13 acts as an inductor and the current through it takes several milliseconds to build up. At this time, therefore, there is only a small amount of collector current flowing.

The circuit has a capacitor 36.14. This capacitor charges of +48 volts rapidly and will discharge through transistor 36.10 keeping the collector current high until the current through the relay builds up, thus preventing the thyratron transistor 36.10 from turning off.

A relay point, not shown, is provided in the collector circuit to cut off transistor 36.10. The +48 volts is subsequently reapplied so another zero input signal can fire the circuit. Capacitor 36.15 absorbs some of the relay contact bounce upon reapplication to prevent transistor 36.10 being turned on.

Memory Driver (DC)

The circuit used for driving core memory drive lines is shown in FIG. 37. In the absence of an input at the gate 37.10, transistor 37.11 is normally conducting. The collector of transistor 37.11 is therefore at approximately −12 volts which keeps the emitter-base diode portion of transistor 37.12 reverse biased, thus keeping 37.12 off. The input of 37.11 is A.-C. coupled.

With the gate input 37.10 at −6 volts, and either diode pulse input held at ground level, transistor 37.11 will remain in conduction. With one diode pulse input held negative, transistor 37.11 will be cut off when the second diode pulse input goes negative. This tends to bring the collector of transistor 37.11 toward +6 volts and causes transistor 37.11 to conduct through an array of cores.

Transistor 37.11 is normally on and transistor 37.12 is normally off.

Input 37.10 is a gate to which gating signals of longer duration are applied. Inputs 37.13 and 37.14 are normal pulse inputs.

This circuit will fire when all inputs are −12 v. (−S). If either diode input 37.13 or 37.14 is at ground, the joint input to the .01 µfd. capacitor 37.15 will be ground (+S).

If input 37.10 is −12 v. and 37.13 is −12 v., an input from a single shot at input 37.14, for example, will cause an A.-C. negative shift to the base of transistor 37.11.

This negative shift turns transistor 37.11 off, and its collector voltage will approch +6 v. The base of transistor 37.12 is tied to the collector of transistor 37.11 through a diode 37.17 and the 37.12 base approaches +6 v. As the 37.12 base becomes more positive than −6 v., transistor 37.12 is turned on, and the base clamps to —6 v. Transistor 37.12 will remain on as long as 37.11 remains off. The output at 37.18 is coupled in series through a diode matrix, a 42.2 ohm current limiting resistor, the core plane, another diode matrix and a memory switch to +6 volts, not shown.

As either diode input 37.13 or 37.14 is returned to zero volts, a positive shift will be coupled through capacitor 37.15 to the base of transistor 37.11. Transistor 37.11 will be turned on and its collector will be held at approximately —12 v. This will be coupled to the base of transistor 37.12 through diode 37.17. Transistor 37.12 will then be turned off.

Resistor 37.19 and capacitor 37.15 form a RC network that tends to turn transistor 37.11 back on after it has been turned off. This time constant is large in comparison to the input signal, and permits the driver to remain under control of normal input signals.

Memory Switches #1 and #2

These switches, FIGS. 38 and 39, are used in conjunction with the core memory driver circuit of FIG. 37.

Two transistors are provided, in Switch #1 FIG. 38, designated 38.11 and 38.12. The emitter of transistor 38.12 is tied to +6 volts. When transistor 38.12 is on, a path can be visualized from terminal 38.13, through a diode matrix, through the core plane, through another diode matrix, through a 42.2 ohm resistor, and back to the driver as discussed in connection with FIG. 37.

Terminal 38.14 is connected to terminal 39.10 of the Memory Switch 2, FIG. 39. Switch 2 is used to connect the emitter of the Main Memory transistor 38.11, FIG. 38, to ground. With Switch 2 off, no current can pass through Switch 1. Terminals 38.10 of Switch 1 and 39.11 of Switch 2 are input terminals, both of which control Switch 1. Essentially, this arrangement comprises an And circuit. Both 38.10 and 39.11 must be properly gated in order to get Switch 1 on.

If either input 38.10 and or 39.11 is —12 volts, the bases of transistors 38.11 and 39.12 will be maintained negative so that they remain off. As the input signals to 38.10 and 39.11 go to +S, the bases go positive turning transistors 38.11 and 39.12 on. A shift occurs at the collector of transistor 38.11 to about ground level which is applied to the base of transistor 38.12. This is more negative than the +6 volt emitter voltage of transistor 38.12 and 38.12 conducts, going deeply into saturation for driving the core plane.

The timing is set up so that the Memory Switch #1, FIG. 38 is turned on considerably before the Memory Driver of FIG. 37.

The Driver is turned on by the Single Shot, FIG. 35 for approximately 6 microseconds. The Driver is turned off, and the Switch is then turned off.

Delay Line

An off-set drive is used for driving memory. That is, the word drivers and bit drivers are fired at different times. The drivers have to coincide to some extent, but the otherwise large pulse of current when they are actuated is minimized by letting each fire at slightly different times. This reduces noise in the machine. Each driver fires approximately 6 microseconds but only 2 microseconds coincidence is required.

The delay line, FIG. 40, performs this function. The Single Shot output is applied at input 40.12 and through the low pass filter network. A fast rise time occurs, the filter introduces phase shift so that the ouput of the filter is delayed.

Transistors 40.10 and 40.11 comprise a pulse shaping network to compensate for slope and ragged top edge of the pulse introduced by the delay line. The delay is about 1.8 microseconds.

A diode And circuit, comprising diodes 40.13 and 40.14, develops a strobe signal from terminal 40.15 to gate the Sense Amplifier, FIG. 42, only when both drivers are in conduction: As soon as either Driver stops driving, the Sense Amplifier is degated.

When either input to this diode And is ground, the output is ground. If both inputs are at —S levels, the output is at a —S level.

The input at 40.12 is zero volts from the Single Shot, which at the end of the delay, is applied to the base of transistor 40.10. Transistor 40.10 is turned off since the base will be a volt or two positive. The collector of transistor 40.10 will then be tied to approximately —12 volts which is connected through a voltage divider network to the base of transistor 40.11.

The base of transistor 40.11 will normally remain negative, keeping 40.11 on. The output at terminal 40.16 will be zero volts.

As the input drops to —12 volts, it is reflected through the delay line to the base of transistor 40.10. Transistor 40.10 comes on, its collector goes toward ground and this is coupled through to turn transistor 40.11 off. Terminal 40.16 then becomes —12 volts.

Sense Amplifier Shaper

Pin 42.25 of the Sense Amplifier, FIG. 42, is applied to pin 41.13 of the Sense Amplifier Shaper, FIG. 41. The Shaper is essentially a Single Shot circuit.

The Shaper has three transistors 41.10, 41.11, and 41.12. With no input pulse at terminal 41.13, transistor 41.10 will be on, transistor 41.11 will be off, and transistor 41.12 will be off.

A positive going pulse at terminal 41.13 (—12 to —12 volts) will cause transistor 41.11 to come on. The emitter of transistor 41.11 is about —6 volts and when it comes on the collector of 41.11 will become —6 volts. This negative shift turns transistor 41.10 off by line 41.14. The collector of transistor 41.10 approaches ground and keeps transistor 41.11 on. The —6 v. on the collector of transistor 41.11 will be coupled to the base of transistor 41.12, turning it on. The output at pin 41.17 will become approximately —9 v.

The capacitor 41.15 and resistor 41.16 form an RC network which allows the base of 41.10 to slowly become more positive so that 41.10 turns on at the end of about 3.5 microseconds. When transistor 41.10 goes on, its collector will shift to —12 volts and turn transistor 41.11 off. As transistor 41.11 turns off, a positive shift occurs at its collector which is applied to transistor 41.10 to turn it on to greater saturation. The positive shift of the collector of transistor 41.11 will be coupled to the base of transistor 41.12, turning it off. The output at pin 41.17 will approach —12 v.

Sense Amplifier

This circuit is shown in FIG. 42. The circuit comprises six transistors 42.10–42.15. Terminals 42.16 and 42.17 are tied to the respective ends of one of the core plane sense windings such as winding 12.13, FIG. 12 and 8.22, FIG. 8.

Either end of a sense winding may become positive with respect to the other depending on the direction it takes through the core plane. This requires differential amplification. When the core drivers are fired, a voltage of a few millivolts is developed between terminals 42.16 and 42.17. Transistors 42.10 and 42.13 are amplifiers operating in a non-saturated mode for amplifying the difference signal. Transistors 42.11 and 42.14 are also non-saturated. Transistors 42.10 and 42.11 or 42.13 and 42.14 amplify the input signal to a few volts.

A strobe pulse of —12 volts is applied at terminal 42.22 when both word Driver and Bit Driver are firing. Normally the Strobe input is at ground level. In this case the bases of transistors 42.12 and 42.15 are at ground through the diodes 42.23 and 42.24.

As the strobe goes to —12 volts the diodes 42.23 and 42.24 become reverse biased so the sense winding signal from transistors 42.11 and 42.14 can be connected to transistors 42.12 or 42.15, respectively.

If terminal 42.17 is more negative than terminal 42.16, a negative voltage will be developed through diode 42.19 to the base of transistor 42.15. The emitter voltage of transistor 42.15 is about —1.5 volts and the signal from diode 42.19 will turn 42.15 on. Output 42.25, which was —12 volts before, will be effectively connected through 42.15 to the emitter of 42.15 and become —1 or 2 volts.

A voltage swing in the other direction will turn on transistor 42.12, rather than transistor 42.15. Either transistor coming on will result in a positive shifting signal at terminal 42.25. This output must be shaped by the Shaper circuit in FIG. 41.

MLC Driver

Figure 43:
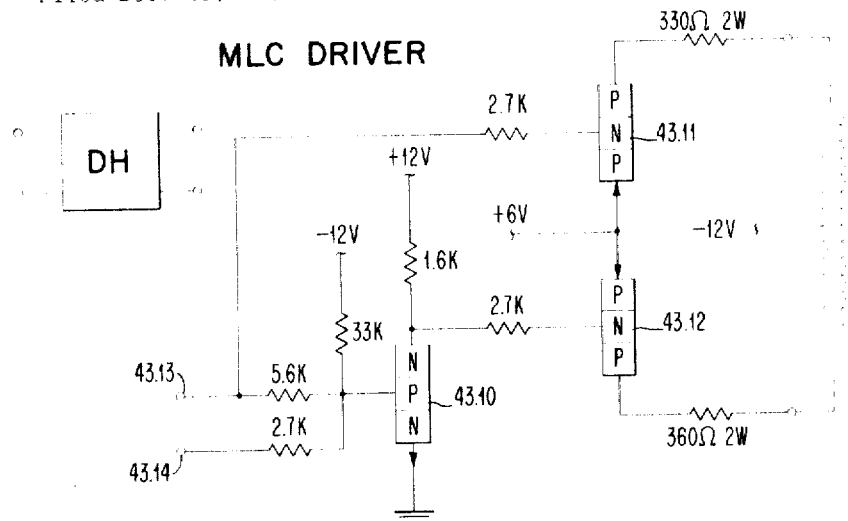

The MLC driver circuit, FIG. 43, provides bias and write currents to the magnetic head of the MLC unit. It includes a logic stage with transistor 43.10 and two driver stages with transistors 43.11 and 43.12 which are effective in their conductive conditions to supply write currents to the upper half of the head coil and to supply bias/erase current to the lower half of the head coil, respectively.

At the input of transistor 43.10, an information input 43.13 and gate input 43.14 are provided. The information input 43.13 varies from +12 (+R) volts to 0 (—R) volt and the gate input 43.14 varies from —12 (—S) volts to (+S) volts.

In the non-MLC operation condition of the circuit, the information input 43.13 is at +12 volts, gate input 43.14 is at —12 volts and all transistors are biased to cut-off. For MLC operation and no input information, the information input is at +12 and the gate is at zero volt. Transistor 43.10 turns on and its collector drops to substantially ground potential and this turns on transistor 43.12. The +12 information input keeps transistor 43.11 off. This is the bias condition of the circuit during MLC operation wherein 43.12 drives bias current through the bias coil of the head. This is a saturating current which also erases all previously recorded information.

To record information, the gate input has 0 volt applied to it, and the information input drops to ground level. Transistor 43.10 is turned off, its collector rises to +12 volts and this is applied to the base of transistor 43.12 to turn it off. Also, the 0 volt at the information input is applied to the base of transistor 43.11 and is less than the +6 v. at its emitter and transistor 43.11 turns on to drive record current through the record winding.

MLC Shaper Amplifier

Figure 44:
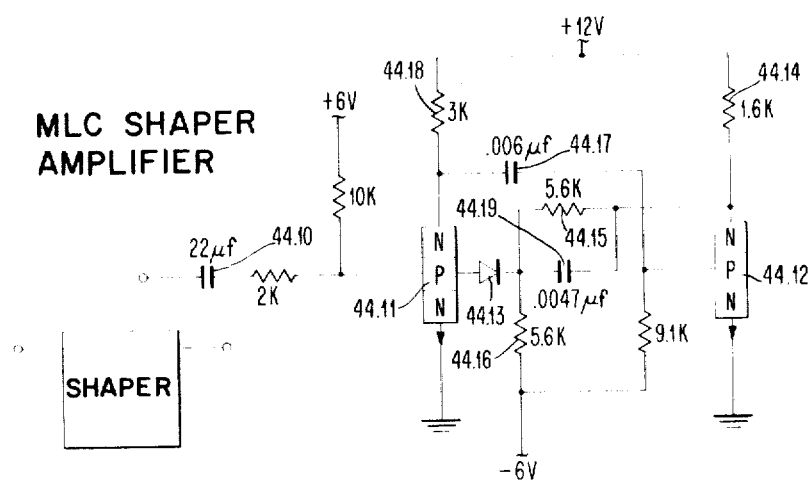
Figure 45:
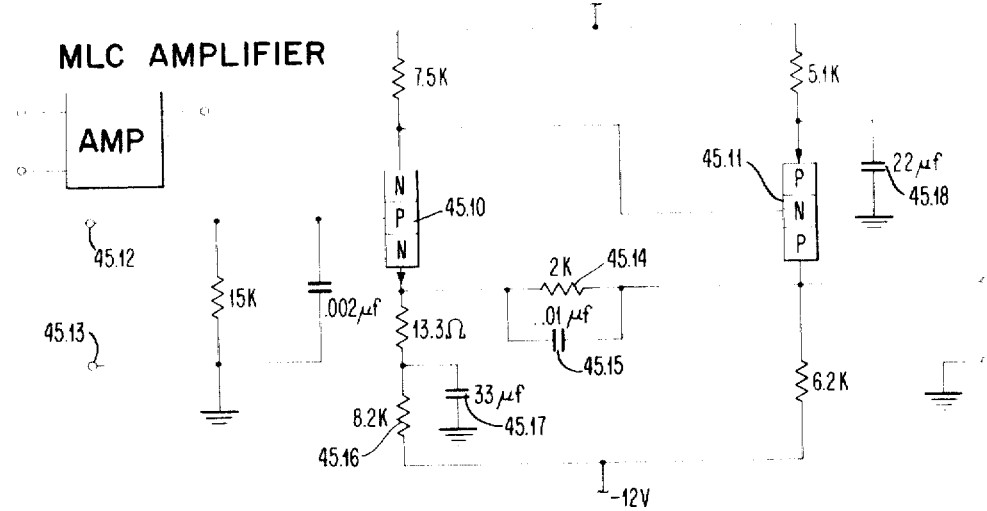

The input to this circuit, FIG. 44, is the output of the MLC amplifier, FIG. 45. The input to this shaper amplifier is coupled for alternating currents through a capacitor 44.10 to the base of transistor 44.11.

In the quiescent condition of the circuit, transistor 44.11 is biased to saturation and transistor 44.12 is biased to cutoff. The diode 44.13 is reversely biased from +12 volts through the potential divider comprising resistors 44.14, 44.15 and 44.16 to —6 v.

The collector of transistor 44.11 is cross-coupled through a capacitor 44.17 to the base of transistor 44.12.

In response to a negative input pulse, transistor 44.11 is cut off, its collector rises in potential rapidly, this is applied to the base of transistor 44.12 to render it conductive. Capacitor 44.17 charges rapidly through the base-emitter junction of transistor 44.12 and resistor 44.18.

During the charging time of capacitor 44.17, the collector of transistor 44.12 is at ground and a negative pulse is applied to the base of transistor 44.11 through resistor 44.15 and capacitor 44.19. This holds transistor 44.11 off during this period. When capacitor 44.17 charges, the —6 v. to the base of transistor 44.12 turns it off and the diode again is reversely biased by the potential at the collector of transistor 44.12. Transistor 44.11 will turn on and the circuit will resume its quiescent state.

MLC Amplifier

This circuit, FIG. 45, has as its input, the output of the read coil of the magnetic head of the MLC unit. The circuit is a two stage direct coupled amplifier. In its quiescent state with no input applied, the transistor 45.10 is biased to partial conduction and transistor 45.11 is also biased to partial conduction. A typical input signal is approximately a sine wave with leading edge negative and with maximum swing 15 to 40 mv. An input signal is applied across terminals 45.12 and 45.13 to the base of transistor 45.10. This first reduces conduction therein and then increases conduction therein but not to cut-off nor to saturation. When transistor 45.10 is driven to lesser conduction, its collector potential rises. This is applied to the base of transistor 45.11, reducing its conduction, and driving its collector negative. With a positive input signal, transistor 45.10 conducts, its collector drops, its conduction is increased and it becomes saturated. Resistor 45.14, capacitor 45.15 and resistor 45.16 provide negative feedback and stabilization. Capacitors 45.17 and 45.18 are A.C. bypass capacitors.

Dot Functions

Many of the basic CTRL circuits can be connected to provide a logical function without the use of additional transistors. The connection is shown as a dot (·) and the logical function is known as a DOT function. The output transistors of the circuits that enter into the DOT function are connected to a common load. Any one of the transistors involved can conduct and cause a voltage drop to occur across the common load, thereby changing the output level. In this sense, all DOT functions are OR logic circuits. However, if the line level sought is possible only when none of the transistors conducts, the DOT function can be considered as And circuitry. The sign of a DOT OR function is opposite to the sign of the same circuitry performing a DOT And function. FIGS. 46a–46d give examples of DOT functions. FIGS. 47a–47d show the circuit details of each. The sign and function of the circuits feeding the DOT function must be considered in determining the DOT output. In those functional blocks (A, O, or C) that are normally signed, the sign refers to the individual block. The DOT function, owing to signal inversion, is of the opposite sign. For example, the —CO and —AO blocks in FIG. 46a are —C and —A blocks respectively, and the DOT function is +O. In those blocks not normally signed (DE, DSP, etc.), the sign refers to the DOT Function.

CLOCK CIRCUITS

Initial Conditions

In FIG. 48, a Start Trigger 48.10 is provided. It is necessary to condition a Start Trigger Gate latch 48.17 in order to turn on the Start trigger and start the Clock. A signal to do this is supplied in most instances from the relay section of the machine. Start signals can also be derived from the electronic logic. The relay signal originates from +48 volts and is directed by a 64-4 N/C relay point, FIG. 48. It is applied to an Integrator 48.11. The +48 volts is translated to a +S level by the Integrator 48.11, and applied to the P input of +And 48.12.

The other inputs of +And 48.12 are conditioned by other logic having to do with Magnetic Ledger Card operations. For example, a +48 volt signal to the Record hub on the control panel is integrated by another Integrator 48.13, and applied to the Q input of a +And 48.14. At the moment, it is assumed that the machine is not in a magnetic ledger card operation. The input at pin E of Integrator 48.13 is therefore at a —W (ground) level, and its output is a —S level, which is applied to the Q input of +And 48.14. The +And 48.14 supplies a +S level to the Q input of +And 48.12.

The third input R of the +And 48.12 is conditioned by the output of a +And 48.15. This +And, in turn, has three inputs. One is pin S from an Integrator 48.16. Relay 64–4 N/O point, FIG. 48, is open at this time, so the input of Integrator 48.16 is —W (ground or zero), and its output is —S. This is applied at pin S of +And 48.15, so its pin R output is +S. This is applied to input pin R of +And 48.12. All inputs of +And 48.12 are +S at this time, so its output at pin D is —S. This —S level is applied to pin P of the Start Trigger Gate Latch 48.17. This sets the Latch to its on condition. The output pin D of the Latch 48.17 is +S. This +S is fed back to pin F of 48.17. Pin G of 48.17 will be —S only for reset. This is a relay signal which is applied during the relay cycle from FIG. 90 under control of Relay 60, FIG. 107, and Relay 501, FIG. 106. Originally, latch 48.17 was restored to its off state by a —S DC Reset signal. At the present time, the DC Reset line has returned to its +S level. Pin H of 48.17 is +S on Not Start, and is derived from the Start trigger itself. This line is therefore +S. Pins C and L of 48.17 are now minus which gives a —S input to pin R of 48.17 to keep the latch set on.

The +S output of the Start latch 48.17, pin D, is applied to pin B of the Start trigger 48.10. The Start trigger has an And circuit gating arrangement. The pin C input to 48.10 comes from the output of a —Or at 48.18. The X input of —Or 48.18 comes from the +And 48.15 whose output at this time is +S. The input at pin Y is also +S at this time.

*Starting the Clock*

Figure 106:
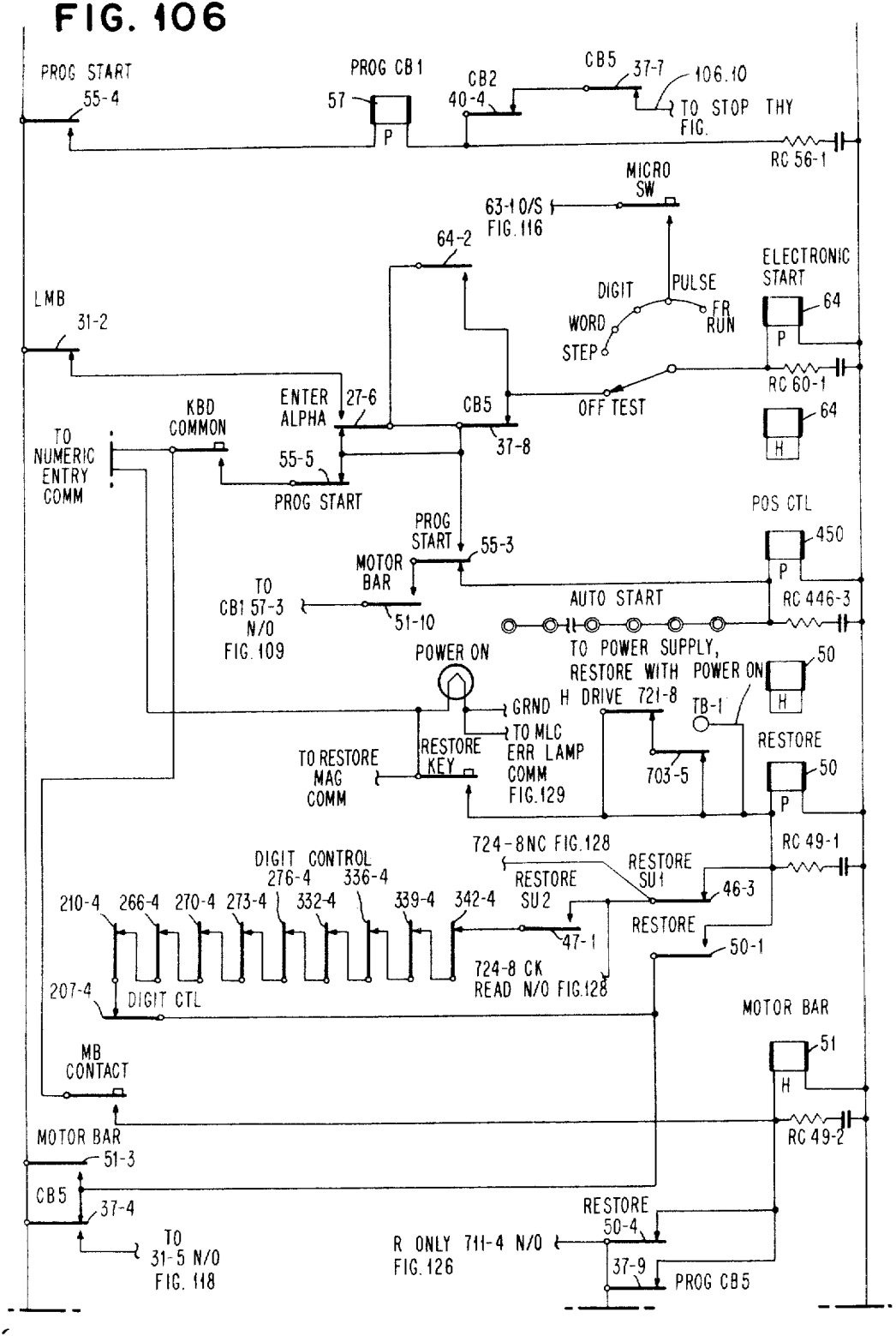

Start Relay 64, FIG. 106, which is the Electronic Start relay, is now energized. When in its de-energized condition, the Start Latch was set on.

The energization of Relay 64 normally results from a signal from some other machine operation, such as where the machine indicates that it is ready for an arithmetic operation. However, starting the electronics during Print Out is initiated under control of the typewriter. The typewriter contacts are ORed with the 64–4 point and come into the same Integrator circuit 48.16.

To summarize, the 64–4 N/O signal comes into Integrator 48.16, is changed to a +S level, and conditions the +And 48.15. Another input T of 48.15 is +S, being —S only at End LA Memory. The other input to 48.15 comes from another +And 48.19. Its injuts are Q trigger and MLC operation. The latter is —S, so the +And 48.19 output is +S to the first mentioned +And 48.15. The +And 48.15 output of —S goes to the —Or 48.18 input X, which gives a +S output. This is applied to pin C of the Start trigger 48.10.

Figure 50:
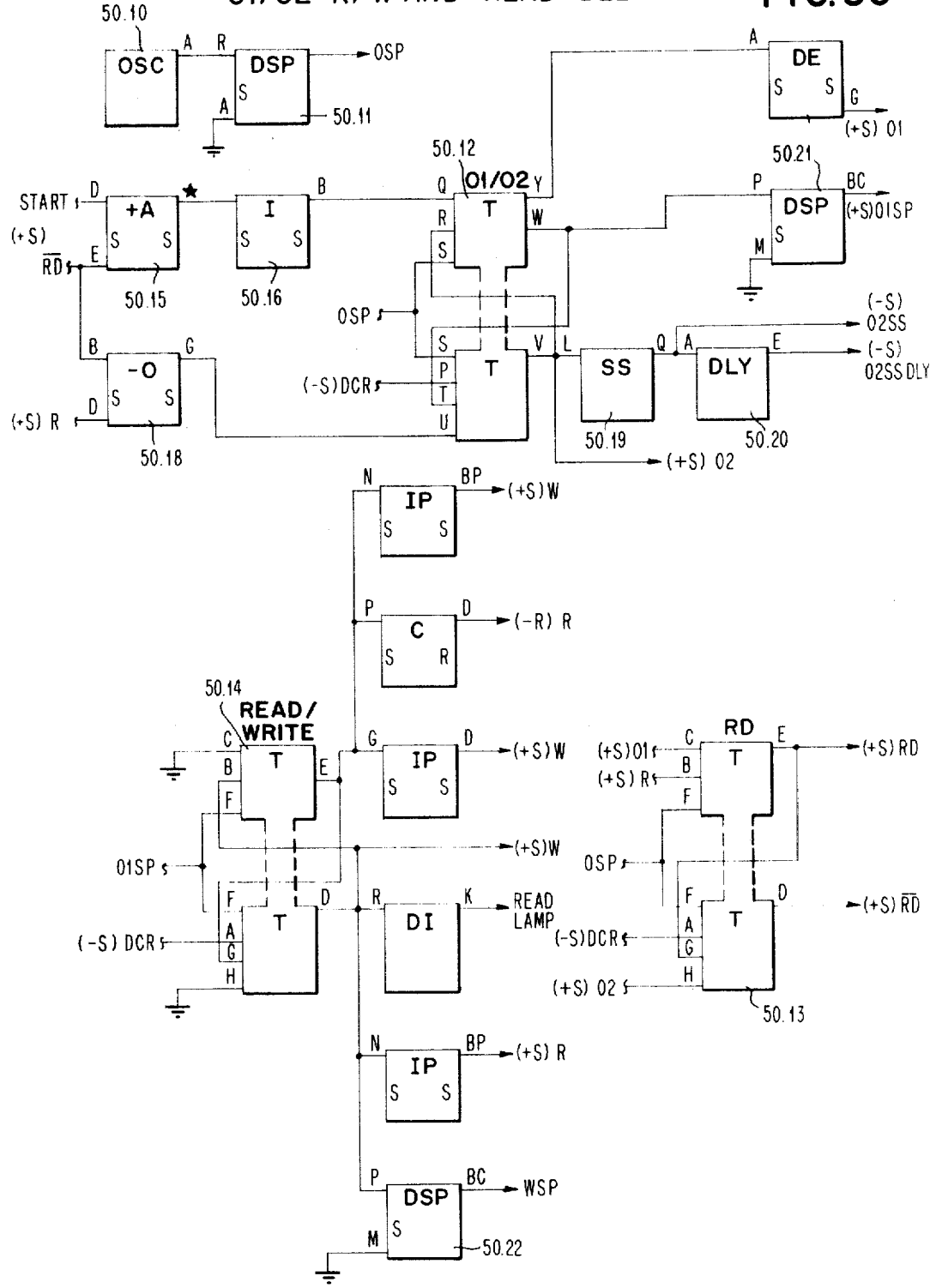

The Sample Pulse (OSP) input to the Start trigger 48.10 comes from the Oscillator Sample Pulse Driver, 50.11, FIG. 50. The oscillator 50.10 is constantly running whenever power is on the machine.

Figure 90:
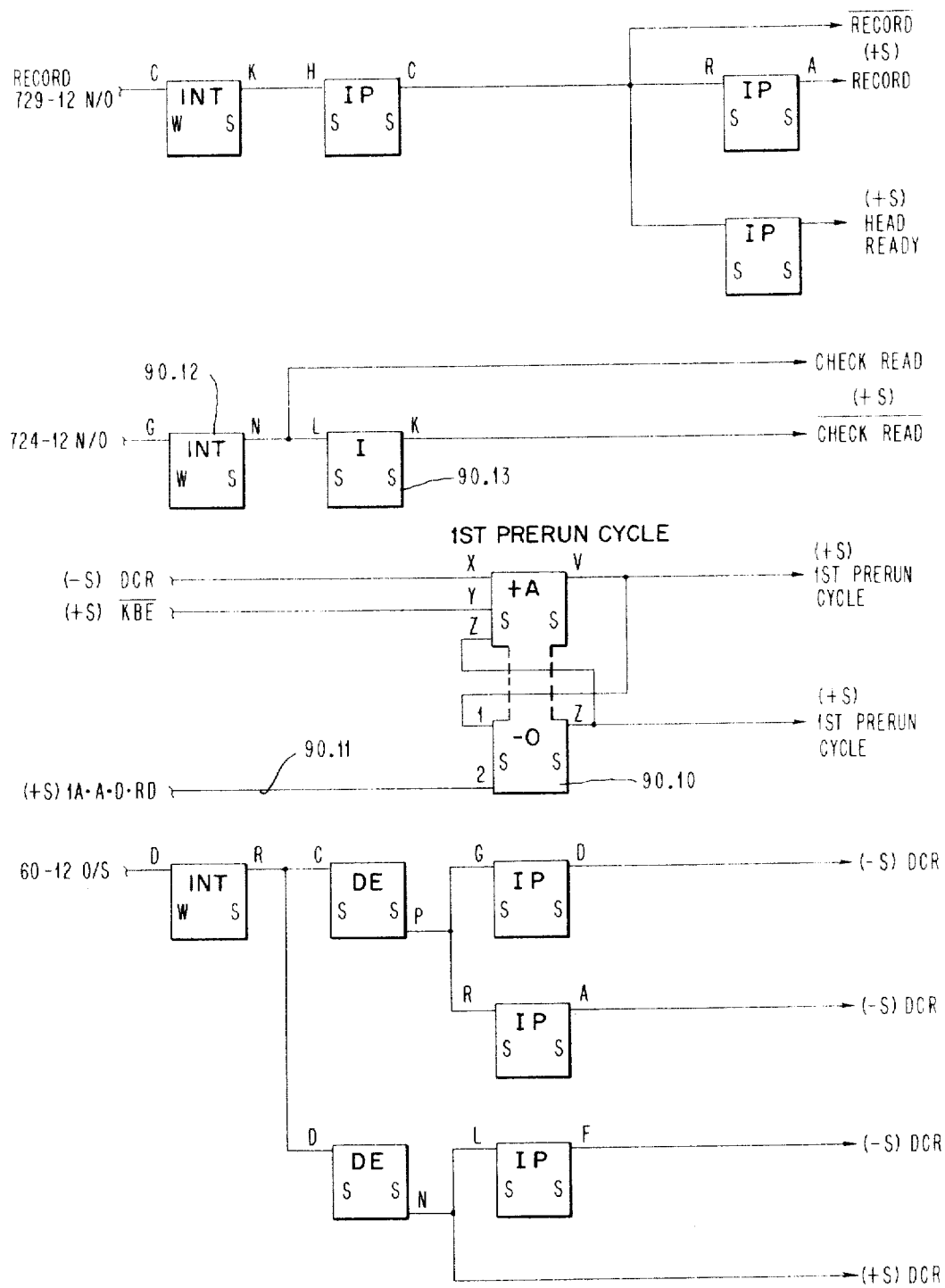

Referring to the Timing Chart FIG. 17, the turn on of the Start trigger is indicated at 17.28. Various triggers, 01/02, etc. are set to the conditions shown in FIG. 17 immediately prior to the turn on of the Start trigger by the DC reset interval which preceded the energization of Relay 64. Reference is made to FIG. 90 for some of the reset circuits.

In FIG. 50, an output from the Start trigger 48.10 is applied to one input of the +And at 50.15. A +S Not Read Delay is applied to the other input. The output of this +And becomes —S, is inverted by Inverter 50.16 through internal wiring as indicated by the star (*). Inverter 50.16 output is +S. This is one of the gates to the 01/02 trigger at 50.12. The other gate of 50.12 is conditioned from the off side of the same trigger. The 01/02 trigger turns on with the next Sample pulse from the oscillator.

Referring to the Read/Write trigger 50.14, lower left in FIG. 50, one gate (Pin C) is at ground and is therefore +S at all times. Gate B of 50.14 comes from the offside of the trigger, which is off at this time. The Read/Write trigger is turned on to the Read state by the first 01 Sample pulse. This comes from the Sample Pulse Driver 50.17 which gets a +S signal from pin W of the 01/02 trigger.

Consider now the turn on of the Read Delay trigger 50.13, FIG. 50. Pin C is +S on an 01 output. Pin B is +S when the Read trigger turns on. The next Oscillator Sample pulse (OSP) turns on the Read Delay trigger.

Looking at the 01/02 trigger again, gate T is gated +S from the on side of 01/02. The other gate at pin U comes from a —Or 50.18. This —Or has an input at pin B which was +S. It is now —S since Read Delay is on. The output of the —Or 50.18 is now +S so the 01/02 trigger turns off with the next oscillator sample pulse.

A Single Shot at 50.19 is driven from pin V of the 01/02 trigger. As pin V goes +S, the Single Shot 50.19 supplies an output at pin Q. This output is split into a first line labelled 02 Single Shot, and a second line which goes through a Delay line 50.20 and becomes 02 Single Shot Delay. These lines are subsequently used for firing the Memory Drivers.

In the Timing Chart of FIG. 17, the next action is the turn off of the Read Delay (RD) trigger. In FIG. 50, the Read Delay trigger 50.13 is gated by its own on side output at input G. Input H is +S from the off side of the 01/02 trigger, which has just turned off. The next Oscillator Sample Pulse (OSP) turns the Read Delay trigger off.

The 01/02 trigger 50.12 is gated to turn on once more from the +And 50.15 pins D and E. Pin D is +S (Start Trigger). Pin E is now +S with the Read Delay trigger off. The —S output of the +And 50.15, after inversion, is applied as a +S level at pin Q of the 01/02 trigger to turn it on with the next Oscillator Sample Pulse (OSP).

The output of the 01/02 Sample Pulse Driver 50.21 sets the Read/Write trigger 50.14 off, or to its Write state, since pins G and H are at +S. A +S Write Sample Pulse is supplied at this time from the Sample Pulse Driver at 50.22 which is used during the Write interval.

With the next Oscillator Sample Pulse, the 01/02 trigger 50.12 goes to its off, or 02 state. The circuit for turn-off is somewhat different from that which transpired during the Read part of the cycle. Input pin D of the —Or 50.18 +S at Read time. Since the Read/Write trigger 50.14 is now in the Write state, this input is —S. The output of the —Or 50.18 is +S and conditions the 01/02 trigger 50.12 to be turned off, or to its 02 state with the next Oscillator Sample Pulse. This bypasses the Read Delay (RD) input to the —Or 50.18 which was used earlier. This establishes a shorter 01/02 cycle for the 01/02 trigger during Write time than that which was established during Read time. The reason for making the 01/02 cycles longer for Read than for Write time, is that more logic is performed during Read Time, and more time is required by the arithmetic portion of the machine.

As the 01/02 trigger 50.12 changes to its 02 state, the 02 Single Shot 50.19 is fired and provides a signal for firing the Write Drivers to write a bit into memory.

The Read Delay trigger 50.13 being off, in conjunction with +S Start at +And 50.15 provides a gate so that the 01/02 trigger 50.12 will turn on with the next Oscillator Sample Pulse, as previously described.

When turned on, the 01/02 trigger causes the 01 Sample Pulse Driver 50.21 to fire. The output of 50.21 is again applied to the Read/Write trigger to change to its Read state.

Normally, during X time, the programmed operator word of memory will be addressed for reading and writing, while during Y time, the programmed operand word of memory will be addressed for reading and writing.

Figure 51:
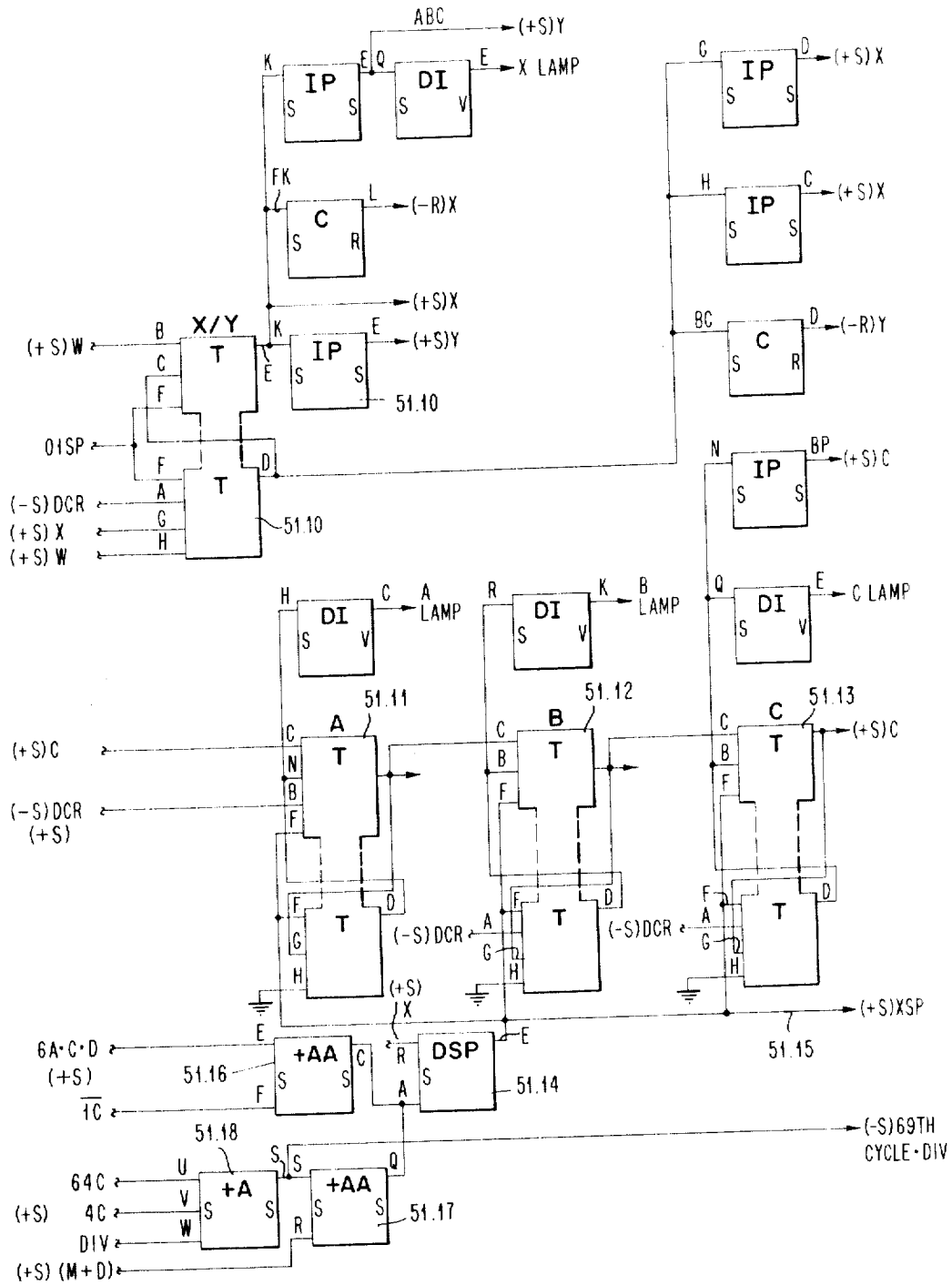

Referring to FIG. 51, an X/Y trigger 51.10 is provided for this purpose. This trigger was initially reset to its Y state prior to starting the clock. It is now necessary to change the X/Y trigger to its X state.

The X/Y trigger is conditioned for this by its own +S Y output on pin C and by a +S at Write time at pin B. At the end of Write time, X time, the X/Y trigger will change to its Y state upon application of the 01 Sample Pulse at pin F.

Referring to the timing chart, FIG. 17, when the X/Y trigger changes to its Y state, it will be noted that the other triggers, such as 01/02, and Read/Write, will proceed through cycles similar to those which occurred when the X/Y trigger was in its X state. The same 01 Sample Pulse that just changed the state of the Read/Write trigger to the Read state, will also change the state of the X/Y trigger to the Y state. Both the Read/Write trigger and the X/Y trigger are changing state at the same instant, with the same 01 Sample Pulse. It should be noted that one of the gates (pin H) to the X/Y trigger 51.10 is the Write output of the Read/Write trigger, which was the state of the latter up to the time of the present change in state. The Read/Write trigger is changing to its +S Read state at the same time that its +S Write output is being used to gate the X/Y trigger.

There is no race condition however, due to the fact that the gate input H of the X/Y trigger is through a resistor gate. The 01 Sample Pulse is applied through capacitor, gates (pin F). The RC time constant is such that the 01 Sample Pulse rises at the F input of the X/Y trigger long before the +S output of the Read/Write trigger at pin H of the X/Y trigger has dropped.

At the end of Y time, the X/Y trigger is conditioned for changing again to its X state. The turn on gate, pin B is +S during Write time, Y time. Pin C is +S when the X/Y trigger is off (Y state), as at present. The X/Y trigger will change to its X state with the next 01 Sample Pulse. At the end of each Write time with the occurrence of the 01 Sample Pulse, the X/Y trigger will change its state in a similar manner.

The ABC ring is shown in the lower part of FIG. 51. The ring comprises an A trigger 51.11, a B trigger 51.12 and a C trigger 51.13. Trigger B is considered on at the present time.

At the beginning of each X time, the ABC ring will be advanced, as can be seen in the timing chart, FIG. 17. The ring was initially reset with A on. B was turned on at the first X time.

A Sample Pulse Driver 51.14 supplies pulses for stepping the ABC ring. This driver delivers X Sample pulses on line 51.15. These are used in various other logic, as well as the ABC ring. Driver 51.14 is gated by +AA blocks 51.16 and 51.17. The A input of the Sample Pulse Driver 51.14 requires a +S level. This will occur if any input of the two +AA blocks 51.16 and 51.17 is —S. There are a number of possible conditions for this.

This circuit is better thought of as an inhibit circuit. Firing of of the Sample Pulse Driver 51.14 will be inhibited, for example, during Multiplication or Division under certain conditions. Input R of +AA 51.17 will be +S. Also the +And 51.18 will provide a —S to the +AA 51.17 during a particular interval of the Divide sequence.

The +AA 51.16 will inhibit stepping of the ABC ring for other Divide conditions. Inputs of +AA 51.16 and +And 51.18 include outputs of the C counter which is used during Multiply and Divide operations. Inputs 6A and C and D are clock inputs.

The gate (pin A) to the DSP 51.14 is normally +S. Therefore, when the X/Y trigger changes to its X state, the A.-C. input R of 51.14 receives a positive shift, and the Sample Pulse Driver will deliver a pulse.

As assumed, trigger B was in its on state. It is gated to turn off by its own On output at pin G. Also pin H is gated to ground. Therefore, the X Sample Pulse at pin F will turn the B trigger off. At the same time, trigger C will turn on. Trigger C was gated by the +S on output of trigger B at pin C.

The clock started with trigger A turning off, and trigger B turning on. The Sign Bit trigger is gated on by +And 52.12. This +And is gated by Write, Not D, 1A and A. 1A is the first position of the 1A–6A ring, FIG. 53. The Sign Bit trigger defines the time during an arithmetic operation when the Sign bits of the programmed words in the memory are brought out and analyzed in order to determine the sign of the operation programmed. The Sign Bit trigger will turn back off again with the next X Sample Pulse, which occurs when the B trigger turns off.

The D trigger 52.10, at the top of FIG. 52, cooperates with the Read/Write Trigger 50.14, FIG. 50, in addressing the bits of the memory. The D trigger is in phase with the +S Read output of the Read/Write trigger during the first cycle of the ABC ring, and in phase with the +S Write output of the Read/Write trigger during the next cycle of the ABC ring, as shown in timing chart, FIG. 17. Initially, the D trigger is off. It is gated on by a +And 52.13 which receives C, Y and Write signals. C is trigger C of the ABC ring, Y is the Off side output of the X/Y trigger, and Write is the off side output of the Read/Write trigger.

Pin B of the D trigger is +S at all times except when the inputs of +And 52.13 are all +S. At all other times, the D trigger changes state regularly under control of the 01 Sample Pulse, line 52.14, just as the Read/Write trigger changes state with the 01 Sample Pulse. The D trigger will therefore step except when C, Y, and Write are +S, when it will not step. This causes a change in phase of the D trigger with respect to the Read/Write trigger.

Having noted the operation of the primary Clock triggers, that is, the 01/02 trigger the Read/Write trigger, the Read Delay trigger, the X/Y trigger, the D trigger, and the ABC ring, the A Counter will now be discussed.

Figure 53:
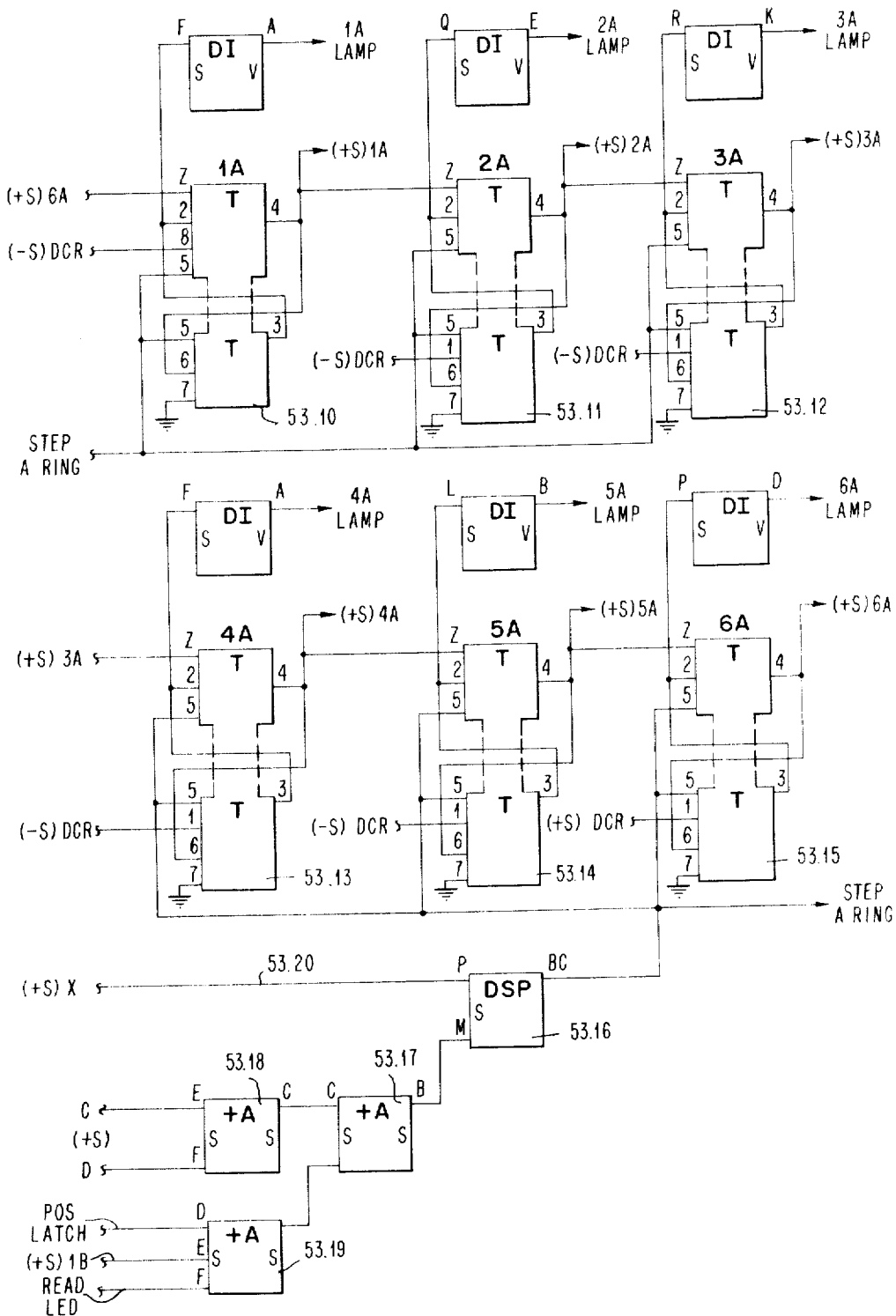

The A Counter, FIG. 53, is a ring Counter with six triggers, 1A–6A, respectively designated 53.10—53–15. The DC Reset is applied to the A counter in a manner to set 1A on at the beginning of the Start sequence.

Referring to the Timing chart, FIG. 17, the 1A–6A status can be observed. The 1A trigger is on from Dummy Digit through Digit 4 time. At the end of Digit 4 time the Sample Pulse Driver 53.16, FIG. 53, is conditioned to supply a pulse to step the A counter.

The input M of the DSP 53.16 is gated by a +S output from the +And 53.17. This +And in turn is conditioned by a +And 53.18 and a +And 53.19. Triggers C and D condition the +And 53.18. Position Latch, trigger 1B in the B counter, and Read Ledger inputs condition the +And 53.19. At this time +And 53.18 is of interest. Trigger C of the ABC ring has supplied +S outputs at two different times while the 1A trigger 53.10 was on. Referring to FIG. 17, trigger C is on during Digit 1 time and during Digit 4 time.

The Sample Pulse applied to Sample Pulse Driver 53.16 is from the X/Y trigger when it changes to its X state. It will be seen that the D trigger is off at the end of Digit 1 time, so that +And 53.18 output is +S. The D trigger is on at the end of Digit 4 time, so that the +And 53.18 output is —S. This results in a +S to gate M of Sample Pulse Driver 53.16 and the Driver fires to step the 1A–6A ring. Trigger 1A turns off, and 2A turns on. Trigger 1A on side output (pin 4) gates trigger 2A. The A counter steps in this manner, each individual step, 1A, 2A, etc. defining 6 bit times in memory, and the entire stepping sequence, or cycle, 1A through 6A, defining 36 bit times or 1 word in memory. In FIG. 17, the normal Start time is at the end of the Dummy Digit time. The Clock also stops at the end of Dummy Digit time. For MLC operations, the Clock will start at the end of Dummy Digit time for the first word cycle, but thereafter, it may start and stop at various times to be described.

The Clock may run for a multiplicity of word cycles, depending on the type of operation. For example, a normal Addition takes only one word time. Subtraction normally takes only one word time unless the algebraic sign is changed. In that case, the machine goes through another word time to recomplement the number. Multiplication and Division take seventy (70) cycles or seventy (70) word times.

In the case of Type or Print the speed is determined by the speed of the output printer, so the machine runs a while, supplies the printer with a character, stops the clock, and waits for the printer to cycle. The printer itself then restarts electronics.

*Stopping the Clock*

Figure 49:
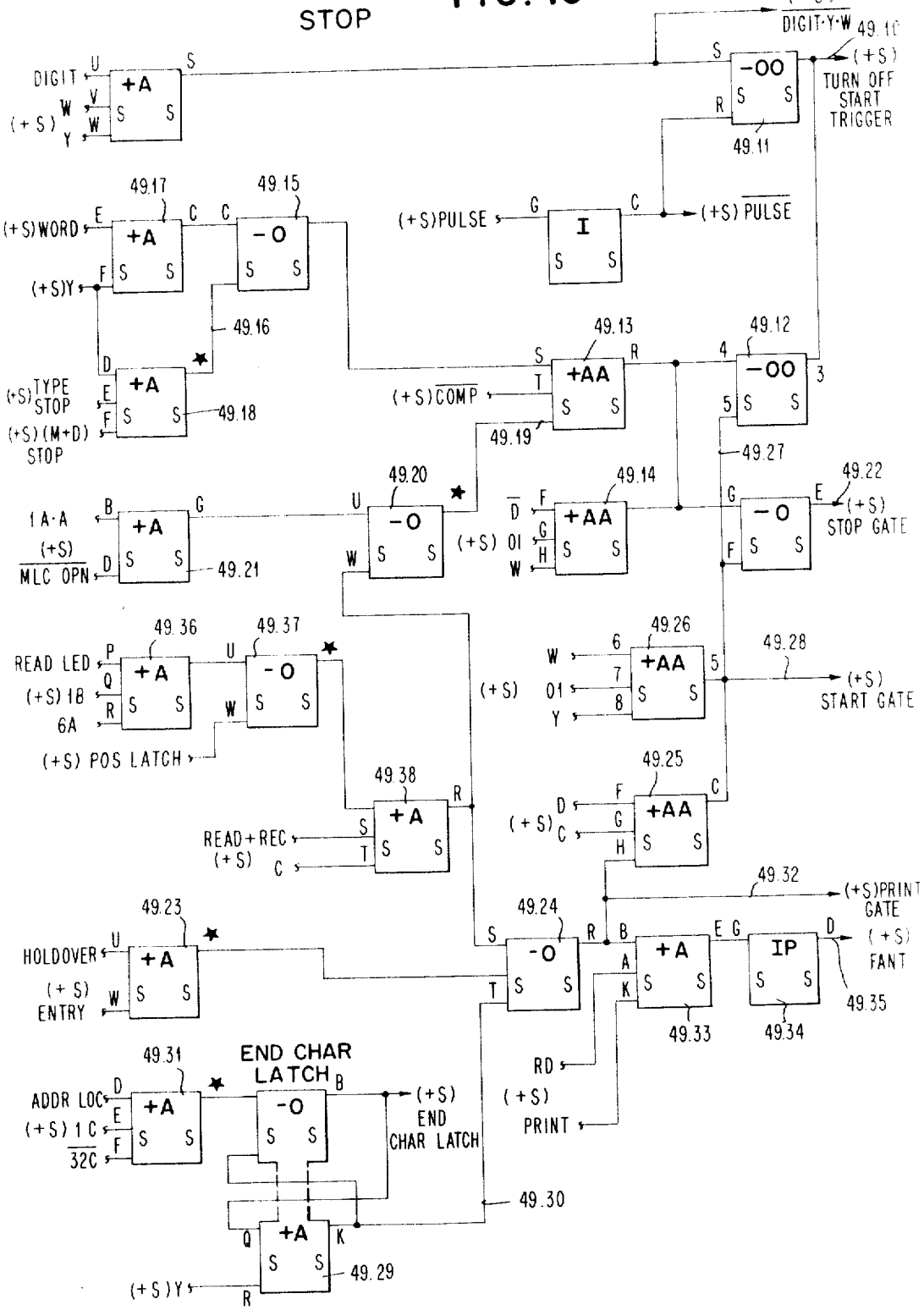

This part of the electronics is in FIG. 49. There are a number of ways to stop the Clock. The signal used is a +S Turn Off Start Trigger output on line 49.10. This line goes back to FIG. 48, to line 48.20. The signal in FIG. 49 comes from two —OO blocks at 49.11 and 49.12, outputs at Q and 3. There are four input conditions to these blocks which will stop the clock.

The first condition is at pin 4, of 49.12. A —S at pin 4 will stop the clock. Two +AA blocks at 49.13 and 49.14 cooperate to produce this signal. Each of these blocks has three input lines. Therefore, six conditions must be satisfied in order to produce a —S level at pin 4 of the —OO 49.12.

Pin S of +AA 49.13 comes from a —Or 49.15 which has inputs at C and 49.16. These originate at a +And 49.17 and a +And 49.18. Pin F of +And 49.17 and pin D of +And 49.18 are +S when the X/Y trigger is in its Y state. Pin E of +And 49.18 is +S on Type Stop. This is +S during a Numeric Type operation and will stop the clock. Pin F of +And 49.18 is marked Multiply or Divide Stop. Except for certain conditions, pins E and F at 49.18 will be +S during the times mentioned. When the X/Y triger is in its Y state, the output of the +And 49.18 will be —S. A +S is derived from the —Or 49.15 to the pin S of the +AA block 49.13. This will occur at each Y time, except when the machine has to go through a number of cycles as in Type, Multiply or Divide.

Pin T to +AA 49.13 is +S Not Complement. This refers to the Complement trigger. This trigger is in the arithmetic logic. It turns on when a Subtract operation has occurred and indicates that it is necessary to change the sign of the Y time (In) word and to take an additional cycle to recomplement the number in the Y time (In) word before the clock is stopped. Input T of 49.13 will inhibit stopping of the clock under those conditions.

The input 49.19 to +AA 49.13 originates at a —Or 49.20 with inputs at U and W. These inputs originate under certain Magnetic Ledger Card conditions. For example, feeding pin U is a +And 49.21 with inputs 1A and A. These are trigger 1A of the 1A–6A ring, and trigger A of the ABC ring. The other input is +S on Not MLC Operation. Under these conditions, the input at pin U of 49.20 is —S at 1A and A time. The input at pin 49.19 of +AA 49.13 is +S.

During MLC operations, it is necessary to analyze the other logic feeding pin W of the —Or 49.20. This logic concerns Read Ledger and Record Ledger. The stopping then would be at times other than 1A and A, as required during traversing of the magnetic reading/recording head across the ledger card.

It will be assumed that stopping at the present time will be at 1A–A time. In order to Stop, the +AA 49.14 must be conditioned. Pin F of 49.14 is +S when the D trigger is off. Pin G is +S when the 01/02 trigger is in its 01 state. Pin H is +S when the Read/Write trigger is in its Write state.

In the timing chart of FIG. 17, it can be seen that these conditions are satisfied near the end of Dummy Digit time during the second to last oscillator interval marked Gate Stop. At this time the +S Turn Off Start Trigger signal is available on line 49.10, FIG. 49. This is applied to pin H of the Start trigger, FIG. 48 as one of conditions to stop it. Pin G of the Start trigger will have a +S level from the 01/02 trigger when in its 01 state. The Clock is actually stopped with the next occurring Oscillator Sample Pulse, pin F of the Start trigger. This pulse is designated Stop in FIG. 17 at 17.25.

The Clock stops as indicated under normal conditions including all Arithmetic operations and Numeric Type Operations. It should be noted that the Clock does not necessarily stop on each cycle during normal operations, but may be inhibited from stopping during Multiply or Divide, or Type operations by appropriate inputs to pins E and F of +And 49.18.

The clock stops under various conditions and at various predetermined times during the Magnetic Ledger operations, which include Read Ledger, Record Ledger, Alphanumeric Print and Alphanumeric Entry. A servicing switch 48.21 in FIG. 48 permits manual starting and stopping of the clock.

DATA TRANSFER AND MEMORY SELECTION

A detailed step by step program for preparing an invoice is described in the aforementioned application Serial No. 248,110, J. E. MacDonald et al.

A number of machine functions occur during the course of the aforementioned program which involve data flow to and from memory.

The primary entry and output actions in the machine which involve data transfer and memory selection are:

(1) Numeric Entry
(2) Numeric Type
(3) Alphanumeric Entry
(4) Alphanumeric Print
(5) Read Ledger
(6) Record Ledger Because of the variety of operations that are performed by the machine, considerable flexibility is provided in the data transfer control, memory organization, and memory selection areas of the machine.

For example, according to one novel aspect of the invention, provision is made for both direct word selection and sequential word selection. Direct word selection may by made at any program step by wiring the desired In-word entry hub or Out-word entry hub. Sequential selection occurs under a number of conditions. Operations involving sequential addressing of memory are under control of the B Counter, which is assisted in several operations by the C Counter.

*B Counter*

The B Counter directly controls sequencing (addressing) of word drive lines in memory. This occurs during two basic types of operations in the machine.

One is an operation involving the use of fixed factors such as the decoding required during the Type operation. As noted, the fixed factors are physical words of memory. They must be sequenced in a predetermined order during a Type or Shift operation. The B Counter performs this task.

The other general type of operation which involves sequential addressing occurs during an Alphanumeric Entry, an Alphanumeric Print Operation, a Read Ledger Operation or a Record Ledger Operation, the first two operations just mentioned involve searching for a desired field of MLC memory, and the B counter plays a prominent role in addressing memory. The B Counter also addresses memory sequentially for the other two operations. The B Counter, therefore, is used to sequence words of memory in the two basic types of operations where words of memory must be sequenced and not addressed directly from the control panel.

The B Counter is initially set up under control of the control panel in a manner that is dependent on the type of operation, as will be subsequently described in detail. As a preliminary example however, the B Counter may be wired from the Digit Capacity or Shift hubs, FIGS. 6 and 76 for sequentially selecting fixed factors for use during Type or Column Shift operations. The B Counter may also be set up from the control panel by means of a wire into a Begin Alpha hub, FIGS. 6 and 76, and depending on its initial status, establishes where numeric information ends and where alphanumeric information begins in the MLC section of the memory.

Figure 82:
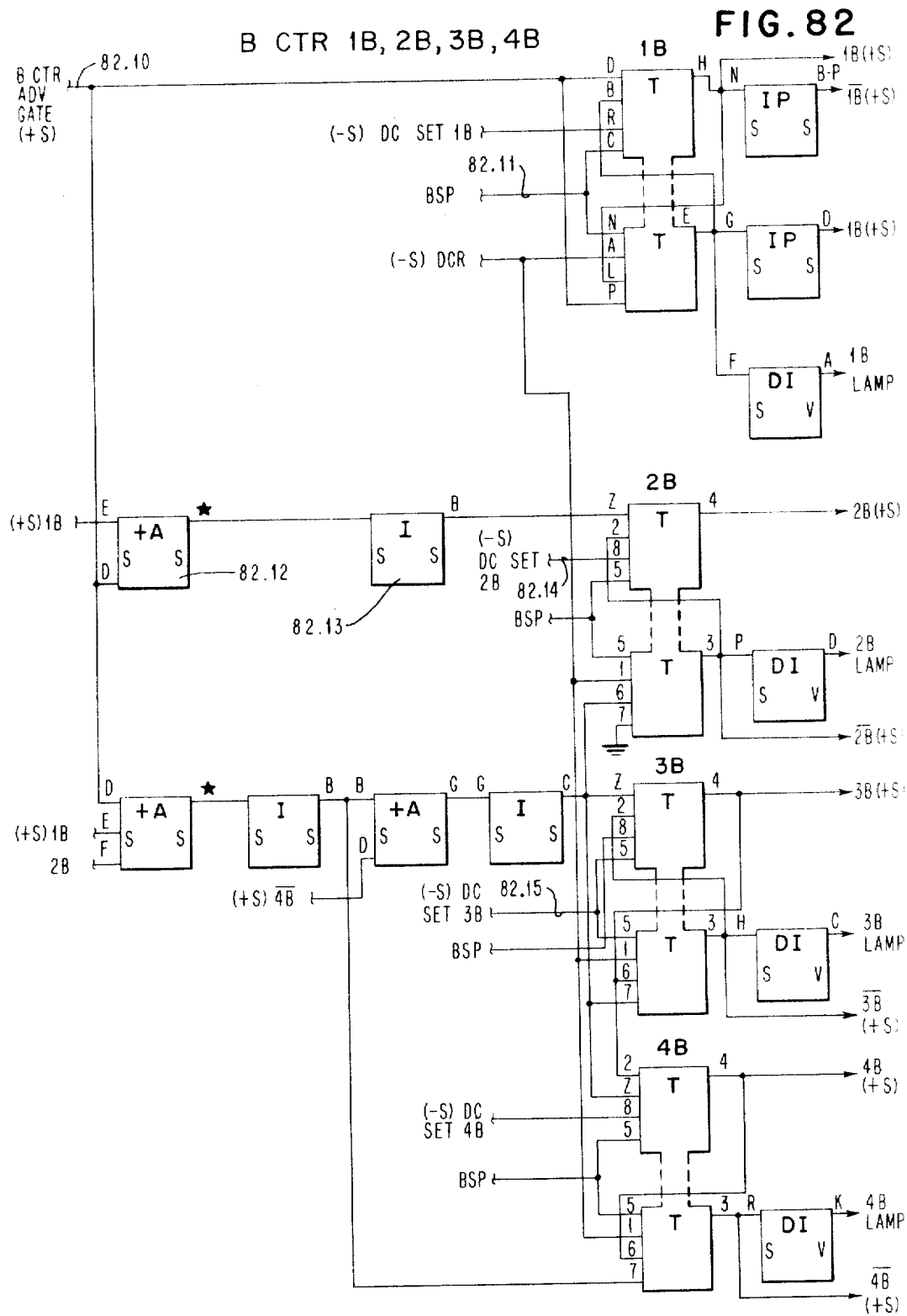
Figure 83:
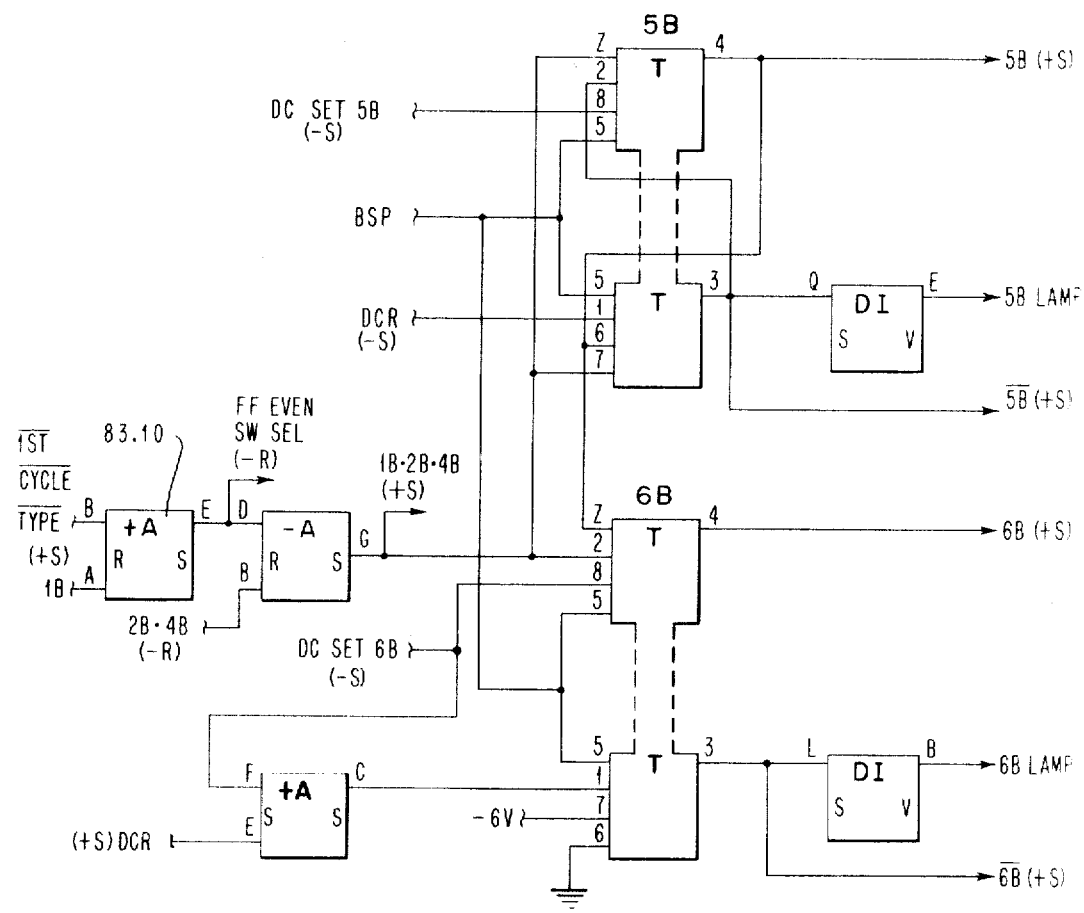

The B Counter comprises six triggers respectively designated 1B, 2B, 3B, 4B, 5B, and 6B. Positions 1B through 4B are shown in FIG. 82; and positions 5B and 6B are shown in FIG. 83. A table showing the various possible conditions of the B Counter appears in FIG. 77, and a sequence chart in FIG. 140.

Positions 1B, 2B, 3B, and 4B comprise a basic counter which can assume ten counts conditions, with the four positions having respective binary weighted values of 1–2–4–8. In each of the ten conditions, it is specified that the B Counter have a 1 bit in at least one position. Therefore, if the B Counter is left in a completely reset condition, it will have no effect on the memory selection circuitry.

Rather than counting 1 through 10 with the basic positions 1B–4B, the counter will count from 2 through 11 as can be seen in the table. The outputs of the B Counter during these ten basic count conditions are used to select the ten fixed factors.

In order to be able to address the forty words of MLC memory, the basic counter is expanded by the addition of triggers 5B and 6B. These have a value of 10 and 20 respectively. Positions 1B–4B can be used to address words 1–10 in MLC Memory. Trigger 5B is then set on and with positions 1B–4B being sequenced as before permits addressing words 11–20. Trigger 6B being on in connection with positions 1B–4B provides for addressing of words 21–30. Both 5B and 6B on in connection with triggers 1B–4B enable selection of Words 31–40 of MLC memory.

Positions 2B, 3B and 4B control selection of the five word drivers. Position 1B controls selection of two Fixed Factor Odd and Even Switches, thus giving the ten (5×2) combinations necessary for accessing Fixed Factor memory.

Positions 5B and 6B, together with position 1B, provide eight possible combinations each of which serves to select a particular read-write Switch combination for cooperation with the five word drivers. These combinations are:

| Status; | | | MLC Words | Read-Write Switch Combinations |
|---|---|---|---|---|
| 1B | 5B | 6B | | |
| $\overline{1B}$ | $\overline{5B}$ | $\overline{6B}$ | 1–10 | 3 |
| 1B | $\overline{5B}$ | $\overline{6B}$ | | 4 |
| $\overline{1B}$ | 5B | $\overline{6B}$ | 11–20 | 1 |
| 1B | 5B | $\overline{6B}$ | | 2 |
| $\overline{1B}$ | $\overline{5B}$ | 6B | 21–30 | 5 |
| 1B | $\overline{5B}$ | 6B | | 6 |
| $\overline{1B}$ | 5B | 6B | 31–40 | 7 |
| 1B | 5B | 6B | | 8 |

Figures 76, 77:
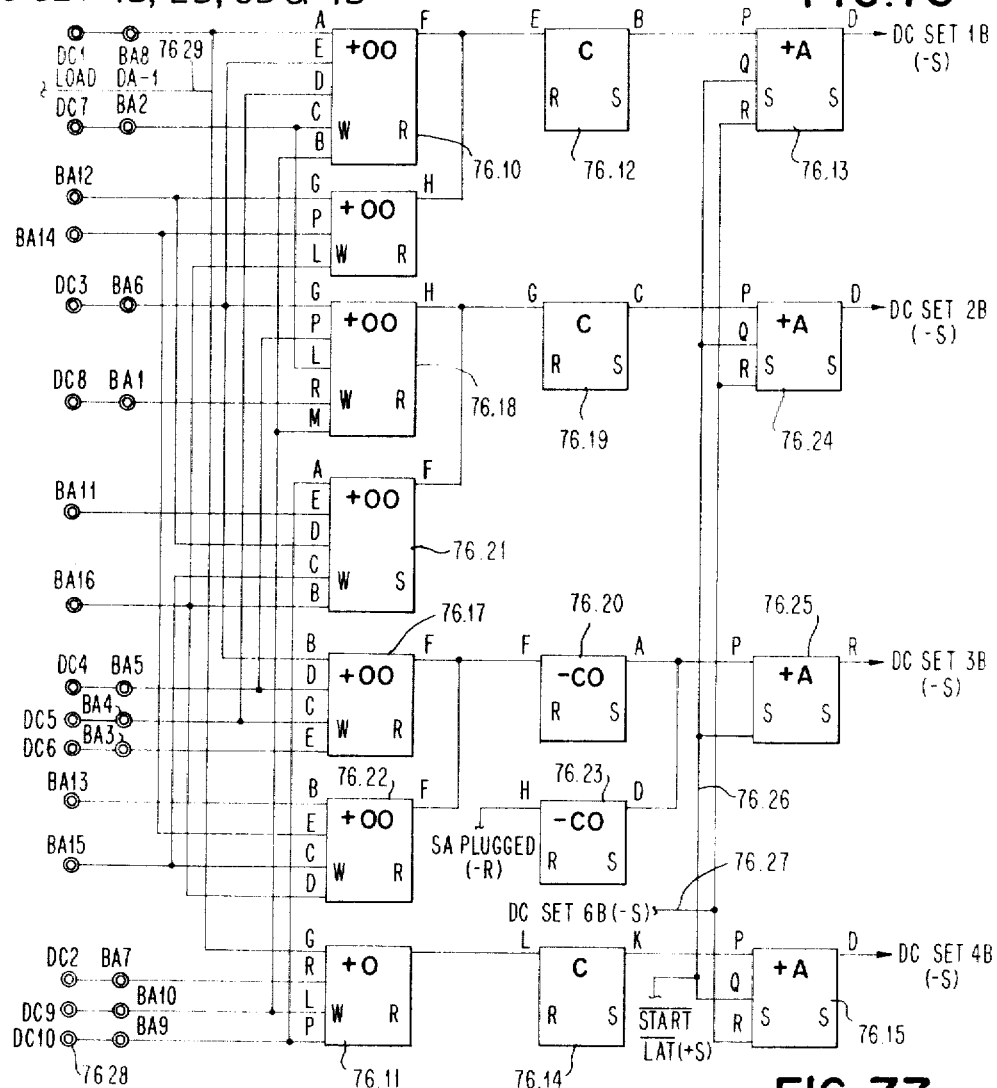

As will be brought out in detail, a single set of hubs, FIG. 76, enables setting up the B Counter for selection of fixed factors as required for the Type operation, and Column Shift operation. An example, and reference to the table of FIG. 77, will clarify this. If the machine is programmed for a Column Shift of two places, it is necessary to address the fixed factor which can be converted to 100 for use as a divisor. On the other hand, if a field width for digit capacity for typeout of two places is programmed, this means that the fixed factor 10, which is the one corresponding to the second position, is required. The B Counter is set up for a Type operation just as if the machine were going to do a Column Shift operation, but prior to manipulation of data, it is stepped down once so that the proper fixed factor is initially addressed.

The B Counter code was set up in order to minimize the amount of switching required for selecting any driver-switch combination needed to address memory positions. 2B, 3B and 4B address the five word drivers in whatever driver-switch combination they appear whether with fixed factor memory, main memory, or MLC memory.

*C Counter*

The C Counter, like the B Counter, plays a significant role in machine operations. This counter comprises seven trigger positions 1C, 2C, 4C, 8C, 16C, 32C, and 64C. Position 1C is shown in FIG. 85; positions 2C, 4C, and 8C in FIG. 86; and positions 16C, 32C and 64C in FIG. 87.

The C Counter is used in a number of ways. It is primarily used to control the addressing of memory during a field search and arithmetic circuits. In multi-cycle operations, such as multiply or divide, the C Counter is used to count cycles. The counter outputs can be used to determine if the cycle being performed is odd or even, which words are to be addressed in the cycle and when the operation has been completed. The C Counter is also used in a Type operation to count the number of successful subtractions made in the determination of the Digit to be typed.

The ledger operations require starting and stopping of the clock and time delays. This also is controlled by the C Counter.

Positions of this counter are identified by their binary value. The usual arrangement used in the operations is to start the clock when 32C turns on and stop the clock either from its own condition or from 32C turning off. Position 32C may or may not be turned off when the clock stops. In the ledger operations, 32C being off permits the C Counter to be stepped. For all timing, the C Counter is set up so that at the end of the desired count 32C will turn on.

The C Counter is also used for address searching and timing of delays during the operations of Alphanumeric Entry and Alphanumeric Print.

Address search is the same for both Entry and Print. The B Counter is set through plugboard wiring to the beginning of the LA section of memory and the C Counter is preset through the LA1–LA9 Address hubs so that counting fields will cause 16C to be on when the desired field is encountered. LA–1 is a special case since the desired address will always be in the B Counter at the beginning of an operation. Therefore, the LA–1 hub is connected to turn on the Address Located latch at the end of bit location six. For Entry, the clock is stopped at this time. For Print, the stop is at the end of bit location twelve.

For addresses other than LA–1, the clock runs and the B Counter steps each cycle scanning memory. Every time a Field Mark character is encountered, the C Counter is stepped twice. When 16C is on, and a Field Mark is encountered, the Address Located latch is turned on. In the Entry operation, the clock is stopped. For Print the clock runs for six more bit times. During Entry, when the search has been completed, the machine awaits the first typewriter cycle. When a key is struck, the transmitting contacts which are closed set the corresponding triggers in the Input/Output register to their on state. At the end of the typewriter cycle, which has a duration of approximately 21 milliseconds, the clock is started and the C Counter counts six idle character cycles. Idle cycles are necessary here to allow the transmitting contacts to settle before shifting is begun. At the end of the sixth cycle, the clock continues to run for six bit times during which the contents of the Input/Output Register is shifted into memory. The machine now awaits the next typewriter cycle. The Index key 7.23 on the Keyboard 1.20 controls the writing of the Field Mark character into memory. The Entry operation is terminated when the Start bar 7.17 is depressed.

During the Print operation, the clock continues to run for six bit times after the Address Located latch is turned on. During this time, six bits from memory shift into the Input/Output Register. The contents of the register are decoded to condition thyratrons. The stopping of the clock is accompanied by firing those thyratrons which have been conditioned. The typewriter will cycle as a result of firing thyratrons. Near the end of the cycle, the clock will be started by the typewriter contacts. At the same time, the C Counter will be set up to time six idle character cycles. These cycles are necessary to allow the typewriter cam contacts in the return path for the thyratrons to stop bouncing. At the end of the idle cycles the clock continues to run for six more bit times to shift out the next character then stops with associated firing of the thyratrons. Thus, the sequence continues until a Field Mark is decoded. When this happens, instead of firing a set of Print thyratrons, the thyratron to advance the program unit is fired.

NUMERIC ENTRY WITH MEMORY SELECTION BY DIRECT CONTROL PANEL WIRING

The form of memory selection will be illustrated in connection with a Numeric Entry operation in which a number comprising several decimal digits is entered by an operator into the Keyboard Buffer word, a translation to binary is performed concurrently with entry, and the completed binary translation is subsequently transferred from the Keyboard Buffer word to another word in memory selected by control panel wiring.

The arithmetic aspects of the entry of decimal information and its conversion to binary are covered in the aforementioned application, Ser. No. 112,116, now U.S. Patent 3,185,825, with W. L. McDonald and R. H. Thurmond as inventors.

However, a review of the entry techniques disclosed will be useful in understanding the direct word selection of the present invention. The source of numeric digits in the system is the numeric keyboard 1.21, FIG. 1. Decimal digits selected by means of keys on the keyboard 1.21 are automatically and mechanically converted to a 1-2-4-8 binary form. The first requirement of a Numeric Entry is to clear the Keyboard Buffer word in Main memory 1.36. The first decimal digit can then be written into the Keyboard Buffer word. More than one digit may be entered during the course of an entry operation, and it is necessary to perform a number of translation and conversion steps in order to insure that the contents of the Keyboard Buffer word truly represent the decimal entry in a correct binary form. In order to do this, two electronic cycles are required for each digit entered.

The Numeric Entry mode is established whenever the machine is in a restored condition and is not under program control. At this time, the memory address circuits are automatically set up to address the Keyboard Buffer word. The first cycle of an entry operation results in the clearing of the Keyboard Buffer word which is done by preventing any information from reaching the Storage trigger 66.10, FIG. 66. The bits of the Keyboard Buffer word are addressed in a sequential manner under control of the clock circuits, beginning with the Sign Bit position and progressing through the last bit position (34). Depression of the first numeric key involved initiates an electronic cycle. At each X time, the bits of information in the Keyboard Buffer word are read. However, the Storage trigger 66.10 is blocked so that no bits of information are transferred to the Accumulator trigger 66.11. At each Y time, the identical cores in the Keyboard Buffer word are read. Since no information was stored in the Keyboard Buffer word during X time, no information will be available for storage during Y time. In this way, the entire contents of the Keyboard Buffer word are cleared.

During the second cycle of the first digit, the 1-2-4-8 configuration of the first numeric entry is transferred from the mechanical contacts of the keyboard to the Accumulator trigger 66.11 and from there written into the Keyboard Buffer word. Sampling of the numeric keyboard contacts takes place during the first, second, third, and fourth bit times. The X address of memory is suppressed during this cycle and the information stored in the mechanical contacts is written into the Keyboard Buffer word at X Write time. No information is read from memory during Y Read time. Therefore, the only bits of information stored by the Accumulator will be those set up by the keyboard contacts during X Write time. During Y Write time each keyboard bit is written into memory. At the end of the fourth bit time, only zeros are written into the remaining bit positions of the Keyboard Buffer word. At the end of the cycle, the keyboard is mechanically restored under control of magnets shown in FIG. 117, and the block on the Storage trigger is removed.

The machine will remain in the Numeric Entry mode and can either accept another numeric digit or be transferred to another mode of operation under operator control.

If only one numeric digit is entered into the Keyboard Buffer word, it can be transferred to another word of Main memory or to the numeric portion of the Magnetic Ledger Card memory just as it was entered into the Keyboard Buffer word. However, most numeric entry situations involve the entry of a plurality of numeric digits. Under these circumstances, as each digit is entered, the preceding digit value stored in the Keyboard Buffer word must be increased by a factor of 10. If the first digit entered is a "2," for example, entry of a second digit such as a "4" will require that the "2" be transformed to a "20," that is, by a factor of 10, in order that the entire numeric value stored in the Keyboard Buffer word will actually represent the desired numeric entry of "24."

The modification of the original decimal entry presently stored in the Keyboard Buffer word is accomplished by shifting the original stored value two positions toward the high order positions of the Keyboard Buffer word, and adding the original value to the shifted result. The necessary shifting operation is performed during Y write time of the first cycle of the second numeric entry by transferring each bit read into the Storage trigger at Y read time through a Delay Y1 trigger 67.10 and each bit of original entry is further applied to a Delay Y2 trigger 67.11, FIG. 67. The original information is read at X time of the first cycle and placed in the Accumulator trigger 66.11.

The net effect of the foregoing operations is to increase the original value stored in the Keyboard Buffer word by a factor of 5. In the second cycle of the second numeric entry to be discussed directly below, the information now stored in the Keyboard Buffer word is further delayed one bit time, which doubles its value and results in the increase in value of the original entry by a factor of 10.

During the second cycle of the second digit entry, the X address is inhibited and the bits read at Y time are delayed one bit time by means of the Delay Y1 trigger 67.10, FIG. 67. The numeric keyboard contacts are sampled during the first, second, third, and fourth bit times with each significant bit being transferred to the Accumulator trigger 66.11 at X Write time during each bit interval. The bits of information in the Keyboard Buffer word are read at each Y time and transferred to the Storage trigger 66.10. The bits are subsequently transferred from the Storage trigger to the Delay Y1 trigger 67.10 at each Y Write time. A check is made during the first, second, third, and fourth bit intervals for the condition of the Delay Y1 trigger 67.10 and the Carry trigger 70.10 in FIG. 70, in order to determine whether the state of the Accumulator trigger 66.11 that was established by the keyboard contacts during X time should be changed. The condition of the Accumulator trigger 66.11 determines what bits will be written back into the Keyboard Buffer word. The insertion of the Delay Y1 trigger during the second cycle results in the original numeric entry now being multiplied by a factor of 10. Since the newly entered digit is applied to the Accumulator trigger, the net result is that the original entry has been multiplied by the required amount and the second entry has been added to it, so that the Keyboard Buffer word now stores a true binary representation of the two entries.

After each digit has been entered, the clock is stopped and the keyboard is restored. The machine is then ready to accept additional numeric digits or it can be transferred to another type of operation, as required.

The circuits involved in a Numeric Entry operation will now be considered in detail. As long as the Alphanumeric Entry relay 27, FIG. 131, or the Program Start relay 51, FIG. 106, are not picked, the machine will be in a Numeric Entry mode. At this time, a —W level is applied to the input of Integrator 88.10, in FIG. 88, and results in a +S Keyboard Entry signal from the output of Power Inverter 88.11. This same level is inverted by Power Inverter 88.12 to obtain a Not Keyboard Entry signal on Line 88.13.

Figure 66:
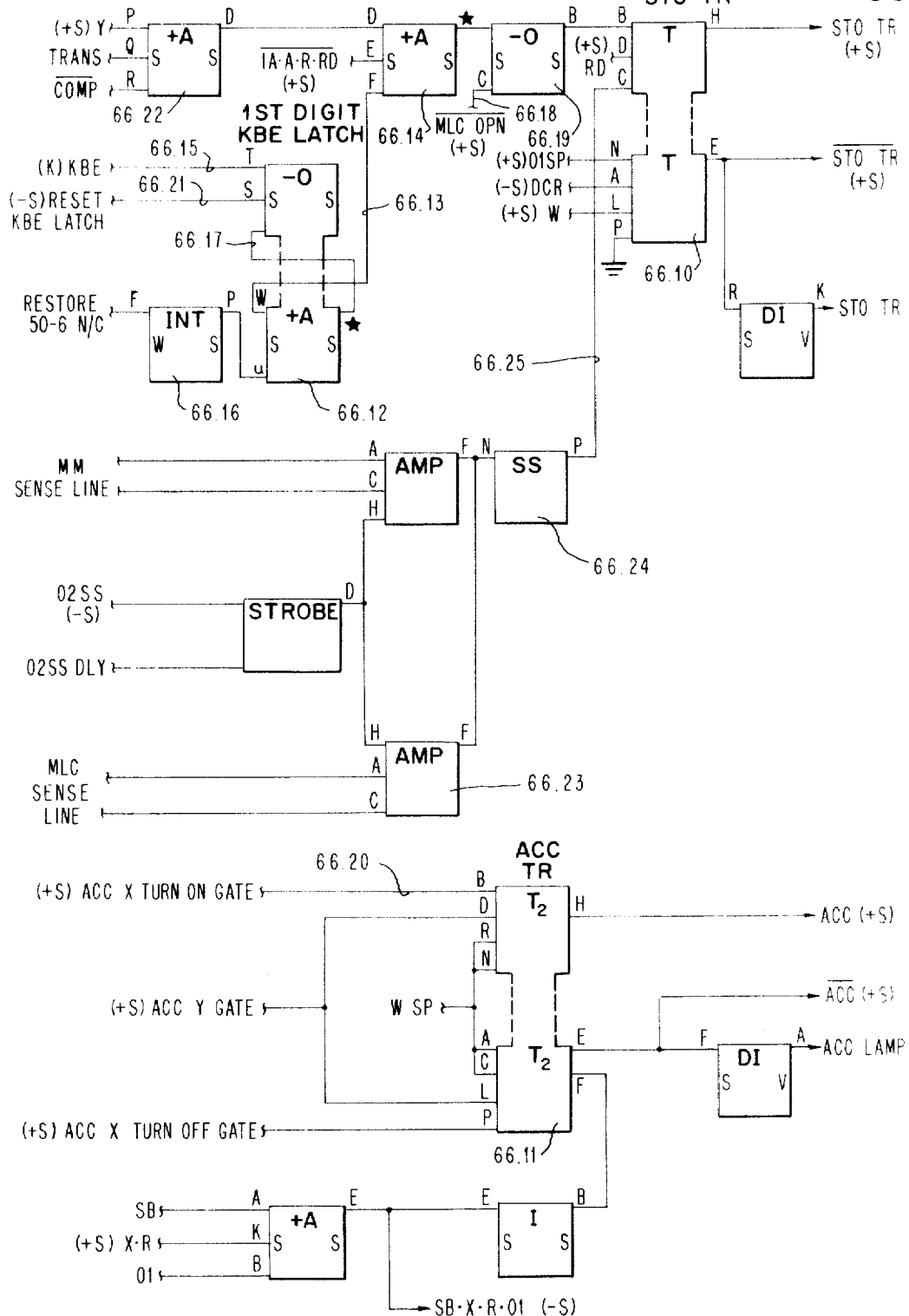

The First Digit Keyboard Entry latch 66.12, FIG. 66, is initially reset so that its output on line 66.13 is at a —S level. This signal being applied to a +And 66.14 results in the Storage trigger 66.10 being degated so that the bits of information read from memory do not affect it. This results in the destruction of any information in the Keyboard Buffer word prior to the entry of new digits from the numeric keyboard.

The preceding discussion concerning the Clock circuits established the fact that the Stop Gate line 49.22 becomes +S at the time that the Start trigger is turned off. However, if the machine has either been turned on or has just run through a restore cycle, the Stop Gate line 49.22 is at a —S level. The Stop Gate signal is applied at one input to a +AA block 104.10 and a +AA block 104.11. With the Stop Gate being at a —S level, the outputs of the +AA blocks on the Reset Keyboard Entry latch line 104.12 will be at a +S level.

The initial DC reset condition of the clock establishes all inputs of a +And block 52.12 at +S. The Reset Y Delay line 52.15 will be —S at this time. It will be recalled that this timing condition is repeated during Dummy Digit time of the timing chart in FIG. 17 so that at the end of the first cycle of a Numeric Entry, which is the beginning of the second cycle of the entry, the —S level on line 52.15 is again produced.

Referring to FIG. 66, since the Keyboard Entry line 66.15 is also +S at this time, both inputs S and T to the First Digit Keyboard Entry latch 66.12 are at a +S level. During a restoring action prior to the start of electronics, relay 50, FIG. 106, is picked. This results in a —W level to the input of Integrator 66.16 and a —S level at its output which is applied to pin U of latch 66.12. This results in a +S output on the star line which is looped back on line 66.17 as an input to the upper —Or portion of latch 66.12. Since all three inputs of this —Or portion of latch 66.12 are +S, its output becomes —S. This signal is used to maintain the latch 66.12 output at a —S level after the restore relay 50 drops.

The —S output of the First Digit Keyboard Entry latch 66.12 is applied to the +And block 66.14 keeping its output at a +S level. The Magnetic Ledger Card operation line 66.18 is also +S at this time so that the output of the —Or block 66.19 is —S. Under these conditions, the Storage trigger is degated.

The —S level on the Reset Y Delay line 52.15 is applied to the Delay Y1 trigger 67.10 and the Delay Y2 trigger 67.11 to set each of these triggers in the off state at the beginning of each electronic time in a Numeric Entry operation.

The other circuits in the machine are reset to the required state by the DC reset that is produced whenever a restoring cycle occurs.

During the first cycle of each Numeric Entry, the Keyboard Buffer word in main memory is automatically addressed at X Read time even though no Out word is wired.

Figure 59:
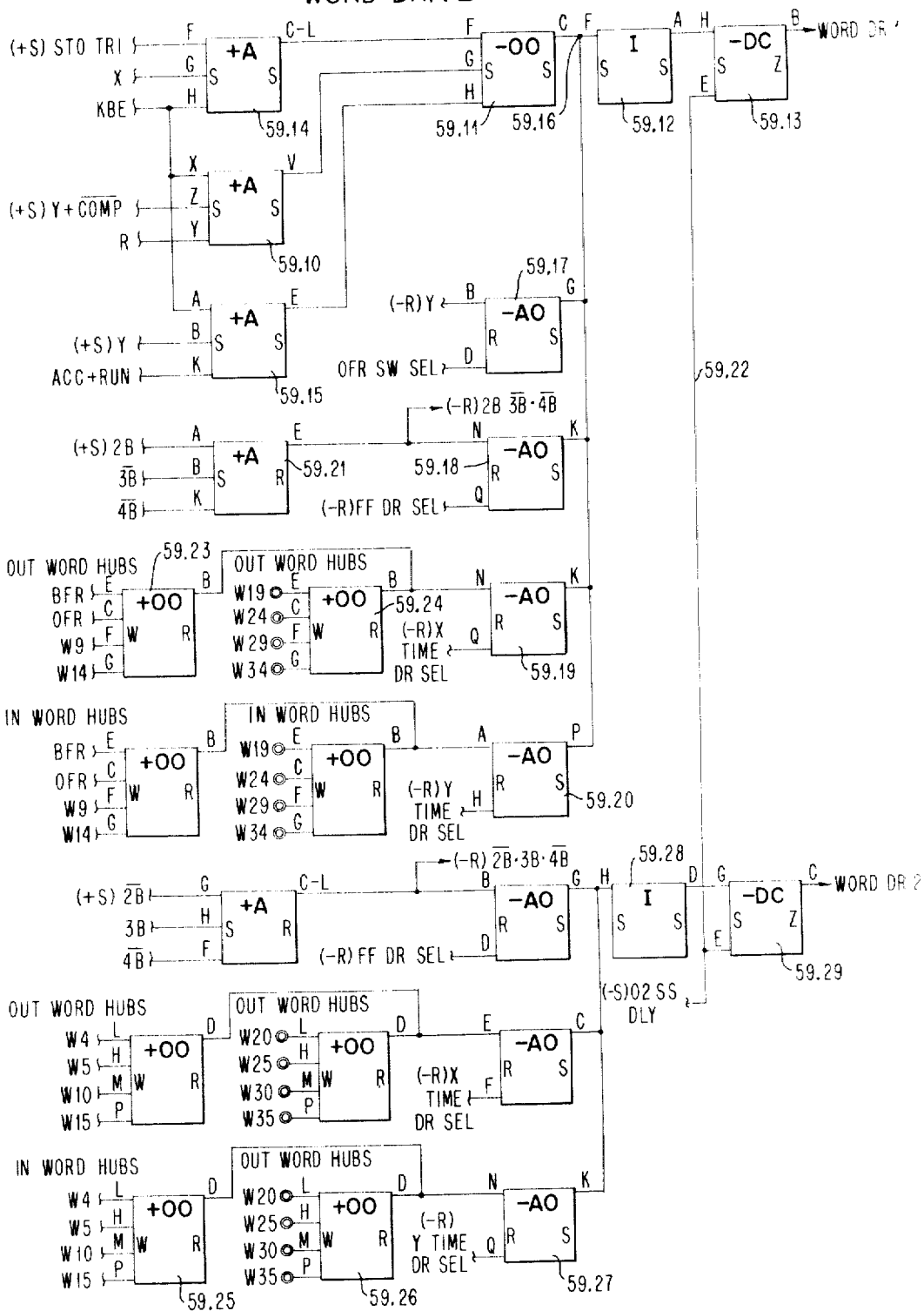

Referring to FIG. 59, since this is the first cycle, the Not Complement line at input Z of +And 59.10 is +S. The Keyboard Entry line and the Read Delay line to this +And are also at +S levels, so its output becomes —S. The —OO block 59.11 then supplies a +S output. This is inverted by Inverter 59.12 and is applied to input H of the Word Driver —DC block 59.13. Pin E of Driver 59.13 is brought to a —S level when the 02 Single Shot Delay signal occurs and at this time, Driver 1 will conduct.

Figure 61:
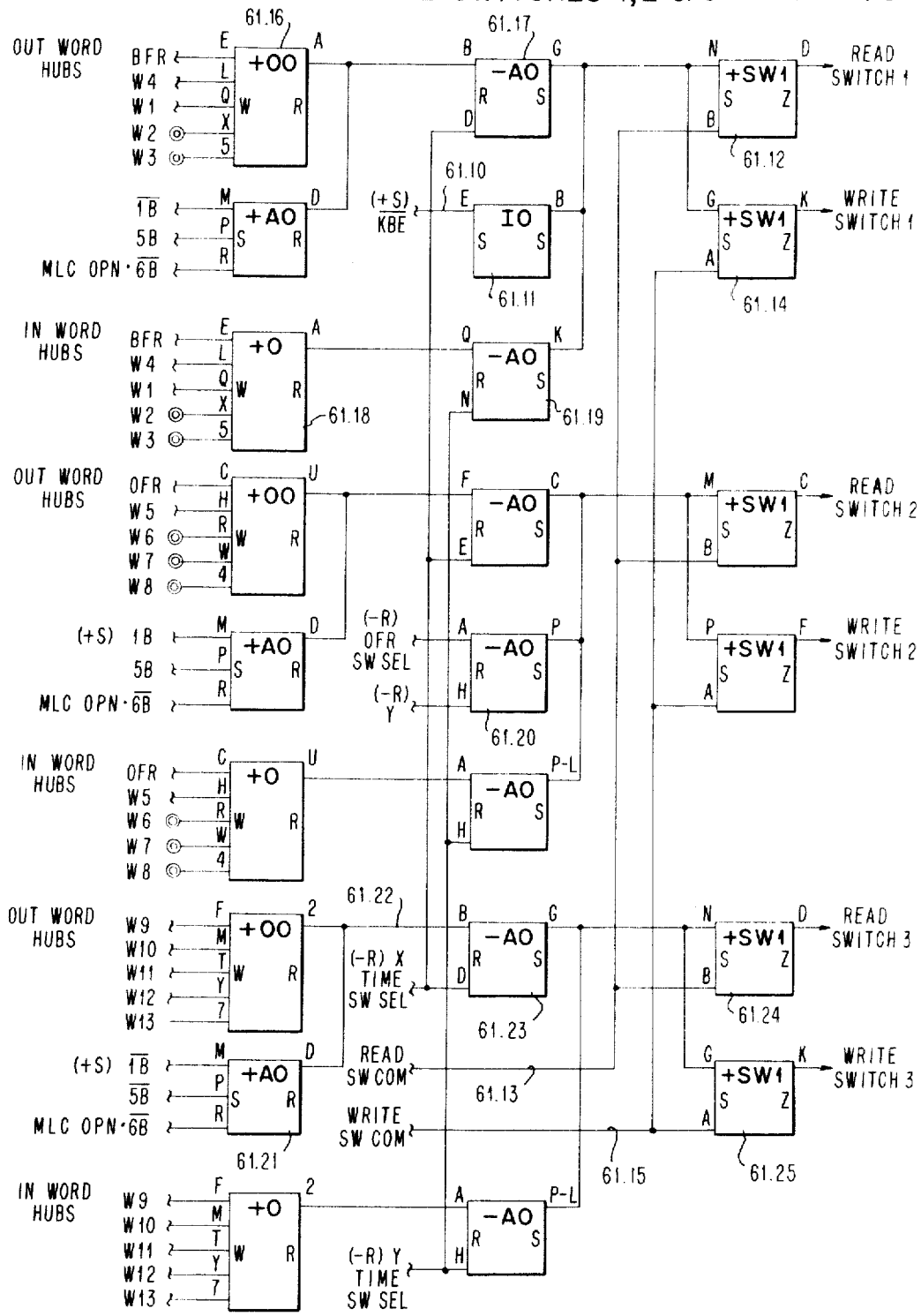

Referring to FIG. 61, since this is a Numeric Entry operation, the Not Keyboard Entry line 61.10 will be at a —S level. This is applied through the IO block 61.11 to input N of the Read Switch 1 block 61.12. The Read Switch common line 61.13 becomes +S during Read Delay time and brings Read Switch 1 into conduction. Write Switch 1, block 61.14, conducts when the Write Switch common line 61.15 becomes +S at Write time.

In this way, the Keyboard Buffer word is automatically selected by the combination of Word Driver 1 and Read Switch 1 or Write Switch 1. The bit drivers and switches are actuated in sequence beginning with the Sign Bit and progressing through the 34th bit of the Keyboard Buffer word.

Since the Storage trigger was degated, no information read at X time will be regenerated or stored for writing.

Referring to FIG. 59, the —S level of the Storage trigger is applied to input F of a +And block 59.14 which results in a +S level to input F of the —OO 59.11. Read time has just passed and Y time has not yet occurred, so the outputs of the +And 59.10 and the +And 59.15 will be at a +S level. This results in a —S output from the —OO 59.11.

Because of the dot Or function at terminal 59.16, the condition of the other circuit blocks —AO 59.17, 59.18, 59.19 and 59.20 must be investigated. The outputs of all these blocks will be —S for various reasons. The output of the —AO 59.17 will be —S as a result of the —RY input at pin B. All triggers in the B counter are off at this time, so the —S level at input A of the +And block 59.21 results in a —S output from the —AO 59.18. No In word or Out word hubs are wired so the blocks 59.19 and 59.20 also supply —S outputs. With a —S input being supplied to the Inverter 59.12, the Word Driver 1 is inhibited and no addressing occurs at X Write time.

The addressing of the Keyboard Buffer word at Y time, Read time, is established in the same manner as it was during X time. The input lines to the +And 59.10 are all +S, so its output is —S. The —OO 59.11 will produce a +S output and inversion of this signal conditions Word Driver 1, block 59.13, to conduct when the 02 Single Shot Delay pulse occurs on line 59.22.

Addressing of memory during Y time, Write time, of the first cycle is inhibited by the off state of the Accumulator trigger 66.11, FIG. 66. No information has been allowed to reach this trigger at either X Read time or Y Read time and accordingly, its output will be at a −S level. This is applied at input K of the +And block at 59.15 and results in an output from this +And of a +S level. This deconditions one input of the −OO block 59.11. The other inputs to 59.11 are held at +S levels by the −S conditions for X and Read Delay applied through the +And blocks 59.10 and 59.14. Since the block 59.11 is dot Ored with the blocks 59.17 through 59.20, it is also necessary that these latter blocks supply −S outputs. The blocks 59.18, 59.19, and 59.20 are unchanged from their status at X Write time. It is only necessary at this time to investigate the Overflow Register Switch select line coming into pin D of the −AO block 59.17. This line is derived from FIG. 57 at +AO, 57.10. The respective outputs of +And blocks 57.11 and 57.12 to pins D and K of the −Or block 57.13 are +S at this time. These inputs to 57.13 together with a Not Type input of +S at pin A result in a −S output from 57.13. This, in turn, deconditions both of the +AO blocks 57.10 and 57.14 so that the signal on line 57.15 is at a +R level.

Referring again to FIG. 59, since the outputs of all of the dot Ored blocks 59.11, and 59.17–59.20 is −S, Word Driver 1, block 59.13, is inhibited. Therefore, no addressing of memory occurs at Y Write time.

The bits of information that were stored in the Keyboard Buffer word were read out, but since the write action was inhibited both at X and Y times, the Keyboard Buffer word has now been completely cleared.

Figure 71:
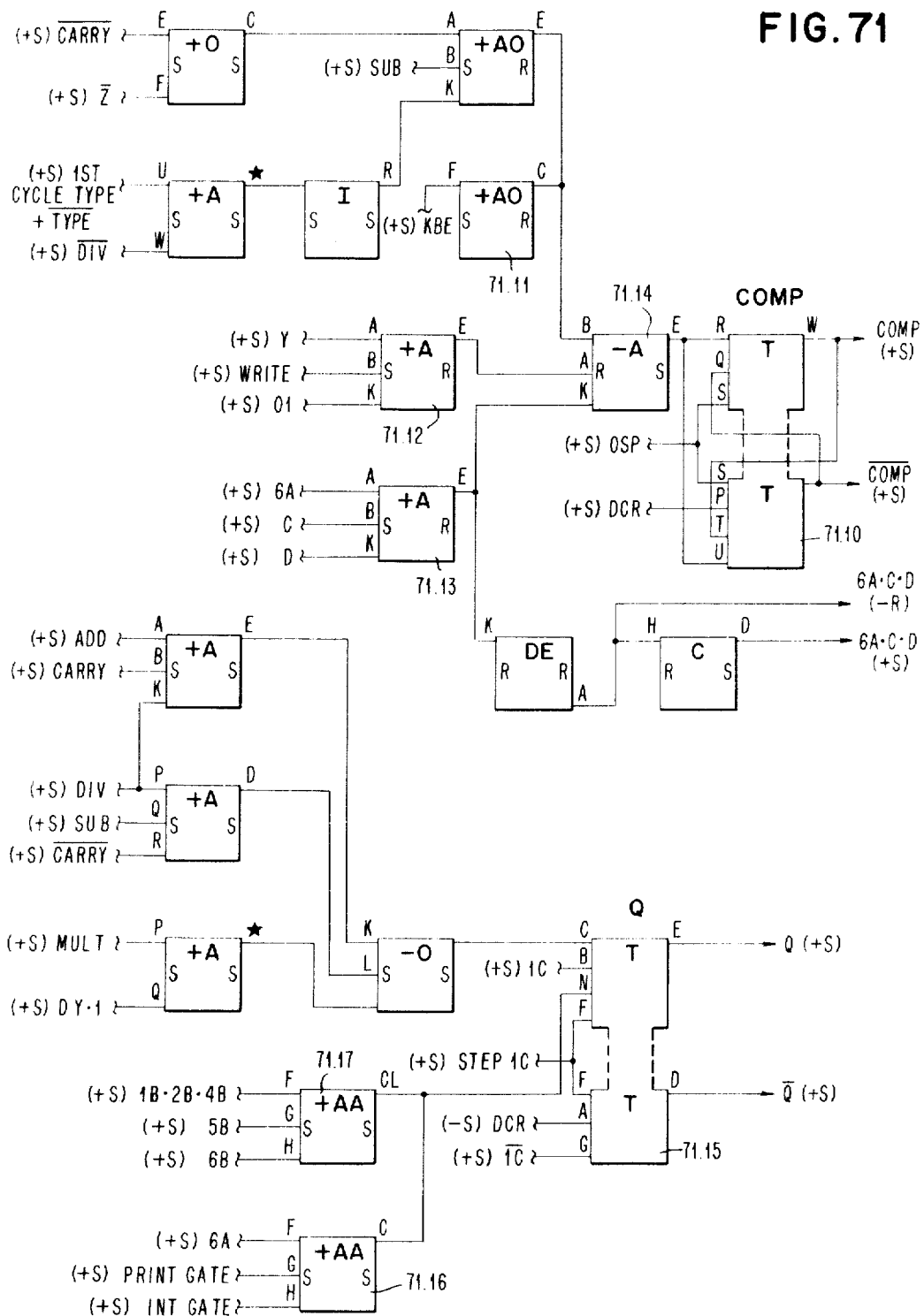

At the end of the first cycle of the first digit entry, the Complement trigger 71.10 in FIG. 71 is turned on and forces the Clock circuits to run through another word cycle. The action occurs because the Complement trigger being on inhibits the Turn Off Start trigger signal which occurs on line 49.10, FIG. 49.

Referring to FIG. 71, with the Keyboard Entry signal at pin F, the +AO block 71.11 supplies a −R output. Near the end of the cycle just discussed, the various inputs to the +And block 71.12 and 71.13 are satisfied. All three inputs to the −And 71.14 are conditioned, so 71.14 generates a +S output to gate the Complement trigger 71.10. The next Oscillator Sample Pulse to inputs S of 71.10 turns the trigger on.

Near the end of the second word cycle comprising 36 bits of information, the Clock again supplies the various signals required to condition the +And blocks 71.12 and 71.13. However, since the output of the −And block 71.14 is also applied to input pin U of the Complement trigger 71.10, the next succeeding Oscillator Sample pulse will cause the Complement trigger to return to its off state. This also permits the Clock to stop and the +S Stop Gate signal to be generated.

The addressing of memory during X time of the second cycle is suppressed. This occurs as a result of the Not Complement signal which is at a −S level all during the second cycle. This is applied to input Z of the +And 59.10, results in all inputs of the −OO block 59.11 being +S, which further causes a +S level to be applied at pin H of the DC block 59.13 for the Word Driver 1 position.

During each of the first, second, third and fourth bit intervals of the second cycle, the bits stored in the mechanical keyboard contacts, FIG. 68, are transferred in a serial manner to the Accumulator trigger 66.11, FIG. 66.

In FIG. 68, a Keyboard Entry signal applied to pin F of the +AA block 68.10 permits sampling of the keyboard lines 68.11, 68.12, 68.13 and 68.14 only when the Keyboard entry mode is established for the machine. The Complement signal to pin G of 68.10 permits the sampling to take place only during the second cycle of the entry involved. A +S 1A input to pin H of 68.10 insures that sampling takes place only during the first through the fourth bit intervals. The +S X input on line 68.15 of +AA block 68.16 insures sampling at X time only.

Each of the keyboard lines 68.11–68.14 feeds an associated integrator and +AO block. The +AO blocks 68.17–68.20 are each conditioned at a particular bit time as determined by the respective clock inputs. In this manner, the four mechanical conditions on the Keyboard Entry lines are transferred in a serial manner to the Accumulator trigger. The C and D inputs to block 68.17 correspond to the bit 1 interval shown in FIG. 17. The other gating inputs to the blocks 68.18–68.20 correspond respectively to the bit intervals 2, 3, and 4, shown in FIG. 17.

The absence of a bit of information on one of the keyboard lines in FIG. 68 results in a +R level being establisted at terminal 68.21. This is converted to a −S level by Convert block 68.22, and applied through the +AA block 68.16 as a +S level by line 68.23 to −Or block 68.24 and 68.25. Therefore, even though all of the inputs of the +AA block 68.10 have been satisfied, the output of 68.16 maintains the line 68.23 at a +S level. This results in the −Or block 68.24 supplying a −S level and the −Or block 68.25 supplying a −R level which, in turn, becomes a +S level at the output of the −And block 68.26.

Referring to FIG. 66, the Accumulator X Turn On Gate line 66.20 being at a −S level at this time, results in the Accumulator trigger 66.11 remaining off upon the occurrence of the next Write Sample pulse.

Assuming that Keyboard Entry line 68.12 is at a +W level, a −R level will be established at terminal 68.21, in FIG. 68. This is converted by 68.22 to a +S level at input F of block 68.16, and with a +S level at X time on line 68.15, the output on line 68.23 will now be at a −S level. This results in a +S level from the −Or block 68.24 which upon the occurrence of the next Write Sample pulse causes the Accumulator trigger to be turned on.

A similar sampling operation occurs during the subsequently following third and fourth bit intervals. Following four bit time, the 1A input to 68.10 assumes a −S level and inhibits any further sampling.

Circuits are established for addressing the Keyboard Buffer word during Y time, Read time, of the second cycle. The logic involved is exactly the same as in the first cycle with the exception that nothing is read during this time because the Keyboard Buffer word was previously cleared. As a result of this, the Storage trigger will remain degated throughout this cycle and as a result, the Accumulator Y Gate output on line 69.10, FIG. 69, remains at a −S level. Therefore, at each Y Write time, the bits of information that were derived from the keyboard contacts in FIG. 68 and applied to the Accumulator trigger can be written into the Keyboard Buffer word.

During each bit interval, if the Accumulator trigger is on, its output will condition input K of the +And 59.15, FIG. 59. This +And supplies a −S output at Y time which results in a −S level being applied to the Word Driver 1 block 59.13 upon occurrence of the 02 Single Shot Delay pulse on line 59.22. If the Accumulator trigger is off, however, during any of the sampling intervals at bit times 1–4, the Word Driver 1 will be inhibited and memory is not addressed.

It will be recalled that at the end of the second cycle of the Numeric Entry, the Complement trigger 71.10 in FIG. 71 is turned off. Therefore, when the clock reaches the normal stop time during the Dummy Digit interval, both the Turn Off Start trigger line and the Stop Gate lines 49.10 and 49.22 will assume their +S levels.

The Stop Gate level in line 49.22 is applied through the +AA blocks 104.10 and 104.11 to supply a −S Reset Keyboard Entry latch signal. This same signal is applied to a —Or block 104.13 and the output of 104.13 results in the initiation of a restoring action in the machine by line 104.14. The —S Reset Keyboard Entry latch from FIG. 104 is applied on line 66.21 to the —Or portion of the First Digit Keyboard Entry latch 66.12. This —Or portion supplies a +S output and since the inputs W and U of the +And portion of 66.12 are both +S the output of this latch on 66.13 assumes a —S level. This is looped back to the lower input of the —Or portion of 66.13 on line 66.17 to maintain the latch in its off state. The degating action that previously existed has now been removed from the Storage trigger circuits, FIG. 66.

Referring again to FIG. 104, the +S level on line 104.14 is applied by line 104.15 to a +And 104.16. Since the other input of this is +S as a result of a Keyboard Entry line 104.17, being at its up level, the output of 104.16 is —S. This which is inverted by Inverter 104.18, and becomes a +S signal which is applied to the thyratron blocks 104.19 and 104.20 for energizing the Restore solenoids in the numeric keyboard. The mechanical restoration of the numeric keyboard causes its common contact to be opened and the Electronic Start relay 64 in FIG. 106 is dropped. The dropping of relay 64 opens the thyratron circuits since they pass through a 64–1 and a 64–2 point, and a result, the Restore solenoids in the keyboard are de-energized.

The initial conditions for entry of a second digit are like those for the entry of a first digit with the exception that the First Digit Keyboard Entry latch 66.12 is now in its reset condition and has no effect on the Storage trigger. Information read from the Keyboard Buffer word can now be transferred to the adder circuits.

The Word Driver 1 block 59.13 will be conditioned to conduct at each 02 Single Shot Delay pulse time during X Read time. The circuits which set up the Driver 1 operate as they did for the first cycle on the first digit. Therefore, an addressing of memory takes place at each X Read Time. However, the addressing of the Keyboard Buffer word at X Write time depends upon the condition of the Storage trigger. The Storage trigger can be set to its on state at each bit time, if a 1 bit is read from the Keyboard Buffer word. If this is the case, the Storage trigger will supply a +S level to the pin F of the +And block 59.14. The output of 59.14 becomes —S at X time and being applied through the blocks 59.11 and 59.12 will result in the energization of the Word Driver 1, block 59.13 at 02 Single Shot Delay time. If, on the other hand, the Storage trigger is in its off state, a —S input to pin F of the +And 59.14 will inhibit writing into memory.

The information read from the Keyboard Buffer word and regenerated at X time is re-read at Y time of the first cycle. Word driver block 59.13 is conditioned at each 02 Single Shot Delay pulse time. This occurs under control of the +And block 59.10.

The addressing of memory at Y Write time of the first cycle for the second digit is determined by the state of the Accumulator trigger which supplies a controlling signal to the input K of +And 59.15. If the Accumulator trigger is on, this input will be +S and the conditions will be satisfied for activating the Word Driver 1 block 59.13. However, if the Accumulator is off, the three inputs to the —OO block 59.11 will not be satisfied and the Word Driver block 59.13 will be degated.

The detailed arithmetic manipulations of the Storage trigger, the Delay Y1 trigger, the Delay Y2 trigger, and Carry trigger during Numeric Entry operations are covered in the aforementioned McDonald, et al., Patent No. 3,185,825, and will not be discussed at this time.

*Transfer of keyboard buffer word to another storage word*

In order to utilize the numeric information just entered in the Keyboard Buffer word, it is necessary to specify a Transfer operation following the completion of the Numeric Entry. For example, it may be assumed that the program specifies that the contents of the Keyboard Buffer word be transferred to Word location 4. If this is the case, the Keyboard Buffer word will be programmed as the Out word and Word 4 will be programmed as the In word. It will be recalled that the Out word is the X time word and the In word is the Y time word.

Referring to FIG. 59, various word selection lines that are directly connected to hubs on the control panel of FIG. 6 are shown. A signal to select the Buffer word as the Out word comes into pin E of the +OO 59.23.

The +OO block 59.23 accepts a +48 volt (+W) signal at any of its inputs and supplies a —R level output. When no signal is present, the output will be a +R. In the assumed case, at the time of the program step involved, a +48 volt signal will arrive at pin E of 59.23 and its output will then be —R.

A similar +OO block 59.24 has its output coupled with the output of 59.23. The joint output is applied at pin N of a —AO block 59.19. With a —R signal at pin N of 59.19, a —R signal applied to pin Q of 59.19 during X time Driver Select will result in a +S output at Terminal 59.16. This output is inverted by Inverter 59.12 and becomes a —S to gate pin H of the Word Driver 59.13. Driver 59.13 will then be fired upon the occurrence of the 02 Single Shot Delay pulse on line 59.22.

When it is fired, Driver 59.13, which is Word Driver 1, will drive the Keyboard Buffer word and seven other words. The ultimate selection of the Keyboard Buffer word is performed by selecting the proper Read-Write switch combination.

Referring to FIG. 61, the Read Switch 1 and Write Switch 1 combination are selected in the following manner. The same +48 volt signal that is applied to the +OO 59.23 is also applied to a +OO 61.16, FIG. 61. This results in a —R level to a —AO block 61.17. The D input of 61.17 receives a —R signal at X Time Switch Select. It will be recalled from the discussion of the clock circuits that this signal is derived from the X/Y trigger. The —AO block 61.17 supplies a +S output to pin N of Read Switch 1 and pin G of Write Switch 1, which are respectively designated 61.12 and 61.14. The B and A inputs of the two switches are supplied by a Read Switch line 61.13 and a Write Switch line 61.15, respectively. These two lines condition the proper switch at read and write time.

Figure 63:
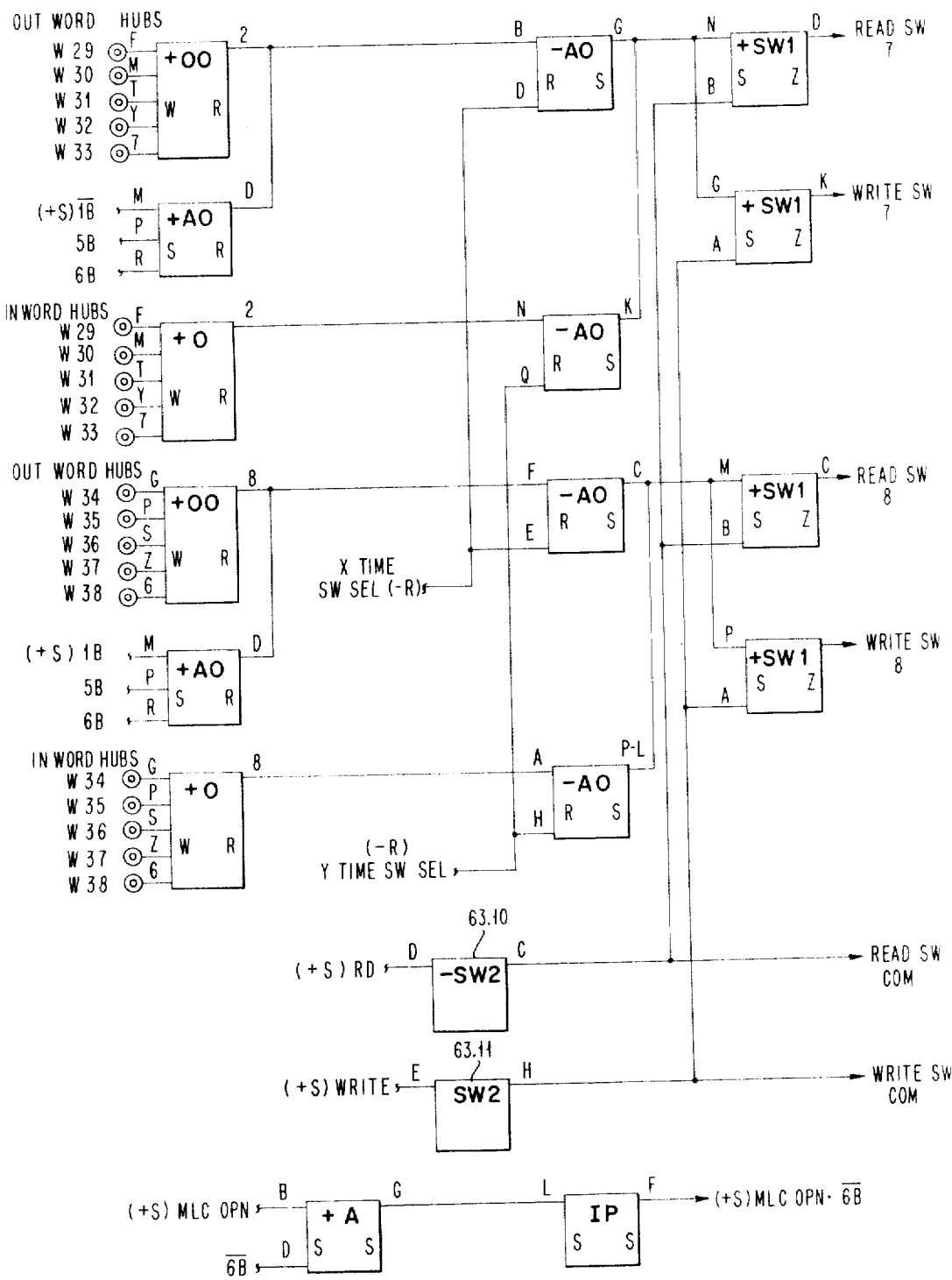

The Read Switch common signal is generated in FIG. 63 from a Switch 2 block 63.10, and results from an output from the Read Delay trigger applied at pin D. This block acts as an inverter, but has no load resistor. In effect, the load for this block is all of the switches which it gates. The transistor in the Switch 2 block 63.10 is in series with any switch to which it is connected and which is conducting.

The Write Switch common signal is derived from a Switch 2 block 63.11 in a similar manner. During X time, therefore, the proper driver and switch combinations have been selected for reading and writing the Keyboard Buffer word.

The In word was assumed to be Word 4. Driver selection for this word occurs in FIG. 59. A +48 volt signal is applied to pin L of the +OO block 59.25. The output of block 59.25 is joined with an output from a +OO block 59.26 in a manner similar to that previously described for the Out word. The joint output of these blocks is applied at pin N of a —AO block 59.27. This output is inverted by an Inverter 59.28 and applied to gate the —DC block 59.29, which is Word Driver 2. The 02 Single Shot Delay pulse at input E fires this driver as Driver 1 was fired previously. It is also necessary that the proper Read-Write switch combinations be selected during Y time for Word 4. Referring again to FIG. 61, it will be seen that this is accomplished by applying a +48 volt signal to pin L of a +O block 61.18. This, in turn, goes to the Q input of a —AO block 61.19. The output of 61.19 is applied to gate the Read Switch 1, block 61.12 and the Write Switch 1, block 61.14. Accordingly, it will be seen that the same switch combination, but a different driver, are used to select Word 4 at Y time.

NUMERIC TYPE WITH MEMORY SELECTION IN A SEQUENTIAL MANNER

Memory selection in a sequential manner will first be discussed in connection with the "Numeric Type" operation.

The B counter is used whenever it is necessary to select the words of memory in a given sequence. It has been seen that direct selection can be performed under control of the Control Panel. There are other instances where it is desirable to select the words of memory sequentially, which will also be discussed at a later time.

The designation Type is reserved for the operation here discussed, that is, the decoding of a binary word to a decimal word before it is printed. The word Print is reserved for Printing of information from the Magnetic Ledger Card Memory which involves taking six bits and applying them directly to the magnets in the typewriter for Print-out. Therefore, there are two kinds of printing operation.

The Type command will cause the information in a desired programmed word to be translated from binary to decimal form and printed on the typewriter. The number of digits or field width desired is also programmed.

At the beginning of the Type operation, the contents of the programmed word are transferred to the Overflow Register in Main Memory. This is under control of the 1st Cycle Type Latch. The operation is the same as explained before for a Transfer Command, with the word to be typed being addressed at X time and the Overflow Register being addressed at Y time. After this word cycle, the programmed word is ignored and all operations deal with the Overflow Register.

To obtain the first digit to be transmitted to the printer, the field width to be typed must first be considered. The programmed field width sets certain triggers in the B Counter, which then will address the proper fixed factor in memory for use in translating the binary word to decimal form. For example, if a Digit Capacity (field width) of 2 is programmed, the B Counter is set to obtain the fixed factor of five (5) in the Fixed Factor memory, FIG. 8. This is delayed one bit time by the X Delay trigger and therefore has a value of ten when it arrives at the Accumulator trigger. The result is that the original fixed factor has been changed to a fixed factor of ten.

The Add-Subtract trigger will be set to Subtract, the Overflow Register addressed at Y time, and the developed fixed factor of ten addressed at X time. A normal subtract cycle will occur with ten being subtracted from the contents of the Overflow register. At the end of this cycle, if the number in the register is still positive, a "one" will be placed in the C Counter and another subtract cycle will be taken. These subtract cycles will continue and be counted by the C Counter until the sign of the Overflow register is changed, which is indicated by a Carry from the 34th digit position, when an overdraw occurs. The overdraw cycle will not be counted. The Add-Subtract trigger is changed to Add and one Add cycle is then taken to restore the overdraw to the overflow register. At the end of this Add cycle, the number in the C Counter is directed to the thyratrons to print the proper decimal digit that has been established as a result of the repeated subtractions.

The B Counter is advanced to address the next lowest order fixed factor and the operation is repeated. Before the second cycle is taken, the Clock will stop and wait for the typewriter to complete its cycle. A contact in the typewriter will then restart the Clock and the operation will continue.

Figure 78:
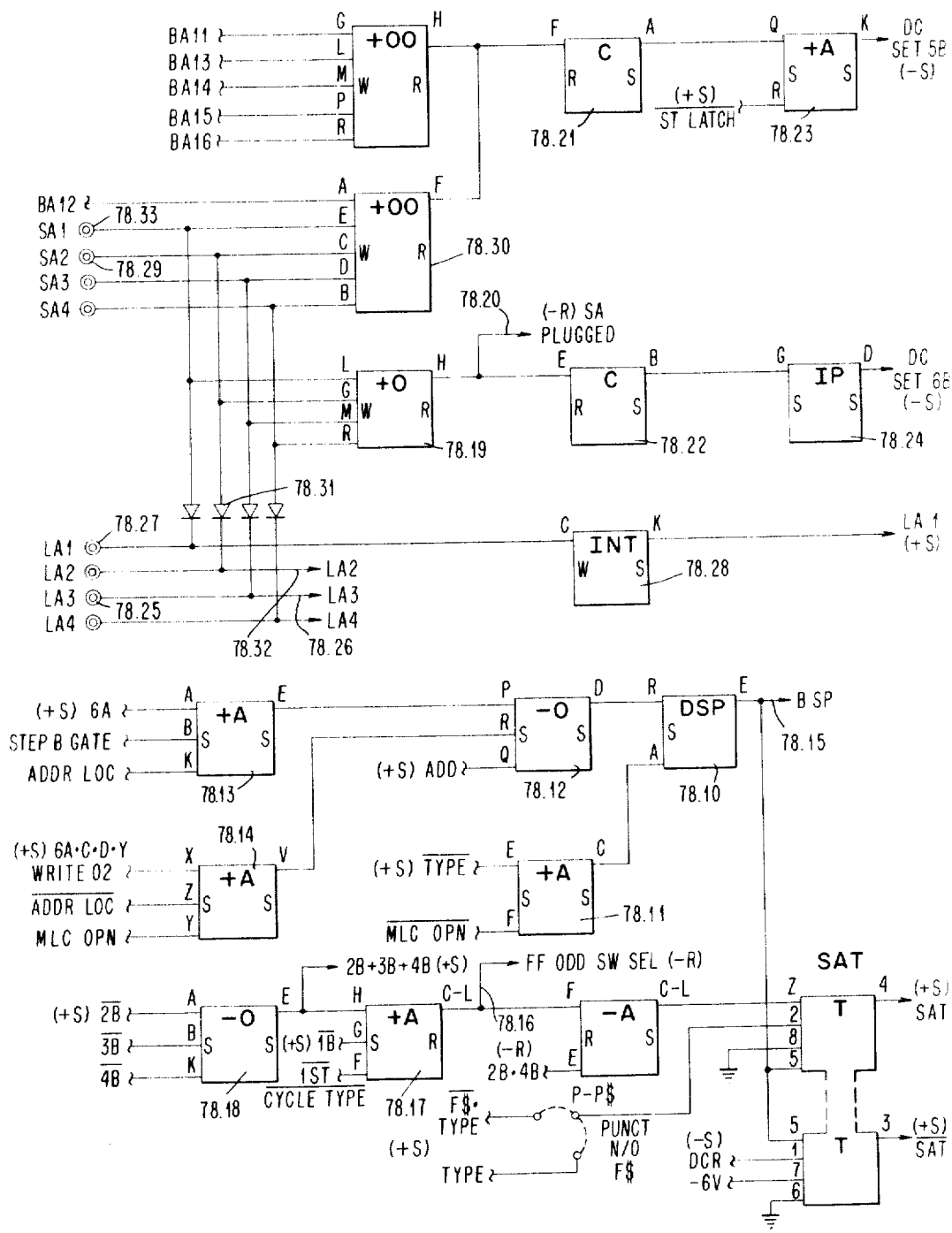
Figure 96:
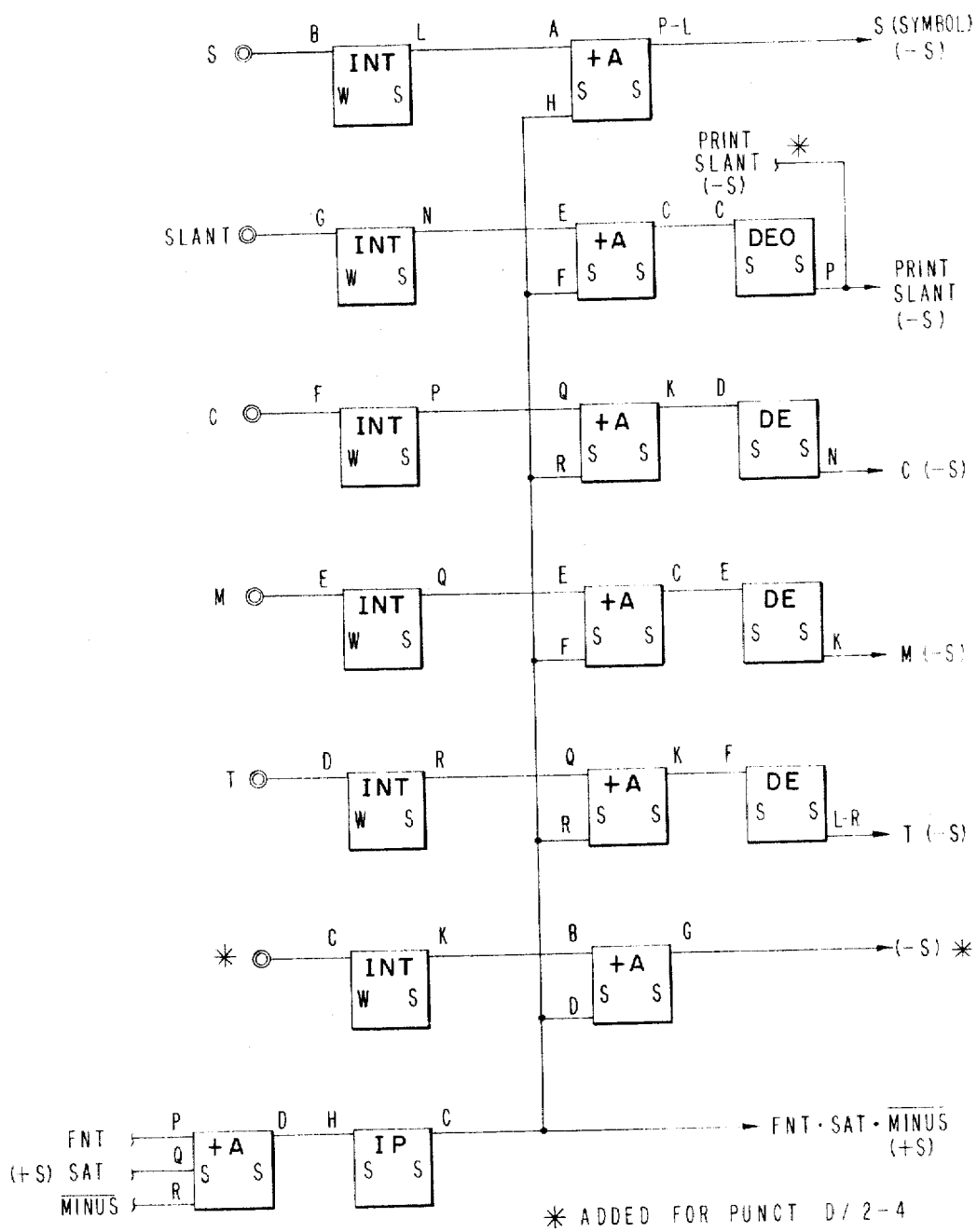

Normally, as the B Counter advances from the units digit, the Space After Type trigger (SAT), FIG. 78, will turn on. This happens right after the thyratrons have been fired to print the units digit. The clock will then stop to prevent further subtract cycles. When the typewriter contact restarts the clock, the machine will take one dummy cycle. That is, no operation is performed. At the end of this cycle, the Space thyratron will normally fire if the number just typed was positive. In the event of a negative number, the Minus Latch, FIG. 97, would have been set on in the first cycle of type. It will be sampled at this time and a minus sign printed in this position. In order to print other symbols, the desired character must be programmed. The following symbols, FIG. 96, are available:

(1)    T
(2)    C
(3)    M
(4)    /
(5)    *
(6)    S

Variations of a normal type-out can be programmed. It is possible, for example, to print high order zeros or suppress Space After Type. Several punctuation variations are also available, to be discussed.

A detailed discussion of the Type operation follows. In FIG. 77, a table shows the B Counter set up code and its usage. The four primary triggers are designated 1B, 2B, 3B, and 4B in the table. A column designated "Word Driver" shows which driver is selected by the particular setting of the triggers 2B, 3B, and 4B, which together can be considered to form a three-stage binary counter. Trigger 2B can be considered the 1 bit position, 3B the 2 bit position, and 4B the 4 bit position. It can be seen that the five drivers are selected strictly according to a binary code.

Trigger 1B is alternately 1 and 0 and is used to select certain of the switches to sequence through the memory.

Triggers 5B and 6B are added for additional switch selection. As to Read/Write Switches, there are two columns marked Not 6B and 6B each being further subdivided into two columns Not 5B and 5B. Under the Not 6B and Not 5B; Not 6B and 5B columns the selection of switch Combinations 1, 2, 3, and 4 is listed.

Under the 6B and Not 5B; 6B and 5B the selection of switch combinations 5, 6, 7, and 8 is noted. Trigger 1B cooperates with Triggers 5B and 6B to make possible the selection of all eight read-write switch combinations.

For example, the first line of the chart shows driver 5 being selected by a 1–0–1 set up of triggers 2B, 3B, and 4B. Trigger 1B in cooperation with triggers 5B and 6B permit selection of read-write switch combinations 2, 4, 6, or 8.

If the B Counter is preset to a particular setting, this will result in a particular word in the memory being addressed. If the B Counter is stepped as indicated in the chart, additional words in the memory can be selected in sequence.

Control Panel hubs which are used to preset the B Counter to particular count levels in order to select particular addresses are shown in FIG. 76.

For example, at the top of FIG. 76 there are two Control Panel hubs designated DC1 and BA8 which stand for Digit Capacity 1 and Begin Alpha 8 respectively.

The Digit Capacity (DC) hubs are used in the Type operation and Column Shift operations, and the Begin Alpha hubs are used in the other operations which involve Alphanumeric Entry or Alphanumeric Print, to be discussed.

A +48 volt signal to either one of the aforementioned hubs will condition +OO 76.10 and +Or 76.11. Pin F of +OO 76.10 supplies a —R level to the Converter block 76.12 which conditions input P of the +And 76.13 with a +S level.

The output on pin H of +Or 76.11 is converted by block 76.14 and applied to pin P of the +And 76.15 as a +S level.

Each of the +And blocks 76.13 and 76.15 have Q and R inputs which are +S under certain conditions. The Q inputs are derived from a Not Start Latch which is +S whenever the Electronics is not running. That is, it is +S when the relay program circuits are operating, and prior to the start of the Clock. Pin R inputs are +S whenever trigger 6B is not being set up, as in this instance.

Therefore, +And 76.13 and +And 76.15 supply —S outputs on DC set 1B and 4B lines, respectively. These outputs are applied to the 1B and 4B positions of the B Counter in FIG. 82 to set them on. The inputs come in at pins R and 8, respectively, of the triggers. Triggers 2B, 3B, 5B and 6B are reset off by —S DC Reset levels at their respective pins 1, which occurs prior to the occurrence of the 1B and 4B setting impulses.

When the Clock starts, the Set and Reset lines are restored to zero and the B Counter can count along and address the drivers and switches in a sequential manner.

The counter is advanced as follows. The DC1 or BA8 hub as just described will set up 1B on and 4B on. In the chart of FIG. 77, it will be seen that this setting of the B Counter is confirmed. Word Driver 4 is selected by 4B being on, 2B and 3B being off. With 1B, Not 5B, and Not 6B, the Read-Write Switch 4 will also be selected. This results in the selection of Word 8 in the memory.

It is necessary to step the B Counter to the status shown in the next line below in the chart, so that the counter triggers are Not 1B, 2B, Not 3B, and 4B. Word Driver 5 and Read-Write Switch 3 are selected at this setting of the Counter so that Word 9 in the memory is selected.

The advance of the B Counter is controlled by a Sample Pulse Driver 78.10, FIG. 78. The gate input A of 78.10 is under control of a +And 78.11 with +S inputs for Not Type and Not MLC operation. If either input is —S, as now, with —S on Not Type input E, the output of the +And 78.11 is +S so that the Sample Pulse Driver 78.10 is gated. No gating occurs if both Not Type and Not MLC operation are +S. A gate will thus be supplied from 78.11 for Type or any MLC operation: Read Ledger, Record Ledger, Alphanumeric Entry or Alphanumeric Print.

Figure 72:
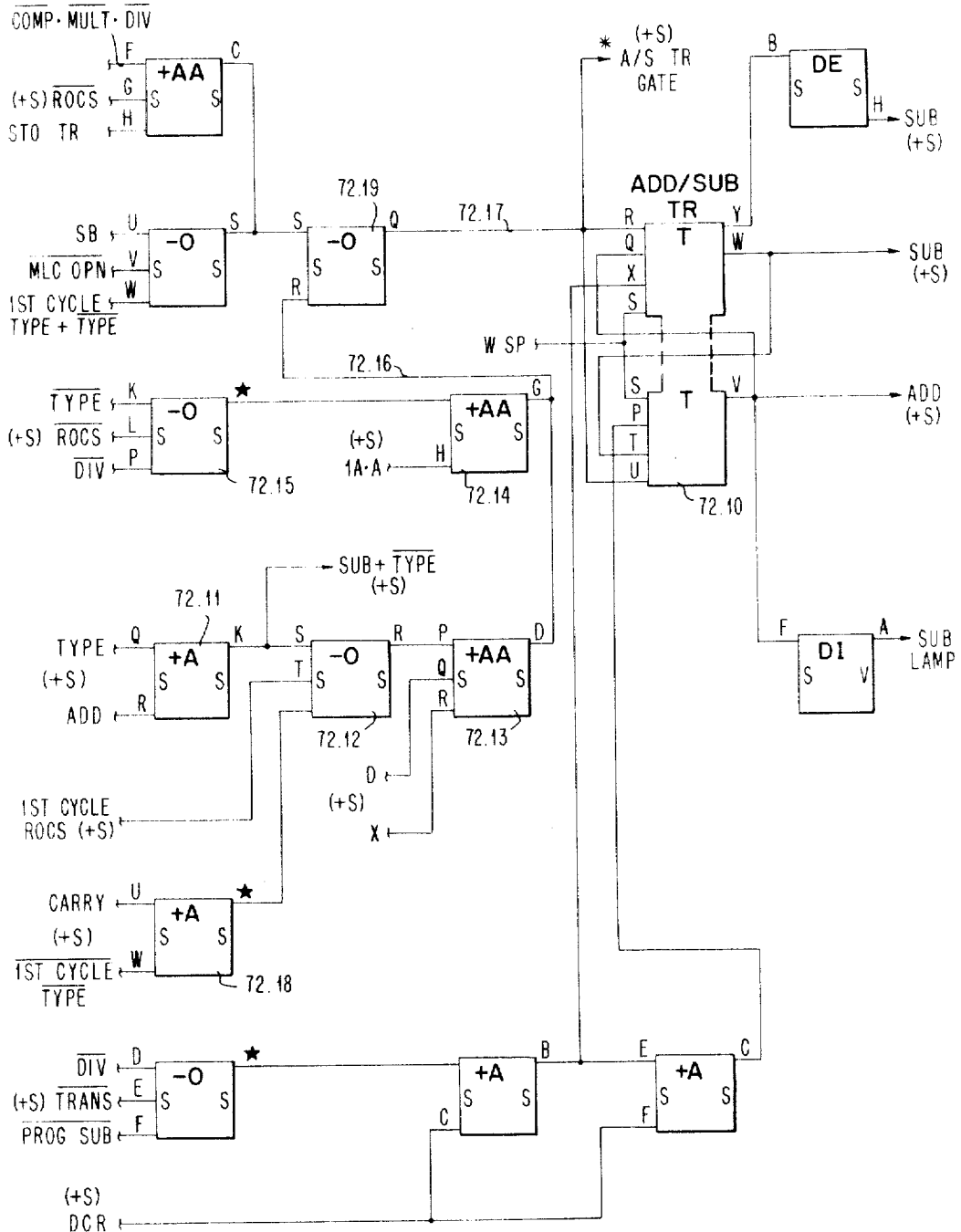

A positive shift is applied to pin R of Sample Pulse Driver 78.10 from a —Or 78.12. The output of this —Or depends on what type of operation the machine is in. If the machine is in a simple Numeric Type operation, as now, the B Counter will advance under control of the Q input of 78.12 which is marked +S on Add. If Add/Subtract trigger, FIG. 72, is in the Add state and suddenly changes to the Subtract state, —Or 78.12 will receive a negative shift, supply a positive shift and, through the R input, fire the Sample Pulse Driver. This occurs each time the Add/Subtract trigger changes to its Subtract state.

During MLC operations, the Sample Pulse Driver at 78.10 is fired by signals to the P and R inputs of Or 78.12. The P input is from +And 78.13 which has inputs +S on 6A, Step B Gate and Address Located. The R input is from the +And 78.14 with +S inputs 6A–C–D–Y–W–02; Not Address Located and MLC operation. This is at the bit time when the 34th binary digit is operated on and happens to be time at which the Clock must be stopped if it is to be stopped in this word time.

As has become apparent, the B Counter stops at different times in the cycle depending on what the operation is.

The output of the Sample Pulse Driver 78.10 is applied to all trigger positions of the B Counter in FIGS. 82 and 83. In the example, 1B and 4B were set on. The table in FIG. 77 shows that 1B is turned off and 2B on. The B Sample Pulse comes in at pin N of 1B, FIG. 82. Pin L is gated by the on side of 1B. Pin P is gated from a line 82.10 marked B Counter Advance Gate. This is a line that is brought up any time an operation requires advancing the B Counter, and also for certain intermediate or sub-operations. Sometimes during an operation involving the B Counter, the gate may be brought down, such as a Punctuation during Type. Normally the line 82.10 is +S and the B Counter is allowed to advance.

In this case, the 1B trigger will turn off with the next Sample Pulse on line 82.11. Trigger 2B is gated to turn on by a +S signal from its off side at pin 2, and a gate to pin Z. The latter comes from a +And 82.12 which feeds an Inverter 82.13. The +And 82.12 is gated by the B Counter Advance gate line 82.10 and by a +S 1B, input E, from the 1B trigger which was on. The same sample pulse that turns off 1B, therefore, will turn on 2B.

The other triggers are not affected at this time.

The next word in the memory is thereby addressed by the new setting of the B Counter.

Figure 60:
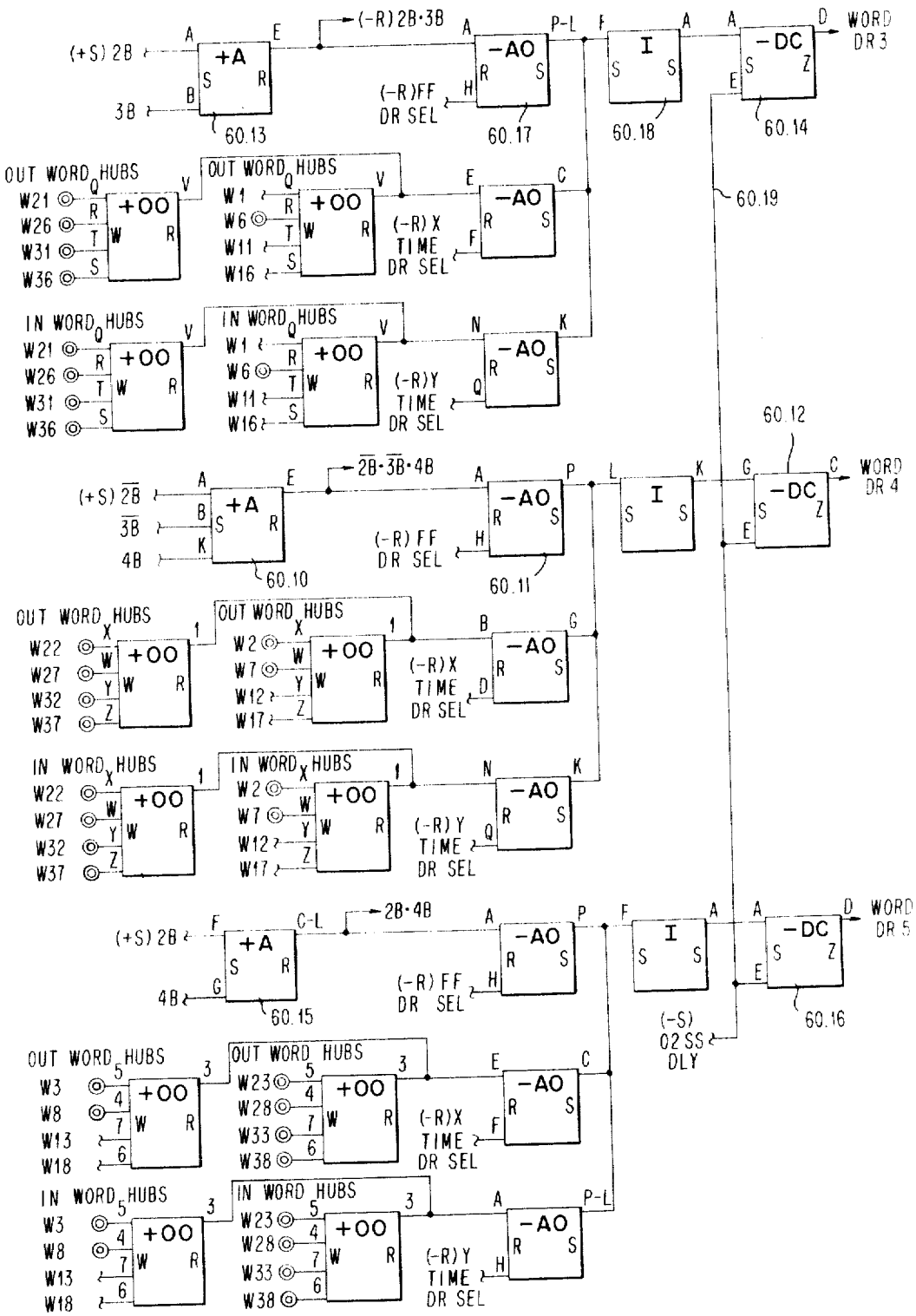

With 1B and 4B on, Word Driver 4 will be selected. Word Driver 4 is shown in FIG. 60. Under these conditions, $\overline{2B}$, $\overline{3B}$, and $\overline{4B}$ are satisfied for the +And 60.10. A —R level results to the —AO 60.11. The other input to 60.11 is a —R Fixed Factor Driver Select line.

Figure 55:
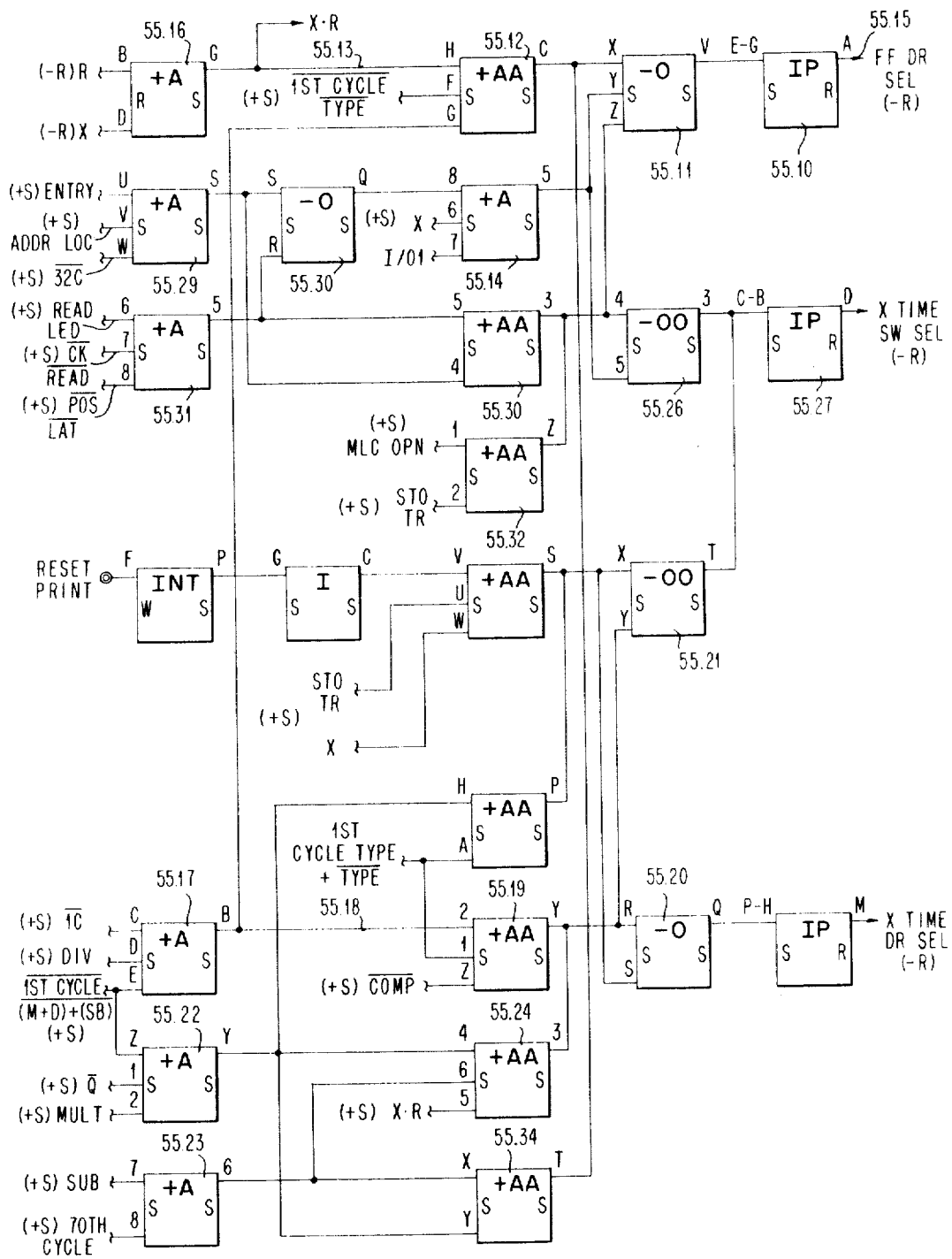

The Fixed Factor Driver Select line is generated in FIG. 55 and is derived from the Power Inverter 55.10. This is driven by a —Or 55.11.

The Fixed Factor Driver Select line is analogous to the X Time Driver Select and Y Time Driver Select lines which were used previously. The Fixed Factor Driver Select will give a timing emphasis to the selection and in turn is conditioned under control of the operation programmed.

Any of three inputs to the —Or 55.11 may be conditioned to cause a Fixed Factor Driver Select output.

For example, the X input to —Or 55.11 will be conditioned during a Type operation. An exception is the First Cycle of Type shown at input F of the +AA 55.12. The H input of 55.12 is brought up at Read time and X time. Therefore, at X time, Read, the line 55.13 will be conditioned. A further exception is when the +AA 55.34 is not conditioned because of certain Multiply and Divide conditions.

The Y and Z inputs to 55.11 have to do with Magnetic Ledger operations and have additional logical conditions imposed upon them. For example, the +And 55.14 is controlled by an X level, and I/O Register 1 input and other signals connected with Read Ledger, Alphabetic Entry, etc. The Z input has similar impositions.

Referring again to FIG. 60, the —AO 60.11 is conditioned accordingly by the —R Fixed Factor Select line. Its output is inverted and drives Word Driver 4 block 60.12 as required. The other word drivers are selected in a similar manner. For example, 2B and 3B inputs to the +And 60.13 fire the Word Driver 3 block 60.14; 2B and 4B condition the +And 60.15 to fire Word Driver 5 block 60.16.

It will be noted that at least one of the 2B, 3B or 4B triggers must be on in order to gate any driver. Otherwise, no driver will be selected by the B Counter. A zero condition of the B Counter, therefore, permits selection under control of the direct control panel signals, as seen earlier.

Figure 62:
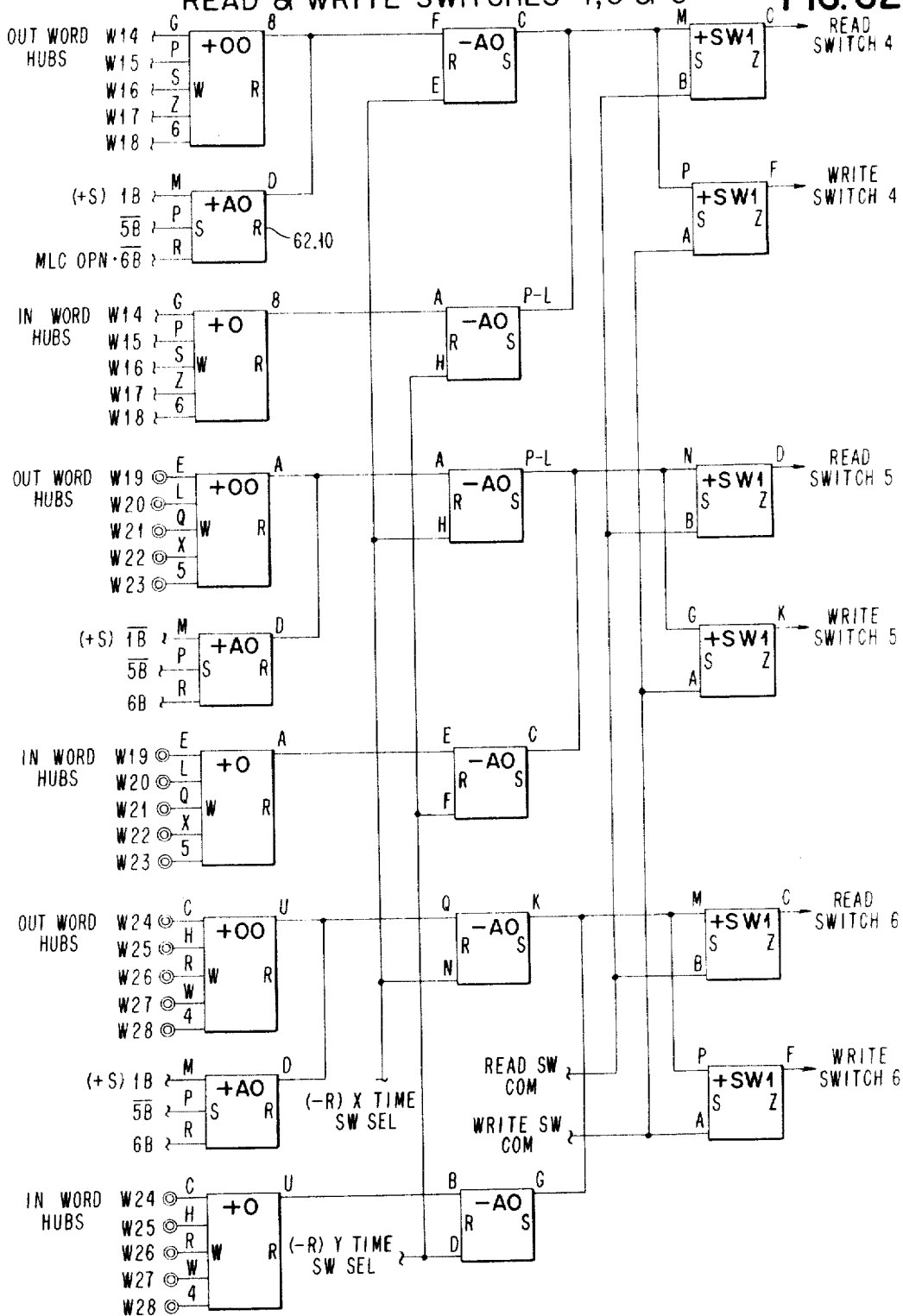

Ordinarily, with 1B and 4B on, Read-Write Switch combination 4 might be selected under various circumstances as shown in FIG. 62. A +AO 62.10 is conditioned off of 1B; Not 5B; MLC operation, and Not 6B lines. This latter line is conditioned only for an MLC operation, such as Read Ledger, or Record Ledger.

If the machine is not in an MLC operation, the switches mentioned would not be selected. However, it will be recalled from the Driver selection just described, that MLC gating was not required.

If an MLC operation is not in effect, Driver 4 will be selected as before, but Switch 4 will not be selected. Instead a different Switch will be selected.

Figure 56:
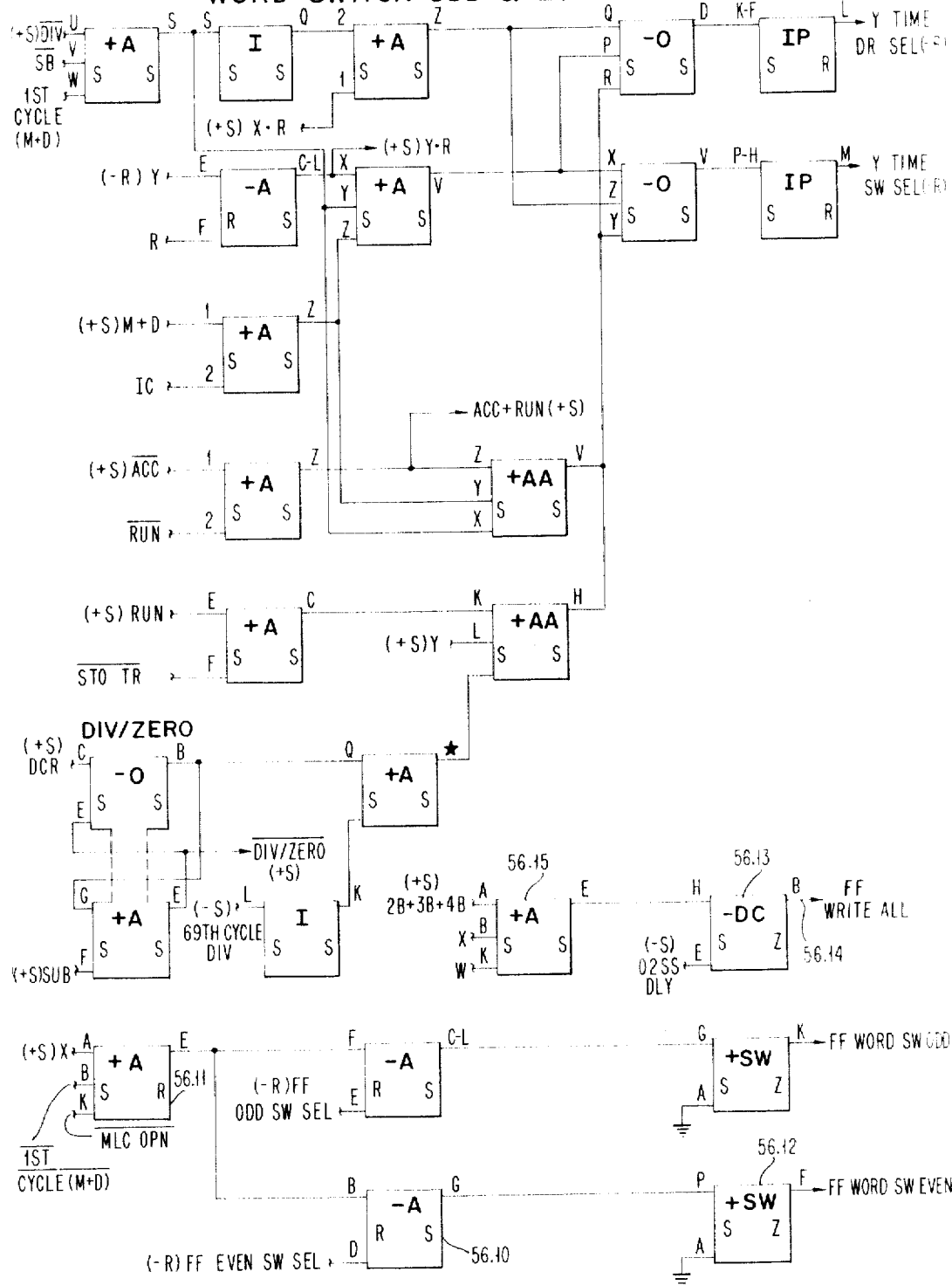

Referring to FIG. 83, a +And 83.10 has inputs of Not First Cycle Type and 1B. The output of this gate provides a —R Fixed Factor Even Switch Select. This line is applied in FIG. 56 to a —And 56.10 pin D. The B input of this —And is from a +And 56.11 which has +S inputs of X from the X/Y trigger, Not First Cycle (Multiply or Divide); and Not MLC operation. When these inputs are satisfied, a Fixed Factor Word Switch Even 56.12 is fired, since the A input of 56.12 is always at ground level and gated.

The companion switch Fixed Factor Word Switch Odd 56.13 is directly above 56.12.

Depending on whether or not the machine is in an MLC operation or not, the Word Driver 4 will cooperate with Word Switch 4 in the former case or with Fixed Factor Word Switch Even in the latter case.

In the latter case, one of the fixed factors in the Fixed Factor memory, FIG. 8, will be selected as the X word for use in a Numeric Type operation or in a Column Shift operation.

None of the Fixed Factor logic is directly dependent on the programming of the Type or Shift operations, but rather is dependent on the machine not being in an MLC operation, and further not being in a Multiply or Divide operation, and further having the B Counter set as described.

Therefore, the B Counter being set at anything other than zero, and the machine not being in an MLC or a Multiply or Divide, is all that is necessary to specify that Fixed Factor words are to be selected.

Continuing with the Type operation, it will be recalled that the word to be typed out is stored in Memory in binary form and must be translated to a decimal form in order to be printed on the Primary printer or the Ledger printer.

The translation from binary to decimal and the significance of the Fixed Factors will be described.

The Fixed Factor selection is of particular importance. However, the complete operation will be described. The use of Fixed Factors in the manner to be described makes it possible to translate easily from binary to decimal codes.

The use of a different set of Fixed Factors would make it possible to translate from binary to any other radix desired. The machine in this case operates only in binary and decimal however.

An entire Type operation will be described with attention being directed primarily to the B Counter.

There are four things to be programmed:

(1) The operation-Type function.

(2) The printer to receive the information must be selected, that is the Primary printer or the Ledger printer, or both.

(3) The source—that is, the word of memory from which information is to be typed. This is the *Out* word.

(4) Digit Capacity—This may also be referred to as "Field Width." It is the number of spaces on the form that have been reserved for the information involved. Since each word in memory holds the equivalent of ten decimal digits in binary form, a Digit Capacity up to ten can be programmed. If a Digit Capacity of 2 is programmed, the two lowest order digits of the programmed Out word will be printed.

When the Type operation is initiated, the proper relays are energized and a DC reset occurs as usual to set the Clock triggers to their proper states.

Figure 74:
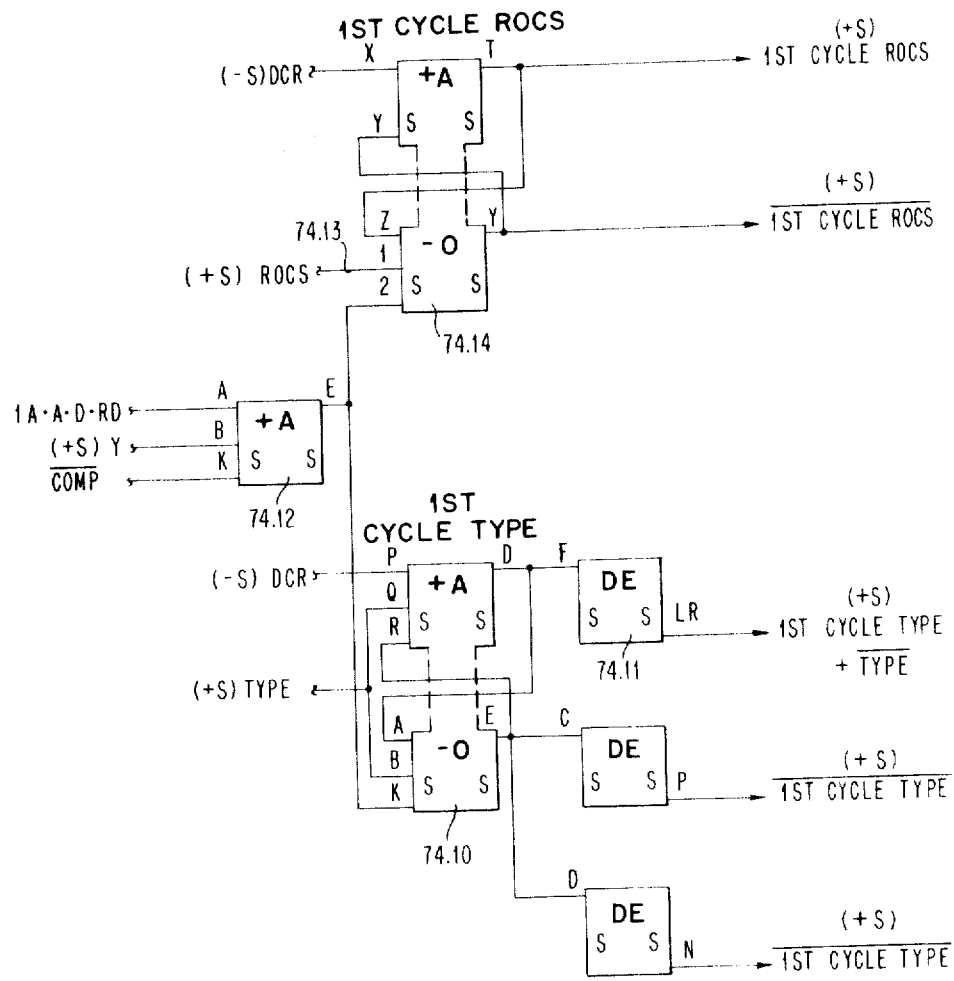

To begin the Type operation, the First Cycle Type Latch, 74.10, FIG. 74, is set to its on state by a —S signal on DC Reset that is applied to Pin P. A +S on Type comes in at pins Q and B. If the machine is not in a Type operation, the latter line will be —S and both sides of the latch will be conditioned due to the convert function of the +And and —Or blocks used in the trigger. If the machine is not in a Type operation, both sides of the latch will be +S. In the assumed case, the latch is turned on, pin D of the +And portion of 74.10 is +S feeding pin A. All other inputs to the —Or portion of 74.10 are +S, so the output at pin E is —S. The +S output of the +And portion of 74.10 is applied through an Emitter Follower 74.11 to supply a First Cycle Type or Not Type signal.

Prior to the first cycle of Type, the B Counter is set to select a Fixed Factor of the selected Digit Capacity plus 1. That is, the counter is set up to select the next higher order Fixed Factor. For example: If the Digit Capacity is 2, the B Counter will be set up to select the Fixed Factor corresponding to the third digit of the numeric word. However, the B Counter is stepped once before it is used in the operation. The reason for doing this involves the Column Shift Operation to be described later.

As shown in the table of FIG. 77, it will be noted that if a Digit Capacity of 1 is selected, trigger 1B and 4B are set on.

A Digit Capacity of 2 will result in setting up trigger 4B only to its on state. In FIG. 77 it will be seen that the Fixed Factor $.5 \times 10^2$, which is associated with the third digit, is selected. However, this is not the Fixed Factor that will actually be used. The B Counter is stepped prior to commencement of the Type operation.

The purpose of the First Cycle of Type is to transfer the programmed X word to the Overflow Register (OFR). This then is the information in binary form which is to be printed. This is a simple Transfer operation.

Figure 97:
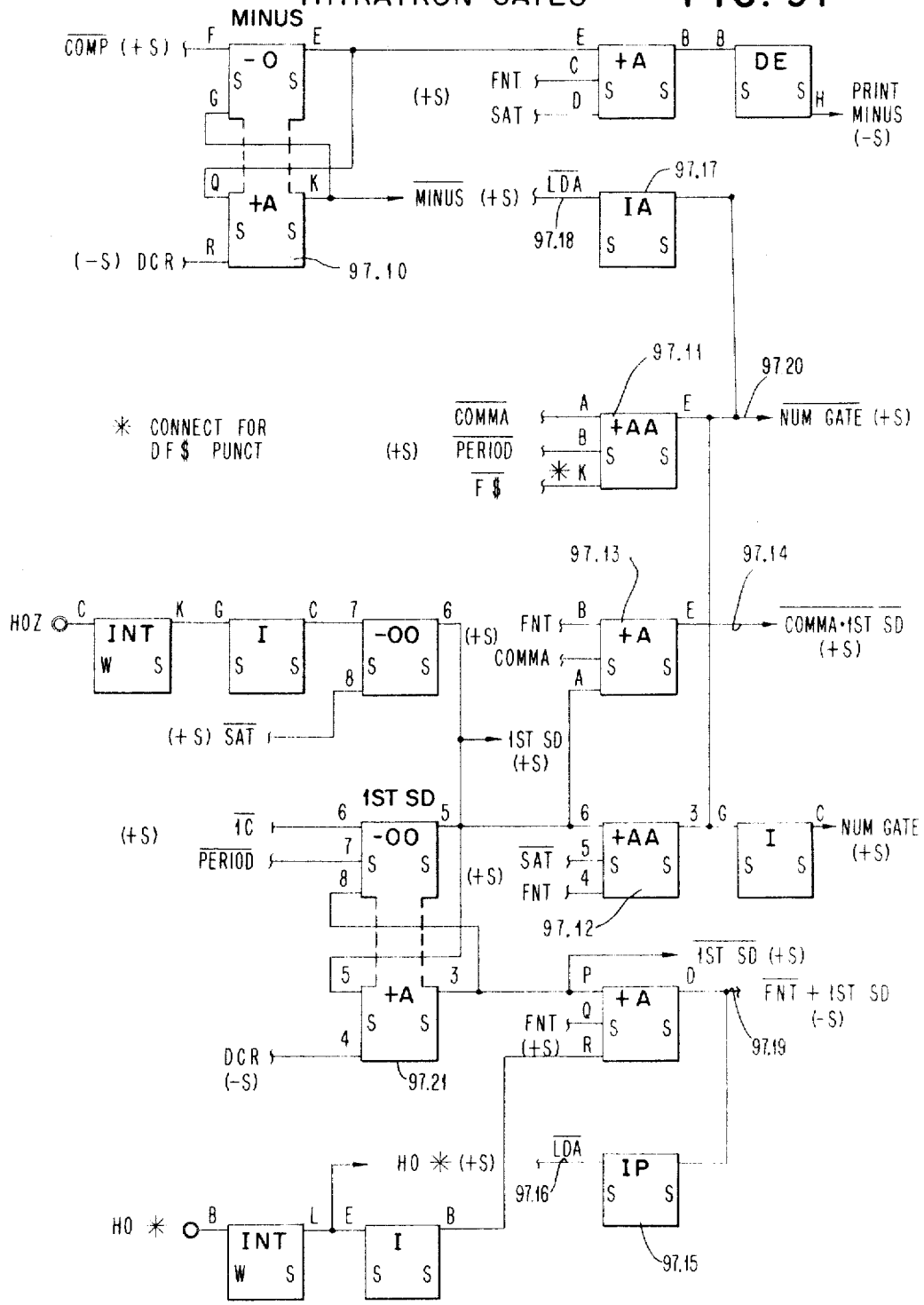

A Minus Latch 97.10, FIG. 97, is set if the X word is negative. This latch is normally reset to its off state and will turn on only if the X word is a negative word. If this is the case, the operation involved is effectively a Subtraction, as far as the Adder is concerned. The Overflow Register is prevented from reading to the Storage trigger, so in effect the X word is subtracted from zero, the result is placed in the Overflow Register and since a change of the sign of the Overflow Register is required, the machine will take a sub-cycle known as a complement cycle to recomplement the contents of the Overflow Register. The Complement trigger output will set the Minus Latch on. The purpose of this latch is to print a Minus sign (—) in the Space after Type (SAT), that is, the space following the units digit of the word to be typed.

The Overflow Register is addressed at Y time and is blocked and cleared. Referring to FIG. 57, the line 57.15 marked —R Overflow Register Switch Selection will be noted. This is derived from two +AO blocks 57.10 and 57.14. The lower +AO 57.14 receives several inputs, including an Inhibit Overflow Register Reading, which is for an optional feature. Input M is Y from the X/Y trigger and Read from the Read/Write trigger. Input P receives a signal from the —Or 57.13. This block receives a —S on the Not Type input A since this is a Type operation. The +AO 57.14 is thereby conditioned in a Type operation at Y Read time. The other +AO 57.10 will take care of writing in the Overflow Register. Pin H is conditioned in a Type operation. Pin G receives a +S input from the Accumulator trigger in the arithmetic section of the machine, which will be active when the contents of the out word are being added to or subtracted from zero. If a 1 results, this line will be active indicating that it is necessary to write a 1 into the memory. The input F is used to inhibit the operation of the Overflow Register relating to Divide or other operations. Not Type will enable writing into the Overflow Register. The —R Overflow Switch Select signal is applied in FIG. 59 to pin D of a block 59.17 with a Y clock pulse at pin B. This results in selection of Driver 1. The Read-Write Switch 2 combination is selected in FIG. 61 by identical signals to —AO block 61.20.

As mentioned, the first cycle of Type is a Transfer operation. As such, the Transfer line 73.10 is brought up in FIG. 73 by a —S signal on the Not First Cycle Type line to input D of the —Or 73.11. This line cooperates with Transfer + and Transfer — hub inputs from the Control Panel. The resulting output will allow the Y time word to be cleared to zero and the contents of the X word will have been transferred to the Y time word, that is, the Overflow Register. One of the uses of the Transfer output from on line 73.10 is shown in FIG. 66 of the logic where the signal comes in to a +And 66.22 along with a Y time gate and a Not Complement signal.

The output of the +And 66.22 goes to another +And 66.14 along with other inputs Not 1A, A, Read, Read Delay; at pin E; and First Digit Keyboard Entry Latch at pin F. The output goes from there to a —Or 66.19. The effect of this is to inhibit the Storage Trigger 66.10 from turning on during a Transfer operation. As the Y time word is read out of the memory, and each bit is reset to zero, the Storage trigger will not be affected by the information. Therefore, the arithmetic section proceeds as if the Y time word was actually zero. The result of the operation is the addition of the quasi-zero with the input from the X time word which is unaffected by this logic.

The arithmetic portion of the machine is either in an Add mode or a Subtract mode at all times. This is determined by the condition of the Add/Subtract trigger 72.10, FIG. 72.

The first cycle of Type, being a Transfer operation, is begun with the Add/Subtract trigger in the Add state. The logic at the bottom of FIG. 72 results in the set up to the Add state. If the number to be transferred is positive, the Add/Subtract trigger will stay in the Add state and an addition takes place as described with the contents of the X word being added to the quasi-zero condition of the Overflow Register. Near the end of this operation, the Add/Subtract trigger will change to its Subtract state. This is done through the logic in the left hand portion of FIG. 72. Referring to +And block 72.11 with +S inputs Type and Add, the output will be —S. This is applied to the —Or 72.12, becoming +S to the +AA 72.13 which is Anded with the +AA 72.14. Other inputs to 72.13 are D and X clock signals. The +AA 72.14 has 1A and A clock signals. The other input to +AA 72.14 is a —Or 72.15 which supplies a +S output because of the —S on the Not Type line. An output is therefore available on lines 72.16 and 72.17 to gate the Add/Subtract trigger 72.10 so that the next Write Sample Pulse will cause the trigger to change its state to Subtract.

The timing here occurs during the Dummy Digit time of the second word time. So at X time of this Dummy Digit interval, therefore, the Add/Subtract trigger will change to its Subtract state. A shift in voltage as the trigger changes its state is applied to a Sample Pulse Driver 78.10, FIG. 78. The Add/Subtract input to pin Q of the —Or 78.12 is +S on Add. The negative shift on pin Q as the Add/Subtract trigger changes state to Subtract, is inverted and applied at pin R of the Sample Pulse Driver 78.10. The Sample Pulse Driver 78.10 supplies a B Sample Pulse on line 78.15 to step the B Counter.

The B Counter will step down according to the table in FIG. 77. The B Counter thereby steps down to the status corresponding to Digit Capacity 1, which is the Digit to Type 2. At this time 1B and 4B are now on. This then is the first count level of the B Counter which is actually effective during the Type operation.

The B Counter is stepped in this manner so that the same hubs on the Control Panel can be used for addressing the proper Fixed Factor during Type out as well as the proper Fixed Factor for a Column Shift operation which requires a Fixed Factor one address higher.

After the B Counter has been stepped at X time of Dummy Digit time, the first cycle of Type has been completed. It is now necessary to turn off the First Cycle Type Latch 74.10, FIG. 74. This results from a signal at pin K from the +And 74.12. This +And is conditioned by timing pulses of 1A, A, D, Read Delay, Y, and Not Complement. If the first cycle of Type has been successfully completed and there is no complement operation to take care of, the First Cycle Type Latch will be turned off during Read Delay of Y time of the Dummy Digit interval. It will be recalled that the Clock was started at Write time of the Dummy Digit interval. After the Clock has gone through one complete cycle (one word time) and the machine is back to the Read time just preceding the corresponding point where the machine started, the First Cycle Type Latch will be turned off.

The information to be typed is now located in the Overflow Register. The next operation is to decode the first digit to be typed. This, in the assumed case, is the second or tens position and the operation to be described will involve addressing the Fixed Factor corresponding to Digit 2 at X time, addressing the Overflow Register at Y time, and performing a subtraction under control of the Add/Subtract trigger. That is, the Fixed Factor will be subtracted from the binary number to be decoded which is in the Overflow Register.

The X time selection is under control of the B Counter. Near the bottom center of FIG. 78, is a line 78.16 designated —R Fixed Factor Odd Switch Select. This is derived from a +And 78.17 which has Not 1B and Not First Cycle Type inputs, and a further input from the —Or 78.18, which is active when any one of the B Counter triggers 2B, 3B, or 4B is on. No output was derived from the +And 78.17 during the First Cycle of Type because input F was —S. Input G of +And 78.17 is Not 1B, but no selection of a Fixed Factor will occur unless one of the triggers 2B, 3B or 4B is on, thereby carrying out the philosophy that the B Counter has no effect when it is in a reset to zero condition.

The circuitry at the bottom of FIG. 78, selects the Fixed Factor Odd Switch, which selects one half of the Fixed Factors. There is another line for selecting the Fixed Factor Even Switch which is shown in FIG. 83.

In the table of FIG. 77, it can be seen that the Fixed Factor Switch lines are alternately designated EVEN and ODD. These are selected by the 1B trigger as can be noted by the even-odd status of the Switches and the 1 and 0 status of the 1B trigger.

In FIG. 83, +S inputs for Not First Cycle Type and 1B will provide an ouput from +And 83.10 on the Fixed Factor Even Switch Select line. The Odd and Even Switch lines go directly to select the proper Fixed Factor word in memory for use in the Type operation.

The Y time selection of the Overflow Register is indicated in FIG. 57 and involves logic previously discussed in connection with the First Cycle of Type, when the Overflow Register was also the Y time word. The manner of selection during subsequent cycles is the same as in the first cycle.

Subsequent cycles occur with the Fixed Factor being addressed at X time and the Overflow Register at Y time.

The Fixed Factor will be subtracted from the Overflow Register contents. The Fixed Factor involved for the Digit 2 to be typed is $.5 \times 10^1$ which is a Factor of 5 and which is stored in the Fixed Factor memory in a binary form. The factor actually required to be subtracted is 10, not 5. Therefore, the Fixed Factor of 5 at the output of the memory must be doubled. This is performed by the X Delay trigger 67.14, FIG. 67. This trigger was previously reset off. Gate C is directly from the Storage trigger 66.10 which is +S when the Storage trigger is on, indicating a 1 output from the Sense line of the memory.

Input B comes from the —AO blocks 67.15 and 67.12. These are controlled by —R outputs from either Fixed Factor Odd Switch Select or Fixed Factor Even Switch Select at X time except for First Cycle Multiply, First Cycle Divide or First Cycle Round Off Column Shift through the +And 67.13. If the Storage trigger is on at X time under the conditions noted, the X Delay trigger 67.14 will be turned on by the next occurring Write Sample Pulse.

The output of the X Delay trigger is applied to input R of the +And 68.27, FIG. 68, along with an X gate input to pin Q. This will control the —Or blocks 68.24 and 68.25 to turn on the Accumulator trigger 66.11 or turn off the Accumulator trigger. The two —Or blocks 68.24 and 68.25 are normally conditioned directly by the output of the Storage trigger as reflected by the output of a +AA 68.28 at X time, a further —Or 68.29 which receives inputs related to Multiply or Divide and Sign Bit, and a further input X Delay gate through Inverter 68.30 which is derived from the —AO blocks 67.15 and 67.12.

Under normal conditions, the output of the Storage trigger is fed directly into the arithmetic section of the machine. However, if the X Delay Gate is +S, which it is at this time, the Storage trigger is inhibited by the output of a +AA 68.31. The X Delay trigger 67.14 then, is substituted for the Storage trigger at this time through the +And 68.27 and the —Or 68.24 and 68.25. The effect of this is to delay the output from the memory one bit time before it reaches the accumulator gates in FIG. 68. The delay occurs because the Storage trigger is turned on at one Read Time, while the X Delay trigger controlled by it is turned on at the next Write Sample Pulse time. It can not be gated into the Accumulator, however, until the following X time (input Q of +And 68.27) so the net effect is to delay the bit one full bit time. This results in a Shift one bit to the left, thereby doubling the number.

The Fixed Factor 5 is doubled to 10 for subsequent use in the arithmetic section. The developed factor 10 is then subtracted from the contents of the Overflow Register.

During the first word time, the Fixed Factor Even and Odd Switch Select lines were inhibited by a First Cycle Type line. The X Delay trigger could not be gated on at that time and the Storage trigger performed in its normal and usual manner.

The Fixed Factor is then addressed at X time for subtraction from the contents of the Overflow Register. Since the Read out of the core memory is inherently destructive in nature, the Fixed Factor cores are switched from their 1 state to their zero state.

It is necessary to write the Fixed Factors, so that they can be used subsequently. Writing into Fixed Factors is performed by a single Word Write Driver which is involved in the writing of all bits in both physical Fixed Factor words. All Fixed Factors are written during X time, Write Time. The Driver involved is in FIG. 56 at 56.13. Its output is Fixed Factor Write All on line 56.14. The timing of the write impulse is taken care of by an 02 Single Shot Delay in conjunction with 2B or 3B or 4B, X, and Write signals to the +And 56.15. Any time Fixed Factors are used, at least one of the triggers 2B, 3B or 4B will be on in the B Counter. The writing of the bits is also under control of the appropriate digit or bit select lines as in any Write operation.

Figure 70:
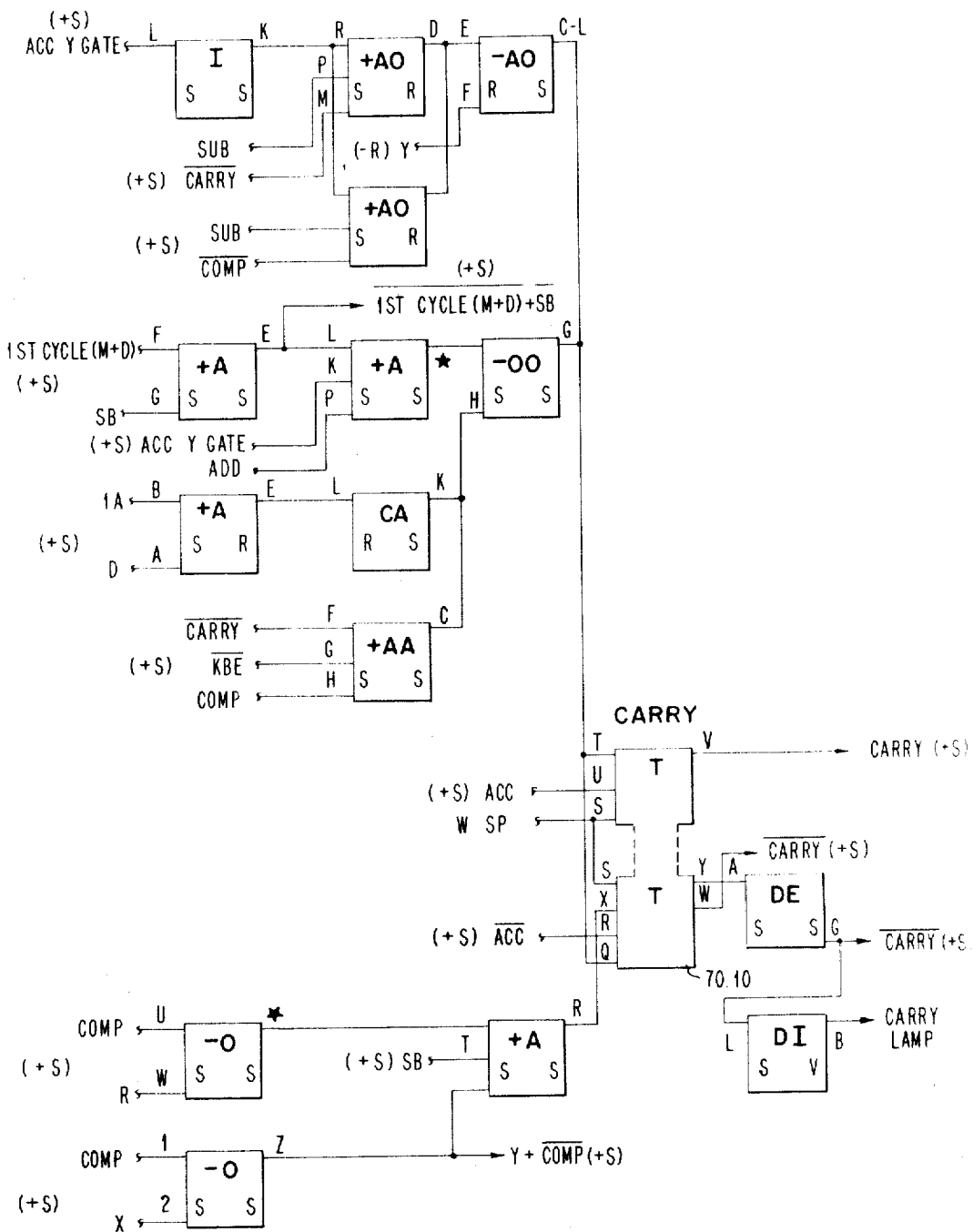

At the end of the Subtract cycle, the condition of the Carry trigger 70.10, FIG. 70, is checked to see if the sign of the number in the Overflow Register has changed. This will influence the operation of the C Counter, previously described. In this case, the C Counter is used to count the repetitive subtract cycles of the Fixed Factor, that is, to determine how many times the 10 can be subtracted from the number in the Overflow Register before the sign of the Overflow Register has been changed.

The effect of this, in the assumed case, is to divide the number in the Overflow Register by the Fixed Factor 10 thereby determining the number to be typed.

The Carry trigger indicates a borrow out of the high order position of the Overflow Register, which would indicate a change in sign.

Figure 84:
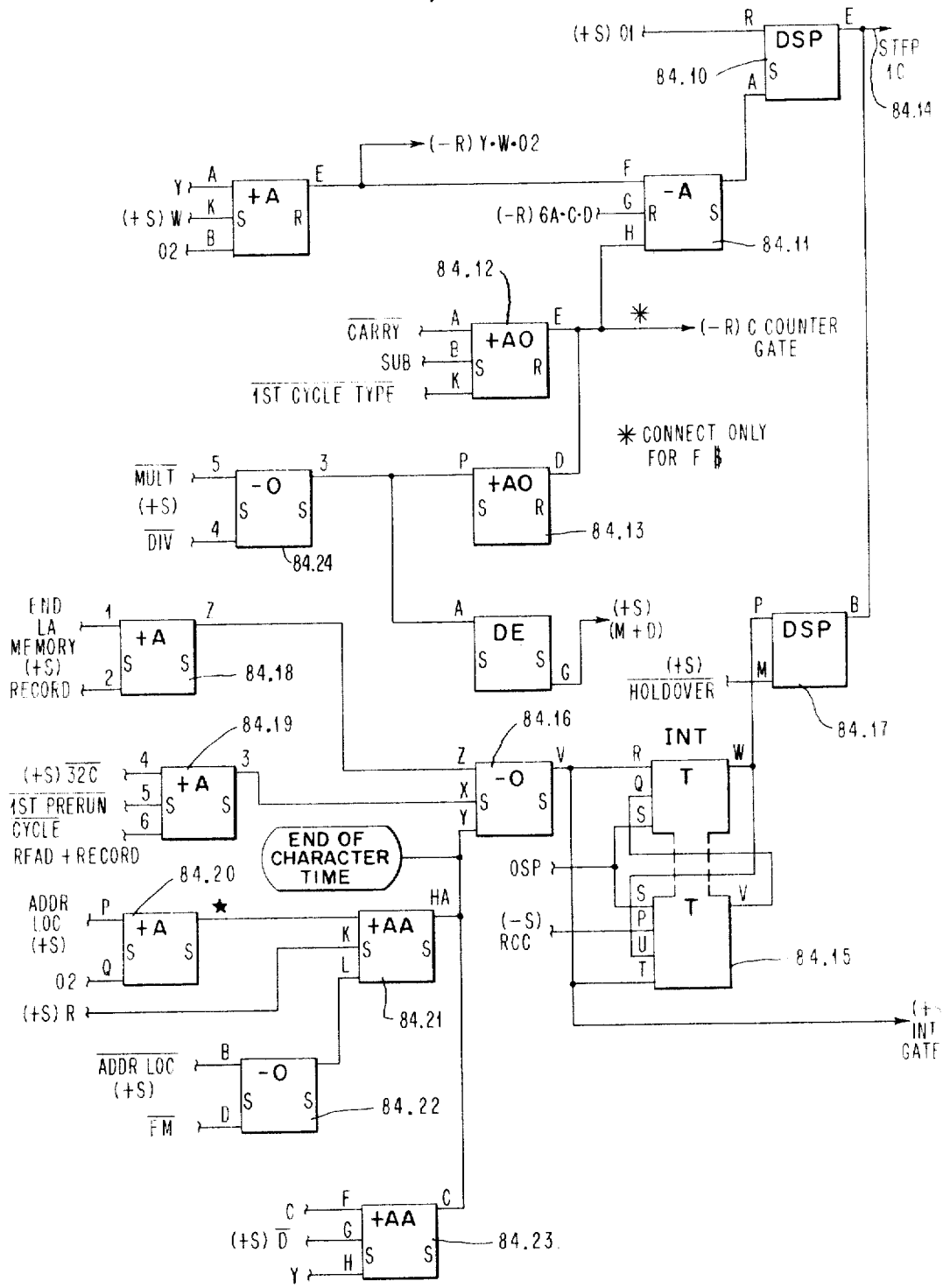

The logic for stepping the C Counter is shown at the upper part of FIG. 84. A Sample Pulse Driver 84.10 is provided for this purpose. This is gated by a —And 84.11. This is controlled by signals 6A, C, D, Y, Write and 02 which defines a time at the end of the 34th Digit time in the word cycle. The —And 84.11 is also controlled by two +AO blocks 84.12 and 84.13. Output pin D of the +AO 84.13 is active during Multiply or Divide only. The upper +AO 84.12 is involved here. It will not supply an output during First Cycle Type but after that time will do so, provided the machine is in a Subtract operation and a Not Carry condition exists, that is, the Carry trigger is not on.

If the Carry trigger is not on at the end of 34th Digit time, this means that the word in the Overflow Register has not changed its sign, that is, not overdrawn. With the next 01 pulse to pin R of the Sample Pulse Driver 84.10, the C Counter will be stepped by a pulse on line 84.14.

Figure 86:
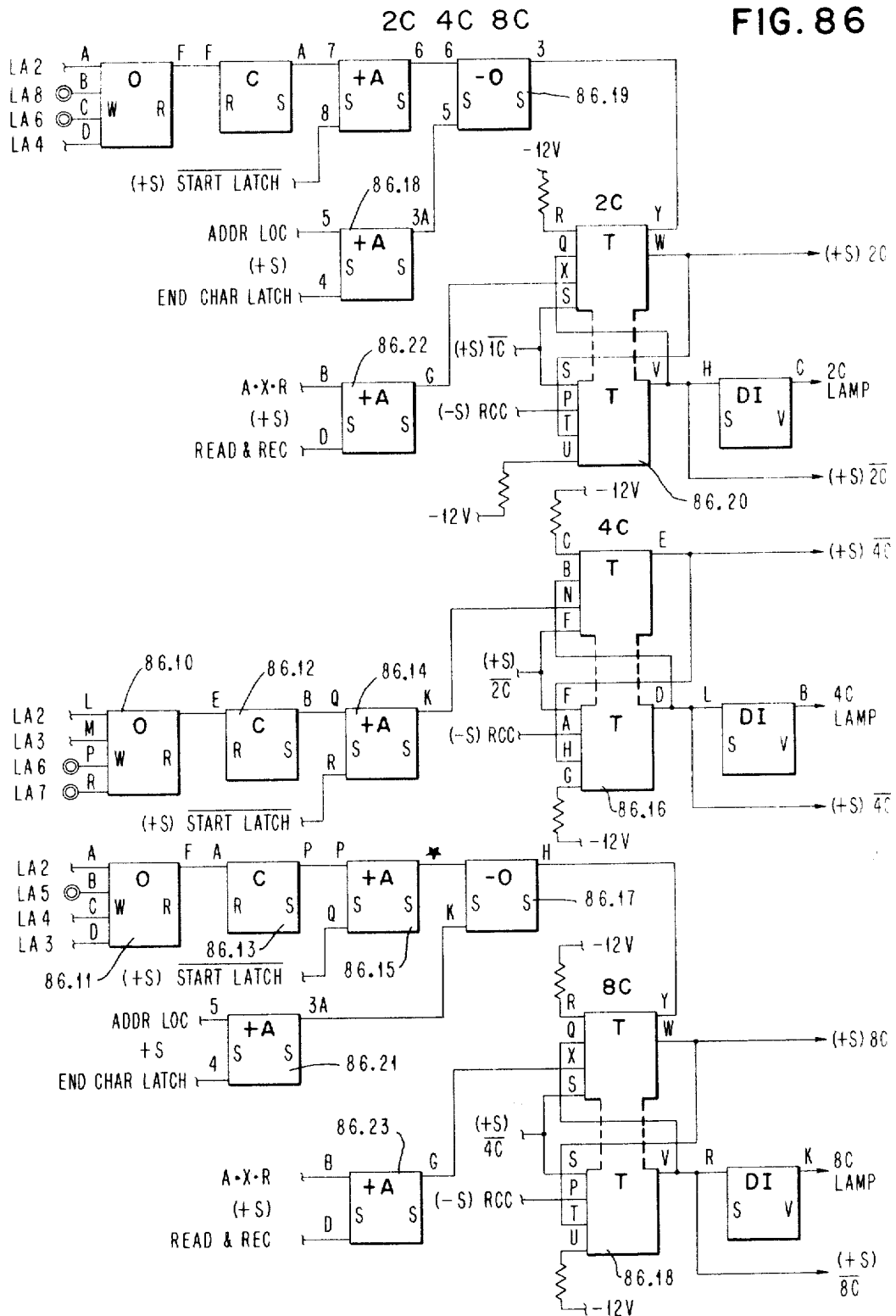
Figure 87:
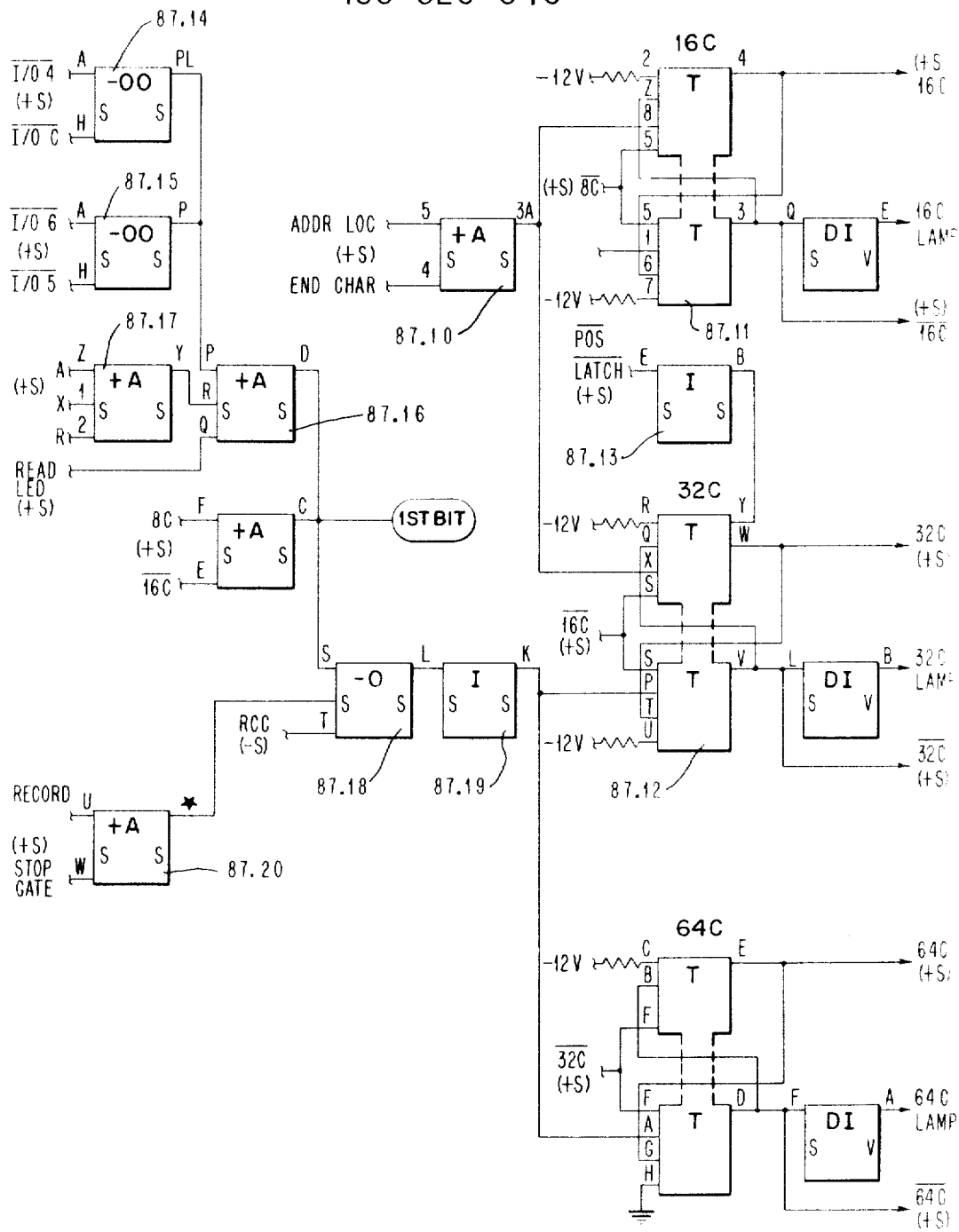

The C Counter is shown in the following figures of the logic:

| | |
|---|---|
| 1C | FIG. 85 |
| 2C | FIG. 86 |
| 4C | FIG. 86 |
| 8C | FIG. 86 |
| 16C | FIG. 87 |
| 32C | FIG. 87 |
| 64C | FIG. 87 |

The trigger numbers correspond to the binary weighted values they represent. The triggers 16C, 32C and 64C are not involved in the Numeric Type operation.

The C Counter is connected in a straight binary fashion to count each of the successful subtractions. The Step 1C impulse, line 84.14, is applied on line 85.10 to turn 1C on or off depending on its previous state. 1C in turn controls 2C, and so on. The C Counter steps along in a regular manner, but is inhibited by the Carry trigger being on when the first unsuccessful subtraction occurs.

The machine continues to subtract and the C Counter continues to count, still addressing the same Fixed Factor.

The operation will continue until the Carry trigger comes on.

Referring to the Add/Subtract trigger 72.10, FIG. 72, it will be recalled that this trigger has been in the Subtract state up to now. If the Carry trigger is on at the 34th Digit time, its input and the +S input whenever the machine is not in First Cycle Type to the +And 72.18 will result in a signal to change the state of the Add/Subtract trigger to the Add state. This occurs through the —Or 72.12, the +AA 72.13, and the —Or 72.19 when D time and X time Clock signals are applied to the +AA 72.13, and various input conditions to the +AA 72.14 are satisfied. This will occur during the Dummy Digit X time following the change in the state of the Carry trigger.

With the Add/Subtract trigger in its Add state, the addressing of memory is not changed, the C Counter did not step at the time of completion of the last subtraction, and the machine will now go through one complete word time addressing the same Fixed Factor as before. This Fixed Factor will now be added back to the Overflow Register contents. The net effect of this is to correct the overdraw. At the end of this cycle, the Overflow Register will be changed back to its state prior to the unsuccessful subtraction as noted by the condition of the Carry trigger 70.10.

As before, the Carry trigger input to +And 72.18 will drive the Add/Subtract trigger to its Subtract state. The B Counter Sample Pulse Driver is again impulsed to drive the B Counter.

The B Counter moves to its next setting so that the Fixed Factor .5×10⁰ (next lower order) is addressed. This is accomplished by turning 1B off and 2B on. Driver 5 and Fixed Factor Odd Switch will be selected.

This Fixed Factor will be delayed again by the X Delay trigger so that it will have an actual factorial value of 1.

This will be the next Fixed Factor involved during Type out in order to obtain the units digit.

At this time, 6A time of the addback cycle, the number developed with the Fixed Factor is set up in the C Counter. The number in the C Counter is in a 1–2–4–8 code and is applied in FIGS. 98 and 99 to fire the appropriate Thyratron Drivers for printing the character developed.

For example, +And 98.10 has Not 8C and Numeric Control gate inputs at pins P and Q. This is applied to the —OO 98.11 and through the Inverter 98.13 and the Inverter 98.13 to drive the R2A magnet in the Primary Printer, FIG. 116, and the R2A magnet in the Ledger Card Printer, FIG. 130.

The Thyratron actually selected is controlled by relay circuitry on the other side of the printer magnets.

Therefore, magnet R2A will be fired anytime the 8C trigger in the C Counter is off. The Numeric gate to pin Q of +And 98.10 is simply a gate which occurs subsequent to the final set up of the C Counter and is derived from FIG. 97.

In a similar way, +And 98.14 controls the R2 magnet with Not 8C and Not 4C inputs. The binary weighted code of the C Counter is thereby used directly to fire the proper print magnets.

In this way, the thyratrons will be fired to print the tens digit.

The C Counter is then reset to zero to count successful subtraction of the next Fixed Factor. To prevent the electronic circuits from getting ahead of the typewriter, the Clock is stopped and electronics waits for a feedback signal from a circuit breaker C2 in the typewriter, FIGS. 116 or 130, to restart it. The C2 signal comes in through the 64–4 N/O contact, FIG. 48, to restart the electronics and let the operation continue.

The next lower order Fixed Factor will be subtracted until an overdraw occurs. At this time, the C Counter will contain the proper value for printing the units digit. The thyratrons are again fired and the units digit printed. At this point, the decoding of the number is completed. The last overdraw has been added back. The Overflow Register has been restored to zero.

The typewriter will take one additional space which is the Space After Type, or in the case of a negative number, the Minus Latch 97.10 mentioned earlier will cause printing of the minus sign by activating the thyratrons as for any other number. When this has been done, the Type operation is terminated, and the relay operation restarted into the next program step by a signal on line 104.14 as at the end of every program step.

*Punctuation Control and Punctuation Options*

Figure 79:
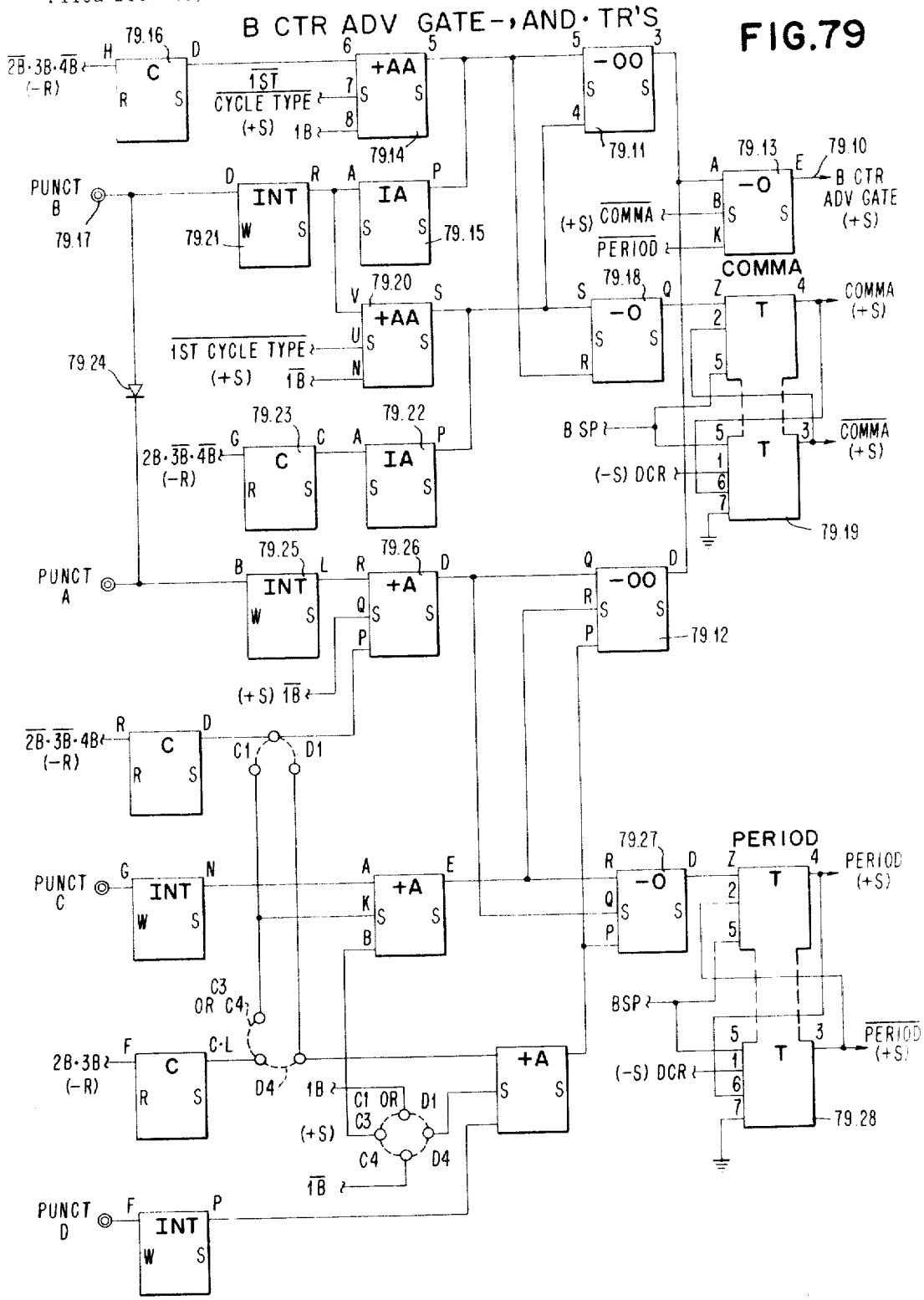
Figure 80:
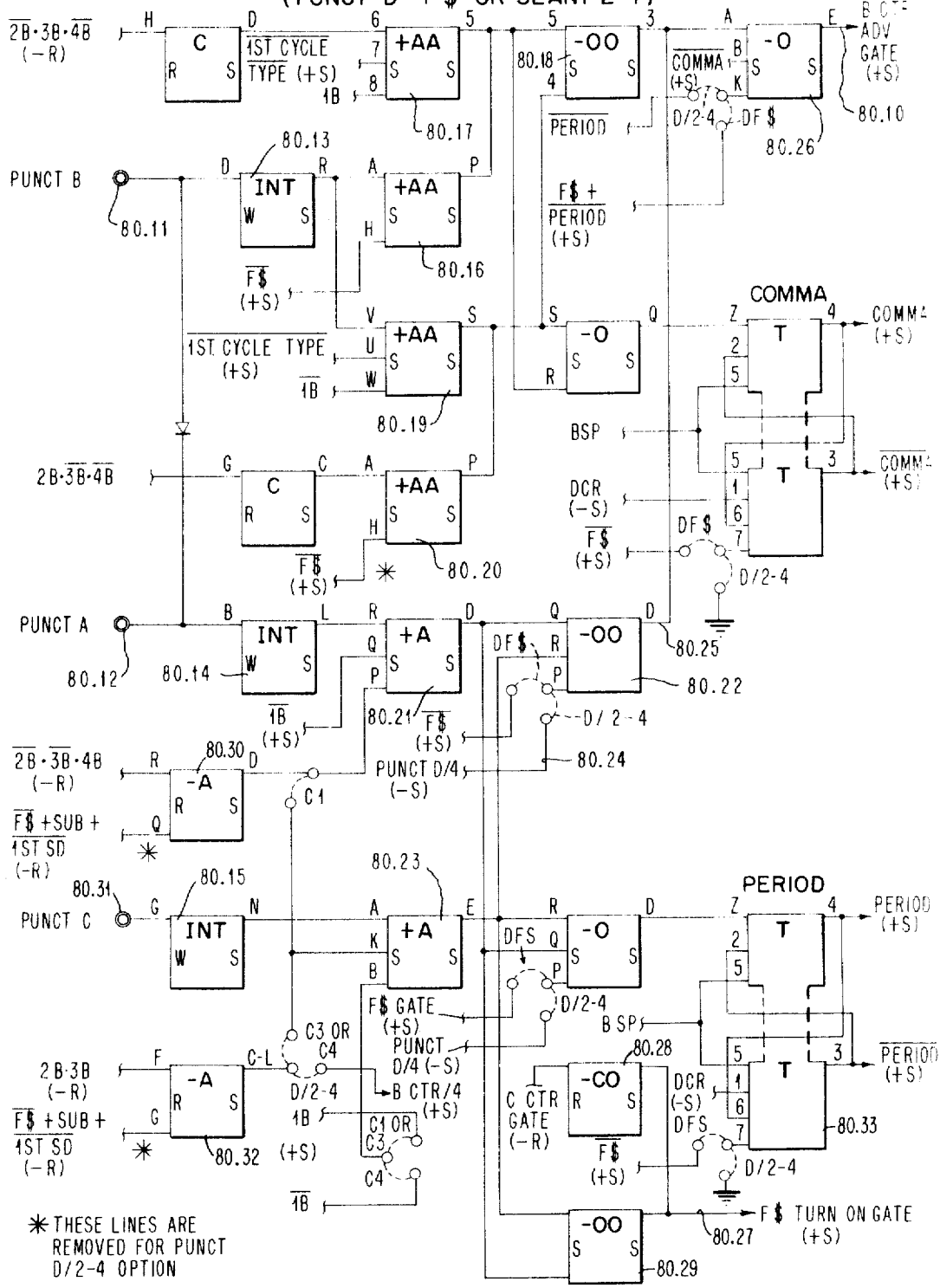
Figure 81:
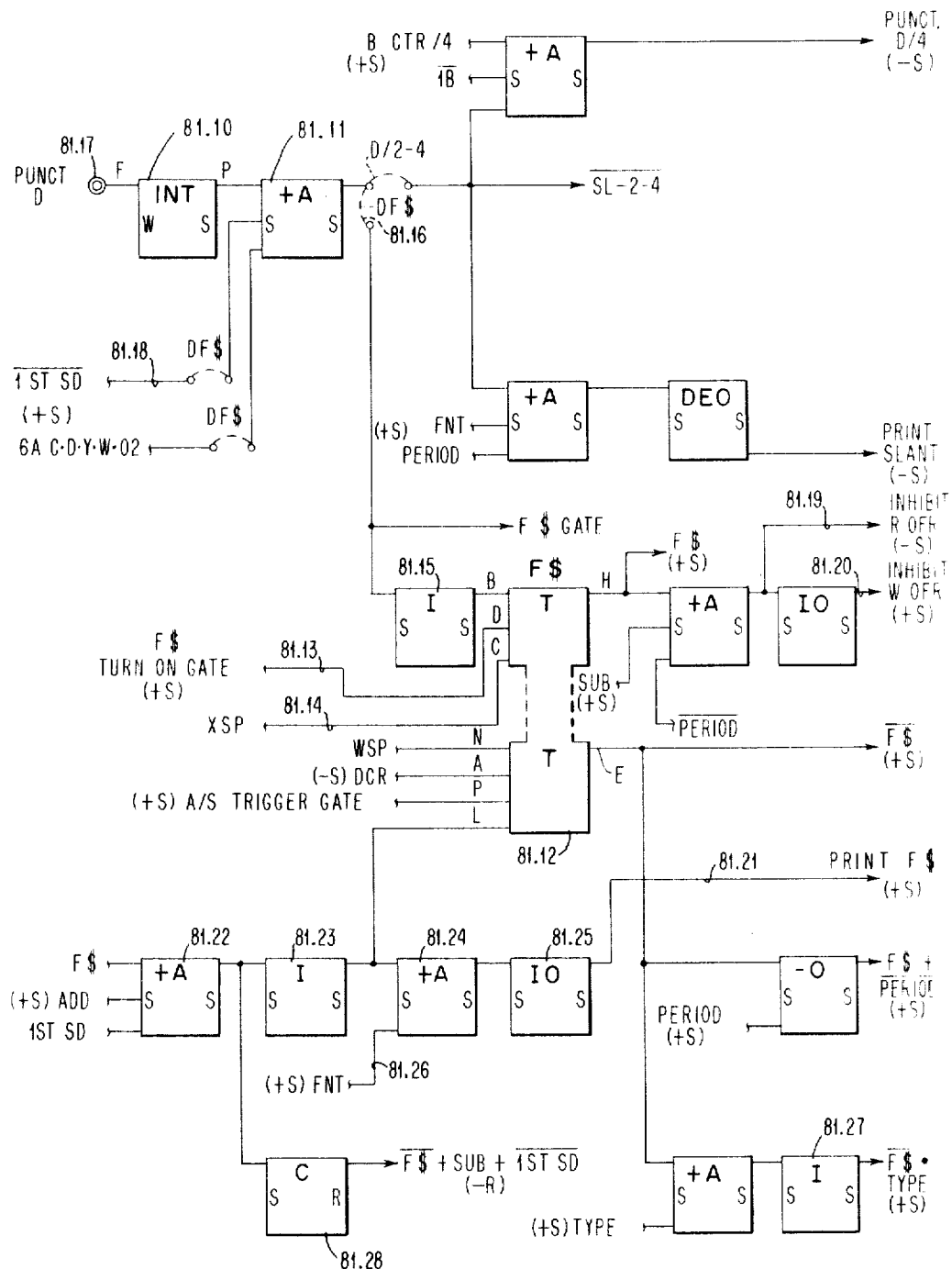

A number of punctuation control hubs and punctuation option hubs are shown in FIG. 6. These hubs, together with the logic associated with them, are also shown in FIGS. 79, 80, and 81. The punctuation alternatives for use during a Numeric Type operation are as follows:

*Punctuation A.*—A control signal to this hub will produce the following format during a numeric type operation:

```
10  9  8  7  6  5  4  3  2  1
 x  x  x  x  x  x  x  x. x  x
```

*Punctuation B.*—A signal to this hub on the control panel will result in the following format during a Numeric Type operation:

```
10  9  8  7  6  5  4  3  2  1
 x  x,  x  x  x, x  x  x. x  x
```

*Punctuation C.*—A signal to this hub on the control panel will produce a period in one of the locations shown below. The choice of location is pre-selected and then determined by internal wiring in the machine.

```
10  9  8  7  6  5  4  3  2  1
 x  x  x  x  x  x. x. x  x. x
```

All possible locations for periods are indicated in the format diagram shown. The period positioned between the first and second positions is designated C1. The period located between the third and fourth positions is designated C3. The period located between the fourth and fifth positions is designated C4.

*Punctuation D.*—A signal to this hub on the control panel will result in the printing of a Floating Dollar Sign (F$). Additional punctuation may also be used concurrently, that is, Punctuation A, or B, or C, in which case, the Floating Dollar Sign will be printed just prior to the first non-zero digit or period. An example of the Punctuation D-Floating Dollar without additional punctuation:

$856432

$6432

$2

In this case, if there are no periods or significant digits the Dollar Sign ($) will not print.

*Punctuation D.*—The Floating Dollar sign may be programmed in conjunction with Punctuation A, Punctuation B, or Punctuation C.

*Examples:*

Punctuation A and Punctuation D-F$   $12345678.09
                                           $1.09
                                            $.09
                                            $.00

Punctuation B and Punctuation
     D-F$                             $12,345,678.09
                                         $123,456.78
                                             $.12
                                             $.00

Punctuation C4 and Punctuation D-F$     $1234.5678
                                           $.1234
                                           $.0001

*Slant 2–4 option*

The format for this option is as follows:

xxxxxx/xx/xx

The machine can be prewired to print a Slant (/) between the second and third digits, designated Slant 2, and a slant between the fourth and fifth digits designated Slant 4.

FIG. 79 shows circuit logic for the B Counter Advance Gate for the four basic punctuation options A, B, C and D, and FIGS. 80 and 81 together also show the B Counter Advance Gate and the four basic punctuation options. However, FIGS. 80 and 81 illustrate the additional logic required when the Floating Dollar Sign (F$) option is provided. Because of the similarity between FIGS. 79 and 80, therefore, the B Counter Advance Gate lines 79.10 and 80.10 will be used interchangeably herein.

In order to illustrate the versatility of the punctuation options, the Punctuation B and the Punctuation D (F$) options will be described in detail. The other punctuation options operate in a manner which is similar to these options.

*Punctuation B.*—Referring to FIG. 79, the B Counter Advance Gate on line 79.10 is normally +S because the —OO block 79.11 and the —OO blocks 79.12 have outputs of —S to pin A of the —Or 79.13. Considering the inputs 5 and 4 of —OO 79.11 and the inputs Q, R, and P of —OO 79.12, the following conditions are applicable. In order to establish a —S input to pin 5 of 79.11 it is necessary that the outputs of +AA 79.14 and IA 79.15 are —S. This will be true if the four inputs to 79.14 and 79.15 are all +S. This requires a —R level of Not 2B and 3B and Not 4B to the Convert block 79.16. It is also necessary to have a Not First Cycle Type input of +S to pin 7 of 79.14 as well as a +S on the 1B line to 79.14. The final conditioning input is a +48 volts to the Punctuation B hubs 79.17. The joint output of +AA 79.14 and IA 79.15 is applied to pin 5 of —OO 79.11 as well as pin R of a —Or 79.18. The —Or 79.18 output controls the setting of a Comma trigger 79.19. Whenever the Comma is placed in its on state, a +S output is available and under proper conditions will cause the printing of a comma.

Considering also the +AA 79.20, this +AA is conditioned by the output of the Integrator 79.21 when a +48 volt signal is applied at hub 79.17, and is also conditioned by a +S on the Not First Cycle Type line to pin U and a +S on the Not 1B line to pin W. The output of +AA 79.20 cooperates with an IA block 79.22 which responds to a +S output from a Convert block 79.23 when a —R 2B and Not 3B and Not 4B condition exists. The combined output of +AA 79.20 and 27.22 is directed to pin 4 of —OO block 79.11 and pin S of —Or 79.18. This establishes another condition for setting the Comma trigger 79.19 in its on state in order to produce a comma.

The control panel signal to the Punctuation B hub 79.17 is also directed through a diode 79.24 to the input of an Integrator 79.25 whose output is applied to a +And 79.26. The Q input and the P input are both +S under certain B Counter conditions as shown in FIG. 79. When +And 79.26 is properly conditioned a —S output from it can then be applied through the —OO block 79.12 to pin A of the —Or 79.13 in order to derive a +S output on line 79.10. The output of +And 79.26 is also applied to a —Or 79.27 which directly controls a Period trigger 79.28. The Period trigger, when in its on state, will set up conditions for printing a period during the course of Numeric Typeout. The other control panel hubs for Punctuation A, Punctuation C, and Punctuation D, will establish appropriate gating and logic conditions in a manner similar to that just described.

Referring once more to the format layout shown above for the Punctuation B option, it will be observed that the purpose of the option is to print a comma between digits 9 and 8, to print a comma between positions 6 and 5, and to print a period between positions 3 and 2.

Reference is also made to the table on FIG. 77 which shows the various B Counter set up conditions. The second column in the table sets forth the digit to be typed. The tenth digit will be typed first, followed by the ninth digit, followed by the eighth digit, and so on through the remaining digits.

It will be assumed that the digit capacity of 10 has been selected by a wire to the DC 10 hub 76.28.

When the B Counter reaches the status in the table of FIG. 77 which corresponds to the ninth digit to be typed, position 2B in the B Counter will be in the on state, and the other positions will be off. Referring to FIG. 79, with the signal to Punctuation B hub 79.17 and a Not First Cycle Type +S to +AA 79.20, the condition of the B Counter at this time establishes a —S output to pin 4 of —OO 79.11 and —Or 79.18. It should be noted that the Not First Cycle Type line to pin U of +AA 79.20 insures that no comma will be printed during the first cycle in the event the digit capacity is such as to imply that a punctuation is desired, but in fact none is required.

With the —OO block 79.11 having an output of +S, input A of the —Or 79.13 is deconditioned, and this results in the B Counter Advance Gate dropping to a —S level on line 79.10. This prevents the B Counter from advancing from its current status. The output of the —Or 79.18 gates the Comma trigger 79.19 so that it turns on with the next B Sample pulse to pin 5. This is the same sample pulse which ordinarily would have stepped the B Counter upon the occurrence of an overdraw of the fixed factor then being addressed by the B Counter. An add back cycle takes place in order to restore the Overflow Register to its previous condition before the overdraw. This aspect of the operation was covered in the Numeric Type operation.

Referring to FIG. 97, the Not Comma input to +AA 97.11 will be —S since the Comma trigger 79.19 is now in its on state. Therefore +AA 97.11 will supply a —S output and the Fire Numeric Thyratron signal (FNT) to pin 4 of the +AA block 97.12 will be ineffective to fire the thyratrons as they would be under normal conditions.

Instead of this, a +And 97.13 with a Fire Numeric Thyratron input, and a Comma input, as well as a First Significant Digit input will provide a —S signal on line 97.14.

Figure 100:
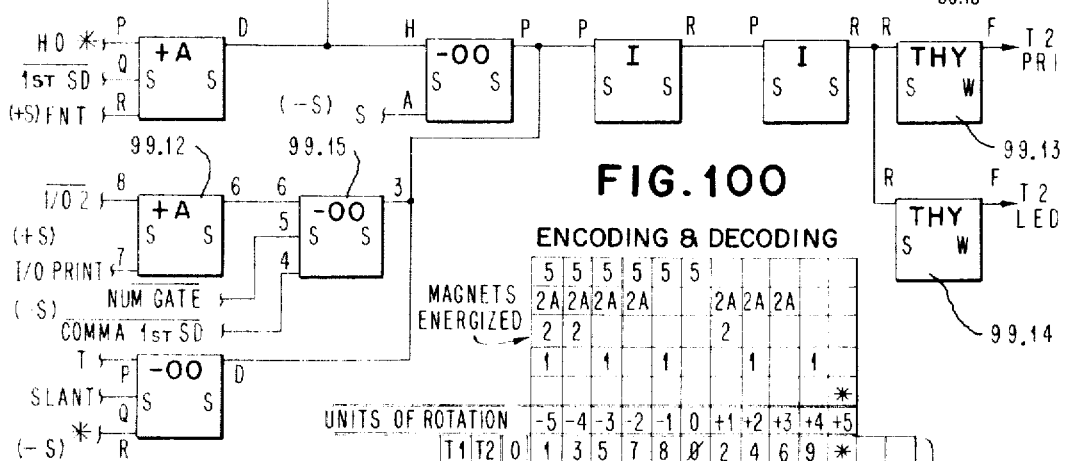

In the table of FIG. 100, it will be observed that in order to print a comma it is necessary to fire a thyratron 99.13 or a thyratron 99.14 which will establish two units of tilt for the Primary printer or the Ledger printer, respectively. The Not Comma or Not First Significant Digit line to pin 4 of a —OO block 99.15 is —S and will thus cause the thyratrons 99.13 and 99.14 to fire.

In FIG. 79, gating pin 7 of the Comma trigger 79.19 is grounded and pin 6 is a +S from the on side of the trigger. The trigger will thereby turn off upon the occurrence of the next B Sample pulse. When the trigger 79.19 is placed in its on state, the Not Comma input to the —Or 79.13 became —S. This permits the B Counter to advance and the development of the next numeric digit as previously described will continue. Referring again to the table in FIG. 77, when the digit to be typed is digit 6, the state of the B Counter is 1B, not 2B, 3B, and not 4B in FIG. 79, this state of the B Counter will condition +AA 79.14, and with the input to Punctuation B hub 79.17, a —S signal is applied to pin 5 of 79.11 and to pin R of the —Or 79.18. This will result in a repetition of the operation just described wherein the comma is printed in the proper position.

If the digit typed is 3, the B Counter status is not 1B, not 2B, not 3B, and 4B. This condition of the B Counter will gate the +And 79.26. The output of +And 79.26 is applied through a —OO 79.12 to the —Or 79.13 to prevent the B Counter from advancing. The output of +And 79.26 is also applied through a —Or 79.27 to set the Period trigger 79.28 to its on state. The printing of a period at this time will occur in a manner similar to the printing of a comma just described with the exception, that is it is necessary to fire only the Check thyratron 103.18 in FIG. 103. This is done when the lines Period, Fire Numeric Thyratron, and Not Floating Dollar Sign, become +S to a +And 103.20. It is apparent that the B Counter can be used in many different ways and under many conditions for controlling printing and punctuation in a selective manner.

*Punctuation D-Floating Dollar Sign (F$)*

A Floating Dollar Sign trigger 81.12 is provided in FIG. 81 for controlling the printing of a Dollar Sign ($) under the various formats and conditions noted above. Trigger 81.12 is gated by a +S level on the Floating Dollar Sign Turn On gate line 81.13, by an X sample pulse on line 81.14, and by various other conditions which cause an input to pin B of trigger 81.12 from an Inverter 81.15. Inverter 81.15 receives a signal from a +And 81.11 through a wire 81.16 which is shown in dashed form, but which will be connected if the Floating Dollar Sign option has been established in the machine. The +And 81.11 will supply a —S output to Inverter 81.15 when the various conditions to its three inputs are satisfied. These are: a Punctuation D signal to hub 81.17, a Not First Significant Digit signal on line 81.18, and Clock conditions 6A, C, D, Y, Write and 02.

The Floating Dollar Sign Turn On gate on line 81.13 is derived from a line 80.27, FIG. 80. The line 80.27 will be $+S$ under certain conditions as determined by a $-CO$ block 80.28 and a $-OO$ block 80.29. The input to the $-CO$ block 80.28 is a C Counter gate signal which is at a $-R$ level any time that the C Counter is to be advanced during a Numeric Type operation. The $-OO$ 80.29 has two inputs. One of the inputs is from a $+And$ 80.21, which is under control of an Integrator 80.14 and a $-And$ block 80.30. The $+And$ 80.21 will supply a $-S$ output if either the Punctuation A hub 80.12 is wired, or the Punctuation B hub 80.11 is wired, and the B Counter is at a certain count status as indicated at pin R of the $-And$ 80.30. Also, input Q of the $-And$ 80.30 must be satisfied with a Not Floating Dollar sign or Subtract or Not First Significant Digit.

The other input to the $-OO$ block 80.29 is derived from a $+And$ 80.23. $+And$ 80.23 responds to a control panel signal at hub 80.31 through Integrator 80.15 and other conditions set up by a $-And$ 80.32 having to do with the placement of periods between the third and fourth positions and the fourth and fifth positions of a digit being typed.

If a Floating Dollar Sign is to be printed before the first significant digit of a number, and no other punctuation is to be printed, the control for printing of the Dollar Sign is established through the $-CO$ block 80.28.

The $-CO$ 80.28 is controlled by a $-R$ C Counter gate from a $+AO$ block 84.12. It will be recalled that during a Numeric Type operation, a Step 1C pulse is set up on line 84.14 in order to step the C Counter each time that a successful subtraction has been made. The Step 1C pulse occurs under control of the $+AO$ block 84.12. The inputs to the $+AO$ 84.12 are Not Carry, Subtract, and Not First Cycle Type. During each cycle, except the first, the machine is in a Subtract mode, and a successful subtraction is indicated by the fact that there has been no carry.

The occurrence of this signal during the first successful subtract cycle of a Numeric Type operation indicates that there is significant information to be printed. With the Punctuation D option wired, it is required that a Dollar Sign be printed before the first significant digit is printed. The turning on of the Floating Dollar Sign trigger 81.12 effectively blocks subsequent subtract cycles until after the printing of the Dollar Sign takes place. Since it is assumed that the Floating Dollar Sign trigger 81.12 has been turned on, the lines 81.19 and 81.20 will have Inhibit Read Overflow Register and Inhibit Write Overflow Register signals. These are applied in FIG. 57 to inhibit selection of the Overflow Register and thereby force an overdraw. This causes the Add-Subtract trigger 72.10 FIG. 72, to change to the Add state in the usual manner as for any Numeric Type operation. A $+S$ Print Floating Dollar Sign signal is supplied on line 81.21 from a series of logic blocks: $+And$ 81.22, Inverter 81.23, $+And$ 81.24, and IO 81.25. The Inputs of $+And$ 81.22 are Floating Dollar Sign, Add, and First Significant Digit. When the time arrives for a character to be supplied to the printer, the Fire Numeric Thyratron line 81.26 becomes $+S$ to the $+And$ 81.24.

The $+S$ Print Floating Dollar Sign signal is applied to line 99.16 and results in the energization of thyratron 99.17 for the Primary printer, thyratron 99.18 for the Ledger printer, or both thyratrons together, in order to print the Dollar Sign.

Position 1C of the C Counter was turned on during the first successful subtract cycle, and it is also necessary to prevent it from affecting the print cycle. This is done by the Not Floating Dollar Sign input to pin K of a $+AA$ 97.11 which is now $-S$, and results in a $+S$ on the Not Numeric gate line 97.20. This will prevent gating the C Counter status to the numeric thyratrons.

The B Counter Advance Gate 80.10 is at a $-S$ level at this time since all inputs to $-Or$ 80.26 are $+S$ including the input Floating Dollar Sign to pin K. The B Counter is prevented from advancing during this cycle.

The clock stops in the usual manner after the firing of the numeric thyratron for printing the Dollar Sign and waits for the signal from the printer or printers indicating that the printing cycles have been completed.

If no additional punctuation is required during the Numeric Type operation being considered, and if the digit being typed has only one significant digit, the Space After Type (SAT) trigger 78.34 must be delayed from turning on for one additional print cycle in order to allow the printing of the Dollar Sign. Trigger 78.34 is degated by a $+S$ signal on line 78.35 which is derived from an Inverter 81.27. Inverter 81.27 in turn is controlled by the $+S$ Not Floating Dollar sign output of the Floating Dollar Sign output of the Floating Dollar Sign trigger 81.12 and the $+S$ Type signal, both of which are satisfied at this time.

As noted above, it is possible to select one of the punctuation options A, B, or C, in order to supplement the Punctuation D or Floating Dollar Sign option. When other punctuation has been selected by control panel wiring, it is necessary to consider other factors in the punctuation procedure. There are two conditions that should be considered at this time. These include:

(1) The situation where there is only one significant digit before a period, (2) The situation where there is no significant digit before the period.

The Numeric Type cycle proceeds as previously described, and the Period trigger is not allowed to be turned on in the same cycle in which the Dollar Sign is printed. The Period trigger 80.33 is degated by the Not Floating Dollar sign signal or Subtract, or Not First Significant Digit input to pin G of the $-And$ 80.32. This particular signal condition is derived from a Converter 81.28, FIG. 81. The B Counter is prevented from advancing in a manner similar to that previously discussed.

Whenever there is no significant digit before the period to be printed, the Period trigger is allowed to be turned on by the fact that the Not First Significant Digit output of Converter 81.28 will be $-R$ to pin G of $-And$ 80.32. This results in a $+S$ gating output from $-And$ 80.32 which gates the $+And$ 80.23.

Handling of the period insertion during typeout of digits for the Punctuation A, and the Punctuation B options is similar, with the exception that it is under control of the Not Floating Dollar Sign, or Subtract, or Not First Significant Digit input to pin Q of the $-And$ 80.30.

When the Period trigger comes on, it establishes a gating condition at pin 7 of the First Significant Digit latch 97.21, which makes it possible to turn the Floating Dollar Sign trigger off at the end of the cycle in which the dollar sign is printed. The output of the First Significant Digit latch is applied to the $+And$ 81.22 which has Floating Dollar Sign, and Add as its other inputs. Since the Period trigger is on during the same cycle that the Dollar Sign is printed, it is necessary to inhibit printing of the period until the next succeeding cycle. This is done by the Not Floating Dollar Sign input to pin K of a $+And$ 103.20 which is $-S$ at this time, thereby preventing a $-S$ output from the $+And$ 103.20. Other Floating Dollar sign situations as well as the Slant 2 and Slant 4 situations are handled in a manner similar to that described.

DIGIT ANALYZER

The system of the present invention also has available as an optional feature a Digit Analyzer. The circuitry involved in the digit analyzer function is shown in FIGS. 134, 135, and 136.

61

In some accounting applications, it is desirable to control machine functions or arithmetic operations in a number of different ways, depending upon certain predetermined identifying indicia. For example, during the course of preparation of the invoices previously described, it might be necessary to accumulate running totals in different words of memory based on a territory or salesman number. It might also be desirable to print all information concerning a particular salesman or territory in a particular predetermined column of an auxiliary document which is fed through the carriage associated with the primary printer, and which is prepared concurrently with the preparation of the basic invoices.

Hubs 6.46, 6.47, and 6.48 on the control panel are associated with this function. The Load Digit Analyzer hub 6.46 is responsive to a signal from a Control Key hub, such as hub 6.40 or a Program Step Exit hub, such as hub 6.20, to initiate the Digit Analyzer function of the machine. This hub is also shown at 134.10.

Another hub 6.47, is designated Digit Analyzer Entry hub. This hub is also shown at 135.10. During the course of the Digit Analyzing function, a number stored in memory in binary form, is translated by means of the C Counter and results in the actuation of a number of relays 468, 469, 472, 474, and 476, all of which are shown in FIG. 134. Various points of these relays are arranged in a predetermined way in FIG. 135. A signal entered in the Digit Analyzer Entry hub 6.47 (135.10) will be routed to one of the Digit Analyzer Exit hubs 6.48 (such as hub 135.11) and will subsequently be used to initiate a machine function or select another word in memory.

The Load Digit Analyzer hub is also shown at 136.10. When impulsed, a +48 volt signal is applied through hub 136.10 to an Integrator 136.11 and also through diodes 136.12 and 136.13 to supply Load DA–2 and Load DA–1 impulses. The +48 volt signal is also supplied by the line 136.14 to pick Relay 471. The diodes and lines just mentioned are shown again for convenience near the top of FIG. 134. The output of the Integrator 136.11 is supplied through a Power Inverter 136.15, which in turn provides a —S level to a Power Inverter 136.16. When the Digit Analyzer function is not in effect, the line 136.17 will have a +S Not Load Digit Analyzer. The output of Power Inverter 136.16 acts as a gate to a series of the +And blocks 136.18–136.23. +And Blocks 136.18–136.23 are also gated under control of a Power Inverter 136.24 which receives a —S Fire Numeric Thyratron signal. The inverse of this is shown, that is, +S Not Fire Numeric Thyratron. In addition, +And blocks 136.19–136.23 have gating inputs from five positions of the C Counter: 1C, 2C, 4C, 8C, and 16C. It will be seen that the outputs of the +Ands 136.19–136.23 are applied through a respectively associated Power Inverter 136.25 and related Inverters 136.26–136.29 to fire respectively associated thyratrons 136.30–136.34. These thyratrons directly control the actuation of the five decoding relays 468, 469, 472, 474, and 476.

The output of the +And 136.18 under proper gating conditions during the Digit Analyzer operation, becomes a —S Fire Stop. This is applied to a line 104.24 in order to return control of the machine operations to the relay circuits at the completion of the Digit Analyzing operation.

The signal from diode 136.12 is applied to Integrator 73.26 in order to initiate a simulated Type operation, but without the actual typing of information as would normally occur during the Type operation. It will be seen that a +S Type signal will occur on line 73.23 and a +S Not Type signal on line 73.24. These outputs are applied to other circuitry in the machine as for a normal Type operation.

62

The Load DA–1 signal through diode 136.13 is applied on line 76.29 in order to set up the B Counter as for a Type Operation involving a digit capacity of 1. This will result in signals from a +OO block 76.10 to set position 1B of the B Counter and from +Or block 76.11 to set position 4B of the B Counter. Once the operation has begun, the setting of the B Counter will result in the selection of the fixed factor which is equivalent to the arithmetic value of .5.

As was noted in the Type operation previously discussed, the fixed factors selected under control of the B Counter are successively subtracted from the programed word, with the subtraction being counted by the C Counter in order to determine the proper digit to be typed out following the conversion process. During the normal Type operation, the C Counter is prevented from counting to a count level greater than 10. However, during the Digit Analyzer operation, it is necessary to develop a count total that lies within the range of 1 to 20 in order to fire the proper combinations of thyratrons 136.30–136.34, and thereby energize the associated decoding relays.

In order to enable the C Counter to count to a level greater than 10, the normally available inhibiting action in FIG. 57 is made ineffective. This is done under control of the +And 57.16 which receives a Not Load Digit Analyzer signal to its single input. When the machine is in a Load Digit Analyzer state, the line 57.17 will be at a —S level, thereby producing a +S output from the +And 57.16. The output of +And 57.16 is combined with the output of the +And 57.18 which normally produces the inhibiting action during the Type operation. The combined output of +And 57.16 and +And 57.18 is applied to pin X of a +And 57.19. The other inputs of 57.19 are +S, so the output of +And 57.19 becomes —S to a —Or 57.20. The output of —Or 57.20 then becomes +S to a +AO block 57.10, whose output in turn becomes —R on line 57.15. This is the Overflow Register Switch Select line which is involved in the Numeric Type operation.

In order to prevent the firing of thyratrons which normally occurs during a Type operation, additional logic is supplied in FIG. 97. The —S Not Load Digit Analyzer signal from line 136.17 is applied to a Power Inverter 97.15 on line 97.16 and also to an IA block 97.17 on line 97.18. The output of Power Inverter 97.15 becomes +S on the line 97.19 and is further designated Not Fire Numeric Thyratrons. The output of IA block 97.17 becomes a +S Not Numeric gate on line 97.20. These two signals will result in the thyratrons being inhibited during the Digit Analyser operations.

In all other respects, the operation proceeds in a manner comparable to the Type Operation. That is the desired binary word from memory is selected as the In word, and under control of the B Counter, the fixed factor is selected and repeatedly subtracted from the programmed In word. The usual overdraw will occur with the C Counter having stored therein a converted numeric value which represents the particular digit selected.

The outputs of the respective positions of the C Counter, that is: 1C, 2C, 4C, 8C, and 16C, are applied to the +And blocks 136.19–136.23. Further gating of +And blocks 136.19–136.23 is performed by the Power Inverter 136.24 under control of the +S Not Fire Numeric Thyratron signal from line 97.19.

When the time comes in the operation that the numeric thyratrons would ordinarily be fired, the +And blocks 136.19–136.23 are conditioned instead under control of the respective positions of the C Counter. After inversion the outputs of these +And blocks are applied to associated thyratrons 136.30–136.34 which in turn will energize the relays 468, 469, 472, 474, and 476, shown in FIG. 134.

It will be noted that the hold coils of the relays 468–476 are connected to +48 volts through normally closed points belonging to Relay 471. This relay is energized as soon as an impulse is supplied at the hub 134.10. This results in resetting all of the relays upon initiation of the Digit Analyzer operation. However, once the operation has been initiated, Relay 471 becomes de-energized, and permits the selective energization of the relays 468–476 under control of the C Counter.

As a result of the selective energization of the decoding relays 468–476, their respectively associated points will be transferred or not transferred in FIG. 135. Therefore, any impulse applied to the hub 135.10 after the selection has been made, will be available at one of the Digit Analyzer Exit hubs 1–20, such as hub 135.11, and may thereupon be used to select a particular word of memory in order to accumulate a running total, for example, or in order to select a particular horizontal position of the primary printer for printing purposes.

MEMORY SELECTION DURING COLUMN SHIFT OPERATIONS

Figure 75:
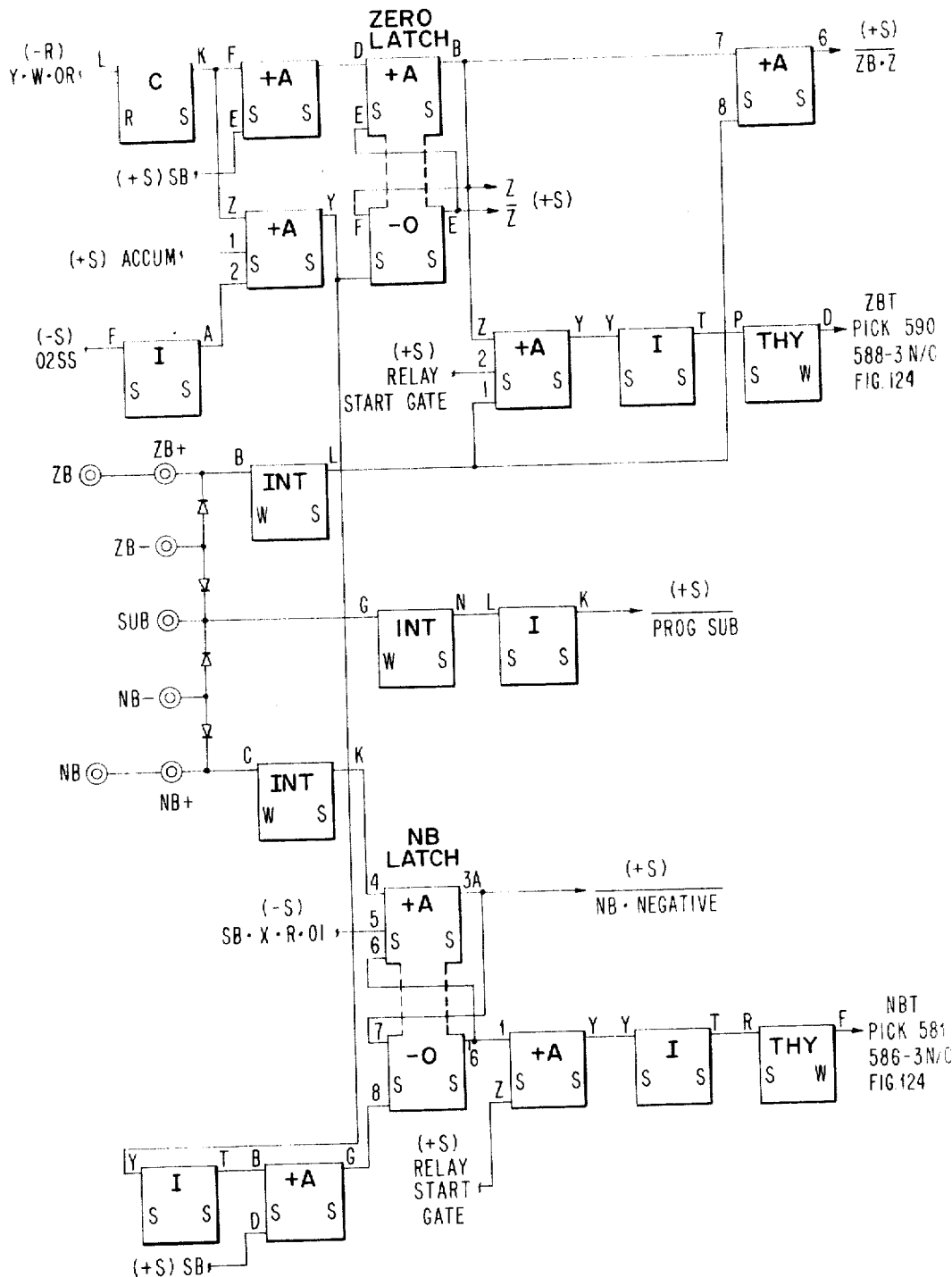

As mentioned in the aforementioned copending application Serial No. 248,110, the machine is capable of performing the basic arithmetic operations of addition, subtraction, multiplication, and division as well as those other operations required for normal accounting purposes. These are:

(1) Tranfer + (FIG. 73)
(2) Transfer − (FIG. 73)
(3) Column Shift Right (FIG. 73)
(4) Column Shift Left (FIG. 73)
(5) Round Off Column Shift (FIGS. 73 and 74)
(6) Zero Balance Test (FIGS. 75 and 124)
(7) Negative Balance Test (FIGS. 75 and 124)
(8) Branching Fixed Factors are used in the machine for purposes of the Type operation as described, and also for the various Column Shift operations. These are Column Shift Left, Column Shift Right and Round Off Column Shift. These three commands are available to the programmer on the control panel.

Round Off Column Shift

The Round Off Column Shift will be described first as the more general example. The Round Off Column Shift Operation involves a half adjust of a number and shifting the number a desired number of digits to the right. For instance, if a dollar amount number is multiplied by a percentage, the result may contain up to four decimal places, as an example. Only two decimal positions are required for print out so the programmer would program a Round Off Column Shift of 2 places. The operation is similar to Type.

In this case the Out word (X) is the Fixed Factor, and the In word (Y) in the word to be shifted. The Fixed Factor is selected by impulsing the proper Digit Capacity or Shift hub, FIG. 6.

The same hub is used as for the Type operation previously described. The B Counter will be set up in a similar manner, that is, one count level too high. To Round Off Column Shift 2 places, the Digit Capacity or Shift hub 2 is impulsed. This will select the Fixed Factor of $.5 \times 10^2$ (50), table, FIG. 77.

In this case, this is the actual factory required from Fixed Factor memory. Therefore, it is not necessary to step the B Counter prior to commencement of the operation. The B Counter is inhibited from stepping under control of the same circuitry which caused it to step before.

Noting the B Counter Sample Pulse Driver 78.10, FIG. 78, the driver is gated by a +And 78.11 which provides a +S output during a Type or an MLC Operation. No output will be available on line 78.15 except during those operations, so the B Counter will not be Stepped during a Round Off Column Shift operation.

Figure 73:
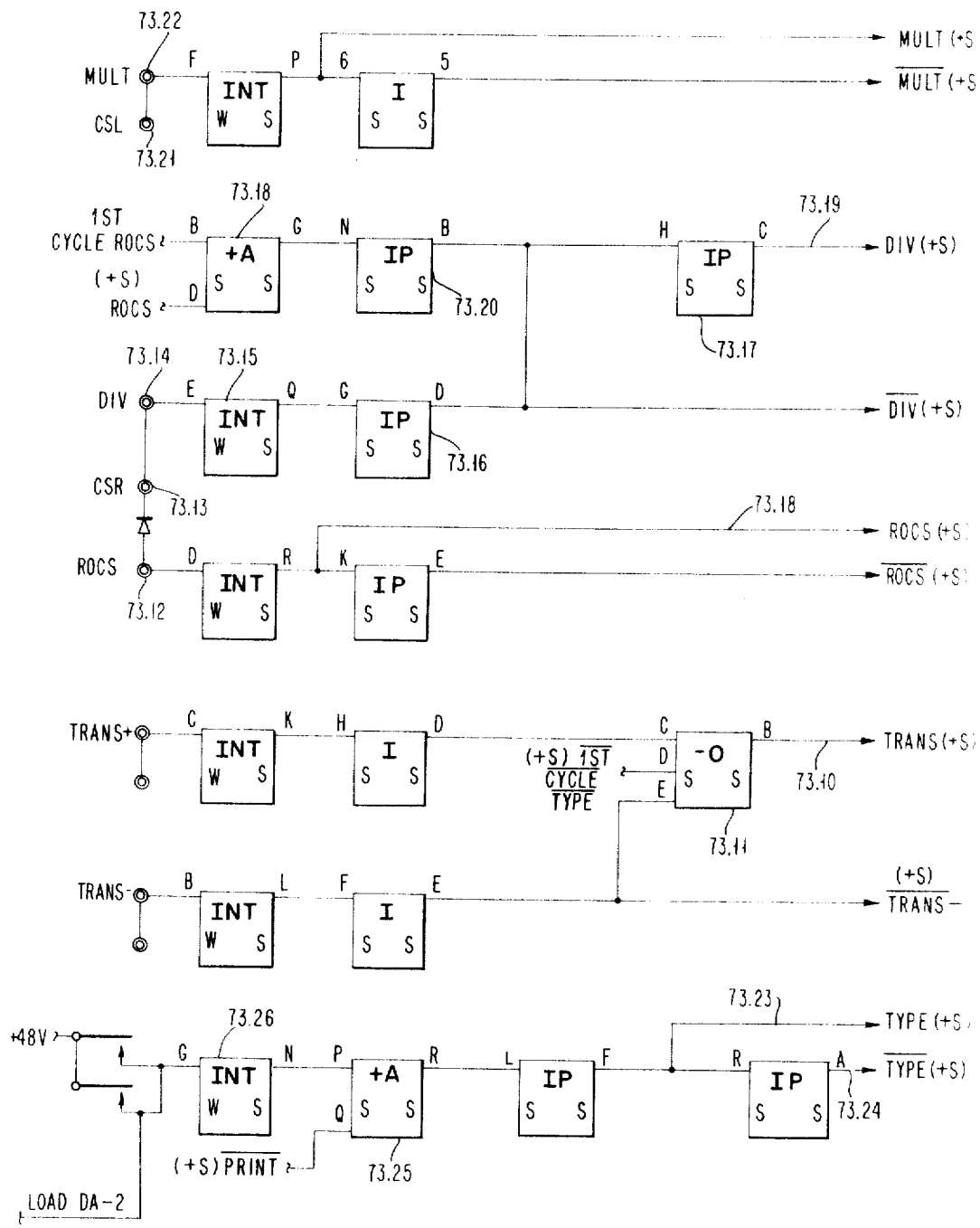

Several control panel aspects should be investigated for the Round Off Column Shift operation. In FIG. 73, the control panel hub ROCS 73.12 will be seen. This hub, when impulsed, brings up two lines, +S ROCS and +S Not ROCS.

Also an impulse at the ROCS hub 73.12 is connected to the Column Shift Right hub 73.13 and the Divide hub 73.14. These are connected through an Integrator 73.15 and Power Inverters 73.16 and 73.17 to supply +S Divide and +S Not Divide signals.

Therefore both Round Off Column Shift (ROCS) and Divide signals are provided. The ROCS signal on line 73.18 is applied to line 74.13, FIG. 74 to prevent the First Cycle Round Off Column Shift latch 74.14 from resetting.

In FIG. 73, a First Cycle Round Off Column Shift signal to input B and Round Off Column Shift signal to input D of the +And 73.18, result in the Divide signal line 73.19 not being brought up. This is because of the Power Inverters at 73.20 and 73.16, one above the other, which are connected in tandem. This will cause the Add/Subtract trigger 72.10, FIG. 72, to be set in its normal Add state at DC Reset time.

The machine is in Add mode. The B Counter is set up to address the proper Fixed Factor at X time. The Y Time word is addressed by control panel wiring and an addition takes place, the Fixed Factor 50 being added to the programmed word.

In this case, the X Delay trigger is not involved, so the Fixed Factor is not doubled as in a Type operation. As a result of the addition, the number is half adjusted. The First Cycle Round Off Column Shift latch 74.14, FIG. 74 is turned off by an output from the +And 74.12 with inputs of 1A, A, D, and Read Delay, Y, and Not Complement. This is the same control that turned off the First Cycle Type latch 74.10 at Dummy Digit time that follows immediately after the first cycle.

Turn off of the First Cycle Round Off Column Shift latch 74.14 results in removal of the inhibit on the Divide signal, FIG. 73. In FIG. 72, the −S First Cycle Round Off Column Shift latch signal, when the latch turns off is applied at pin T of the −Or 72.12 and at D, X, 1A, and A time causes the Add/Subtract trigger to change to its Subtract state. The Add/Subtract trigger will then be in its normal state for Division. The machine will now be in a Divide mode. The X word being the Fixed Factor or divisor is selected by the B Counter and is the same Fixed Factor that was addressed for the half adjust operation just completed.

Now, however, since the First Cycle Round Off Column Shift latch is off, the X Delay trigger becomes effective so that the Fixed Factor is doubled by the time it reaches the arithmetic section. The Fixed Factor 50 thereby becomes 100 and acts as a divisor.

The programmed Y word is shifted right two places.

Column Shift Left and Column Shift Right

The other two commands which use the Fixed Factor in a similar manner are the Column Shift Left and Column Shift Right commands. The Control Panel hubs for these operations are also shown in FIG. 73 at 73.21 and 73.13, respectively.

The Column Shift Left hub is connected directly to the Multiply hub 73.22, while the Column Shift Right hub is connected directly to the Divide hub 73.14.

The difference between a Column Shift Left operation and a Multiply operation lies not in the programming of the function but rather in the selection of the Out Word (X word) involved which is under control of the B Counter and which is a Fixed Factor. This is determined by a signal to the proper Digit Capacity or Shift hub. The programmer will select the X word Fixed Factor by wiring Digit Capacity or Shift and the Y word to be shifted by direct selection on the control panel. The B Counter will not be stepped, but rather, the same Fixed Factor is used so that the Y word will be multiplied by the proper power of 10 to get a decimal left shift.

In the case of Column Shift Right, the programmer wires the associated function hub 73.13 on the control panel. In this case, the programmed Y word is divided by the Fixed Factor selected through the appropriate Digit Capacity hub. There is no half-adjust as in a Round Off Column Shift operation.

MULTIPLY AND DIVIDE OPERATIONS

The operations of Multiply and Divide in the machine include a number of features.

For example, it is not required that either operand involved be obtained from a special storage location as in other data processing systems Instead, the machine works with the two operands regardless of their location in memory, with the locations being determined by control panel wiring.

Also the Overflow Register is considered as any other word in memory and need not be handled in a special way. (This also applies to the Keyboard Buffer word.)

The Multiply and Divide operations each require seventy cycles of Clock time. In addition to fulfilling its other functions in the machine, the C Counter also counts cycles during these operations.

A brief summary of the program set up for the Multiply operation is as follows.

*Multiply:*

(1) Control panel wiring sets up a Multiply operation and also specifies the In and Out words to be addressed.

(2) The Out word is addressed at X time and remains unchanged.

(3) The In word is generally addressed at Y time and accumulates the product.

(4) The Overflow Register is automatically selected at the proper time and stores any Overflow bits from the Y word.

The C Counter FIGS. 85, 86 and 87, is initially reset off and is stepped at the end of each cycle. This means the counter is at a zero count status during the first cycle and will continue to lag by 1 throughout the operation. The 1C Trigger, FIG. 85, is used to define Odd and Even cycles. When 1C is off, the cycle is Odd. When 1C is on, an Even cycle is being performed. This control provides a means for determining the particular operation to be performed.

In FIG. 73, the Multiply signal from the control panel comes into Integrator 73.27, and produces the signals +S Multiply and —S Not Multiply.

The C Counter will have been reset at this time. Therefore, all the Not C Counter inputs to the three +AA blocks 54.10, 54.11 and 54.12, in FIG. 54, will be +S, as will Multiply or Divide, to pin F of +AA 54.10. Therefore, the output to Power Inverter 54.13 will be —S and its output becomes +S First Cycle Multiply or Divide, and after inversion by Power Inverter 54.14 becomes —S First Cycle Multiply or Divide.

The C Counter is stepped during Multiply and Divide operations under control of a —Or 84.24, FIG. 84. This —Or has +S inputs Not Multiply and Not Divide. These will be —S during either operation. The output of —Or 94.24 is applied through +AO 84.13 to satisfy input H of —And 84.11. The other inputs to —And 84.11 are Clock times 6A, C, D, Y, Write, and 02. The C Counter is stepped at this time in every word cycle.

The first cycle of the Multiply operation results in a transfer of the Y word into the Overflow Register. This clears the Y Word and makes it available to store the product. Prior to the actual transfer, the sign of the product is determined and written into the Y word. This is done in Sign Bit time of the first cycle. At X Read Time, the sign of the Multiplicand is read and placed in the Storage trigger, FIG. 66. During X Write time, the bit is regenerated and also placed in the Accumulator trigger, FIG. 66. The sign of the Multiplier is read at Y time and placed in the Storage trigger. The accumulation is written from the Accumulator into the sign position of the Y word during Y Write time.

A positive sign is stored as a "0" and a negative sign is stored and a "1." Therefore, like signs produce a positive product and unlike signs produce a negative product. Negative signs in both words will cause an unwanted carry, so the Carry trigger, FIG. 70, is blocked during Sign Bit time.

Following Sign Bit time, the 1st through 34th bit positions of the Y Word and Overflow Register are addressed. At X Read time, the Y word is read and placed in the Storage trigger. This information is transferred to the Accumulator at X Write time but is not regenerated. During Y Read time, the Overflow Register is addressed. However, since the Accumulator is blocked at Y Read time, this information is destroyed. Therefore, the only data held by the Accumulator is the Y word bit placed there at X time. This information is written into the Overflow Register at Y Write time. As the Clock advances the address from bit to bit, the Y word is transferred into the Overflow Register. At the end of the cycle, the Y word, except for the Sign Bit position, is cleared and the Overflow Register contains the Multiplier.

In the second cycle and all subsequent Even cycles, the Clock omits Dummy Digit and Sign Bit times. The reason for this change in Clock logic is more apparent in later cycles and will be discussed at that time. The purpose of the second cycle and each of the succeeding Even cycles is to determine the value of the high order bit of the Multiplier. This is accomplished by shifting the Overflow Register left 1 bit position. The 34th bit is shifted from memory and examined to determine if the Multiplicand is to be added to the product word.

The address of memory is inhibited at X time during the second cycle. This is brought about by the on condition of the 1C trigger. At Y time, the Overflow Register is read. The information placed in the Storage trigger is transferred to the DY–1 trigger, FIG. 67, at Y Write time. Therefore, each bit read arrives in the Accumulator one bit time later. The bit read from the first position is placed in the Accumulator during the second bit time and written into memory at Y Write time. This operation continues throughout the cycle. The 34th bit, therefore, is held by DY–1 at the end of the second cycle. If this bit is a "1," the Quotient (Q) trigger, FIG. 71, is turned on. If the bit is "0," the Q trigger is left in the off state.

In the third cycle and all the following Odd cycles, the Y word is shifted left. If the Q trigger is on, indicating the high order bit of the Multiplier is "1," the address circuits are conditioned to address X word. Note that this address is inhibited at X Sign Bit time. However, during the other bit times, the information read at X time is placed in the Storage trigger. This information is transferred to the Accumulator and also regenerated at X Write time. The data read from the Y word is delayed for one bit time before reaching the Accumulator. This is not true of the Y word sign. Therefore, the accumulator of X and Y information written into memory is, in effect, the X word added to the delayed Y word. When this cycle is completed, DY–1 holds the bit read from the 34th bit position of the Y word. This information may be a part of the product which overflows the capacity of the Y word. Since this possibility exists, the bit must be saved and written into the first bit position of the Overflow Register.

The fourth cycle, which produces an Overflow Register shift, is an Even cycle and omits Dummy Digit and Sign Bit times. Therefore, the bit held by DY–1 can be placed in the Accumulator during the first bit time of this cycle and written into the first position of the Overflow Register. There is also a possibility that the last addition in the preceding Odd cycle, the binary addition of the 34th bit of X and the delayed 33rd bit of Y, will produce a Carry. In that case, the adder circuits consider the state of DY–1 and carry before determining the state to which the Accumulator is set in the first bit time of the Overflow Register shift.

This operation continues until the C Counter indicates that 70 cycles have been completed. The product is now contained in the Y word, any overflow bits are stored in the Overflow Register and the X word is unchanged.

Figure 54:
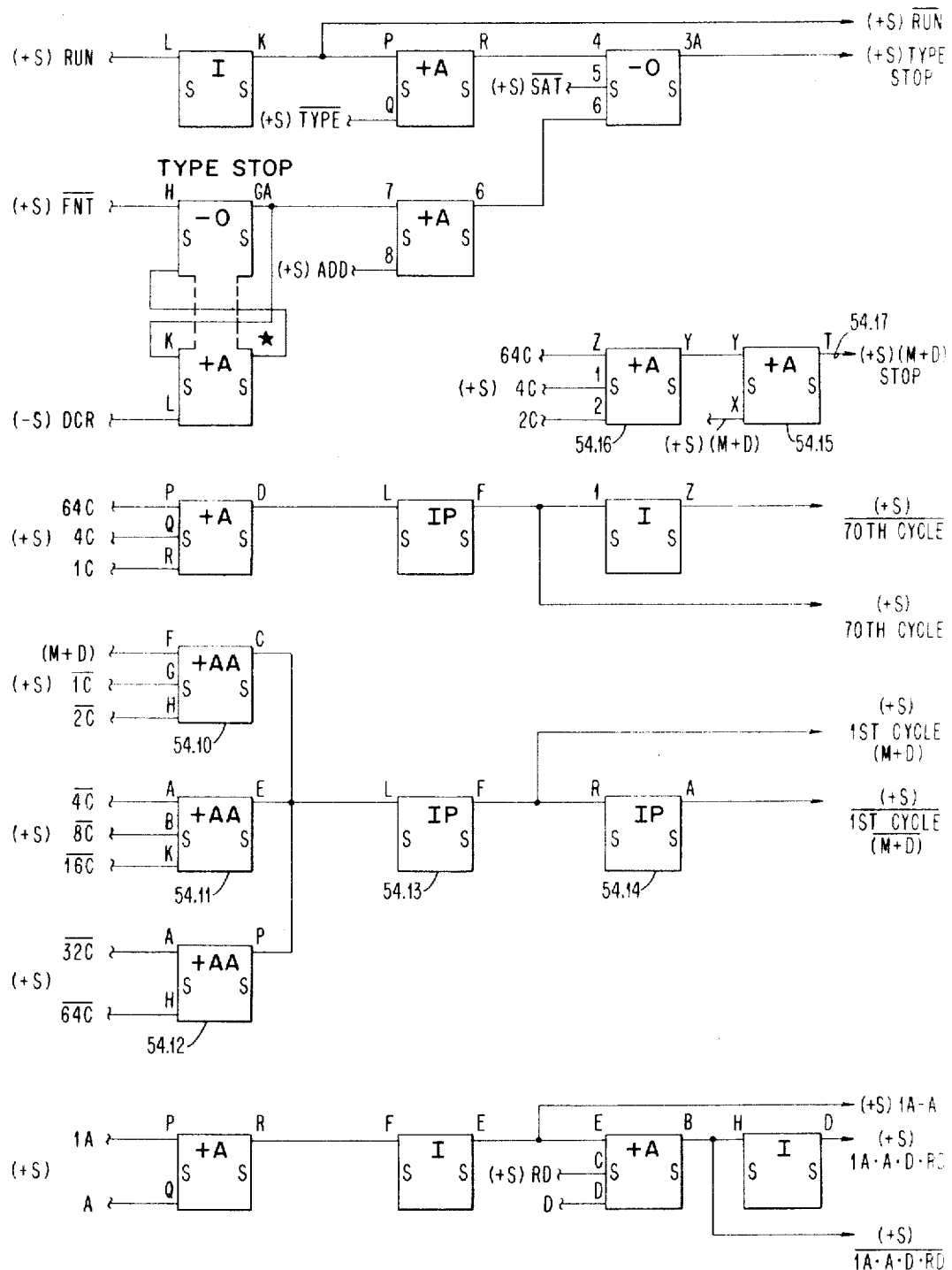

The machine stops when the C Counter reaches a count of 70 at the end of the 70th cycle. This is accomplished in FIG. 54. In FIG. 54, the +And 54.16 will have 64C, 4C, and 2C at +S. The output of +And 54.16 become —S to pin Y of +And 54.15. Pin X of +And 54.15 is +S as a result of being in a Multiply or Divide operation, and +And 54.15 supplies a +S output on line 54.17.

This is then applied to pin F of +And 49.18, FIG. 49 and results in the +S Turn Off Start trigger signal on line 49.10.

*Divide:*

(1) Control panel wiring specifies the In and Out words and establishes a Divide operation.

(2) The Out word is addressed at X time (and remains unchanged).

(3) The In word is addressed at Y time and stores the quotient.

(4) Any remainder from the Y word is stored in the Overflow Register which is addressed automatically at the proper time.

As in multiplication, the Divide operation requires 70 cycles of Clock time for completion. The C Counter is used for control purposes, with position 1C, FIG. 85, defining Odd and Even cycles.

When the operation is terminated, the Divisor remains unchanged. The Quotient is stored in the Y word and if a remainder is developed, it is stored in the Overflow Register. On Odd cycles, the Y word is shifted left. The Even cycles produce a shift left of the Overflow Register and subtraction of the X word from the shifted Overflow Register. If the subtraction is successful, a Quotient is developed. This information is held by the Quotient (Q) trigger, FIG. 71, and written into the Y word during the next cycle. An unsuccessful subtraction occurs when the X word exceeds the value of the Overflow Register. This condition results in a complemented register and is indicated by the on state of the Carry trigger, FIG. 70, at the end of the cycle.

At this point, it may appear necessary to addback the Divisor to correct the complemented register, shift the Overflow Register left in the next Even cycle, and attempt another subtraction. However, the same results can be obtained by omitting the addback, shifting the register and adding the Divisor in the next Even cycle. The sequence just described can be expressed in the following manner:

Let Overflow Register equal the complemented register
Let D equal the —Divisor
Overflow Register=D=Corrected Register
2(Overflow Register +D)=Corrected Register shifted left
2(Overflow Register +D)—D=Corrected register shifted left and subtraction of divisor The same results are obtained using the other line of reasoning.

| | |
|---|---|
| 00100 | Overflow Register ____ (4). |
| —00110 | Divisor _____ (6). |
| 11110 | Complemented _____ Overflow Register. |
| 11100 | Shifted Overflow Register. |
| +00110 | Divisor. |
| 00010 | Overflow Register ____ (2). |

It may be necessary to perform several Even cycles, shifting the register and adding the divisor in each, before the Overflow Register is restored to an uncomplemented state. The state is indicated by a Carry at the End of the cycle. Until this occurs, no Quotient is developed. However, when the Overflow Register is restored to a true state, is also is indicative that a successful subtraction could have been made. Therefore, an add which produces a Carry, also develops a Quotient. This Quotient is held by the Q trigger and written into the first position of the Y word in the following Odd cycle. When no Quotient is produced, a "O" is written into the first position of the Y word. Once the Overflow Register is recomplemented, the Add-Subtract trigger, FIG. 72, is returned to the Substract state. This expression can be simplified and expressed as follows:

2 Overflow Register +2D —D
2 Overflow Register +D

Therefore, if the complemented register is simply shifted left in the next Even cycle and the Divisor added to the shifted results, the same value is obtained. This can also be shown by using a binary example.

| | |
|---|---|
| 00100 | Overflow Register ____ (4). |
| —00110 | Divisor _____ (6). |
| 11110 | Complemented _____ Overflow Register. |
| +00110 | Addback Divisor. |
| 00100 | Corrected Overflow Register. |
| 01000 | Shifted Overflow Register. |
| —00110 | Divisor. |
| 00010 | Overflow Register ____ (2). |

The subtraction of 6 from 4 produced a complemented register. The addback of the Divisor restored the Overflow Register to its original value. Then, when the register was shifted and the Divisor was subtracted, the value of the register was reduced to 2.

After 69 cycles, the Y word contains the Quotient and the Remainder is stored in the Overflow Register. However, it is possible for the register to contain the Remainder less the Divisor or, stated differently, the difference between the two in complement form. Therefore, the 70th cycle is an addback of the Divisor when, at the beginning of the cycle, the Add-Subtract trigger is in the Add state. If the trigger is in the Subtract state, the addback is inhibited.

The signs of the Quotient and Remainder are determined in the first cycle. The sign of the Quotient is positive if the X and Y word signs are alike and negative if the signs are unlike. However, the sign of the Y word is always used as the sign of the Remainder. The sign indication is stored in the Sign Latch, FIG. 69, and written into the Sign Bit position of the Overflow Register in the 70th cycle.

The following points are significant:

(1) The Q trigger is turned on to indicate the development of a Quotient bit if at the end of an Even cycle.
    (a) The Add-Subtract Trigger is in the Subtract state and the Carry trigger is off.
    (b) The Add-Subtract trigger is in the Add state and the Carry trigger is on.

(2) If the Carry trigger is on at the end of an Even cycle, the state of the Add-Subtract trigger is changed.

(3) In the 70th cycle, the Overflow Register is not shifted and the Divisor is added if the Add-Subtract trigger is in Add state.

Figure 69:
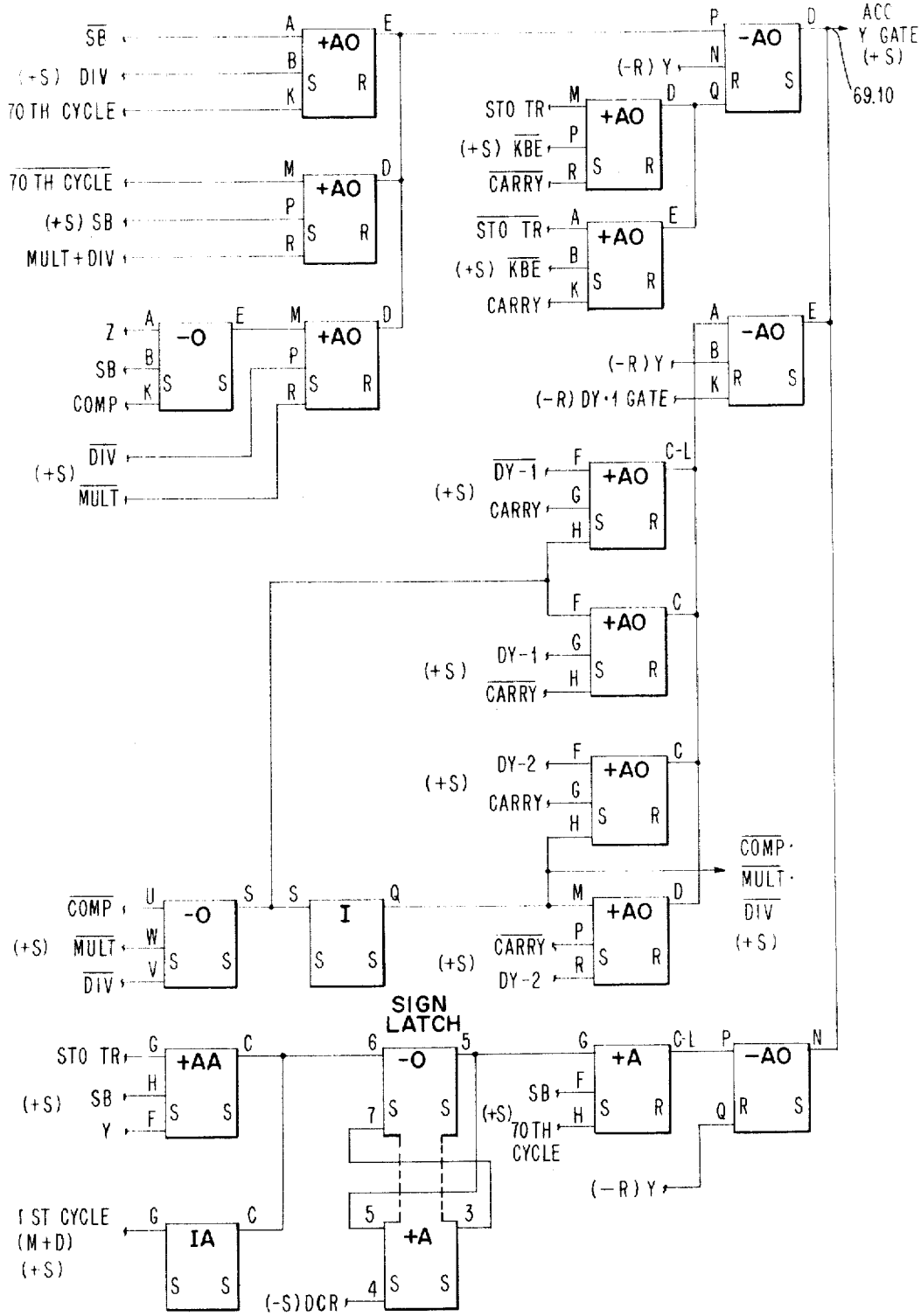

In the first cycle of a Divide operation, the Y word is shifted left. However, before the shift occurs, the signs of the Quotient and Remainder must be determined. Addresses of the X and Y words are set-up by the Clock and control panel. This address takes place in Sign Bit time. The Sign of the Divisor is read at X Read time and placed in the Storage trigger, FIG. 66. During X Write, the information held by the Storage trigger is placed in the Accumulator trigger, FIG. 66, and also regenerated. At Y time, the sign of the Dividend is read from memory and placed in the Storage trigger. The Sign latch, FIG. 69, is set at Y Write time and will hold the sign of the remainder until the 70th cycle. The bits of the X and Y words are accumulated and written into the Y word as the sign of the Quotient. The Carry trigger, FIG. 70, is blocked to prevent the development of an unwanted carry if both signs are negative.

Following Sign Bit time, the X address is suppressed. At Y Read time, the Dividend is read from memory and placed in the Storage trigger. However, rather than placing this bit in the Accumulator, the information is transferred from the Storage trigger to DY–1, FIG. 67, and the preceding bit is moved from DY–1 to the Accumulator. This action takes place at the beginning of Y Write time. During Y Write, the information held by the Accumulator is written into memory. Therefore, each bit stored in the Y word is shifted left 1 position. The 34th bit is held by DY–1 at the end of the cycle.

When the Divide operation was initiated, the control panel was wired to cause the development of the Divide command. This signal brought about the establishment of the Subtract mode. Therefore, in the second cycle, the Divisor will be subtracted from the Overflow Register.

At X Read time, the X word is addressed and the information read is placed in the Storage trigger. This data is transferred to the Accumulator and also regenerated at X Write time. The Overflow Register is addressed at Y time. This information is also placed in the Storage trigger. However, at Y Write time, the bit is transferred to DY–1 and the information held by DY–1 is used to develop the difference. (During the first bit time, the 34th bit of the Y word is held by DY–1. Therefore, the difference between the 34th bit of the Y word and the first bit of the X word is written into the first position of the Overflow Register.) The net effect of the operation is the subtraction of the X word from the shifted Overflow Register.

After completing the address of the 34th bit positions, the condition of the Carry trigger, FIG. 70, is checked. If the Carry trigger is off, the subtraction is successful and the Q trigger, FIG. 71, is turned on. The Add-Subtract trigger is left in the Subtract state. However, if the Carry trigger is on, the Quotient trigger is left in the off state and the Add-Subtract trigger is changed to the Add state.

Since Dummy Digit and Sign Bit times are generated between the Even and Odd cycles, the information held by Q can be placed in DY–1 during Sign Bit time. Therefore, it can be placed in the Accumulator during Y Write time of the first bit and written into that position in memory. The first bit read from memory is delayed 1 bit time before reaching the Accumulator. Therefore, it is written into the second position. When the cycle is over, each bit of the Y word is shifted left 1 position and DY–1 holds the 34th bit.

At the benginning of the fourth cycle and each of the following Even cycles, the state of the Add-Subtract trigger determines whether the Divisor is subtracted from the Overflow Register or added to the Register. If the Subtract operation performed in the second cycle was successful, another subtraction will be performed in the fourth and all succeeding Even cycles until the Carry trigger, FIG. 70, is turned on as the result of an unsuccessful subtraction. Then, addition of the X word to the Overflow Register will take place in the Even cycles until a carry is obtained. The Subtract state is re-established and the sequence is repeated. For each successful subtraction, or the addition which produces a carry, a "1" is written into the first bit position of the Y word. For the unsuccessful subtraction, or the additions which do not generate a carry, a "0" is written into the first bit portion of the Y word.

In the 70th cycle, which is the last cycle of the Divide operation, the sign of the Remainder is transferred from the Sign latch into the Accumulator. From the Accumulator, the Sign Bit can be written into the Overflow Register. Even though this is an Even cycle, Dummy Digit and Sign Bit times are generated. This was not the case in the preceding Even Cycles.

It may also be necessary to correct the Overflow Register. If the Add mode is true, an address of the X word is set-up. The X word is read and added to the Overflow Register to correct the complemented register. The Overflow Register is not shifted in the 20th cycle. If however, the Add-Subtract trigger is in the Subtract state, the X address is inhibited.

The stepping of the C Counter and stopping of the machine is similar to that which occurred during the Multiply operation.

ORGANIZATION OF MAGNETIC LEDGER CARD (MLC) MEMORY AND MEMORY SELECTION FOR MLC OPERATIONS

The other operations involving the B Counter and C Counter are the four MLC operations of Alphanumeric Entry and Alphanumeric Print, Read Ledger, and Record Ledger.

In these operations, the selection of Fixed Factors is inhibited by a control line "MLC operation." Instead, the Word drivers and MLC Read-Write Switch combinations are selected by the B Counter and the words of MLC memory are addressed sequentially.

The selection of the basic word drivers and read-write switch combinations occurs as for a Main memory operation with a selection being made among the eight sets of Read-Write Switches, rather than the Fixed Factor switches.

Triggers 5B and 6B in the B Counter cooperate with trigger 1B to select individual Read-Write switches as shown in the table of FIG. 77.

The B Counter sequences Fixed Factor memory or MLC memory. In each case the control of the stepping of the B Counter depends on the operation involved.

In the case of MLC sequencing, the action of the B Counter depends on the organization of the variable length alphanumeric words (fields) LA1–LA9 in the MLC memory. The starting and stopping is under control of the Field Marks which separate the variable length fields. This is involved in Alphanumeric Entry as well as Alphanumeric Print.

Before proceeding with a description of the Alphanumeric Entry operation, the organization of the MLC will first be considered. It will be recalled from earlier discussion that the MLC Memory comprises 40 words, each word having 36 bits of information. It was also mentioned that the MLC Memory can accommodate both binary numeric and alphanumeric information. The layout of MLC Memory can be observed in FIG. 137. In FIG. 137, it can be seen that the MLC Memory is divided into two primary areas. These are Ledger Alphanumeric 1—Ledger Alphanumeric 9 (LA1–LA9) and Special Alphanumeric 1—Special Alphanumeric 4 (SA1–SA4).

The Ledger Alphanumeric (LA) portion of MLC Memory contains 32 words, each word comprising 36 bits. The Special Alphanumeric portion of MLC Memory has 8 words, each word also comprising 36 bits.

Much information encountered during the preparation and processing of accounting documents involves alphabetic or numeric words which may be of variable length. The MLC Memory is arranged to accommodate such information and will receive practically any combination of 6 bit characters of information or 6 bit function characters. Therefore, the Alphanumeric fields LA1–LA9 can be of varying lengths and the alphanumeric fields SA1–SA4 can also be of variable lengths.

The MLC Memory can also be considered divisible into two other areas, that is, the words L1–L15 and the remainder of MLC memory.

The first fifteen 36 bit words, L1–L15, may be used for binary numeric information which can be manipulated in arithmetic calculations as required in conjunction with any of the binary numeric words of main memory or any other binary numeric words within the group L1–L15. The number of words within the group L1–L15 which are to be used for binary numeric information is predetermined and prewired on the control panel. Whenever any of these words are used in this manner, the group of variable length fields LA1–LA9 is correspondingly reduced in size. For simplicity in programming, the two areas of information are not intermixed. Any of the words L1–L15 which are used for storing binary numeric information will store the equivalent of a 10 decimal digit number. This corresponds with the arrangement that was discussed previously in connection with the Main memory.

Each word in the remaining portion of the words 1–32 which are not used for storing binary information can accommodate six alphanumeric characters which are based on a 6 bit code that is compatible and which corresponds with the tilt and rotate codes used for selecting characters and functions in the Primary printer and in the Ledger printer. An LA or SA word can begin at the beginning of any one of the six bit characters within a 36 bit word, with the exception that the first LA word and the first SA word must begin at the beginning of the first 36 bit word set aside for such information. The first LA word, that is, LA1 may start with the first character of any of the MLC words designated 1–16. The first SA word, that is SA1 will always begin with the first character of the 33rd word in MLC Memory.

Each LA word and SA word is preceded by a particular character which is designated a Field Mark (FM). The Field Mark is used for locating any of the alphanumeric fields which may be desired for making an entry or for printing out information.

FIG. 138 shows a typical assignment of MLC Memory for the various categories of information. It can be seen that there are four MLC words assigned for binary numeric information, and seven LA words of variable length assigned for alphanumeric information. The first LA word, that is LA1, begins at a point in memory which defines the beginning of alphanumeric information. In this case, this point is designated "Begin Alpha 5."

FIG. 139 represents a possible assignment of the Special Alphanumeric portion of MLC Memory which shows that three Special Alphanumeric words SA1–SA3 have been set up.

The LA portion of MLC Memory may begin with any one of the first sixteen words in MLC Memory. Therefore, it is always essential to indicate the starting point by wiring from the Begin Alpha Common hub to one of the hubs designated Begin Alpha 1 through 16 on the control panel. In the example, FIG. 138, it would be necessary to wire from the Begin Alpha Common hub to the Begin Alpha 5 hub on the control panel which would designate the beginning of the first alphanumeric field, LA–1, at word location 5. Any LA words provided for after LA1 are indicated by Field Marks which can be seen in several places in FIG. 138, as at 138.10 and 138.11.

It will be seen in FIG. 138, that word locations 5, 10, 25, and 32 in the MLC Memory have been expanded to show the character arrangement within each word. Some of the characters of a particular word can be included within one LA Field, and some of the characters within the same word can be included within the adjacent LA word. For example, in Word 10, the first two characters N and Y belong to the LA1 word, while the last four characters FM, 1, 2, and 5 belong to the LA–2 word.

Certain of the characters within each of the four words mentioned have been expanded to show the bit arrangement within the character, and still further, one bit position in each of the expanded characters is further expanded in order to show the timing conditions which may exist at particular times during an entry operation.

The Word 5 has six character locations, the first one being blank. This character is automatically interpreted as a Field Mark. Further inspection of FIG. 138 will show that this character has only 5 bit positions. The reason for the first bit position not being included, is that during an operation involving the entry of information into MLC Memory or the printing of information from MLC Memory, electronics is started at the end of the dummy digit interval of the first character in the first LA word. However, even though only 5 bit positions are included in the first character of the first LA word, the character is still recognized as a valid Field Mark. The bit configuration for a normally encountered Field Mark, that is, other than the first Field Mark, is shown at 138.12.

Referring again to FIG. 137, word 20 has been expanded to show a typical character arrangement. The fourth character which is the letter "W" has been expanded further to show its bit configuration. The fourth bit interval of the character W has been further expanded to show that only the X time read and write intervals are used during an MLC operation.

The following discussion of Alphanumeric Entry makes the assumption that alphanumeric characters have previously been entered into the MLC Memory in accordance with a predetermined arrangement of fields such as that shown in FIG. 137.

When information exists in MLC Memory, the usual purpose for making an Alphanumeric Entry is to alter some of the existing information in one or more of the presently established LA fields. When this is the case, a special function or control key can be wired to initiate the operation and the control panel is wired to select the particular LA field or fields in response to the control key signal.

It is evident that initially, all locations in the MLC Memory will be blank and therefore no Field Mark characters will exist with which to conduct a search for LA fields, since no LA fields have been established in MLC memory.

All character locations in MLC Memory can be filled from the Alphanumeric Entry device directly with insertion of Field Marks to define the various LA fields, where appropriate. In an entry situation of this kind, the insertion of information would begin with the first character location of the first alphanumeric word as determined by the Begin Alpha wiring.

A similar entry procedure can be followed for insertion of information into the special alphanumeric fields CA1–SA4.

The information recorded in MLC Memory can subsequently be recorded on the magnetic stripe of a ledger card and stored indefinitely. This takes place during the Record operation to be described. A previously recorded ledger card can then be inserted in the ledger card handling unit and the contents of the magnetic stripe on the card can be transferred to MLC Memory beginning with word location 1. The information is transferred from the card to MLC Memory during the Read ledger operation which will also be described.

The information on the ledger card is an exact image of the original information as entered into MLC Memory during the manual Alphanumeric Entry procedure, mentioned above. Each character of information or functional character will appear in a predefined character location in memory, and the variable length fields LA1–LA9 are clearly identifiable by the Field Mark characters.

It it is desired to change information in any of the LA fields in MLC Memory, the beginning of the first field, LA1, is pre-established by the Begin Alpha wiring on the control panel and a search is initiated for the desired field.

ALPHANUMERIC ENTRY

In order to enter information into one of the LA words, LA1–LA9, it is necessary to wire the control panel as follows:

(1) A control source is wired into the Enter Alpha hub on the control panel. The source may be either a special function control key or it may be the Exit signal which becomes available from any program step during a particular program sequence.

(2) A wire is connected from the Begin Alpha Common hub to one of the Begin Alpha hubs 1–16 in order to indicate the end of binary numeric information in MLC Memory and the beginning of alphanumeric information.

(3) A wire is connected from the Enter Alpha Exit hub to one of the hubs LA1–LA9.

(4) The wire into the Enter Alpha hub will cause the machine to assume an Alphanumeric Entry mode as contrasted with its normal Numeric Entry mode. When the machine assumes the Alphanumeric Entry mode, an LA address search will be initiated. The wire into one of the BA1–BA16 hubs will result in presetting the B Counter in order to provide the setup necessary for selecting the proper word of MLC Memory from which to start the search. Also, during this time a DC reset of the electronic circuits will occur.

Reference is now made to FIG. 77, and to previous discussion of the B Counter wherein it was noted that the B Counter can be preset to particular count levels in order to begin a sequential addressing of the MLC Memory. The right hand portion of the table in FIG. 77 indicates the particular group of ten words of MLC Memory which will be selected under control of the triggers 5B and 6B in the B Counter.

The wire into one of the hubs LA1–LA9 will cause the C Counter to be preset to a particular count level which is dependent upon the LA word selected. The C Counter is directly involved in the location of the LA word desired for entry of information.

The C Counter is preset according to the following table:

| LA word: | C Counter setup |
|---|---|
| 1 | 16 |
| 2 | 14 |
| 3 | 12 |
| 4 | 10 |
| 5 | 8 |
| 6 | 6 |
| 7 | 4 |
| 8 | 2 |
| 9 | 0 |

From the table above it will be seen that the higher the number of the LA word, the lower will be the setting of C Counter. The C Counter is stepped along in a regular manner under control of Field Marks as they are encountered and a total count of 16 in the C Counter will be recognized and will indicate that the address sought has been located.

If LA–1 is wired for example, the C Counter will be immediately set to a count level of 16. This indicates that the first LA word is located and that a search of the MLC Memory is not required. It also results in the setting of two latches designated Address Located and Holdover.

Figure 131:
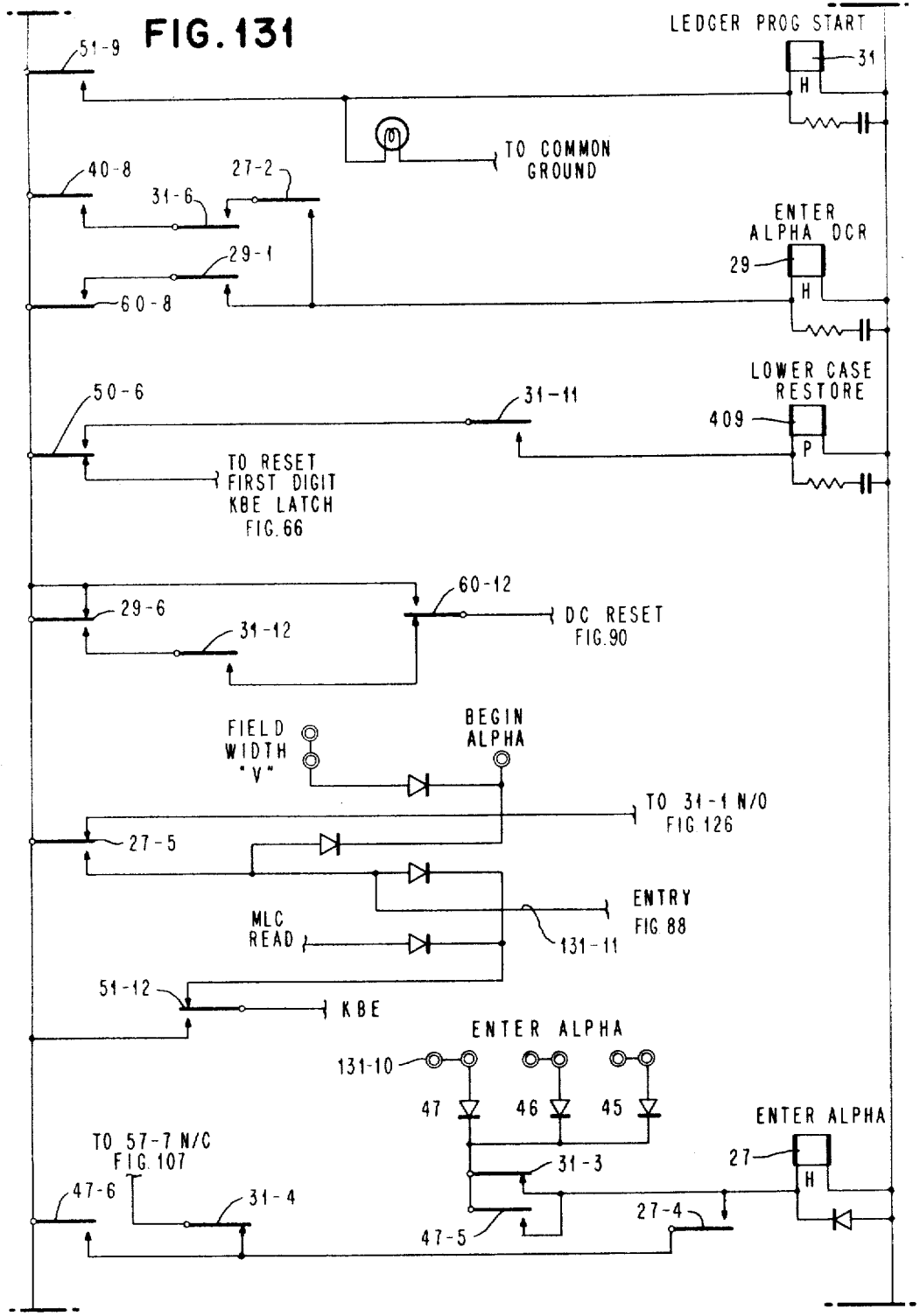

A number of Enter Alpha hubs are shown in FIG. 131. A signal to one of these sets of hubs such as 131.10, will result in the picking of the Enter Alpha Relay 27. If the Ledger Program Start Relay 31 is down so that continuity can be established through the 31–3 point, FIG. 131, Relay 27 will then hold through its own 27–4 normally open point. The picking of Relay 27 results in the establishment of an Alphanumeric Entry mode and also sets up an MLC operation. In addition, a pulse is emitted from the Begin Alpha Common hub which, as indicated before, is wired to one of the Begin Alpha hubs. This results then in the setup of the B Counter to the proper MLC word address.

If any LA word, other than LA–1, was selected, the C Counter will be setup as indicated in the table above. The last thing which occurs upon the energization of the Enter Alpha Relay 27 is a picking of the Electronic Start Relay 64 which is shown in FIG. 106. This provides for the starting of electronics and the searching for the desired LA word.

When these actions have transpired, the search for the desired LA word takes place automatically. When the desired LA word has been located, the machine will then be ready to receive Alphanumeric information from the Alphanumeric keyboard. Any time that a character or function key is depressed, the alphanumeric entry device will go through a mechanical cycle. This causes the selective closing of various transmitting and cam contacts which result in the encoding of the particular character or function key that was depressed. The 6 bits of information comprising a character are loaded in parallel into the Input/Output register, the machine electronics is started, and the character is written into MLC Memory bit by it in a serial manner.

After the first alphanumeric character has been entered into MLC Memory, the C Counter will control the electronic circuits of the machine so that the machine will take six idle character cycles before a new character from the alphanumeric entry device can be entered into MLC Memory.

As entry of information progresses, the B Counter is advanced so that the proper words of MLC Memory are addressed in sequence. Entry of information can proceed until the end of LA Memory is encountered, which is the end of the thirty-second word in MLC Memory.

During the process of Entry, as the end of each variable length field is encountered, the operator depresses the Field Mark key to insert a six bit character into Memory for indicating the end of one LA Field and the beginning of the next LA Field. The entry of alphanumeric data can be terminated by depressing the Restore key or the Program Start key. The various characters representing machine functions that can be entered into MLC Memory by depressing the key which represents the function required, include Carrier Return, Tab or similar functions.

Prior to the initiation of the Alphanumeric Entry Operation and starting of electronics, a DC Reset is applied in order to establish certain triggers and latches in a predetermined state.

The following triggers are all reset to their off condition:

Start Trigger
Clock Triggers (with 1A and A on)
Q Trigger
Storage Trigger and Associated Adder Triggers (Accumulator trigger may be in either state)
B Counter Triggers
Start Latch
Address Located Latch
Holdover Latch The DC Reset Signal is applied to the Address Located Latch 89.10 and to the Holdover Latch 89.11 in order to set each latch to the off state.

Figure 89:
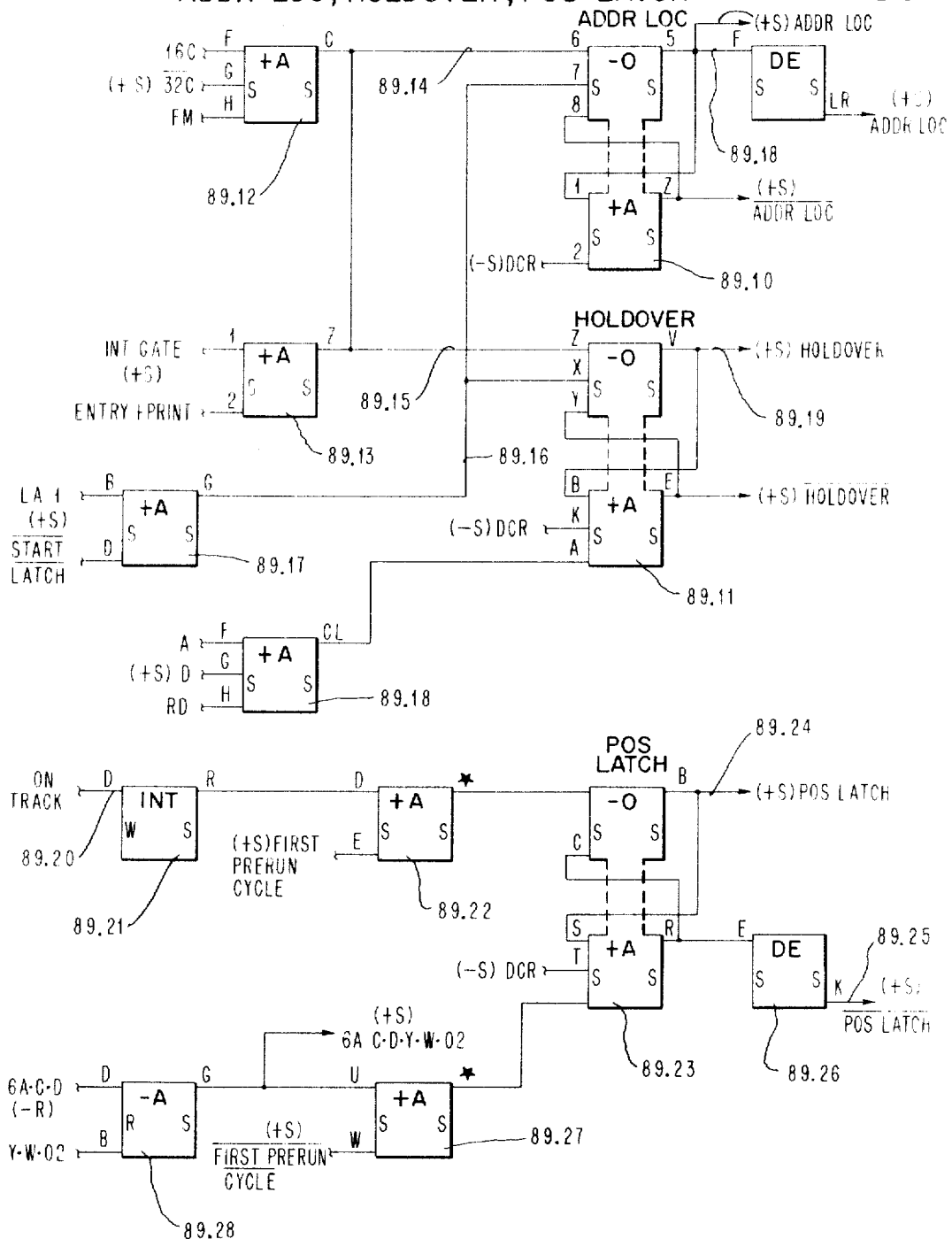

In FIG. 89, a +And 89.12 and a +And 89.13 are conneced in an extended manner to provide a five input And circuit. A −S level to any one of the five inputs will result in a +S level on the lines 89.14 and 89.15 to pin 6 of the latch 89.10 and to pin Z of the latch 89.11. The two latches 89.10 and 89.11 are gated by +S signals to pins 7 and X respectively, applied on line 89.16 from a +And 89.17 whenever the Ledger Alpha 1 to input B of 89.17 is at a −S level. The latches 89.10 and 89.11 are set to their off condition, and in this condition, +S levels are applied to the gate inputs 8 and Y, respectively. The outputs of the latches 89.10 and 89.11 on lines 89.18 and 89.19 are at —S levels at this time. These are fed back to the off-side gate inputs of the latches to hold them in the off state once the DC Reset signal has been removed.

Another signal which is of interest at this time is the Reset C Counter signal that is produced on line 85.10, FIG. 85.

The Reset C Counter pulse is used to reset the following triggers:

Intermediate Trigger
C Counter
Input-Output Register

The Reset C Counter circuit is shown in the center of FIG. 85. Referring to the +And block 85.11, input Q is at a —S level as a result of the Address Located latch 89.10 being in the off condition. Input P of 85.11 is also at a —S level at this time. The output of 85.11, therefore, is +S at the start. A +And 85.12 and a +And 85.13 are Anded together with their outputs connected to pin E of a —Or block 85.14. The Type input of 85.13 at pin A is at a —S level. This produces a +S level at pin E of 85.14.

Input D of —Or 85.14 has the DC Reset signal applied. The DC Reset signal will move a +S level to a —S level and back to a +S level. While the signal is at the —S level, the output of —Or 85.14 will be +S and this is inverted by Power Inverter 85.15 in order to develop a —S signal on line 85.10.

The Clock circuit is set to the normal starting state as follows:

1A, A, Not D, Y, Write, O1.

For purposes of illustration, it will be assumed that a control or special function key exit has been wired into the Enter Alpha hub and that the Enter Alpha hub has been wired in turn to the LA3 hub. Also the Begin Alpha Common hub has been wired to the Begin Alpha 5 hub.

Figure 88:
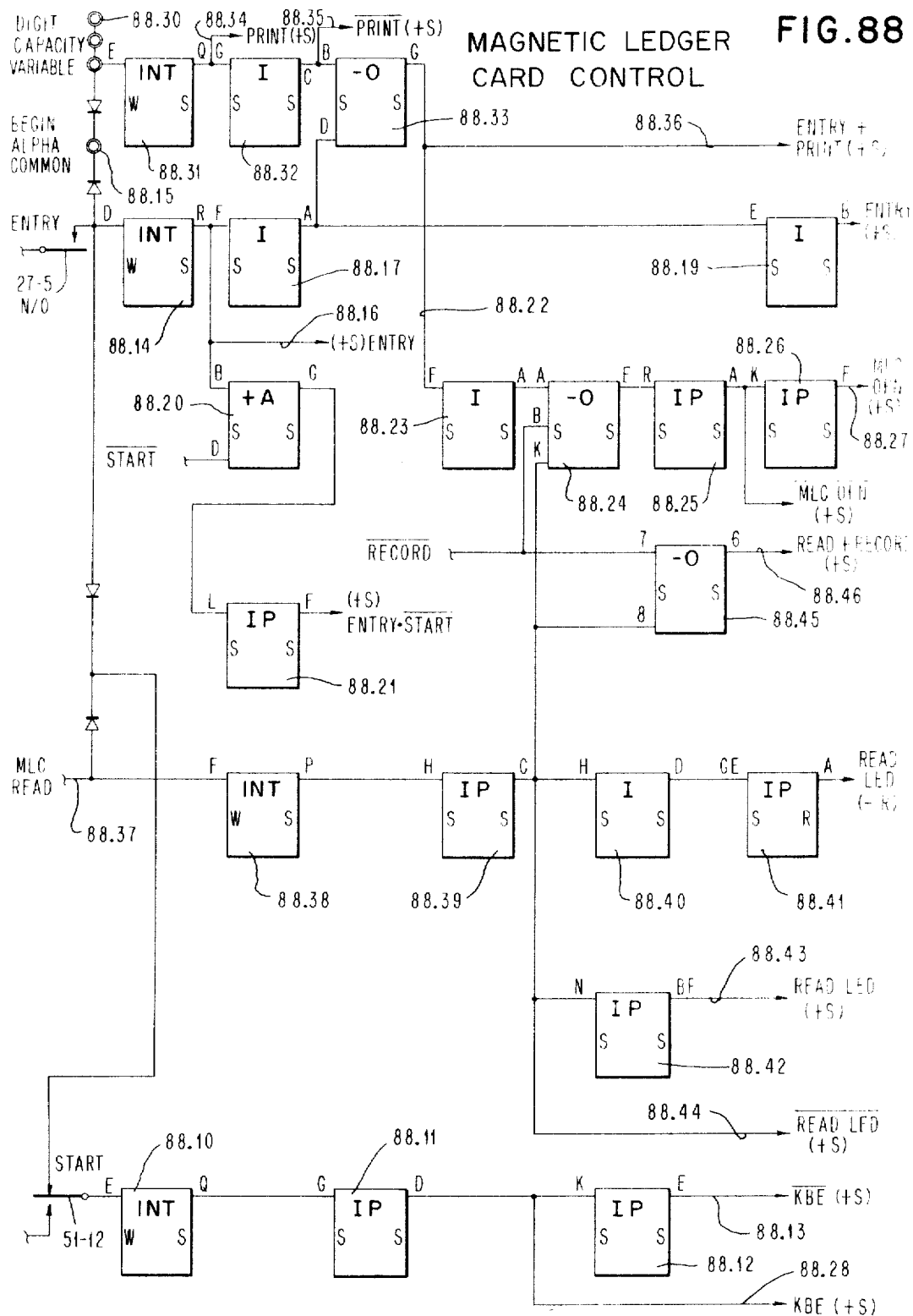

When the Control Key is depressed, a +48 volt signal will be applied to hub 131.10, in FIG. 131, and will pick the Enter Alpha Relay 27 through the normally closed 31-3 point. Relay 27 holds through its own 27-4 normally open point. As soon as Relay 27 is energized, the 27-5 point transfers and +48 volts is available on a line 131.11. For convenience, the 27-5 point is also shown in FIG. 88. The +48 volt level is applied to an Integrator 88.14 and to another Integrator 88.10 through the 51-12 normally closed point. The +48 volt signal also becomes available at the Begin Alpha Common hub 88.15.

The +48 volt or +W input to 88.14 results in a +S output on the Entry line 88.16. This will result in the machine being placed in an Entry mode. The output of Integrator 88.14 is +S but comes —S after inversion by the Inverter 88.17. The output of Inverter 88.17 is applied to pin D of —Or 88.33 and to pin E of Inverter 88.19. This supplies the necessary +S levels for Entry mode purposes.

The output of Integrator 88.14 is also applied to pin B of a +And 88.20 which has a +S Not Start level at pin D. This results in a —S Output of +And 88.20 which becomes a +S at the output of a Power Inverter 88.21. This signal is used to decondition several electronic circuits after the electronics has been started during the Alphanumeric Entry operation. The Entry or Print +S level on line 88.22, after inversion by block 88.23 becomes a —S to pin A or a —Or 88.24. The output of —Or 88.24 is successively inverted by Power Inverters 88.25 and 88.26 to become a +S MLC operation on line 88.27. The Not MLC operation line 88.28 becomes —S.

The 48 volt Input to Integrator 88.10 becomes a —S level at the output of Power Inverter 88.11 so that the Keyboard Entry Line 88.28 is then —S. The Not Keyboard Entry line 88.13 becomes +S. This results in the machine being taken out of the normal Numeric Keyboard Entry mode.

*B Counter Setup*

The B Counter will be setup as determined by the particular Begin Alpha hub that was wired. In this case, the Begin Alpha 5 hub which is designated 76.16 in FIG. 76 was wired from the Begin Alpha Common hub 88.15, FIG. 88. It will be noted that the +48 volt signal applied to the Begin Alpha 5 hub 76.16 will in turn be applied to pin D of a +OO block 76.17 and to pin of a +OO block 76.18. This results in —R output levels from +OO blocks 76.17 and 76.18. These are converted to +S levels at the output of Inverter blocks 76.19 and 76.20. The outputs of +OO blocks 76.17 and 76.18, which are —R will override the outputs of the respectively associated +OO blocks 76.21 and 76.22, which are +R.

In FIG. 78, since none of the hubs SA1–SA4 are wired, the +Or block 78.19 produces a +R level on line 78.20 which is applied to the input of a —CO block 76.23 in FIG. 76. Block 76.23 produces a —S level, but the +S level from block 76.20 overrides this —S level. The +OO blocks in FIG. 76 as well as a +Or block 76.11 have —W inputs.

It should be noted at this time that only one Begin Alpha hub can be wired in any program step. Since this is the case, none of the other +OO or the +Or blocks in FIG. 76 and 78 will have +48 volt inputs. The outputs of these blocks will therefore be at +R levels. These +R levels are converted by the Converters 76.12, 76.14, 78.21, and 78.22 so that the respectively associated +And blocks 76.13, 76.15, and 78.23, as well as the Power Inverter 78.24 are inactive at this time. The outputs of the last four mentioned blocks are +S. As a result, the DC Set lines for positions 1B, 4B, 5B and 6B remain at a ground level and these triggers will remain in their off condition. The +And blocks, 76.24 and 76.25, however, will supply —S outputs as a result of the +48 volt inputs to the Begin Alpha 5 hub 76.16.

The output of +And 76.24 is applied on line 82.14 to set the 2B Trigger in the B Counter to its on condition. The output of the +And 76.25 is applied on line 82.15 to set the 3B trigger in the B Counter to its on condition.

The +And blocks 76.24 and 76.25 are further conditioned in response to a +S level on the Not Start latch line 76.26. This latch is shown at 85.16 in FIG. 85. The latch had previously been set on during the DC Reset interval so that it supplied a +S Not Start latch signal on the line 85.17. The latch 85.16 is subsequently turned off by a Not Start signal on line 85.18. This returns the outputs of the +And blocks 76.24 and 76.25 to a +S level and permits operation of the B Counter. Trigger 6B in the B Counter will be off so that the signal to input R of the +And 76.24 is at a +S level to gate the DC setting of Trigger 2B in the B Counter.

Reference is now made to logic which is provided for advancing the B Counter after electronics has been started. This logic is shown in FIG. 80. It is necessary to obtain a +S Output on the B Counter Advance Gate line 80.10.

In an Alphanumeric Entry operation, none of the punctuation hubs, such as hubs 80.11 and 80.12, will be conditioned. The —S levels will exist at the outputs of Integrators 80.13, 80.14, 80.15, in FIG. 80, and 81.10 in FIG. 81. The output of Integrator 80.13 is applied to a +IA block 80.16, whose output in turn, overrides the output of the +AA block 80.17 and supplies a +S signal to pin 5 of the —OO block 80.18.

The output of the Integrator 80.13 to the +AA block 80.19 results in a +S signal at pin S on 80.19 which overrides the output of the +IA 80.20. The +S output from 80.19 to pin 4 of the —OO block 80.18 results in +S levels at both inputs of 80.18 so that the output is —S at pin 3, the —S output of Integrator 80.14 to pin R of +And 80.21 is inverted to a +S level to pin Q of the —OO block 80.22. The +And 80.23 also inverts the —S input to its A input, providing a +S input to the —OO 80.22. The output of Integrator 81.10 is applied to a +And block 81.11 and then on line 80.24 to the P input of —OO block 80.22. With all inputs of the —OO 80.22 at +S, this block supplies a —S output on line 80.25.

The joint outputs of —OO block 80.18 and —OO block 80.22 are at a —S level to input A of a —Or block 80.26. The output of —Or block 80.26 then becomes +S thus providing the required B Counter Advance Gate signal on line 80.10.

Besides conditioning the B Counter Advance Gate logic, it is also required that the B Sample Pulse Driver logic in FIG. 78 be conditioned. Pin F of +And 78.11 is conditioned as a result of the Not Magnetic Ledger Card Operation line being at a —S level at this time. +And 78.11 provides a +S output to input A of the Sample Pulse Driver block 78.10. This results in conditioning the Sample Pulse Driver 78.10 for supplying a sample pulse on line 78.15.

It will be recalled that the B Counter positions 2B and 3B in FIG. 82 were set into their on condition. After electronics has started, the Start latch 85.16 in FIG. 85 will be turned off and the DC set lines 82.14 and 82.15 in FIG. 82 will return to their +S levels. This allows the B Counter to advance as required during the operation. The B Counter is conditioned at this time with Trigger 2B and 3B on.

*C Counter Setup*

All positions of the C Counter which are shown in FIGS. 85, 86 and 87 were reset to their off condition during the DC reset interval. Under control of the Reset C Counter signal (RCC), voltage was supplied from line 85.10 in FIG. 85, as previously described.

In addition to resetting the C Counter, the signal from line 85.10 also set the Intermediate Trigger 84.15 to its off codition.

Figure 92:
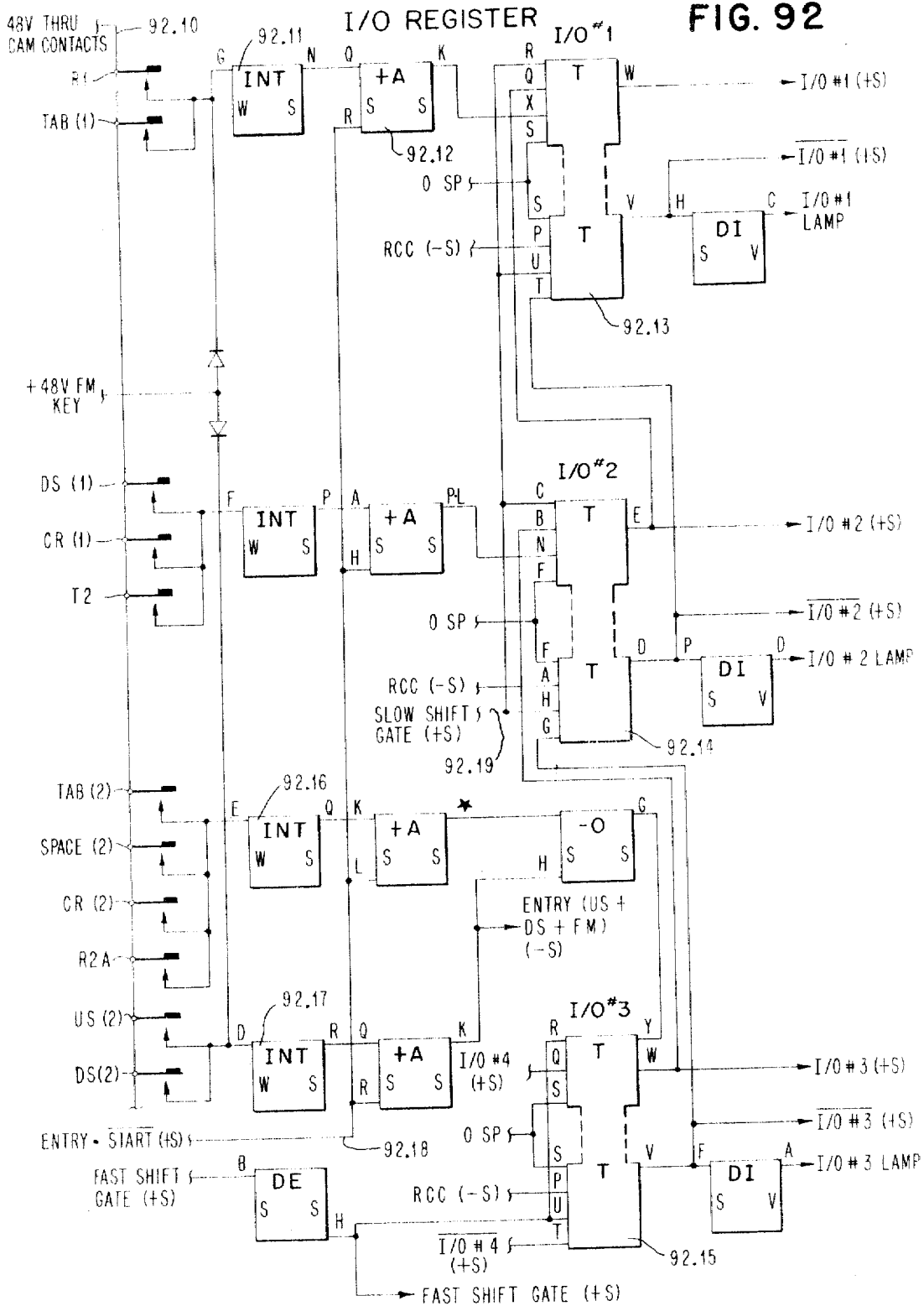
Figure 93:
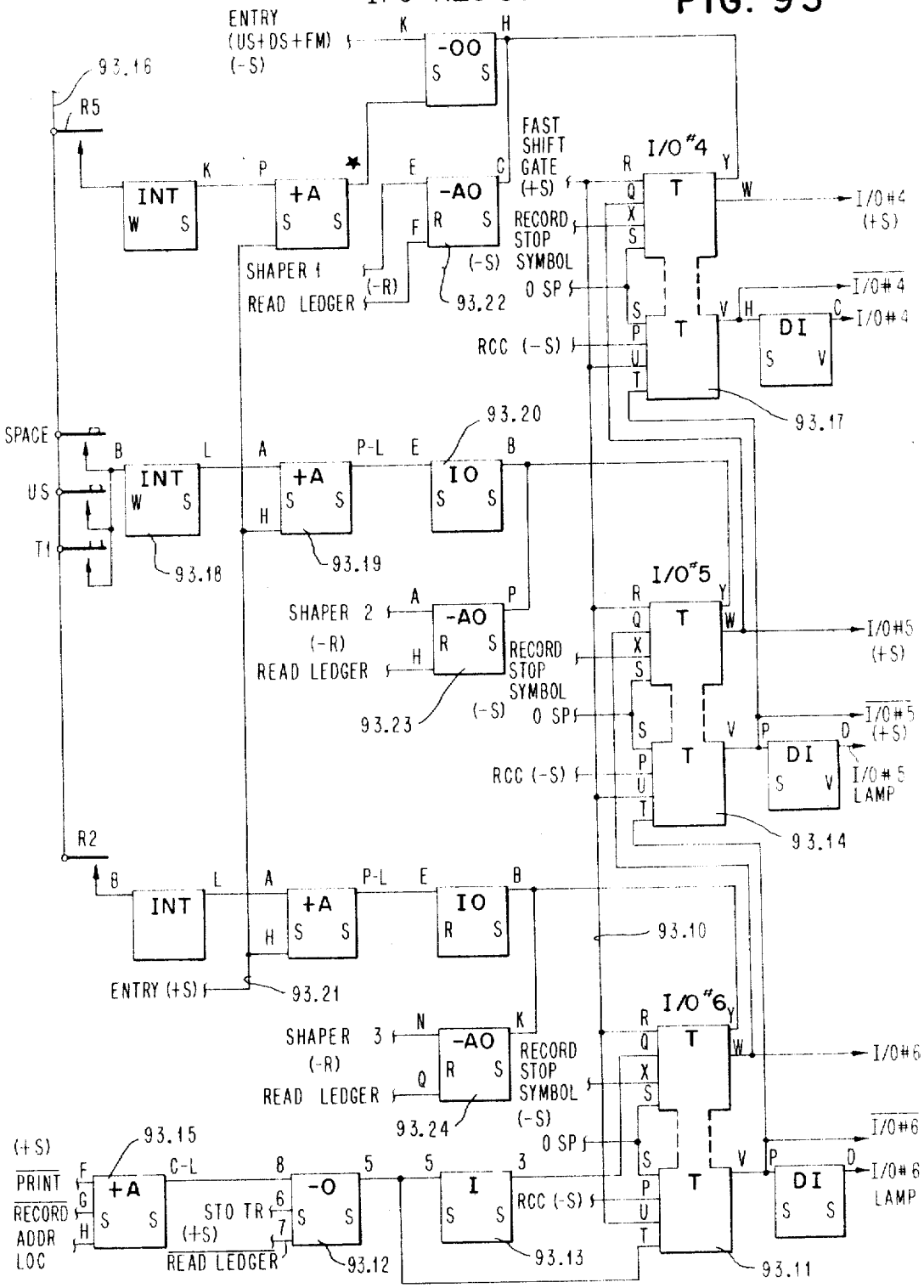

The RCC signal is also used to restore all positions of the Input/Output register, that is positions 1 through 6, FIGS. 92 and 93, to their off condition.

In the assumed case, the wire from Enter Alpha was connected to the LA3 hub on the control panel. It will be recalled that the C Counter is set to a Count Level which is dependent upon the LA word being sought in the MLC Memory. In this case, since LA3 has been selected, the C Counter will be set to an initial count status of 12. As the search takes place, the C Counter is stepped in response to recognition of Field Marks as they are encountered and eventually indicates that the address has been located.

The +48 volt signal on the control panel is applied to hub 78.25 in FIG. 78. This signal is directed over line 78.26 to input M of Or block 86.10 and to pin D of Or block 86.11. The outputs of the blocks 86.10 and 86.11 change to —R levels which in each case are converted by the associated Convert blocks 86.12 and 86.13. The outputs of 86.12 and 86.13 are applied respectively to +And blocks 86.14 and 86.15. The input at pin R of +And 86.14 has a +S Not Start latch signal. The output of 86.14 then becomes —S to pin N of the trigger 86.16 which is position 4C of the C Counter. The signal from 86.14 turns on trigger 4C. Also, pin Q of 86.15 is +S at this time and 86.15 supplies a —S output to a —Or block 86.17. The output of 86.17 is applied to pin Y of a trigger 86.18 which is 8C position of the C Counter. The signal to pin Y of 86.18 pulls the collector of the on side transistor in the trigger to a +S level, thus causing the trigger 86.18 to turn on.

When electronics starts, and the Start latch is turned off, the triggers 4C and 8C in the C Counter will be permitted to change state as required. The C Counter thus starts out with a count of 12, which is the binary weighted equivalent of 4C and 8C. Stated in another way, this means that the C counter must step from a count of 12 to a count of 16 before the address of the LA3 word can be considered to be located.

*Start of Electronics and Search for Required Field*

At the beginning of the Alphanumeric Entry Operation, the electronics of the machine is started by the energization of Electronic Start Relay 64. This is true for the first starting of electronics only. Starting of the electronics subsequent to this time will be under control of the printer as reflected by the actuation of the Electronic Start Interlock Relay 63. Referring to FIG. 106, it can be seen that the Relay 64 will be energized by a +48 volt potential through a 31-2 normally closed point as soon as the 27-6 point moves to its upper or normally open condition as a result of the Relay 27 having been energized. In FIG. 116, it will be seen that the Electronic Start Interlock Relay 63 is energized under control of selected ones of the cams C1–C6 which are mechanically rotated during a printer cycle.

In FIG. 48, as soon as the Electronic Start Relay 64 is energized, a +48 volt signal is applied through the 64-4 normally open point to pin F of an Integrator 48.16. This is applied to pin S of a +And 48.15. Pin T of 48.15 is at a +S level, since the end of LA Memory has not been reached. As a result of an MLC operation being in effect, pin W of +And 48.19 is at a +S level, but pin U of 48.19 is at a —S level. The +And block 48.19 therefore supplies a +S level to the lower input of +And 48.15. All inputs of +And 48.15 are thereby conditioned and it supplies a —S input to pin R of +And 48.12 and pin X of Or 48.18. The output of +And 48.12 becomes +S and is applied to pin P of the Start Trigger Gate latch 48.17. The latch 48.17 remains on at this time because of the feedback loop from its off side to pin R of the upper —Or block in the latch.

Since pin X of —Or 48.18 has a —S level applied, its output becomes +S to pin C of the Start trigger 48.10. The input B of the Start trigger 48.10 is at a +S level and the Start trigger will turn on with the next Oscillator Sample pulse to pins F. As the Start trigger 48.10 changes to its on condition, the +S Not Start signal at pin H of the Start Trigger Gate latch 48.17 becomes —S. This turns the latch 48.17 off and in turn de-conditions the gate input B of the Start trigger 48.10. The gating conditions just described, remain this way until the trigger 48.10 is turned off.

As indicated in connection with FIG. 136, during this type of operation the bits of information in MLC Memory are read at X time and written at X time. No addressing takes place during Y time of the X/Y interval.

The selection of the proper drivers and switch combinations is under the control of the B Counter. In order to condition a word driver during this time it is necessary to produce a —R signal on the Fixed Factor Driver Select line 55.15. The only conditions that are necessary to get this signal at this time are the Read signal and the X signal. These are applied to pins B and D of a +And 55.16, which then supplies a +S level to pin H of the +AA block 55.12. Pin F of 55.12 is at a +S level at this time. Input D of +And 55.17 is —S at this time since this is not a Divide operation and the output of 55.17 will therefore be +S to pin G of 55.12. The inputs X and Y of 55.34 are a +S at this time so 55.34 also supplies a —S output. The combined outputs of 55.12 and 55.34 are —S to pin X of the —Or block 55.11. This is converted by the Power Inverter 55.10 and becomes a —R signal on line 55.15.

The —R fixed Factor Driver Select is applied to pin H of a —AO block 60.17 in FIG. 60. The other input of the —AO block 60.17 is derived from a +And block 60.13 that is conditioned in turn by +S signals as a result of the triggers 2B and 3B being on in the B Counter.

With the inputs of the —AO block 60.17 being satisfied, its output becomes +S applied to pin F of Inverter 60.18. Inverter 60.18 supplies a —S signal to pin A of the Word Driver 3 block 60.14. Word Driver 3 will in turn provide an output upon the occurrence of the 02 single Shot Delay signal on line 60.19.

It is also necessary to select one of the Read/Write switch combinations, which in this case is Read/Write switch combination #3, in FIG. 61. The initial setting of the B Counter results in +S signals being applied to all three inputs of a +AO block 61.21, and 61.21 provides a —R output on line 61.22. This, in turn, is applied to pin B of a —AO block 61.23. The other input P of —AO 61.23 is at a —R level during X time Switch Select. When this is the case, the —AO block 61.23 will supply a +S level to pin N of the Switch 1 block 61.24 and to pin G of the Switch 1 block 61.25.

A +S level will be present at pin B of 61.24 during Read time and a +S level will be present at pin A of 61.25 during Write time.

The X time Switch Select to input D of the —AO block 61.23 is conditioned as follows. It will be recalled that the +And block 55.17 has a —signal at pin D and thereby supplies a +S signal on the line 55.18 to input 2 of a +AA block 55.19. Pin 1 of 55.19 is at a +S level and pin Z of 55.19 is also at a +S level so that the output of 55.19 is —S to pin R of the —Or block 55.20 and pin Y of the —OO block 55.21.

The output of the +And block 55.22 is also +S at this time as a result of the —S level on the Multiply line to pin 2. The output of +And 55.23 is also +S at this time as a result of the —S level on the Subtract line to pin 7. The output of +And 55.23 is applied to pin 6 of a +AA 55.24 and the output of +And 55.22 is applied to pin 4 of 55.24. At X Read time, input pin 5 of 55.24 will be +S, thus conditioning all inputs of 55.24. The output of 55.24 then becomes —S, and in conjunction with the —S output from +AA block 55.19 supplies a net —S signal to pin R of 55.20 and pin Y of 55.21.

The —OO block 55.21 then provides a +S output on line 55.25. The —OO block 55.26 is inactive at this time so that its output is —S. However, the +S output of the —OO block 55.21 predominates and brings the input of the Power Inverter 55.27 to the +S level. This is inverted and converted simultaneously so the X time Switch Select line 55.28 becomes —R at X Read time.

The bit driver and bit switch selection during the operation is comparable to that encountered during operations with Main Memory, with the exception that it is necessary to use the MLC Bit Drivers rather than the Main Memory Bit Drivers.

Figure 64:
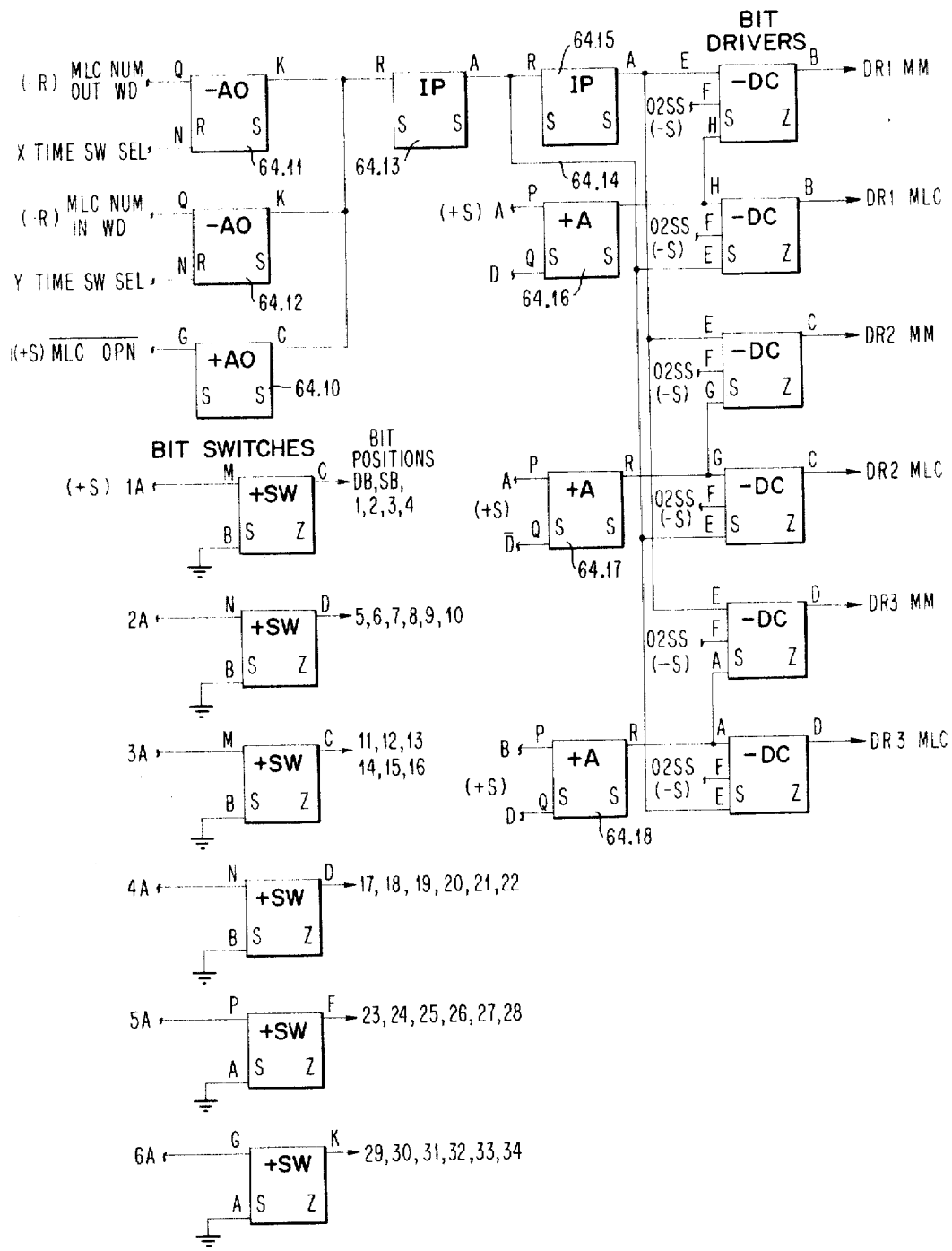
Figure 65:
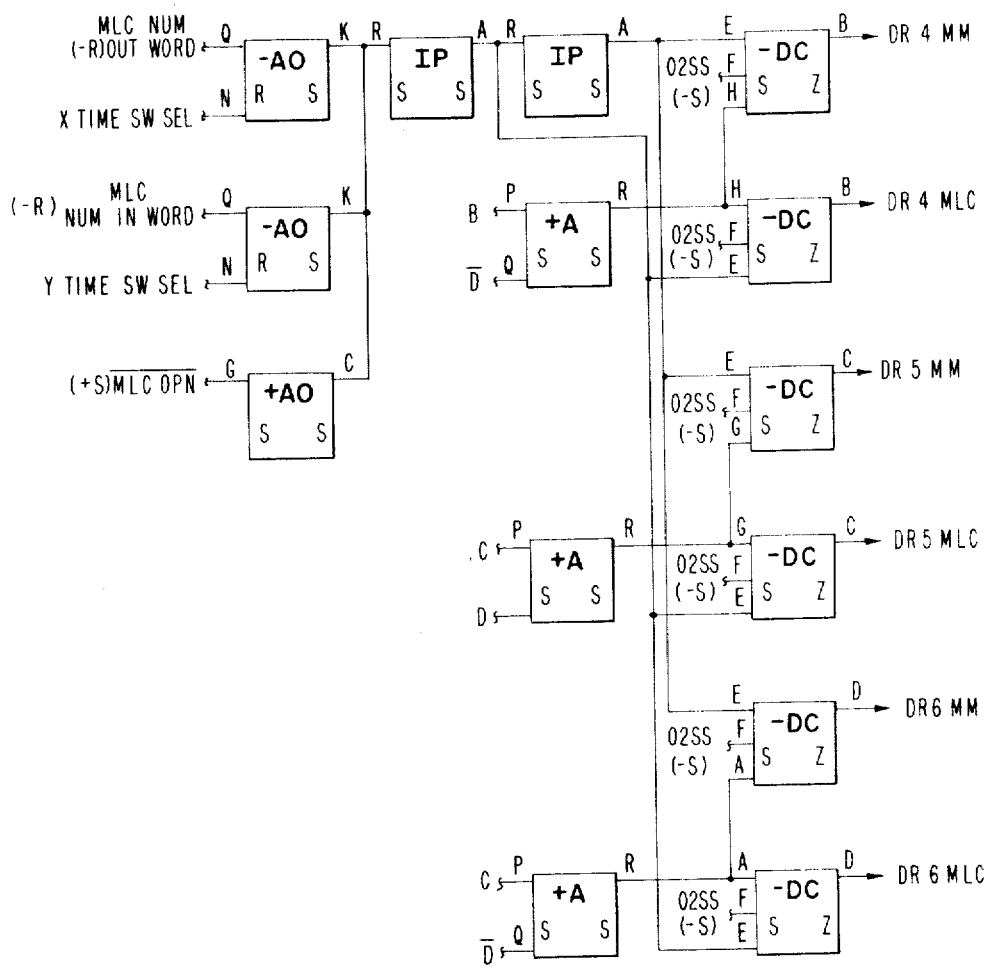

Reference is made to FIG. 64 which shows drivers 1, 2 and 3 for the Main Memory and for the MLC Memory. Drivers 4, 5 and 6 are shown in FIG. 65. In addition, all six bit switches are shown in FIG. 64. As with the Main Memory driver selection, the selection of the MLC drivers is under control of the clock circuits. The drivers are controlled more specifically by the ABC ring in conjunction with the D trigger. The +AO block 64.10 has direct control over the selection of the Main Memory drivers or the MLC drivers.

Figure 58:
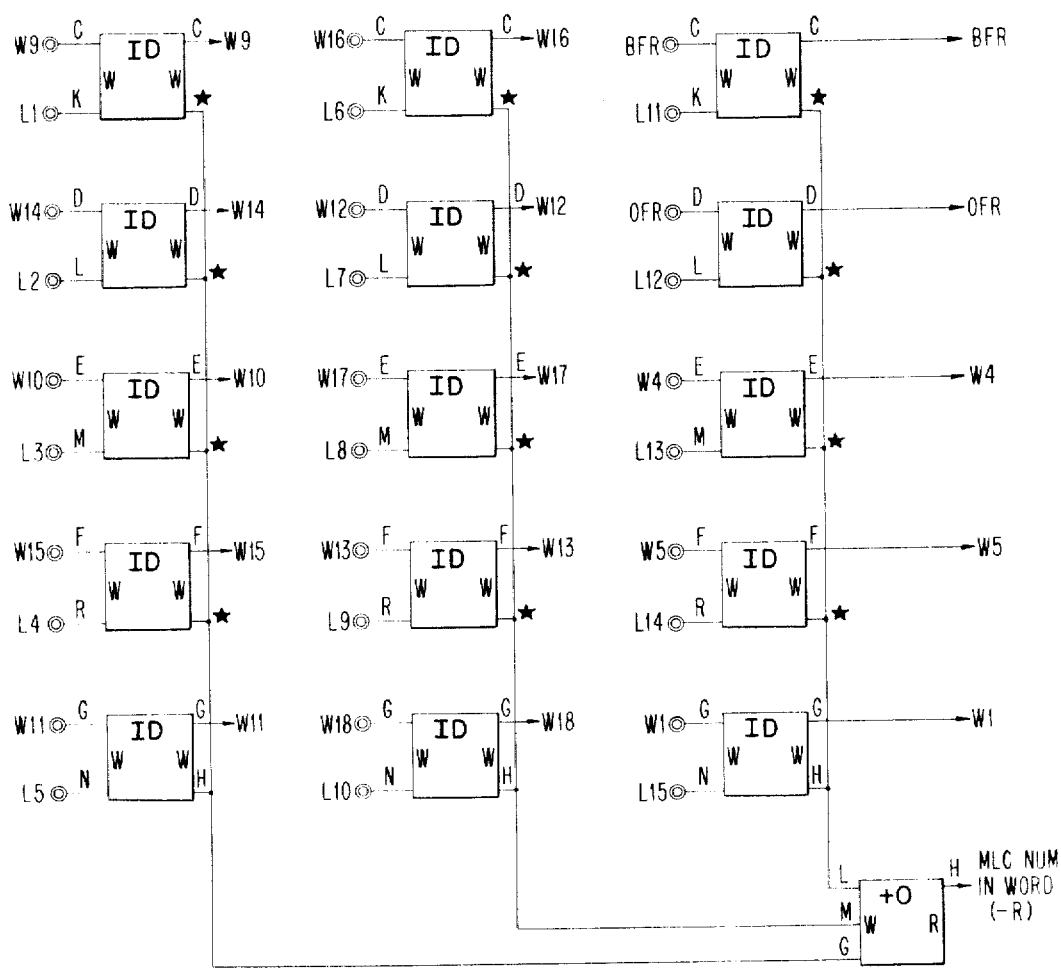

The —AO block 64.11 and the —AO block 64.12 control the selection of drivers for operations of the machine involving numeric information. The MLC Numeric inputs for these blocks are derived from FIGS. 57 and 58.

Since the machine is in an MLC Operation, the input pin G of +AO 64.10 will be —S. The resulting +S output of 64.10 predominates over any outputs from the blocks 64.11 or 64.12 so that the input to pin R of the Power Inverter 64.13 is +S. The output of Power Inverter 64.13 on line 64.14 then becomes —S and this is applied to each of the MLC drivers 1, 2 and 3.

The output of Power Inverter 64.13 is inverted further by Power Inverter 64.15, thereby deconditioning the Main Memory drivers 1, 2, and 3. The MLC drivers 1, 2, and 3 are conditioned further by the respective outputs of +And blocks 64.16, 64.17, and 64.18. The final input condition for each of the MLC drivers is the 02 Single Shot pulse. Similar selection principles apply to the MLC drivers 4, 5, and 6 shown in FIG. 65.

If a particular bit position in MLC Memory has a "1" stored in it, this is evidenced by the arrival of a differentiated signal to inputs A and C of an amplifier 66.23. Amplifier 66.23 in turn supplies a signal to a Single Shot 66.24 which in turn provides a shaped signal on line 66.25 to input C of the Storage trigger 66.10. Gate B of Storage trigger 66.10 is conditioned by an output from a —Or 66.19, which in turn receives a —S input on line 66.18. Pin D of the Storage trigger 66.10 is conditioned by a Read Delay signal at Read Delay time.

The condition of the Storage trigger which indicates whether or not a bit of information was read from Memory, determines whether or not information must be written into Memory following a read operation. Writing into MLC Memory during an MLC Operation is accomplished by conditioning the Fixed Factor Driver Selector line 55.15 and the X time Switch Select line 55.28, both of which are shown in FIG. 55.

Referring to FIG. 55, a —S signal exists on the Address Located line to pin V of a +And 55.29. This causes a +S level to exist on pin 4 of a +AA block 55.30. Input 6 of the +And 55.31 is a —S at this time so that its output to pin 5 of the +AA block 55.30 is also +S. With a +S level to pin 1 of the +AA block 55.32 because of the Magnetic Ledger Card operation, a +S input to pin 2 of +AA 55.32 as a result of the Storage trigger being on will cause a —S output at the combined junction 3 and Z of +AA 55.30 and 55.32. This —S level is applied to pin 4 of the —OO block 55.26. This block converts a —S level to a +S level, it is applied to the Power inverter 55.27 and converted to a —R output for X time Switch select.

The —S output of 55.30 and 55.32 is applied to pin Z of the —Or 55.11. The —Or 55.11 inverts the signal to a +S level which in turn is inverted by the Power Inverter 55.10 and becomes a —R on line 55.15 for accomplishing a Fixed Factor Driver Select function.

The overall selection of drivers and switches occurs in a manner similar to that previously described during the read interval with the exception that the Write switch 3 block 61.25 is conditioned by a signal on line 61.15, in FIG. 61.

It is apparent that if the Storage trigger did not have a bit of information stored therein, then the pin 2 of +AA 55.32 would be at a —S level, providing a +S output to both the —OO 55.26 and the —Or block 55.11, thereby deconditioning the driver and switch select functions.

The search for the selected LA Field in MLC Memory continues until the proper number of Field Marks has been recognized and the C counter reaches a count level of 16. Normally, more than one 36 bit word in MLC Memory has to be addressed before the desired address has been located. It is therefore, necessary to provide some means of stepping the B Counter to the next count level at the end of each 6A clock time for purposes of addressing the next MLC word in Memory.

Referring to FIG. 78, it will be recalled that the Sample Pulse Driver 78.10 supplies sample pulses on line 78.15 for advancing the B Counter. It was noted previously that the input A of the Sample Pulse Driver 78.10 is conditioned as a result of the —S Magnetic Ledger Card operation input to pin F of the +And 78.11 and the resulting +S output.

Pins Y and Z of +And 78.14 are at +S levels as a result of the Not Address Located and the MLC operation lines being +S. Pin X of 78.14 will go to a +S level when the clock reaches the 6A, C, D, Y, Write, and 02 during the cycle currently in progress. The output of 78.14 then becomes −S to pin R of the −Or block 78.12. The −Or block 78.12 supplies a +S pulse to pin R of the Sample Pulse Driver 78.10 which in turn results in the sample pulse being generated on line 78.15. A sample pulse for stepping the B Counter occurs in this manner at the end of each word time until an address specified has been located.

Reference is now made to FIG. 140 which illustrates in short form the actual stepping of the B Counter and the words in MLC Memory that are addressed at particular count levels of the B Counter. The B Counter does not step in a straight binary fashion. It will be seen in FIG. 140 that the first two states of the Counter, that is, the zero or reset state, and the state wherein rigger 1B is in the on condition will result in no word selection in MLC Memory. These two states of the B Counter are used for pre-run cycles during the Read Ledger operation and the Record Ledger operation. FIG. 140 should be considered in conjunction with FIG. 77. It will be noted that the 1B trigger operates in a straight binary fashion. Each state of the 5B trigger makes a group of ten words available from a block of 20 words in MLC Memory. The 6B trigger is used to switch from one block of 20 words in MLC Memory to a second block of 20 words in MLC Memory. The various combinations of the 1B, 2B, 3B and 4B triggers permit selection of any one of the ten words in a group of ten words.

In order to locate the desired LA word, it is necessary to load the characters from MLC Memory into the Input/Output register in order that a Field Mark character previously stored in the MLC Memory can be recognized. The number of Field Marks that have been recognized is indicated by the current status of the C Counter. Information in the MLC Memory, like that in the Main Memory, is handled serially by bit. Bits of information are read from Memory and loaded into the Input/Output register to form recognizable characters. It is possible that an invalid Field Mark character would be recognized under certain conditions if the required bit configuration existed in the Input/Output register and if the status of the register were checked at the end of each bit time. However, the machine is setup to recognize bit configurations in the Input/Output register only at End Character Time. This time occurs at the end of each complete set of 6 bits of information from Memory.

The reception and storage of bits of information in the Input/Output register will be discussed in connection with FIGS. 92 and 93. Referring first to FIG. 93, it will be seen that a +S level is applied on a line 93.10 to gate inputs R and U of the Input/Output trigger #6 which is designated 93.11. Whenever the Shift Gate on line 93.10 is conditioned, therefore, the trigger 93.11 will assume the state of the Storage trigger. This happens in the following manner. The output of the Storage trigger is applied to pin 6 of a −Or block 93.12. During the operation under discussion, that is Alphanumeric Entry, the other inputs to pins 7 and 8 of −Or 93.12 will also be in a +S level. When this occurs, the output of 93.12 will decondition input T of Trigger 93.11.

The output of −Or 93.12, after inversion by 93.13, becomes a +S to the Q input of the trigger 93.11. When the next Oscillator Sample Pulse arrives at inputs S of the Input/Output trigger 6 designated 93.11, the trigger will be turned on. If the Storage trigger had no bit of information stored, the trigger 93.11 will remain off, or, if on, would have been turned off.

It is necessary, whenever a bit of information has been stored in trigger 93.11, to move the bit to trigger 93.14 which is the Input/Output trigger #5 before the next bit of information is supplied by the Storage trigger to I/O trigger #6. This gate line 93.10 is also used for transferring the information from the Storage trigger into the I/O trigger #6.

Figure 94:
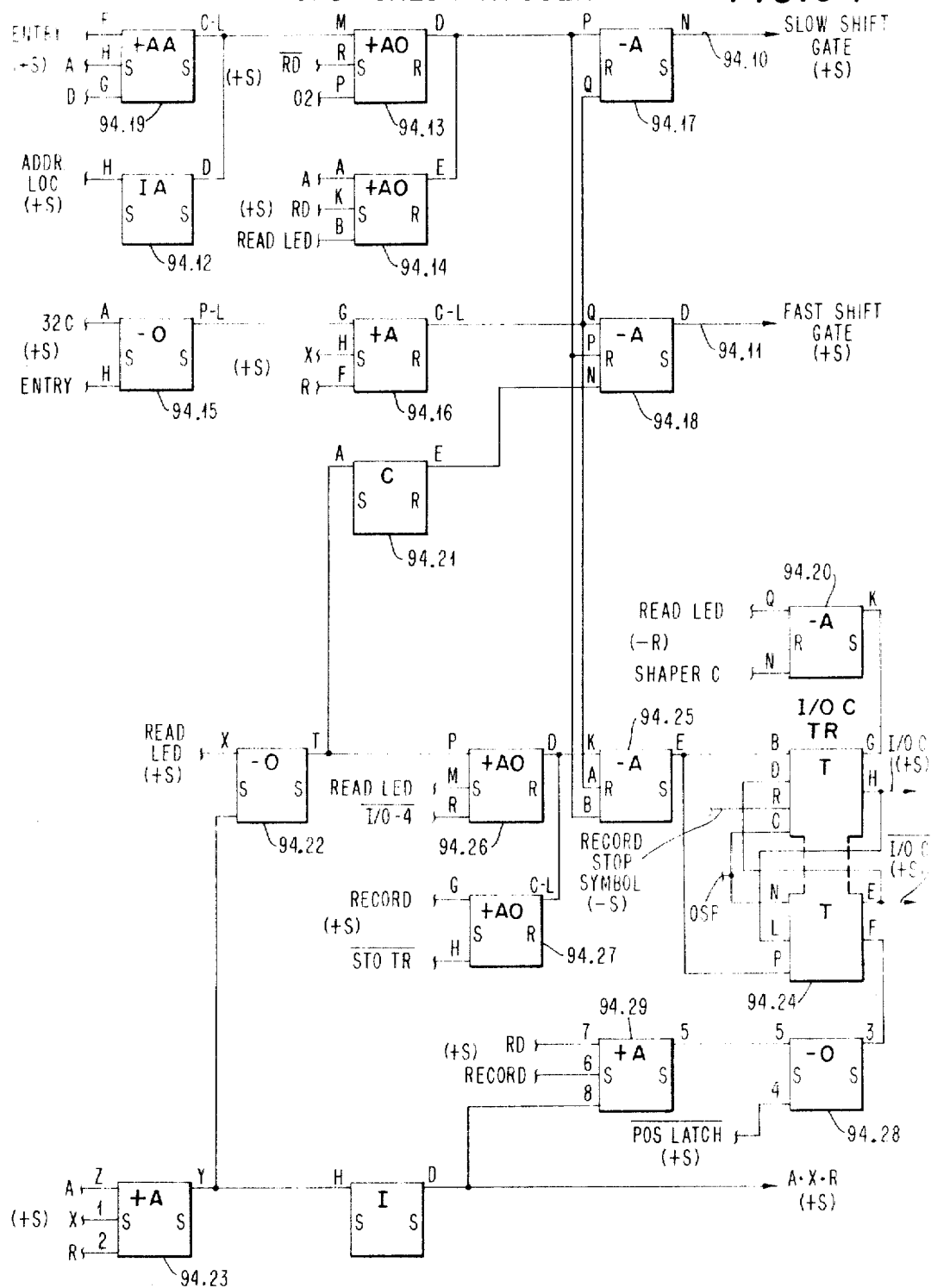

The gate circuits for shifting information into and through the Input/Output register are shown in FIG. 94. A Slow Shift Gate 94.10 and a Fast Shift Gate 94.11 are provided. During an Alphanumeric Entry into the MLC Memory, when one of these gate lines is conditioned, the other gate line is also conditioned. The Fast Shift Gate line 94.11 conditions the I/O triggers 3, 4, 5, and 6. The Slow Shift Gate line 94.10 conditions the I/O triggers 1 and 2.

In FIG. 94, during the search operation, the Address Located line to pin H of the I A block 94.12 will be at a −S level. This is inverted and applied as a +S signal to pin M of a +AO block 94.13. A Read Ledger line to pin B of a +AO block 94.14 is at a −S level and results in the output of 94.14 being +R even though the A and the Read Delay signals to pins A and K of 94.14 occur some time during the cycle. Correspondingly, the Not Read Delay and the 02 signals to pins R and P of +AO 94.13 will cause a −R output from 94.13.

The 32C input at pin A of the −Or block 94.15 will be at a −S level, since the address required has not been located. This −S level is inverted by 94.15 and applied to pin G of a +And 94.16. Therefore at X, Read Delay, and 02 time, the −R outputs from 94.13 and 94.16 will condition both of the −And blocks 94.17 and 94.18. The outputs of these blocks on lines 94.10 and 94.11 then become +S and are applied to condition the respective shift gate inputs of the I/O register trigers. An Oscillator Sample Pulse is used at the end of each shift gate pulse in order to transfer the bits of information among the various trigger positions of the Input/Output register.

The bit configuration for the Field Mark is indicated below:

| Input/Output register | 1 | 2 | 3 | 4 | 5 | 6 |
|---|---|---|---|---|---|---|
| Field Mark | 1 | 0 | 1 | 1 | 0 | 0 |

In order to determine the presence of a Field Mark character with the bit configuration indicated, the Input/Output register status is checked by means of logic shown in FIG. 103. In FIG. 103, the Magnetic Ledger Card operation line to pin U of the +And 103.10 will be at a +S level. When trigger 3 of the Input/Output register has a one bit stored therein as indicated by a +S level to pin V of the +And 103.10, and when trigger 6 of the Input/Output register does not have a bit stored therein as indicated by a +S level to pin W of +And 103.10, the output of +And 103.10 becomes −S. This is inverted to a +S by inverter 103.11 and applied in turn to pin W of a +And 103.12. When trigger positions 1 and 4 of the Input/Output register have a one bit stored in them, the V and U inputs of the +And 103.12 will be at a +S level. The output of 103.12 becomes −S and after inversion by Inverter 103.13 becomes a +S on line 103.14.

The codes in which the machine operates have been carefully selected so that in order to recognize a valid Field Mark, it is only necessary to check the condition of triggers 1, 3, 4, and 6 in the Input/Output register. Also the output of the Inverter block 103.11 is designated as +S Function on line 103.15. When the line 103.15 becomes +S, the code then in the shift register is a Function character, and any time that the line 103.15 becomes −S, the code in the I/O register is an information character.

As indicated before, the contents of the I/O register are checked at the end of each character comprising six bits of information. This check occurs at Clock times C, Not D, Y and Read Delay during an address search. This combination of clock pulses is referred to as the End Character time. This interval or End Character time occurs during the last Y time of each trigger in the 1A–6A ring.

If a valid Field Mark character is recognized at this time, then the Intermediate trigger 84.15 in FIG. 84 is conditioned to provide stepping pulses for the C Counter. The gate input to the Intermediate trigger 84.15 is supplied from a −Or 84.16 and results in the trigger 84.15 being responsive to four Oscillator Sample Pulses at input S. The Intermediate trigger 84.15 will, under these circumstances, turn on, then off, then on again, and then off. This produces two positive shifts at the output of the Intermediate trigger at pin W which are applied to pin P of the Sample Pulse Driver 84.17. The Sample Pulse Driver 84.17 then generates two pulses which are supplied by line 84.14 to step the 1C trigger in order that the C Counter will count twice each time that a Field Mark is recognized.

Considering the detailed development of conditions for deriving the necessary stepping pulses from the Intermediate trigger 84.15, reference is first made to a +And 84.18.

The Record line to pin 2 of +And 84.18 is −S and 84.18 supplies a +S level to pin Z of the −Or block 84.16. The Read or Record line to pin 6 of +And 84.19 is −S at this time so that 84.19 supplies a +S level at pin X of the −Or block 84.16. The Address Located line is −S at pin P of +And 84.20. The +And block 84.20 then supplies a +S input to a +AA block 84.21. The Not Address Located line to pin B of a −Or block 84.22 is +S and a Not Field Mark to pin D is +S at this time. As soon as the Field Mark code is recognized and the Not Field Mark input to pin D becomes −S, −Or 84.22 will provide a +S to +AA 84.21. The signal conditions to pin K of 84.21 and the three inputs of a +AA block 84.23 correspond to the four clock conditions which define the End Character time. If a Field Mark is recognized at this time, the outputs of 84.21 and 84.23 will assume a −S level to pin Y of the −Or 84.16. The −Or 84.16 then supplies a +S output to pins R and T of the Intermediate trigger 84.15.

The smallest time interval during the End Character time is the read interval which will gate the Intermediate trigger 84.15 long enough so that four Oscillator Sample Pulses will be effective to change the state of the Intermediate trigger four times, that is on, off, on, and off. As the Intermediate trigger 84.15 changes state four times, it will supply two positive shifts at its pin W output to the Sample Pulse Driver 84.17. Since the input to pin M of 84.17 is +S, two sample pulses will be produced on the line 84.14.

Referring to FIG. 85, the step pulse output from the Sample Pulse Driver 84.17 on line 84.14 is applied to line 85.19 of the 1C trigger 85.20. The 1C trigger 85.20 will change state twice and supply one pulse on the line 85.21 to position 2C of the C Counter in FIG. 86.

In the assumed example, the C Counter was preset to a count level of 12 in order to locate the LA3 address. When a valid Field Mark is recognized, the C Counter will step twice and then assume a state or count level of 14. Since the address is considered located only when the C Counter is at a count of 16, it will be necessary to recognize one or more Field Mark character, so that the C Counter can be stepped twice again from its count status of 14 to a final count status of 16. At this time the electronics will stop and the machine will wait for the entry of the first alphanumeric character.

*Distinctions between Search for Field LA1 and One of Fields LA2–LA9*

As previously noted, any one of the variable length alphanumeric fields LA1–LA9 can be located in MLC Memory in a selective manner under the influence of control key signals or automatically generated program signals. The circuit procedure for locating the first field LA1 differs to some extent from the action involved when a search is made for the other fields LA2–LA9.

During the preliminary setup operations, the B Counter is preset to a count status which directly determines the driver and switch selections for the first alphanumeric word in MLC Memory as determined by the particular Begin Alpha hub wired.

The first alphanumeric word in MLC Memory corresponds to the first word of the LA1 field. Since the clock circuits were previously stopped at the end of Dummy Digit time, only thirty five bits of the first word can be addressed, beginning with the Sign Bit position. The first five bits of the first alphanumeric word, that is the Sign Bit, the 1, 2, 3, and 4 bit positions, may contain any bit configuration due to information stored previously while using a different Begin Alpha position or having been used as an MLC Numeric word. The balance of the bit positions in the first alphanumeric word will accommodate five alphanumeric characters of 6 bits each.

The first five positions of the first alphanumeric word are recognized as a Dummy Field Mark for defining the beginning of the variable length field LA1. This Dummy Field Mark can be observed at 138.13 in FIG. 138. This is indicated as being blank in FIG. 138 since any information stored therein will be regarded by the machine as invalid and will not be rewritten.

When a search is initiated for field LA1 it becomes necessary only to interpret the first five bits read as a Field Mark, at which time the electronics is stopped. Since the electronics starts at the end of Dummy Digit time, it is not possible to use six bit locations for a Field Mark character.

Referring to FIG. 78, the LA1 impulse enters a hub designated 78.27. This is a +48 volt signal and is converted to a +S signal by the Integrator block 78.28. Referring to FIG. 89, the output of the Integrator 78.28 is applied to pin B of a +And 89.17. Since Not Start latch is +S to pin D of 89.17, a −S pulse will be generated on line 89.16 to pin 7 and pin X, respectively, of the Address Located latch 89.10 and the Holdover latch 89.11, thereby turning these two latches on. The Not Start latch signal to pin D of 89.17 will return to a −S level, but the latches 89.10 and 89.11 will remain on. This allows the machine to stop automatically at the end of the first character time as defined by the 1A position of the 1A–6A counter in the clock circuits.

Each bit location in the Dummy Field Mark position of LA1 is read, but is not regenerated, with the result that zeros will be stored in each of the five bit locations involved.

The output of the Address Located trigger is applied as a +S level to pin H of the +And 93.15. The other inputs of 93.15 are +S at this time, so the output becomes −S to a −Or 93.12. The output of −Or 93.12 becomes +S to pin T of the I/O trigger #6 designated 93.11, and also becomes a −S through inverter 93.13 to pin Q of the 93.11 trigger. Regardless of the status of the Storage trigger as reflected at input 6 of the − Or 93.12, the I/O trigger #6 is effectively deconditioned and is not responsive to any information read from memory during the Dummy Field Mark interval.

Referring to FIG. 55, MLC Memory is still addressed by the proper gating of the Fixed Factor Driver Select line 55.15 and X time Switch Select line 55.28. However, these lines are conditioned only at X Read time. The bits of information are prevented from entering the five bit locations in the Dummy Field Mark by deconditioning the lines 55.15 and 55.28 during the X Write time interval. At this time, the Read line to input B of +And 55.16 will be +R. The output 55.16 is −S which degates +AA 55.12. The output of 55.12 then becomes +S to pin X of the −Or 55.11. All inputs of +And 55.29 are +S which results in a −S input to pin S of a −Or block 55.33. −Or 55.33 supplies a +S signal to pin 8 of +And 55.14. The +And block 55.4 is then under control of the X1 time clock signal to pin 6 and the I/O #1 trigger signal to pin 7. The outputs of +AA blocks 55.30 and 55.32 are held at a +S level as a result of the −S signal from +And 55.29 to pin 4 of 55.30. This results in a +S level at pin Z of —Or 55.11. Since the I/O #1 signal to pin 7 of +And 55.14 remains at a —S level throughout the Dummy Field Mark interval, the output of +And 55.14 will be +S to the pin Y of —Or 55.11. All inputs to the —Or 55.11 are now +S so the output of 55.11 will be —S to the Power Inverter 55.10 resulting in a +R output on line 55.15. The line 55.15 is therefore deconditioned and no information will be written into the five bit locations of the Dummy Field Mark in field LA1.

Referring again to FIG. 89, the Holdover latch 89.11 is still on. The +S output of the Holdover latch is applied to pin U of a +And 49.23, and with the Entry line being +S to pin W of +And 49.23, the output of 49.23 is —S to a —Or block 49.24. The output of 49.24 becomes +S to pin H of a +AA block 49.25. The +AA block 49.25 is Dot Anded with a +AA block 48.26. When the particular clock conditions C, D, Y, Write, and 01 occur, +S levels are applied to the other five inputs of 49.25 and 49.26 in common. The output of these two blocks on line 49.27 becomes —S to a —OO block 49.12 and results in a +S signal on line 49.10 to turn off the Start trigger and stop the electronics.

The machine is now ready to receive the first alphanumeric character.

When an Alphanumeric Entry involves one of the fields LA2-LA9, the C Counter is set to some status lower than 16, as previously discussed. The C Counter is then stepped twice upon recognition of each Field Mark until a count level of 16 is reached, at which time the LA field required is indicated as having been located.

The B counter is also preset to a particular count status for selecting the proper driver and switch combinations in order to begin the search of MLC Memory at the first alphanumeric word location. As the alphanumeric characters in memory are read out bit by bit and checked for Field Mark identification, the B Counter is stepped at the end of each word time which is the end of 6A time of the 1A-6A ring in the clock circuit. The bits of information are stored in the Storage trigger, which then controls the regeneration of the bits of information into memory at each X, Write time. As indicated, the B Counter is stepped when the clock conditions 6A, C, D, Y, Write, and 02 occur, with control being exercised by the MLC Operation and the Not Address Located lines.

Besides controlling the regeneration, the Storage trigger also directly controls the insertion of bits into the Input/Output register position 6. This occurs at each X, Read, Not Read Delay and 02 time. The bits of information are shifted from the Input/Output register position 6 to position 5, from position 5 to position 4, and through the other register positions to position 1. The contents of the Inupt/Output register are checked at Each End Character time which is defined by the clock conditions C, Not D, Y, and Read, and which occur at the end of each 6 bits of information. Whenever a valid Field Mark is encountered, the Intermediate trigger in FIG. 84 is impulsed four times, and supplies two stepping pulses to position 1C of the C Counter.

When the C Counter reaches a count of 16, the machine recognizes that the desired LA word has been located, and the electronics will then be stopped. Referring to FIG. 89, the lower input of a +And 89.12 will be +S upon occurrence of a Field Mark. When the C Counter reaches a count level of 16, and with a Not 32C input, the other two inputs of +And 89.12 are +S. This results in a —S level on lines 89.14 to the Address Located latch 89.10 and 89.15 to the Holdover latch 89.11. The Not Start latch signal to pin D of +And 89.17 is —S at this time, and results in a +S output on line 89.16 to inputs 7 and X of the latches 89.10 and 89.11, respectively. The status of +And 89.13 must also be considered at this time. The Entry signal at pin 2 and the Intermediate gate signal to pin 1 are both at a +S level, and +And 89.13 supplies a —S output which is combined with the previous —S output from +And 89.12. As a result of these signal conditions, the Address Located latch 89.10 and the Holdover 89.11 are set to their on condition. The Address Located latch will remain on until a DC Reset signal is applied to pin 2. The Holdover latch 89.11 is reset just after the clock is started again and upon the occurrence of A time, D time, and Read Delay inputs to +And 89.18. The function of the Holdover latch is to remember the fact that the address sought was actually located and retain this fact until the first character has been entered.

Once the address has been located, it is necessary to stop the electronics before the first bit of the following character is addressed. This is accomplished by a +S signal on line 49.10 which is developed in the following manner. A +S Holdover input to pin U of +And 49.23 along with a +S Entry input to pin W of 49.23, results in a —S input to the —Or 49.24.

End Character latch 49.29 was reset to its off condition by a —S level on the Y input to pin R which occurred during X time of the character interval when the Field Mark was recognized. This latch is still off and supplies a +S output on line 49.30 to input T of a —Or block 49.24. Only the Address Located line to pin D and the Not 32C line to pin F of a +And 49.31 are +S at this time, so the +And 49.31 provides a +S output to the setting input of the End Character latch 49.29. Therefore, the latch 49.29 remains off at this time.

As a result of the —S output from +And 49.23, the —Or block 49.24 provides a +S Print gate level on line 49.32 which is also applied to pin H of a +AA block 49.25. The +AA block 49.25 has its output coupled to the output of another +AA 49.26. The other five inputs of these two blocks 49.25 and 49.26 will all be at a +S level when the Clock reaches C, D, Y, 01, and Write time. A —S level will then exist on line 49.27 to the —OO block 49.12 and result in a +S signal on line 49.10 which is applied by line 48.20 to turn off the Start trigger 48.10. The Start trigger 48.10 is turned off upon the occurrence of the next Oscillator Sample Pulse to pins F.

Besides stopping the electronics it is also necessary to reset the C Counter to zero and to reset the Input/Output register to zero. If the Field Mark character had been recognized during 6A time of the 1A-6A ring in the clock circuits, it is also necessary to step the B Counter.

Figure 128:
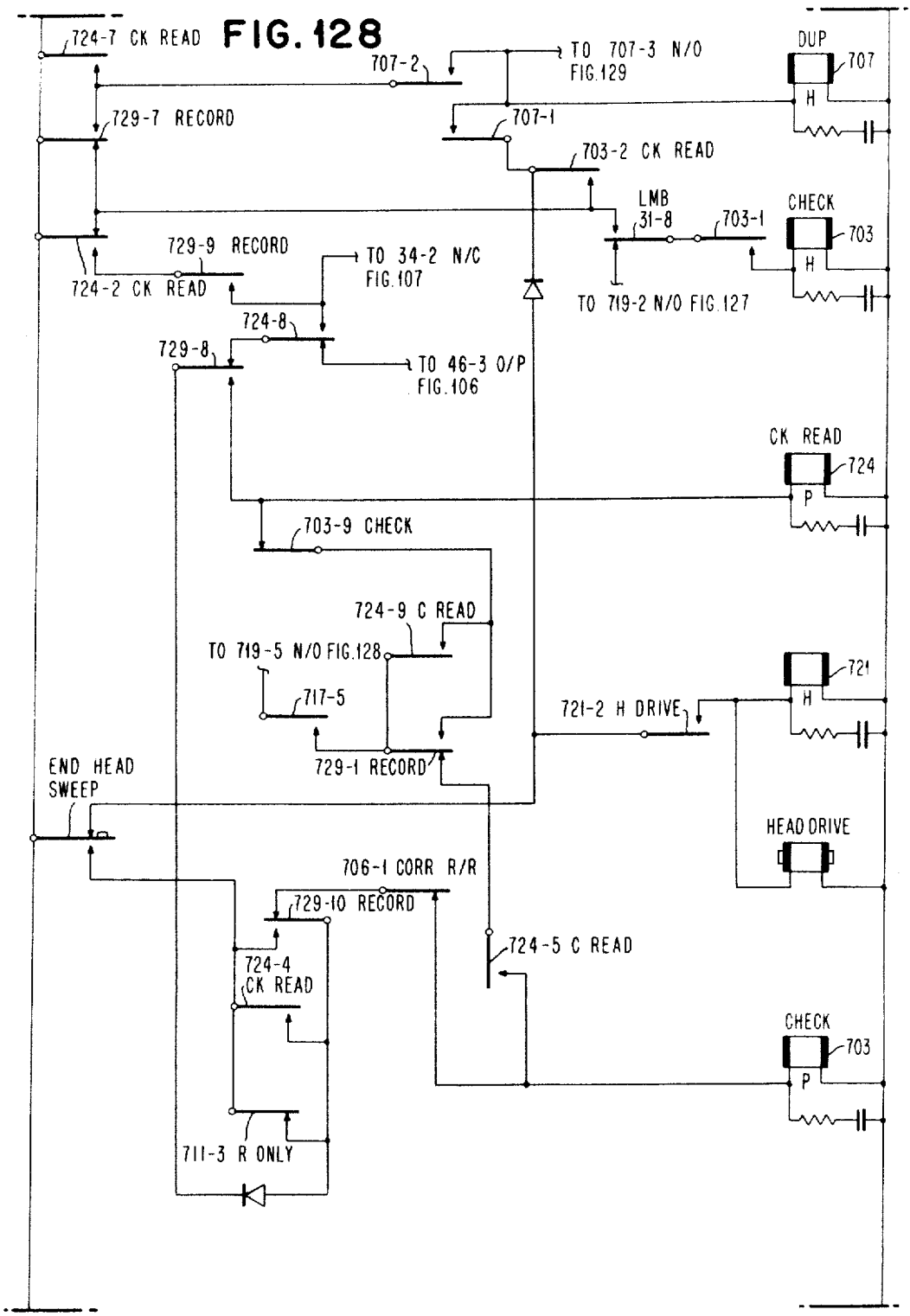

It will be assumed that the Field Mark which indicates the beginning of the variable length field LA3 is located in character position 5 of word location 13 in MLC Memory as shown in FIG. 128. Accordingly, it is not necessary to step the B Counter at this time. The signal for resetting the C Counter positions to zero and the positions 1-6 of the Input/Output register to zero is derived from a Reset C Counter (RCC) line 85.10. The +AA block 85.13 will have a —S to pin A on the Type line and supply a +S output to pin E of the —Or block 85.14. Pin D of the —Or 85.14 is +S at this time since DC Reset is not active. The Print line to pin F of +And 85.23 is at a —S level and the output of 85.23 is +S to the —Or 85.22. Pin C of —Or 85.22 will be at a +S level until the Start Gate line goes to a —S. Therefor, a —S level exists at pin P of +And 85.11. The Address Located line to pin Q is at a —S level normally, but when the Address Located latch turns on, this line will go to a +S level. The output of the +And 85.11 then comes under control of the Start Gate signal to pin C of the —Or 85.22.

As soon as the Start Gate line to pin C of 85.22 becomes —S, the output of 85.22 assumes a +S level. This is made available on a Step B Gate line 85.24 and is also applied to pin T of +And 85.11. The output of +And 85.11 becomes —S and is applied to pin C of —Or 85.14. The output of —Or 85.14 is applied to the Power Inverter 85.15 and becomes the —S Reset C Counter signal on line 85.10. This signal is then directed to all stages of the C Counter resetting them to their off state and is also applied to all positions of the Input/Output register to restore all of its positions to the off state.

The +S Step B Gate level on line 85.24 is applied to pin B of a +And 78.13. The Address Located input at pin K of +And 78.13 is assumed to have gone to a +S level as a result of the address required having been located. If the character recognized as a Field Mark occurred during the 6A time interval of the 1A–6A ring in the clock circuits, input A to +And 78.13 would also be +S. The output of 78.13 to pin P of —Or 78.12 is then a —S signal. The usual source for advancing the B Counter during the process of stepping through the MLC Memory is the +And 78.14. However, the Not Address Located line to pin Z of +And 78.14 is at a —S level at this time, giving a +S output from 78.14 even though the clock timing conditions to pin X of 78.14 could later be satisfied. The B Counter cannot be stepped under these conditions from +And 78.14. Also the Q input to —Or 78.12 is +S. The —Or 78.12 does respond to the —S input at pin P and supplies a positive shift to the AC input of the Sample Pulse Driver 78.10 at pin R. The Sample Pulse Driver 78.10 was previously gated at pin A from +And 78.11.

*Entry of First Alphanumeric Character*

It will now be assumed that the particular variable field LA1–LA9 has been located, and that the system is ready for the entry of the first character into the selected field. The Entry operation for the first alphanumeric character is somewhat different from the operation involved for the entry of characters subsequent to the first character. Whenever an alphanumeric or function key is depressed on the Primary printer 1.13, the printer will go through a print cycle. During the print cycle, the selected character will be printed or the selected function will be performed. Selection of a character or function results in the closing of various rotate, tilt, and function contacts shown at the left of FIGS. 92 and 93. Following this, the various cam contacts C1–C6 shown in FIG. 116 are actuated during the cycle. The next result of this action is to load the six bit configuration for the character involved into the Input/Output register positions 1–6 in FIGS. 92 and 93. Also the electronic portion of the machine is started in order to serialize the bits of information in the register and write them into MLC Memory.

Relay 64, FIG. 106, is picked at this time and is holding through the 27–6 normally open contact of the Enter Alpha Relay 27.

When the Primary printer contact C1 closes during the cycle, a +48 volts is made available to pick Relay 63 through the 27–3 point in FIG. 116. As soon as Relay 63 becomes energized, a +48 volt level becomes available through the 63–3 normally open point, FIG. 116, and this is applied on line 92.10 and 93.16 to any transferred selection contacts that were previously closed. This results in loading the positions 1–6 of the Input/Output register according to the bit configurations shown in FIG. 101. These are established by various ones of the selection contacts in accordance with the encoding and decoding chart of FIG. 100.

If the letter F is selected, for example, the Tilt contacts T1 and T2 will be closed, and also the Rotate contacts 1 and 2 will be closed. The application of the +48 volt level through these contacts in FIGS. 92 and 93 will result in the triggers 1, 2, 5, and 6 in the Input/Output register being turned on. It will be recalled that a Reset C Counter pulse was made available at the end of the electronic cycle and was used to restore all Input-Output register triggers to their off state. Therefore, with the letter F, trigger positions 3 and 4 will remain off. With contact R1 closed in FIG. 92 for example, a +W level exists at pin G of Integrator 92.11. The +S output of Integrator 92.11 is provided to pin Q input of a +And 92.12. The R input of 92.12 is +S as a result of Entry mode having been established. Block 92.12 then supplies a —S level to pin X of I/O trigger 1 designated 92.13 and sets it on. I/O trigger 2 designated 92.14 is set on in a similar manner as a result of the Tilt 2 contact having been closed.

I/O trigger 3 designated 92.15 remains off, since none of the contacts connected to Integrators 92.16 and 92.17 are closed. I/O position 4 designated 93.17 remains off for similar reasons.

The T1 contact in FIG. 93 is closed and a +48 volt level is applied to Integrator 93.18 which in turn supplies a +S level to a +And 93.19. Pin H of 93.19 is also +S so 93.19 supplies a —S signal to the I/O 93.20. The +S so output of 93.20 is +S and is applied to input Y of the I/O 5 designated 93.14 to set it in the on state by collector pullover as described previously.

The R2 contact in FIG. 93 causes I/O 6 designated 93.11 to be set on in a similar manner.

Before electronics starts, the lines 92.18 and 93.21 assume a —S condition and thereby degate all of the connected +And circuits. This permits the triggers in the Input/Output register to step as required for shifting of the bits of information.

The words of MLC Memory are addressed under control of the B Counter, as previously described, and the bits of information are entered in succession into the Storage Trigger. However, the bits which form the first character that were just entered in the Input/Output register are written back into MLC Memory from the I/O 1 position 92.13

As soon as the first bit of information in the I/O 1 trigger 92.13 is written into the first bit location of memory, the Input/Output register is shifted so that the next bit of this first character will then be in the I/O 1 trigger 92.13. This occurs at X Write time. The shifting of the register takes place five times and results in all bits, including that in the I/O 6 trigger 93.11, being shifted through the I/O 1 position 92.13.

The shift gate lines 94.10 and 94.11 are shown in FIG. 94. For this particular shift operation, these two lines are equivalent to each other. The Address Located line is +S to the IA 94.12. The output of 94.12 is —S to pin M of the +AO block 94.13. The Entry line to pin F of the +AA block 94.19 is also +S. This conditions 94.19 for A and D signals to inputs H and G, respectively.

The —Or block 94.15 has a —S level on the 32C line at pin A. The output of 94.15 is +S to the +And 94.16. This makes the +And 94.16 subject to +S signals on the X and Read lines to pins H and F, respectively. The Read Ledger line to pin B of +AO 94.14 is —S making a +R level available at the output of 94.14. In order to condition +AO 94.13 properly for the shifting operation, it is necessary that a +S output be supplied from +AA 94.19. In order to do this, either the A or the D input to 94.19 must be at a —S level. When these conditions exist, a +S level will exist at pin M of +AO 94.13. When the other conditions of Not Read Delay and 02 are +S to pins R and P of 94.13, its output becomes —R and overrides the +R output of 94.14. This is applied to pins P of —And 94.17 and —And 94.18. Upon the occurrence of the X, Read condition to +And 94.16, a —R level will exist to pins Q of the —And 94.17 and the —And 94.18. The input N of 94.18 is —R at this time. Therefore, when the various conditions mentioned have been satisfied, the +S levels will exist on the Slow Shift Gate line 94.10 and the Fast Shift gate line 94.11. These are then used to shift the Input/Output register.

Once the electronics has started in the first character sequence, it is no longer necessary to keep the Holdover latch on, and the latch is reset by A, D, and Read Delay clock pulses as reflected at output of +And 89.18. The holdover latch 89.11 is thereby turned off.

It is necessary to stop the electronics, once the bits of information of the first character have been shifted through the Input Output register and written into the first character position of the LA field. This is accomplished under control of the End Character latch 49.29 which is turned on under control of a +And block 49.31 as a result of a +S input on the 1C line. This is derived from the 1C position of the C counter which in turn is placed in the on condition by a pulse from the Sample Pulse Driver 84.17 that is derived in turn from the Intermediate trigger 84.15. It will be recalled that the Intermediate trigger was conditioned during the search operation to change state four times, in order to advance the C Counter twice. However, at this time it is only required that the C Counter be stepped once from its reset condition. Referring to FIG. 84, the Address Located line to pin P of a +And 84.20 is now at a +S level. This places the output of a —Or 84.16 primarily under control of the 02 signal to Pin Q of +And 84.20. The latter was not used in the previous instance.

End Character time is defined by the C, not D, and Y inputs to the +AA 84.23 as well as the Read signal to pin K of +AA 84.21 and the 02 signal to pin Q of +And 84.20. The output of —Or 84.22 to pin L of +AA 84.21 is +S also. The output of +AA 84.21 becomes —S to pin Y of the —Or 84.16. The —Or 84.16 output then becomes +S to pins R and T of the Intermediate trigger 84.15 for a duration of 20 microseconds as indicated in the timing chart of FIG. 17. This allows the Intermediate trigger 84.15 to turn on and off only. The output from its pin W applied to the Sample Pulse driver 84.17 causes a Step 1C Sample Pulse on 84.14 and position 1C of the C Counter is turned on.

Referring to FIG. 49, when trigger 1C comes on, the +And 49.31 is properly conditioned, supplies a —S output, and sets the End Character latch on. The off side output of the End Character latch on 49.30 to pin T of the —Or 49.24 results in a +S output on line 49.32. This +S level is also applied to pin H of 49.25, and when the other clock conditions of W, 01, Y, D, and C are satisfied to the remaining five inputs of +AA 49.25 and 49.26, a +S signal is available on line 49.10 to turn off the Start trigger and stop electronics. The Start Gate line 49.28 is also —S and sets up conditions for deriving the Step B Gate and Reset C Counter logic as previously described.

By this time the first character has been shifted into the sixth character position of the 13th word of MLC Memory. The B Counter must be stepped in order to select the proper driver and switch combinations for addressing the fourteenth word of MLC Memory. The advance of the B Counter takes place as previously described.

When the Reset C Counter pulse is generated, the C Counter and the Input/Output register are set to zero. However, all characters after the first character are handled in a slightly different fashion and it is necessary to set the C Counter to a count level of 58 in order to provide time delays required in processing subsequent characters. This means that trigger position 2C, 8C, 16C and 32C in the C Counter must be set on. The Reset C Counter pulse just generated will have left 1C, 4C, and 64C in their off conditions.

The setting up of the C Counter in order to get ready for the next character entry will be discussed by reference to FIG. 86. Both inputs of the +And 86.18 are now at a +S level, so +And 86.18 supplies a —S output to the —Or 86.19.

The output of —Or 86.19 becomes +S which is applied to the Y input to the 2C trigger 86.20 which is thereby turned on by collector pullover action. A similar +And 86.21 supplies a signal to —Or 86.17 to turn on the 8C trigger 86.18. A +And 87.10 provides —S signals to pin 8 of a 16C trigger 87.11 and pin X of the the 32C trigger 87.12 which sets these two triggers on. When the next character is entered, the End Character latch is turned off, thus deconditioning +And 86.18, +And 86.21 and +And 87.10, to permit the C Counter to step as required. This concludes the discussion of entry of the first character into MLC Memory.

*Entry of the Second Alphanumeric Character and Subsequent Characters*

The primary difference between entry procedures for the second and subsequent characters as contrasted with the entry procedure for the first character, is that the C Counter is set to a count level of 58 rather than to zero. This action takes place for the purpose of convenience in circuit operation and the C Counter establishes a predetermined delay between the entry of the first character and the second character, as well as between each successive pair of characters.

The C Counter plays a more significant role in controlling the printing of information from MLC Memory during an Alphanumeric Print operation than it does during an Alphanumeric Entry operation, presently being described. During the Alphanumeric Print operation, the C Counter establishes a predetermined time delay between the read out of one character from MLC Memory and the Read out of the following character from MLC Memory in order that the printers, whether the Primary printer alone, the Ledger printer alone, or both printers, will have adequate time to complete their cycles of operation in order to print the successive characters, and to overcome the effects of contact bouncing conditions, as well as mechanical inertia.

Therefore, in order to simplify the circuits involved for the Alphanumeric Entry and the Alphanumeric Print operations, a similar time delay is established during each operation. At the end of the first character interval, and at the end of each succeeding character interval, the C Counter is always preset to a count level of 58. The C Counter is then impulsed by signals which are spaced one character interval apart, as defined by the clock, that is, the time required to step through six bit positions of MLC Memory. The C Counter is stepped seven times in order to establish a count level of 65 which then conditions the machine for accepting another character from the alphanumeric entry device.

Six of the seven character intervals are idle character cycles, that is, from the count level of 58 to the count level of 64. The seventh character interval which comprises the interval between the count level of 64 and the count level of 65 is used for the entry of the character presently in the Input/Output register into its proper location in MLC Memory.

In order to develop the necessary idle cycles, the clock is started, runs for seven character cycles, and is stopped at the end of the seventh character interval. During the first six cycles, the B Counter is not advanced, and consequently, since each word in memory comprises six equal characters of six bits each, the same word in MLC Memory and the same character location will be addressed at the end of six character intervals when the C Counter is sitting at a count level of 64, as when the C counter was sitting at a count level 58 at the beginning of the idling sequence. The alphanumeric character currently stored in the Input/Output register is then shifted in a normal manner during the seventh character interval from the count level of 64 to the count level of 65. The entry of the character during the seventh character interval is identical to the operation performed when the first character was entered as described previously.

During the six idle cycles, the information from memory is read, stored in the Storage trigger, and regenerated back into memory; the Input/Output register is deconditioned so that no shifting takes place; and the B counter is left in the state which it had at the beginning of the six idle cycles.

Referring to FIG. 55, a —S level exists on the Not 32C line to pin W of +And 55.29. This results in a +S output from +And 55.29 to the —Or 55.33. The other input to the —Or 55.33 is also +S at this time. As a consequence, the output of the —Or 55.33 to pin 8 of +And 55.14 is —S. This in turn results in a +S level from +And 55.14. The gating of the Fixed Factor Driver Select line 55.15 and the X time Switch Select line 55.28 then comes primarily under control of the Storage trigger at input pin 2 of +AA block 55.32. The Storage trigger, in this manner, effectively controls the regeneration of information into the MLC Memory during the six idle cycles. The state of the trigger position 1 in the Input/Output register as reflected at pin 7 of the +And 55.14 has no effect at this time because of the —S input to pin 8 from the —Or block 55.33.

Referring to FIG. 94, the Slow Shift Gate output on line 94.10 and the Fast Shift Gate output on line 94.11 are deconditioned as a result of the +S inputs on the 32C line and the Entry line to the —Or 94.15. This results in a —S level to pin G of the +And 94.16, and a +R output from 94.16 which degates the —And blocks 94.17 and 94.18. In this way, the Input/Output register is prevented from shifting during the idle cycles.

It will be recalled that an output from the off side of the End Character latch 49.29 results in the development of a +S signal on the Turn Off Start trigger line 49.10 in order to stop electronics. However, the Not 32C line at pin F of +And 49.31 is at a —S level as a result of the 32C trigger being on throughout the entire interval, comprising the six idle character times. The output of +And 49.31 is such all through this interval that the End Character latch 49.29 cannot be turned on in order to stop electronics.

The —S level to pin F of +And 49.31 continues until the C Counter has advanced to a count level of 64, at which time the 64C trigger comes on, the 32C trigger goes off, and all trigger positions 1C–16C are also turned to the off state. One additional character cycle results in the C Counter reaching a count level of 65, the 1C trigger is turned on, and electronics can be stopped as described previously in connection with the entry of the first alphanumeric character.

The Start Gate line 49.28 is also deconditioned throughout the six idle character intervals, and prevents the Step B Gate impulse and the Reset C Counter signals from occurring. The B Counter remains in the state in which it was at the beginning of the six idle cycles.

During the seventh character cycle, the character that was entered into the Input/Output register, is shifted and written into MLC Memory. The electronics of the machine are stopped with the C Counter again set to a count level of 58, and with the circuits conditioned for the entry of the next character.

It will be recalled by reference to FIGURES 137 and 138 that the MLC Memory is primarily separated into a first portion comprising the variable length fields LA1–LA9 and a second portion comprising special alphabetic information which is SA1–SA4. Since the information in positions SA1–SA4 of MLC Memory is semi-permanent in nature, it is necessary to prevent any accidental entry of information from the alphanumeric entry device into this portion of MLC Memory. A signal designated End LA Memory is generated in the logic for this purpose. The signal is developed under direct control of the B Counter and occurs when the counter has reached a setting which indicates that the thirty-third word in MLC Memory is being addressed.

The signal End LA memory does not lock up the alphanumeric entry device and entry of information can continue as before. However, the information is prevented from being entered into memory.

The conditions encountered at this time can be realized by reference to FIG. 48. The outputs of the B Counter which control the situation are applied to a number of inputs of a +AA block 48.21 and a cooperating +And block 48.22. The inputs to pins F, G, and H of 48.21 and pin T of 48.22 represent a B Counter address status for the thirty-third word of memory. The B Counter reaches this status at the end of the sixth character in the thirty-second word. This is represented by the 6A input to pin R of 48.22. The input to pin Q of +And 48.22 is at a +S level at this time. As a result of the aforementioned inputs, the joint output of 48.21 and 48.22 becomes —S and represents the End LA memory signal on line 48.23. This —S signal is applied to pin T of the +And 48.15 and results in a +S output from 48.15. This, in turn, is applied to pin X of a —Or 48.18 which has another +S signal to its Y input from a +AA block 48.24. The —Or block 48.18 then supplies a —S level to pin C of the Start trigger 48.10, thereby deconditioning it and preventing it from turning on in a normal manner.

This concludes the discussion with respect to alphanumeric entry into the LA portion of MLC Memory.

*Entry of Information into the Special Alphanumeric (SA1–SA4) Portion of MLC Memory*

The special Alphanumeric portion of MLC Memory comprises eight physical word locations 33–40 in MLC Memory. These eight word locations are separable into four variable length fields which are set aside for information of a semi-permanent nature, and which are designated SA1–SA4.

In order to enter information into one of the SA locations, the control panel is wired in the following manner:

(1) A program step exit or a control key exit is wired into the Enter Alpha hub.

(2) A wire is connected from the Enter Alpha hub Exit to one of the hub locations SA1–SA4.

In the case of a Special Alphanumeric Entry, it is not necessary to wire any of the Begin Alpha Hubs, because, regardless of the particular SA hub that is wired, the B Counter and the bit selection circuits are always set up to address word location 33 in MLC Memory.

The selection principles for recognizing the beginning of SA1 are similar to those which apply during the recognition of the beginning of LA1. Like LA1, the first five bits of SA1 are blank and are recognized as a Dummy Field Mark. The first character entered in SA1 is placed into the second character location of the word location 33 in MLC Memory.

The searching process for locations SA2–SA4 is similar to that used for LA2–LA4.

The setup of the C Counter for searching purposes in the SA portion of MLC Memory corresponds exactly with the setup of the C Counter for searching in the LA portion of MLC Memory.

Referring to FIG. 78, it will be assumed that the Enter Alpha hub Exit has been wired to the SA2 hub 78.29. A +48 volt (+W) signal is applied to pin C of +OO 78.30 and to pin G of +O 78.19. The output of +OO 78.30 becomes —R, is converted by Convert block 78.21 to a +S level which is applied to pin Q of the +And 78.23. Not Start latch to pin R of 78.23 is also +S, so +And 78.23 supplies a —S signal which results in position 5B of the B Counter being set to its on state. The +Or 78.19 also supplies a —R signal on line 78.20 as well as to a Convert block 78.22. Block 78.22 supplies a +S signal to Power Inverter 78.24, the output of which becomes —S and sets position 6B of the B Counter to its on state. The —R level on line 78.20 is applied to the —CO block 76.23, converted to a +S, and applied to pin P of a +And 76.25.

The other input to +And 76.25 is a +S Not Start Latch. The +And 76.25 thereupon supplies a —S signal which results in setting trigger 3B of the B Counter to its on state.

Positions 1B, 2B, and 4B of the B Counter are kept in their off state by a —S DC Set 6B signal on line 76.27 which is applied at pins R of +And blocks 76.13, 76.24, and 76.15 to decondition them.

When the Start latch is set to its on state following the starting of electronics, the various —S signals that were provided for setting the required positions of the B Counter are returned to a +S level because of the Not Start latch line to the respective +And blocks going to a —S level. This permits the B Counter to step along and function in a normal manner with the exception that position 6B will remain on until it is DC reset. The B Counter is now set to the proper status for addressing word location 33 in MLC Memory.

In FIG. 78, it will be seen that the +48 volt signal to SA2 hub 78.29 is also supplied through a diode 78.31 to the LA2 line 78.32. This signal results in setting up the C Counter to a count level 14, which is the same as the count level that would be used for locating an LA2 word in MLC Memory.

If the SA1 hub 78.33 had been wired instead, a signal would be applied to Integrator 78.28 as for an LA1 selection. This would result in an immediate conditioning of the Address Located latch and the Holdover latch as previously described. In FIG. 71, the Q trigger 71.15 is used to recognize the end of SA Memory which corresponds to the last character location in word location 40 of MLC Memory. The clock conditions at End character time establish +S inputs to a +AA 71.16. When the B Counter reaches the status corresponding to the addressing of word location 40, all inputs of a +AA 71.17 are conditioned. This results in a —S level to pin N of the Q trigger 71.15 which sets it on. The output of the Q trigger is applied to pin U of a +N 48.19 in FIG. 48. The Magnetic Ledger Card operation line to Pin W is already at a +S level, so +And 48.19 supplies a —S output to +And 48.15. The output of +And 48.15 becomes +S to the —Or 48.18. The other input of —Or 48.18 is also +S at this time as a result of the Read or Record input to pin 5 of +AA 48.24 being at a —S level at this time. The output of —Or 48.18 thereby degates the Start trigger 48.10 by a —S signal to pin C of 48.10.

Entry of characters into the SA portion of MLC Memory takes place in a manner similar to that for the entry of characters into the LA portion of MLC Memory.

ALPHANUMERIC PRINT

As mentioned earlier, the expression "Print" refers to the printing of 6 bit alphanumeric characters that are stored in the MLC Memory. This contrasts with the "Type" command which refers to the operation of printing binary numeric information stored in Main memory or stored in the first part of the MLC memory. The alphanumeric characters are stored in Memory with the exact bit configuration required to actuate the Primary printer and the Ledger printer, either alone or together. Therefore, no translation is necessary in order to print alphanumeric information stored in Memory. It will be recalled that the binary numeric information, on the other hand, required a translation from its binary form to the 6 bit form in order to actuate the Primary and Ledger printers.

Ordinarily, the Alphanumeric Print operation is initiated under control of a Program Step Exit signal which is wired in the following manner:

(1) A Program Step Exit hub is wired to either or both of the Ledger Print and Primary Print hubs.

(2) The Program Step Exit hub is also wired to the hub Digit Capacity Variable.

(3) The Program Step Exit hub is wired to one of the LA Fields, LA1–LA9 or to one of the SA Fields, SA1–SA4.

In order to illustrate the Alphanumeric Print operation, it will be assumed that a Program Step Exit impulse is applied to the LA1 hub 78.27 in FIG. 78 and that it is also wired to the Digit Capacity Variable hub 88.30 in FIG. 88.

A +48 volt signal coming into the Digit Capacity Variable hub 88.30 results in a +S Print signal on line 88.34, a —S Not Print signal on line 88.35, and is also available at the Begin Alpha Common hub 88.15. The Begin Alpha Common hub 88.15 is then wired to one of the Begin Alpha hubs in FIG. 76 in order to set up the B Counter to the first alphanumeric word location in MLC Memory.

The B Counter is set up prior to the initiation of the Alphanumeric Print operation in a manner which is exactly like that for the Alphanumeric Entry operation previously described.

Referring to FIG. 89, the signal to the LA1 hub is applied to Pin B of a +And 89.17 and in conjunction with a +S Not Start latch to Pin D causes a —S signal at the output of +And 89.17. This sets the Address Located latch 89.10 and the Holdover latch 89.11 to their on state as described for Alphanumeric Entry.

The clock circuits of the machine are started as described for the Alphanumeric Entry operation at the beginning of Sign Bit time and the 5 bit locations in the first word of LA Memory are addressed. It will be recalled that these 5 bit locations comprise a Dummy Field Mark which is used to condition the machine for recognizing the fact that the variable length field LA1 has been located.

Referring to FIG. 84, the +S output of the Address Located latch is applied to pin P of a +And 84.20. The output of the +And 84.20 then comes under control of the 02 input to pin Q and with negative logic will be +S to a +AA block 84.21 whenever the 02 signal to pin Q of +And 84.20 is at a —S level, that is, when the 01/02 trigger is in its 01 state near the end of digit 4 time. A —Or 84.22 supplies a +S output to Pin L of +AA 84.21 since the Not Address Located input to Pin B is —S at this time. The +AA block 84.21 has its output combined with another +AA block 84.23 and the combined output will become —S upon the occurrence of clock conditions Read, C, Not D, and Y at the end of digit 4 time. This output is applied to a —Or block 84.16 and the output of —Or 84.16 becomes +S to gate R of the Intermediate trigger 84.15 which is set on upon the occurrence of the next Oscillator Sample pulse to pin S.

The Intermediate trigger 84.15 will remain on for 20 microseconds, being turned off at the end of that time by the next occurring Oscillator Sample Pulse. Ordinarily the C Counter would be stepped upon recognition of the Field Mark. This happened during the Alphanumeric Entry operation when the LA1 field was specified. Referring to FIG. 49, it will be recalled that the +And 49.23 was actuated in response to a Holdover signal and an Entry signal and supplies a —S input to the —Or 49.24. The output of the —Or 49.24 in turn to the +AA block 49.25 permitted the generation of a +S Turn Off Start trigger signal on line 49.10 when the five clock conditions to inputs 6, 7, and 8 of +AA 49.26 and inputs F and G of +AA 49.25 were satisfied at the end of the Dummy Field Mark interval, which is the end of digit four time in FIG. 17.

This time however, no output is available from the +And 49.23, and the clock comes under control of the End Character latch 49.29 which enables the clock to continue running for another six bit times or for one complete character time. Referring to FIG. 89, it will be observed that clock conditions A, D, and Read Delay to a +And 89.18 result in a —S to pin A of the Holdover latch 89.11 which resets it to its off state. Prior to this time, the Not Holdover output of 89.11 was —S and since this is applied to the M input of the Sample Pulse Driver 84.17, the Sample Pulse Driver 84.17 was degated during the previous character interval. As a consequence, no output was available from the Sample Pulse Driver 84.17 on line 84.14 and the C Counter was not stepped. Now however, the Holdover latch 89.11 has been turned off so that the Not Holdover output becomes +S. The Sample Pulse Driver 84.17 will then be gated and when the Intermediate trigger 84.15 comes on at the end of the First Significant character of information, Sample Pulse Driver 84.17 will supply a Step 1C pulse on line 84.14 which will turn position 1C of the C Counter to its on state.

The bits of information from memory are shifted into the Input/Output register in the following manner. A +And 93.15 has a Not Print line to pin F which is —S at this time. The output of +And 93.15 is therefore +S to pin 8 of the —Or 93.12. Pin 7 of —Or 93.12 has a +S Not Read Ledger at this time. This places the —Or 93.12 under control of the Storage trigger. The bits of information from the first significant character location are read from memory, stored in the Storage trigger, and transferred to I/O position 6 of the Input/Output register. The Fast Shift Gate and the Slow Shift Gate lines are active during this character interval so that the bits of information are shifted through the register from I/06 to I/01. At the End of Character time the Input/Output register will contain a complete information character or function character depending on what was read from memory.

At the end of this character interval, it is necessary to stop the electronics in order that the character stored in the Input/Output register may be printed. The stopping of electronics is under control of the End Character latch which, in turn, is under control of the C Counter. The status of the C Counter is such that position 1C is on and position 32C is off. This satisfies pins E and F of +And 49.31, and since the Address Located signal to pin D is also +S, the output of 49.31 becomes —S and turns on the End Character latch. The off side output of the End Character latch on line 49.30 becomes —S to the —Or block 49.24 which in turn generates a +S Print Gate signal to 49.32 and also establishes a +S Turn Off Start trigger signal on line 49.10.

In addition, the output of the —Or 49.24 is applied to a +And 49.33. The other inputs to this +And are a Read Delay clock signal, and the Print signal. +And 49.33 supplies a —S output during a Read Delay time of the current character interval which is inverted by Power Inverter 49.34 to become a +S Fire Alphanumeric Thyratron on line 49.35.

The character presently in the Input/Output register may represent either an informational character or a function character. It is necessary to distinguish between these two types of characters. The logic for doing this is shown in FIG. 103. The +And 103.10 has a +S input to pin U as a result of the Magnetic Ledger Card line being active. The other inputs to +And 103.10 are an I/O 3 signal from the Input/Output register and a Not I/O 6 from the Input/Output register. As evidenced in the code charts shown in FIG. 101, function characters are readily identifiable by the fact that they have a 1 in position 3 of the Input/Output register, and further that they do not have a 1 in position 6 of the Input/Output register. No other characters stored will satisfy this requirement. Therefore, whenever the character in the Input/Output register is a function character, the +And 103.10 supplies a —S output. This output is applied to an inverter 103.11 and becomes a +S Function output on line 103.15. This same output from 103.11 gates the +And 103.12 in order to signify the recognition, after inversion by 103.13, of a Field Mark on line 103.14. The output of +And 103.10 is also applied to pin T of a +And 103.16. The other input of this +And block is the Fire Alphanumeric Thyratron signal from the End Character latch. The +And 103.16 supplies a —S to a —Or block 103.17 whose output then becomes +S to a thyratron block 103.18 and a thyratron block 103.19. These thyratrons supply Check Primary and Check Ledger outputs, respectively. The presence of the six bit configuration for a "period" in the Input/Output register does not ordinarily result in any thyratrons firing or any rotation or tilting of the print head in the Primary printer or the Ledger printer and the +And 103.20 is provided in FIG. 103 in order to fire the thyratrons 103.18 and 103.19 and produce the "period" on the printer. The —S output of +And 103.10 will degate the Fire Alphanumeric Thyratron signal at +And 103.16 to prevent firing thyratrons 103.18 and 103.19 when a Function code is recognized.

Assuming now that the first character were a function character, the +S Function signal on line 103.15 would become available. This signal is applied to pin E of a +And 102.10. This +And provides a —S level when the Fire Alphanumeric Thyratron signal is present at pin F. This —S signal is inverted by Power-Inverter 102.11 to a +S signal which gates a number of connected +And circuits 102.12, 102.13, 102.14, and 102.15.

These +And circuits have other inputs from the Input/Output register and when the proper bit configurations exist in the Input/Output register, each circuit will supply signals through associated Inverter blocks 102.16, 102.17, 102.18, 102.19 to fire the thyratron which is related to the particular function then stored in the register. The functions shown in FIG. 102 include the Tabulate (tab), the Carrier Return (CR), the Upshift (US) and the Downshift (DS). The Space function is shown in FIG. 103. Since the condition I/O 3 and Not I/O 6 is common in the bit configurations of all of the function characters, these particular conditions are not involved in the gating of the function thyratrons.

The other type of character which may be stored in the Input/Output register is the information type character which requires selective rotation or tilting of the print head on the Primary printer or on the Ledger printer in order to be printed.

Figure 98:
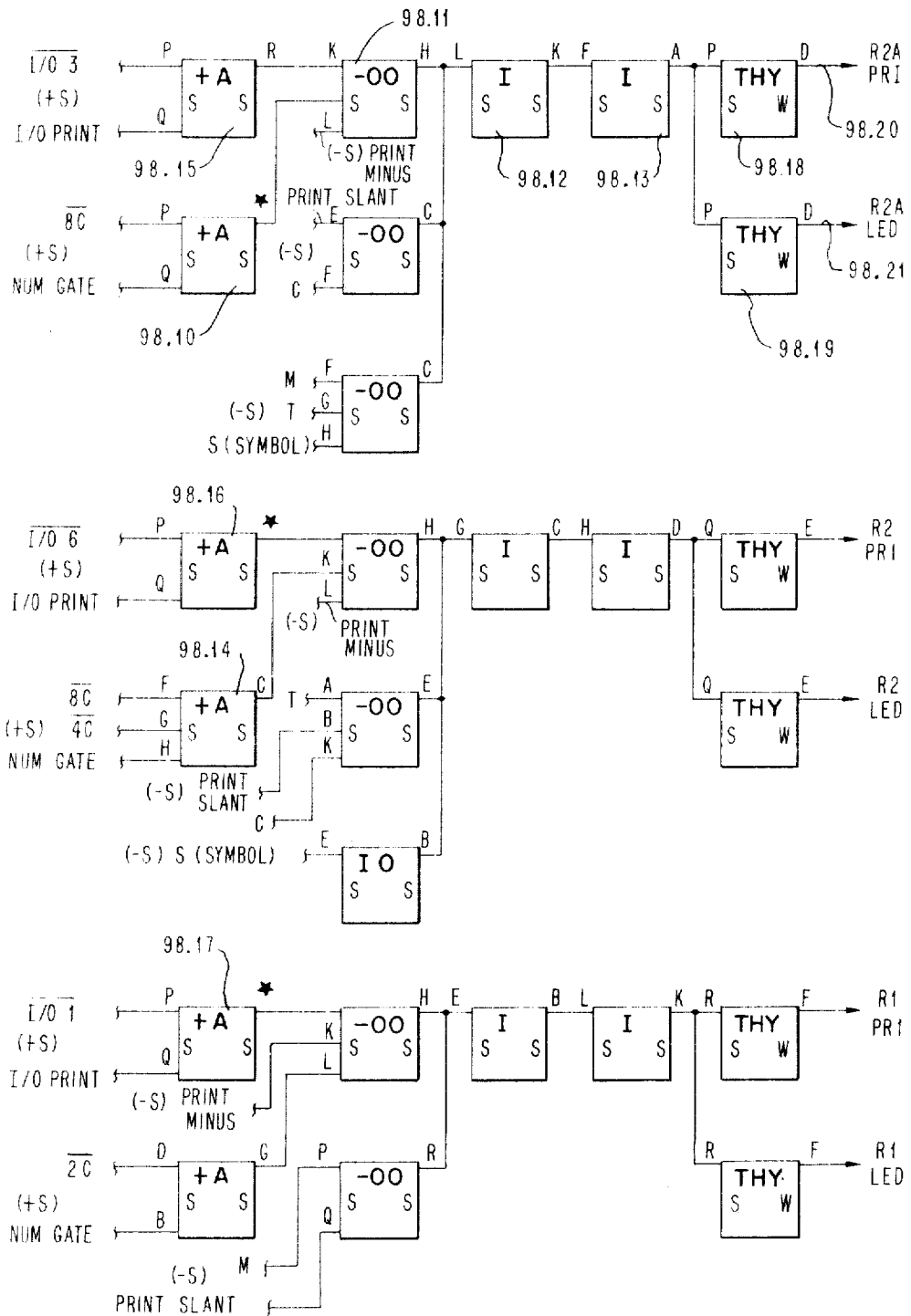
Figure 99:
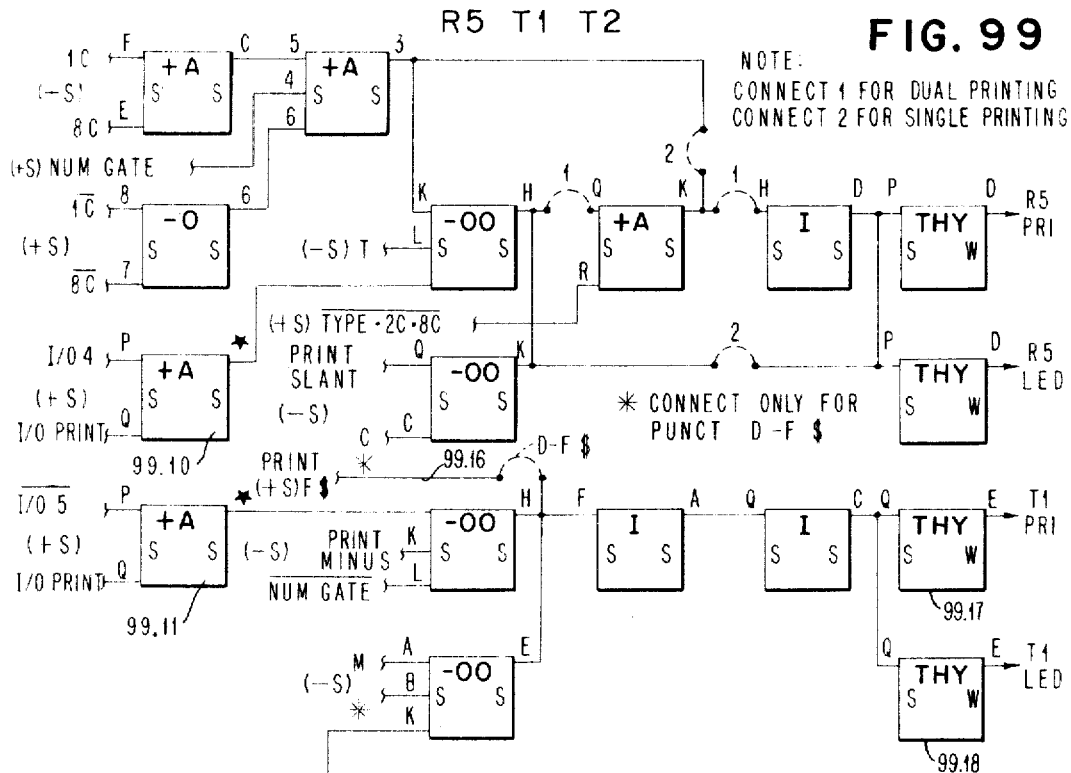

In FIG. 103, the absence of a function character in the Input/Output register results in a +S output from +And 103.10 to pin T of +And 103.21. The +And 103.21 is supplied with a Fire Alphanumeric Thyratrons +S signal at input Q, and in turn provides a —S level to an Inverter 103.22 which becomes a +S I/O Print on line 103.23. This line is connected to the Q inputs of a +And 99.10 and a +And 99.11. It is also applied to pin 7 of a +And 99.12. In FIG. 98, the I/O Print signal is applied to a +And 98.15, a +And 98.16, and a +And 98.17. The I/O Print signal thereby supplies a gating function for six sets of thyratrons which control the units of rotation and tilt required for selection of a character on the print head as indicated in the chart of FIG. 100. In FIG. 98, the thyratron 98.18 controls the R2A rotation of the print head on the Primary printer. The thyratron 98.19 controls the R2A rotation of the print head on the Ledger printer. Either one or both of these thyratrons will be energized if a proper 48 volt level exists on the respectively associated lines 98.20 and 98.21.

In this way, the appropriate thyratrons will be fired to actuate the printers for printing or for performing a function.

It will be recalled that during the Alphanumeric Entry operation, a predetermined time delay was established between successive characters, following the entry of the first character. Further importance of the delay will now be evident, when it is considered in connection with the Alphanumeric Print operation. Concurrently with the firing of the alphanumeric thyratrons just discussed, an Address Located signal and an End Character latch signal are at +S levels and are applied to pins 5 and 4 respectively of the +And 86.18. The +And 86.18 then supplies a —S output to a —Or block 86.19 whose output in turn is +S to pin Y of the trigger position 2C in the C Counter. This turns on position 2C by the collector pullover action described. Similar logic is connected to position 8C of the C Counter and turns it on also. In addition, the output of +And 87.10 in response to the Address Located signal and the End Character signal directly sets on position 16C and 32C in the C Counter. Therefore, immediately upon the stopping of the clock, positions 2C, 8C, 16C, 32C are turned on and the C Counter is thereby set to a count level of 58.

In order to establish the required time delay, the electronic circuits are started, as they were during Alphanumeric Entry, and the machine runs through a total of seven character cycles, six of which are designated idle cycles. During the Alphanumeric Entry operation previously discussed, the seventh character cycle was used to shift the contents of the Input/Output register into memory. Just the opposite action occurs during the Alphanumeric Print operation wherein the seventh cycle is used to shift the six bits comprising a character of information into the Input/Output register in order to fire the print and function thyratrons.

The initiation of the six idle cycles and the seventh transfer cycle is under control of the printers which first supply a +48 volt signal to the 64-4 N/C input of Integrator 48.11, and which later supply a +48 volt signal to the 64-4 N/O input of Integrator of 48.16 near the end of the print cycle which results from the firing of the thyratrons. Upon the occurrence of the later signal, the Start trigger will be turned on and the machine will begin cycling through memory. The C Counter is regularly stepped at the end of each character interval under control of the Intermediate trigger 84.15, receiving one stepping pulse from the line 84.14 at the end of each character time. Trigger position 1C therefore steps once at the end of each character time. At the end of these character times, because of the preset count level of 58, position 32C of the C Counter will have been turned off, and 64C will have been turned on.

Referring to FIG. 49, the fact that position 32C of the C Counter has been on degates +And 49.31 since a −S level will exist on the Not 32C line to pin F of +And 49.31 all during the time required to advance the C Counter from its initial setting of 58 to the setting of 64.

All during this time, the bits of information stored in the Storage trigger are transferred through the −Or 93.12 to position 6 of the Input/Output register and shifted from position 6 toward position 1. However, none of the thyratron circuits are gated during the six idle character times, so the contents of the Input/Output register are not used. From the discussion of the Alphanumeric Entry, it will be remembered that since each word in memory comprises six characters, stepping through memory an equivalent of 6 character intervals will result in the memory address being set up for the seventh character position which is the character required for printing. The bits of this character are shifted into the Input/Output register during the seventh character interval. Also during this interval the 1C position of the C Counter will be stepped under control of the Intermediate trigger, so that the C Counter now has 1C on and 64C on. This condition of the C Counter satisfies the inputs of +And 49.31 to the End Character latch 49.29 which turns on. The off side output of the End Character latch on line 49.30 becomes a −S to the −Or 49.24 and sets up conditions for turning off the electronics, determining whether the character is a function character or informational character, as well as gating and firing the alphanumeric thyratrons under control of the contents of the Input/Output register.

The selection, transfer, and printing of alphanumeric characters from the required LA field in MLC Memory continues in the manner described until the end of the selected field is reached. While the electronics is turned off, a −S Start Gate signal will exist on the line 49.28. This is fed to input C of a −Or 85.22 which then supplies a +S Step B Gate signal on line 85.24. If the character just transferred to the Input/Output register happens to be the sixth character of a word location in MLC Memory, the trigger 6A in the 1A−6A ring will be on. The Step B Gate, the 6A signal, and the Address Located signal to a +And 78.13 result in a −S output which establishes a B Sample pulse on 78.15 from a Sample Pulse Driver 78.10. This causes the B Counter to step to the next higher word location status at this time as scanning of memory proceeds.

Eventually a Field Mark will be encountered which represents the beginning of the next LA field in MLC Memory. This is combined with a +S Stop Gate signal from 49.22 which occurs at the End Character time, and also with a Print signal to a +And 104.21 which conditions a −Or 104.13. The −Or 104.13 supplies a +S on line 104.14. This is applied to a +And 104.16 to fire the Keyboard Restore thyratrons 104.19 and 104.20 and is also applied through a +And 104.22 to fire the thyratron 104.23 whose output enters FIG. 106 on line 106.10 and results in the energization of relay 57. Control of the machine is thereupon turned back to the relay and program circuits.

An Alphanumeric Print operation involving the LA fields 2 through 9 is somewhat different from an Alphanumeric Print operation from the field LA1. The wiring of the control panel is comparable to that just discussed. A +48 volt signal will occur at hub 88.30. This is directed through a series of logic blocks including an Integrator 88.31 and Inverter 88.32 and a −Or block 88.33 to establish a +S Print on line 88.34 and a +S Not Print on line 88.35 and a +S Entry or Print on line 88.36. The output of the −Or 88.33 directed through other logic causes a +S MLC Operation on line 88.27, the +S Type line 73.23 and the +S Not Type line 73.24 are deconditioned for a Print operation by the signal −S Not Print to pin Q of a +And 73.25.

If it is assumed that the LA3 field has been selected for an Alphanumeric Print operation, a +48 volt signal will be applied at the hubs 78.25 and on line 78.26 to an Or circuit 86.10 and another Or circuit 86.11 in FIG. 86. This results in positions 4C and 8C of the C Counter being set on which is the count level necessary in order to locate the LA field 3. The triggers in the C Counter will be set on under control of the Not Start latch signals to +And 86.14 and +And 86.15 which exist prior to the starting of electronics.

The B Counter will also have been set up as a result of the +48 volt signal from the Begin Alpha Common hub to the desired Begin Alpha hub which indicates the beginning of alphanumeric information. In FIG. 103, the signals Field Mark and Not Field Mark on lines 103.14 and 103.24 will become active as a result of an output from the +And 103.12 in response to the Field Mark bit configuration existing in the Input/Output register. The status of the register when the Field Mark is located therein establishes a +S level on the I/O 1 input to pin V of +And 103.12 and a +S level on the I/O 4 input to pin U of the +And 103.12.

Referring to FIG. 84, the Not Address Located line to −Or 84.22 is +S at this time since the required address has not been located. The Not Field Mark line is normally +S as long as a Field Mark is not encountered in the Input/Output register. Upon the recognition of a Field Mark however, the Not Field Mark line becomes a −S to the −Or 84.22 which then supplies a +S to pin L of +AA 84.21. This conditions the +AA 84.21 and +AA 84.23 to provide a −S output to pin Y of the −Or 84.16 when the appropriate clock time is reached. The duration of the signal to −Or 84.16 is 40 microseconds or four Oscillator Sample Pulses. The Intermediate trigger 84.15 is turned on, off, on, and then off in response to the four Oscillator Sample Pulses. This results in two stepping pulses on line 84.14 which are applied to trigger position 1C of the C Counter. This happens each and every time that a Field Mark is recognized.

The stepping of the C Counter will continue until the C Counter reaches a count level of 16 at which time the Address Located and Holdover latches will be turned on, as before. The clock continues to run for one more character time after the final Field Mark has been recognized in order to shift the bits of a character from memory into the Input/Output register. The clock is stopped when the End Character latch is turned on in FIG. 49 with a C Counter setting of 1C, Not 32C, and Address Located.

The B Counter is stepped at the end of the sixth character in each word location of memory in order to establish the proper driver and switch combinations for word selection. The stepping pulse is normally derived from line 78.15 under control of a +And 78.14. However, if the Field Mark is encountered in the sixth character position of a word location, the +And 78.14 becomes ineffective, and +And 78.13 is used instead. This +And is under control of a Step B Gate that is derived from line 85.24 in response to an output from a +And 85.23.

ALPHANUMERIC PRINT FROM SA MEMORY

In order to print alphanumeric information from one of the semi permanent fields SA1–SA4, the control panel is wired in a similar fashion to that for an Alphanumeric Entry into this area of MLC Memory. The Print operation will be wired instead of the Enter Alpha operation. The B Counter is set up to begin addressing MLC Memory at word location 33 just as for an Alphanumeric Entry. The searching and printing out of the SA memory proceeds in a manner comparable to that which occurred during the print out of LA memory.

LEDGER OPERATIONS

In the preferred embodiment of the invention, the system is provided with the magnetic ledger card unit 2.16 in FIG. 2. An important feature of a system with a ledger unit of this kind is that several different kinds of ledger cards can be initially prepared or updated during the course of preparation of a primary document. If the machine is programmed for the preparation of invoices to be sent to individual customers for example, accounts receivable ledger cards pertaining to each customer, as well as inventory cards, can be utilized at predetermined points in the program in an expeditious manner.

Three magnetic ledger cards which are typical of those that might be encountered during the preparation of a particular invoice are illustrated in FIGS. 3a, 3b, and 3c.

Ledger cards 3.10 is an accounts receivable card, and ledger cards 3.11 and 3.12 are inventory cards. Ledger card 3.10 has information visibly printed thereon such as account number, customer name and address, shipping and tax information, as well as a running record of transactions with the customer involved.

Ledger card 3.11 contains information relating to inventory item number 3017 which is a shirt of a particular size and style. Ledger card 3.12 similarly contains information concerning inventory item 1559.

Portions of the visibly printed information on ledger card 3.10, such as account number, customer name and address, shipping information, tax, and the last recorded balance are also stored in a magnetically recognizable form on a magnetic stripe 3.13. The other cards 3.11 and 3.12 have similar magnetic stripes, not shown, which are used for storing the information on each card.

For convenience, the magnetic ledger stripe 3.13 is positioned near the lower edge of the card and on the reverse side. Also the stripe 3.13 has a longitudinal dimension extending completely across the width of the card which is greater than the vertical dimension of the stripe. Only one magnetic stripe is shown in this instance, but a plurality of contiguous stripes positioned either on the front of the card or on the reverse side could be provided for the storage of information.

FIGS. 4a and 4b illustrate various dimensional relationships of the magnetic stripe as well as typical bit configurations used for the storage of information. FIG. 4a represents the first portion of the magnetic stripe encountered during a Reading or Recording operation and is broken at 4.10. The latter portion of the stripe is shown in FIG. 4b beginning at a point 4.11. It will be understood that a great number of characters are stored in the portion of the stripe between 4.10 and 4.11, not shown.

The unit 2.16 has a slot 2.20 for receiving an individual ledger card inserted by the operator of the machine. When a card is inserted in unit 2.16 it is automatically positioned at a first station for reading the contents of the magnetic stripe, and is then positioned with respect to the ledger printer at a second station for the printing of information. Since it is usually necessary to print a new account balance and transaction reference, such as the transaction of April 27, 1962 shown on the ledger card 3.10, each card has perforations therein, such as perforations 3.14 which are sensed by the unit 2.16 and which determine the proper positioning of the ledger card at the second station in order to print the current transaction on a new line. The sensing mechanism for sensing apertures 3.14 in unit 2.16 is displaced vertically from the printing line desired, thus explaining the linear displacement between the last aperture 3.14 and the next printing line. Information developed according to the program in use is printed on the ledger card, at which time the card is then automatically returned to the first station in order that the information previously read from the stripe may be recorded on the stripe either unmodified or updated, depending on the program. Upon the completion of the recording operation and a related checking operation, the ledger card is automatically ejected and projects from the slot 2.20 for easy removal by the operator.

The mechanical ledger card handling, feeding, positioning, and ejecting aspects of the unit 2.16 are fully covered in the aforementioned application Serial No. 248,117, entitled Ledger Card Handling Mechanism, C. S. Jenkins, et al. Bits of information and control bits are arranged in a coded manner on the magnetic stripe of FIGS. 4a and 4b in four channels. When a card has been properly positioned at the first station in the unit 2.16, the magnetic stripe is scanned for reading, recording, and checking purposes by a set of four read heads, and a set of four recording, or writing heads. Each track on the stripe has an associated read head and record head. The head scanning mechanism is not shown herein, but the individual read and write heads are illustrated in FIG. 91 for circuit discussion purposes. Scanning of the stripe begins at point 4.12 in FIG. 4a and terminates at 4.13 in FIG. 4b with individual bits from each of the four channels being read or recorded in parallel.

The information stored on the magnetic stripe is an exact image of the words 1–32 of MLC memory, including all binary numeric words in the first portion of MLC Memory as well as all alphanumeric characters in those word locations. None of the alphanumeric characters stored in the SA portion of MLC Memory, SA1–SA4 are involved in a Read Ledger or Record Ledger operation. Every character configuration, whether informational, functional, or control in nature is stored on the magnetic stripe.

The first part of the magnetic stripe is reserved for the indication of certain scanning conditions and the last portion of the stripe is similarly recorded. For example, a certain amount of time is required for the scanning mechanism to pick up speed in order to read or record properly. For this purpose, the first blank portion of the stripe includes times required for an On track switch closure, indicated at 4.14, a First Pre-run cycle as indicated between line 4.14 and line 4.15, and a Second Pre-run cycle as indicated between lines 4.15 and 4.16. Recording of the stripe will begin only after the time required for these preliminary operations has expired. The last portion of the stripe includes Stop symbols 4.17 which are automatically recorded for control purposes.

In contrast with the six bit character configuration used in the LA Memory and the SA Memory, the individual sets of bits of the stripe consist of 3 bits of information along with a check bit where required for odd parity checking. Three informational bits from one set of bits can be combined with three informational bits from another set of bits to form a six bit character, thereby establishing compatibility between the bit configuration on the stripe and the bit configuration used in the magnetic memory of the machine.

Since each word in memory contains 36 bits, word locations 1–32 in MLC Memory will contain a total of 1,152 bits of information, comprising 192 characters of 6 bits each, if none of the words are used for binary information. These are recorded on the magnetic stripe as 384 half-characters of 3 bits each. Each half-character or set of 3 bits is accompanied by a check bit as mentioned.

During a Record Ledger operation, the individual 6 bit characters from MLC Memory are transferred in succession to the Input/Output register, and subsequently recorded on the stripe as individual sets of 3 bits, each accompanied by the check bit. During a Reading operation, the converse is true. That is, the individual sets of 3 bits recorded on the stripe are transferred to the Input/Output register and then written into the MLC Memory in such a way that valid 6 bit characters are formed from the individual sets of 3 bits each from the magnetic stripe. Bits of information are shifted into and out of the Input/Output register, but some important differences exist in the shifting control required for Read Ledger or Record Ledger operation when contrasted with the Alphanumeric Entry and Alphanumeric Print operations previously described. These differences will be discussed in detail shortly. During a Read Ledger operation, as the individual sets of bits are read from the ledger card stripe, the fourth bit position in each set is applied to a parity circiut for checking purposes.

In order to simplify the understanding of the Record Ledger operation and the Read Ledger operation, brief summaries of these operation will first be given.

*Summary Of Record Ledger Operation*

Briefly, the Record Ledger operation includes the following steps:

(1) Prior to initiation, the B Counter is reset with all positions in the off state.

(2) Closure of the On Track switch initiates one complete idle cycle by the clock. At the end of this idle cycle, the B Counter is advanced. At this time, the C Counter is also preset to a count level of 10 in order to establish a predetermined Write delay.

(3) Additional delay is provided by a Second Pre-run cycle in order to insure proper scanning speed and as a consequence proper Read/Write spacing. At the end of this cycle, the B Counter is again advanced and is in a proper status for addressing word location 1 in MLC memory.

(4) Three bits of information are shifted into the Input/Output register from the MLC Memory and are accompanied by generation of a check bit.

(5) A predetermined amount of Write Delay time is established under control of the C Counter.

(6) The first three bits of information from MLC Memory together with the associated check bit are written on the Magnetic Stripe and another three bits are read from memory into the Input/Output register accompanied again by appropriate checking. Write delay under control of the C Counter and Writing takes place as before.

(7) When the last bit of the 32nd word of LA memory is read, the fact that the end of LA Memory has been reached is recognized.

(8) A predetermined number of Stop symbols is recorded, such as symbols 4.17.

(9) The contents of the ledger stripe just recorded are read for checking purposes.

*Summary Of Read Ledger Operation*

The Read Ledger operation is somewhat similar to the Record Ledger operation and includes the following steps:

(1) Closure of the On Track switch results in setting the Position latch, FIG. 89, and the clock circuits will run for one full idle cycle and one abbreviated idle cycle. This abbreviated cycle is produced by stepping the 1A–6A counter at the beginning of each X time rather than at the beginning of every sixth X time. The reason for this is to insure that a reading operation starts about 5 milliseconds ahead of a recovering operation in order that the first recorded bits of information are not lost.

(2) The B Counter is stepped at the end of each idle cycle in order to be correctly set up for addressing the first word of MLC memory.

(3) The first bit of information recognized controls the C Counter in such a manner that it will time out a particular character interval designated Character Gate. At the end of this time, all bits of the first set of bits should have been received in the Input/Output register.

(4) When the C Counter times out, the clock is again started and the three bits of information just received are shifted by the first three oscillator pulses so that they now are positioned in the last three trigger locations of the Input/Output register. As the data is shifted, a check is made for odd redundancy.

(5) As soon as a shifting of the set of three bits is completed, the Character Gate is again set up under control of the C Counter in order that the next set of three information bits and the associated redundancy bit may be received in the Input/Output register. Also the last three positions of the I/O register are shifted during three bit time intervals into memory, at which time the clock stops.

(6) The Stop symbols at the end of the magnetic stripe are recognized as the head nears the end of its scan, the electronics is reset, and the magnetic ledger unit supplies an impulse which results in the initiation of the following program step.

The ledger cards, such as ledger card 3.10 may be preprinted or pre-recorded with certain of the significant information, such as customer name and address, account number, and other similar information. This applies also to the inventory cards 3.11 and 3.12.

Ordinarily, however, each ledger card will be printed and recorded initially by a loading routine. During the routine, the ledger card can be inserted in the forms handling device of the Primary printer and the visible printed information can then be printed on the card concurrently with an Alphanumeric Entry operation into MLC Memory. The desired area of LA memory for the storage of binary numeric and alphanumeric information is determined as usual under control of the Begin Alpha circuits. After the required information has been stored in MLC Memory, the newly printed card can then thereafter be visually checked, removed from the Primary printer, inserted in the ledger card handling unit 2.16 and have the corresponding information from MLC Memory transferred to its magnetic stripe by a Record operation.

Once the loading routine has been completed, the card can then be removed and placed in a file of similar cards for use in a normal program routine shortly after its preparation, or at some future date.

Upon completion of the initial loading routine, each card required in an accounting application will then have visible printed information, as well as magnetically stored information which is primarily permanent in nature, but which can be altered as required as the card is used in future program sequences.

From the standpoint of efficiency, all accounts receivable cards, all inventory cards, and all other types of cards required during a particular program routine would usually be prepared as a group, in order that the particular program routine in which the cards are involved would not be interrupted unnecessarily to prepare individual accounts receivable cards, or inventory cards during the course of the operation. Once, the entire group of cards has been prepared by the loading routine, the use of the loading routine thereafter should be infrequent, since the only time that it would be necessary would be to prepare accounts receivable cards for new customers, or to prepare inventory cards for newly stocked items of inventory.

During the normal course of a typical program or accounting application, sequence, such as the preparation of the invoices previously indicated, the accounts receivable cards as well as the inventory cards would already have been preprinted and have been magnetically recorded for use during the sequence.

In the typical sequence therefore, the usual order of events is that the ledger card required at a particular step of the program is inserted in the ledger card unit 2.16, the card is positioned at the first station, the contents of its magnetic stripe are transferred into MLC Memory during a Read Ledger operation, and the card is then fed to the second station for a printing operation as required. Following this, various program operations will be carried out automatically by the machine, the ledger card will then be returned to the first station and the contents of MLC Memory will be transferred back to the Magnetic Stripe by a Record Ledger operation. A subsequent scan of the stripe is made in order to check that the information just recorded is accurate. The card would then usually be ejected from the magnetic ledger card unit 2.16.

For this reason, and in order to illustrate the actions of the system in a typical sequence, a Read Ledger operation will then be described.

It will be understood of course that the ledger card would have been recorded prior to its insertion in the ledger card unit during the previously mentioned loading routine which involves a Record Ledger operation that is identical to the Record Ledger operation to be described.

READ LEDGER OPERATION

After the ledger card is inserted into the magnetic ledger card unit 2.16 it is aligned and driven to the Read/Record station. This occurs in a manner described in the aforementioned copending application Serial No. 248,117, to C. S. Jenkins, et al.

Normally, just prior to the start of a Read Ledger operation, the machine is in a Keyboard Numeric Entry mode. Following the proper feeding and alignment of the card to the Read/Record station in the ledger card unit, a signal indicating this fact is made available to a line 88.37. This signal is applied to an Integrator 88.38 and through a switch designated Start to an Integrator 88.10. The output of the Integrator 88.10 is applied through Power Inverters 88.11 and 88.12 to produce −S Keyboard Entry signal and a +S Not Keyboard Entry signal. These signals are used to take the machine out of the Keyboard Entry mode.

The Not Keyboard Entry line is used to set a First Pre-run Cycle latch 90.10 to its on state.

The output of Integrator 88.38 is applied through a Power Inverter 88.39 to an Inverter 88.40 and a Power Inverter 88.41 to develop a −R Read Ledger signal. The output of Power Inverter 88.39 also creates a +S Read Ledger signal from Power Inverter 88.42 on line 88.43 and a +S Not Read Ledger signal on the line 88.44.

The output Power Inverter of 88.39 is also applied to pin 8 of a −Or 88.45 to develop a +S Read or Record signal on line 88.46. The output of Power Inverter 88.39 is also applied to the −Or 88.24, 88.25 and Power Inverter 88.26 to set up +S MLC operation and −S Not MLC operation signals.

Referring to FIG. 89, as the magnetic head in the ledger card unit 2.16 reaches the point on the magnetic stripe designated On Track, previously mentioned, a +48 volt signal will be supplied on line 89.20 to an Integrator 89.21. The output of Integrator 89.21 is applied to one input of a +And 89.22. The output of +And 89.22 then becomes −S which sets a Position latch 89.23 to its on state. The Position latch supplies a +S Position latch signal on line 89.24 and also a −S Not Position latch signal 89.25 through an Emitter Follower 89.26.

Referring to FIG. 87, the +S Not Position latch is applied through an Inverter 87.13 as a −S Signal to pin Y of trigger 32C of the C Counter thereby setting it to its on state.

In FIG. 48, the +S 32C output from the position 32C trigger is applied to pin 7 of a 32C Start latch designated 48.25. This sets latch 48.25 so that its output to pin 6 of +AA 48.24 is +S. The other inputs to +AA 48.26 are also +S at this time. Therefore the combined outputs of 48.26 and 48.24 is −S. This is applied to pin Q of the Start Trigger Gate latch 48.17 and also to pin Y of a −Or 48.18. As a consequence, the latch 48.17 provides a +S signal to pin B of the Start trigger 48.10, the −Or 48.18 also supplies a +S to the Start trigger 48.10, and a Start trigger will turn on upon the occurrence of the next Oscillator Sample Pulse to pins F.

With the turning on of the Start trigger 48.10, the clock circuits of the machine will begin stepping through their predetermined sequences and electronics can be considered to have started.

Figure 95:
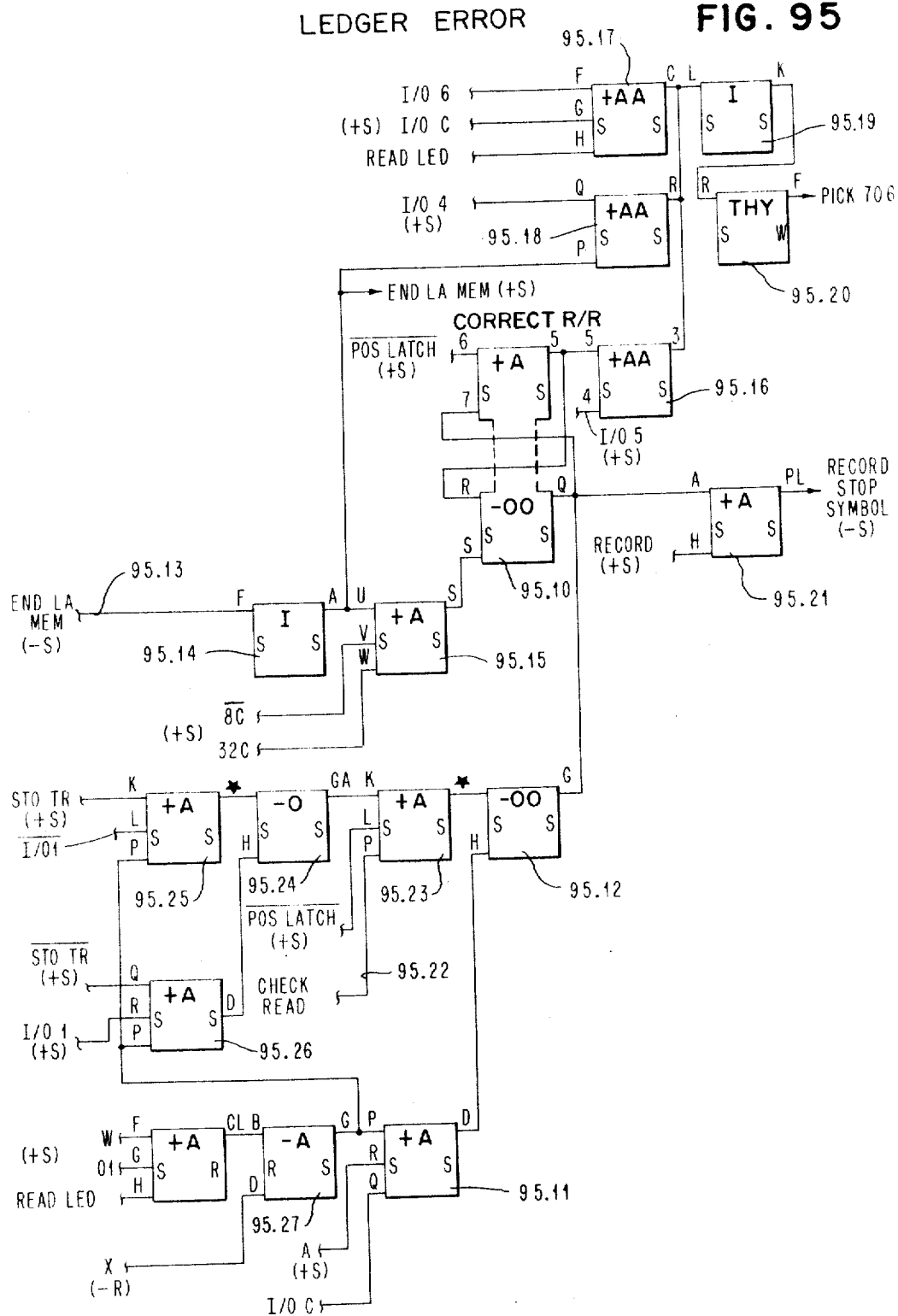

Prior to the start of electronics, and upon the occurrence of the Position latch being set on, a +S Position latch signal is applied to a Correct Read/Record latch 95.10 FIG. 95, to set it in its on state.

The clock will run through a complete word cycle comprising 36 bit times. The primary purpose of running the clock in this manner is to step the B Counter from its completely reset condition to a status which will enable the addressing of word location 1 in MLC Memory. It will be necessary to step the B counter twice in order to reach this status.

Another purpose for running the clock circuits is to produce predetermined delays which will allow various relay contacts to completely make or break and to settle down before the bits of information from the magnetic ledger stripe are read.

The clock will first be run through a normal 1A–6A cycle and later will run through an abbreviated cycle which comprises six bit times rather than 36 bit times.

Referring to FIG. 78, a +And block 78.14 has an MLC operation input to pin Y and a Not Address Located to input pin Z. These are +S at this time. At the very end of the normal clock cycle currently in progress, the other input to +And 78.14 will also become +S with a 6A, C, D, Y, Write, and 02 clock condition. This results in a −S to the −Or 78.12 which in turn gates the AC input of the Sample Pulse Driver 78.10 thereby producing a B Sample pulse on line 78.15. This is applied on line 82.11 and turns position 1B of the B counter to its on state. This status of the B counter is not shown in the table of FIG. 77 but does occur just prior to the first status tabulation shown in FIG. 77.

In addition to the development of the B Sample pulse on line 82.11, it is necessary that the 1B position be gated by a +S level on the B Counter Advance Gate line 82.10. This will exist if the corresponding lines 79.10 and 80.10 are at +S levels, which is the case at this time. The condition of the last mentioned lines 79.10 and 80.10 will remain +S throughout the Read operation.

It will be recalled that the clock always starts at the end of Dummy Digit time, regardless of the operation. Therefore the various clock conditions that exist during Dummy Digit time are not available until the clock has gone completely through a word cycle and has begun the second word cycle.

In addition to stepping the B counter at the end of the second abbreviated cycle, it is necessary that certain other circuit functions take place. At the beginning of the second cycle, the +S 1A, A, D, and Read Delay clock conditions on line 90.11 will be satisfied and will turn off the First Pre-run Cycle latch 90.10. The Position latch 89.23 will now be conditioned under control of a +And 89.27 for turning off late in the second cycle.

In order to step the clock completely through a 1A–6A abbreviated cycle in only six bit times, the 1A–6A ring, FIG. 53, is stepped under control of the Sample Pulse Driver 53.16 at each X time. Noting a +And 53.19, +S levels will exist on all three inputs which are Position latch, 1B, and Read Ledger. +And 53.19 supplies a —S output to +And 53.17, thereby deconditioning it so it will supply a +S level to pin M of Sample Pulse Driver 53.16. This enables the X pulses on the line 53.20 to step the 1A–6A ring completely through its sequence in only 6 bit times.

Reference is now made to FIG. 86. Early in the abbreviated Second cycle, the clock conditions A, X, and Read to input B of a +And 86.22 will be satisfied. Also, the Read or Record input to +And 86.22 is +S at this time, resulting in a —S output to pin X thereby setting the 2C trigger to its on state. Also, in FIG. 86 is a +And 86.23 which receives similar inputs and which sets the 8C trigger to its on state. Position 32C of the C counter was set in its on state previously through Inverter 87.13 when the Position latch came on. Position 32C of the C counter will shortly be turned off upon recognition of the first bit of information from the magnetic ledger stripe. Until that time the status of the C Counter remains as it is now with 2C on, 8C on, and 32C on.

The clock runs rapidly through the abbreviated cycle and finally reaches the condition 6A, C, D, Y, Write, and 02. At this time, —R levels exist to pins D and B of a —And 89.28 which in conjunction with a +S Not First Pre-run cycle results in a signal which turns off the Position latch 89.23. Also, the same clock conditions result in the generation of the B Sample pulse from +And 78.14, —Or 78.12 and Sample Pulse Driver 78.10. The B Counter is thereby stepped to the status shown in the second line of the table of FIG. 77. Position 1B was previously on in the B Counter and the +S 1B signal to pin E of +And 82.12 in conjunction with the B Counter Advance Gate 82.10 results in setting position 2B of the B Counter on. Concurrently with 2B coming on, position 1B will turn off under control of the same +S B Counter Advance Gate on line 82.10. Observation of the table in FIG. 77 will show that the B Counter is now in a state for addressing word location 1 of MLC Memory. The proper word driver and read/write switch combinations are thereafter selected by the B Counter in a manner similar to that previously described.

It is also necessary at this time to turn off the Start trigger in order to stop the electronics. This occurs in FIG. 49 where a +S Read Ledger, 1B and 6A are applied to a +And 49.38. The latter has a +S Read signal to its pin S, and will have another +S level to pin T at C time of the abbreviated cycle. +And 49.38 then provides a —S level to pin W of a —Or 49.20 which in turn conditions the lower input of a +AA 49.13. The other inputs of this +AA block, as well as the +AA 49.14 below it will be satisfied at this time, thereby resulting in a —S level to a —OO block 49.12, and as a consequence, a +S Turn Off Start Trigger signal on line 49.10. This is applied in the usual manner on the line 48.20 to turn off the Start trigger 48.10.

Conditions have now been established in the machine for the receipt of the first set of bits from the magnetic ledger stripe. The head continues its scan and shortly at least one bit is recognized by one of the four heads 91.10–91.13. Any bit recognized will produce a voltage in the associated head which is then amplified and shaped by the associated amplifier and shaper block in FIG. 91. The outputs of shapers 1, 2, and 3, are directed to —AO blocks in FIG. 93 which, in turn, control the pullover inputs of Input/Output register positions 4, 5, and 6 respectively. The output of the shaper C is applied to a —And 94.20 and controls the Pullover input of the Input/Output register Check trigger. The —AO blocks involved for shapers 1, 2, and 3 are designated 93.22, 93.23, and 93.24. These blocks and the —And 94.20 are individually gated by Read Ledger inputs. In FIG. 87, two —OO blocks 87.14 and 87.15 each have inputs from two of the register positions just mentioned. Therefore, if any of the register positions has been set to its on state, the combined outputs of —OO 87.14 and 87.15 becomes +S to pin P of a +And 87.16. The input clock conditions to +And 87.17 of A, X, and Read, are not satisfied at this time since the clock was stopped at 6A, C, D, Y, Write and 02 time. The output of 87.17, therefore, is a +S to pin R of +And 87.16. The output of +And 87.16 becomes —S to a —Or block 87.18. The output of the —Or 87.18, is inverted by Invert block 87.19 and applied to pin P of the 32C trigger 87.12, thereby turning it off.

At this time, conditions are established for stepping the C Counter from its current count status of 10, which is 2C on and 8C on, to a count level of 32 in order to derive a character gate of a predetermined duration.

The pulses for stepping the C Counter are developed in FIG. 84 on line 84.14. A +And 84.19 has three inputs including a +S Not First Pre-run cycle and a +S Read or Record. These inputs are +S at this time. As soon as position 32C of the C Counter is turned off, the other input Not 32C becomes a +S, thereby conditioning all inputs of +And 84.19. The output of +And 84.19 becomes —S to a —Or 84.16 which then gates an Intermediate trigger 84.15. The Intermediate trigger is then set to its on state upon the occurrence of the next Oscillator Sample Pulse to pins S. The output of the Intermediate trigger 84.15 controls a Sample Pulse Driver 84.17 which is presently gated by a +S Not Holdover line to pin M. The Intermediate trigger 84.15 is gated in a binary fashion so that it turns on and off in response to the Oscillator Sample pulses to pins R and T so long as it is gated. The Intermediate trigger will thereupon supply a pulse to the Sample Pulse Driver 84.17 upon the occurrence of every other Oscillator Sample Pulse, and this results in the production of Step 1C pulses on line 84.14 every twenty microseconds.

The stepping pulses on line 84.14 are applied to position 1C of the C Counter and since the C Counter was set to a count level of 10, 22 stepping pulses will require 440 microseconds of machine clock running time. Referring to FIG. 48, the 32C Start latch 48.25 was restored to its off condition previously by a +S Not Start signal to pin F. Now upon the position 32C trigger in the C Counter turning on after the 22 count intervals, the 32C Start Latch 48.25 is again turned on. This results in a +S to pin 6 of the +AA 48.24. The other inputs of the +AA 48.26 and the +AA 48.24 are satisfied so that their combined output becomes —S to pin Q of the Start Trigger Gate latch 48.17 and to pin Y of the —Or 48.18, thereby turning the Start trigger 48.10 on.

Referring to FIG. 87, as soon as the electronics starts, the clock conditions A, X, annd Read to +And 87.17 will be +S, dropping its output to a —S which is then applied to pin R of +And 87.16. This degates the resetting input to pin P of the 32C trigger 87.12, so 32C will remain on.

In FIG. 55, the X and Read inputs to +And 55.16 and its output to +AA 55.12 as well as the other input conditions to +AA 55.12 and +AA 55.34 will result in a —S input to the —Or 55.11 in order to set up a —R output from Power Inverter 55.10 on line 55.15 for driver selection. In order to get the —R level required for X time switch selection on line 55.28, it is necessary to condition —OO 55.21 to drive Power Inverter 55.27. An input to —OO 55.21 is derived from the combined outputs of +AA 55.19 and +AA 55.24. Pin 2 of +AA 55.19 has a +S as a result of the +And 55.17 having a —S on the Divide line, among others. Pin 1 of +AA 55.19 has a +S from the Not Type line. The pin Z has a +S on the Not Complement line. Referring to +AA 55.24, pin 4 has a +S from +And 55.22 as a result of the —S on the Multiply input to pin 2. Pin 6 of +AA 55.24 has a +S as a result of the +S input on the Subtract line to pin 7 of +And 55.23. Pin 5 of +AA 55.24 is conditioned at X Read time as was pin H of +AA 55.12.

At A time, X Time, Read Time, of the clock, whatever was stored in the first bit location of MLC Memory will be read out to the Storage trigger. However, since this is a Read Ledger operation, the driver and switch selection circuits will be conditioned during Write only by bits of information that are provided by I/O 1 of the Input/Output register, and the Storage trigger contents will have no effect during a Write operation.

While the clock is in A, X, Read Time, it is necessary to shift the newly entered bits of information from positions 4, 5, and 6 of the Input/Output register into positions 1, 2, and 3 of the Input/Output register. This shifting operation takes place at a fast rate. The bit stored in I/O 1 is written into memory, and two shifts take place at a slow rate in order to transfer the bits from positions 2 and 3 into position 1 for writing into memory.

The circuitry for producing the Slow Shift Gate pulses and the Fast Shift Gate pulses is shown in FIG. 94. Certain of the clock timing conditions involved can be observed in FIG. 17 of the timing chart. The clock time selected for this fast shift operation is A time during which three Oscillator Sample Pulses are used for the necessary three fast shift operations from positions 4, 5, and 6 of the Input/Output register to positions 1, 2, and 3. The exact interval during A time during which the three pulses are produced comprises the period Read Delay plus the additional period between the end of Read Delay and the beginning of Write time. Referring to FIG. 94, the Fast Shift Gate pulses are supplied on a line 94.11 from a —And 94.18. It is necessary that all three inputs of this —And 94.18 have a —R level applied to them in order to derive the necessary output gating pulse. A —R input to pin Q is available from a +And 94.16 as a result of +S levels on the X and R lines to pins H and F, as well as the +S from the —Or 94.15 as a result of the —S on the Entry line. A —R level is also present at pin N of —And 94.18 from Convert block 94.21. Convert 94.21 receives a +S from a —OR 94.22 as a result of a —S input to pin Y. This is supplied by +And 94.23 which has +S inputs on all three of the lines A, X, and Read. The final input to —And 94.18 is at pin P and is under control of +AO block 94.13 and a +AO 94.14.

Two-thirds of the gating interval is provided under control of the +AO 94.14 which supplies a —R to pin T of —And 94.18 during the clock interval Read Delay which conditions pin K of +AO 94.14 at a +S level. The other inputs of +AO 94.14, that is, the A clock time to pin A and the Read Ledger to pin B will also be +S. One-third of the gating interval is provided under control of the +AO 94.13 which supplies a —R level to pin T of the —And 94.18 during the interval when Not Read Delay is +S and the clock timing 02 is +S. The other pin M has a +S as a result of +AA 94.19 and IA 94.12 being deconditioned.

It will be noted that the —And 94.17 will also be conditioned for this interval and will supply a Slow Shift Gate +S level on line 94.10.

Referring to FIGS. 92 and 93, it will be noted that I/O 1 and I/O 2 of the Input/Output register are conditioned for shifting by the +S Slow Shift Gate input on line 92.19. I/O 3 position of the Input/Output register is conditioned by the Fast Shift Gate signal to pin U and pin R. In FIG. 93, the Fast Shift Gate signal on line 93.25 controls shifting in positions 4, 5, and 6 of the Input/Output register. Position 1 of the Input/Output register not only has the Slow Shift Gate applied to pins R and U, but also has a +S signal to pin Q when I/O 2 is in its on state and a +S level to pin T when I/O 2 is in its off state. The change in state, if any, in any position of the register is controlled in this manner by the next higher order position in the register. Each lower order trigger in the register will assume the condition of the next higher order trigger with every Oscillator Sample pulse as long as the Shift Gates remain in the +S condition.

Following the fast shift operation, the bit in I/O 1 of the Input/Output register is written into the first bit location in memory under control of clock conditions A, X, and Write.

The gating of the Fixed Factor Driver Select line 55.15 and the X time Switch Select line 55.28 occurs under control of a +And 55.14. This +And has pin 8 at a +S level from —Or 55.33 as a result of a —S input to pin R from a +And 55.31 which is conditioned on all of its inputs Read Ledger, Not Check Read, and Not Position latch. The other inputs to +And 55.14 are X clock time to pin 6 and +S I/O 1 from the Input/Output register to pin 7.

Following the writing of the first bit at clock times A, X, and Write, it is necessary for the contents of the Input/Output register to be shifted once more toward position 1, in order that the bit stored in position 2 of the register can be written into memory.

In FIG. 94, the Fast Shift Gate line 94.11 is deconditioned since the clock A time to pin Z of the +And 94.23 is down at this time. The output of 94.23 is +S to the —Or 94.22 which also has a +S Read Ledger to pin X. Under these conditions, the —Or 94.22 supplies a —S level to the Convert block 94.21 and the output of 94.21 is a +R.

However, the Slow Shift Gate line 94.19 supplies a gate signal which has a duration long enough for the application of 1 Oscillator Sample Pulse to the Input/Output register. The +S Slow Shift gate comes from the —And 94.17 which has its Q input at —R as a result of the +And 94.16 being conditioned during X Read time. Pin P of —And 94.17 receives a —R input from a +AO 94.13 which is conditioned only when the clock signals Not Read Delay and 02 exist. The +AO 94.14 has no effect at this time, since the clock A time has already passed.

Accordingly, the contents of the Input/Output register will be shifted once during the clock times B, X, and Read. When the clock reaches B, X, and Write, the status of position 1 of the Input/Output register will determine whether or not a bit will be written into memory.

A similar Slow Shift takes place at clock time C, X, and Read, and the condition of the I/O 1 of the Input/Output register after the shift has taken place determines what will be written into memory. In FIG. 94, the I/O Check trigger 94.24 was set to its on state if a check bit was detected during the Character Gate Interval. A checking operation takes place during the fast shift of the information bits from positions 4, 5, and 6 to positions 1, 2, and 3 of the Input/Output register. The I/O Check trigger 94.24 operates in a binary fashion under control of Oscillator Sample pulses to inputs C and N. The trigger will only change state if pins B and P are properly conditioned by —And 94.25 which in turn is under control of a +AO 94.26. The +AO 94.26 is gated by the same output from —Or 94.22 which gated pin N of the —And 94.18 for the fast shift operation. The +AO 94.26 also is gated by a Read Ledger to pin M and a Not I/O 4 to pin R. The —And 94.25 is also conditioned by gating signals to pins A and B which are applied to 94.17 and 94.18.

As the bits of information are shifted during the fast shift interval, position 4 of the register will assume on and off states corresponding to the respective bits. The +AO 94.26 will provide a gating output to —And 94.25 for conditioning the I/O Check trigger 94.24 whenever the position 4 of the Input/Output register is in its off state. If the proper number of bits were entered originally into positions 4, 5, and 6, the I/O Check trigger 94.24 will be returned to its off state and the information read from the magnetic stripe can be considered correct.

If the I/O Check trigger remains on, it will supply a +S output to pin Q of a +And 95.11. The +And 95.11 is conditioned at A clock time, 01, Write, and X, as well as Read Ledger. The +And 95.11 supplies a —S output to a —OO block 95.12 which in turn provides a +S level to pin 7 of the Correct Read/Record latch 95.10. The Not Position latch line is +S to pin 6 of 95.10, and this results in 95.10 turning to its on state. If the latch 95.10 is in its on state when the end of LA Memory is reached as indicated by a signal on line 95.13, the latch 95.10 will be gated by its own —S on side output to be turned off, and an error in the Read Ledger operation will be indicated.

The clock is stopped at the end of three bit intervals in the following manner. A +And 49.38 has its upper input +S from a —Or 49.37; its center input is a +S Read signal; and its lower input to pin T is a +S on clock condition C. The output of +And 49.38 becomes a —S to a —Or 49.20 which in turn supplies a +S to the +AA block 49.13. The inputs S and T in +AA 49.13 are +S at this time. The output of +AA 49.13 is combined with the output of a+AA 49.14. The +AA 49.14 has Not D, 01, and Write inputs. These conditions will be satisfied near the end of the third bit interval, thereby producing a +S signal on line 49.10 which turns off the Start trigger.

The scanning of the head along the magnetic stripe continues and the bits of the next half-character are entered into the positions 4, 5, and 6 of the Input/Output register. As soon as the first bit of the set appears, the input conditions to +And 87.16 are satisfied, and it supplies an output through —Or 87.18 and Inverter 87.19 to turn off position 32C of the C Counter. During the first bit interval of the three bit interval just completed, the conditions A, X, Read, and Read Ledger to the +And 86.22 and the +And 86.23 had set up the C Counter in preparation for timing out a delay as soon as the first bit of the present character was recognized.

Input/Output register postions 4, 5, and 6 and the I/O Check trigger have been cleared as a result of the fast shift operation during A, X, and Read time. During A, X, and Write time, the Read signal to pin 2 of +And 87.17 will be set at —S, producing a +S output to +And 87.16. Throughout the remainder of the time required to transfer the information from the Input/Output register positions into memory, one or more of these inputs will be at a —S level. The output of +And 87.17 will remain +S and +And 87.16 will be conditioned to receive the first bit without having to wait until the previous information has been completely stored in memory.

With position 32C of the C Counter turned off, the C Counter is stepped from a count level of 10 to a count level of 32 as described before. This establishes the required character gate interval in order to insure proper entry of the bits of information into the Input/Output register.

As soon as the C Counter has timed out, the clock is again started in a manner similar to that described before. A fast shift takes place in order to get the bits entered in positions 4, 5, and 6 of the Input/Output register transferred to positions 1, 2, and 3 of the Input/Output register. I/O 1 is written into memory, and two slow shift operations take place so that the other two bits can be written into memory. The checking sequence is also performed during this time.

The stopping of the clock at the end of this three bit interval is slightly different from that which transpired before. An output is again available from the +And 49.38 but instead of being applied to the —Or 49.20, it is applied to a —Or 49.24. The output of 49.24 is directed to pin H of a +AA block 49.25. This +AA block has its output combined with the output of a +AA 49.26. The clock conditions to the five remaining inputs of these two +AA blocks will be satisfied near the end of the third bit of the second three bit set. This will result in a +S Turn Off Start trigger output on line 49.10.

Scanning of the magnetic stripe and reading of the information, including its transfer to MLC Memory, will continue in this fashion until the end of the stripe is reached.

It is necessary to step the B Counter periodically in order that the correct word location of memory is addressed. This is performed near the end of each 6A time and is done under control of a +And 78.14. The X input of this +And has a clock condition 6A, C, D, Y, Write, and 02 which exists when the 36th bit of a word is written into memory. The other inputs of the +And 78.14 will also be satisfied, and a B Sample Pulse is developed through —Or 78.12 and Sample Pulse Driver 78.10 to step the B Counter.

The End of LA Memory, that is the end of word location 32, is recognized by a +AA 48.21 in combination with a +And 48.22. The inputs to +AA 48.21 represent the B Counter status when word location 33 is about to be addressed. This condition of the B Counter will establish an inhibiting action to prevent the Start trigger from being turned on.

A —S End LA Memory signal is also produced on line 48.23 which is applied to an Inverter 95.14 and becomes +S to a +And 95.15. The Not 8C line to pin Z is —S. The 32C line to pin W of +And 95.15 may be +S or —S depending on whether or not the first bit of the next character has been received. It will be recalled by reference to FIG. 4b that a number of invalid stop characters comprising bits recorded in all four channels of the stripe are recorded following the valid information on the stripe. It will be seen that I/O 5 is applied to pin 4 of a +AA 95.16, that I/O 6 and I/O C are applied to pins F and G of +AA 95.17, and that I/O 4 is applied to pin Q of a +AA 95.18. The remaining inputs to +AA 95.17 and 95.18 are Read Ledger and End LA Memory respectively. The other input to +AA 95.16 is the +S on output of the Correct Read/Record latch 95.10. If the latch 95.10 is in its on state, therefore, the combined outputs of +AA 95.17, +AA 95.18, and +AA 95.16 can thereupon be directed through an Inverter 95.19 becoming +S to a thyratron 95.20 which will result in the energization of relay 706, FIG. 129 thereby indicating that the Read operation was correctly performed.

However, if the next character read was anything but a character which contained all ones in each of the four bit positions, the relay 706 would not have been picked, and the latch 95.10 would be turned to its off state so that no subsequent check character could be recognized and cause the relay 706 to be picked. If an error is indicated by the machine, the action required is taken care of in the magnetic ledger card unit 2.16 as disclosed in the aforementioned application Serial No. 248,117, C. S. Jenkins et al.

RECORD LEDGER AND CHECK READ OPERATION

In the usual sequence of events following a correct Read Ledger operation, the ledger card would be fed to the second station for printing of information developed during the program. As an alternative procedure, the ledger card might also be ejected even though the Read Ledger operation was correct in every respect, and reinserted subsequently.

The information that was just read from the ledger card in word locations 1–32 can be used in various program sequences as required. The binary numeric portion can be used in arithmetic operations or be modified during a Numeric Entry operation, and the alphanumeric portion may be used for automatic printing of information such as customer name, and address, as well as be modified by an Alphanumeric Entry operation previously described.

Following the printing and updating procedures, the ledger card would normally be returned to the Read/Record station for the Record operation. During this operation, the contents of MLC Memory word locations 1–32 are again recorded on the magnetic stripe of the ledger card.

The Record Ledger operation is similar in most respects to the Read Ledger operation. The B Counter setup is identical since the information stored in word locations 1–32 of memory is addressed just as in the Read Ledger operation. The trigger positions 4, 5, and 6 of the Input/Output register will be loaded from MLC memory rather than from the magnetic ledger card stripe as in the Read Ledger operation. As each set of three bits is transferred serial by bit from MLC memory to the Input/Output register, a parity or Check bit is generated, and the entire set of information bits and check bit is subsequently applied to the magnetic recording heads for recording on the magnetic stripe.

The C Counter is used in a similar manner for a character gate to establish appropriate intervals between each set of bits on the magnetic stripe. After a set of three bits is transferred from the MLC memory to the Input/Output register, the C Counter is set to a count level of 10 and is then stepped to a count level of 32 in order to provide the proper gate interval.

When all valid information has been transferred from word locations 1–32 of MLC Memory, the C Counter is permitted to step in such a manner that the invalid check characters comprising a one bit in each of the four channels on the stripe are generated.

Following the recording scan of the head, the head is returned to its home position, and another scan is initiated in order to compare the newly recorded information with the information stored in memory. The bits stored in memory are fed in sequence to the Storage trigger and proper timing conditions are established so that the corresponding bit from the magnetic stripe will exist in the I/O 1 position of the Input/Output register for comparison with the contents of the Storage trigger.

A Record hub 48.27 receives a +48 volt signal from the control panel which is then applied to the Integrator 48.13. This is translated to a +S level at pin Q of +And 48.14. The Not 32C line to pin R is +S at this time so +And 48.14 supplies a —S to pin Q of +And 48.12. In view of this, no output is available from +And 48.12 to set the Start Trigger Gate latch 48.17 to its on state when the 64–4 N/C point supplies an input to pin P of +And 48.12 through Integrator 48.11. This results in the clock remaining off, since the Start trigger 48.10 cannot be turned to its on state.

The purpose of the foregoing is to allow sufficient time for the ledger card to be positioned in the magnetic ledger unit 2.16 for the Record Ledger operation to take place.

An automatic scan by the head unit in the magnetic ledger unit 2.16 occurs as soon as the card is positioned, and when the head has reached the proper scanning speed, the On Track switch will transfer, and turn on the Position latch 89.23. This is similar to the action described during the Read Ledger operation. Two pre-run cycles will also be taken by the machine in order to step the B Counter to the proper count level for addressing word location 1 in MLC Memory. However, during the Record Ledger operation, both of the pre-run cycles have an identical duration of 36 bit intervals, as contrasted with the Read Ledger operation where the second pre-run cycle had a duration which corresponds to only 6 bit intervals, rather that 36 bit intervals. This was accomplished by stepping the 1A–6A ring at each X time during the second cycle so that it completed a complete word cycle in one-sixth of the time ordinarily required. This will not happen during the Record Ledger operation since the Read Ledger line to pin F of +And 53.19 is presently at a —S level. The net effect of this arrangement of course, is that the recording of bits of information on the magnetic ledger stripe begins approximately 4.32 milliseconds later than the reading of bits from the stripe began during the Read Ledger operation.

Position 32C of the C Counter is turned on as before by a —S Not Position latch through Inverter 87.13. When position 32C turns to its on state, the input conditions of +And 48.14 are satisfied for starting the electronics. The stopping of electronics occurs in a slightly different manner from that which occurred during the Read Ledger operation. Referring to FIG. 49, the Read Ledger input to pin P of +And 49.36 is —S at this time, so the output of 49.36 to pin U of —Or 49.36 is +S. This places —Or 49.37 under control of the Position latch line to pin W. The output of —Or 49.37 becomes +S only after the Position latch is turned off which, it will be recalled by reference to FIG. 89 and —And 89.28, occurs at clock times 6A, C, D, Y, Write, and 02. Therefore, the clock will not stop at the end of the Second Pre-run cycle but will instead continue until the end of the first A–B–C clock sequence, thereby bringing three bits of information out of memory before the clock stops.

The contents of memory are regenerated as they are read. Also, as each bit is read from memory into the Storage trigger, a transfer takes place from the Storage trigger to I/O 6 of the Input/Output register. In FIG. 93, the Not Record line to pin G of the +And 93.15 is —S at this time resulting in a +S output to pin 8 of —Or 93.12. The Not Read ledger line to pin 7 of —Or 93.12 is also +S at this time. This places Or 93.12 under control of the Storage trigger status at pin 6. The —S output from —Or 93.12 whenever the Storage trigger is in the 1 state is inverted by an Inverter 93.13 and applied to I/O 6 to set it in its on state. The Slow and Fast Shift gate signals are also established as follows. The Slow Shift gate on line 94.10 is controlled by the +AO 94.13 output. The only time that +AO 94.13 input conditions are satisfied is Not Read Delay and 02 clock times. The Read Ledger line to pin X of —Or 94.22 is —S at this time, thereby resulting in a —R input to pin N of the —And 94.18 and the Fast Shift Gate output on 94.11. Therefore, the Input/Output register will be shifted once near the end of each A time, B time, and C time of the clock. During A time the first bit from memory will be read into the I/O 6 position of the register, and during B and C times, the second and third bits will be read out of memory with concurrent shifting of the register so that the three bits from memory will now be stored in positions 4, 5, and 6 of the Input/Output register.

In FIG. 94, the I/O Check trigger 94.24 is gated to change state for establishing the proper check bit to be written on the stripe under control of a +AO 94.27. The inputs of this +AO are Record to pin G which is +S at this time and Not Storage trigger which reflects the status of the Storage trigger during the Read out operation from memory. The output of 94.27 is applied to pin K of —And 94.25 which has its other inputs conditioned by the Slow Shift gate signals. The I/O Check trigger 94.24 is thereby gated for changing its state as required.

The I/O Check trigger 94.24 is reset to its off state at the beginning of read out of each set of three bits from memory. This is done under control of the —Or 94.28 which receives a —S signal from a +And 94.29. The +And 94.29 has +S Record to pin 6. It also has a +S to pin 8 representing clock times A, X, and Read as derived from the +And 94.23. At Read Delay time, therefore, the pin 7 input of +And 94.29 is satisfied, and the I/O Check trigger is reset off. During the course of read out of memory the trigger 94.24 is gated by an odd number of zeros from the Storage trigger which conversely represents an even number of one bits from memory. If this is the case, the I/O Check trigger will be left in the on state at the completion of the read out. Therefore, the I/O Check trigger will be in the on state if an even number of ones is read, and it will be in the off state if an odd number of ones is read.

At each X Write time, a bit will be restored to memory under control of the Storage trigger.

In FIG. 49, the +And 49.38, in connection with the +AA block 49.13 and the +AA 49.14 will establish conditions for stopping the clock after the first three bits, while the +And 49.38 in connection with the +AA 49.26 and +AA 49.25 will set up proper conditions for stopping the clock at the end of the next three bits. The circuit logic in FIG. 49 alternates in this manner for each set of three bits throughout the remainder of the Record operation.

With the clock having stopped, a +S will be available to pin W of +And 87.20, and this together with a +S Record results in a —S to the —Or 87.18. After inversion by 87.19, this signal is used to turn the trigger 32C to its off state.

In FIG. 84, the Not 32C line, the Not First Pre-run cycle line, and Read or Record to a +And 84.19 results in gating the Intermediate trigger so that the C Counter can step from its count level of 10 to a count level of 32. This establishes a proper character gate time for writing the bits of information stored in the Input/Output register and the Check trigger on the magnetic stripe of the card.

The four record heads together with associated logic for writing the bits of information on the stripe are shown in FIG. 91. Each head is primarily under control of a +And, such as +And 91.14 for channel 1. The other +Ands involved are 91.15, 91.16, and 91.17. Each +And receives a data signal from a particular source and these are I/O 4, I/O 5, I/O 6, and I/O check, respectively. All four +Ands 91.14–91.17 are gated by a +S Record signal on line 91.18. As soon as the C Counter has reached a count level of 24 which means that it has stepped 14 times from its initial count level of 10, the inputs 8C, 16C, and Not 32C to the +And 91.19 will be satisfied. This results in a —S output to Power Inverter 91.20 which gates all of the +Ands 91.14–91.17 so that writing of bits of information can take place in those channels which are properly conditioned by the respective I/O triggers.

The C Counter will continue to step until position 32C turns on. This will remove the signal from +And 91.19 and cause all recording heads to resume the bias state. This will also result in the Start trigger turning on as previously described and the reading of memory, transferring of bits and checking, with subsequent writing on the magnetic stripe, continues throughout the entire portion of memory, comprising word locations 1–32.

Eventually, the end of word location 32 will be reached, at which time electronics will not restart.

The —S End LA memory signal on line 95.13 to Inverter 95.14 results in a +S to pin U of +And 95.15. The other inputs of Not 8C and 32C will be +S and the +And 95.15 will provide an output to the Correct R/R latch 95.10. The latch 95.10 is thereby turned off and supplies a +S output to the +And 95.21. This +And has a +S Record input to pin H, and the resulting output is a —S Record Stop Symbol signal.

Referring to FIGS. 93 and 94, it will be seen that each of the triggers I/O 4, I/O 5, I/O 6, and I/O Check have a setting input of —S Record Stop Symbol. Each of these triggers will be set to its on state therefore and these are used for recording the stop symbols for checking purposes. A +And 84.18 will have both inputs End LA memory and Record at a +S level at this time. The output of +And 84.18 is —S to a —Or 84.16. This turns on the Intermediate trigger 84.15 which then gates the Sample Pulse Driver at regular intervals and thereby supplies Step 1 C pulses on line 84.14. The C Counter will continue to run from this time on until a DC Reset signal is received, when the magnetic head has reached the end of its scan. This results in the writing of the record stop symbols at the end of the stripe, one symbol each time the C Counter reaches a count level of 24.

*Check Read*

Following the scan of the head, closure of the End Head Sweep contact in the magnetic ledger card unit results in the energization of relay 724, FIG. 128, which is the Check Read relay. In FIG. 90, the energization of the relay 724, results in the closing of the 724–12 point. A +48 volt signal is then applied to an Integrator 90.12 which then has an output of +S Check Read. The signal is also inverted by Invert block 90.13 for a —S Not Check Read.

The head unit in the magnetic ledger card unit again scans the magnetic stripe. However, the machine is in a Check Read mode, which is different from either a Read, or a Record mode.

During the Check Read operation, individual sets of three bits are read from the magnetic ledger stripe into I/O positions 4, 5, and 6. These are then fast shifted to I/O positions 1, 2, and 3. The usual pre-run cycles taken during a normal read operation are also taken during the Check Read operation. The loading of the Input/Output register positions 4, 5, and 6 results in the starting of the clock. The fast shifting operation takes place during A time, X time, and Read of the clock, as described before. The first bit of MLC Memory is also read during A, X, Read into the Storage trigger.

In FIG. 95, the Check Read line 95.22 is +S to a +And 95.23 which also receives a +S on the Not Position latch line when the Position latch turns off. Prior to this time when the Position latch assumes its off state, the pin 6 of the Correct Read/Record latch 95.10 has a +S signal applied for gating purposes. The +And 95.23 controls a —OO block 95.12 which, under proper circumstances, will supply a +S signal to pin 7 of the Correct Read/Record latch 95.10 to set it in its on state. The +And 95.23 has a —Or 95.24 controlling pin K. —Or 95.24 has two inputs, one of which is from a +And 95.25 and the other of which is from the +And 95.26.

The +And 95.25 and the +And 95.26 are gated from a —And 95.27 which supplies a +S output at each Write, 01, X time. At this time, the status of the Input/Output 1 position of the Input/Output register is compared with the Storage trigger by inputs which represent an Exclusive Or arrangement to each of the +And blocks 95.25 and 95.26.

For example, if the Storage trigger is in the on condition as represented by a +S to pin K of +And 95.25, and the I/O 1 position of the Input/Output register is not in a 1 position as represented by a +S Input to pin L of +And 95.25, the +And 95.25 will supply a —S output to the —Or 95.24. This is directed to pin K of +And 95.23 which, as observed, already has its other two inputs satisfied. The output of the +And 95.23 would become —S at this time to the —OO 95.12. The output of 95.12 becomes +S to pin 7 the Correct Read/Record latch 95.10. This will set the Correct Read/Record latch 95.10 to its off state, before it can be used to indicate the occurrence of End LA Memory, whereupon the thyratron 95.20 cannot be energized in order to pick relay 706 and thereby indicate a satisfactory Check Read operation. Following the X, Write, 01 interval comparison of the I/O 1 position of the Input/Output register and the Storage trigger, a slow shift operation takes place at X, Read, Not Read Delay, and 02 time which results in the register positions I/O 2, and I/O 3 being transferred to the positions I/O 1, and I/O 2 in preparation for another comparison. The clock time B, X, and Read results in the addressing of the next bit from MLC Memory which is placed in the Storage trigger. A comparison takes place between the I/O 1 position of the Input/Output register and the Storage trigger at X, Write, and 01 time of the clock, the circuit action taking place during the comparison being identical with that which occurred during X time, Write time, and 01 time previously.

A similar shift operation in order to transfer I/O 2 into I/O 1 takes place at X Read, Read Delay, and 02 of clock time C, X, and Read. Another comparison takes place between the I/O 1 and the Storage trigger during X, Write, 01 time of the C bit interval.

In FIG. 49, the occurrence of clock time C, Y, 01, and Write together with a D results in an output from +AA 49.26 and +AA 49.25, and similar clock conditions together with a Not D to pin F of +AA 49.14, results in an alternate output from the +49.13 and +AA 49.14 in order to develop the +S Turn off Start trigger at the end of each 3 bit times as previously described.

If the relay 706 has not been picked as it should have been, closure of the End Head Sweep contact results in a signal through the 706–1 N/C to pick the Check Error relay 703, FIG. 128. The picking of the Check Error relay 703 is used to turn on an error light, inhibit program starting, or other functions.

Any ledger card that does not pass the Check Read comparison operation just described would normally be ejected by the magnetic ledger card unit 2.16.

Referring to FIG. 55, the Fixed Factor Driver Select line 55.15 and the X time Switch Select line 55.28 are energized during X Read time of each bit interval under control of the usual X, and Read clock Signals.

The information stored in the Storage trigger is regenerated by the combination of +AA 55.30 and +AA 55.32 under control of a +And 55.31. The input Not Check Read to pin 7 of +And 55.31 will be −S at this time resulting in a +S output to pin 5 of +AA 55.30. The +AA 55.30 and +AA 55.32 will gate −Or 55.11 and −OO 55.26, whenever the Storage trigger is in its on or +S condition.

FULL CARD REGENERATION

Each ledger card has enough space for many transactions to be printed. Eventually, however, the entire face of a card may be filled with posted information. When this happens the card will not feed as far into the ledger card unit 2.16 before it stops at the posting station. By an appropriately located switch, the fact that a card is not far enough in for a legitimate posting is detected and used for program modification, in order to prepare a new card to replace or supplement the full card.

The mechanical aspects of the ledger handling and feeding in unit 2.16 are covered in the aforementioned application Ser. No. 248,117, C. S. Jenkins, et al. The discussion herein will be directed primarily to the aspects of the Full card situation. As disclosed in application Ser. No. 248,117, Unit 2.16 has a "cam line" comprising circuit breakers and mechanical cams which step along in synchronism with any ledger card being handled and which supply timed electrical impulses and mechanical motion for control purposes.

Figure 126:
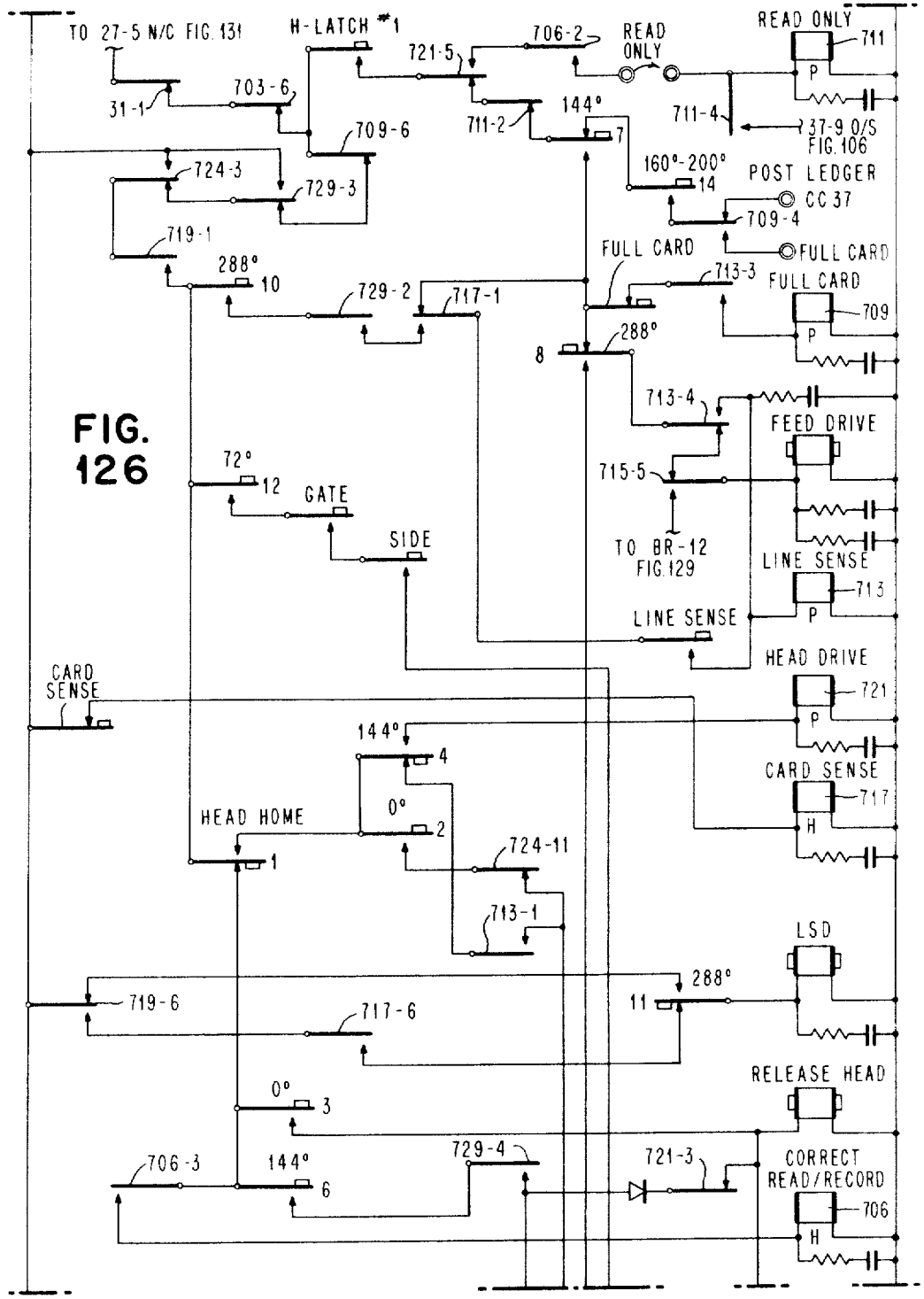
Figure 127:
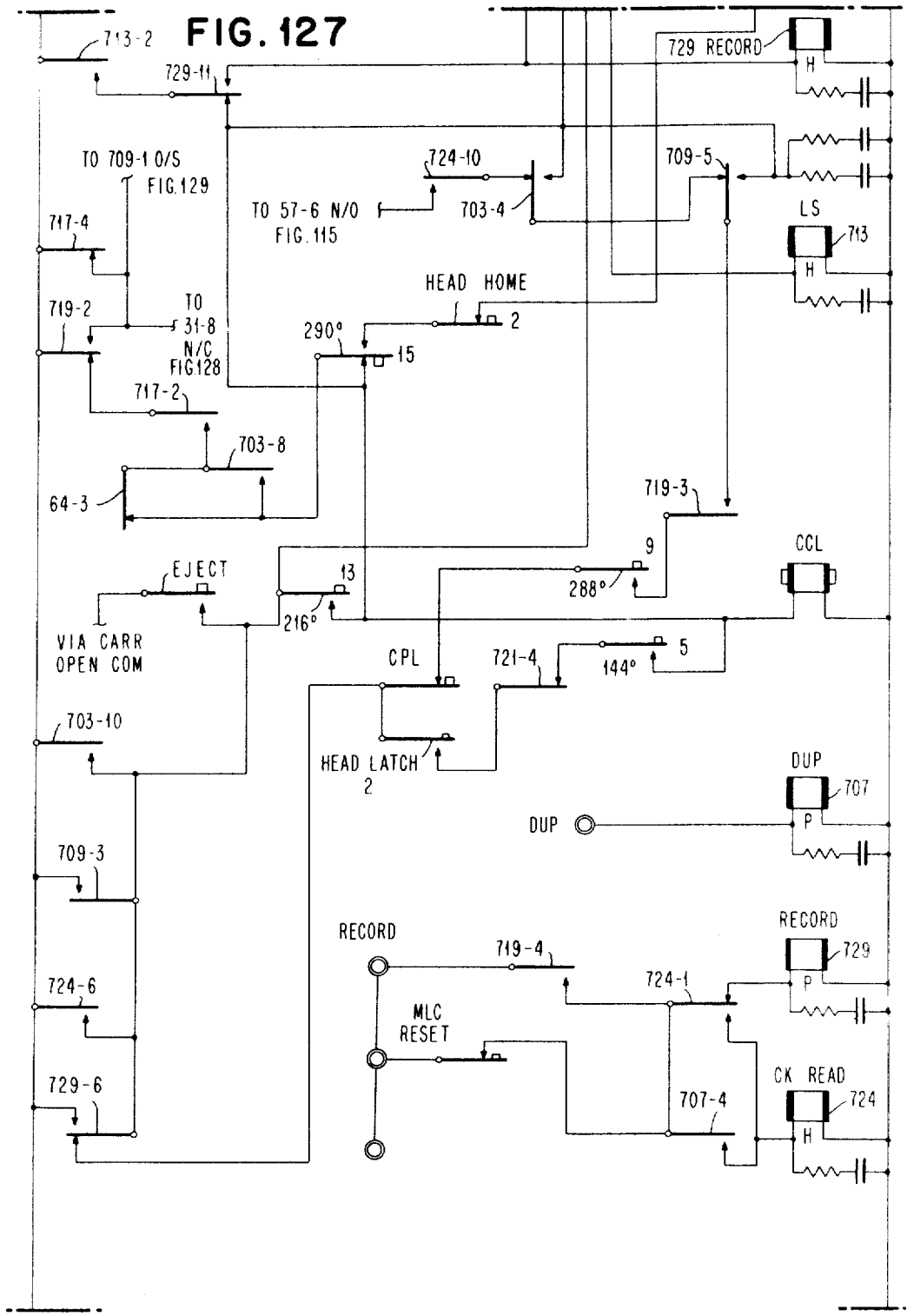

In FIG. 126, the arrival of a card at the posting line in unit 2.16 is signalled by the closure of the Line Sense contact which stops the feed drive and picks relay 713. Contact 713–2 in FIG. 127 is effective to cycle the cam line of unit 2.16 from 144° to 216°. As the cam line advances, the 160°–200° contact in FIG. 126 is momentarily closed. This normally produces an impulse at the Posting Line (PL) hub (6.53, FIG. 6) via contacts 27–5 in FIG. 131, and 31–1, 703–6, Head Latch #1, 711–2, 144° cam, 160°–200° cam, and 709–4 in FIG. 126.

In the full card situation, however, while the cam line is at 144°, the closure of contacts 713–3 of the Line Sense relay 713 in FIG. 126 will cause Full card relay 709 to be picked if at this time the card has not travelled far enough to interrupt the Full Card Contact. It is apparent that the transfer of contacts 709–4 in FIG. 126 will cause the impulse normally appearing at the Post Ledger hub to appear at the Full Card (FC) hub. This hub will normally be used to pick a selector, such as those shown in FIG. 125 to cause a later branching of the program.

The transfer of contact 709–3 in FIG. 127 is effective to cycle the cam line to 288° via the 216° contacts. The transfer of contact 709–3 is also effective to engage the feed drive via the 288° contact and contacts 713–4 and 715–5, FIG. 126. Relay 713 will drop as soon as the cam line cycles from 144°.

Figure 129:
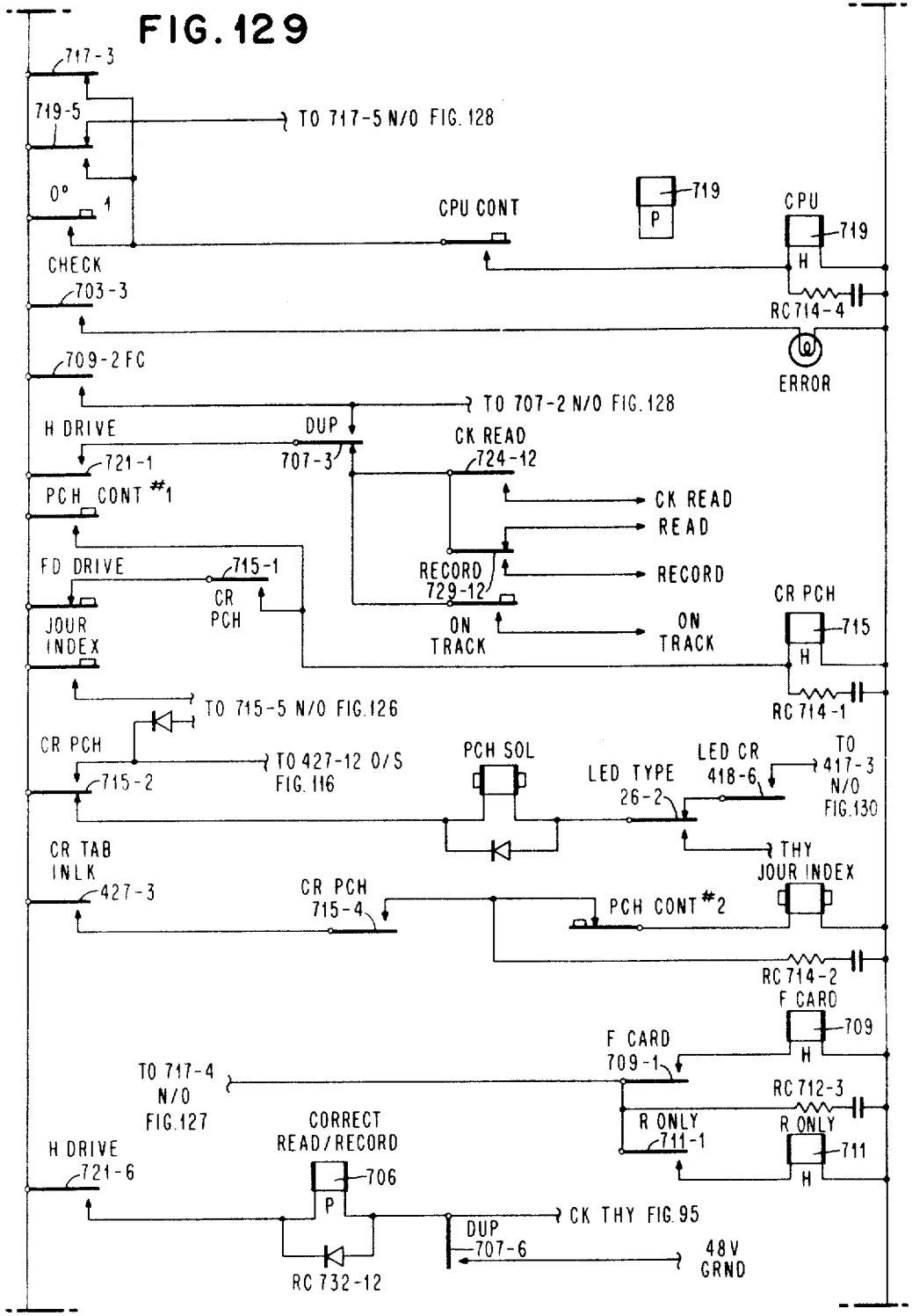

As soon as the top of the card passes under Card Present Upper (CPU) contact, FIG. 129, relay 719 will be picked. Its contact 719–3 in FIG. 127 will complete the circuit from the normally closed Card Present Lower (CPL) contact via 288°, 719–3 and 709–5 to the Cycle Cam Line (CCL) Magnet, FIG. 127, so that when the bottom of the card passes under the Card Present Lower contact, the circuit will be complete via 729–6 and 709–3 to 48 volts, and the cam line will cycle to 0°.

A further action of relay 709 is through its points 709–2 in FIG. 129. These points complete a circuit to the Duplicate (DUP) relay 707 in FIG. 128. The action of this relay is discussed below.

Therefore, if no more posting lines are available on a card an indication is given under control of Relay 709 so that the program may be altered, and the card is thereafter ejected from unit 2.16 for removal by the operator. Through the action of the Duplicate (DUP) relay it is now possible for a blank card to be inserted for printing and recording of the information that was on the full card. At some point in the program prior to posting the ledger card, the selector which was picked from the Full Card hub, FIG. 126, can cause a branch to a routine for an Alphanumeric Print from MLC memory in order to print a heading for the newly inserted card. Then, after the usual posting, and during the normal Record Ledger operation, the magnetic data in MLC memory which was on the old card as modified by the current transaction, will be recorded on the new card.

Even though a full card situation does not exist, it is also possible to pick the Duplicate relay 707 with any impulse in the program, except a Coordinate Exit impulse, through the New Card (N.C.) hub shown in FIG. 127. This hub is shown on the control panel, FIG. 6, at 6.55. Duplicate relay 707 is held, as shown in FIG. 128, through its own contact 707–2 and contacts 729–7 or 724–7 of the Record and Check Read relays respectively. When neither Record or Check Read is in progress, Relay 707 is held through its own contact 707–1 and the End Head Sweep normally closed contact, FIG. 128. Thus, whenever Relay 707 is picked, it will hold through the next Read Ledger head sweep, at the end of which it will reset.

The principal use of Duplicate relay 707 appears in FIG. 129. The contact 707–3, when transferred, will prevent energizing of any of the lines which activate the electronic circuitry during a manipulation of the ledger card. Thus, neither the memory of the machine, nor the stripe on the card can be changed while the machine is in the mode defined by picking the Duplicate relay 707.

In addition to the use previously described, the Duplicate relay 707 may be picked from the control panel to enable the insertion of a blank card upon which data for a new account is to be recorded. Such insertion will not change any information about the account which may already have been entered in MLC memory, nor will insertion of the card activate the error circuits, as a blank card normally would. Since the Duplicate relay 707 will have been reset at the end of the head sweep in which reading would normally have taken place after insertion of a card, it is now possible, after whatever other printing, entry, or calculation is desired, to transfer the account data to the magnetic stripe using the usual Record Ledger instruction.

SUMMARY

From the foregoing discussion, it is evident that the system described herein possesses a high degree of versatility and flexibility combined with an efficient operation which has not been possible heretofore in a system of this nature. In accordance with the preferred embodiment of the invention, a few simplified control and selection circuits govern the flow of data into and out of memory in an effective manner irrespective of the data format, or data handling complexities involved.

While the invention has been particularly shown and described with reference to a preferred embodiment thereof, it will be understood by those skilled in the art that various changes in form and details may be made therein without departing from the spirit and scope of the invention.

What is claimed is:

1. A system for selecting and controlling the transfer of information into and from individual storage locations, or a group of storage locations beginning with a particular individual location, comprising:

storage means, said storage means having a first portion for storing numeric words and a second portion for storing alphanumeric words;

means for directly selecting a word location in said storage means for the transfer of information;

means for generating pulses according to a predetermined pattern;

and selection means, said means being responsive to control signals indicative of an alphanumeric transfer operation and of the beginning of the second portion of said storage means, and said means being further responsive to said generated patterns of pulses for selecting the alphanumeric word locations in said storage means in a sequential manner beginning with a specified location.

2. A system for selecting and controlling the transfer of information into and from individual storage locations, or a group of storage locations beginning with a particular individual location, comprising;

storage means, said storage means comprising a first portion set aside for storing fixed length binary numeric words, and a second portion set aside for storing variable length alphanumeric words;

a fixed factor memory, said memory comprising a number of physical words, each word having a predetermined number of storage elements;

means for directly selecting a word location for the transfer of information;

a set of word drivers, a set of read-write switches associated with said storage means, a set of read switches associated with said fixed factor memory, the number of drivers times read-write switch sets equalling the total number of words in said storage means, and the number of drivers times said read switches equalling the total number of words in said fixed factor memory;

selection means, said selection means including a first control portion for selectively gating said word drivers in sequence, said selection means including a second control portion for selectively gating said read-write switches in sequence, and said selection means further comprising a third control portion for gating said fixed factor read switches;

control circuits for establishing a particular operating mode from among a plurality of arithmetic and functional modes;

means responsive to a control signal indicative of a memory transfer operation with respect to said storage means for actuating said first control portion and said second control portion in order to access the alphanumeric words in said storage means in a sequential manner;

and means responsive to a control signal indicative of a numeric type operation or a column shift operation for actuating said first control portion and said third control portion in order to access the factors stored in said fixed factor memory in a sequential manner.

3. A data processing system for the periodic preparation of accounting documents, and concurrent processing of magnetic ledger cards, comprising:

means for storing individual characters in variable length alphanumeric fields, wherein each character comprises a number of bits arranged according to a data format having a particular predetermined number of bit positions, and wherein a predetermined number of characters comprise a word of information;

means responsive to control signals for establishing an alphanumeric entry or print operation, or for establishing a read ledger or record ledger operation;

means for providing a control signal for an alphanumeric entry or print operation which is indicative of a specified word location in said storage means from which a search for a variable length alphanumeric field is to commence;

means for providing a control signal for an alphanumeric entry or print operation which is indicative of a particular alphanumeric field in said memory;

means for initiating a search for said particular alphanumeric field beginning at said specified word location in said storage means during an alphanumeric entry or print operation;

and means for accessing a particular number of word locations in said storage means beginning with an invariable predetermined word location during a read ledger or record ledger operation.

4. A data processing system for the periodic preparation of accounting documents, and concurrent processing of magnetic ledger cards, comprising:

means for storing individual characters in variable length alphanumeric fields wherein each field is indicated by a field mark character, and wherein a predetermined number of characters comprise a word of information;

means responsive to control signals for establishing an alphanumeric entry or print operation, or for establishing a read ledger or record ledger operation;

means for providing a control signal prior to an alphanumeric entry or print operation which is indicative of a specified word location in said memory from which a search for a variable length alphanumeric field is to commence;

means for providing a control signal prior to an alphanumeric entry or print operation which is indicative of a particular alphanumeric field in said memory;

means for initiating a search for said particular alphanumeric field beginning at said specified location in said storage means during an alphanumeric entry or print mode of operation;

counting means, said counting means being stepped under control of field mark characters as they are encountered during a search operation and said counting means supplying a signal at a particular count level for terminating the search and indicating that the desired field has been located;

means thereafter operative to reset said counting means to a particular predetermined count status and to step said counting means to another predetermined count status in order to establish time delays between successive character entry cycles, or successive character print cycles;

means for accessing a particular number of word locations in said storage means beginning with an invariable predetermined word location during a read ledger or record ledger operation;

and means operable during a read ledger or a record ledger operation only for presetting said counting means to a first predetermined count status, and thereafter stepping said counting means to a second predetermined count status in order to establish a desired character gating interval during said ledger operations.

5. A system for printing an accounting document in accordance with stored information, and for concurrently printing punctuation symbols according to a preselected punctuation format, comprising:
- means for selecting a desired punctuation format from among a plurality of available punctuation formats;
- storage means, said storage means storing information in a first coded form;
- a fixed factor memory, said memory comprising a number of physical words, each word having a predetermined number of storage elements;
- means for converting said information in said first coded form to a second coded form for printing under control of factors in said fixed factor memory;
- a set of drive lines for said fixed factor memory, said drive lines being selectively coupled to the individual storage elements in each physical word;
- a set of word drivers, and a set of read switches for said fixed factor memory, the product of the number of drivers times the number of read switches equalling the total number of fixed factor words in said memory;
- selection means, said selection means selectively gating said word drivers and said read switches so as to sequentially access said fixed factor words during a conversion operation;
- and means responsive to signals from said selection means representing a particular selection status thereof for producing signals in order to print punctuation symbols according to said preselected punctuation format.

6. The system of claim 5, said system further comprising:
- means for selecting a plurality of punctuation formats in combination from a plurality of available punctuation formats.

7. The system of claim 5, said system further comprising:
- control circuits for producing signals in order to print a predetermined symbol prior to the printing of the first significant digit in a number being typed.

8. A system for typing an accounting document in accordance with stored information, and for concurrently printing punctuation symbols according to a preselected punctuation format, comprising:
- means for selecting a desired punctuation format from among a plurality of available punctuation formats;
- storage means for storing words of numeric information in a coded form;
- a fixed factor memory, said memory comprising a number of physical words, each of said words having a predetermined number of storage elements;
- two sets of drive lines for said fixed factor memory, said drive lines being selectively coupled in a predetermined manner to the individual storage elements in each physical word in order to establish fixed factors;
- a set of word drivers, and a set of odd and even switches connected in a predetermined manner to said drive lines for word selection purposes, the number of drivers times the number of switches equalling the total number of words in said fixed factor memory;
- counting means, said counting means comprising a first portion for selectively gating said word drivers in sequence, and said counting means further comprising a second portion for gating said odd and even switches in an alternate manner;
- means responsive to a control signal indicative of a numeric type operation for presetting said counting means to a particular count level, in order to thereafter sequence through a predetermined group of fixed factors required in said operation;
- means responsive to said control signal for selecting and converting a particular numeric word from said coded form by use of said fixed factors and for subsequent typing;
- and means responsive to signals from said counter representing a particular status thereof for producing signals in order to print punctuation symbols during said conversion process according to said preselected punctuation format.

9. The system of claim 8, said system further comprising:
- a control circuit for normally producing a spacing operation following the typing of the units digit in a selected number being typed;
- a circuit for producing signals representative of a plurality of available symbols;
- and means for selecting a particular one of said signals in order to print a particular symbol rather than a space following the units digit of a number being typed.

10. The system of claim 8, said system further comprising:
- punctuation control circuits for producing signals in order to print a dollar sign prior to the printing of the first significant digit in a number being typed.

11. A system for selecting numeric factors in a selective manner for use in an information conversion operation, or for use in arithmetic shifting operations, comprising:
- a fixed factor memory comprising a number of physical words, each word having a predetermined number of storage elements, and each word being selectively wired with a plurality of drive lines to establish fixed factors;
- a set of work drivers and a cooperating set of odd and even read switches associated with said memory, the product of said drivers times said read switches equalling the total number of words to be selected in said memory;
- selection means, said selection means comprising a first control portion for selectively gating said word drivers in sequence, and said selection means further comprising a second control portion for gating said odd and even switches in an alternate manner;
- means responsive to a control signal indicative of a numeric type operation or a column shift operation for presetting said selection means to a particular selection status, which defines a starting point in said memory;
- means for thereafter changing the setting of said selection means if a particular one of said operations has been indicated in order to specify a different starting point in said memory;
- and means for sequencing through a group of fixed factors under control of said selection means beginning with the finally selected starting point.

12. A system for selecting and controlling the transfer of alphanumeric information between a memory facility and devices associated therewith, comprising:
- storage means, said storage means including a first alphanumeric portion of variable length fields, with the first field of said portion beginning at a storage location in said storage means that is selectively variable, and said storage means further including a second alphanumeric portion of variable length fields, with the first variable length field in said second portion beginning at a storage location in said storage means that is predetermined and invariable;
- means for providing control signals in order to select a variable length field in said first alphanumeric portion of said storage means or in order to select a variable length field in said second alphanumeric portion of said storage means;

and means responsive to a control signal indicative of an alphanumeric transfer operation for initiating a search at the selectively variable location of said first alphanumeric portion when a variable length field in said portion has been selected, and for initiating a search at the invariable beginning of said second alphanumeric portion when a variable length field in said second portion has been selected.

13. A system for selecting and controlling the transfer of information between data memory facilities and entry and output devices associated therewith, comprising:

storage means, said storage means comprising a first alphanumeric portion of variable length fields, with the first field of said portion beginning at a storage location in said storage means that is selectively variable, and said storage means further comprising a second alphanumeric portion of variable length fields, with the first variable length field in said second portion beginning at a storage location in said storage means that is predetermined and invariable, and each of said fields having a plurality of characters including a field mark character for defining the beginning of the field;

means for selecting a particular variable length field in said memory;

means responsive to a control signal indicative of an alphanumeric transfer operation for initiating a search in said first alphanumeric portion of said storage means when a variable length field in said first portion has been selected, and for initiating a search in said second alphanumeric portion of said storage means when a variable length field in said second portion has been selected;

and means actuated upon recognition of a predetermined number of field marks for indicating that the selected variable length field has been located.

14. A system for selecting and controlling the transfer of information between data memory facilities and entry and output devices associated therewith, comprising:

storage means, said storage means comprising a first alphanumeric portion of variable length fields, the first field of said portion beginning at a storage location in said storage means that is selectively variable, and said storage means further comprising a second alphanumeric portion of variable length fields, where the first variable length field in said second portion begins at a storage location in said storage means that is predetermined and invariable, each said field having a plurality of characters including a field mark character for indicating the beginning of the field;

means responsive to a control signal indicative of an alphanumeric transfer operation for initiating a search at a specified location in said first alphanumeric portion for a variable length field in said first portion, and for initiating a search at the invariable beginning of said second portion for a variable length field in said second portion;

counting means, said counting means being stepped by signals developed as a result of recognizing field mark characters during a search for a particular alphanumeric field;

and means responsive to a particular count level in said counting means for terminating a search operation and indicating that the required field has been located.

15. The system of claim 14, said system further comprising:

means operative upon completion of the search operation for resetting said counting means to a particular predetermined count status and to step said counting means to another predetermined count status in order to establish time delays between successive alphanumeric character entries or successive character print cycles.

16. A system for selecting and controlling the transfer of information between data memory facilities and entry and output devices associated therewith, comprising:

storage means, said storage means having a first portion set aside for storing fixed length binary numeric words, and a second portion set aside for storing variable length alphanumeric words, wherein each of said variable length words is denoted by a field mark character having a particular bit configuration;

counting means, said counting means comprising a number of trigger positions, said positions being arranged in a binary weighted progression;

means responsive to a control signal indicative of a particular variable length alphanumeric field required during an operation for presetting said counting means to a count status which is incrementally different from a particular count status in said counting means, a different predetermined increment being established for each variable length field selected, with the increments being progressively greater from the lowest order to the highest order field established;

means for initiating a search for a required alphanumeric field beginning at a specified location in said alphanumeric portion of said storage means during an alphanumeric entry or print mode of operation;

means for stepping said counting means under control of field mark characters as they are encountered during a search operation;

means for terminating the search when said counting means reaches a particular count level;

means responsive to said particular count level of said counting means during an alphanumeric print operation for transferring the first character of the selected alphanumeric field, and for indicating that said required field has been located;

means responsive to a particular count level in said counting means during an alphanumeric entry operation for terminating said search operation and indicating that the required field has been located;

and means operable upon the termination of said search in an alphanumeric entry operation for placing the machine in readiness for receiving the first character of alphanumeric information.

17. A system for selectively entering and establishing variable length fields of alphanumeric information in a memory facility, comprising:

means for storing alphanumeric information in variable length fields, said fields having a plurality of characters, including field mark characters;

a single multiple-purpose counting means;

means for presetting said counting means to a particular count level in response to a signal indicative of a particular alphanumeric variable length field required for an entry operation;

means for initiating a search operation for said particular field in response to a control signal indicative of an alphanumeric entry operation;

means for stepping said counting means in response to signals developed as a result of recognizing field mark characters during a search for said particular alphanumeric field;

means responsive to signals from said counting means when it has reached a predetermined count level for terminating the search operation, and indicating that the required alphanumeric field has been located;

means operative following termination of said search operation to reset said counting means to a first particular predetermined count status and to step said counting means to a second predetermined count status in order to establish time delays between successive character entries;

and means actuated upon said counting means reaching said second predetermined count status for placing said system in a condition for receiving a subsequently entered alphanumeric character, thereby establishing a predetermined delay between successive character entries.

18. A system for selecting and controlling the transfer of alphanumeric information from a memory facility to a utilization device associated therewith, comprising:

means for storing characters of information in variable length alphanumeric fields, said individual fields being defined by field mark characters;

counting means presettable to a particular count level in response to a signal indicative of a particular variable length field required during an operation;

means responsive to a control signal indicative of an alphanumeric print operation for initiating a search for said particular alphanumeric field;

an input/output register for receiving and dispensing characters;

means for transferring bits of information from said storage means to said input/output register during the course of said search;

means for recognizing field mark characters as they are encountered and entered in said register during the search operation and for stepping said counting means upon each said recognition;

and means responsive to a particular count level of said counting means for terminating said search operation following the transfer of the first character of said alphanumeric field into said input/output register, and for indicating that said required field has been located.

19. The system of claim 18, said system further comprising:

means operative to reset said counting means to a particular predetermined count status upon termination of the search and to step said counting means to another predetermined count status;

and means responsive to said latter count status for initiating a transfer operation of another character of alphanumeric information from said required field to said register, whereby a predetermined time delay is established between the printing of successive characters.

20. A system for selecting and handling information stored in memory facilities in a variety of data formats, comprising:

storage means, said storage means having a first portion for storing information according to a first data format, a second portion for storing information according to a second data format, with a division line between said first and second portions that is selectively variable, and said storage means further having a third portion for storing additional information according to said second data format with a division line between said second and said third portions that is invariably established;

means for directly selecting an information location in said first portion of said storage means;

means for providing control signals which are indicative of an information location in said second portion of said memory storage means;

means for providing control signals which are indicative of an information location in said third portion of said storage means;

means controlled by said control signals for selecting information in said second portion of said storage means or in said third portion of said storage means;

and means responsive to a control signal indicative of a particular information transfer operation for initiating a search at the selectively variable location of said second portion of said storage means when information in said second portion has been selected, and for initiating a search at the invariable beginning of said third portion of said storage means when information in said third portion has been selected.

21. A memory selection system, comprising:

storage means, said storage means including a first alphanumeric portion of variable length fields, with the first field of said portion beginning at a storage location in said storage means that is selectively variable, and said storage means further including a second alphanumeric portion of variable length fields, with the first variable length field in said second portion beginning at a storage location in said storage means that is predetermined and invariable;

and selection means, said means being responsive to a first type of control signal for selecting the first and subsequent alphanumeric storage locations in said first portion of said storage means, and said means being further responsive to another type of control signal for selecting the first and subsequent alphanumeric storage locations in said second portion of said storage means.

22. A memory selection system, comprising:

first and second storage means, each of said storage means comprising a matrix of core storage elements arranged in rows and columns, respectively representative of bits and words of information, with the total number of word columns being equal to the product of two predetermined factors, and the total number of bit rows being equal to the product of two predetermined factors, a first set of bit drivers associated with said first storage means, a second set of bit drivers associated with said second storage means, and a cooperating set of bit selection switches;

a first set of bit drive lines, each of said drive lines having a first portion routed in a first direction through a particular bit row, and each of said drive lines having a second portion routed in an opposite direction through another bit row, with the first portion of one bit drive line, and the second portion of an associated bit drive line being routed through each of said bit rows, thereby establishing proper interconnections of said bit drive lines for both reading and writing purposes, said bit drive lines further being arranged in groups equal in number to said first set of bit drivers, each group being connected to a particular one of said bit drivers, and each individual drive line in each of said groups having its terminus connected to a particular one of said set of bit switches;

a second set of bit drive lines wired through said second storage means in a manner identical with that of said first set of drive lines, said second set of drive lines being arranged equally in groups corresponding in number to said second set of bit drivers, with each group being connected to a particular one of said bit drivers, and each individual drive line in each of said groups having its terminus connected to a particular one of said bit switches, the number of said first set of bit drivers times the number of said bit switches equalling the total number of bit drive lines in said first storage means, and the number of said second set of bit drivers times the number of said bit switches equalling the total number of bit drive lines in said second storage means;

a set of word drivers and a cooperating set of read-write switches, the product of drivers times read-write switch sets equalling the total number of words to be selected in said storage means;

a first set of word drive lines individually and serially wired through the word columns in said first and second storage means, said first set of drive lines being arranged equally in a number of groups, each group being connected to a particular one of said word drivers, and each drive line in a group of said first set being further connected at its terminus to a particular one of said read switches;

a second set of word drive lines individually and serially wired through the word columns in said first and second storage means in an opposite direction, said second set of drive lines being arranged equally in a number of groups, each of which is connected to a particular one of said word drivers, and each drive line in a group of said second set being connected at its terminus to a particular one of said write switches;

pulse generating means for supplying related machine operating pulses during repetitive, cyclic intervals;

first counting and selecting means controlled by pulses from said pulse generating means to count in a cyclic manner, each cycle representing a bit interval;

means responsive to signals from said first counting means for selecting said bit drivers and said bit switches in sequence;

second counting means, said second counting means being stepped in a regular cyclic manner under control of said first counting means at a particular count level thereof, each cycle of said second counting means representing a word interval;

third counting means, said counting means having trigger positions that are interconnected in a particular manner in order to supply predetermined sequences of pulses under control of stepping signals, said stepping signals being provided in a cyclic manner by said second counting means whenever it reaches a predetermined count status;

and means responsive to the pulse groups supplied by said third counting means for selecting said word drivers and said word switches in a sequential and orderly fashion in order to access the words in said storage means in a sequential manner.

23. A memory selection system, comprising:

first, second, and third storage means, each of said storage means comprising individual storage elements arranged in rows and columns to represent bits and words of information;

first and second sets of bit drive lines, and an associated set of word drive lines, said first set of bit drive lines being interconnected with said first and second storage means for driving purposes, said second set of bit drive lines being connected through said third storage means for driving purposes, and said word drive lines being connected in a serial manner through said second and third storage means, and said word drive lines being further connected in parallel through said first storage means for word driving purposes;

a set of word drivers, a set of read switches associated with said first storage means, a plurality of sets of read-write switches associated with said second and third storage means, the number of drivers times the number of said read switches equalling the total number of words in said first storage means, and the number of drivers times read-write switch sets equalling the total number of serially connected words in said first and second storage means;

means for sequentially driving said first and said second set of bit drive lines;

and word selection means, said selection means having a first control portion for selectively gating said word drivers in sequence, said selection means further having a second portion for gating said read switches in sequence, and said selection means further having a third control portion for gating said read-write switches in sequence.

24. A memory selection system, comprising:

first, second, and third storage means, each of said storage means comprising individual storage elements arranged in rows and columns to represent bits and words of information;

a first and second set of bit drive lines, and an associated set of word drive lines, said first set of bit drive lines being interconnected with said first and second storage means for driving purposes, said second set of bit drive lines being connected through said third storage means for driving purposes, said word drive lines being connected in parallel through said first storage means, and said word drive lines being serially interconnected through said second and third storage means for driving purposes;

word driving means, said means including a set of word drivers, a set of two read switches associated with said first storage means, a plurality of sets of read-write switches associated with said second and third storage means, the number of drivers times the number of said read switches equalling the total number of words in said first storage means, and the number of drivers times the number of read-write switch sets equalling the total number of serially interconnected words in said first and second storage means;

means for sequentially driving said first and second sets of bit drive lines;

counting means, said counting means comprising a plurality of trigger positions interconnected to count in a predetermined pattern;

means responsive to signals provided by a first group of trigger positions in said counter for selecting said word drivers in a sequential manner, means responsive to signals provided by a particular trigger position in said counting means for selecting one or the other of said read switches, said word drivers being cooperatively gated in a sequential manner with each of said read switches whereby each of the words in said first storage means are accessed in a sequential manner during a first type of operation;

and means responsive to signals provided by a second group of trigger positions in said counter for selecting said read-write switches in a sequential manner, the sequencing of drivers and read-write switch sets being established in a manner whereby each word driver is interconnected with each and every read and write switch during a second type of operation, thereby accessing each and every word in said second and third storage means.

25. A system for transferring and recording alphanumeric information stored in a memory facility to a storage area on a ledger card, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a ledger operation involving said second portion of said storage means for presetting said pulse generating means in order to make available a particular invariable group of pulses for selecting the alphanumeric word locations in said second portion of said storage means in a sequential manner beginning at an invariable word location;

means for scanning a said ledger card in order to record information in said ledger card storage area;

and means operable during the scanning of said ledger card for transferring information from said selected locations to said ledger card storage area.

26. A system for reading and transferring alphanumeric information stored in a magnetic form on a ledger card to a memory facility for use in data processing and accounting activities, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a ledger operation involving said second portion of said storage means for presetting said pulse generating means in order to make available a particular invariable group of pulses for selecting the alphanumeric word locations in said second portion of said storage means in a sequential manner beginning at an invariable word location;

means for scanning a ledger card in order to derive signals representative of alphanumeric words of information stored in magnetic form thereon;

and means operable during the scanning of said ledger card for transferring information from said ledger card to said selected locations.

27. A system for controlling the transfer of alphanumeric information between a ledger card and a memory facility, comprising:

storage means, said storage means having a first portion for storing numeric words and a second portion for storing alphanumeric words;

means for directly selecting a word location in said storage means for the transfer of information;

means for generating pulses according to a predetermined pattern;

selection means, said means being responsive to control signals indicative of a ledger transfer operation and of the beginning of the second portion of said storage means, and said means being further responsive to said generated patterns of pulses for selecting the alphanumeric word locations in said storage means in a sequential manner beginning with a predetermined location;

a ledger unit, said unit having means for scanning an inserted ledger card in order to read or record alphanumeric information stored in a magnetic form on said ledger card;

and means operable during the scanning of said ledger card for transferring information between said ledger card and said selected storage locations.

28. A system for controlling the transfer of information between a ledger card and an accounting document, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a ledger transfer operation involving said second portion of said storage means for presetting said pulse generating means in order to make available a particular invariable group of pulses for selecting the alphanumeric words in said second portion of said storage means in a sequential manner beginning at an invariable word location;

and means responsive to control signals indicative of an alphanumeric transfer operation involving said second portion of said storage means for presetting said pulse generating means in order to make available a particular group of pulses for selecting the alphanumeric words in said second portion of said storage means in a sequential manner beginning at a specified variable word location.

29. A data processing system for the periodic preparation of accounting documents, and concurrent processing of magnetic ledger cards, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a ledger operation involving said second portion of said storage means for presetting said pulse generating means in order to make available a particular invariable group of pulses for selecting the alphanumeric words in said second portion of said storage means in a sequential manner beginning at an invariable word location;

an input/output register for receiving and dispensing characters;

means for scanning a ledger card in order to read alphanumeric information, said information being stored in a magnetic form on said card by individual sets of information bits representative of portions of alphanumeric characters;

means operable during the scanning of said ledger card for gating individual sets of bits representing portions of characters to a first set of individual storage positions in said input/output register;

and means for supplying shifting pulses to said register at a relatively fast rate which will insure the complete transfer of each set of bits from said first set of storage positions to a second set of storage positions in said register prior to the reading of a succeeding set of bits, said shift control means further providing shifting pulses at a relatively slower rate during subsequent time intervals in order to shift each bit in a set into a particular register position for subsequent transfer to said storage means.

30. A data processing system for the periodic preparation of accounting documents, and concurrent processing of magnetic ledger cards, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a read ledger operation involving said second portion of said storage means for presetting said pulse generating means in order to make available a particular invariable group of pulses for selecting the alphanumeric words in said second portion of said storage means in a sequential manner beginning at an invariable word location;

an input/output register for receiving and dispensing characters;

means for scanning a ledger card in order to read and record alphanumeric information, said information being stored in a magnetic form on said card by individual sets of information bits representative of portions of alphanumeric characters;

means operable during the scanning of said ledger card for gating individual sets of bits representing portions of characters to a first set of individual storage positions in said input/and output register;

means for supplying shifting pulses to said register at a relatively fast rate which will insure the complete transfer of each set of bits from said first set of storage positions to a second set of storage positions in said register prior to the reading of a succeeding set of bits, said shift control means further providing shifting pulses at a relatively slower rate during subsequent time intervals in order to shift each bit in a set into a particular register position for subsequent transfer to said storage means;

means responsive to control signals indicative of a record ledger operation involving said second portion of said storage means for presetting said pulse generating means in order to again make available a particular group of pulses for selecting the alphanumeric words in said second portion of said storage means in a sequential manner beginning at said invariable word location;

means for scanning said ledger card in order to record information thereon during said record ledger operation;

means for reading and gating individual bits of information from said storage means into a particular position of said register, and for simultaneously shifting previously entered bits of information in said register;

and means for recognizing the registration of a predetermined number of bits in said register representative of a portion of a character for transferring the same for recording in a magnetic form on said ledger document.

31. A system for controlling the transfer of information between a ledger card and an accounting document, comprising:

storage means, said storage means having a first portion for storing numeric words of information that are both randomly and sequentially accessible, and a second portion for storing alphanumeric words of information that are solely sequentially accessible;

means for directly and randomly selecting any of said numeric words in said storage means for the transfer of information;

means for generating pulses according to a predetermined pattern;

means responsive to control signals indicative of a ledger transfer operation involving said first and second portions of said storage means for presetting said pulse generating means in order to make available a particular invariable group of pulses for selecting both the numeric and alphanumeric words in said storage means in a sequential manner beginning at an invariable word location;

means for scanning a ledger card in order to derive signals representative of numeric and alphanumeric words of information stored in magnetic form thereon;

means operable during the scanning of said ledger card for transferring information from said ledger card to said selected locations;

means responsive to control signals indicative of an alphanumeric transfer operation involving said second portion of said storage means for presetting said pulse generating means in order to make available a particular group of pulses for selecting the alphanumeric words in said second portion of said storage means in a sequential manner beginning at a specified variable word location;

printing means associated with said document;

and means for thereafter initiating successive printing cycles in said printing means in order to print the information selected during said alphanumeric transfer operation.

32. A data processing system for the periodic preparation of accounting documents, and concurrent processing of magnetic ledger cards, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a ledger operation involving said second portion of said storage means for presetting said pulse generating means in order to make available a particular invariable group of pulses for selecting the alphanumeric words in said second portion of said storage means in a sequential manner beginning at an invariable word location;

means for scanning a ledger card in order to derive signals representative of alphanumeric words of information stored in magnetic form thereon;

means operable during the scanning of said ledger card for transferring information from said ledger card to said selected locations;

means responsive to control signals indicative of an alphanumeric transfer operation involving said second portion of said storage means for presetting said pulse generating means in order to make available a particular group of pulses for selecting the alphanumeric words in said second portion of said storage means in a sequential manner beginning at a specified variable word location;

first printing means associated with said accounting document, and second printing means associated with said ledger card;

control circuits for selecting said printing means for printing purposes;

and means for thereafter initiating successive printing cycles in order to print the information selected during said alphanumeric transfer operation.

33. A data processing system for the periodic preparation of accounting documents, and concurrent processing of magnetic ledger cards, comprising:

storage means, said storage means having a first portion for storing numeric words of information, and a second portion for storing alphanumeric words of information;

means for directly selecting a word location in said first portion for the transfer of information;

means for generating pulses according to a predetermined pattern;

means responsive to control signals indicative of a ledger operation involving said second portion of said storage means for presetting said pulse generating means in order to make available a particular invariable group of pulses for selecting the alphanumeric words in said second portion of said storage means in a seqential manner beginning at an invariable word location;

an input/output register for receiving and dispensing characters;

means for scanning a ledger card in order to derive signals representative of alphanumeric words of information stored in magnetic form thereon;

means operable during the scanning of said ledger card for transferring information from said ledger card to said selected locations via said register;

means responsive to control signals indicative of an alphanumeric transfer operation involving said second portion of said storage means for presetting said pulse generating means in order to make available a particular group of pulses for selecting the alphanumeric word locations in said second portion of said storage means in a sequential manner beginning at a variable word location;

a first printing means associtated with said accounting document, and a second printing means associated with said ledger card;

control circuits for selecting said printing means for printing purposes;

means for initiating a transfer of information from said second alphanumeric portion of said storage means to said register during an alphanumeric transfer operation;

and means for recognizing the registration of complete sets of bits representative of characters in said register for transferring the same to said printing means.

34. A system for reading information stored in a magnetic form on a ledger card in order to use the same during the preparation of an accounting document, selectively alter the same, and return the same in its selectively altered form to the ledger card, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a read ledger operation involving said storage means for selecting the alphanumeric words in said storage means in a sequential manner beginning invariably at a predetermined word location;

means for scanning a ledger card in order to derive signals representative of alphanumeric words of information stored in magnetic form thereon;

means operable during the scanning of said ledger card for transferring information from said ledger card to said selected locations;

an alphanumeric entry device;

means responsive to control signals indicative of an alphanumeric entry operation for selecting the alphanumeric word locations in said storage means in a sequential manner;

means for transferring characters of information from said alphanumeric entry device to said storage means;

means responsive to control signals indicative of a record ledger operation for again selecting the alphanumeric words in said storage means in a sequential manner beginning at said invariable word location;

means for scanning said ledger card in order to record information thereon;

and means operable during the scanning of said ledger card for transferring information from said selected locations to said ledger card.

35. A system for controlling the transfer of information between a ledger card and an accounting document, comprising:

means for storing a first predetermined number of individual characters of information in variable length alphanumeric fields, wherein each character comprises a number of bits arranged according to a data format having a particular predetermined number of bit positions, and wherein a second predetermined number of characters less than said first predetermined number comprises a word of information;

means responsive to control signals indicative of a ledger transfer operation involving said storage means for selecting all of said first predetermined number of alphanumeric words in said storage means in a sequential manner beginning invariably at the first word location in said storage means;

and means responsive to control signals indicative of an alphanumeric transfer operation involving said storage means for selecting all or part of said first predetermined number of alphanumeric words in said storage means in a sequential manner beginning at a specified variable word location.

36. A system for controlling the transfer of information between a ledger card and a memory facility, comprising:

means for storing individual characters of alphanumeric information in variable length fields, wherein each word comprises a number of bits arranged according to a data format having a particular predetermined number of bit positions, and wherein a predetermined number of characters comprise a word of information;

selection means, said means being responsive to control signals indicative of a ledger transfer operation for selecting all of the alphanumeric word locations in said storage means in a sequential manner beginning invariably with the first word location in said storing means;

a ledger unit, said unit having means for scanning an inserted ledger card in order to read or record alphanumeric information stored in a magnetic form on said ledger card;

and means operable during the scanning of said ledger card for transferring information between said ledger card and said selected storage locations.

37. A system for reading and transferring alphanumeric information stored in a magnetic form on a ledger card to a memory facility for use in data processing and accounting activities, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a ledger operation involving said storage means for selecting all of the alphanumeric word locations in said storage means in a sequential manner beginning invariably at the first word location in said storing means;

means for scanning a ledger card in order to derive signals representative of alphanumeric words of information stored in magnetic form thereon;

and means operable during the scanning of said ledger card for transferring information from said ledger card to said selected locations.

38. A system for transferring and recording alphanumeric information stored in a memory facility to a storage area on a ledger card, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a ledger operation involving said storage means for selecting all of the said alphanumeric word locations in said storage means in a sequential manner beginning invariably at the first word location in said storing means;

means for scanning a said ledger card in order to record information in said storage area;

and means operable during the scanning of said ledger card for transferring information from said selected locations to said ledger card.

39. A data processing system for the periodic preparation of accounting documents, and concurrent processing of magnetic ledger cards, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a ledger operation involving said storage means for selecting the alphanumeric words in said storage means in a sequential manner;

an input/output register for receiving and dispensing characters;

means for scanning a ledger card in order to read alphanumeric information, said information being stored in a magnetic form on said card by individual sets of information bits representative of portions of alphanumeric characters;

means operable during the scanning of said ledger card for gating individual sets of bits representing portions of characters to a first set of individual storage positions in said input/output register;

and means for supplying shifting pulses to said register at a relatively fast rate which will insure the complete transfer of each set of bits from said first set of storage positions to a second set of storage positions in said register prior to the reading of a succeeding set of bits, said shift control means further providing shifting pulses at a relatively slower rate during subsequent time intervals in order to shift said set of bits into a particular register position for subsequent transfer to said storage means.

40. A data processing system for the periodic preparation of accounting documents, and concurrent processing of magnetic ledger cards, comprising:

means for storing individual characters of information in variable length alphanumeric fields, wherein each character comprises a number of bits arranged according to a format having a particular predetermined number of bit positions, and wherein a predetermined number of characters comprise a word of information;

means responsive to control signals indicative of a read ledger operation involving said storage means for selecting the alphanumeric words in said storage means in a sequential manner;

an input/output register for receiving and dispensing characters;

means for scanning a ledger card in order to read alphanumeric information, said information being stored in a magnetic form on said card by individual sets of information bits representative of portions of alphanumeric characters;

means operable during the scanning of said ledger card for gating individual sets of bits representing portions of character to a first set of individual storage positions in said input/output register;

means for supplying shifting pulses to said register at a relatively fast rate which will insure the complete transfer of each set of bits from said first set of storage positions to a second set of storage positions in said register prior to the reading of a succeeding set of bits, said shift control means further providing shifting pulses at a relatively slower rate during subsequent time intervals in order to shift each bit in a set into a particular register position for subsequent transfer to said storage means;

means responsive to control signals indicative of a record ledger operation involving said storage means for selecting the alphanumeric words in said storage means in a sequential manner;

means for scanning said ledger card in order to record information thereon during said record ledger operation;

means for reading and gating individual bits of information from said storage means into a particular position of said register, and for simultaneously shifting previously entered bits of information in said register;

and means for recognizing the registration of a predetermined number of bits in said register representative of a portion of a character for transferring the same for recording in a magnetic form on said ledger document.

41. A data processing system for the periodic preparation of accounting documents, and concurrent processing of magnetic ledger cards, comprising:

means for storing individual characters of information in variable length alphanumeric fields, wherein each character comprises a number of bits arranged according to a format having a particular predetermined number of bit positions, and wherein a predetermined number of characters comprise a word of information;

means responsive to control signals indicative of a read ledger operation involving said storage means for selecting the alphanumeric words in said storage means in a sequential manner;

an input/output register, said register having six storage positions;

means for scanning a ledger card in order to read alphanumeric information, said information being stored in a magnetic form on said card by individual sets of three information bits representative of portions of alphanumeric characters;

and control means operable during the scanning of a ledger card for transferring each set of three bits in parallel to a first set of three storage positions in said register, said control means further providing shifting impulses at a relatively fast rate for shifting said set of three bits into a second set of three storage positions in said register prior to the reading of a succeeding set of bits, and said control means further providing shifting pulses at a relatively slower rate during subsequent time intervals in order to shift said set of three bits toward a particular position of said register for subsequent transfer to said storage means.

42. A data processing system for the periodic preparation of accounting documents, and concurrent processing of magnetic ledger cards, comprising:

means for storing individual characters of information in variable length alphanumeric fields, wherein each character comprises a number of bits arranged according to a format having a particular predetermined number of bit positions, and wherein a predetermined number of characters comprise a word of information;

means responsive to control signals indicative of a read ledger operation involving said storage means for selecting the alphanumeric words in said storage means in a sequential manner;

an input/output register, said register having six storage positions;

means for scanning a ledger card in order to read alphanumeric information, said information being stored in a magnetic form on said card by individual sets of three information bits representative of portions of alphanumeric characters;

control means operable during the scanning of a ledger card for transferring each set of three bits in parallel to a first set of three storage positions in said register, said control means further providing shifting impulses at a relatively fast rate for shifting said set of three bits into a second set of three storage positions in said register prior to the reading of the next succeeding set of bits and said control means further providing shifting pulses at a relatively slower rate during subsequent time intervals in order to shift said set of three bits toward a particular position of said register for subsequent transfer to said storage means;

means responsive to control signals indicative of a record ledger operation involving said storage means for selecting the alphanumeric words in said storage means in a sequential manner;

means for scanning said ledger card in order to record information thereon during said record ledger operation;

means for reading and gating individual bits of information from said storage means into a particular position of said register, and for simultaneously shifting previously entered bits of information in said register;

and means for recognizing the registration of a set of three bits in said register representative of a portion of a character for transferring the same for recording in a magnetic form on said ledger document.

43. A system for reading information stored in a magnetic form on a ledger card in order to use the same during the preparation of an accounting document, selectively alter the same, and return the same in its selectively altered form to the ledger card, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a read ledger operation involving said second portion of said storage means for selecting the alphanumeric words in said storage means in a sequential manner beginning at an invariable word location;

an input/output register for receiving and dispensing characters;

means for scanning a ledger card in order to read alphanumeric information, said information being stored in a magnetic form on said card by individual sets of information bits representative of portions of alphanumeric characters;

means operable during the scanning of said ledger card for gating individual sets of bits representing portions of characters to a first set of individual storage positions in said input/output register;

means for supplying shifting pulses to said register at a relatively fast rate which will insure the complete transfer of each set of bits from said first set of storage positions to a second set of storage positions in said register prior to the reading of a succeeding set of bits, said shift control means further providing shifting pulses at a relatively slower rate during subsequent time intervals in order to shift said each bit in a set into a particular register position for subsequent transfer to said storage means;

an alphanumeric entry device;

means responsive to control signals indicative of an alphanumeric entry operation for selecting the alphanumeric word locations in said second portion of said storage means in a sequential manner;

means for transferring characters of information from said aliphanumeric entry device to said storage means;

means responsive to control signals indicative of a record ledger operation for again selecting the alphanumeric words in said storage means in a sequential manner beginning at said invariable word location;

means for scanning said ledger card in order to record information thereon during said record ledger operation;

means for reading and gating individual bits of information from said storage means into a particular position of said register, and for simultaneously shifting previously entered bits of information in said register;

and means for recognizing the registration of a predetermined number of bits in said register representative of a portion of a character for transferring the same for recording in a magnetic form on said ledger document.

44. A system for controlling the transfer of information in a ledger card accounting system, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a ledger transfer operation involving said storage means for selecting the alphanumeric words in said storage in a sequential manner beginning at an invariable word location;

means for scanning a ledger card in order to derive signals representative of alphanumeric words of information stored in magnetic form thereon;

means operable during the scanning of said ledger card for transferring information from said ledger card to said selected locations;

means responsive to control signals indicative of an alphanumeric transfer operation involving said storage means for selecting the alphanumeric words in said storage means in a sequential manner beginning at a specified word location;

printing means;

and means for thereafter initiating successive printing cycles of said printing means in order to print the information selected during said alphanumeric transfer operation.

45. The system of claim 44, wherein said printing means has a single element type head;

wherein means are provided for selectively rotating and tilting said head in order to print an informational character;

wherein said printing means further has a number of electromagnetically actuated means for performing various functions associated with printing, such as tabulation, shifting, and the like;

and wherein means are provided for selectively actuating said electromagnetic means in response to functional characters in said register.

46. A data processing system for the periodic preparation of accounting documents, and concurrent processing of magnetic ledger cards, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a ledger operation involving said storage means for selecting the alphanumeric words in said storage means in a sequential manner;

means for scanning a ledger card in order to derive signals representative of alphanumeric words of information stored in magnetic form thereon;

means operable during the scanning of said ledger card for transferring information from said ledger card to said selected locations;

means responsive to control signals indicative of an alphanumeric transfer operation involving said storage means for selecting the alphanumeric words in said storage means in a sequential manner;

first printing means associated with said accounting document, and second printing means associated with said ledger card;

control circuits for selecting said printing means for printing purposes;

and means for thereafter initiating successive printing cycles in said printing means in order to print the information selected during said alphanumeric transfer operation.

47. A data processing system for the periodic preparation of accounting documents, and concurrent processing of magnetic ledger cards, comprising:

means for storing individual characters of information in variable length alphanumeric fields, wherein each character comprises a number of bits arranged according to a data format having a particular predetermined number of bit positions, and wherein a predetermined number of characters comprise a word of information;

means responsive to control signals indicative of a ledger operation involving said storage means for selecting the alphanumeric words in said storage means in a sequential manner beginning at an invariable word location;

an input/output register for receiving and dispensing characters;

means for scanning a ledger card in order to derive signals representative of alphanumeric words of information stored in magnetic form thereon;

means operable during the scanning of said ledger card for transferring information from said ledger card to said selected locations via said register;

means responsive to control signals indicative of an alphanumeric transfer operation involving said storage means for selecting the alphanumeric word locations in said storage means in a sequential manner beginning at a variable word location;

a first printing means associated with said accounting document, and a second printing means associated with said ledger card;

control circuits for selecting said printing means for printing purposes;

means for initiating a transfer of information from said storage means to said register during an alphanumeric transfer operation;

and means for recognizing the registration of complete sets of bits in said register representative of characters for transferring the same to said printing means.

48. A data processing system for the periodic preparation of accounting documents, and concurrent processing of magnetic ledger cards, comprising:

means for storing individual characters of information in variable length alphanumeric fields, wherein each character comprises a number of bits arranged according to a format having a particular predetermined number of bit positions, and wherein a predetermined number of characters comprise a word of information;

means responsive to control signals indicative of a read ledger operation involving said storage means for selecting the alphanumeric words in said storage means in a sequential manner;

an input/output register for receiving and dispensing characters;

means for scanning a ledger card in order to read alphanumeric information, said information being stored in a magnetic form on said card by individual sets of information bits representative of portions of alphanumeric characters, each set being accompanied by a check bit;

a parity check trigger;

means operable during scanning for gating the information bits of each set of bits to a first set of positions in said register, and concurrently gating the check bit associated with said set of bits to said parity check trigger;

means for supplying shifting pulses to said register at a relatively fast rate which will insure the complete transfer of each set of bits from said first set of storage positions to a second set of storage positions in said register prior to the reading of a succeeding set of bits;

means operable during said fast shift operation to change the state of the parity check trigger in accordance with the state of a particular register position as said information bits are shifted through said particular position;

means subsequently operative to further providing shifting pulses at a relatively slower rate during subsequent time intervals in order to shift each bit in a set into a particular register position for subsequent transfer to said storage means;

and means subsequently operable under control of said parity check trigger for providing an indication of correct or incorrect parity during said read operation.

49. The system of claim 48, said system further comprising:

means responsive to control signals indicative of a record ledger operation involving said storage means for selecting the adphanumeric words in said storage means in a sequential manner;

means for scanning said ledger card in order to record information thereon during said record ledger operation;

means for reading and gating individual bits of information from said storage means into a particular position of said register, and for simultaneously shifting previously entered bits of information in said register;

means for changing the state of said parity check trigger or not, as required, as each bit is shifted into said particular position of said register, thereby establishing a parity check bit for each set of information bits;

and means for recognizing the registration of a predetermined number of bits in said register representative of a portion of a character for transferring the same and said check bit for recording in a magnetic form on said ledger document.

50. The system of claim 49, said system further comprising:

means for recognizing the completion of said record operation for thereafter initiating a read check operation;

means responsive to a read check signal provided during said operation for again scanning said ledger card in order to transfer sets of bits to said register;

means for shifting each set of bits through a particular register position;

means for concurrently reading the corresponding bit in said storage means;

and means for comparing the corresponding sets of bits during the scanning operation in order to determine the correctness of the record operation.

51. A system for selecting and controlling the transfer of information, comprising:

storage means of predetermined capacity, said storage means having a first portion for exclusive storage of information in a first data format, and a second portion for exclusive storage of information in a second data format;

selectively settable means for variably establishing a data format boundary between said first and second portions of said storage means to thereby expand information in one of said portions and contract information in the other of said portions;

and means controlled by said boundary establishing means for recognizing and processing the information in the first and second portions of said storage means according to the respective data formats.

52. The system of claim 51 wherein:

additional means is provided for processing said information conjointly and irrespective of said data format boundary.

53. A system for selecting and controlling the transfer of information, comprising:

storage means of predetermined capacity, said storage means having a first portion for exclusive storage of numeric information having a first data format, and a second portion for exclusive storage of alphanumeric information having a second data format;

selectively settable means for variably establishing a data format boundary between said first and second portions of said storage means to thereby expand information in one of said portions and contract information in the other of said portions;

and means controlled by said boundary establishing means for recognizing and processing the numeric information and the alphanumeric information according to their respective data formats.

54. A system for selecting and controlling the transfer of information into and from individual storage locations, or a group of storage locations beginning with a particular individual location, comprising:

storage means of predetermined capacity, said storage means having a first portion for exclusive storage of information in a first data format, and a second portion for exclusive storage of information in a second data format;

selectively settable means for variably establishing a data format boundary between said first and second portions of said storage means to thereby expand information in one of said portions and contract information in the other of said portions;

means for directly and randomly selecting an information location in said first portion for the transfer of information;

means for generating pulses according to a predetermined pattern in order to select information in said storage means;

and sequencing means controlled by said boundary establishing means and responsive to a control signal indicative of a transfer operation involving said second portion of said storage means to preset and thereafter operate said pulse generating means in order to make available a particular group of pulses for selecting the information in said second portion of said storage means in a sequential manner.

55. The system of claim 54 wherein:
said sequencing means is further responsive to a control signal indicative of a transfer operation involving both said first and second portions of said storage means to preset and thereafter operate said pulse generating means for selecting both the first and second data format information in a sequential manner irrespective of said data format boundary.

56. A system for selecting and controlling the transfer of information into and from individual storage locations, or a group of storage locations beginning with a particular individual location, comprising:

storage means of predetermined capacity, said storage means having a first portion for exclusive storage of numeric information having a first data format, and a second portion for exclusive storage of alphanumeric information having a second data format;

selectively settable means for variably establishing a data format boundary between said first and second portions of said storage means to thereby expand information in one of said portions and contract information in the other of said portions;

means for directly and randomly selecting numeric information in said first portion;

means for generating pulses according to a predetermined pattern for selecting information in said storage means;

and sequencing means controlled by said boundary establishing a means and responsive to control signals indicative of an alphanumeric transfer operation involving said second portion of said storage means for presetting and operating said pulse generating means in order to make available a particular invariable group of pulses for selecting the alphanumeric words in said second portion of said storage means in a sequential manner.

57. The system of claim 56 wherein:
said sequencing means is further responsive to a control signal indicative of a transfer operation involving both said first and second portions to preset and thereafter operate said pulse generating means for selecting both the numeric and alphanumeric information in a sequential manner irrespective of said data format boundary.

58. A system for controlling the transfer of alphanumeric information between a ledger card and a memory facility, comprising:

storage means, said storage means having a first portion for exclusive storage of numeric words having a first data format and a second portion for exclusive storage of alphanumeric words having a second data format;

selectively settable means for variably establishing a data format boundary between said first and second portions of said storage means to thereby expand information in one of said portions and contract information in the other of said portions;

means for directly selecting a word location in said storage means for the transfer of information;

means for generating pulses according to a predetermined pattern in order to select information in said storage means;

selection means, said means being responsive to a control signal indicative of a ledger transfer operation to preset and thereafter operate said pulse generating means for selecting the word locations in said storage means in a sequential manner beginning with a predetermined location and irrespective of said data format boundary;

a ledger unit, said unit having means for scanning an inserted ledger card in order to read or record information stored in a magnetic form on said ledger card;

and means operable during the scanning of said ledger card for transferring information between said ledger card and said selected storage locations.

59. The system of claim 58, further comprising:
means controlled by said data format establishing means for recognizing and selectively processing information in said first and second portions of said storage means according to the respective data formats.

60. The system of claim 59 wherein:
said recognizing and processing means includes manual entry means for entering information into either of said first and second portions of said storage means and printing means for printing information from either of said first and second portions of said storage means.

61. A system for selecting and controlling the transfer of information into and from individual storage locations, or a group of storage locations beginning with a particular individual location, comprising:

storage means, said storage means having a first portion for storing information in a first data format that is both randomly and sequentially accessible, and a second portion for storing information in a second data format that is solely sequentially accessible;

first means for directly and randomly selecting individual information locations in said first portion for the transfer of information;

second means independent of said first means for generating pulses according to predetermined patterns;

and third means responsive to control signals indicative of a transfer operation involving said first and second portions of said storage means to preset and thereafter operate said pulse generating means for selecting both the first and second data format information in a sequential manner, and said third means being further responsive to control signals indicative of a transfer operation involving said second portion of said storage means for presetting said second means to an initial status, and thereafter operating said second means in order to make available a predetermined number of pulse patterns for selecting only the information in said second portion of said storage means in a sequential manner beginning at a specified location.

62. A system for selecting and controlling the transfer of information into and from individual storage locations, or a group of storage locations beginning with a particular individual location, comprising:

storage means, said storage means having a first portion for storing numeric words that are both randomly and sequentially accessible, and a second portion for storing alphanumeric words that are solely sequentially accessible;

means for directly and randomly selecting any word location in the first portion of said storage means for the transfer of information;

second means independent of said first means for generating pulses according to a predetermined pattern;

and selection means, said selection means being responsive to control signals indicative of a transfer operation involving both said first and second portions of said storage means to preset and thereafter operate said generated patterns of pulses for selecting the numeric and alphanumeric words in a sequential manner, and said selection means being further responsive to control signals indicative of a transfer operation and of the beginning of the second portion of said storage means to preset and thereafter operate said pulse generating means to select the alphanumeric word locations in said storage means in a sequential manner from said beginning location.

63. A system for controlling the transfer of alphanumeric information between a ledger card and a memory facility, comprising:

storage means, said storage means having a first portion for storing a first type of information that is both randomly and sequentially accessible, and a second portion for storing a second type of information that is solely sequentially accessible;

means for directly and randomly selecting for transfer the information in the first portion of said storage means;

means for generating pulses according to a predetermined pattern;

selection means, said means being responsive to control signals indicative of a ledger transfer operation and to said generated patterns of pulses for selecting both types of information in said storage means in a sequential manner beginning with a predetermined location;

a ledger unit, said unit having means for scanning an inserted ledger card in order to read or record information stored in a magnetic form on said ledger card;

and means operable during the scanning of said ledger card for transferring information between said ledger card and said selected storage locations.

References Cited by the Examiner

UNITED STATES PATENTS

| 2,872,666 | 2/1959 | Greenhalgh | 340—172.5 |
| 3,077,580 | 2/1963 | Underwood | 340—172.5 |

References Cited by the Applicant

UNITED STATES PATENTS

| 2,902,213 | 9/1959 | Hamilton. |
| 2,947,475 | 8/1960 | Rauch et al. |
| 2,967,295 | 1/1961 | Dirks. |
| 2,972,444 | 2/1961 | Phelan. |
| 3,012,717 | 12/1961 | Sobisch. |
| 3,031,647 | 4/1962 | Dirks. |
| 3,063,628 | 11/1962 | Hebel. |
| 3,112,394 | 11/1963 | Close. |

FOREIGN PATENTS

| 786,021 | 11/1957 | Great Britain. |
| 786,046 | 11/1957 | Great Britain. |

ROBERT C. BAILEY, *Primary Examiner.*

M. LISS, *Assistant Examiner.*